(12) United States Patent
Meyers et al.

(10) Patent No.: US 12,138,545 B2
(45) Date of Patent: *Nov. 12, 2024

(54) FACILITATING PLAY OF GAMES VIA GENRE CUSTOMIZED DISPLAY OF GAME NFTs

(71) Applicant: Galiant Arts, LLC, Austin, TX (US)

(72) Inventors: Mark Meyers, Austin, TX (US); Bruce E. Stuckman, Austin, TX (US); John W. Howard, Cedar Park, TX (US); Brian G. Howard, Austin, TX (US); Gregory Meador, Austin, TX (US)

(73) Assignee: Galiant Arts, LLC, Austin, TX (US)

( * ) Notice: Subject to any disclaimer, the term of this patent is extended or adjusted under 35 U.S.C. 154(b) by 78 days.

This patent is subject to a terminal disclaimer.

(21) Appl. No.: 18/299,252

(22) Filed: Apr. 12, 2023

(65) Prior Publication Data

US 2023/0264107 A1 Aug. 24, 2023

Related U.S. Application Data

(63) Continuation of application No. 17/656,084, filed on Mar. 23, 2022, now Pat. No. 11,786,820.

(Continued)

(51) Int. Cl.
  *A63F 13/00* (2014.01)
  *A63F 13/352* (2014.01)
  *A63F 13/60* (2014.01)
  *A63F 13/79* (2014.01)
  *H04L 9/00* (2022.01)

(52) U.S. Cl.
  CPC ............ *A63F 13/60* (2014.09); *A63F 13/352* (2014.09); *A63F 13/79* (2014.09); *H04L 9/50* (2022.05)

(58) Field of Classification Search
  CPC .......... A63F 13/69; A63F 13/71; A63F 13/77; H04L 9/50
  See application file for complete search history.

(56) References Cited

U.S. PATENT DOCUMENTS

| 7,921,302 B2 | 4/2011 | Gatto |
| 2010/0087251 A1 | 4/2010 | Collar |

(Continued)

FOREIGN PATENT DOCUMENTS

| WO | WO-2021062160 A1 * | 4/2021 | ......... G06F 16/2365 |
| WO | WO-2022204404 A1 * | 9/2022 | ............ G06F 21/10 |

*Primary Examiner* — David L Lewis
*Assistant Examiner* — Eric M Thomas
(74) *Attorney, Agent, or Firm* — Garlick & Markison; Bruce E. Stuckman

(57) ABSTRACT

A non-fungible token (NFT) platform operates by: accessing, via a network interface, a plurality of game NFTs, each of the plurality of game NFTs including a playable instance of an associated game that is accessible by a user of a client device; generating, via a processor, display data associated with a customized collection display that contains the plurality of game NFTs; sending, via the network interface, the display data associated with a customized collection display to the client device for display via a graphical user interface associated with the client device; receiving, via the graphical user interface, a selection of one the plurality of game NFTs for play of the associated game; and facilitating, via the network interface, play of the associated game in conjunction with the client device.

20 Claims, 217 Drawing Sheets

Related U.S. Application Data

(60) Provisional application No. 63/310,376, filed on Feb. 15, 2022, provisional application No. 63/309,382, filed on Feb. 11, 2022, provisional application No. 63/308,546, filed on Feb. 10, 2022, provisional application No. 63/307,349, filed on Feb. 7, 2022, provisional application No. 63/306,405, filed on Feb. 3, 2022, provisional application No. 63/306,412, filed on Feb. 3, 2022, provisional application No. 63/305,559, filed on Feb. 1, 2022, provisional application No. 63/305,505, filed on Feb. 1, 2022, provisional application No. 63/302,757, filed on Jan. 25, 2022, provisional application No. 63/302,768, filed on Jan. 25, 2022, provisional application No. 63/297,394, filed on Jan. 7, 2022, provisional application No. 63/266,478, filed on Jan. 6, 2022, provisional application No. 63/265,754, filed on Dec. 20, 2021, provisional application No. 63/264,811, filed on Dec. 2, 2021, provisional application No. 63/263,844, filed on Nov. 10, 2021, provisional application No. 63/262,858, filed on Oct. 21, 2021, provisional application No. 63/262,762, filed on Oct. 20, 2021, provisional application No. 63/262,536, filed on Oct. 14, 2021.

(56) References Cited

U.S. PATENT DOCUMENTS

| | | | |
|---|---|---|---|
| 2021/0082044 A1* | 3/2021 | Sliwka | H04L 9/3255 |
| 2023/0079127 A1 | 3/2023 | Benedetto | |

* cited by examiner

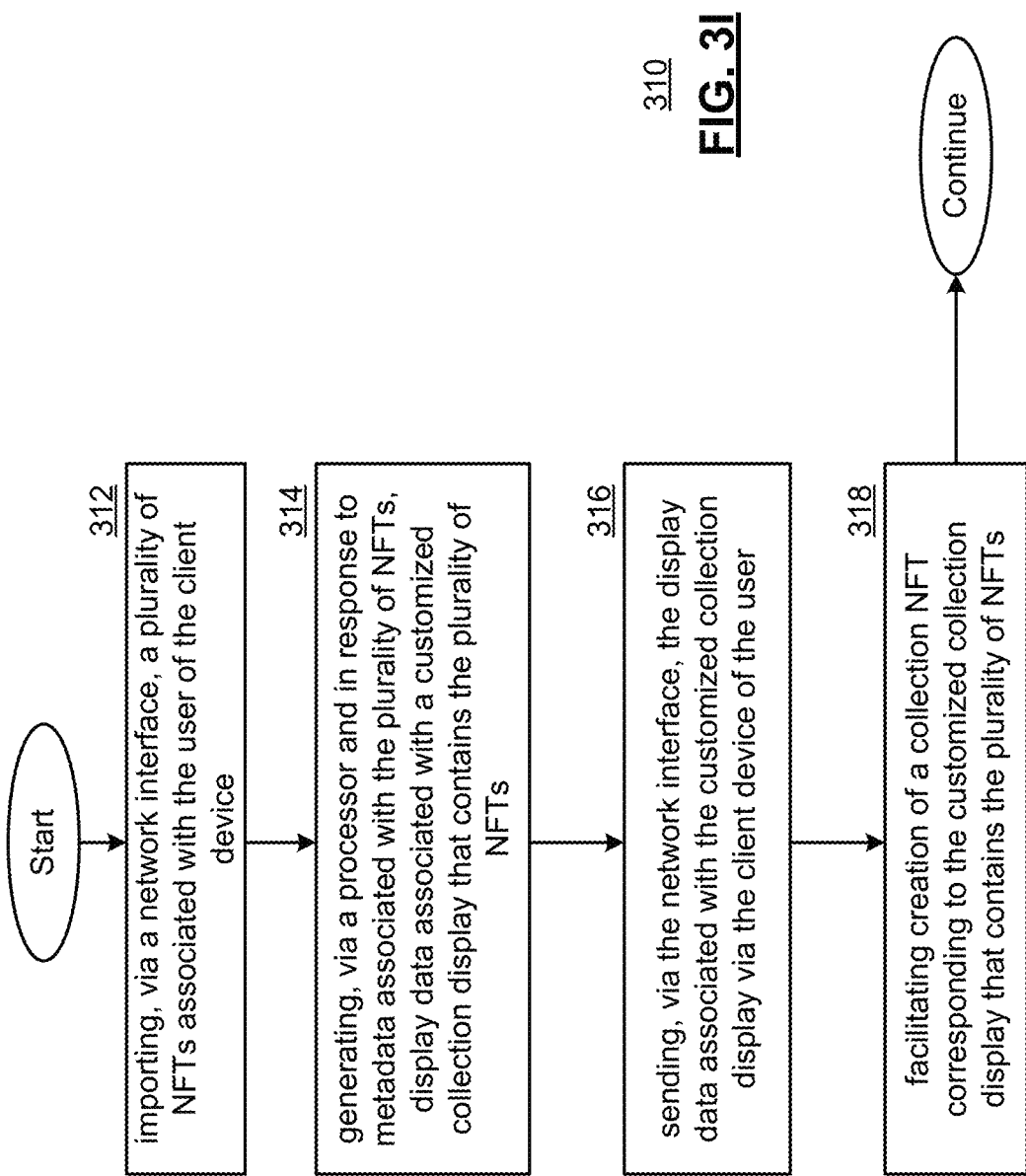

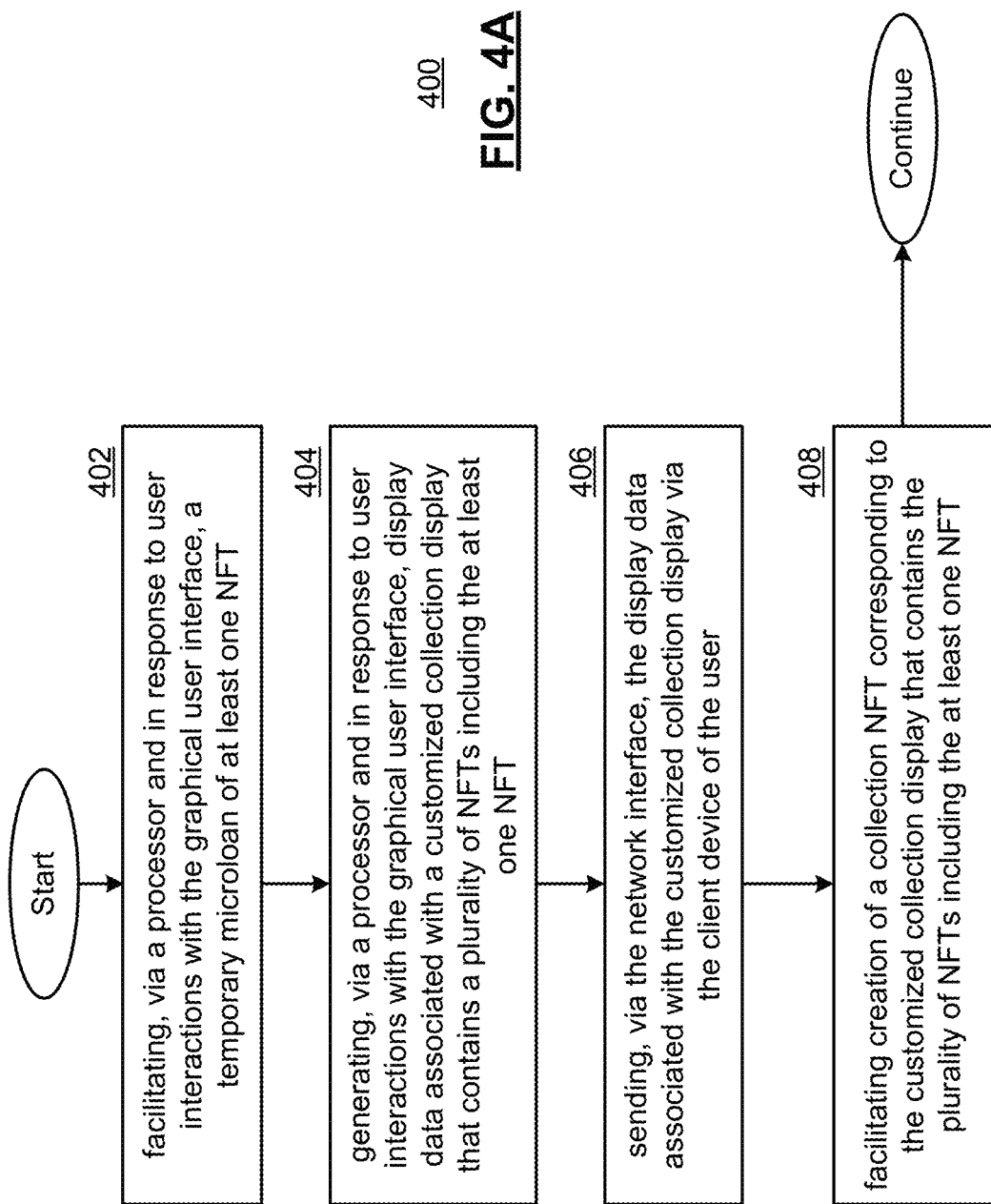

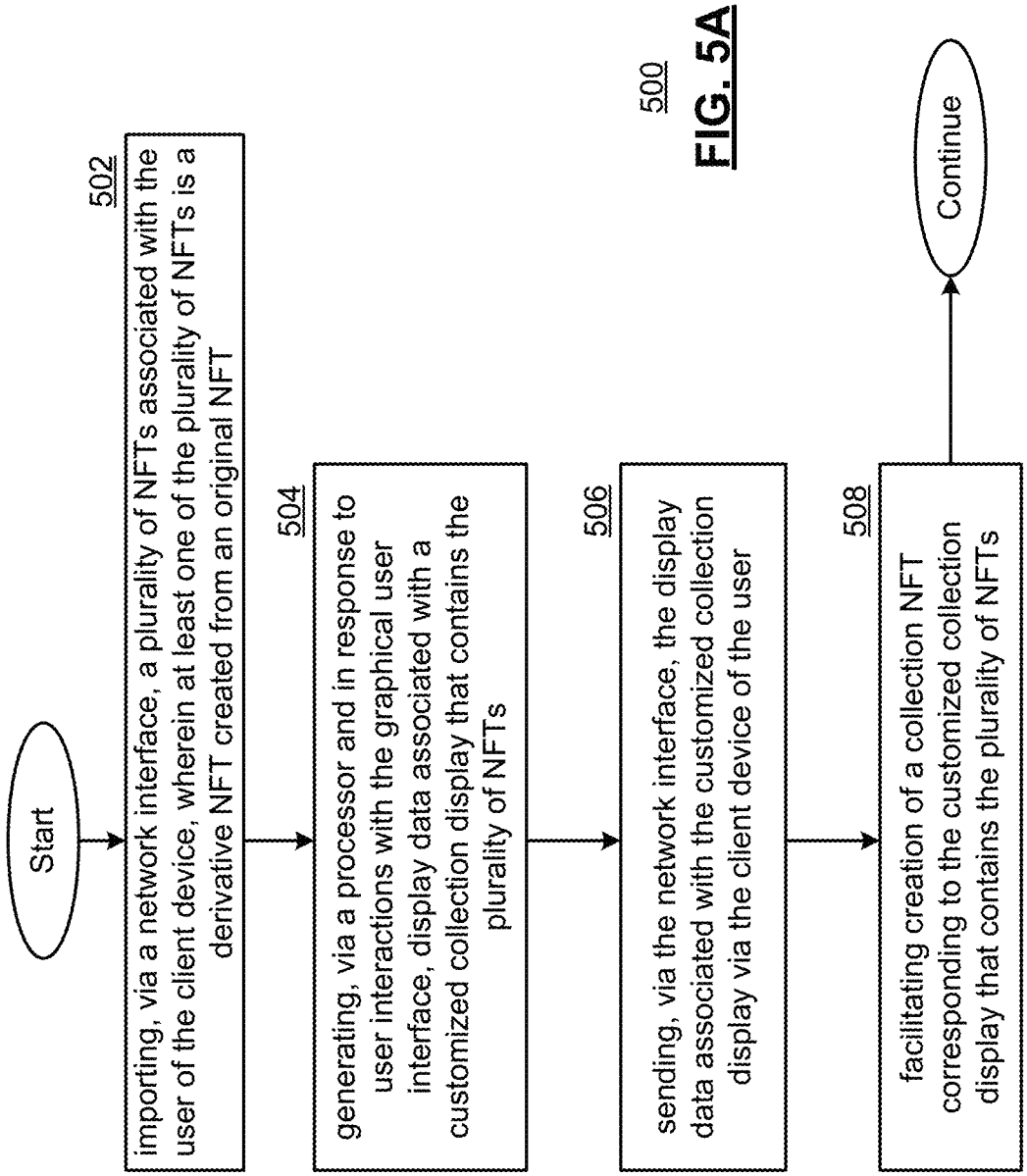

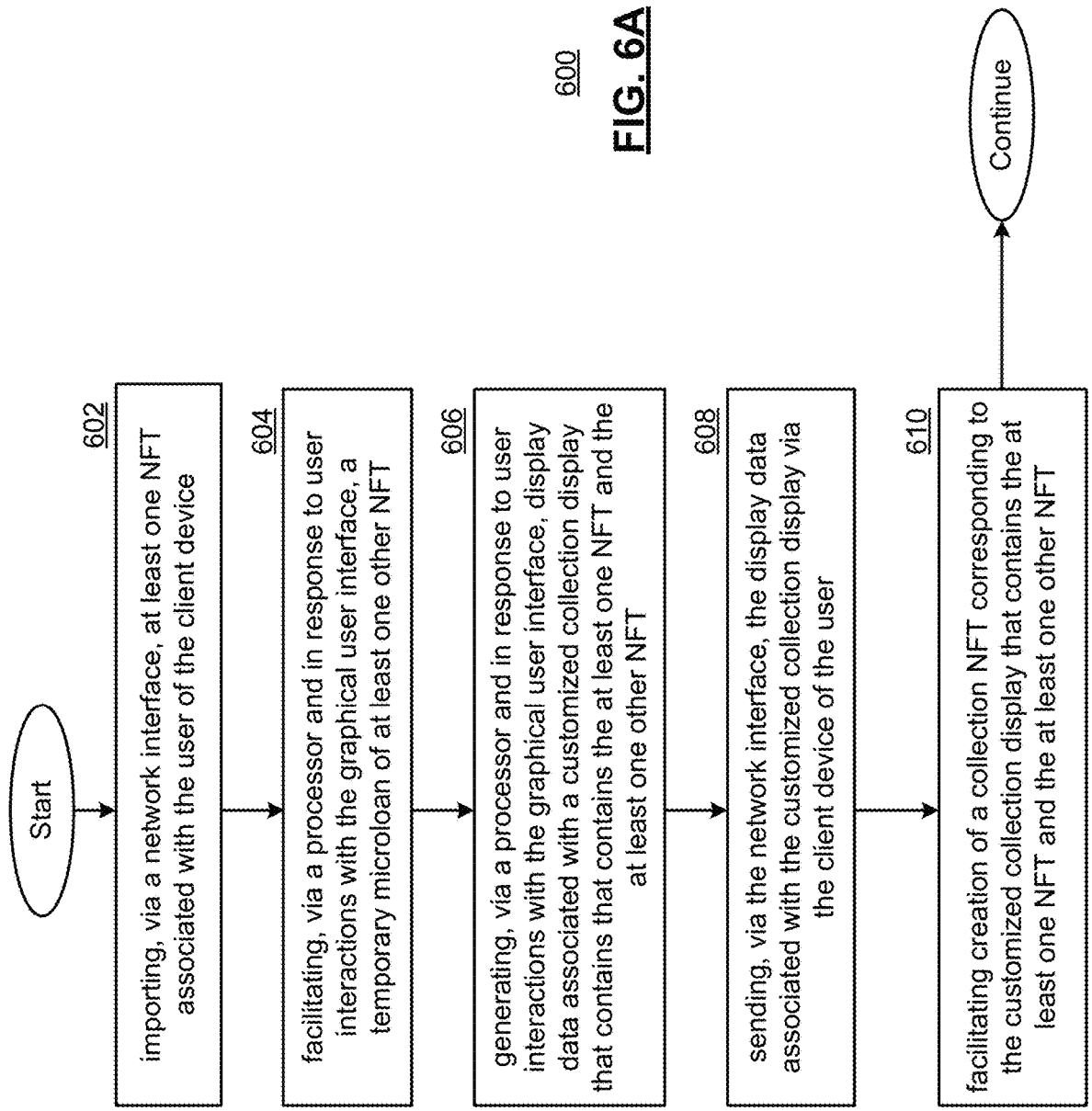

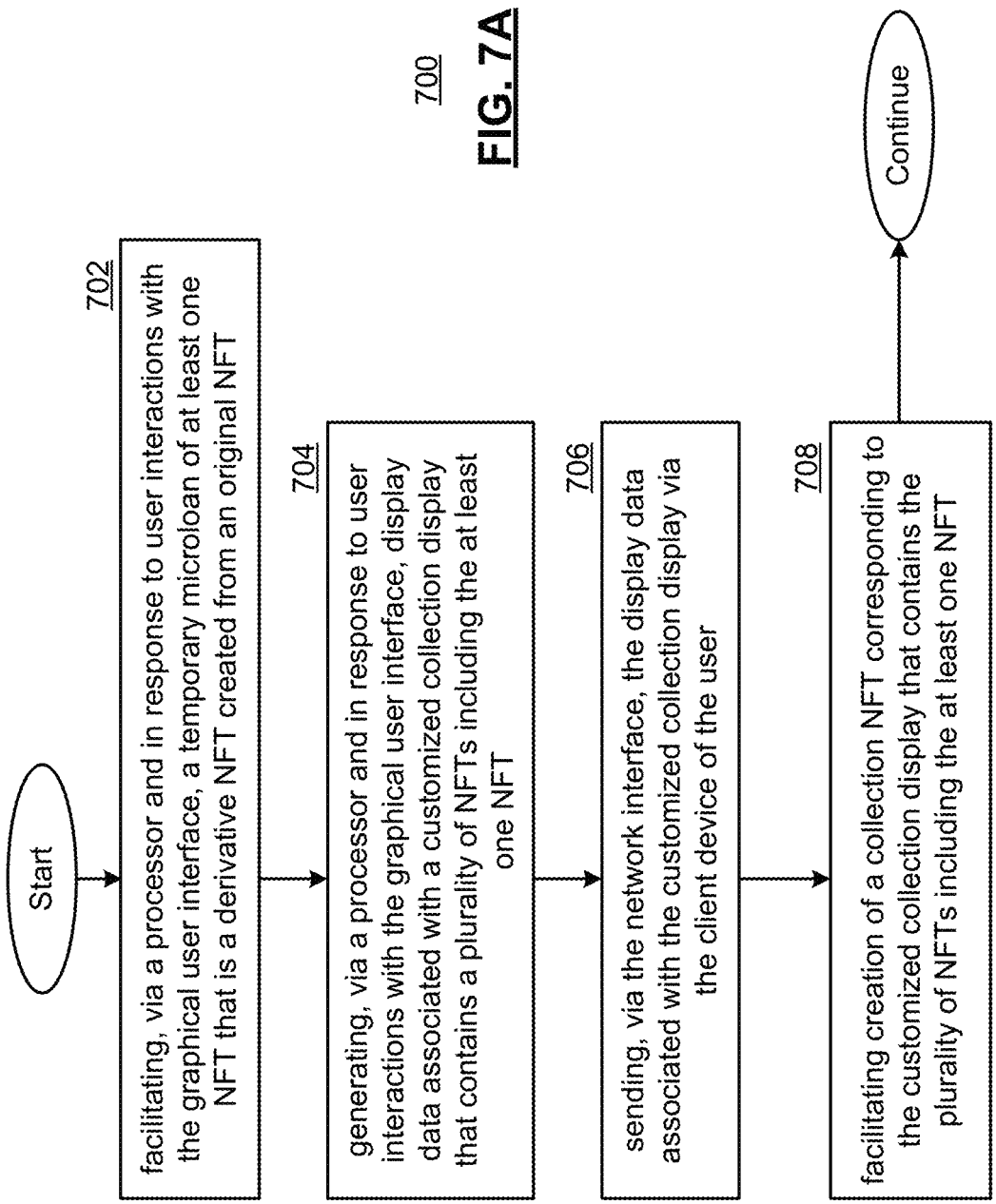

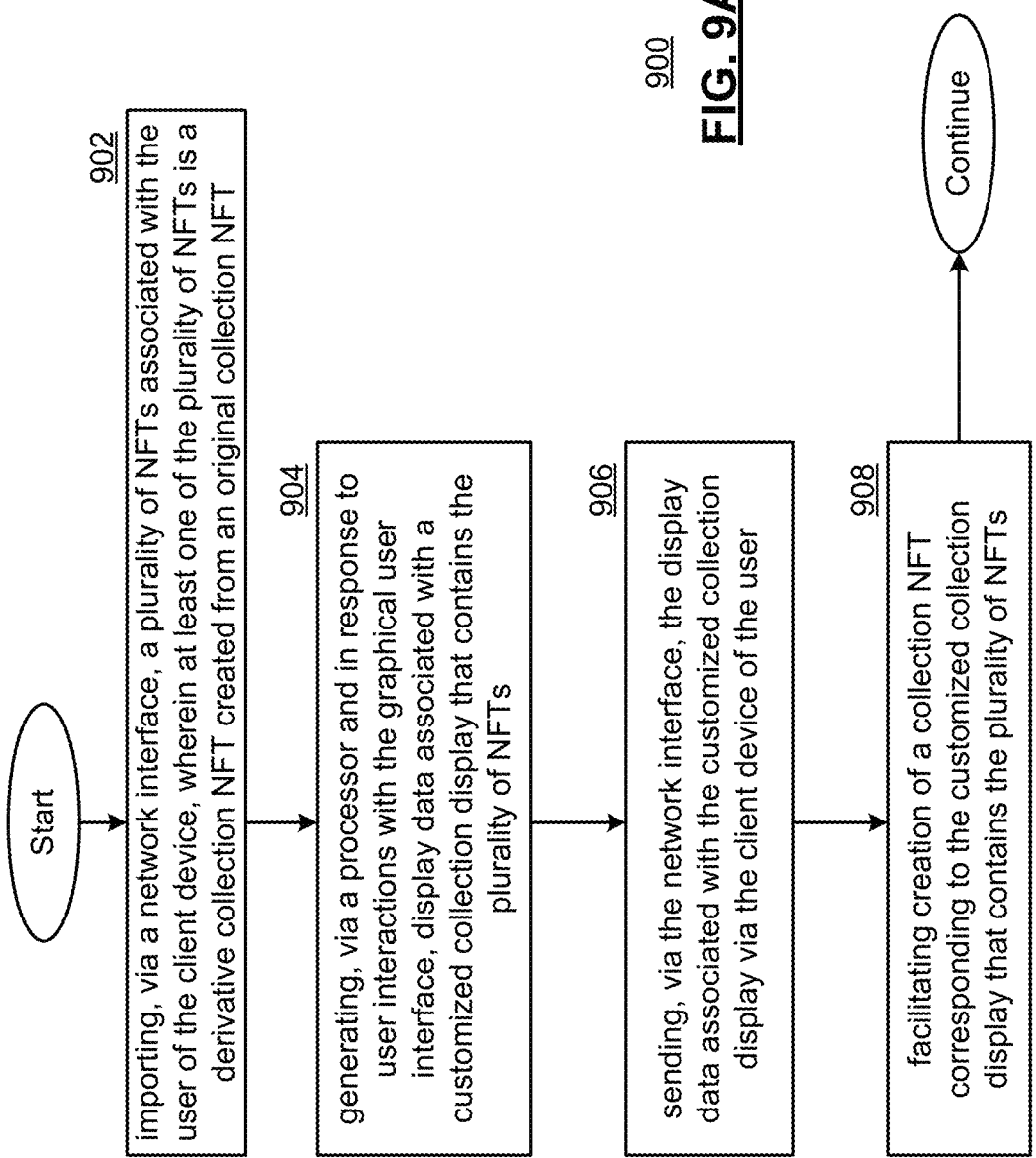

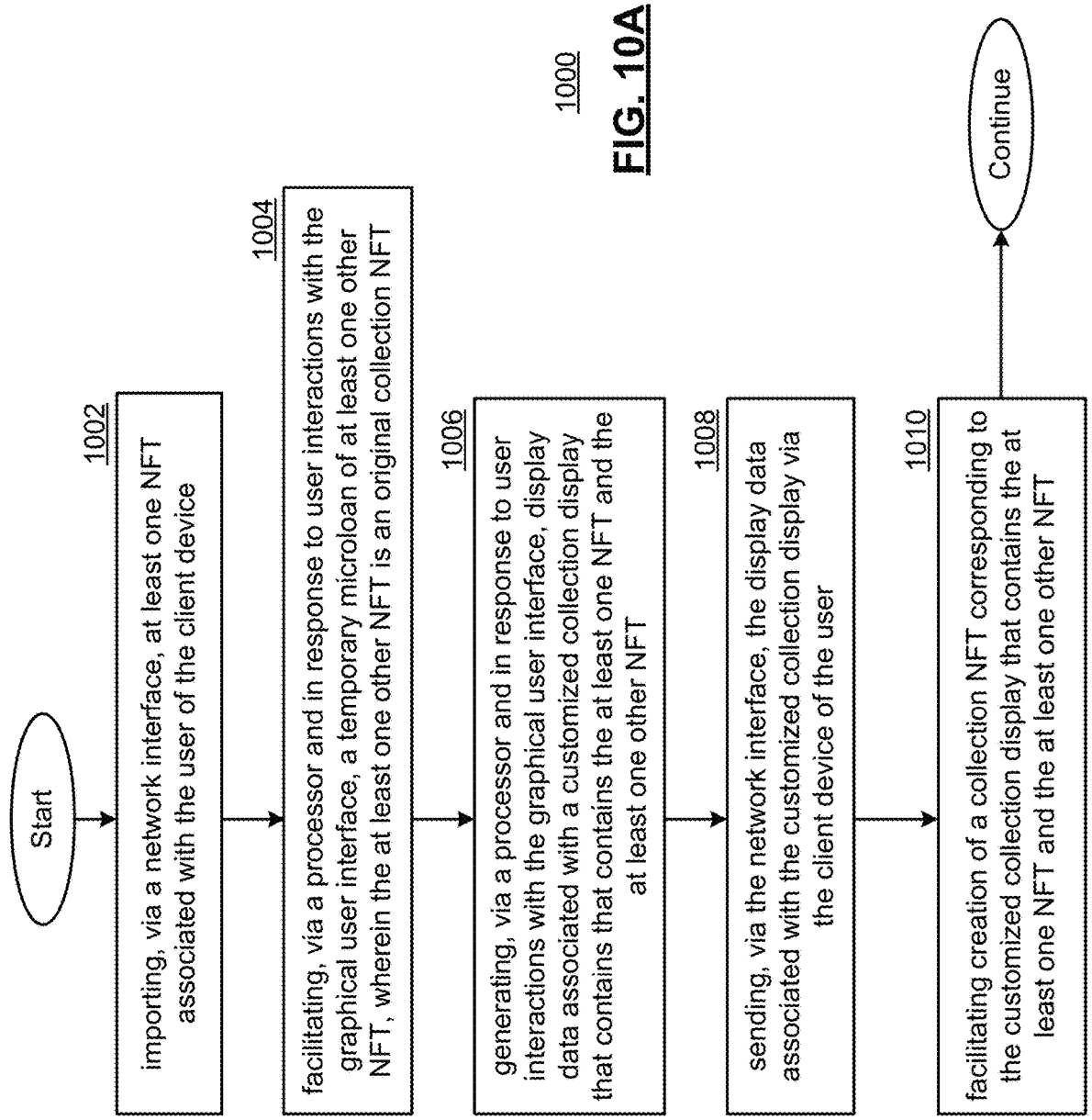

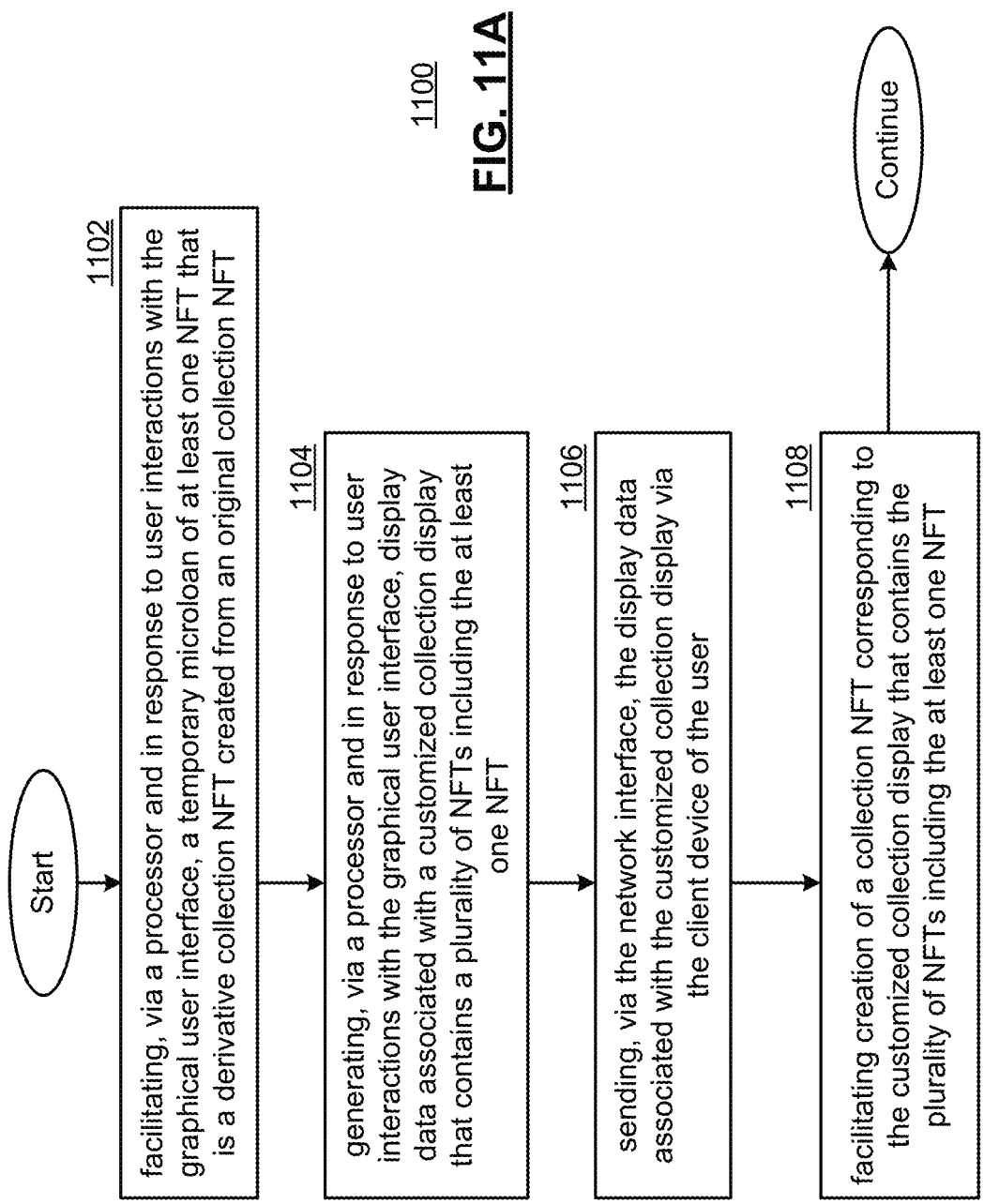

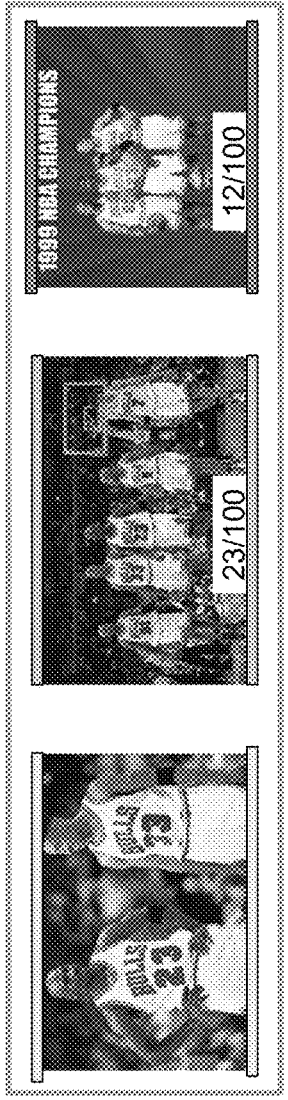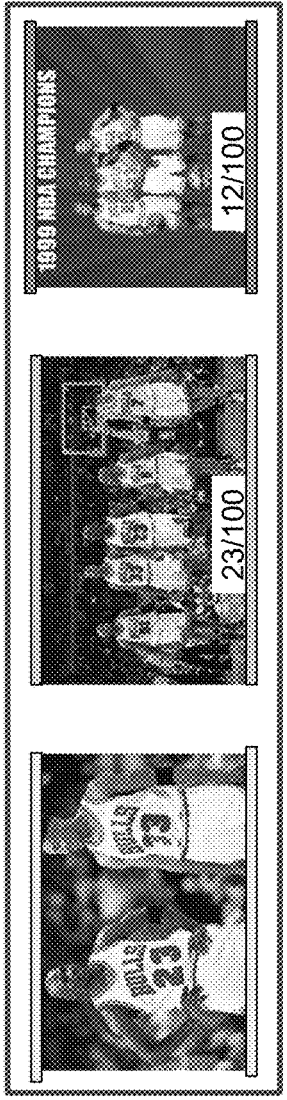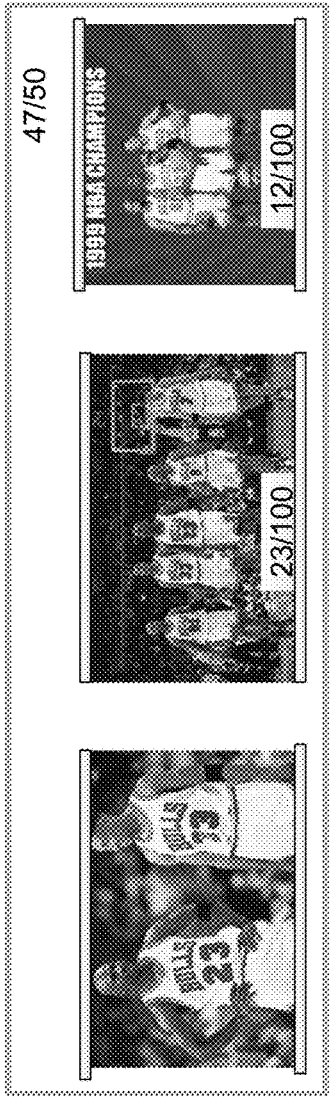
FIG. 12B

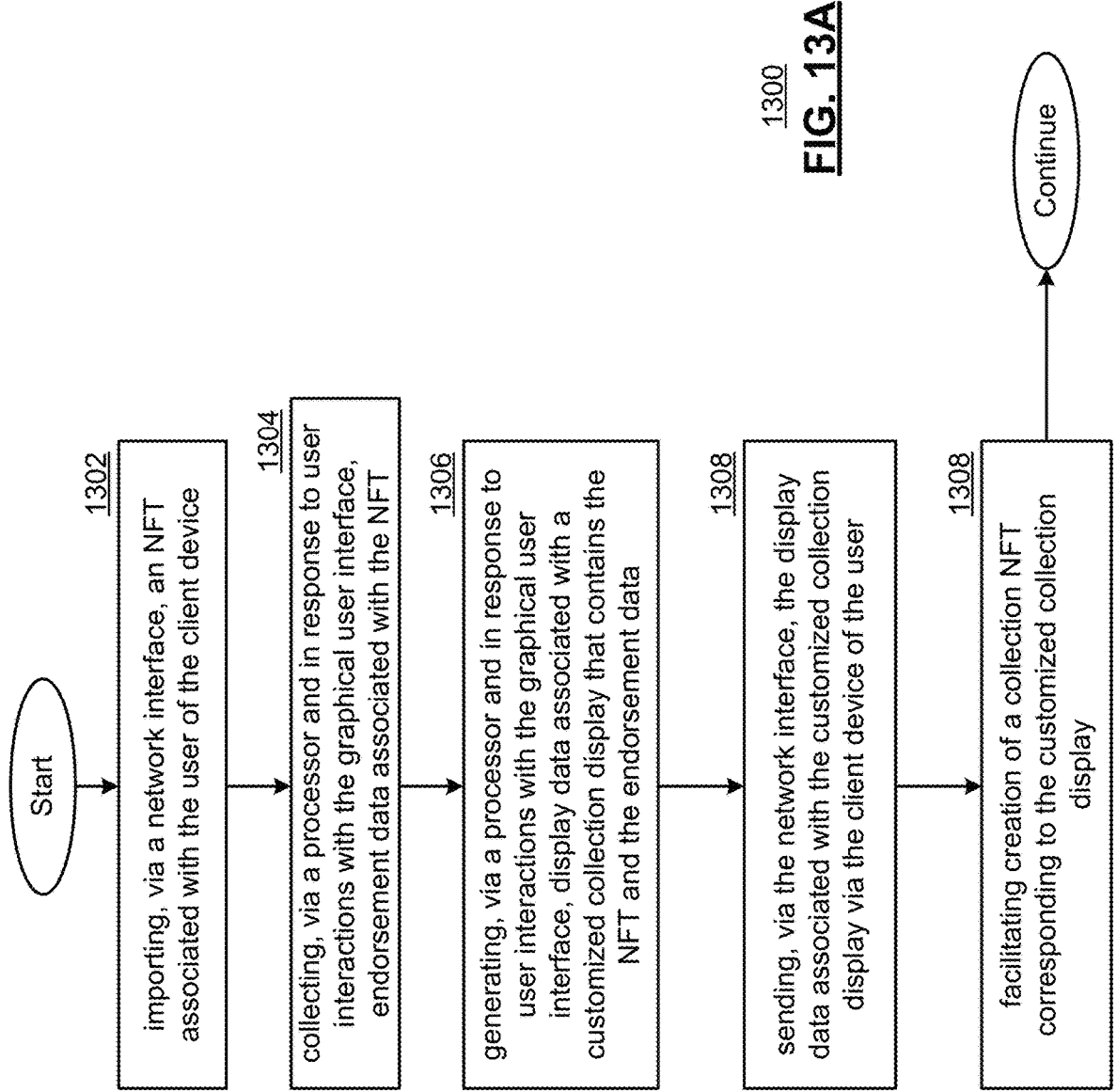

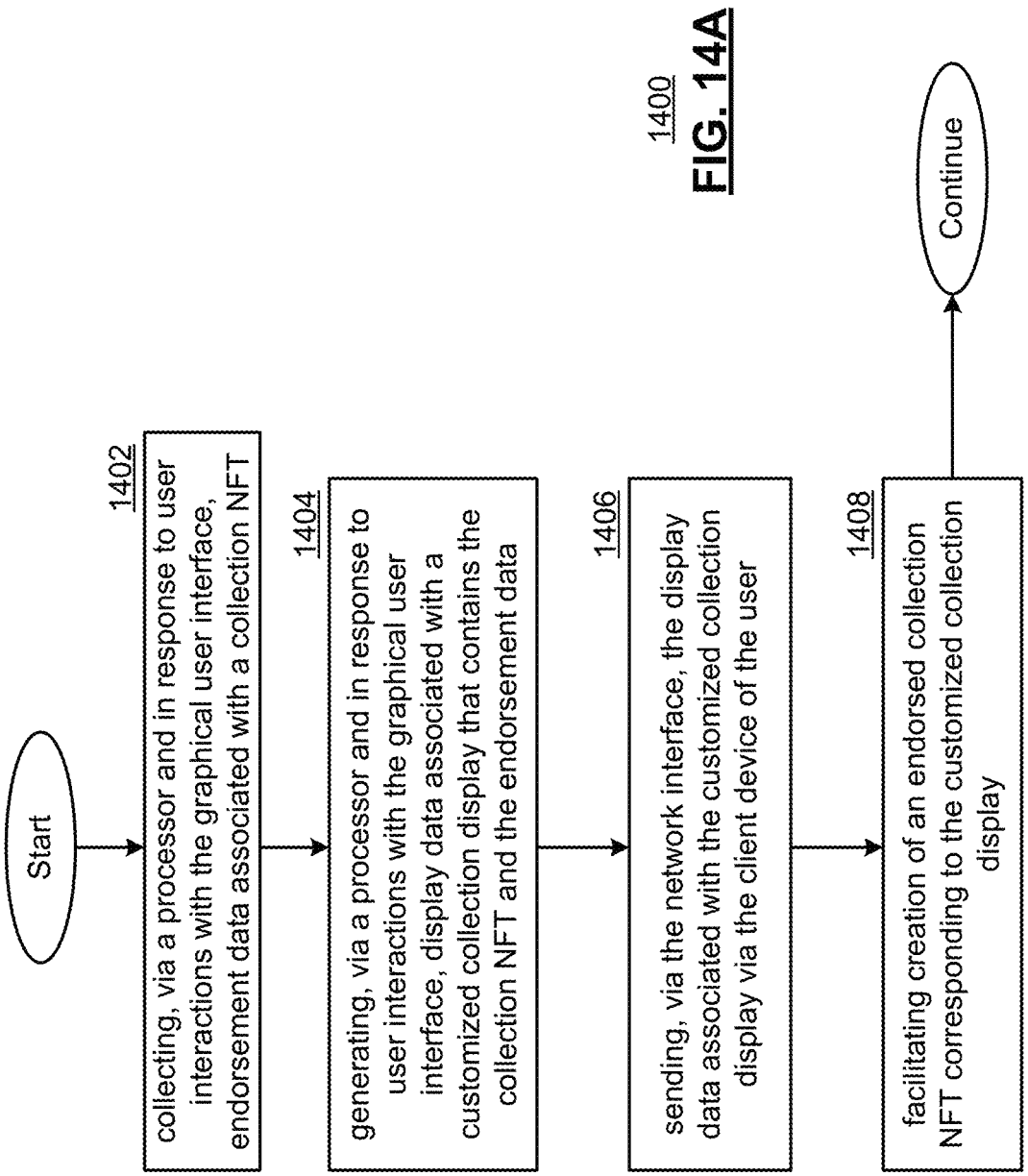

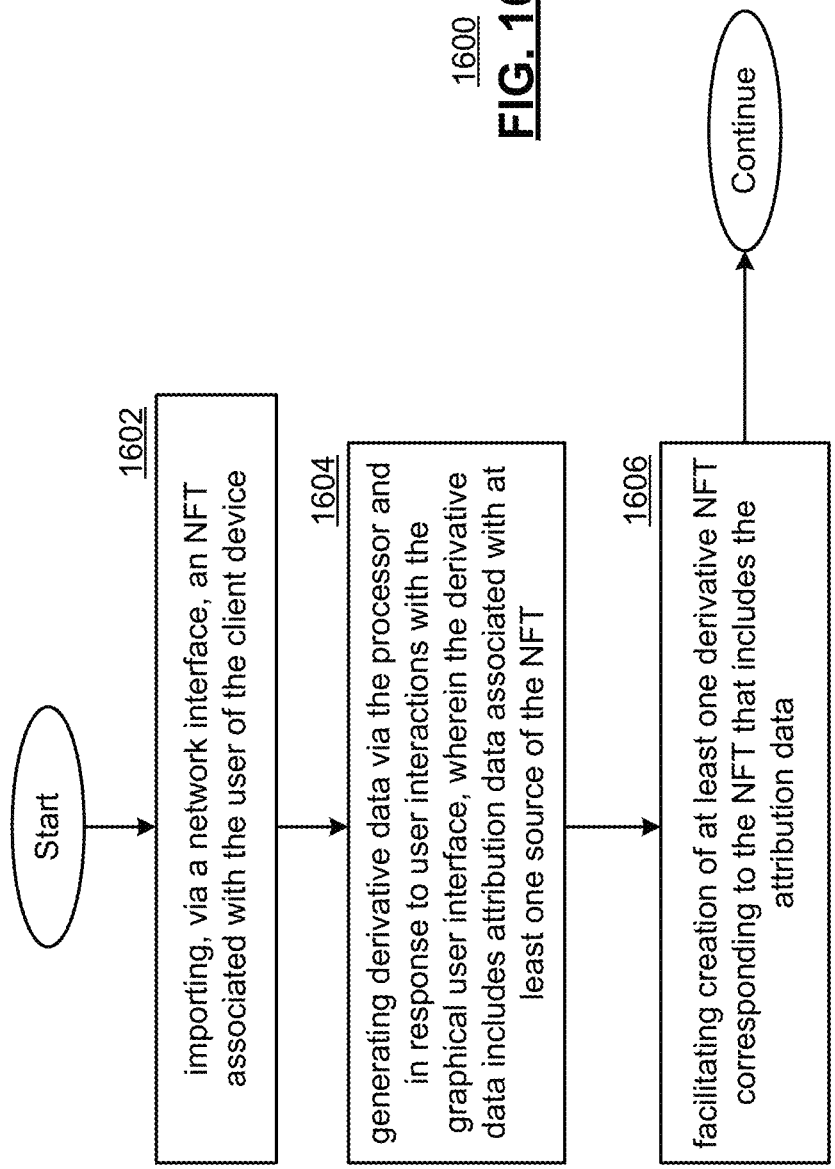

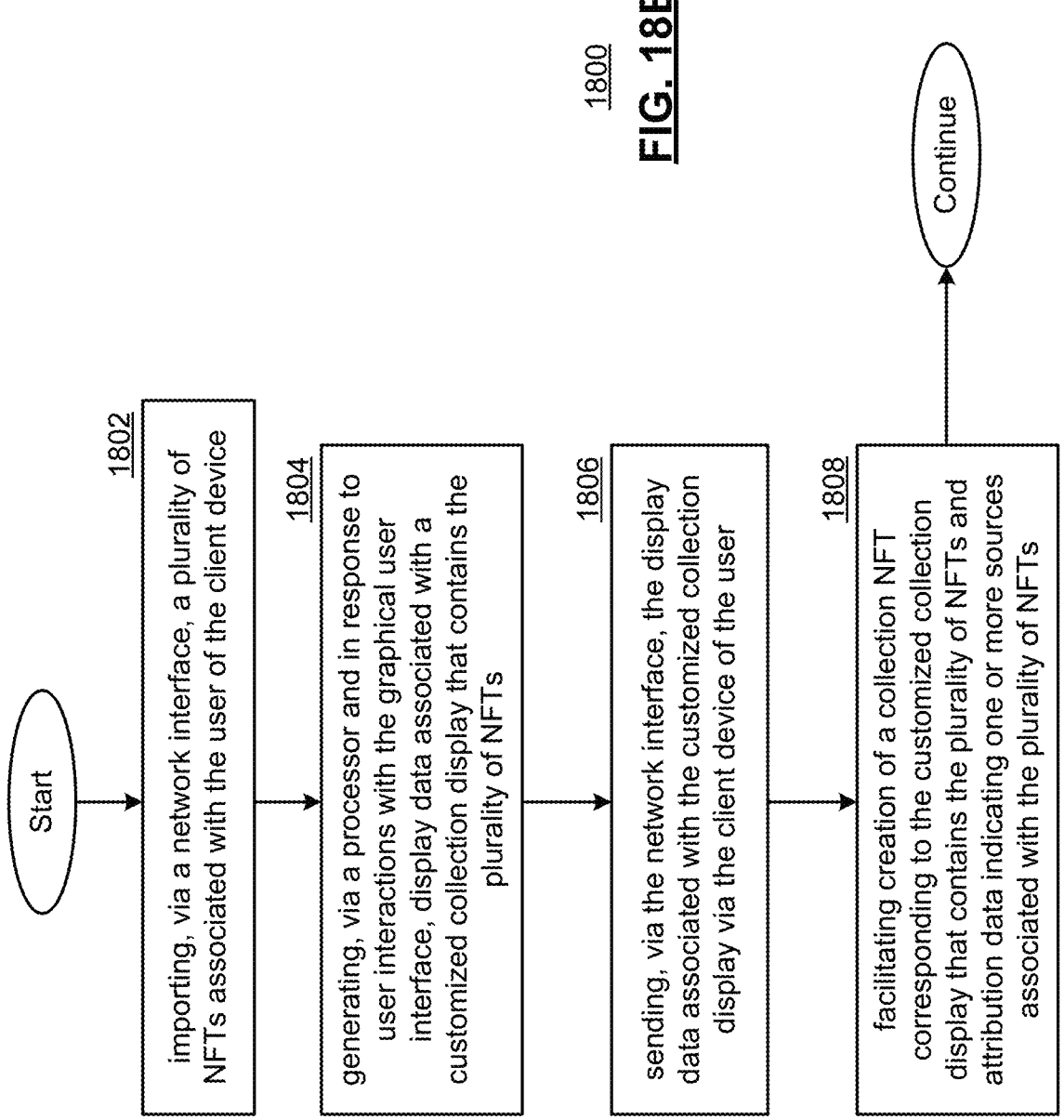

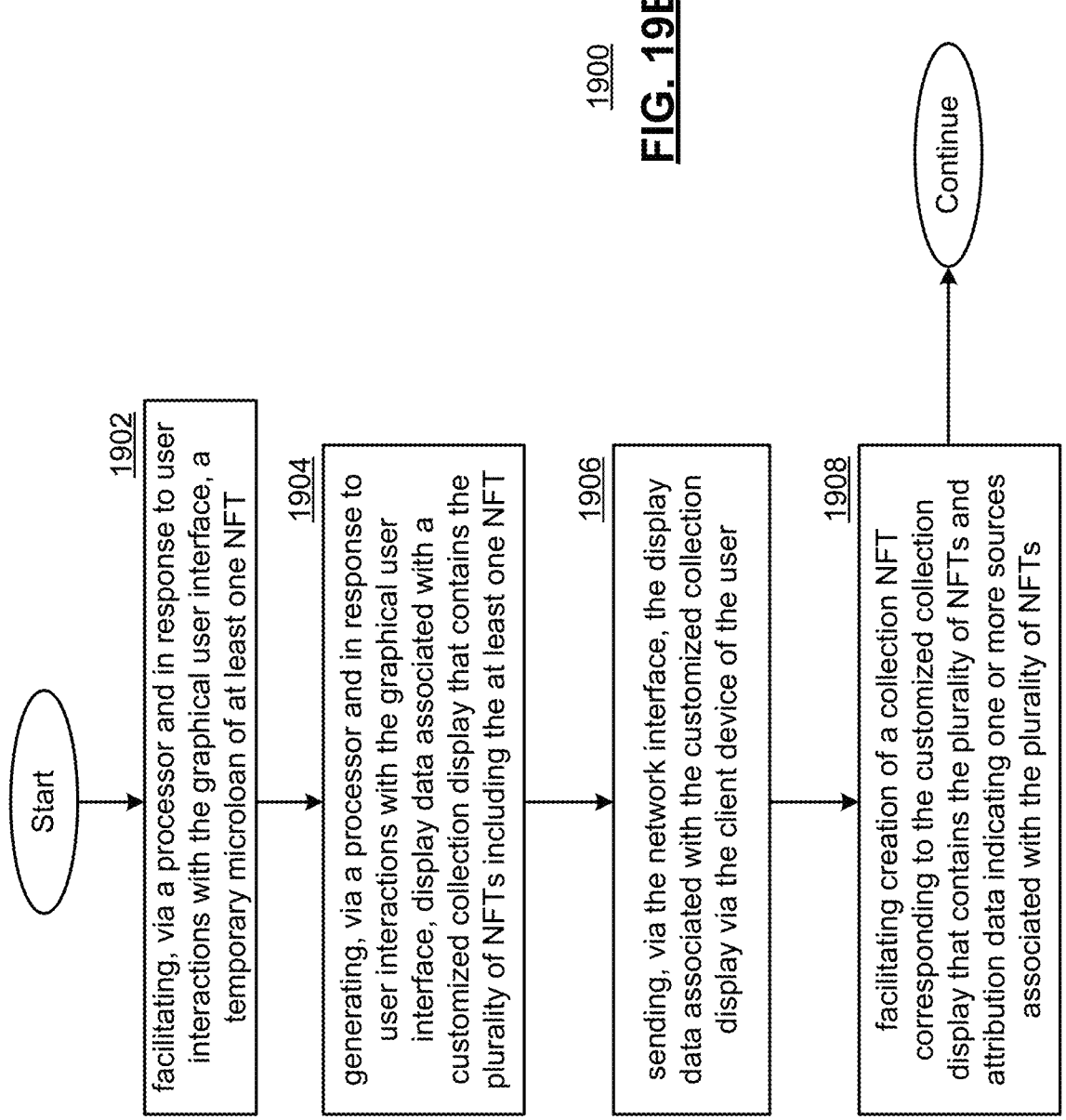

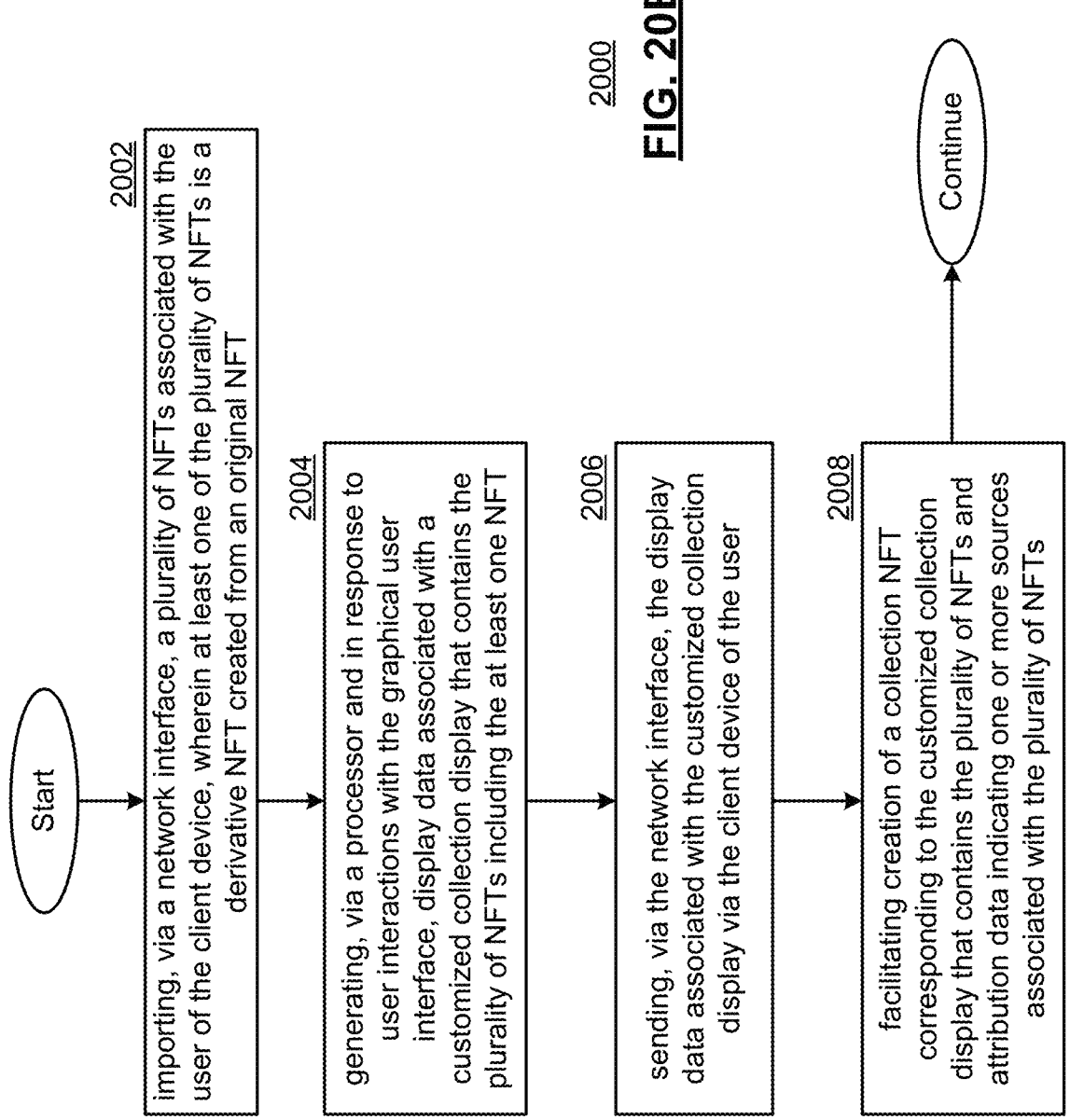

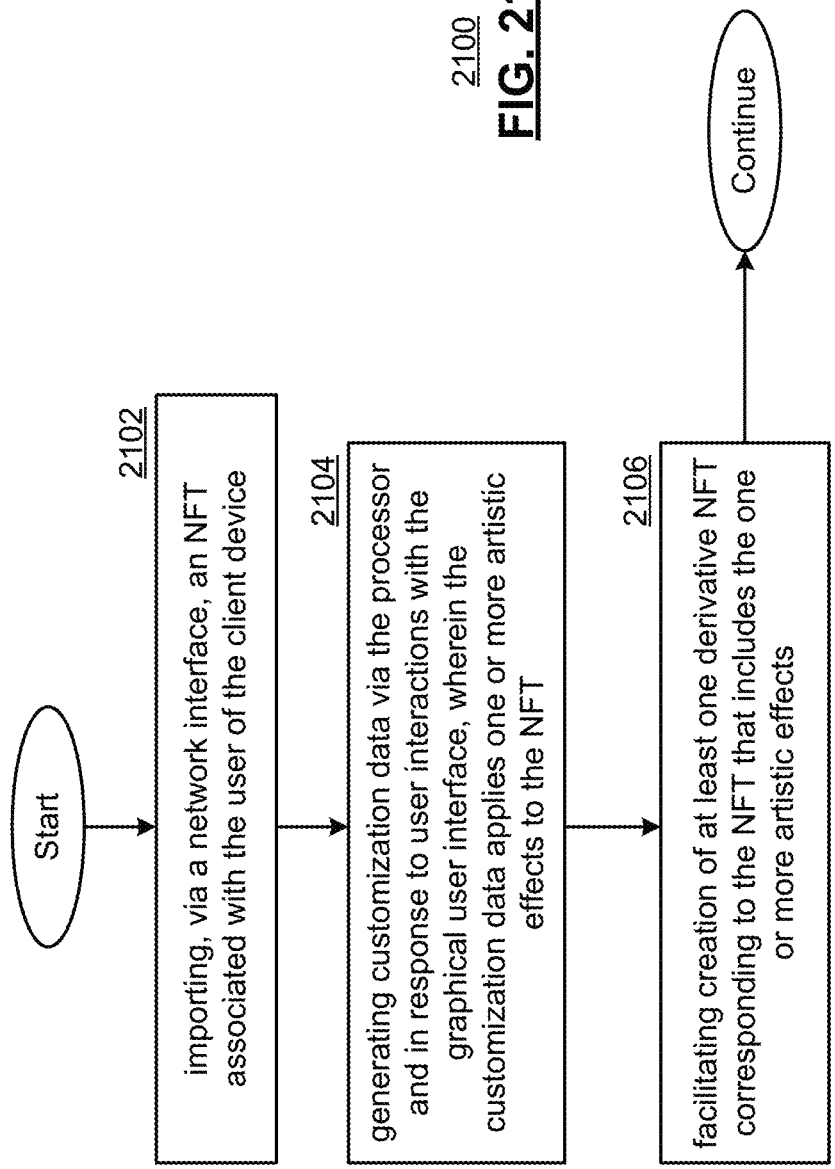

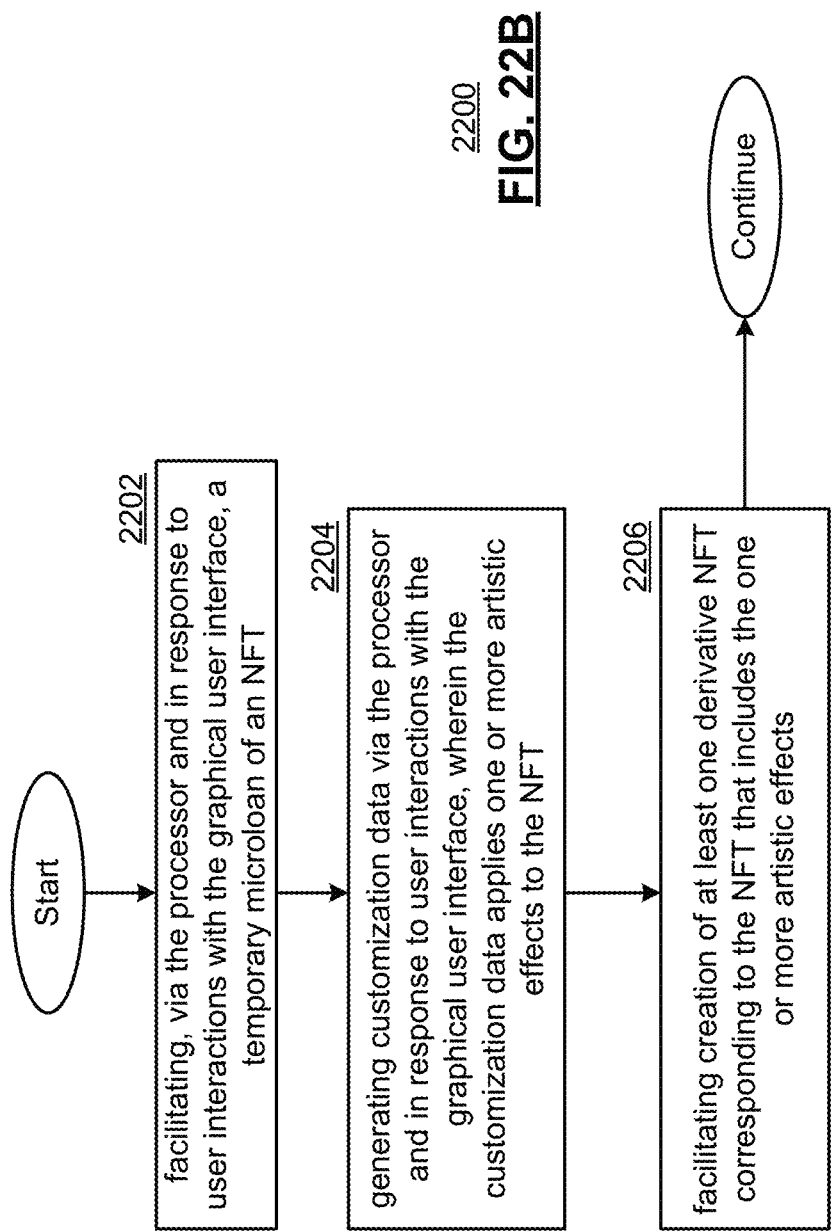

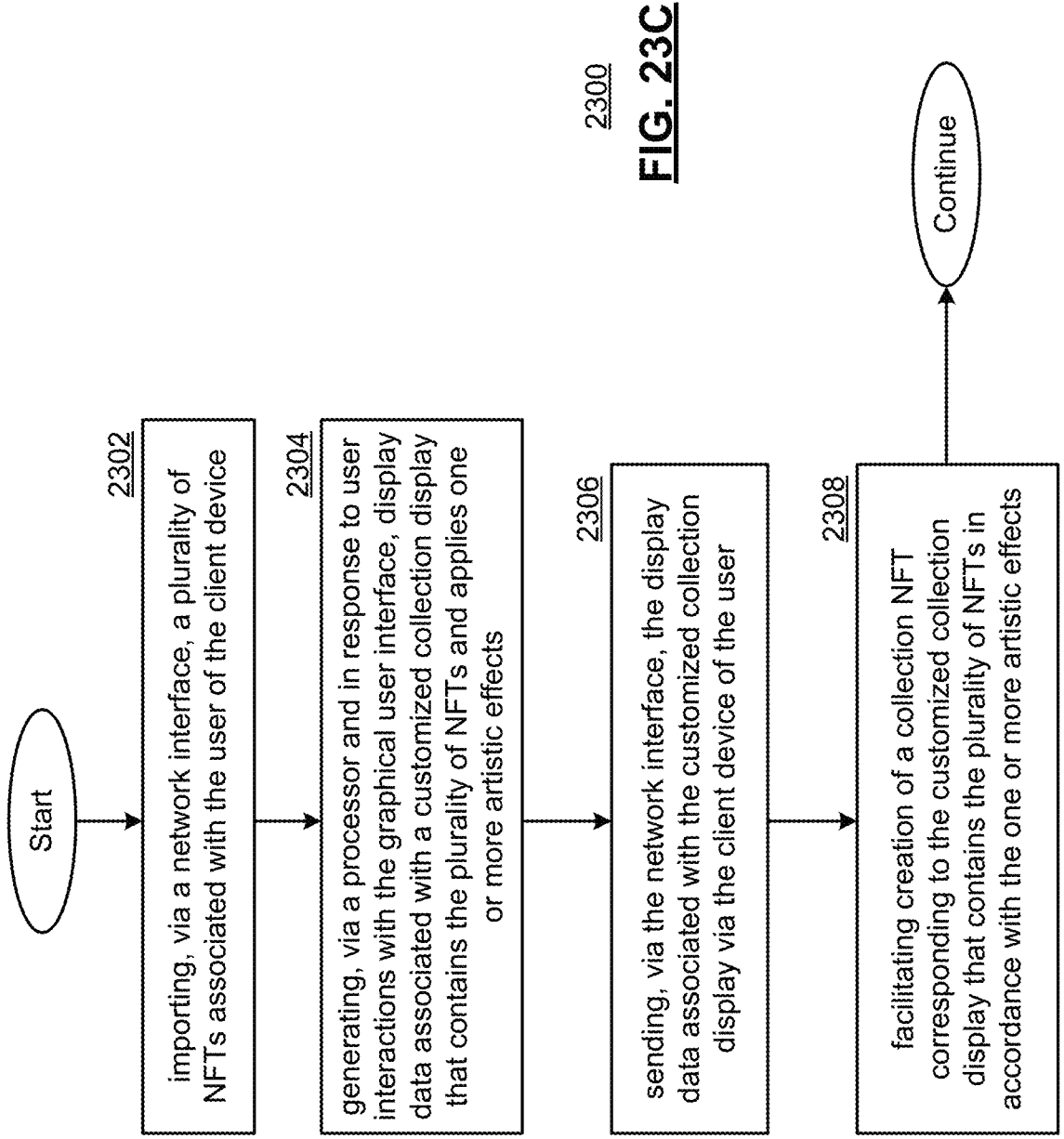

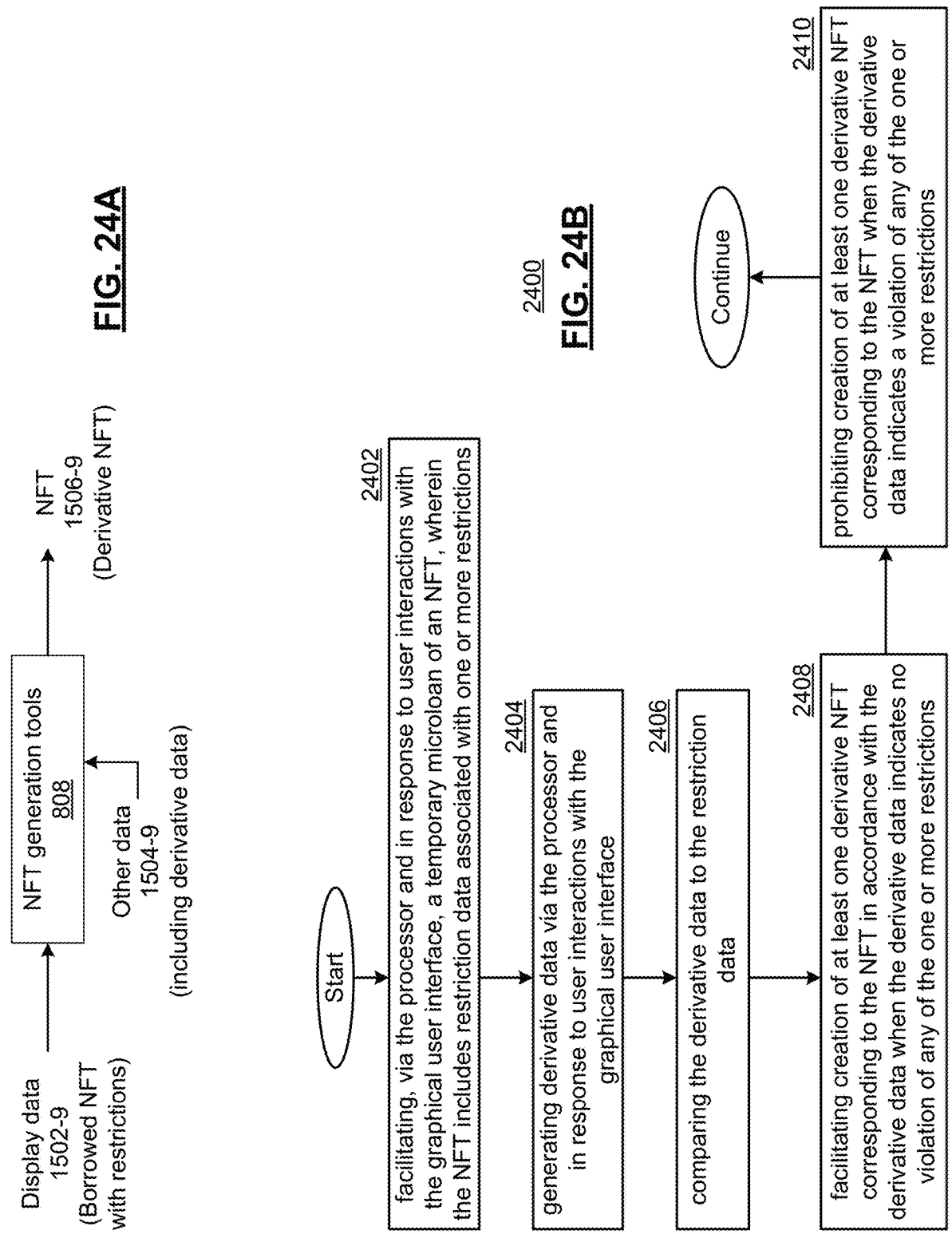

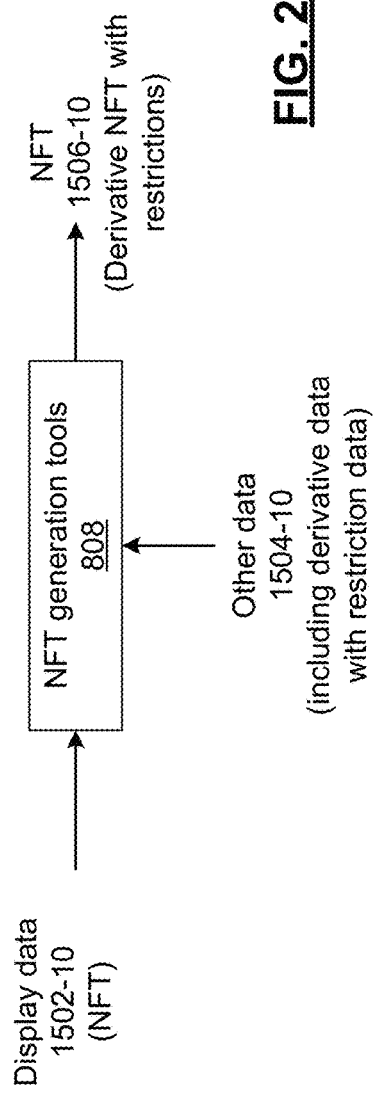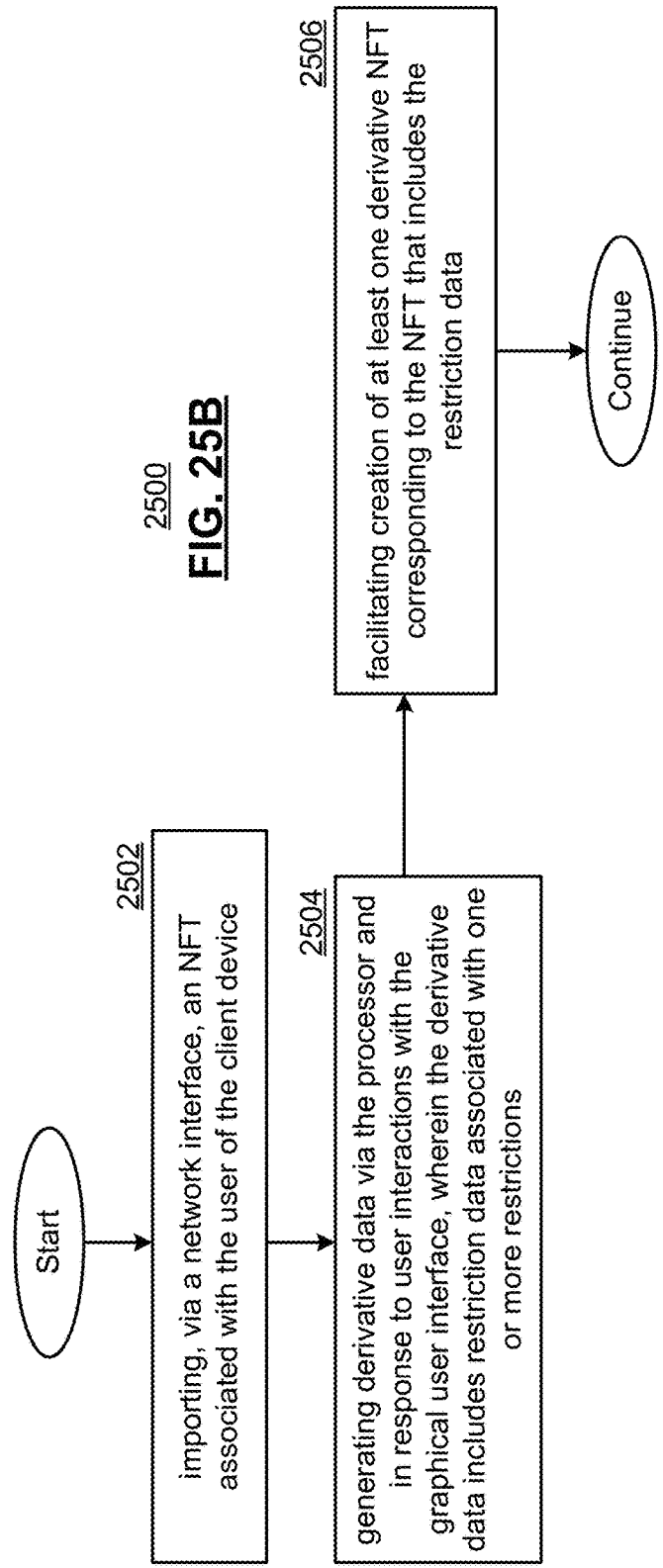

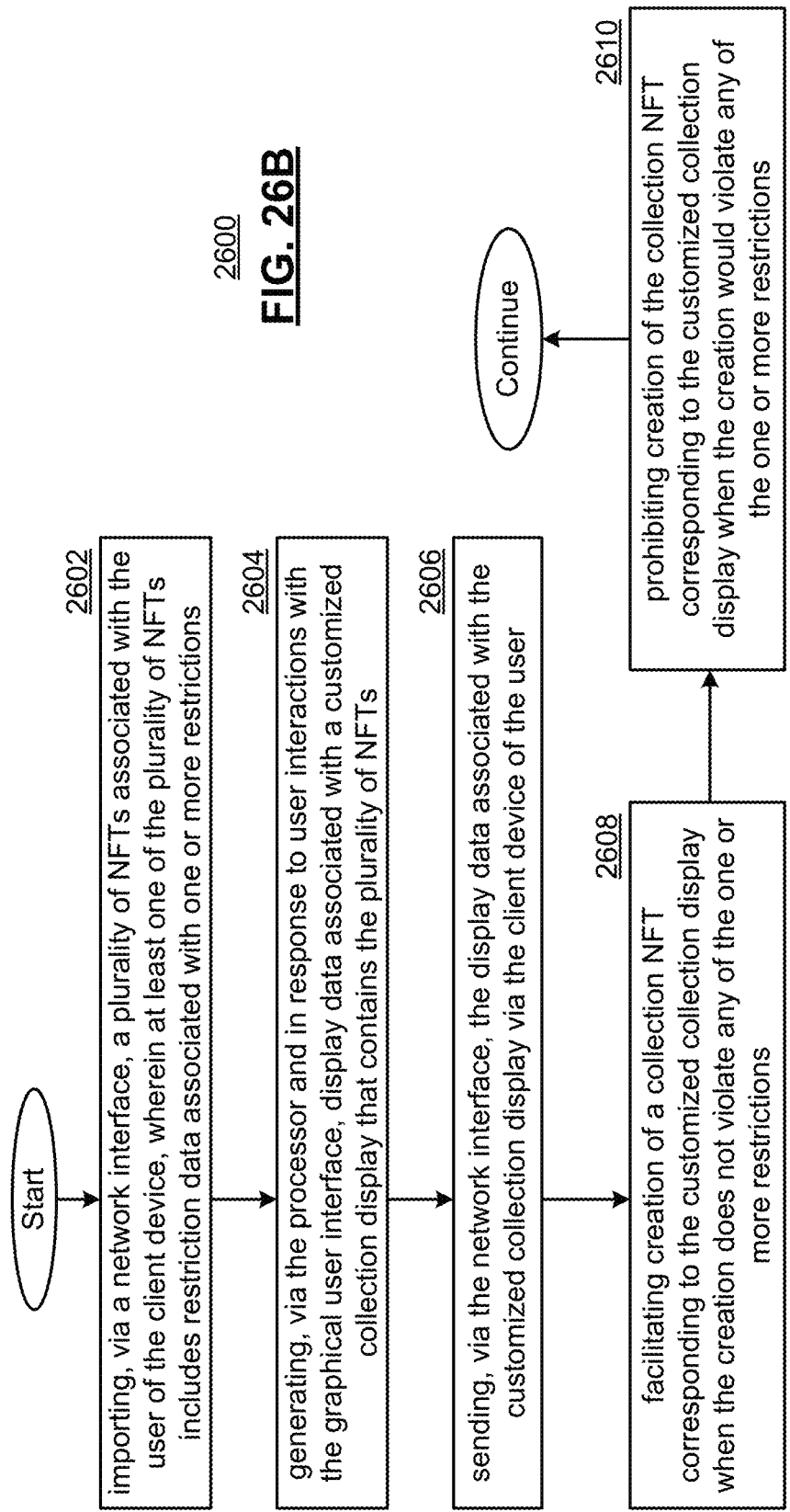

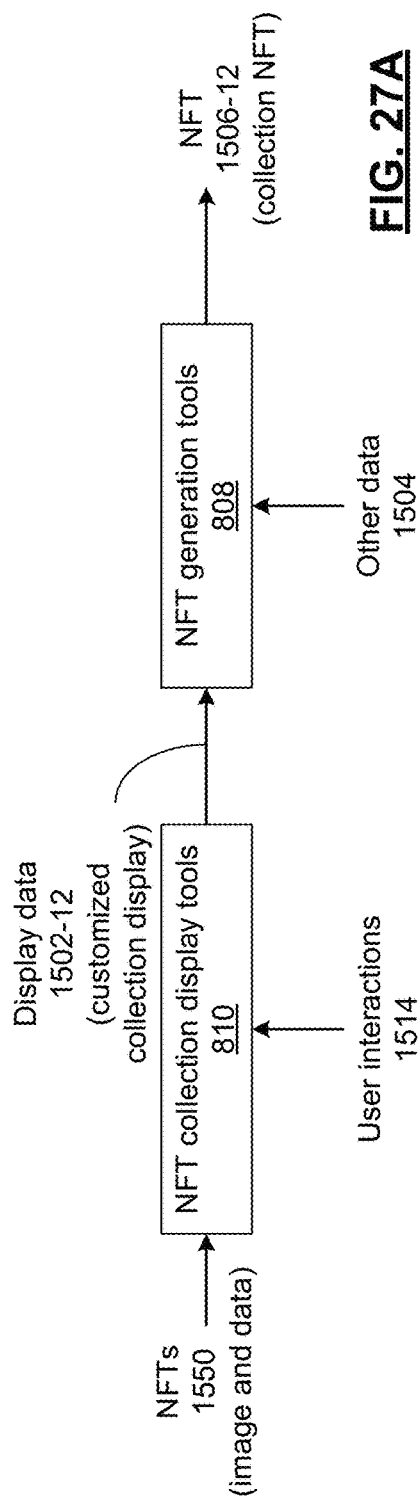
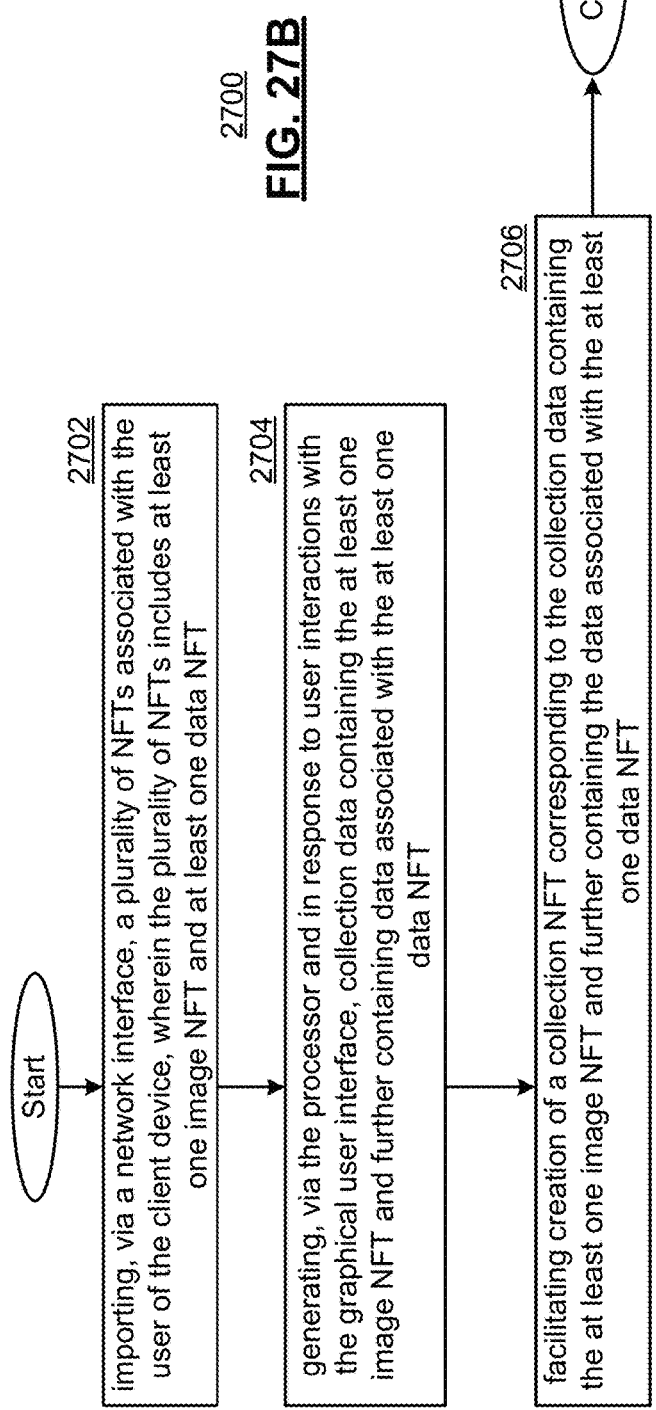

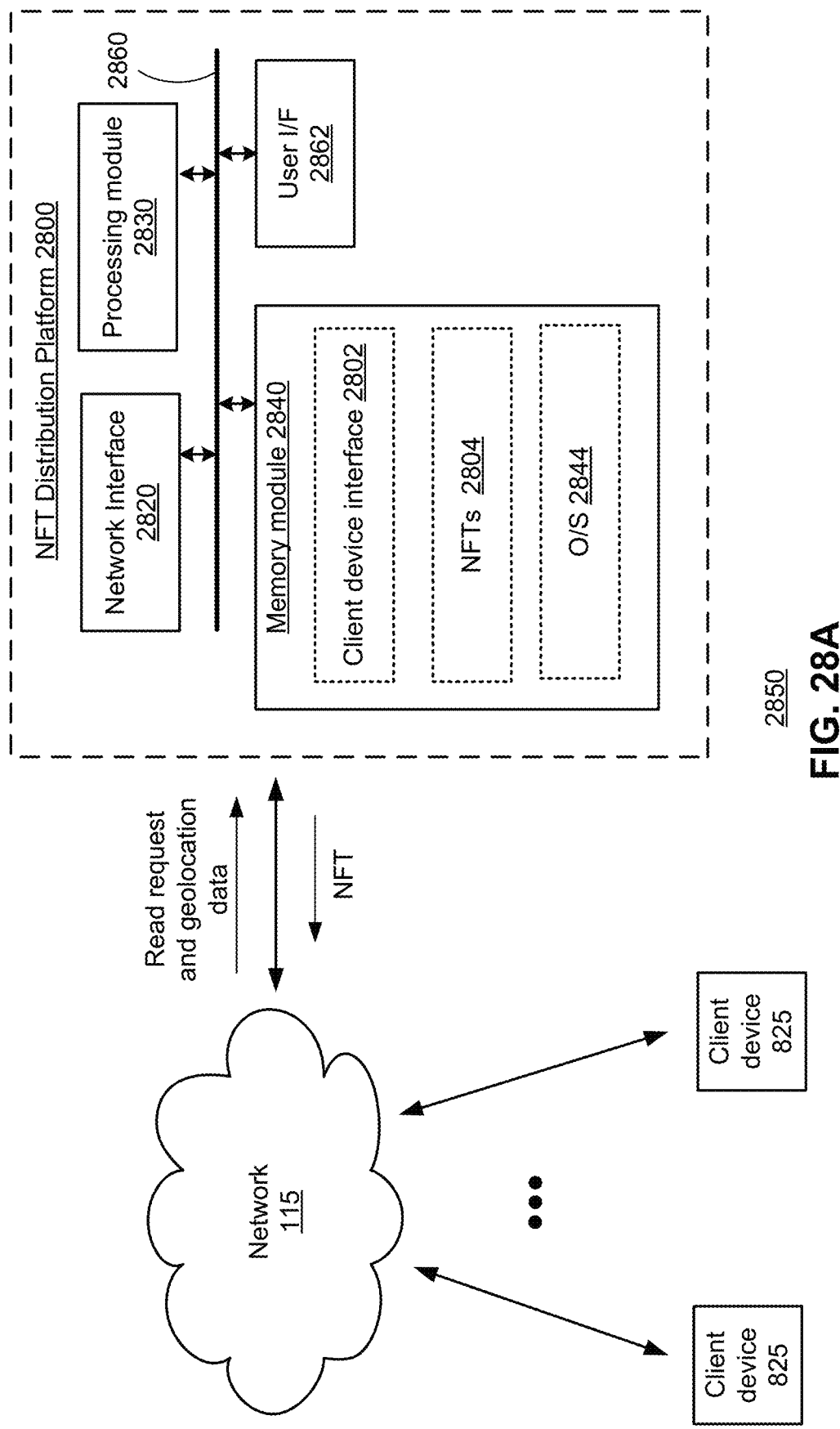

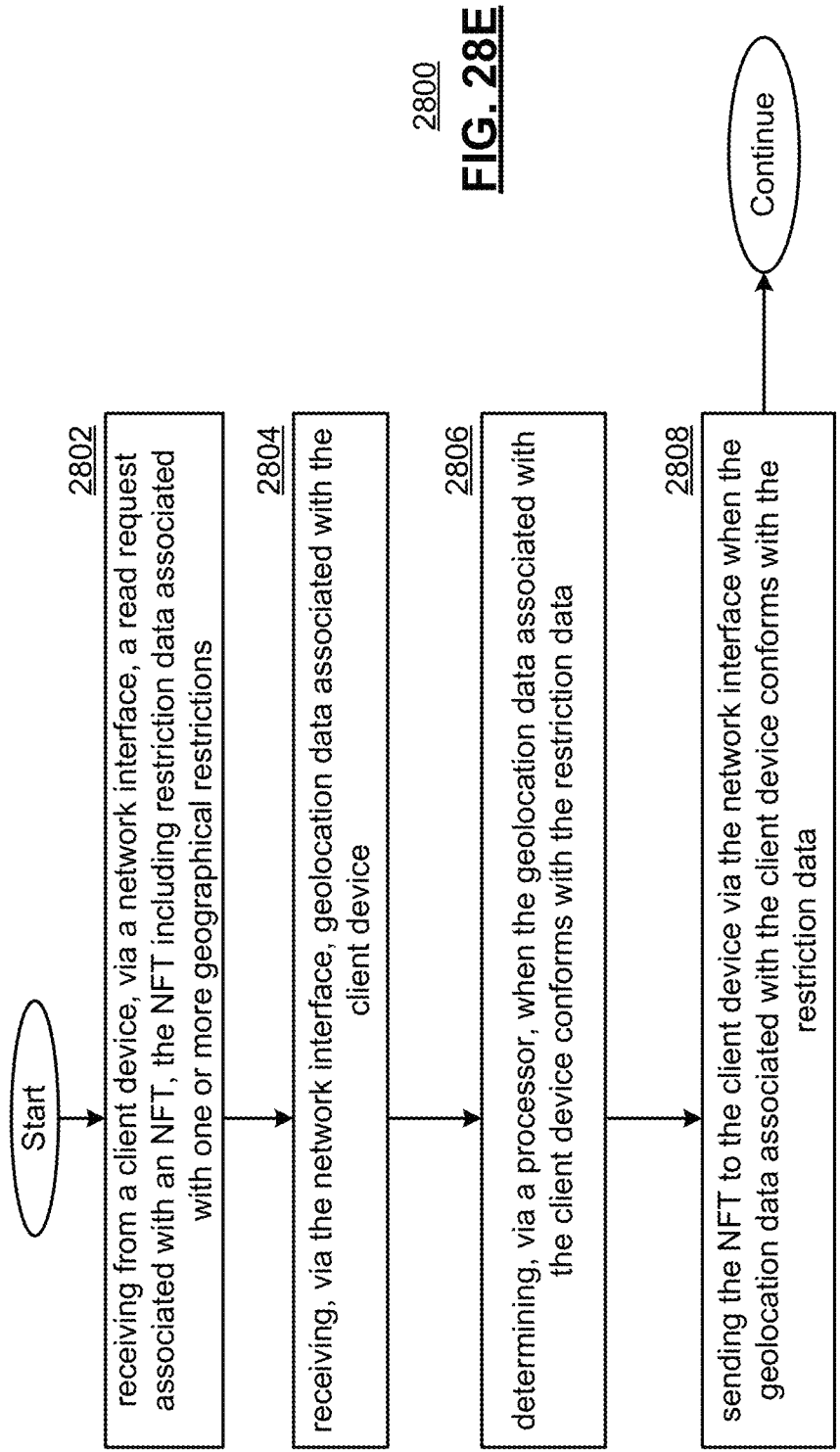

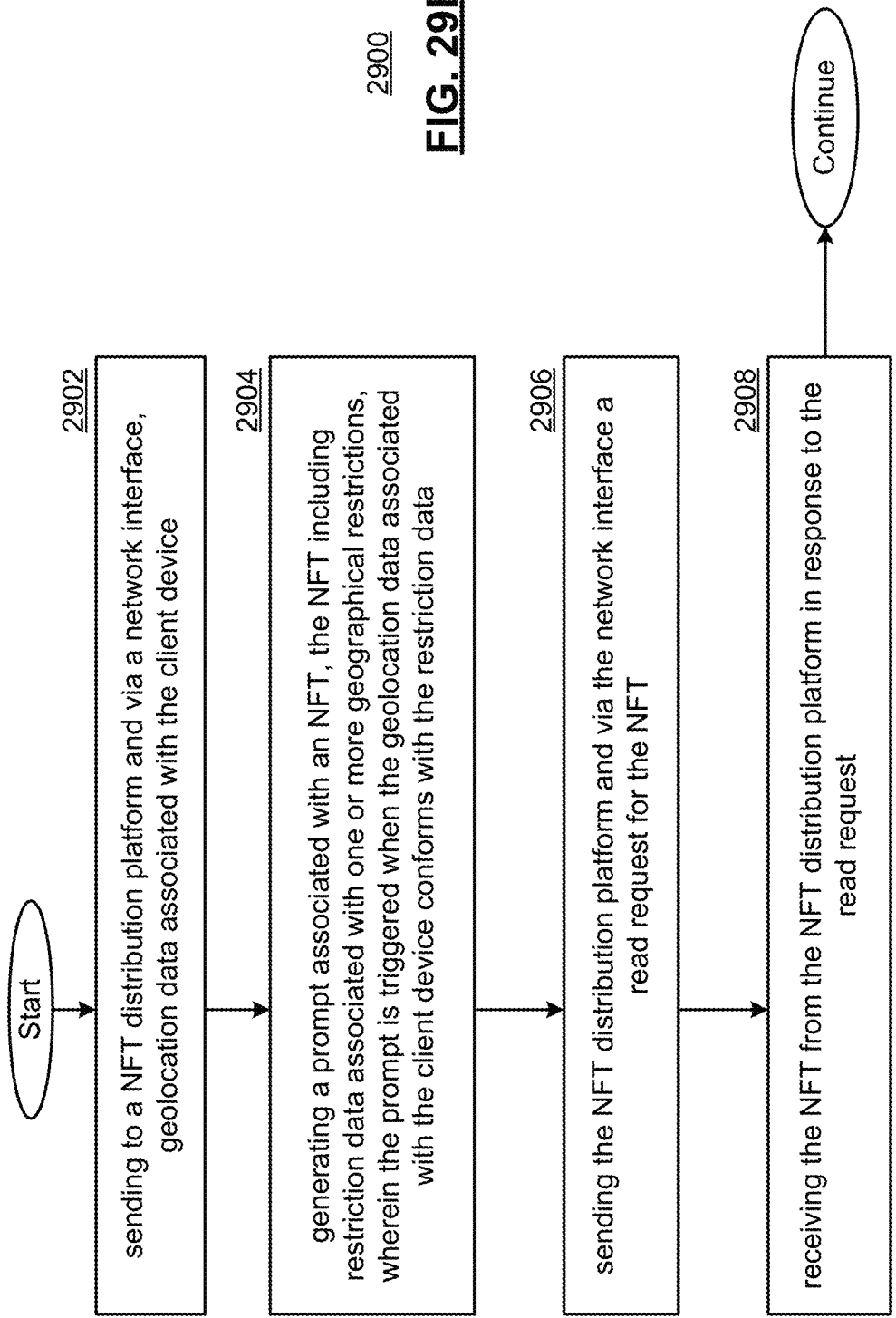

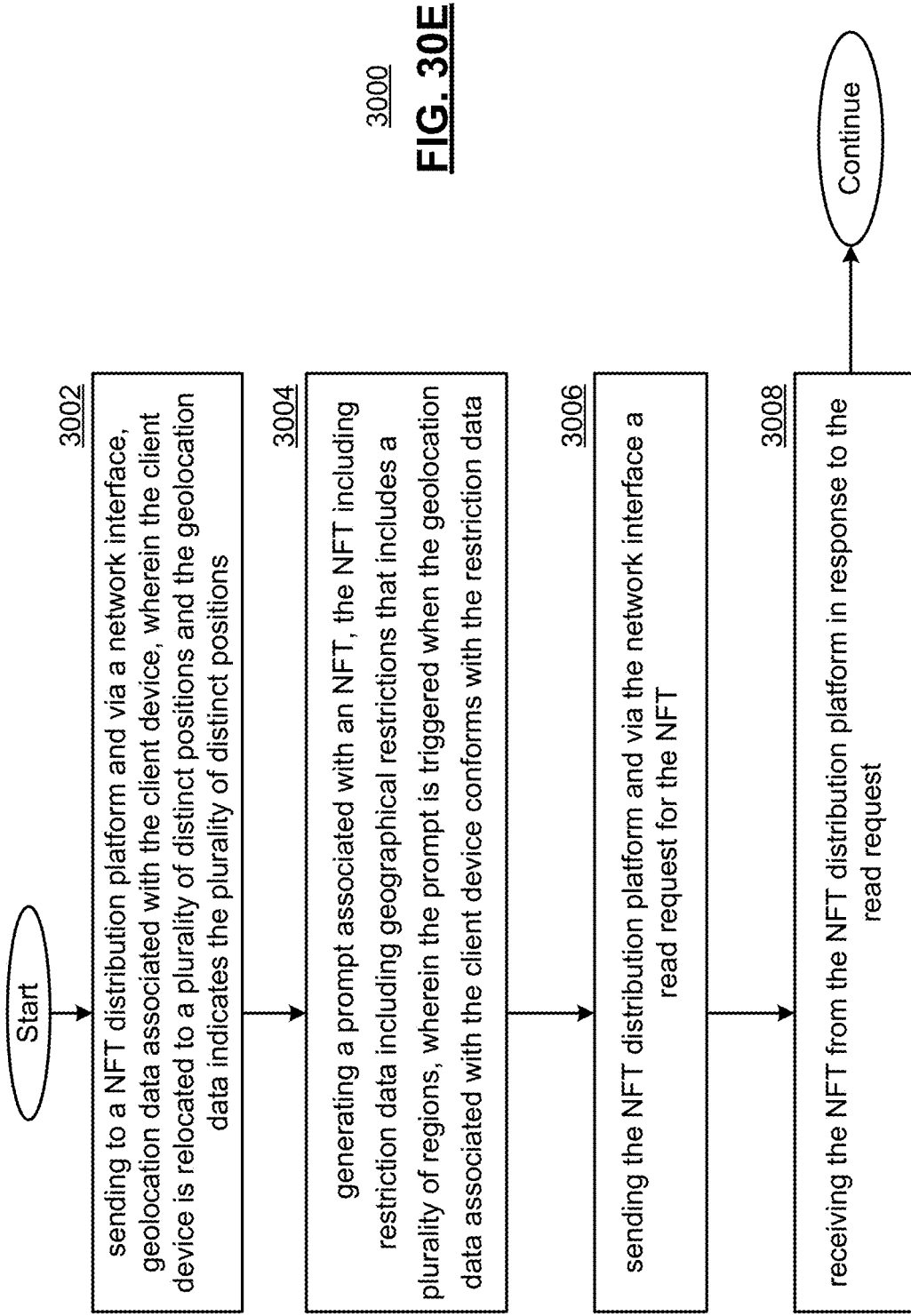

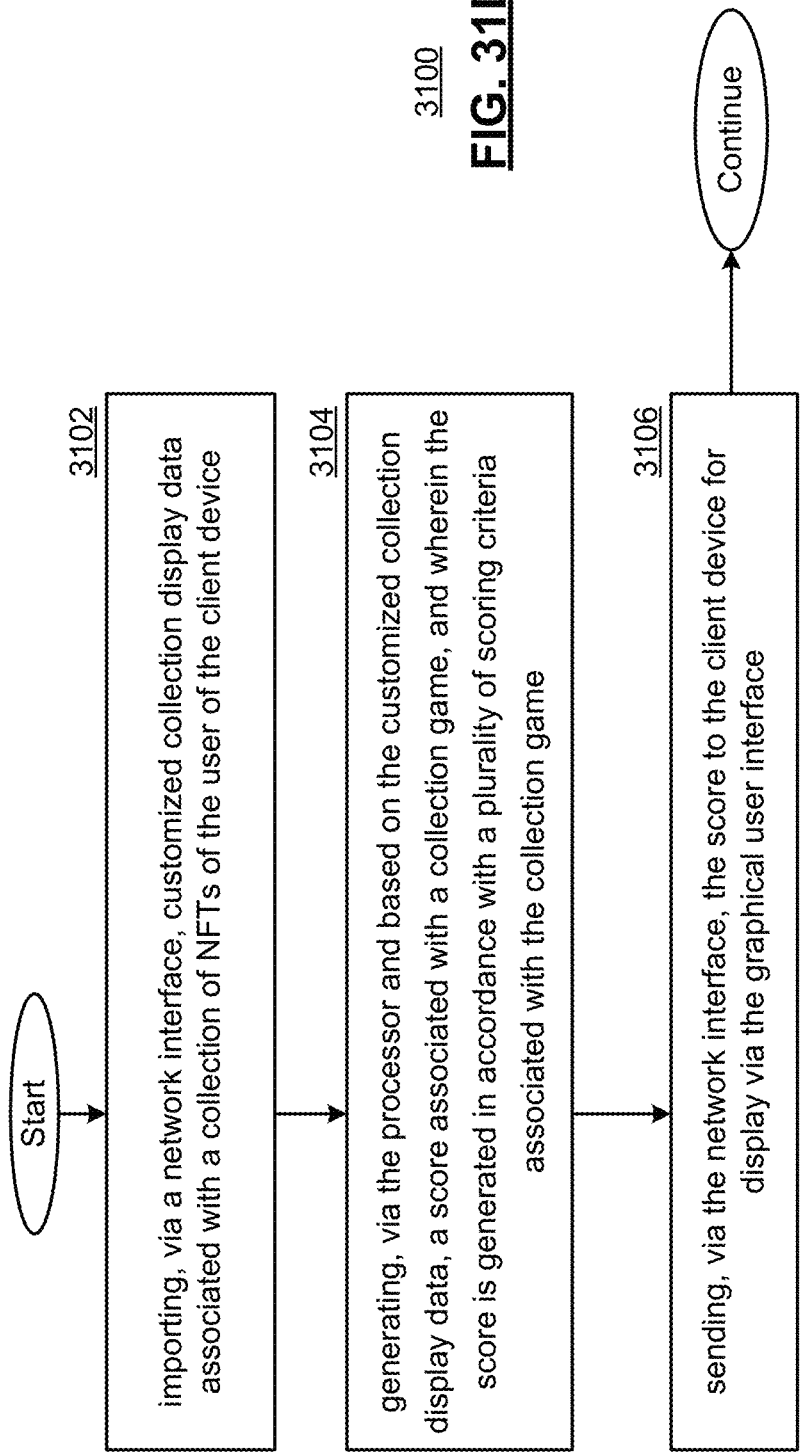

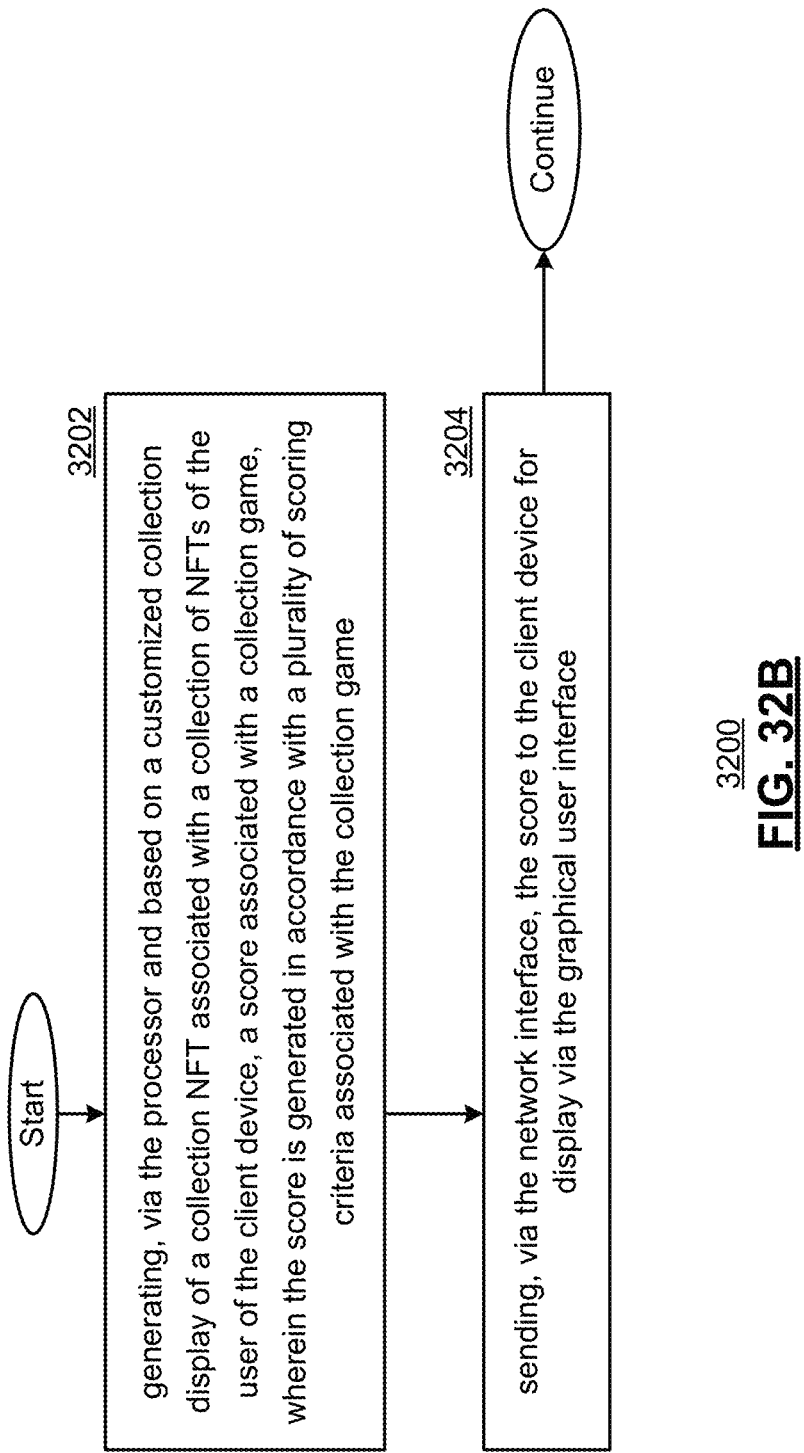

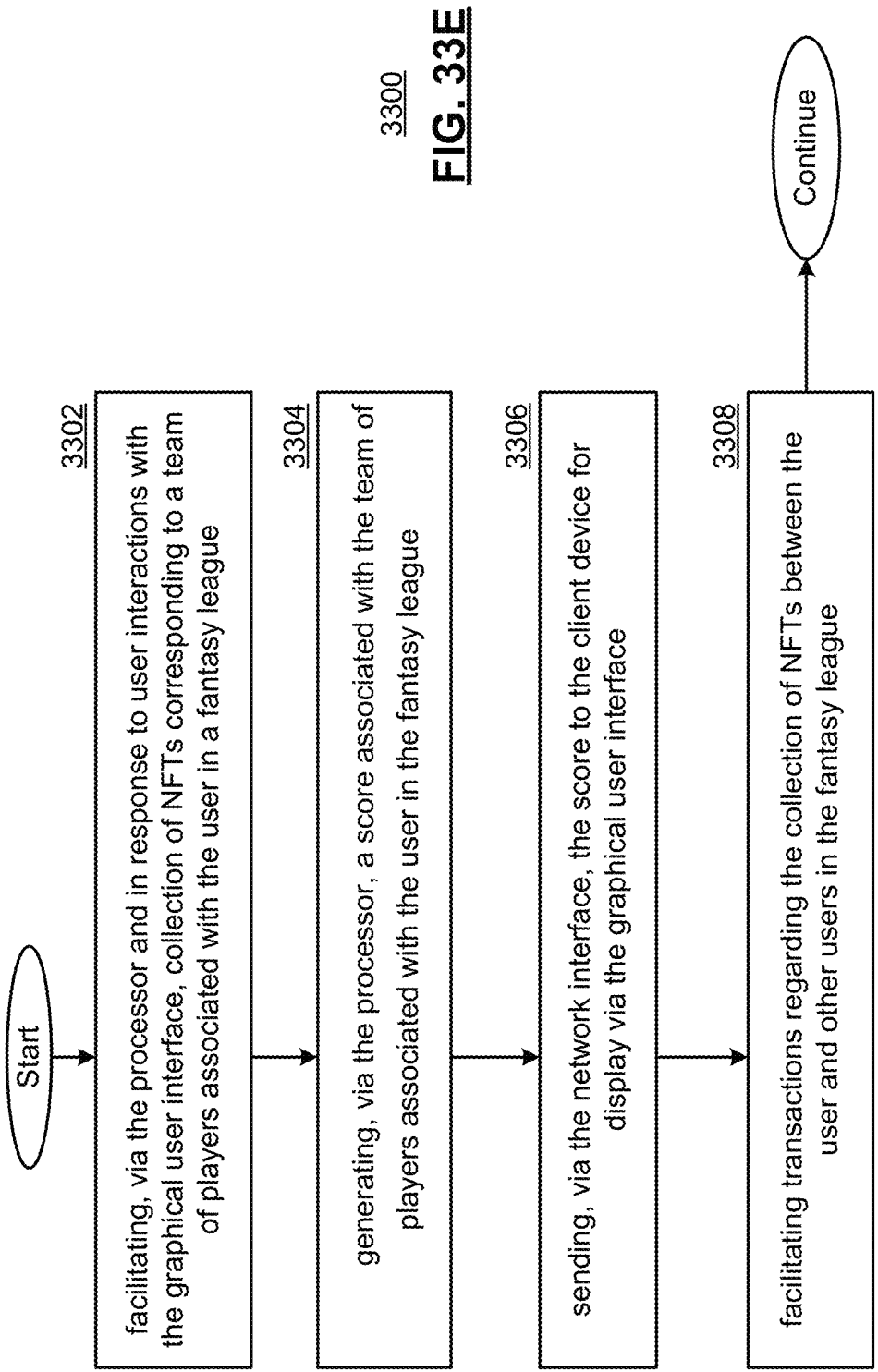

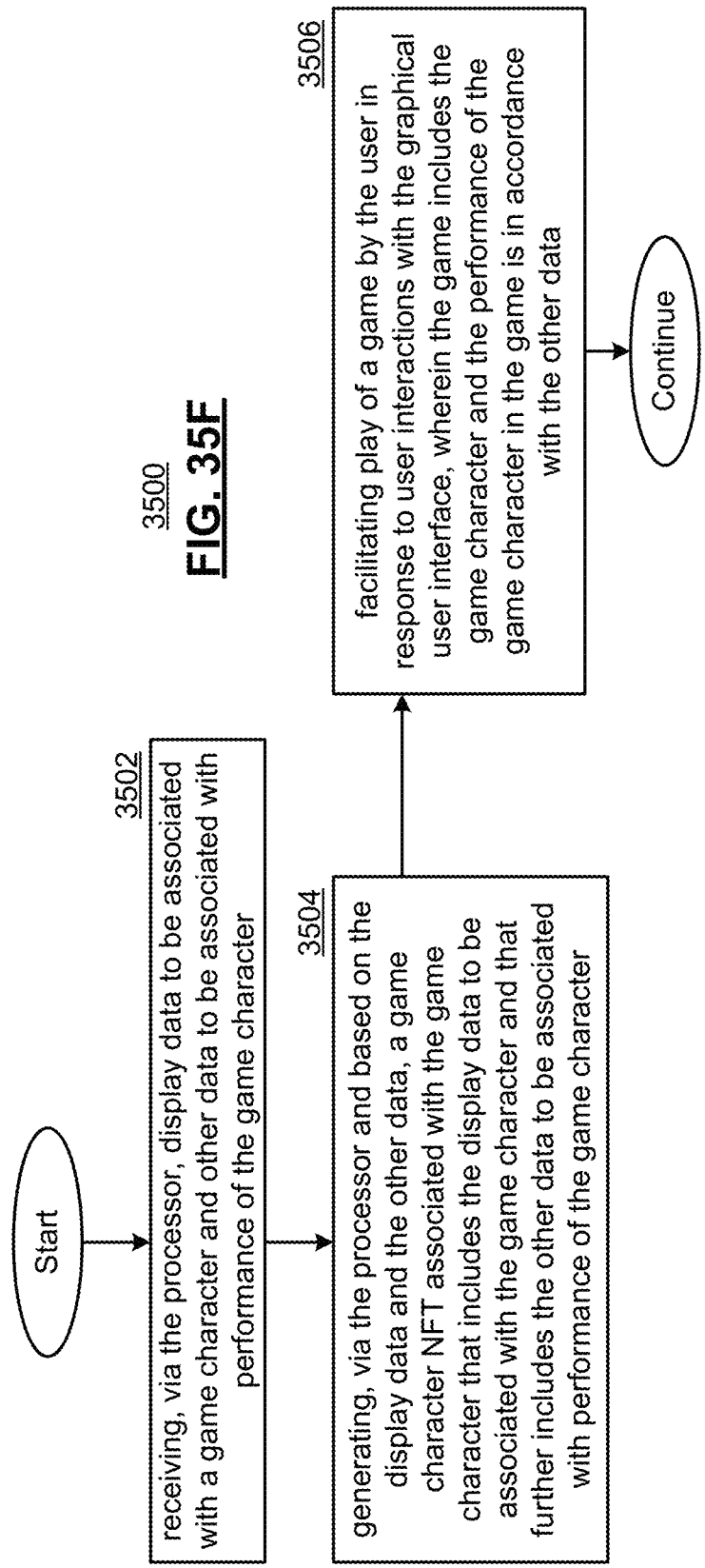

FIG. 36E
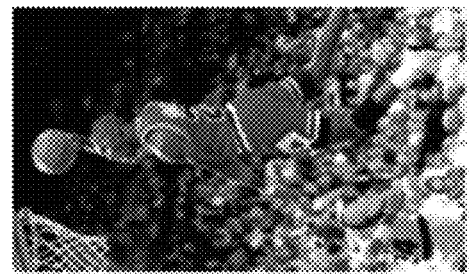
FIG. 36D
FIG. 36C
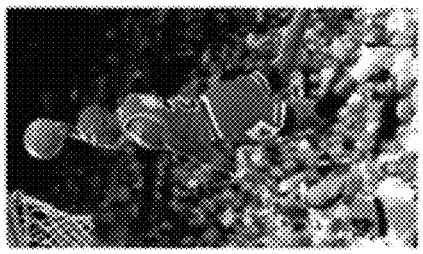
FIG. 36B
FIG. 36A

3800

Display data associated with a game character 1570-1 → NFT generation tools 808 → Game character NFT 1572-1

Other data including customization data with artistic effects 1596

Display data associated with a game character 1570-1

Game character NFT 1572-1

Image NFT 4020

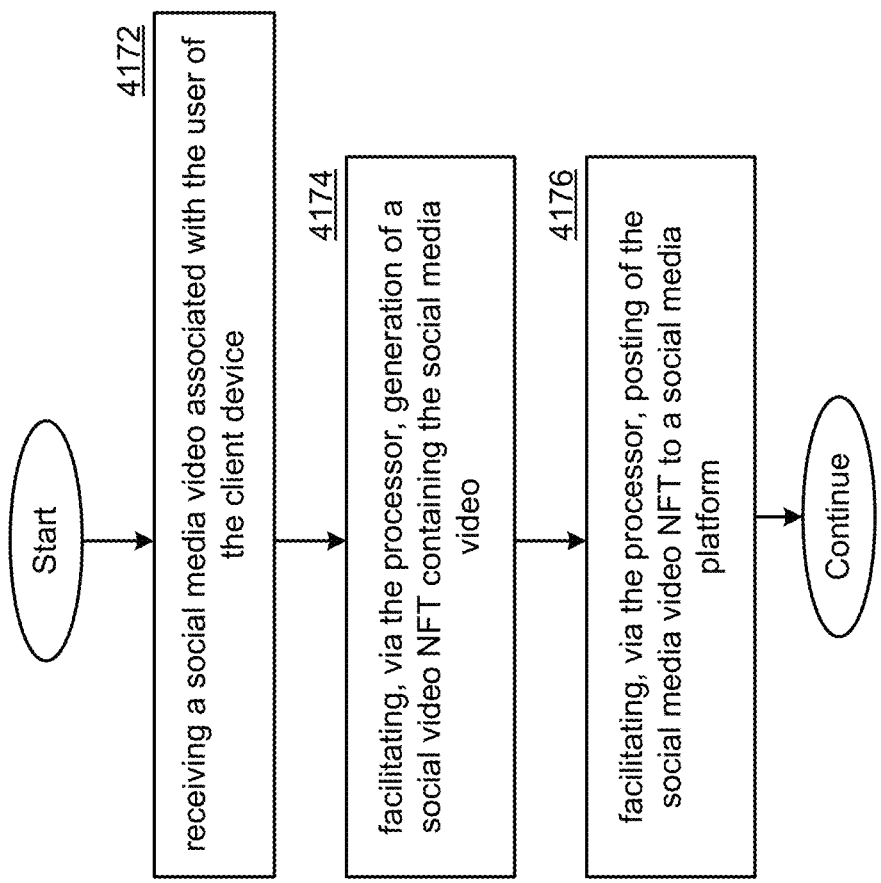

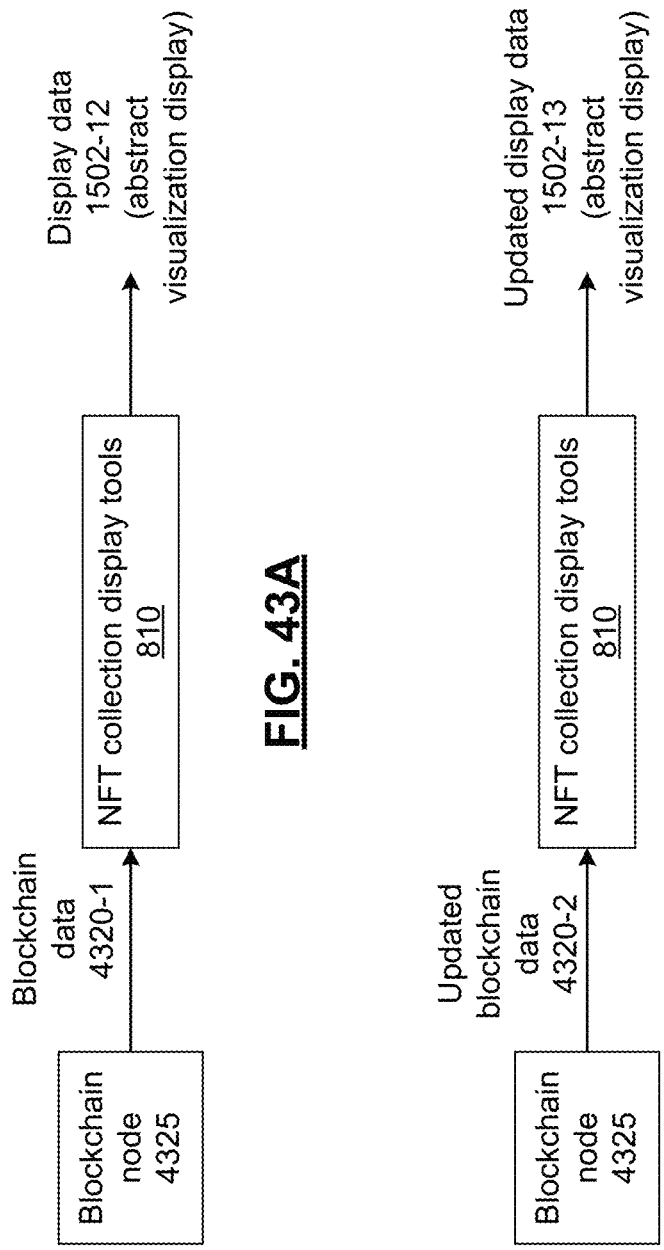

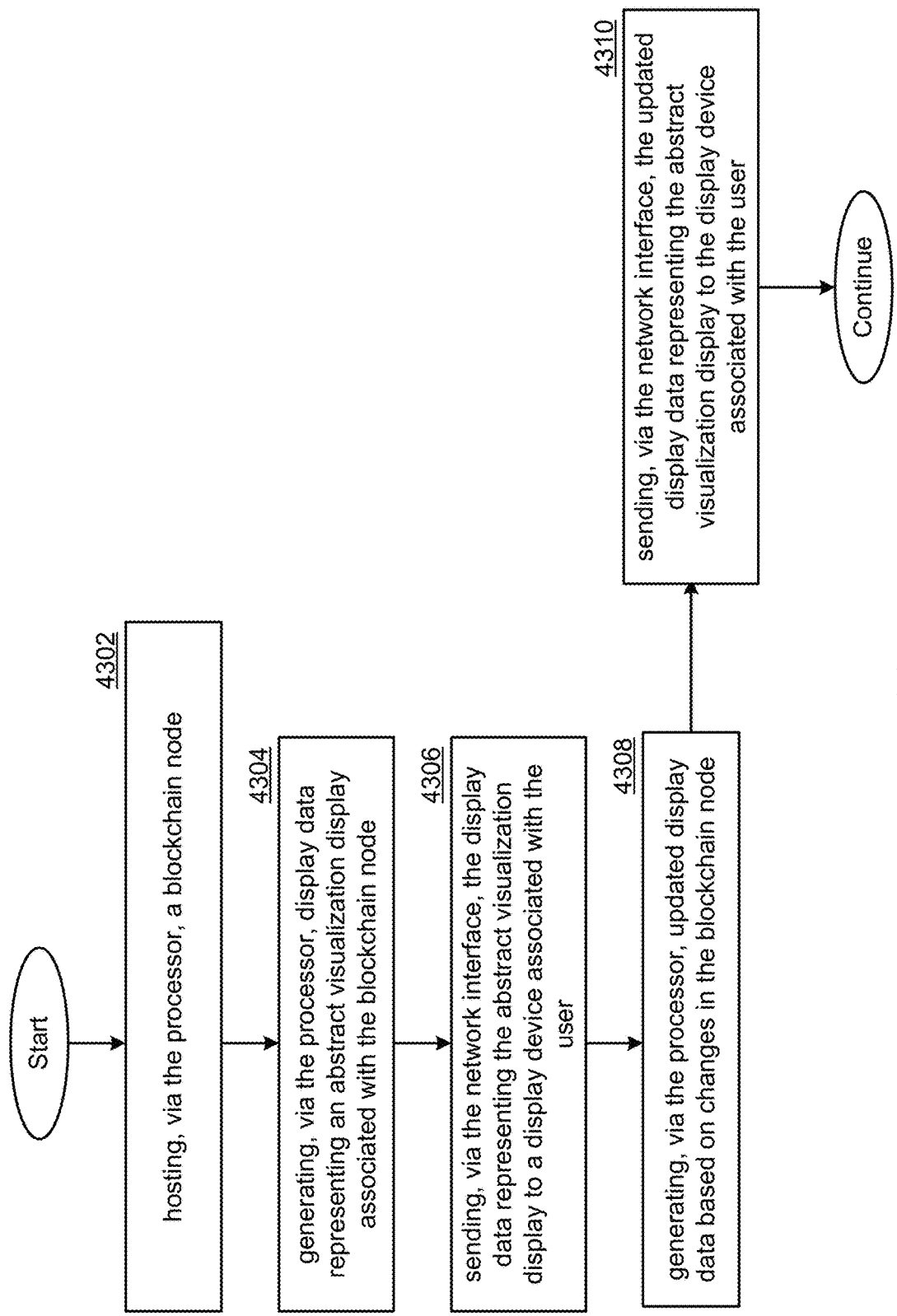

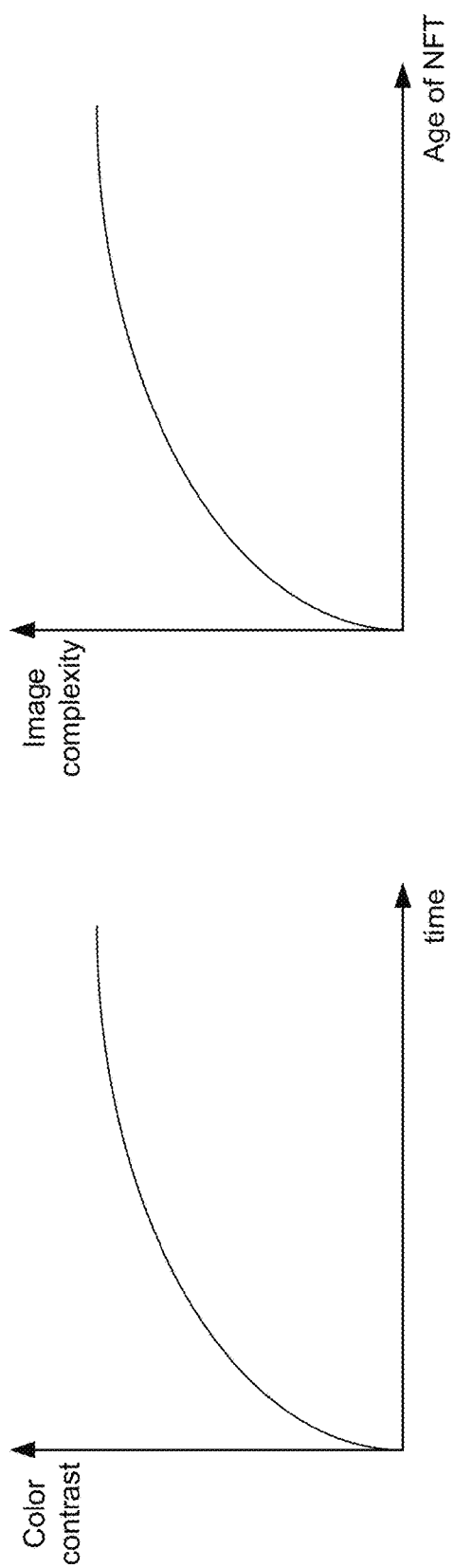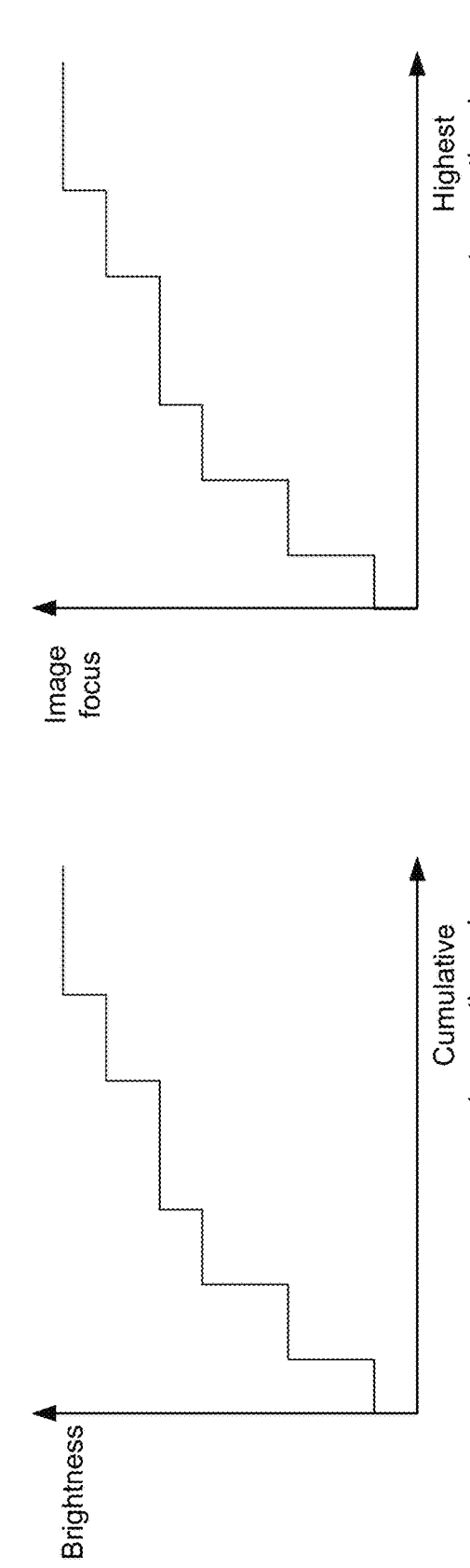

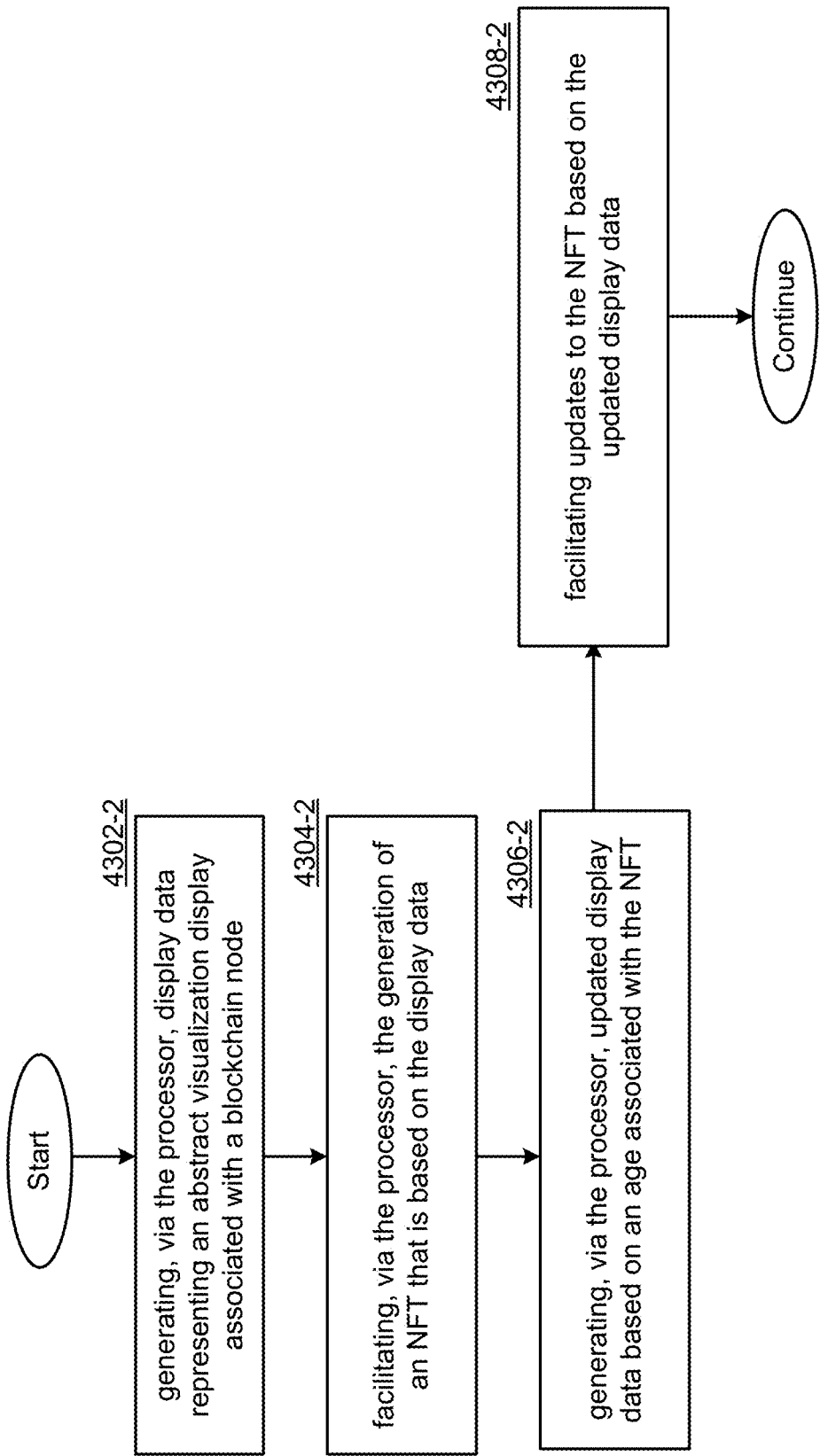

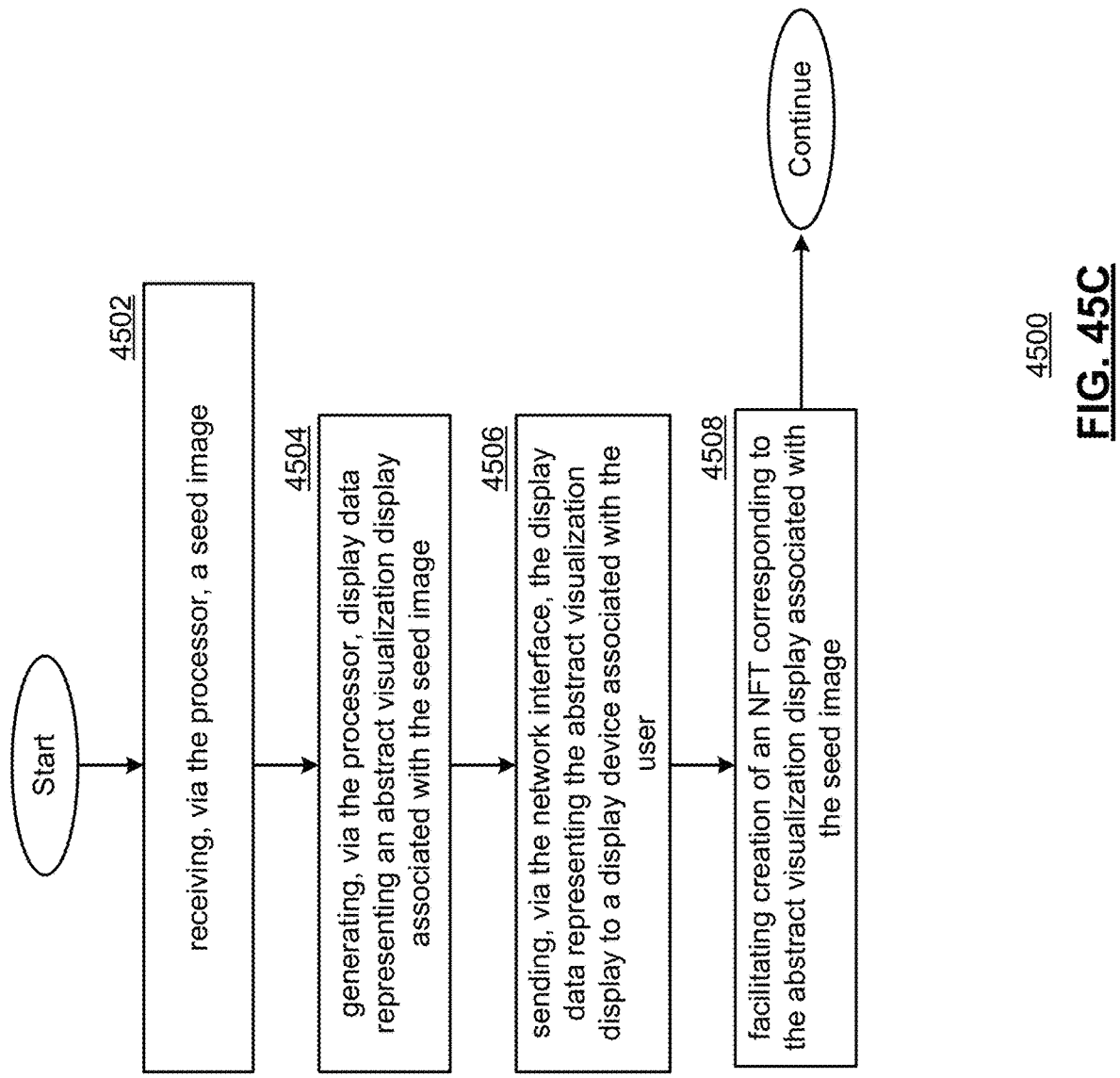

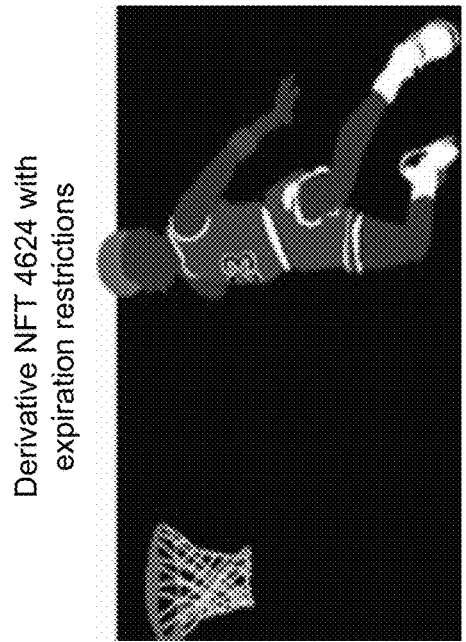
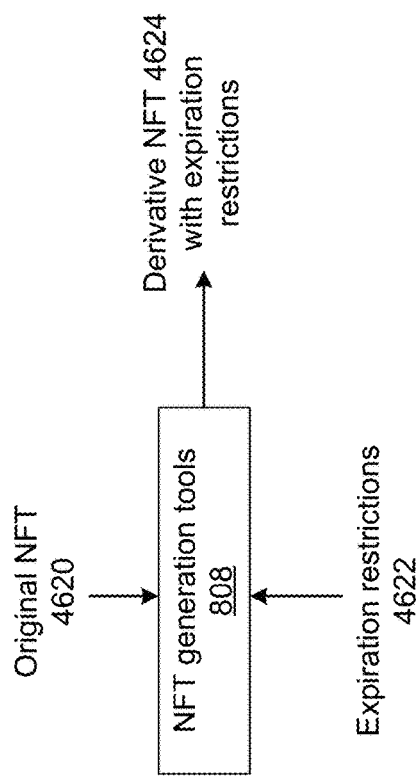
FIG. 46A
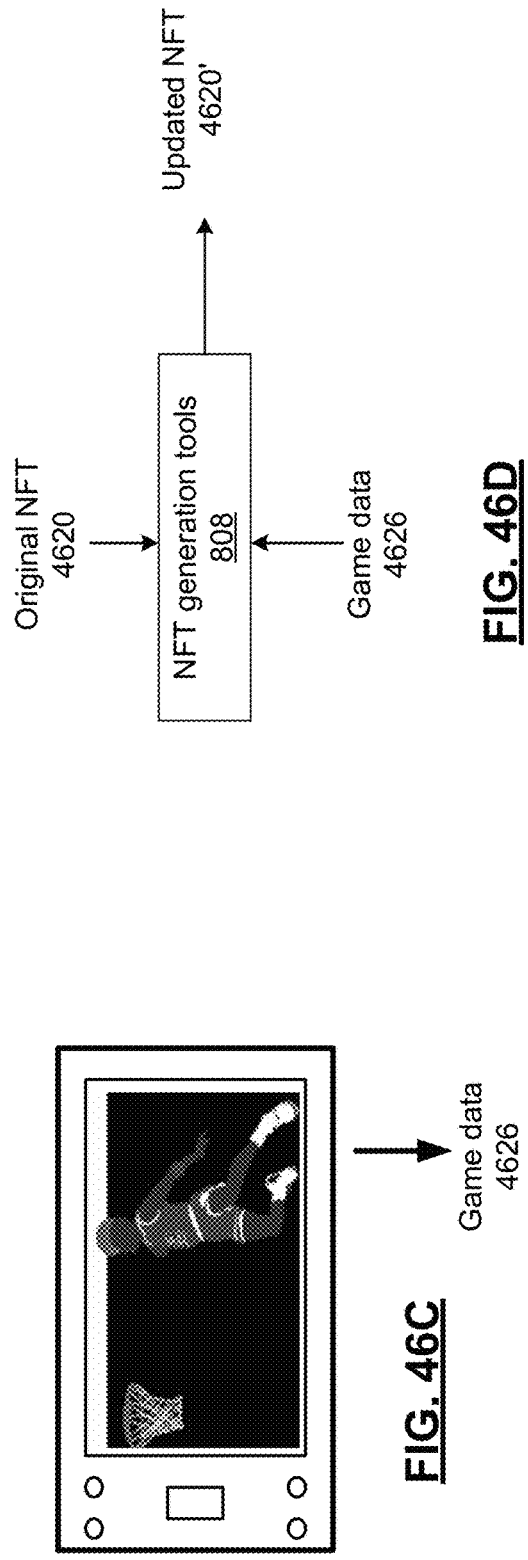
FIG. 46B
FIG. 46C
FIG. 46D

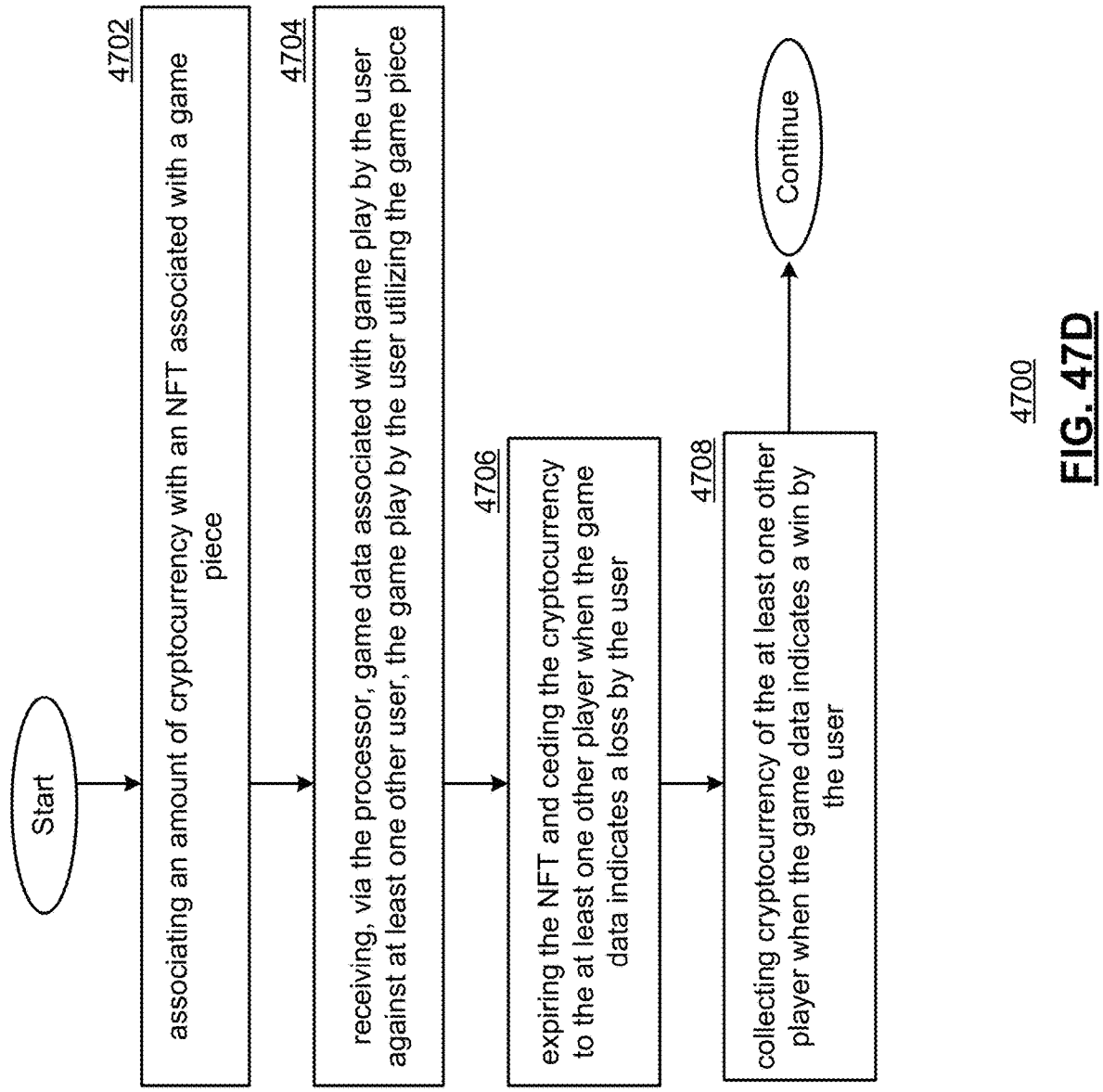

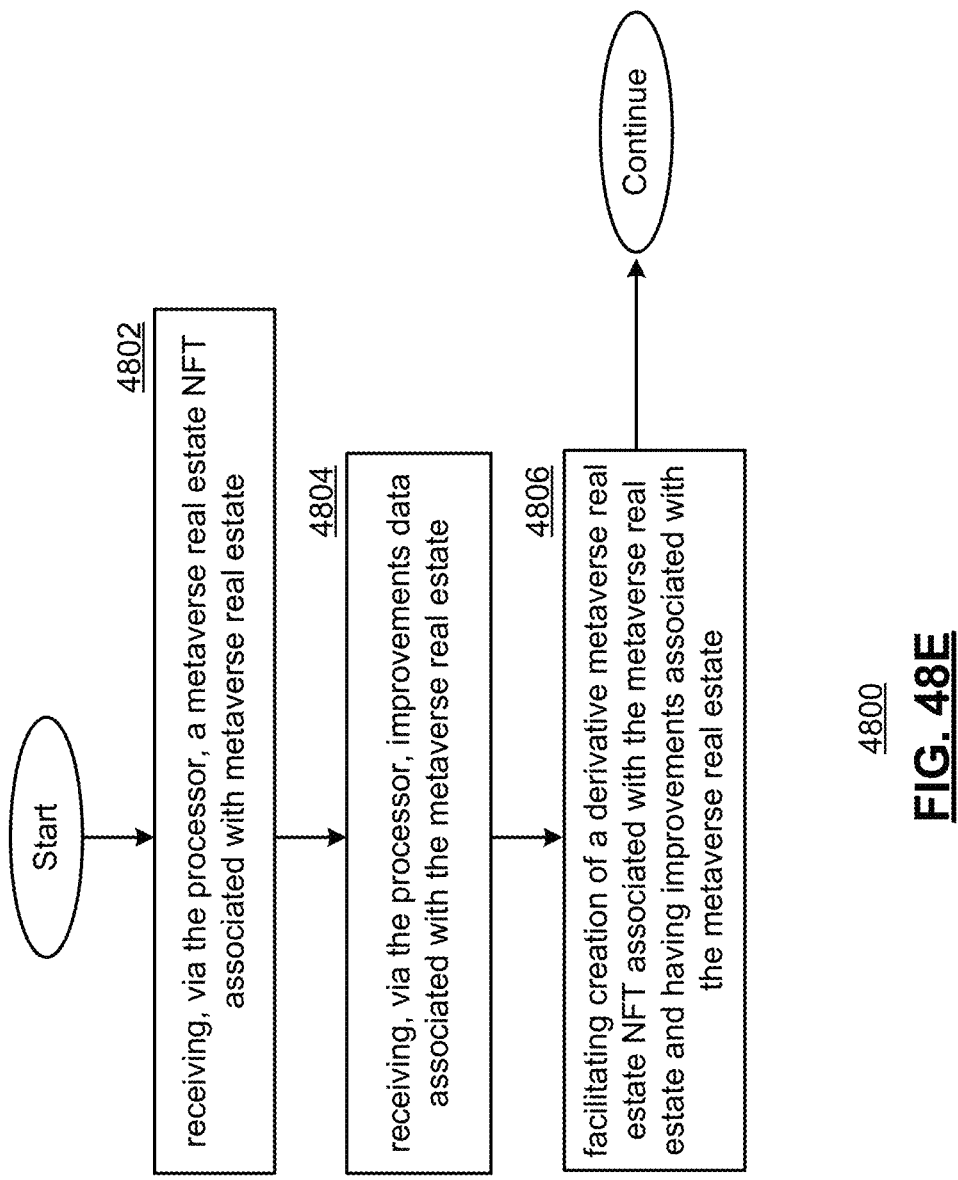

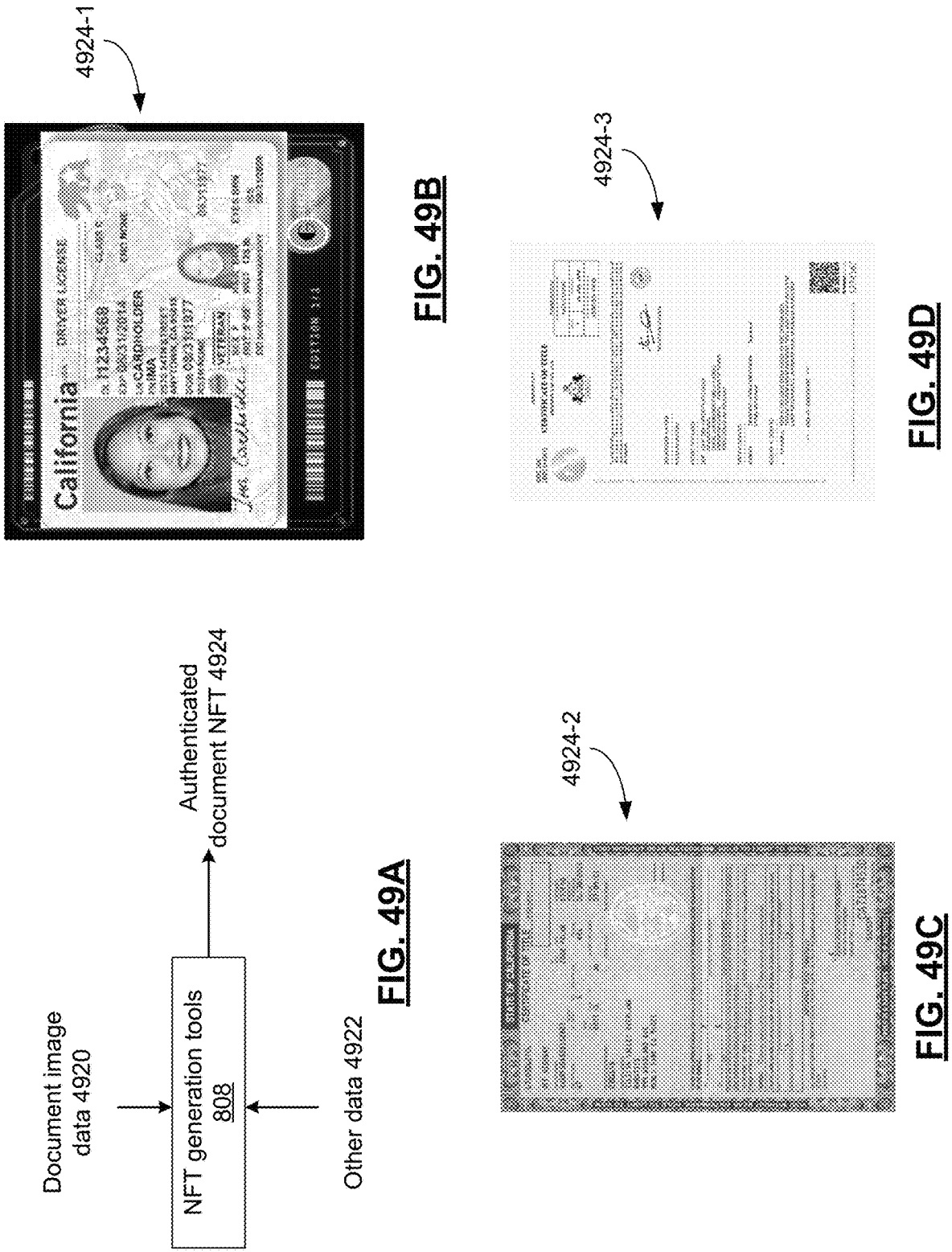

4924-8

4924-9

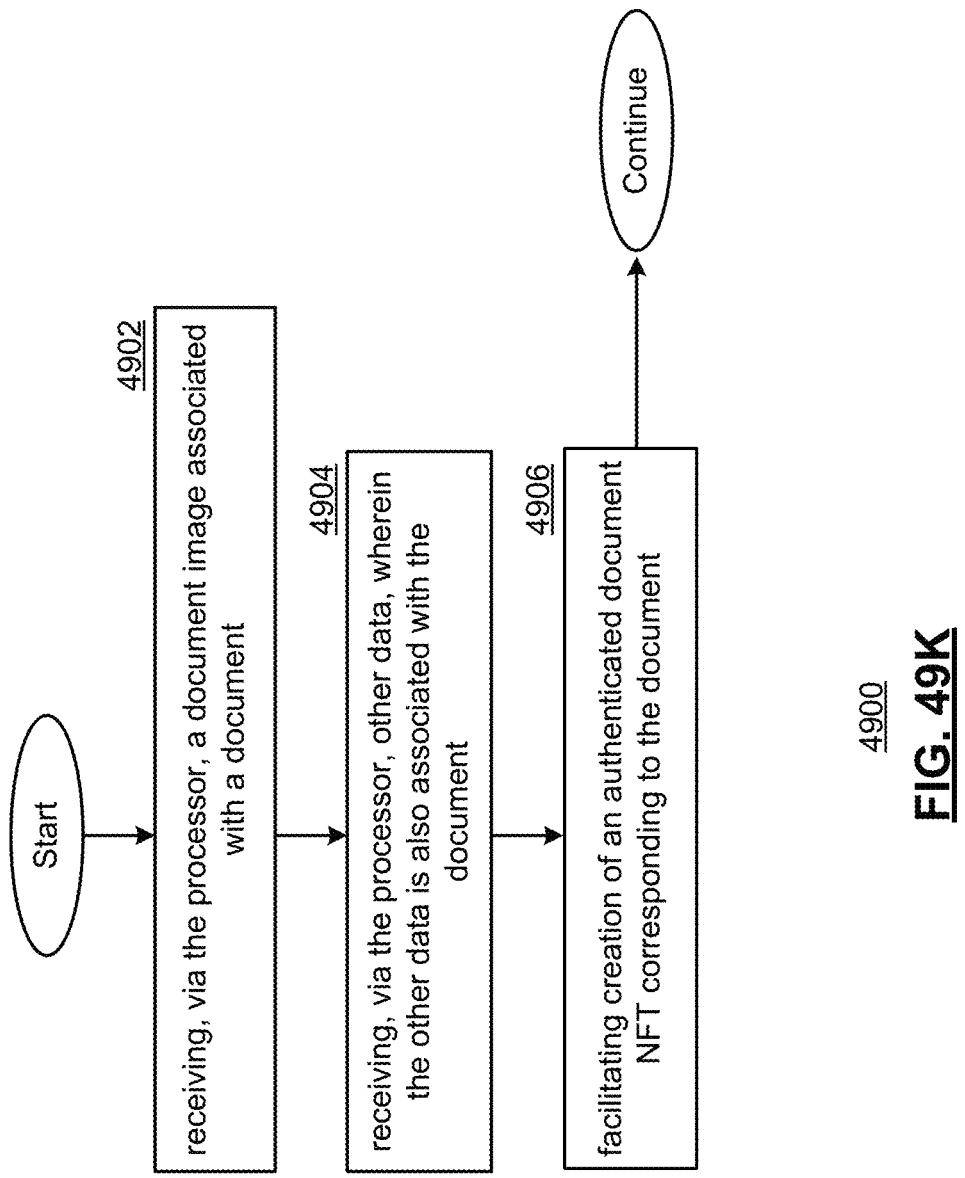

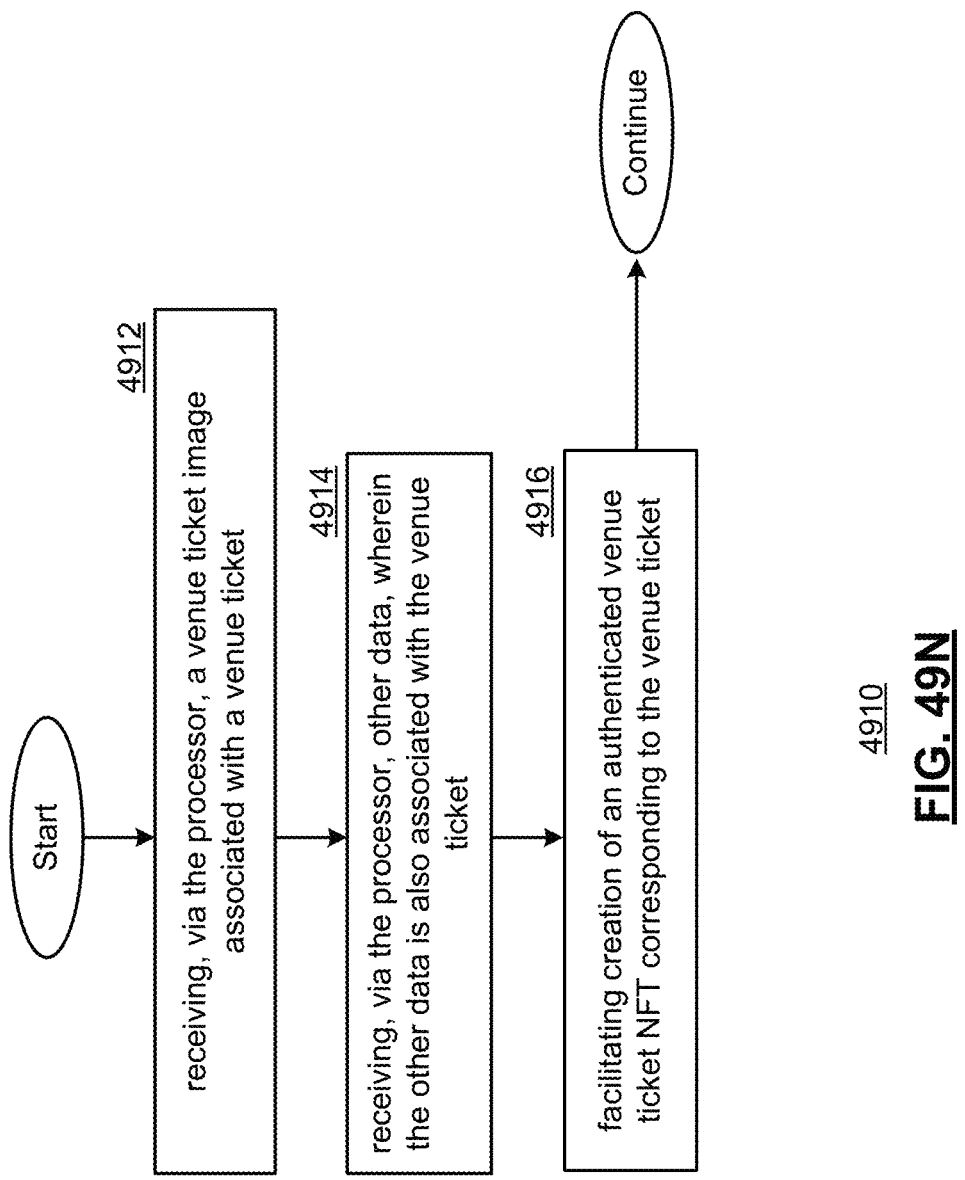

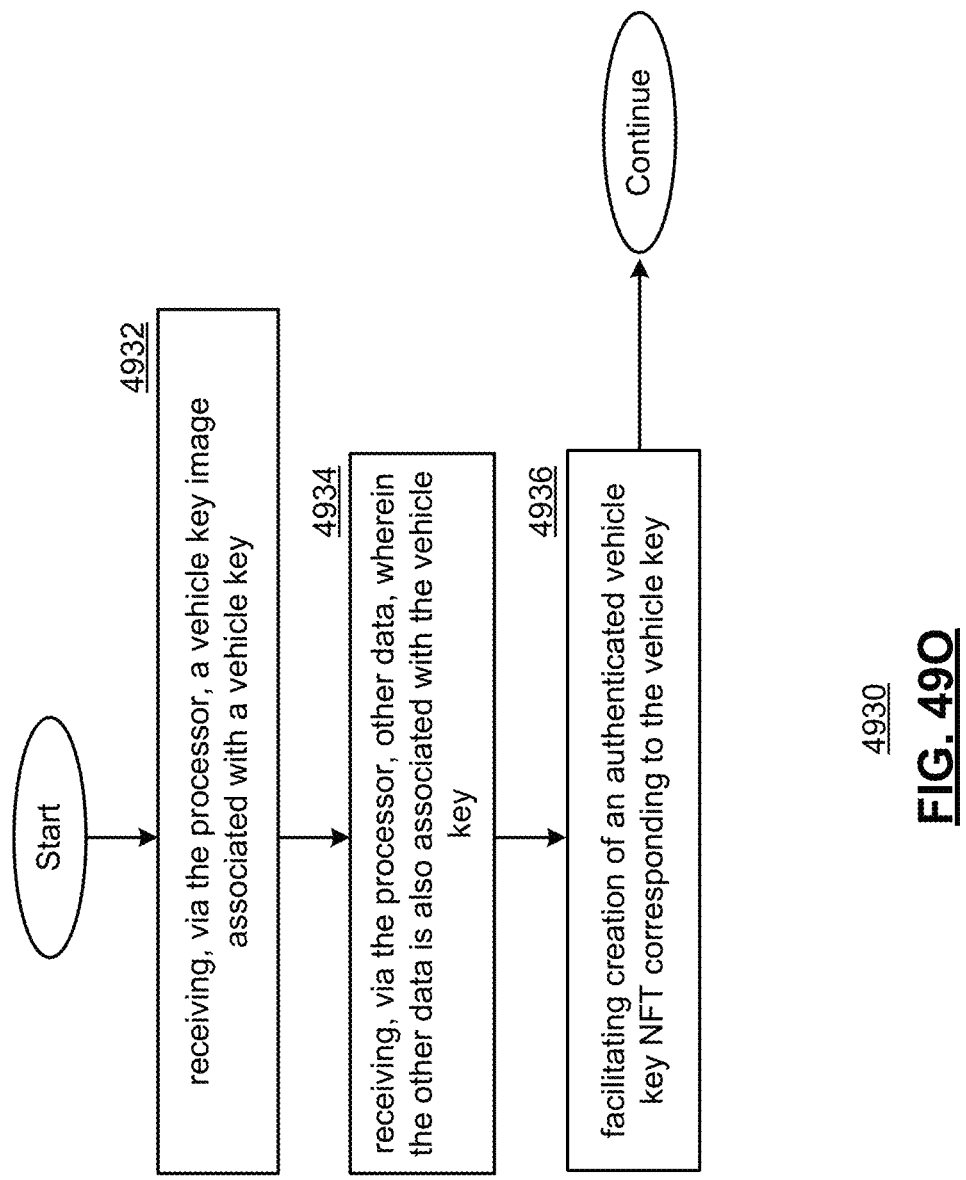

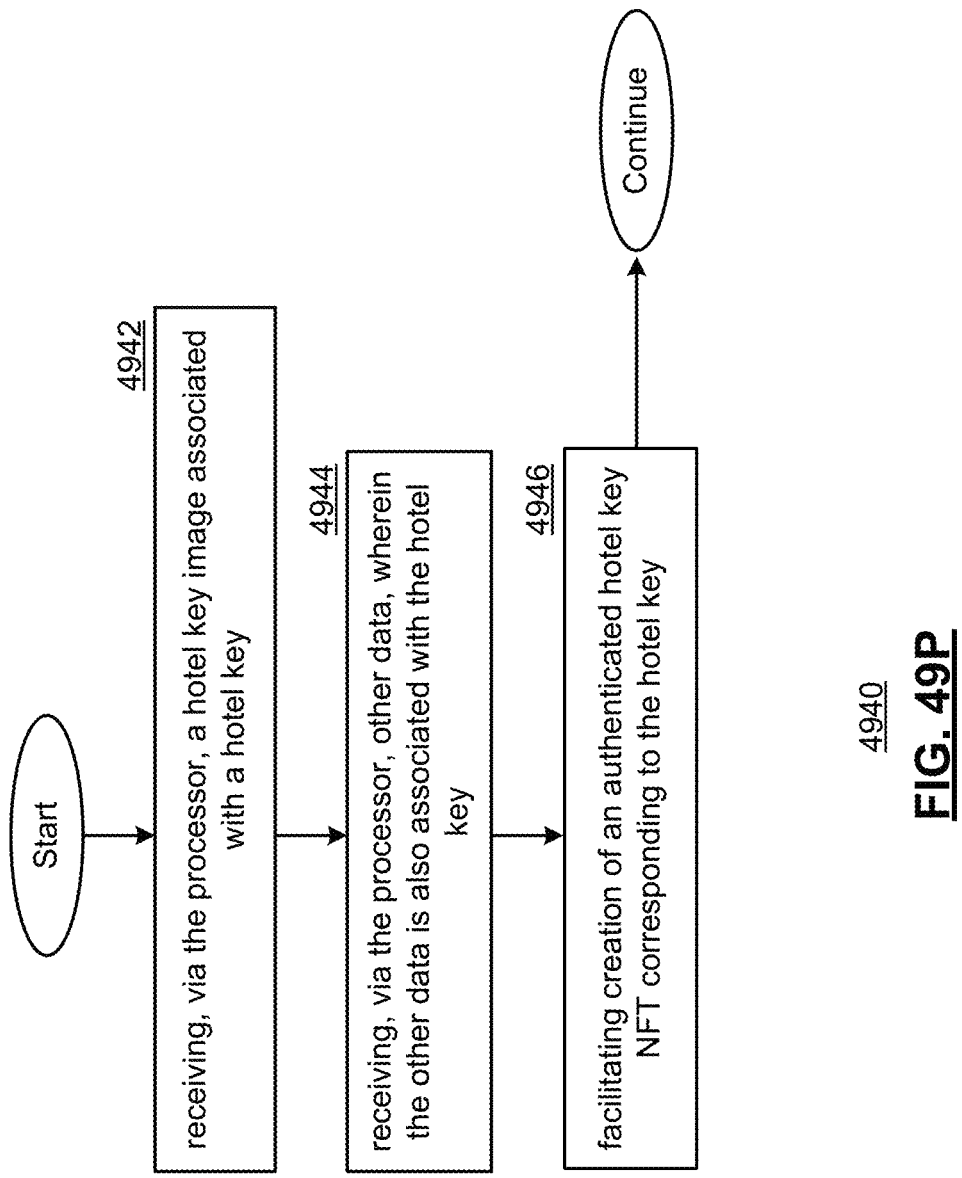

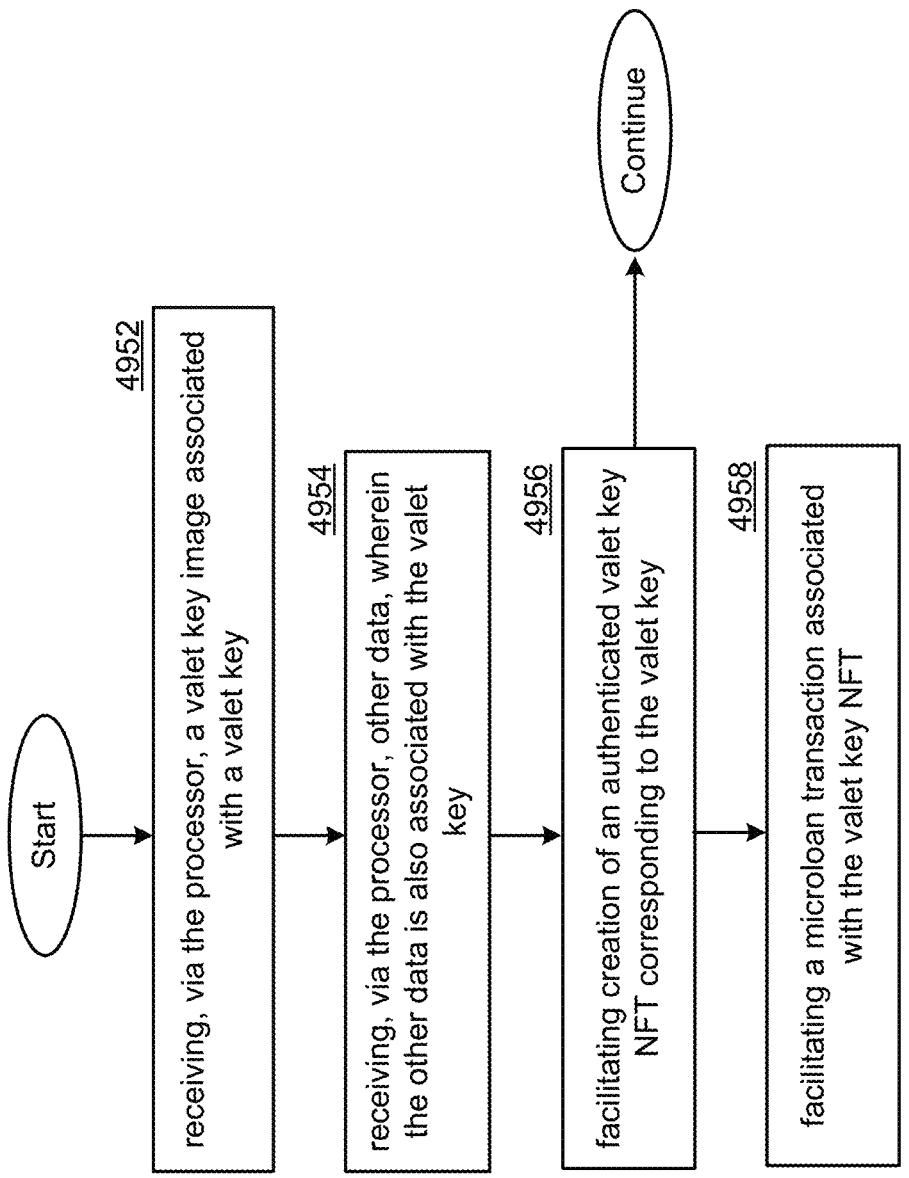

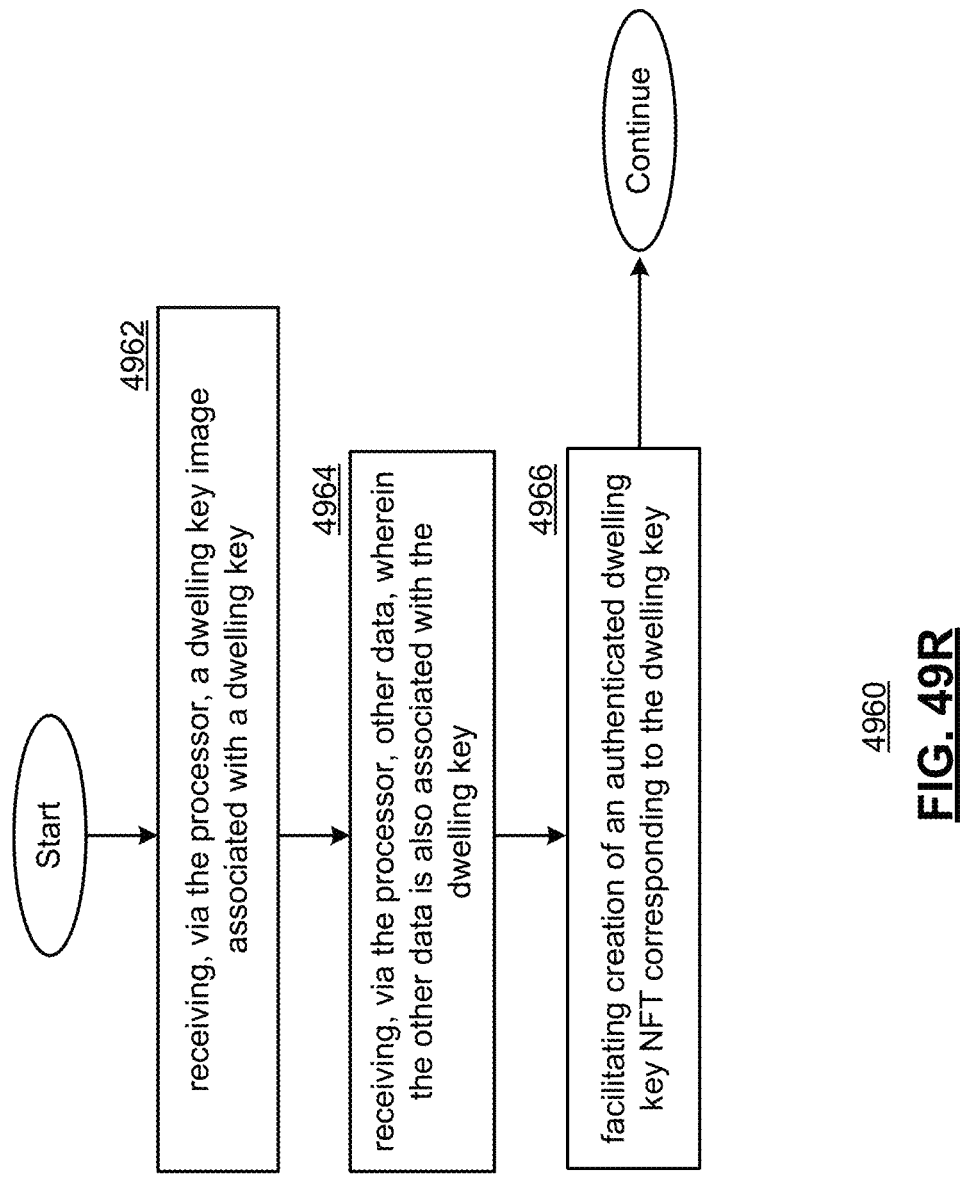

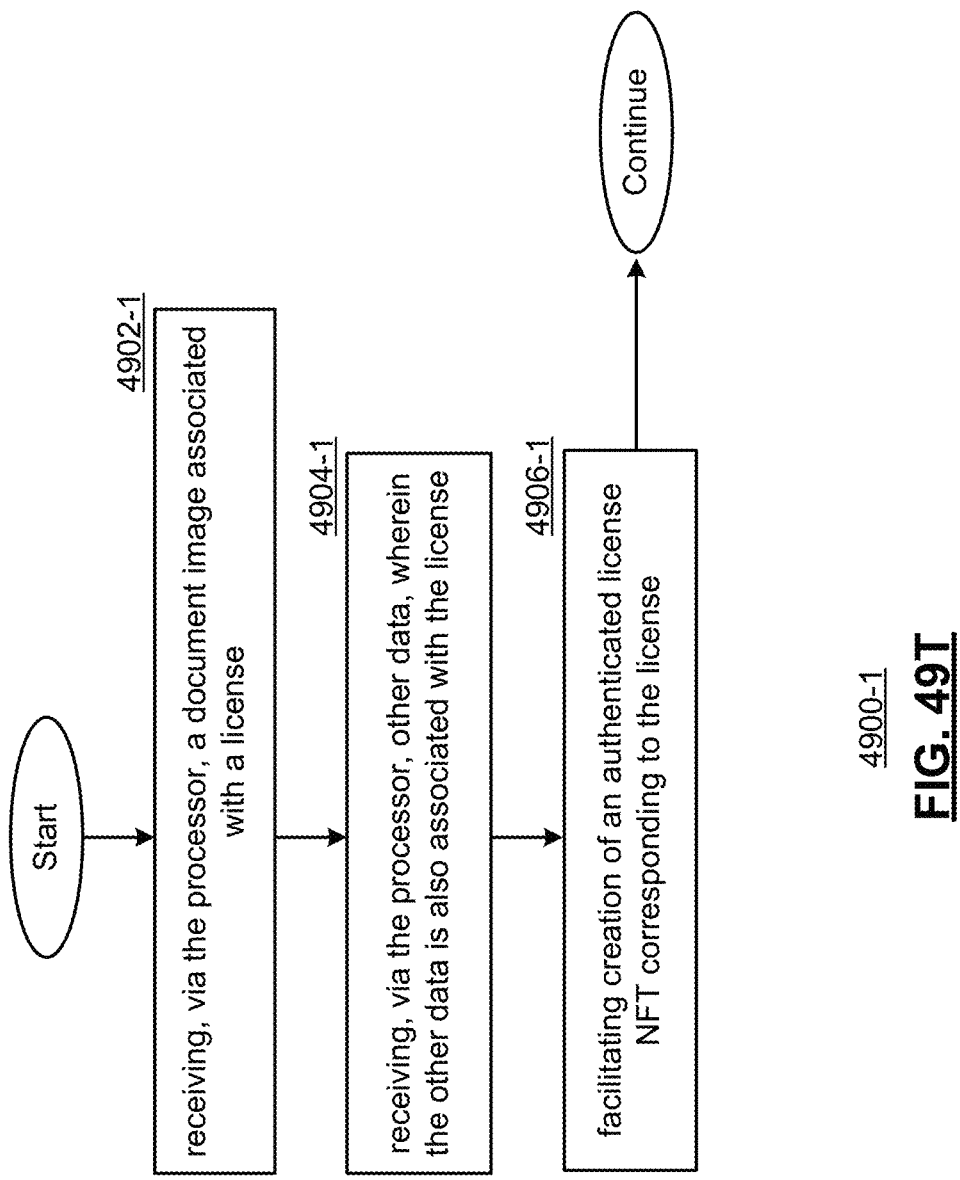

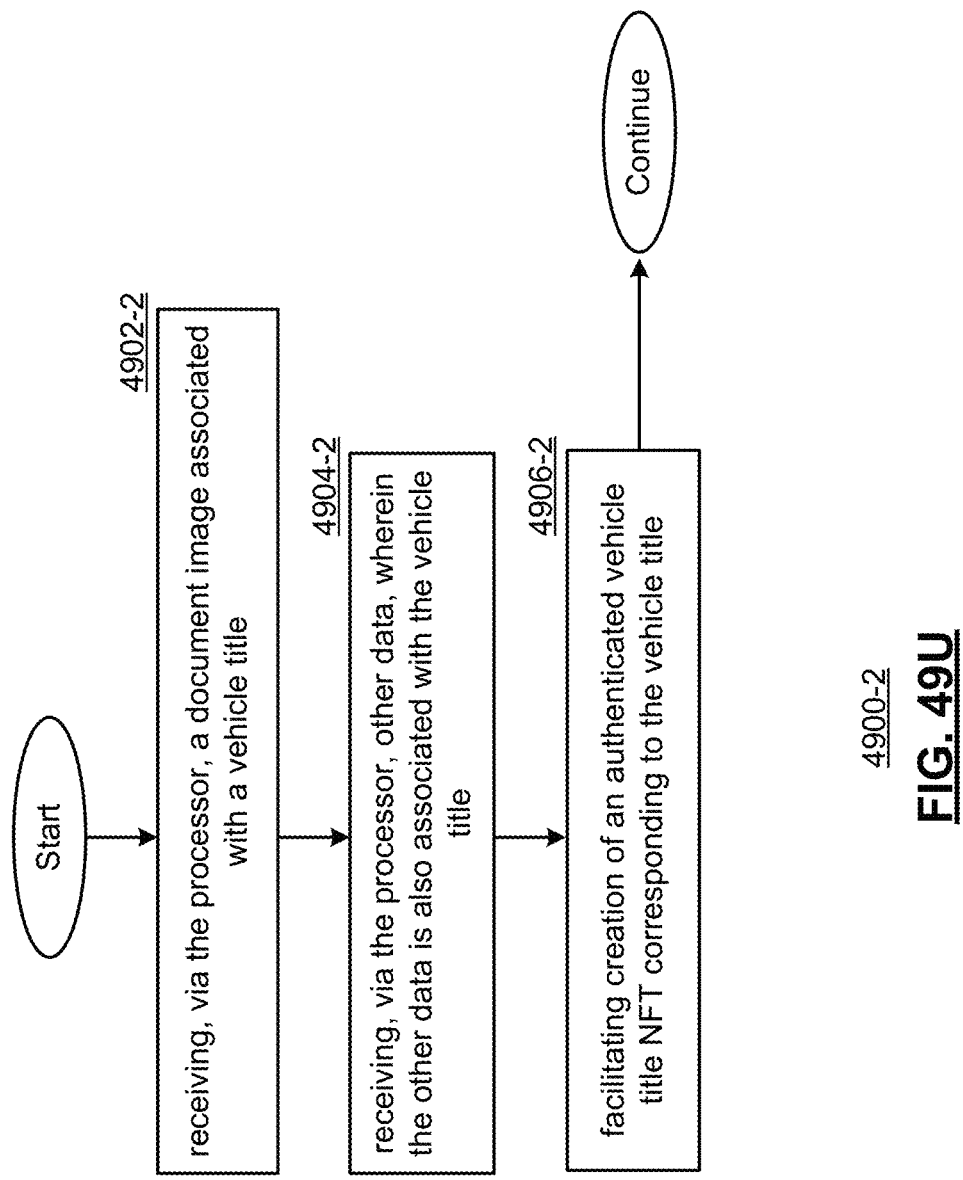

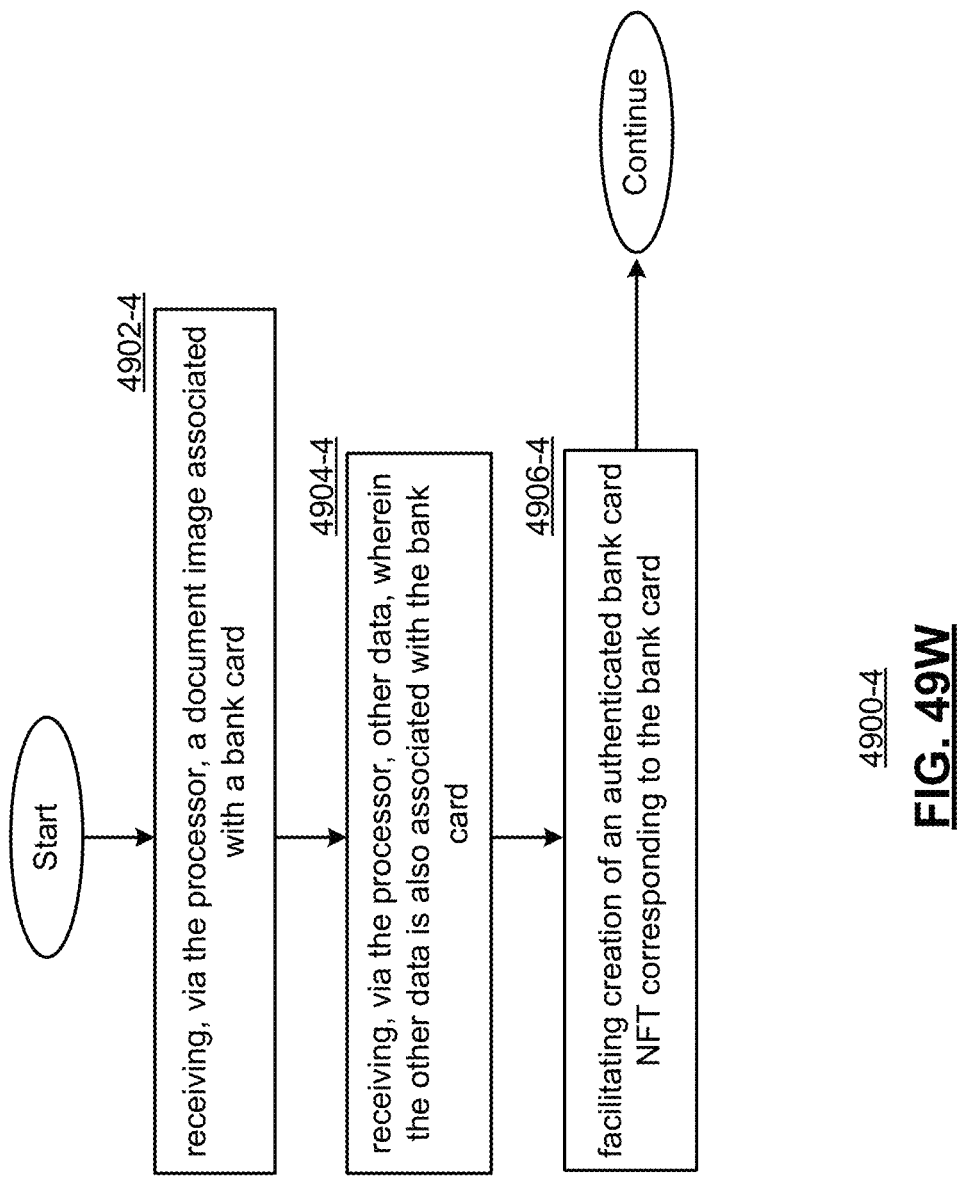

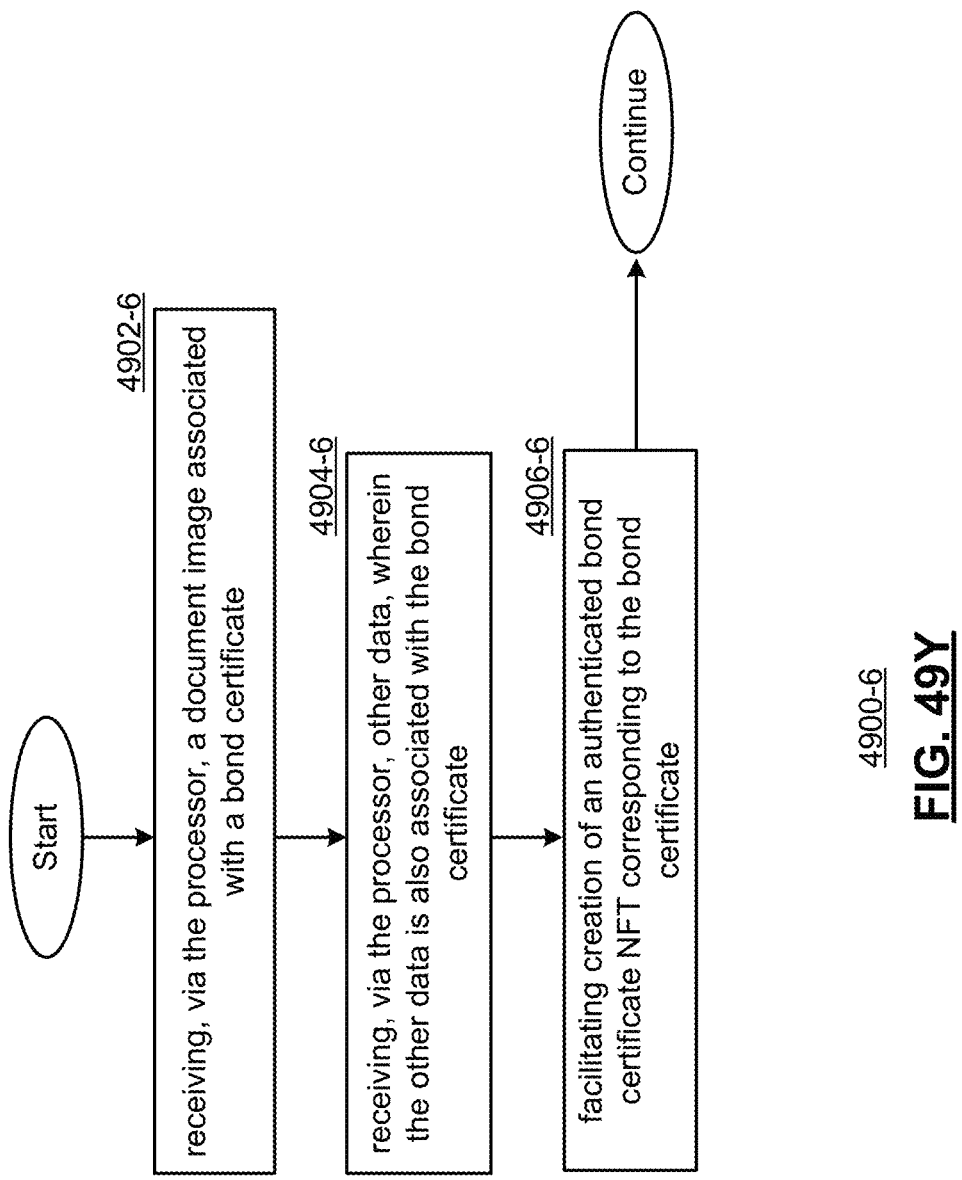

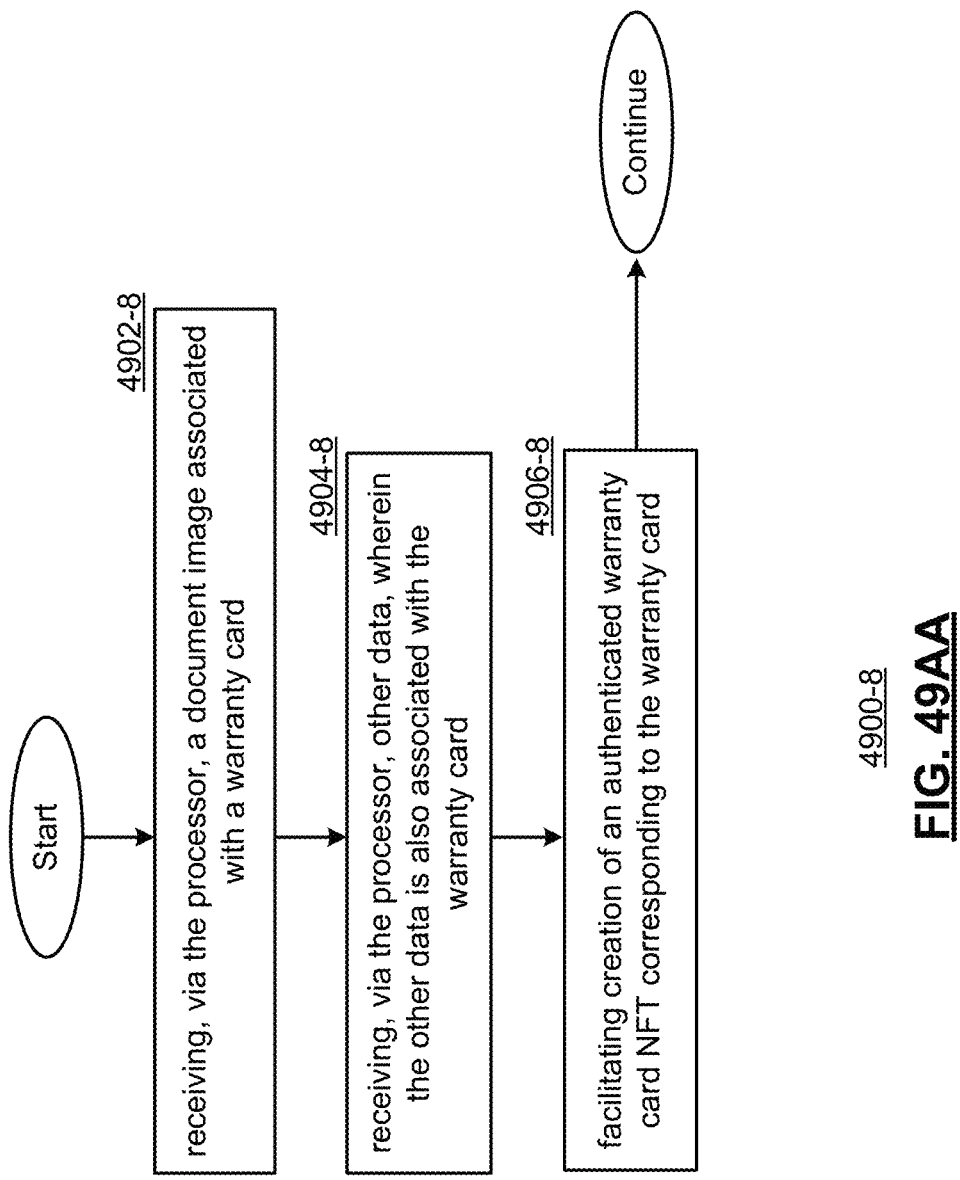

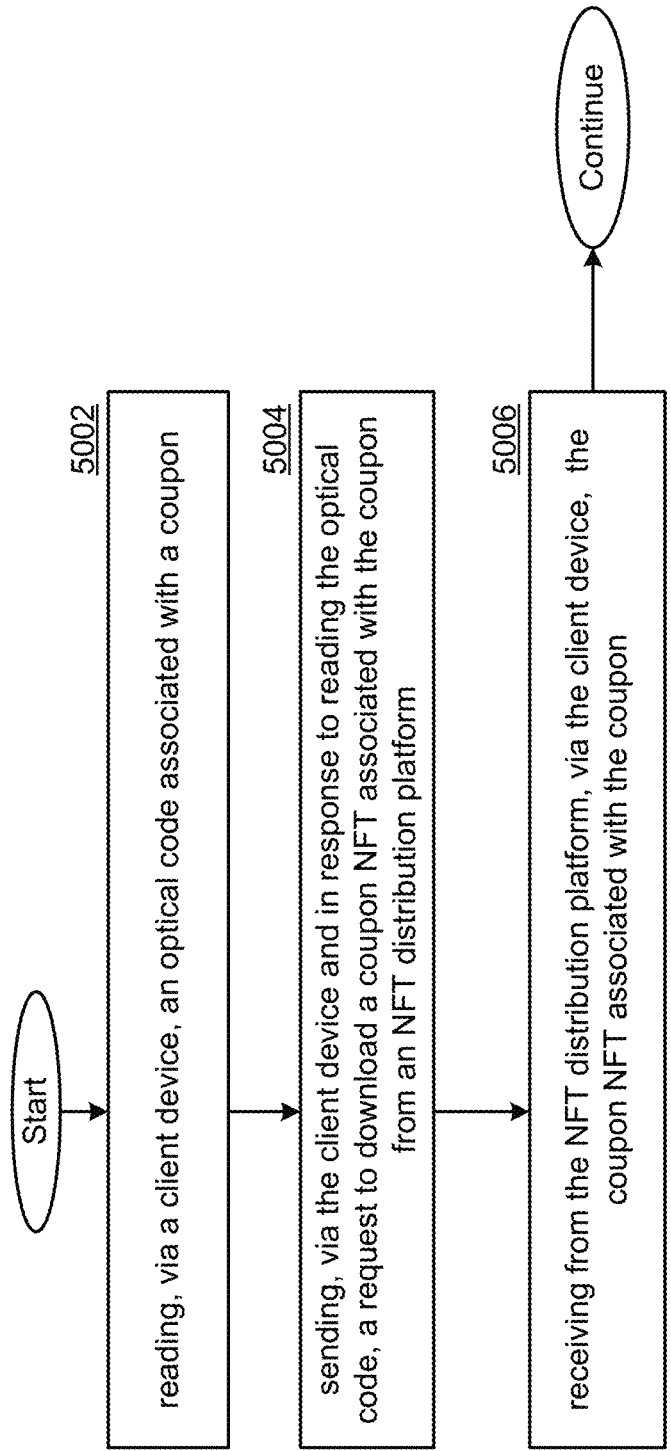

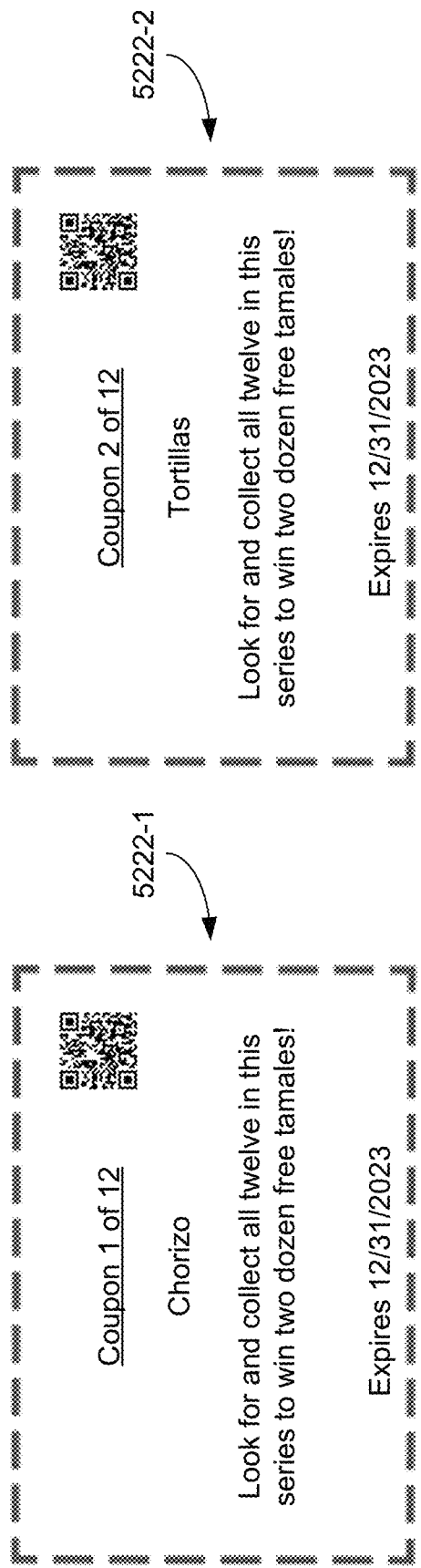
FIG. 52A
FIG. 52B
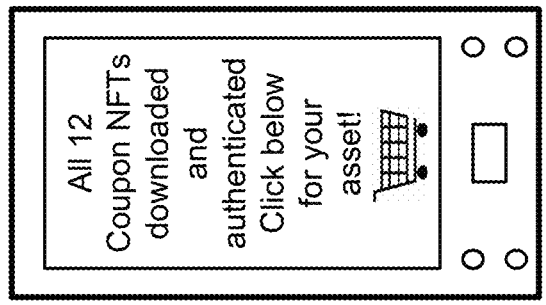
FIG. 52D
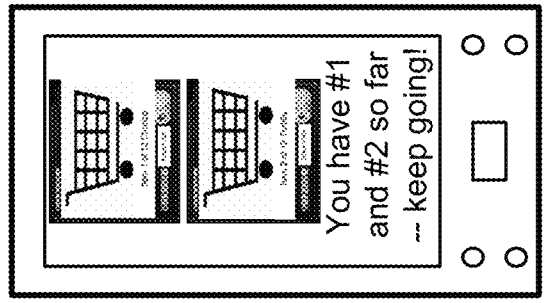
FIG. 52C

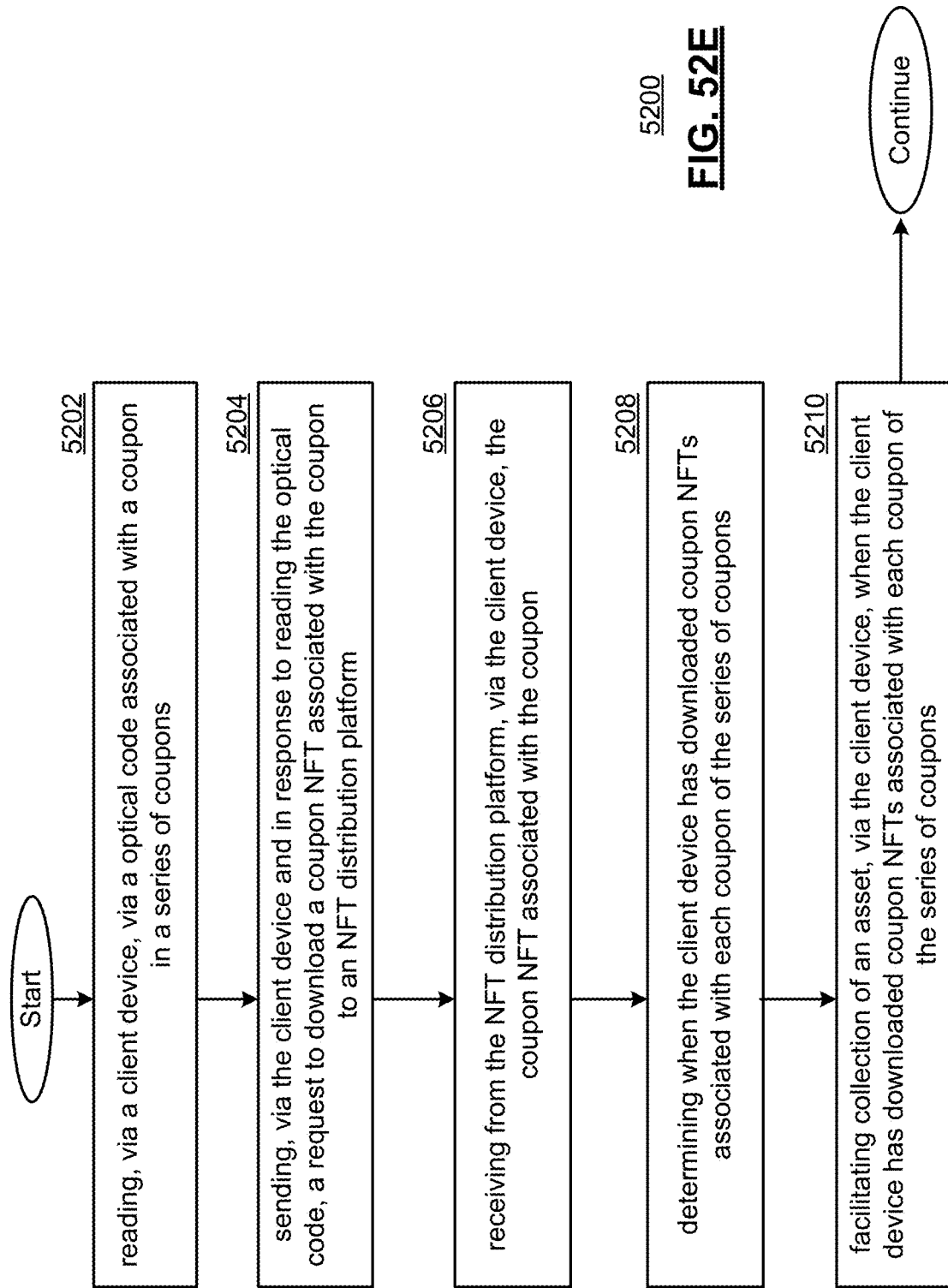

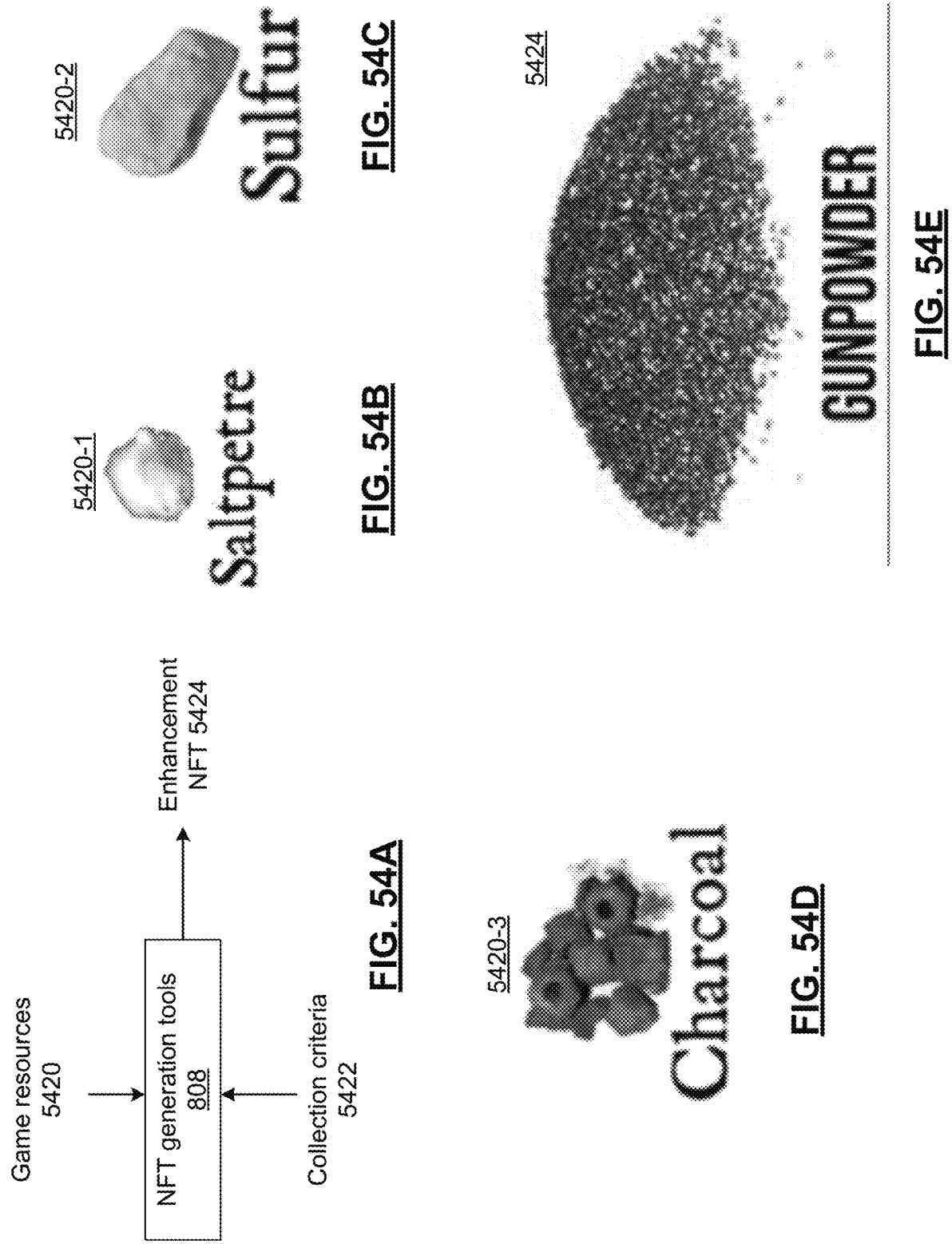

FIG. 56B
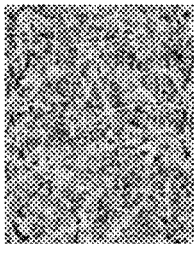
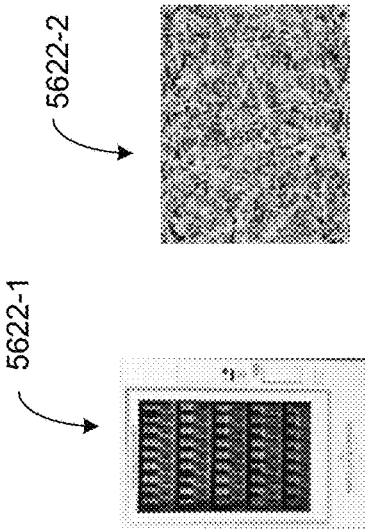
FIG. 56C
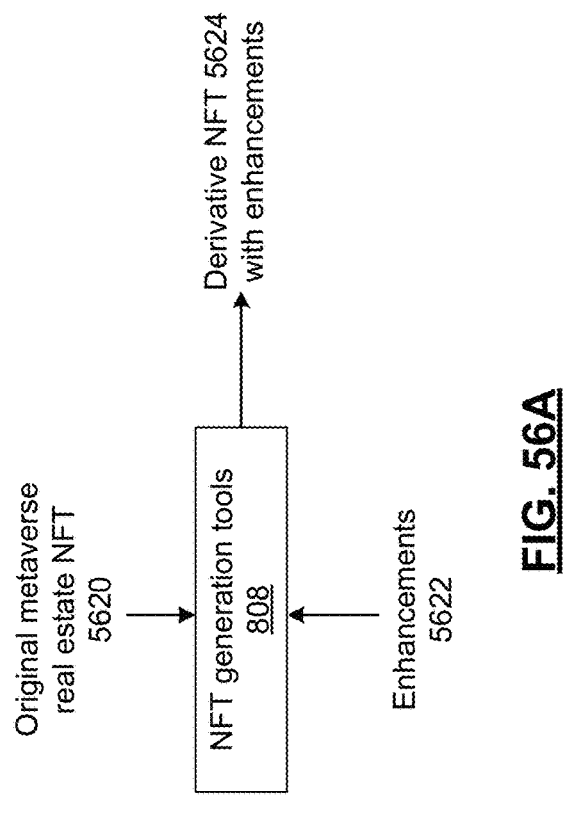
FIG. 56A
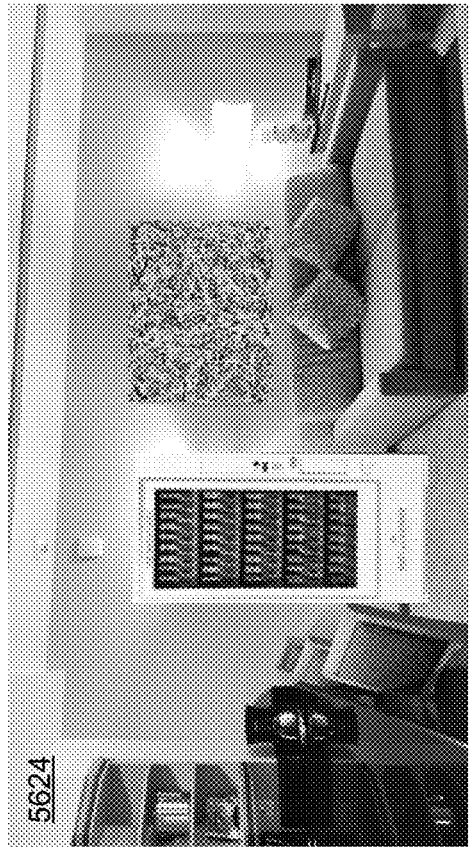
FIG. 56D

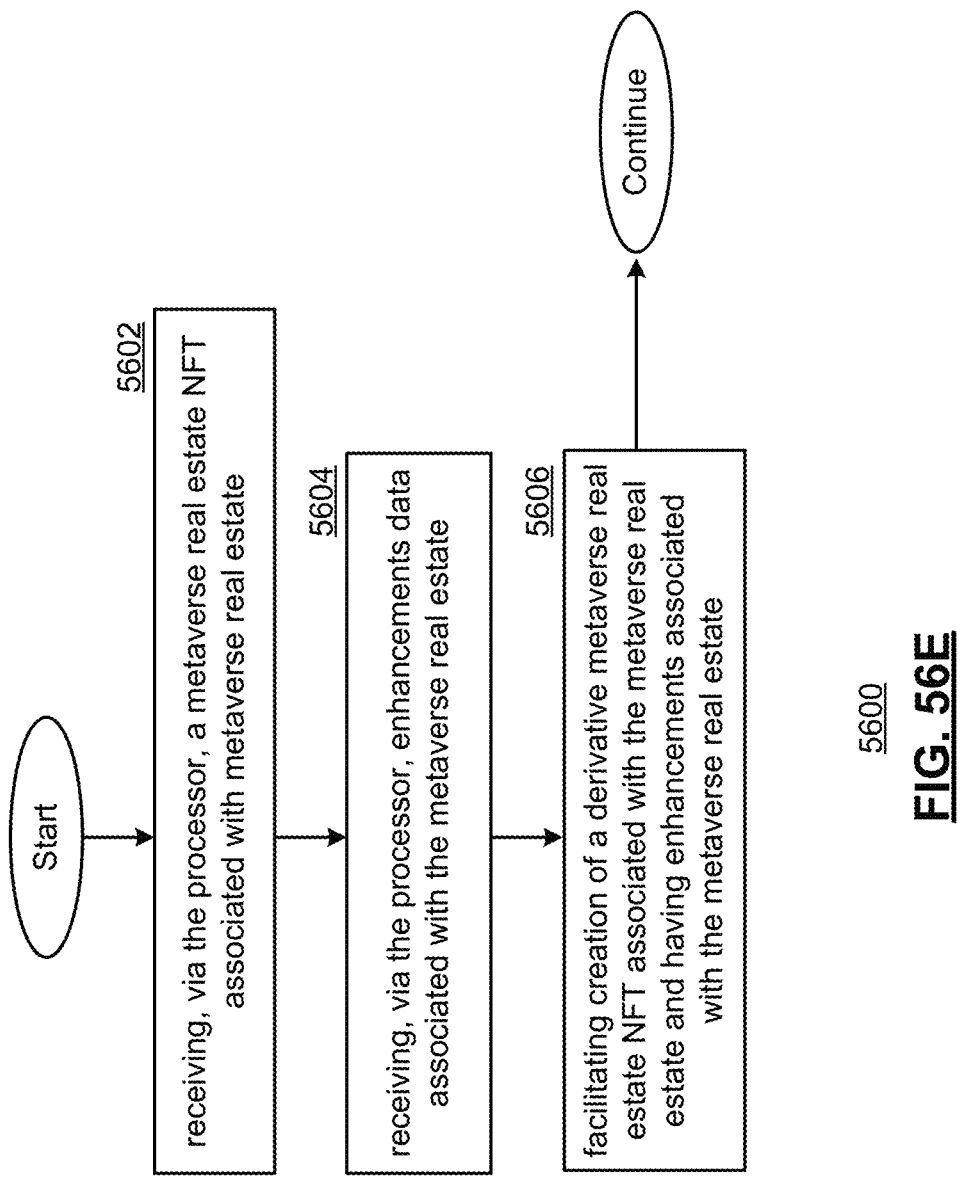

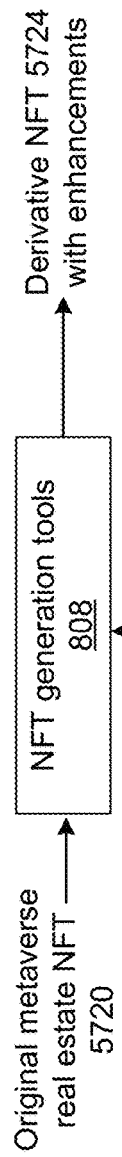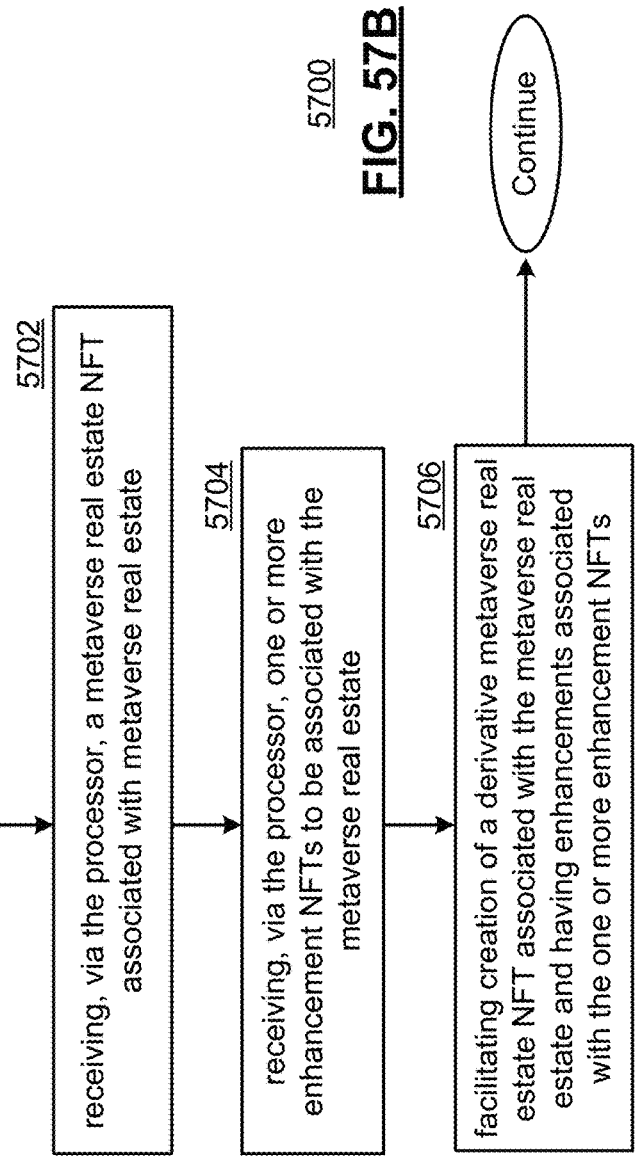

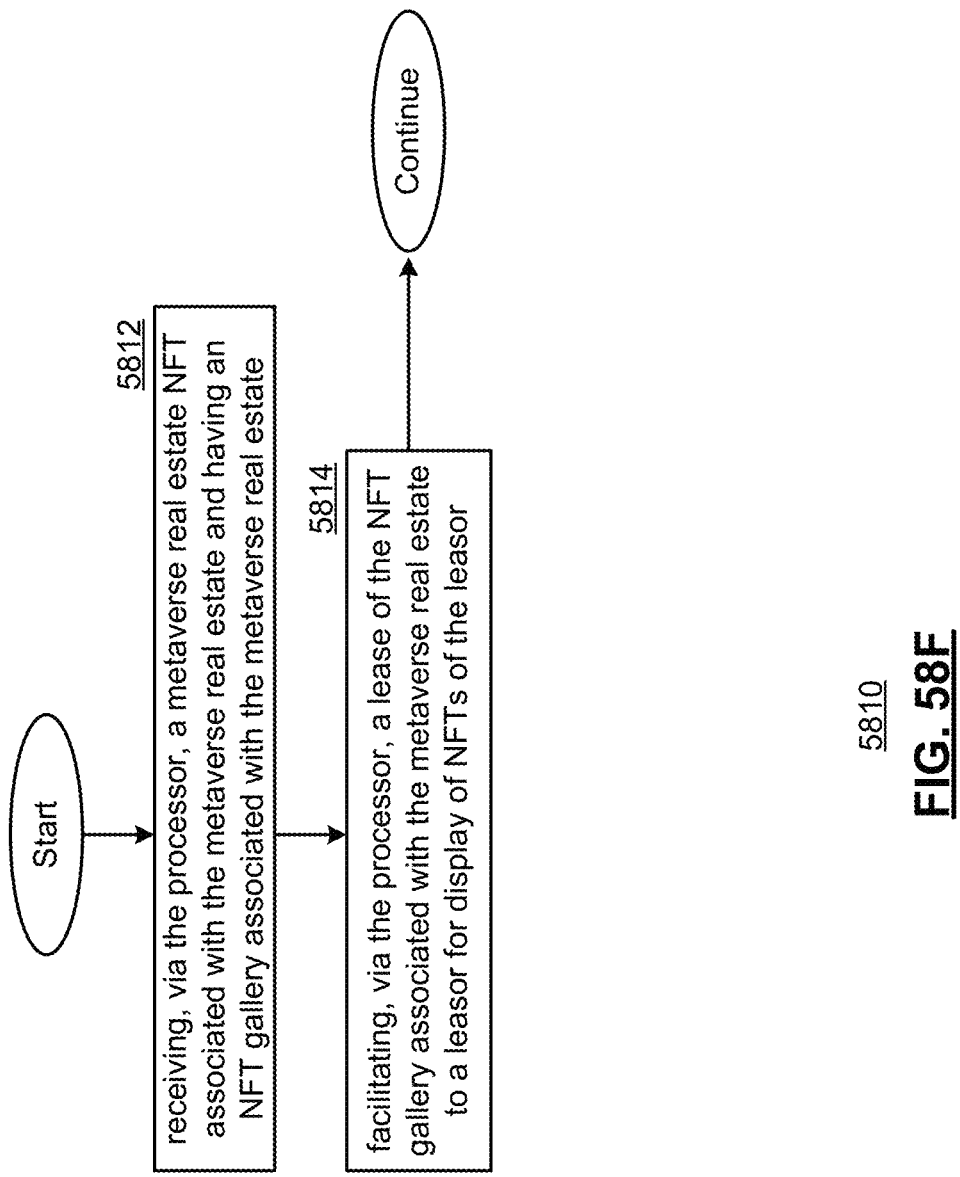

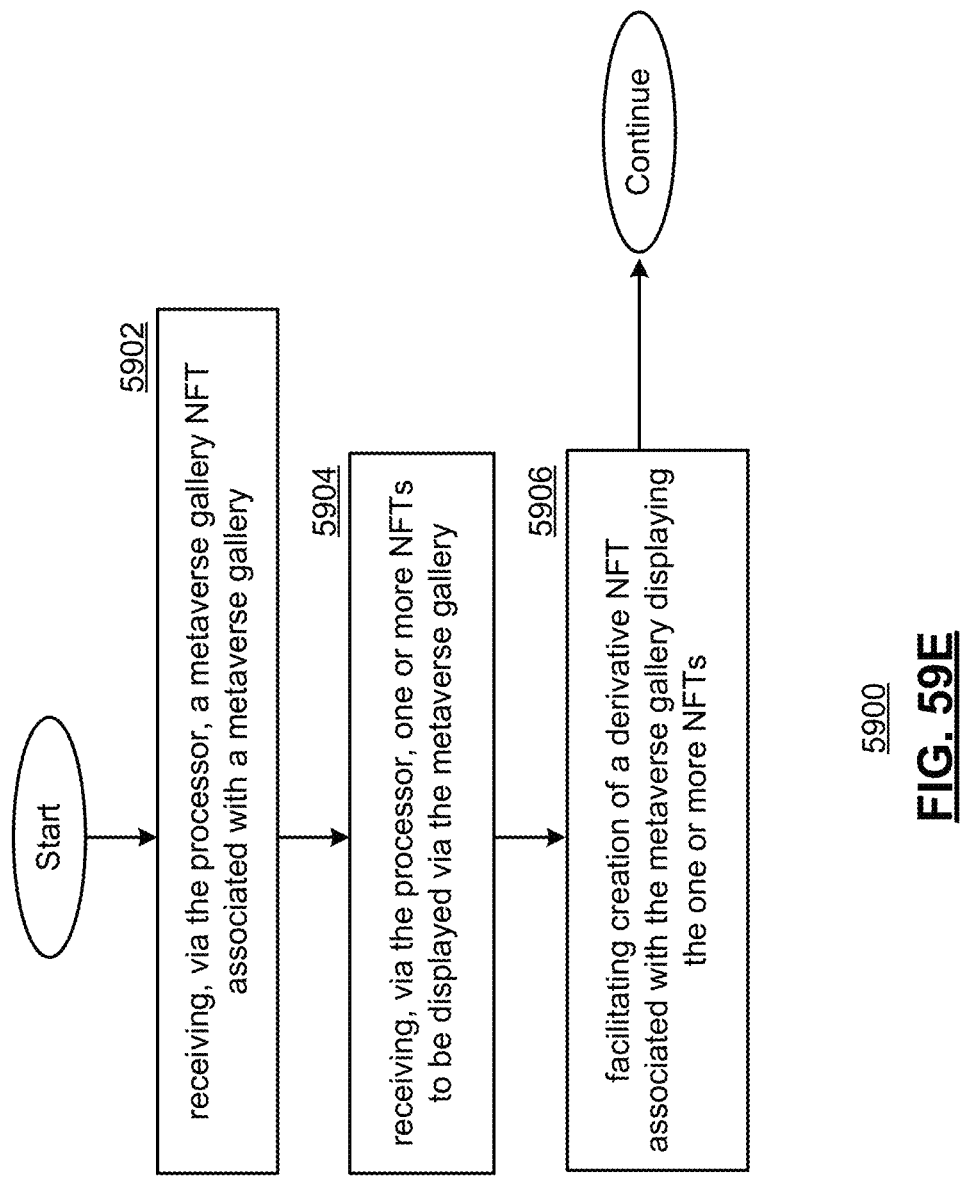

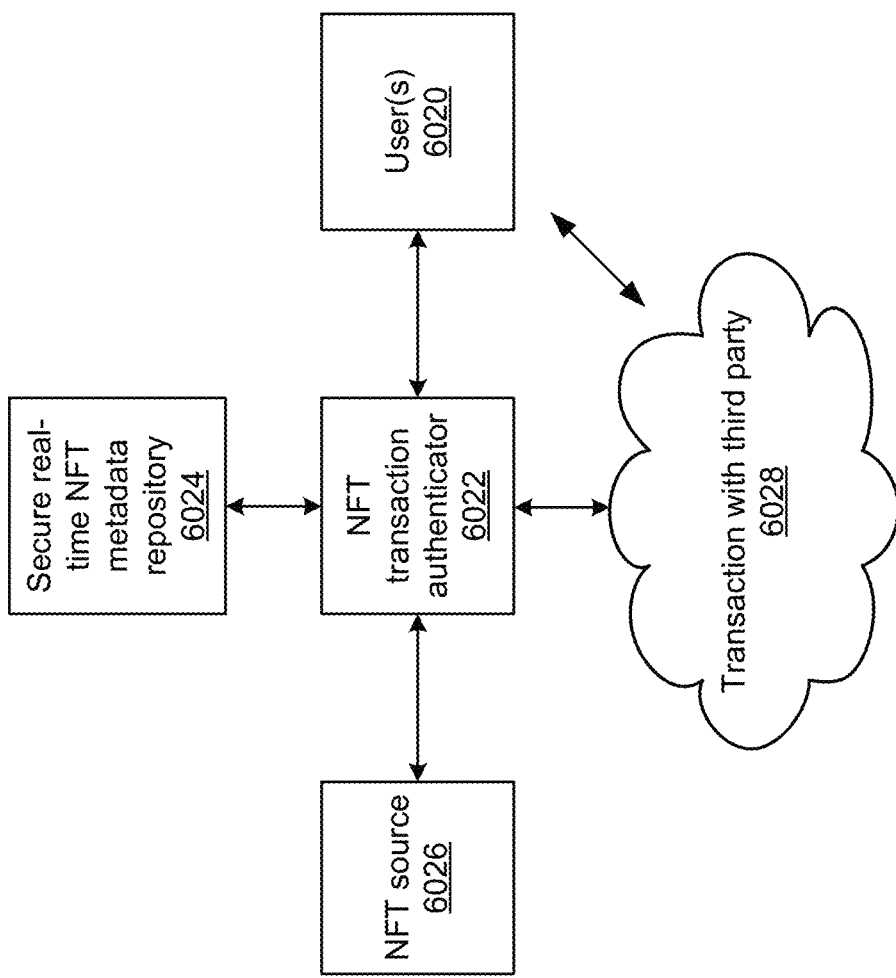

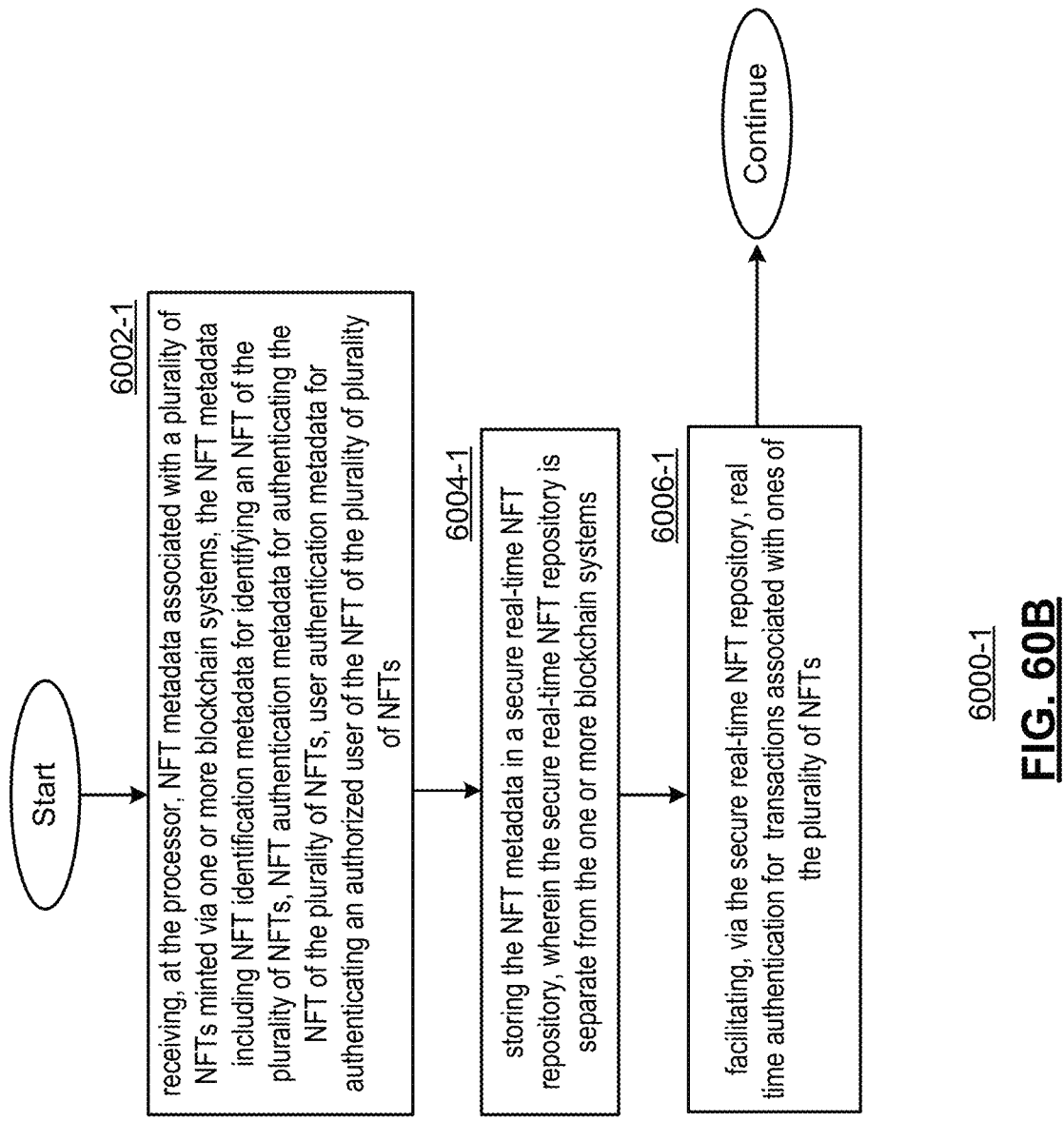

6000-3

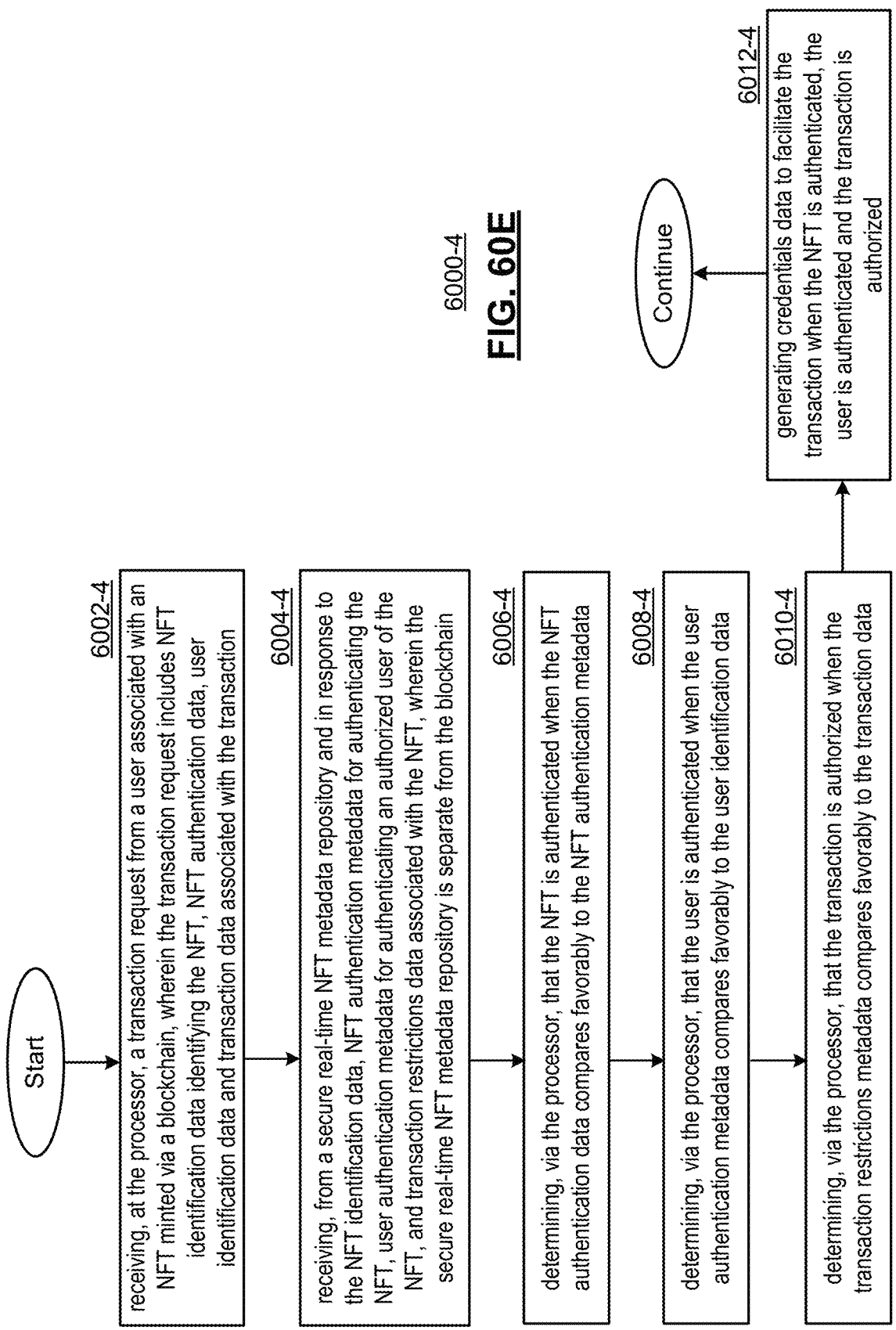

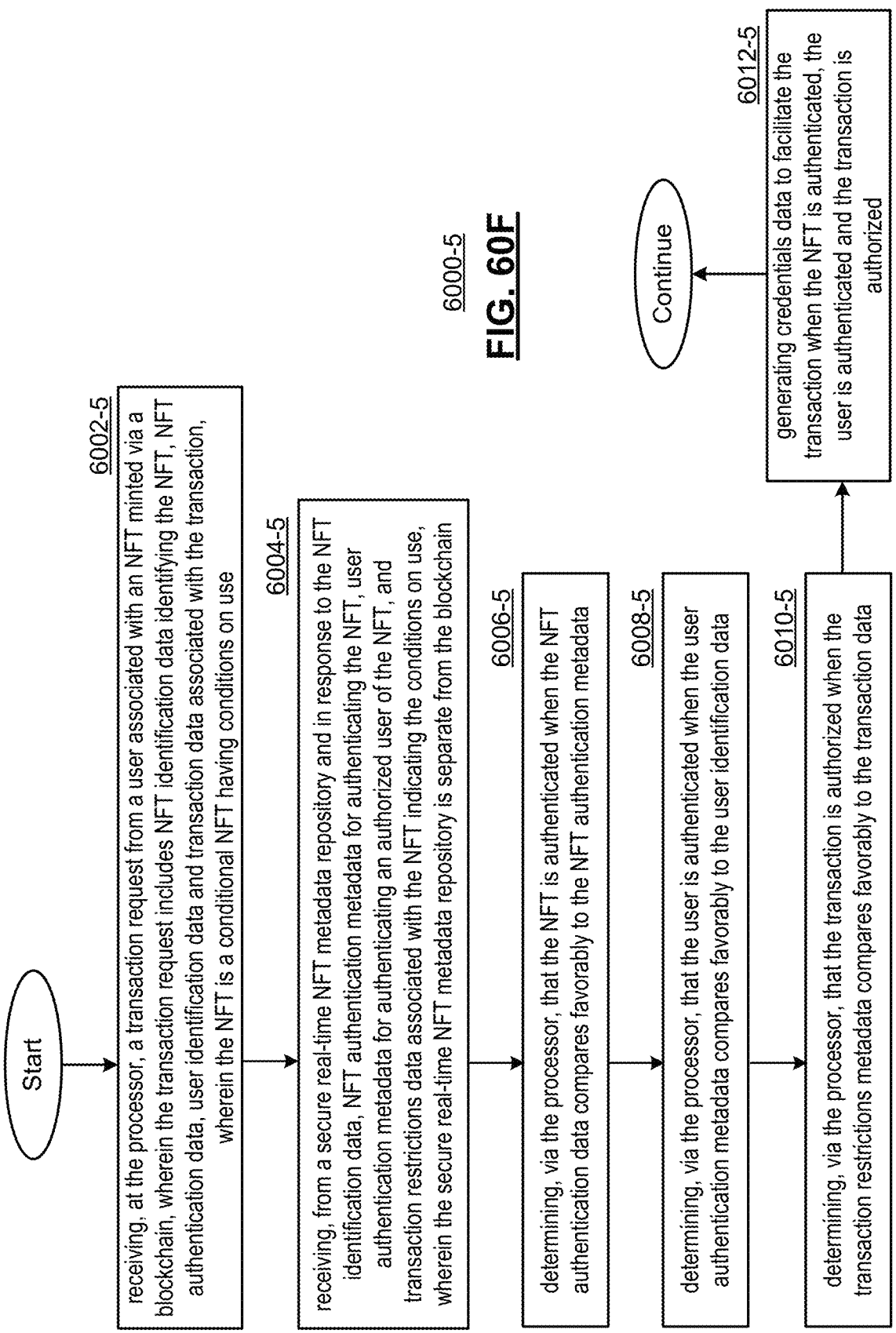

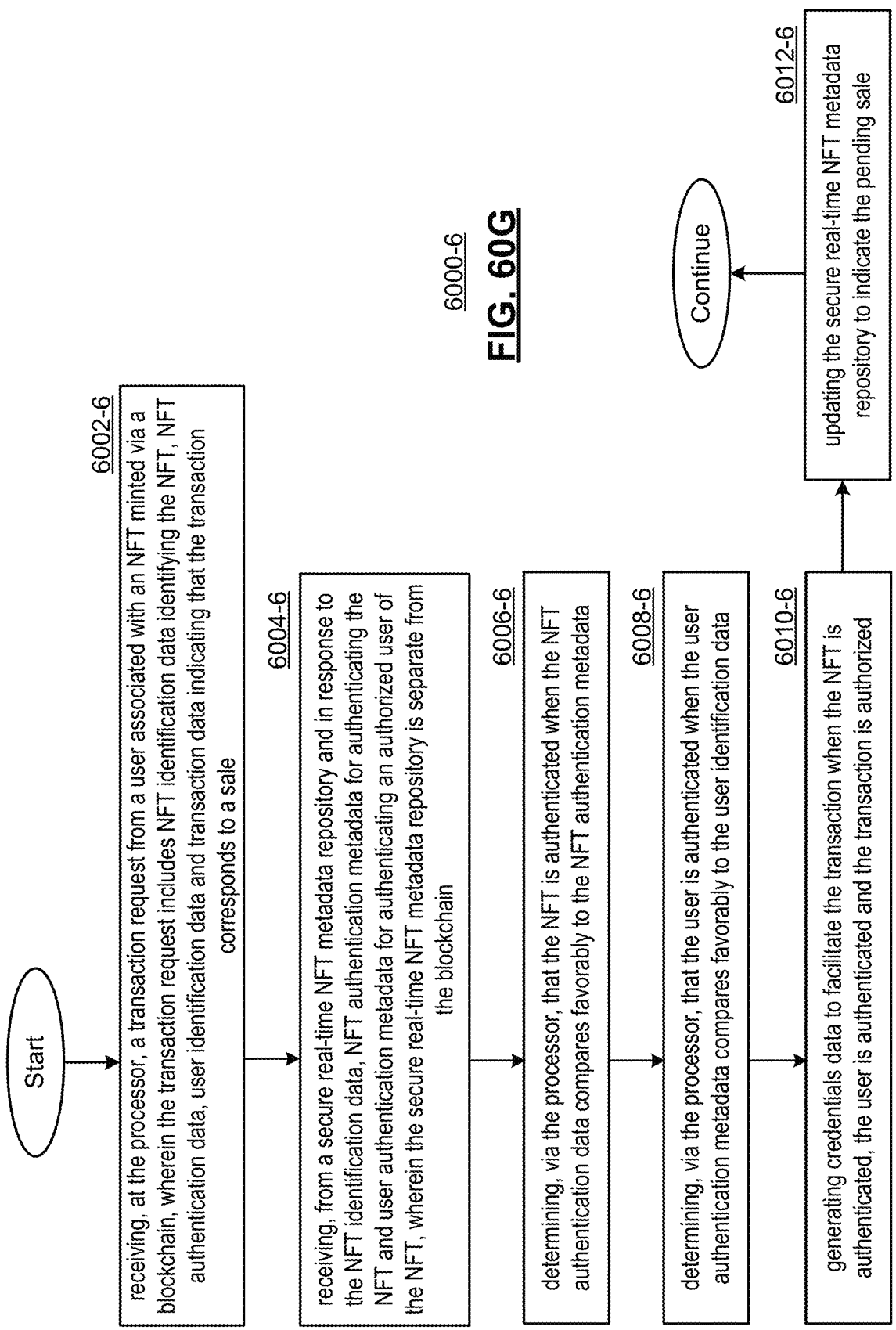

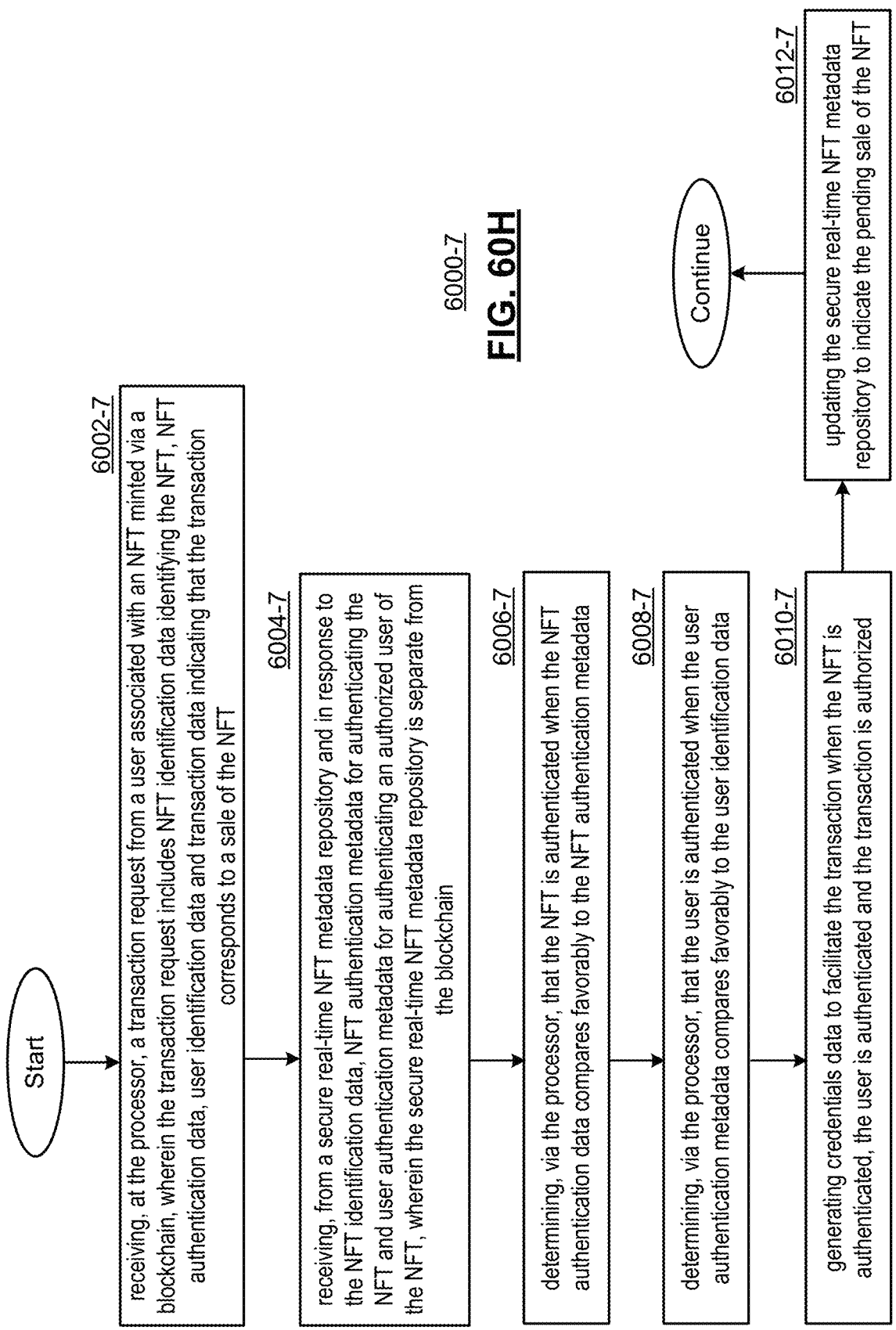

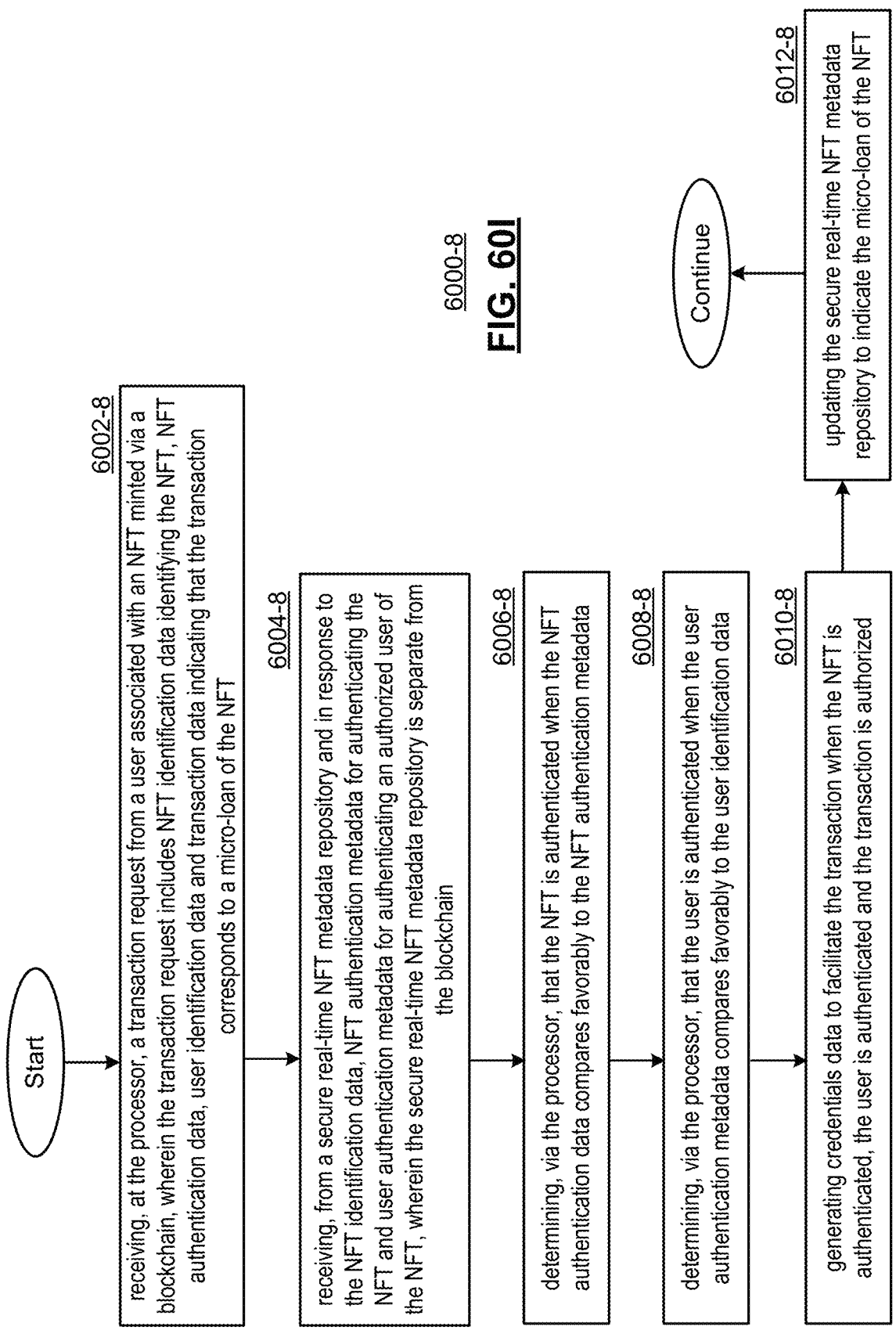

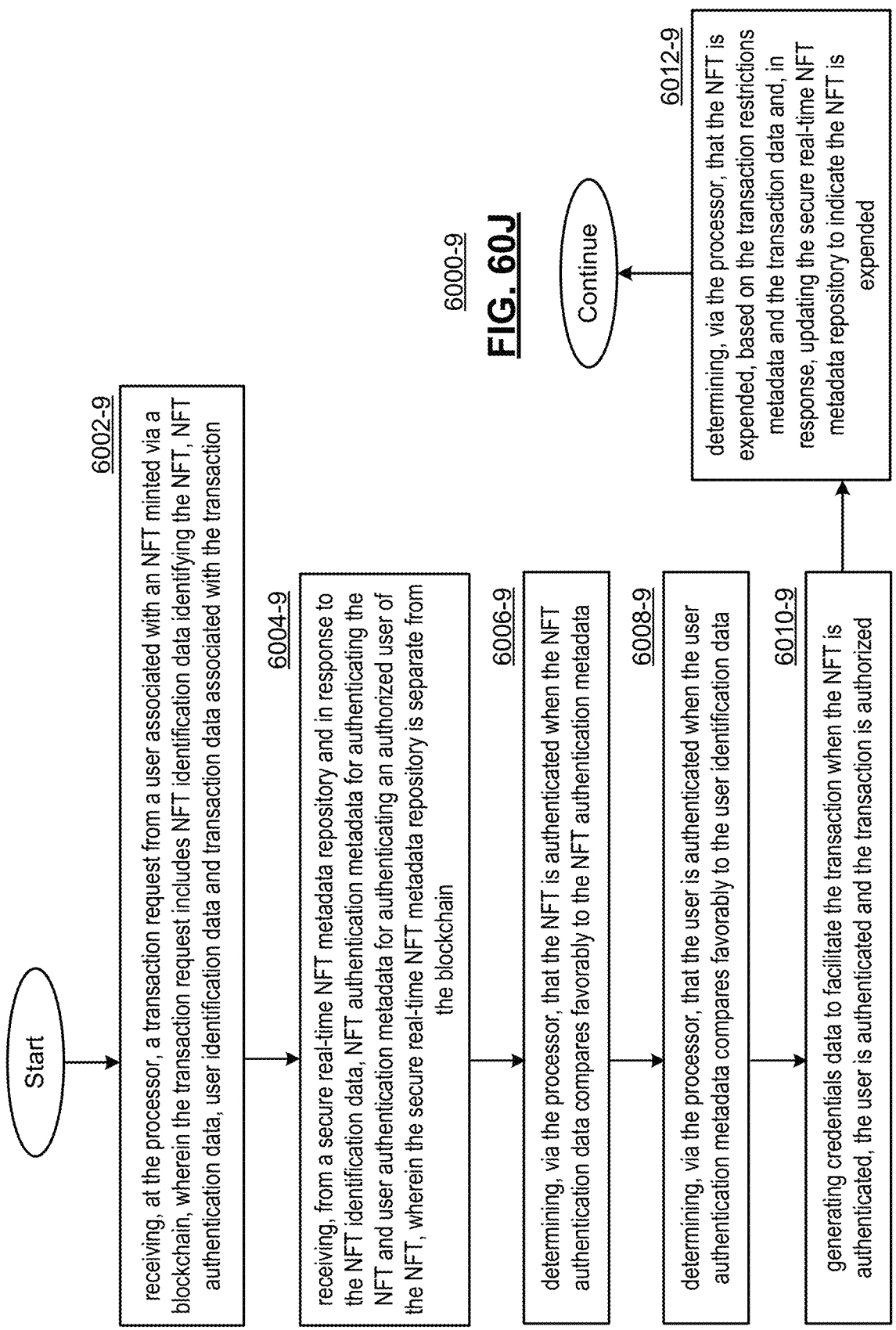

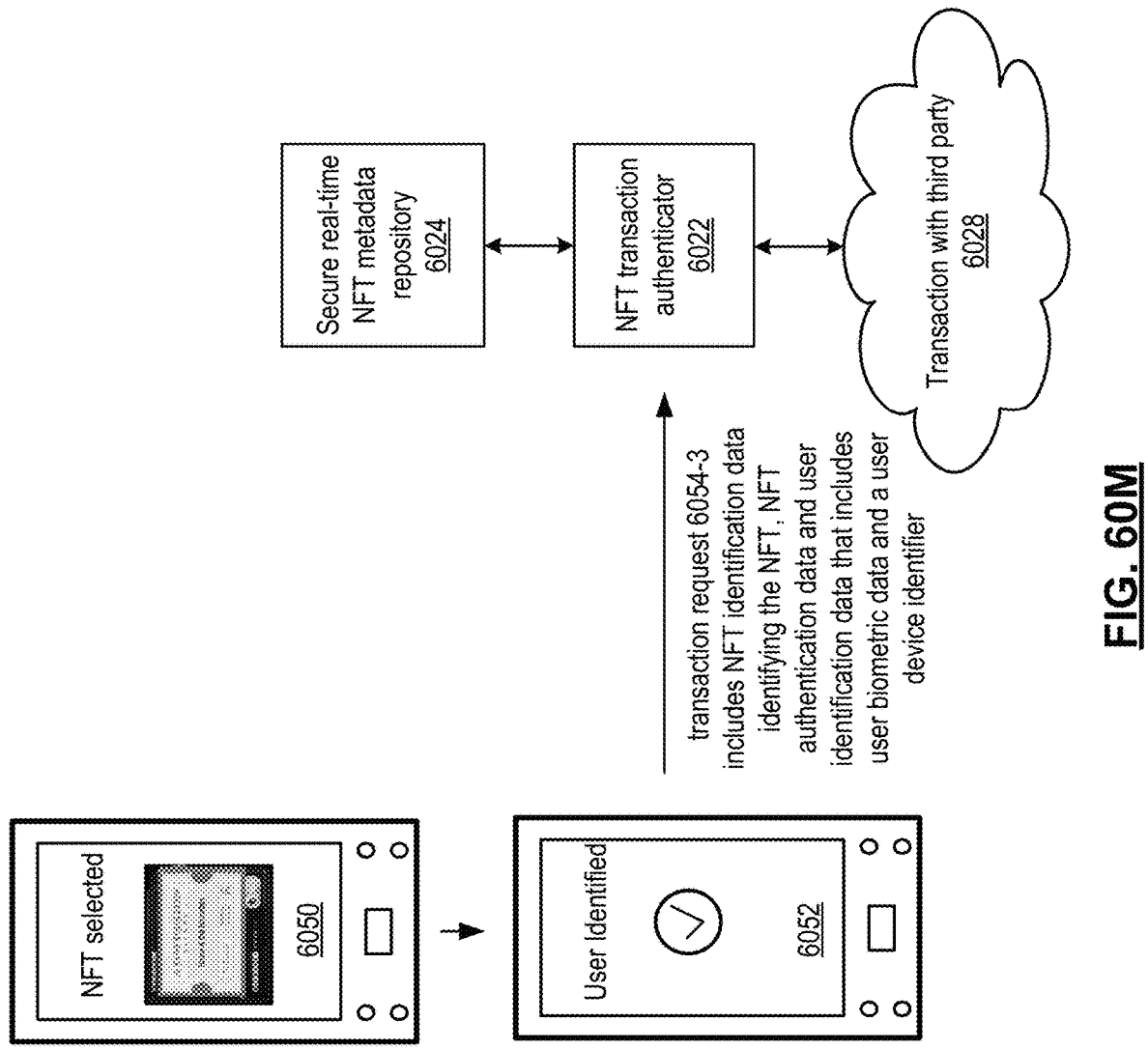

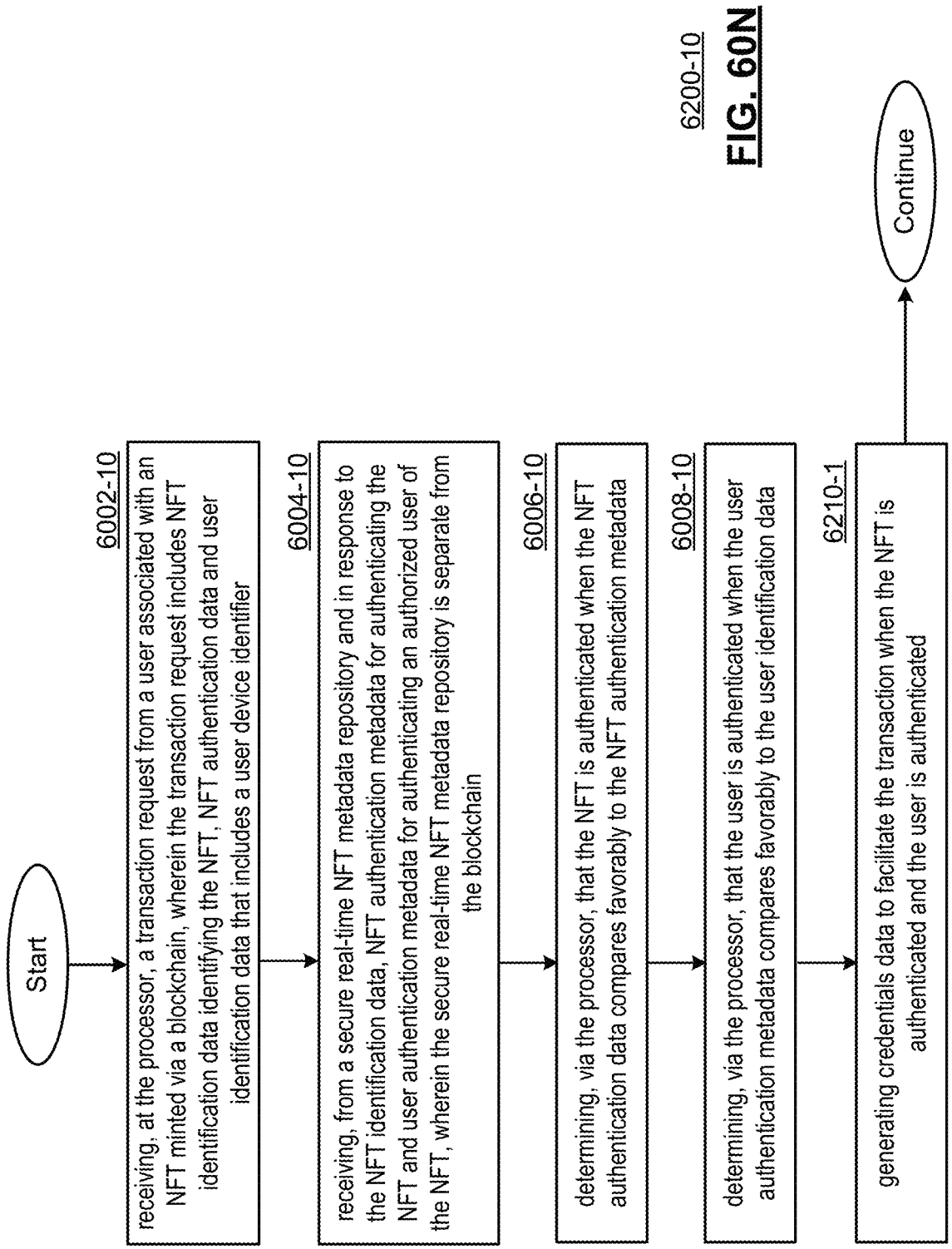

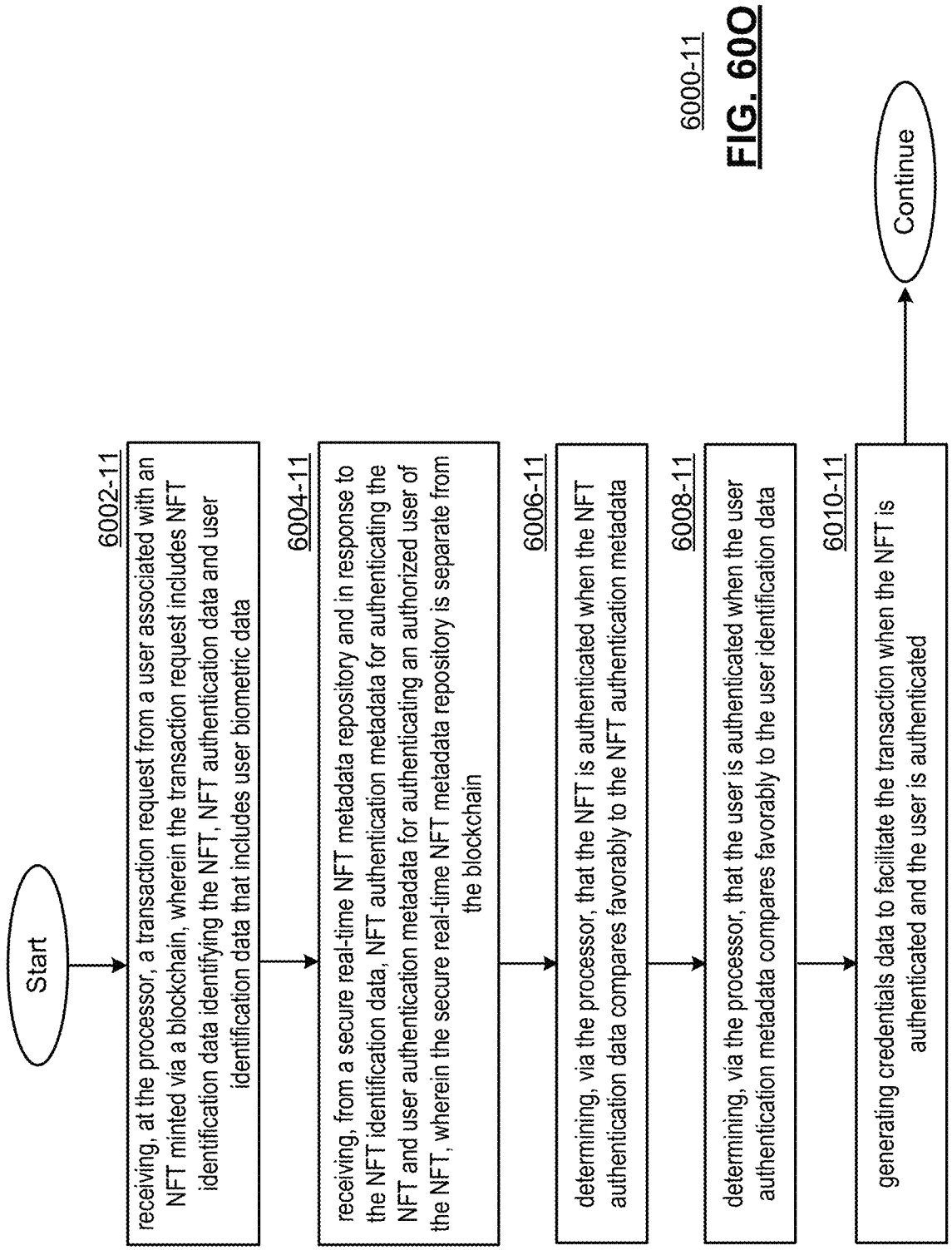

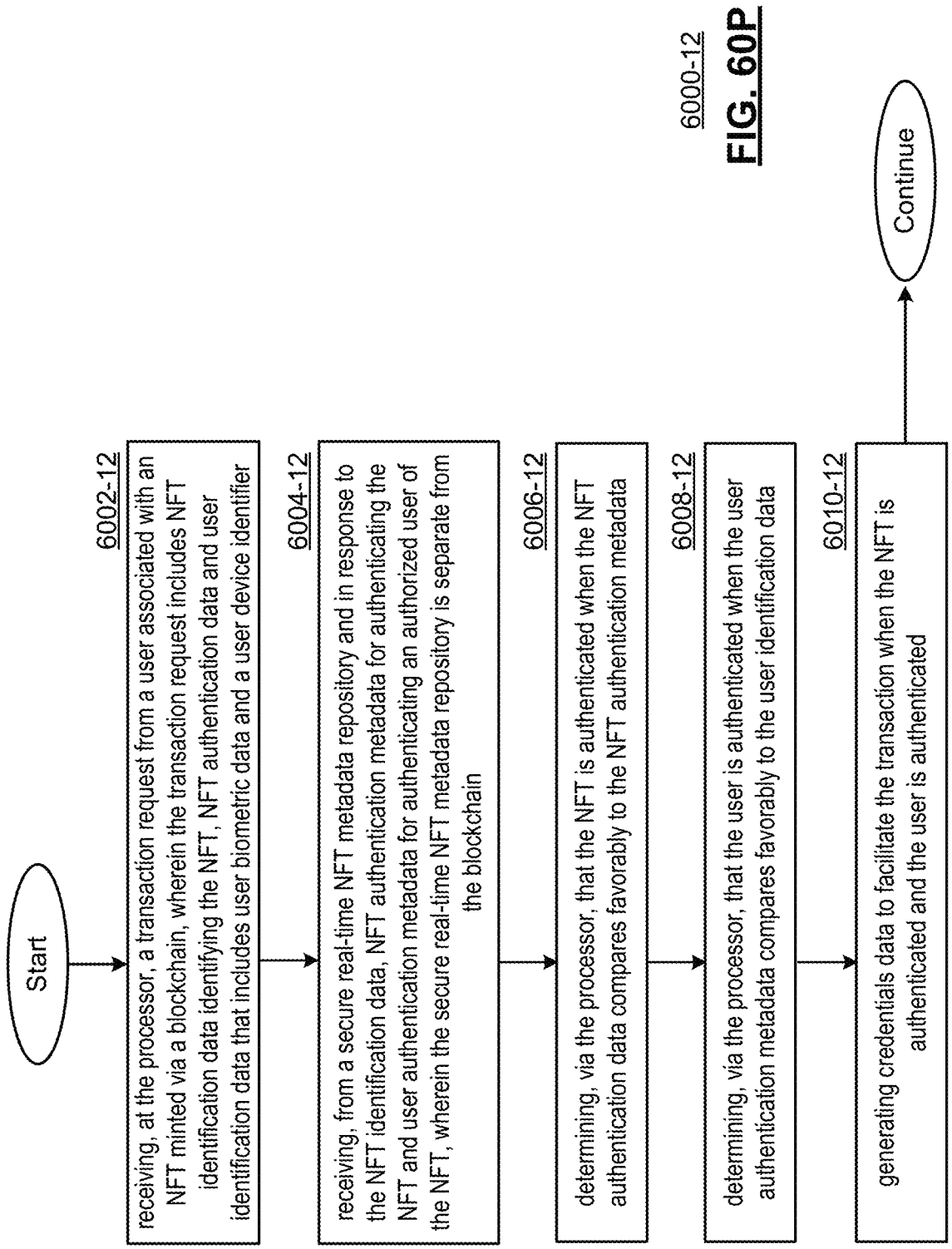

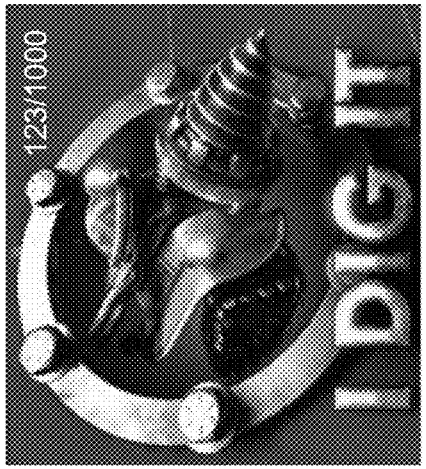

FIG. 61G

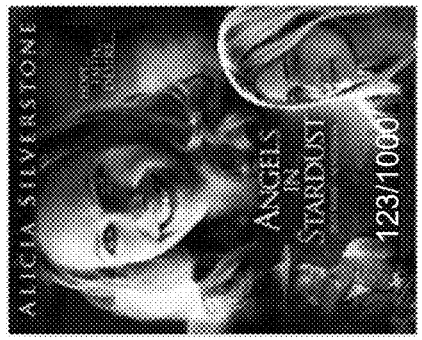

Wine Flight          123/1000

I slip the surly bonds of Earth and dance through space on Rocket Science wings,
I sip the wine with tumbling mirth, and think of grapes that taste of many things;
Syrah, the Cab, the tart Merlot, help lift my visage to the skies;
the tannins in Petit Verdot, bring heartfelt tears unto my eyes;
with silent lifting mind I trod, the sanctity of space;
but my thoughts return to Caldwell, and how I love this place.

FIG. 61J

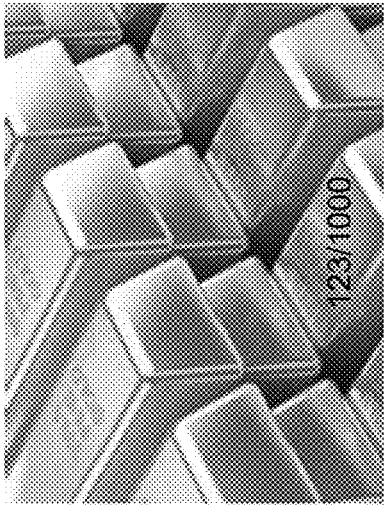
FIG. 61M
FIG. 61L
FIG. 61K
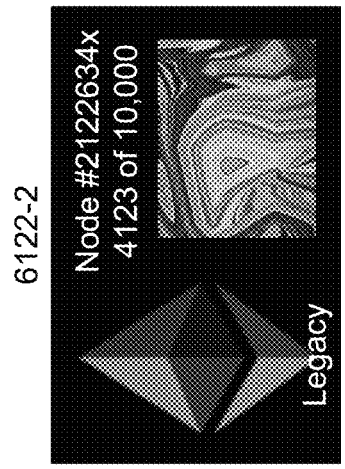
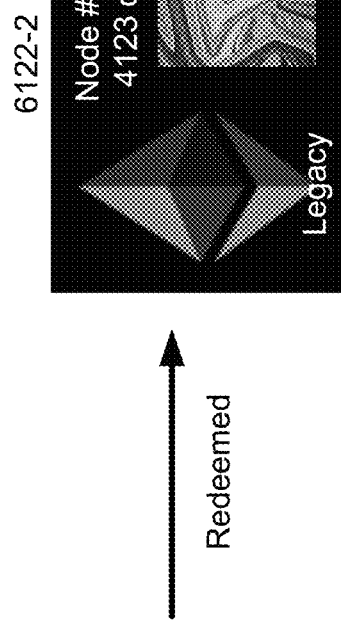
FIG. 61N
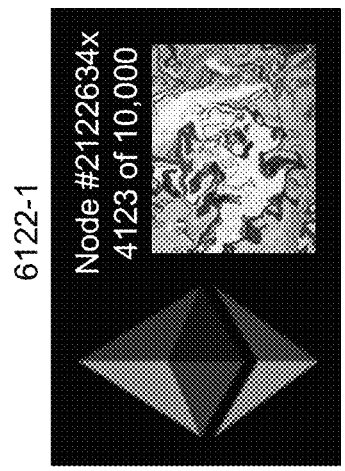

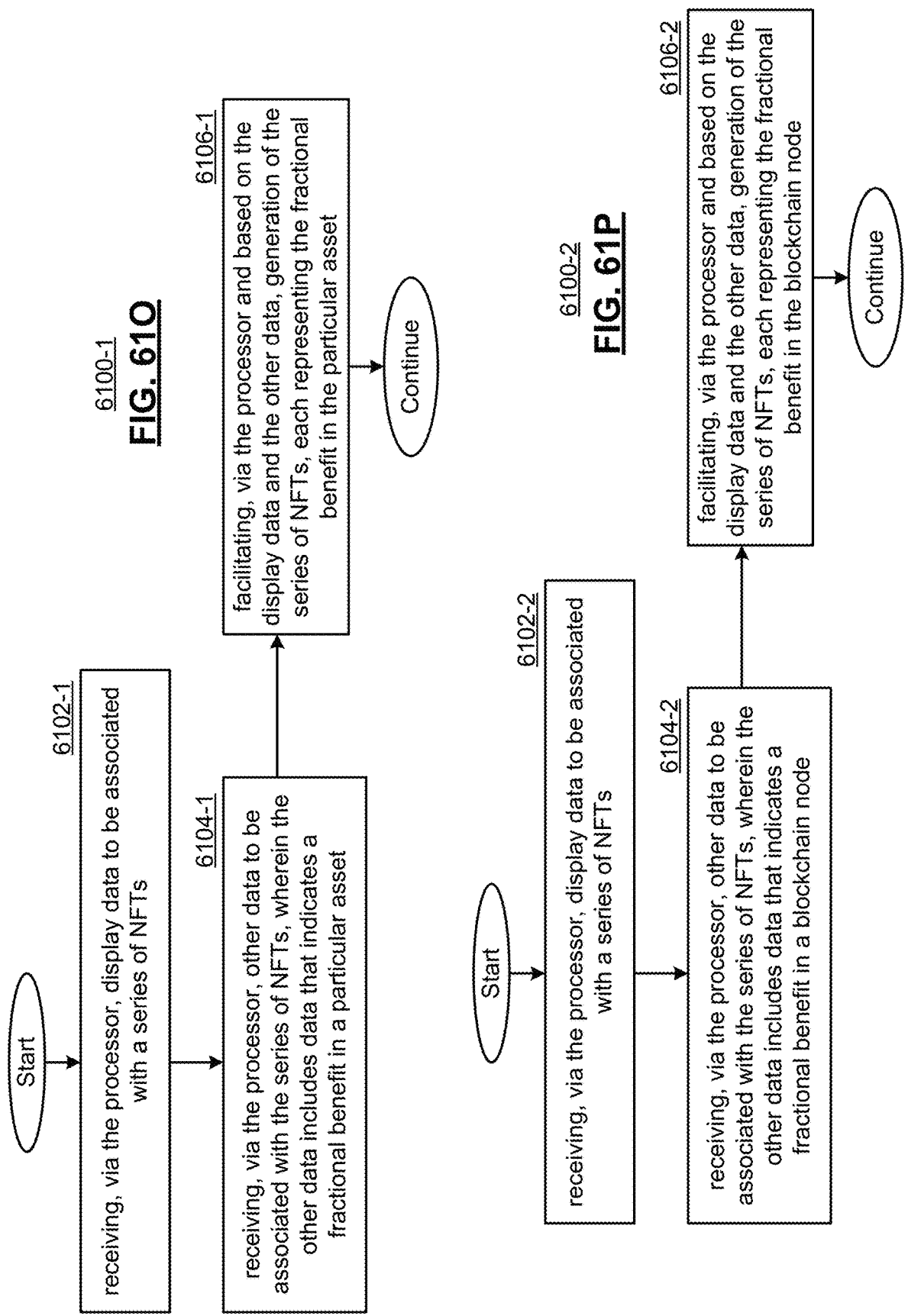

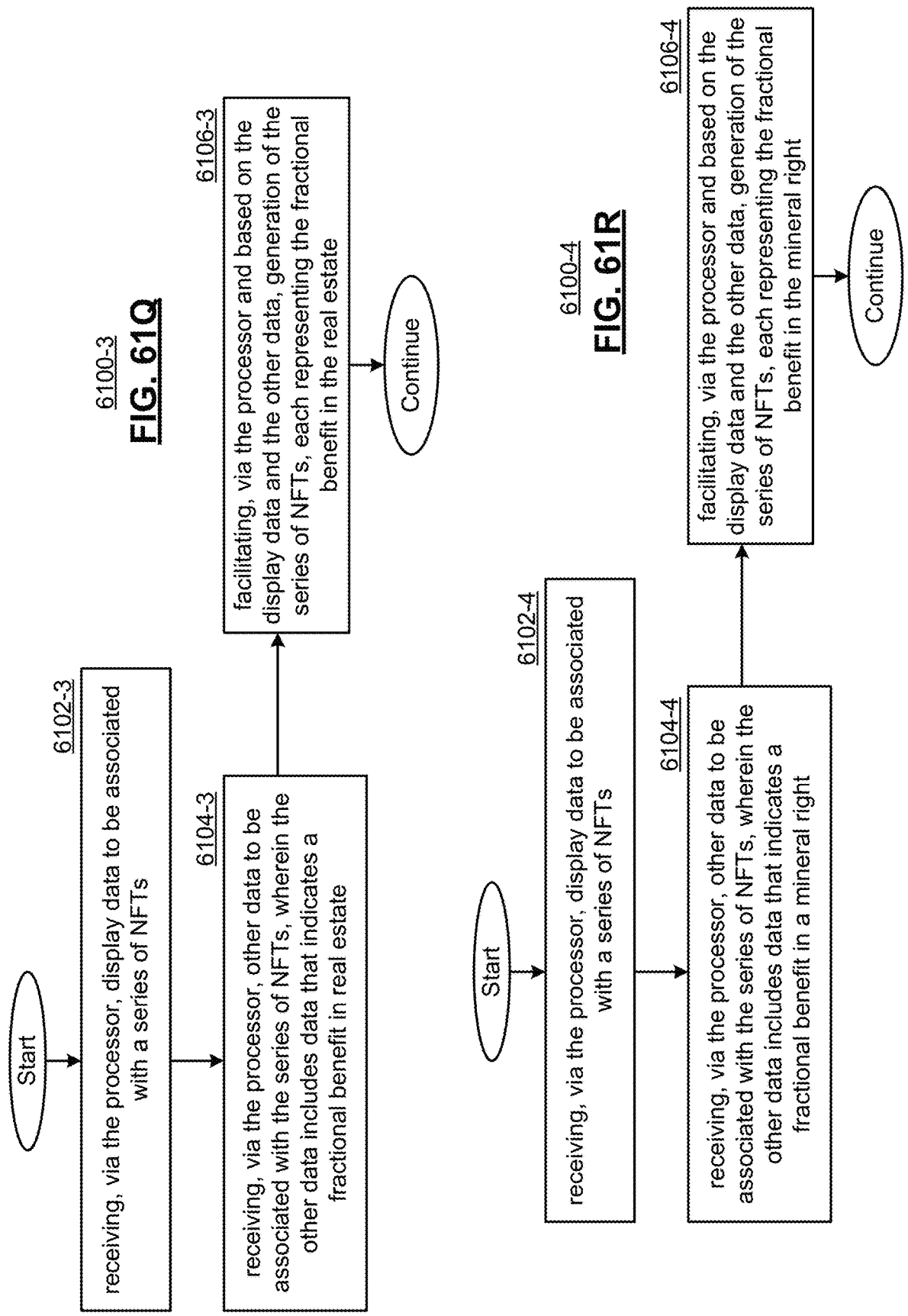

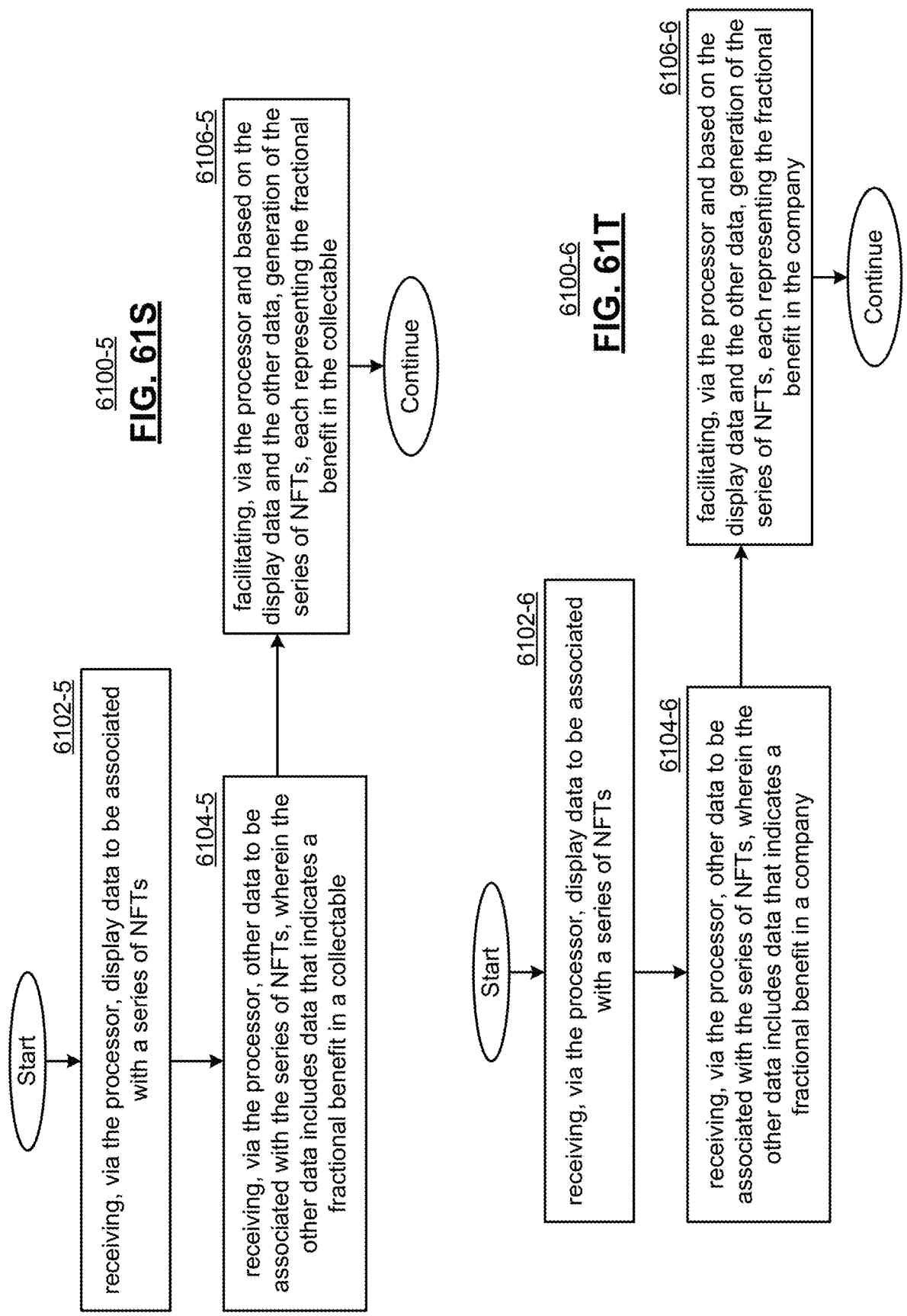

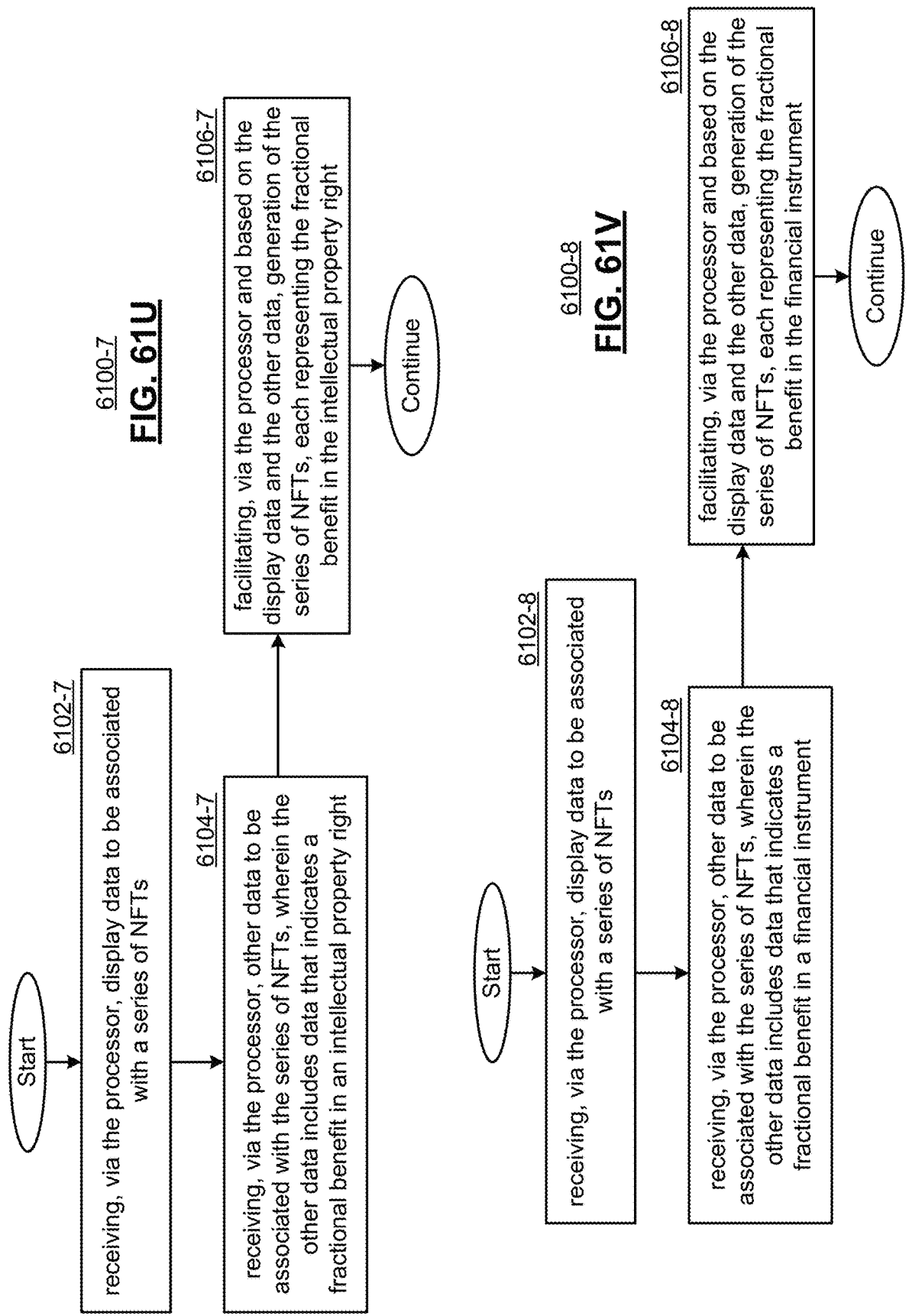

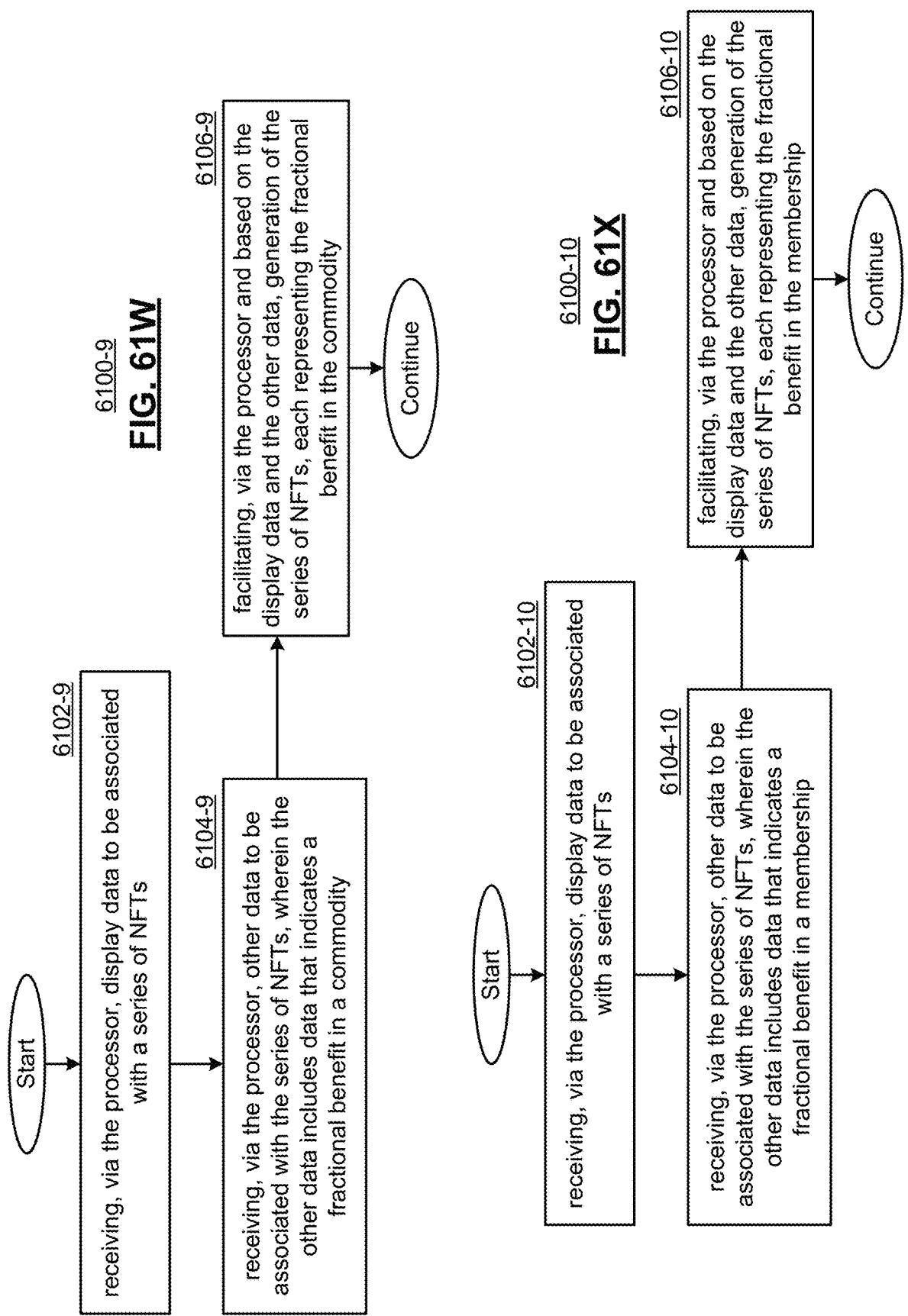

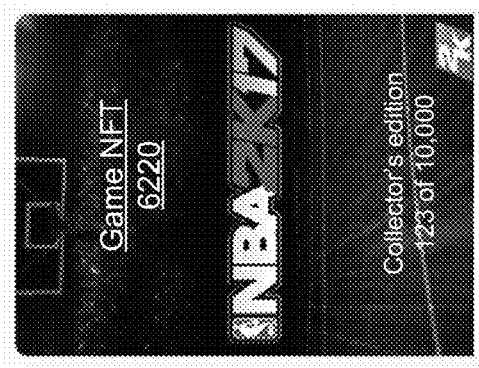
FIG. 62G
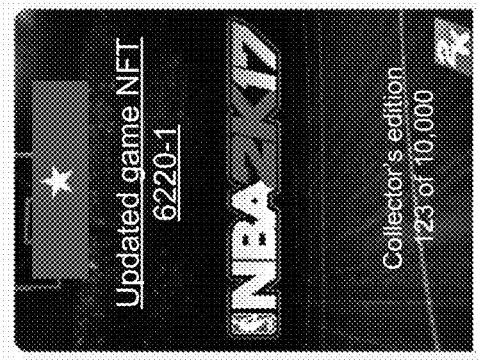
FIG. 62H
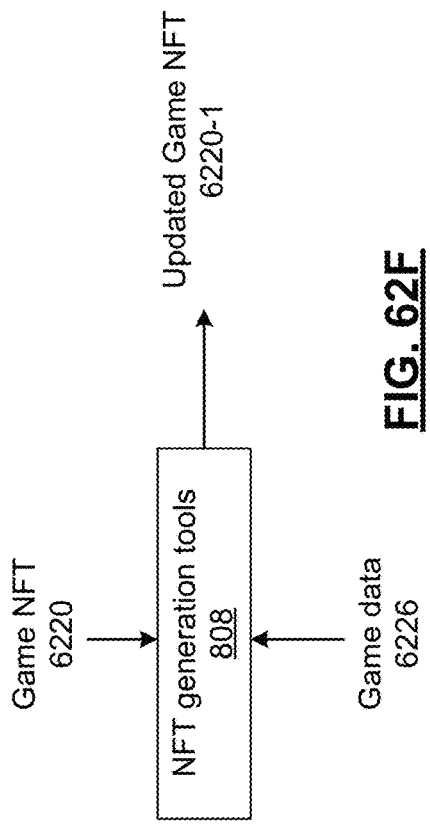
FIG. 62F
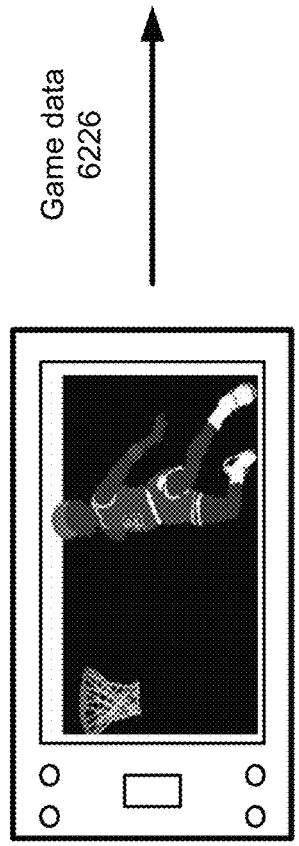

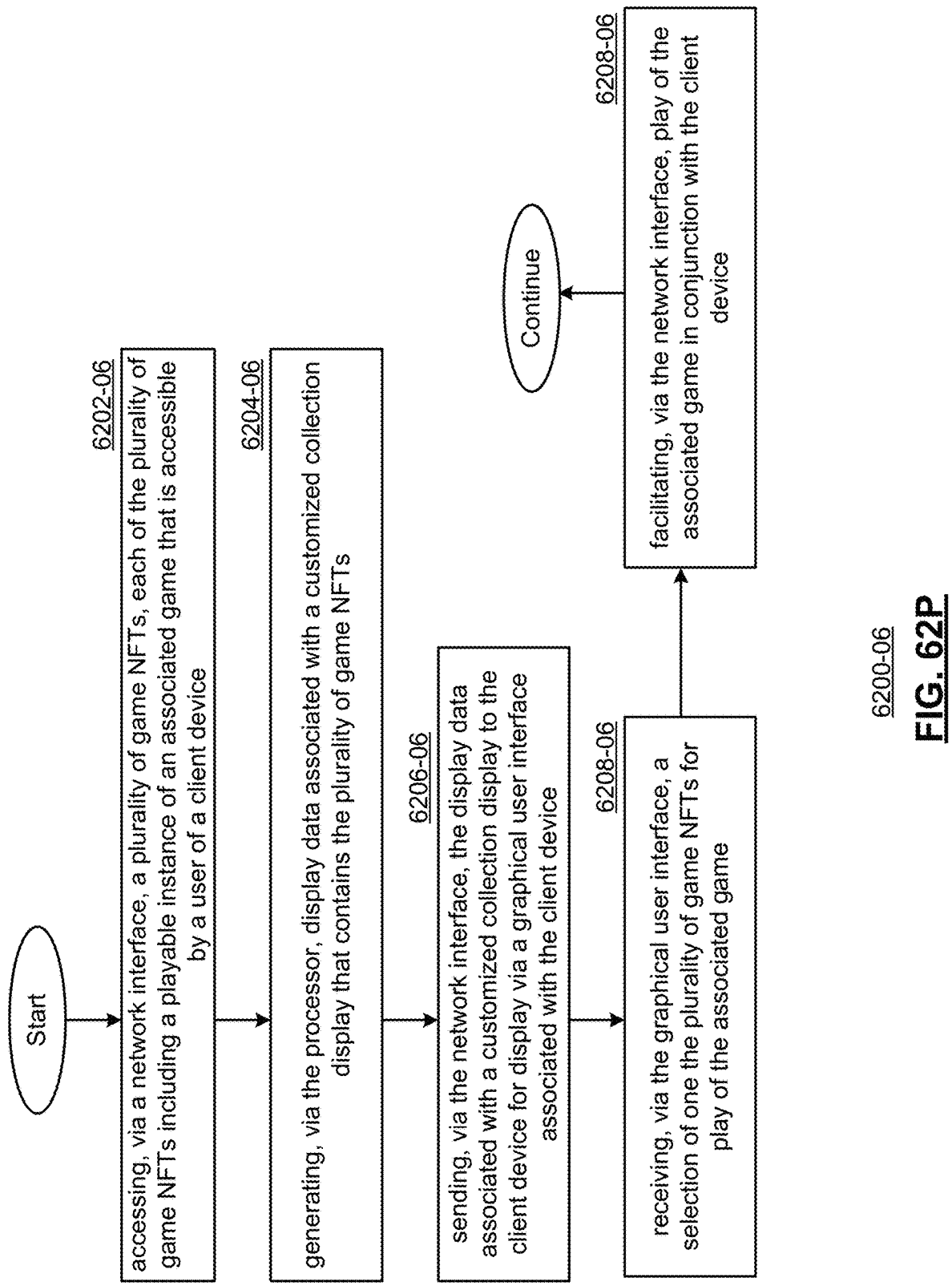

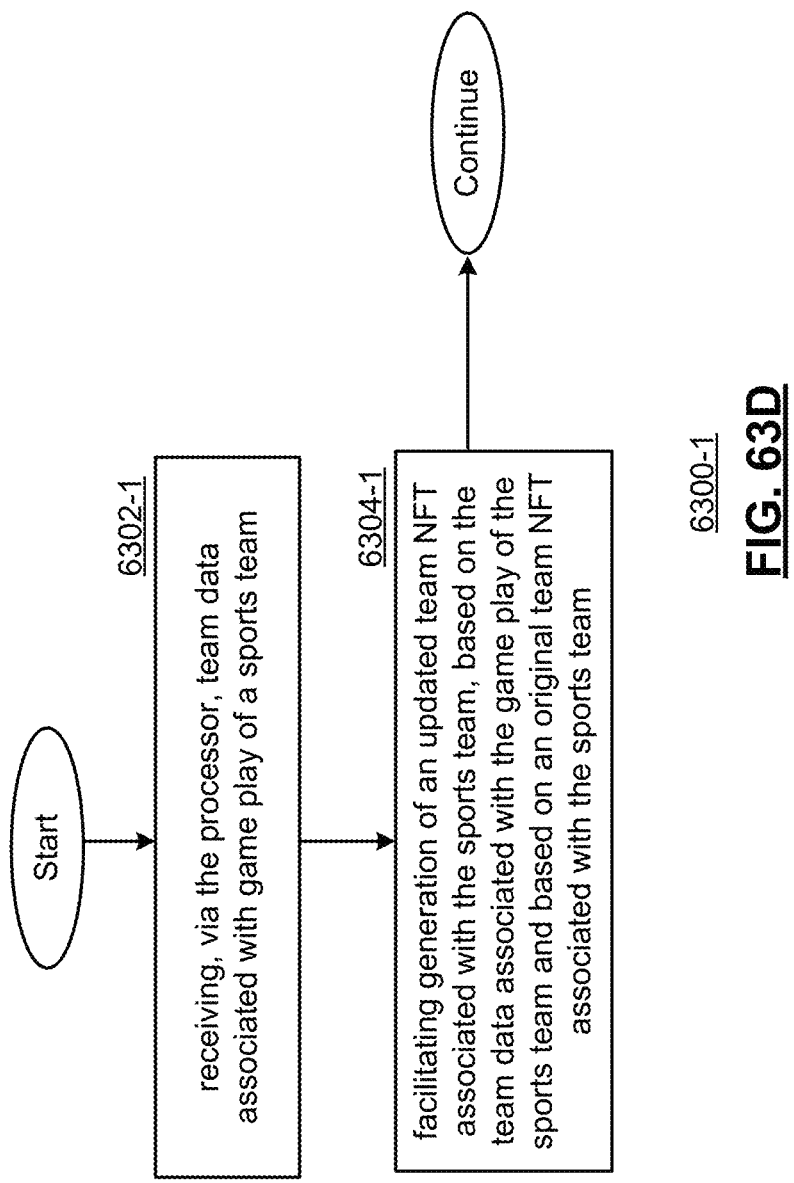

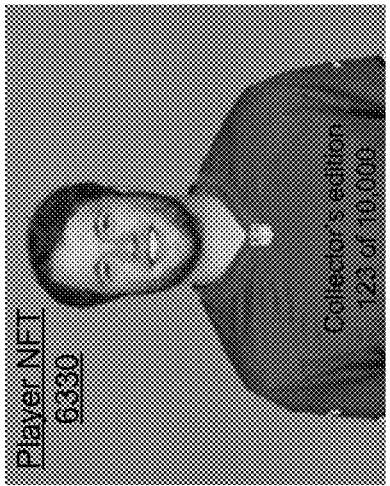
FIG. 63F
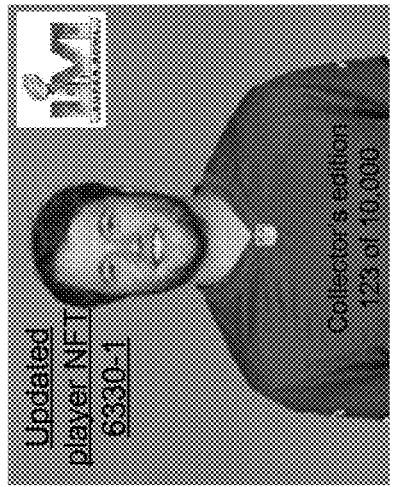
FIG. 63G
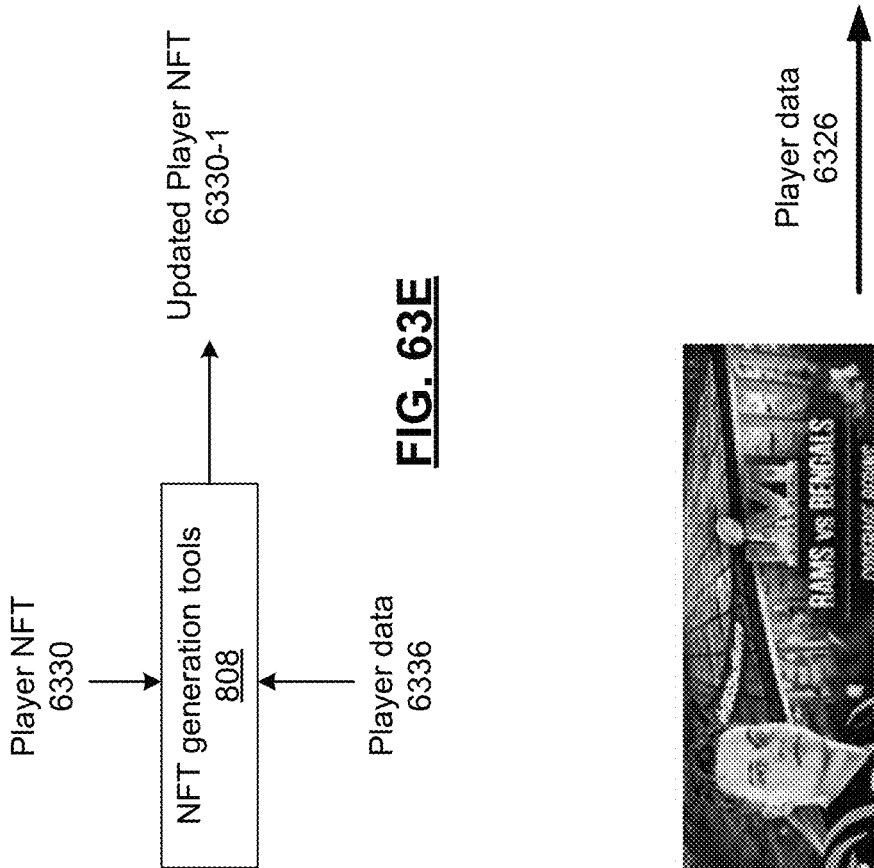
FIG. 63E
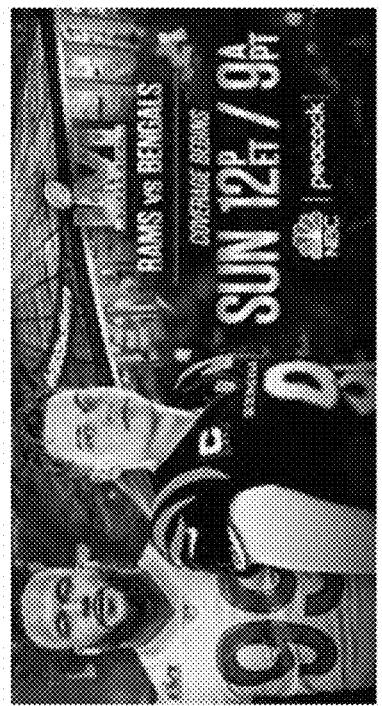

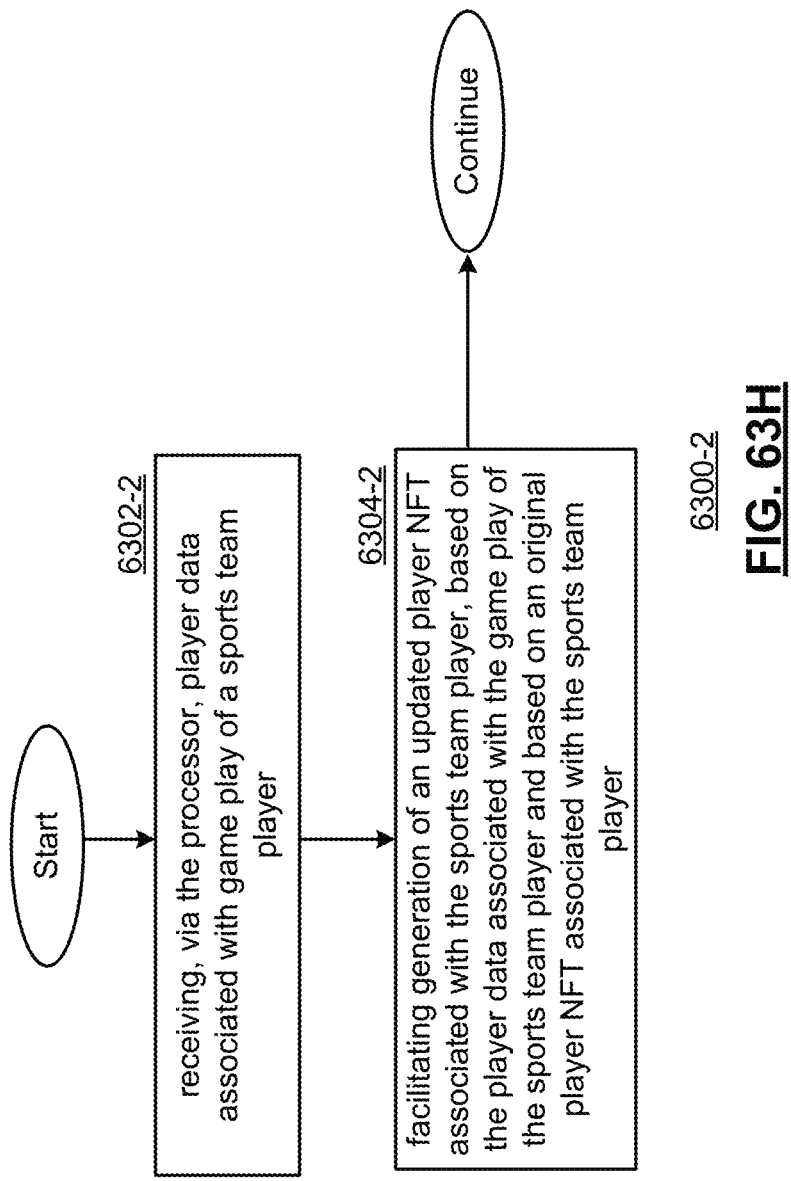

FIG. 63J
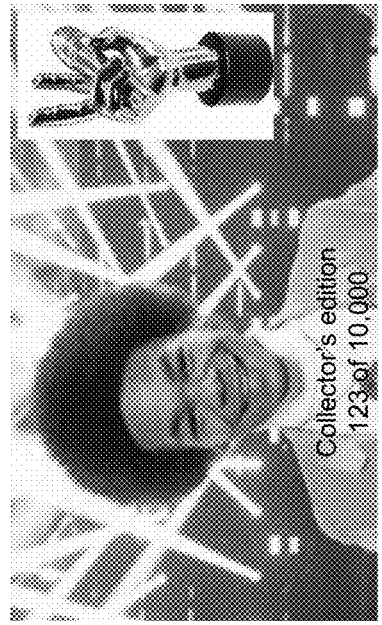
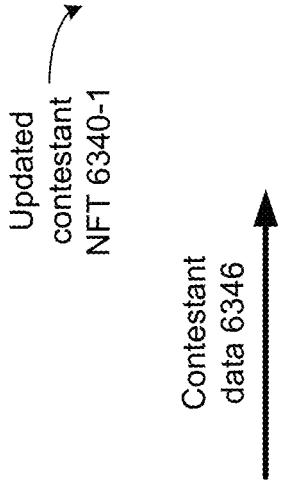
FIG. 63K
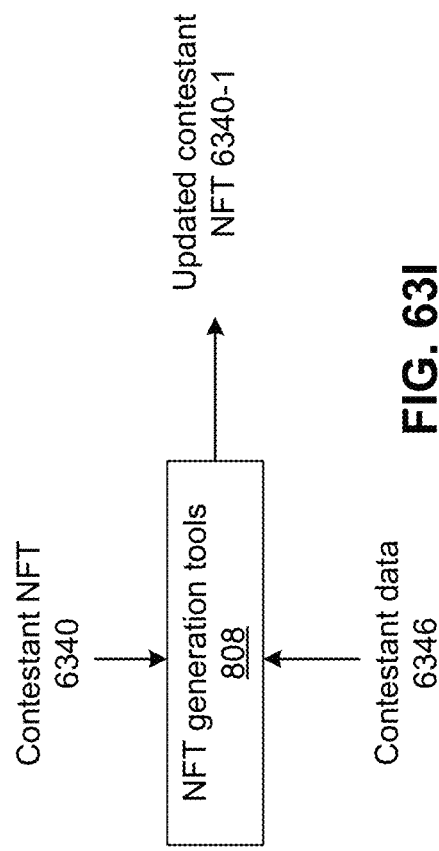
FIG. 63I

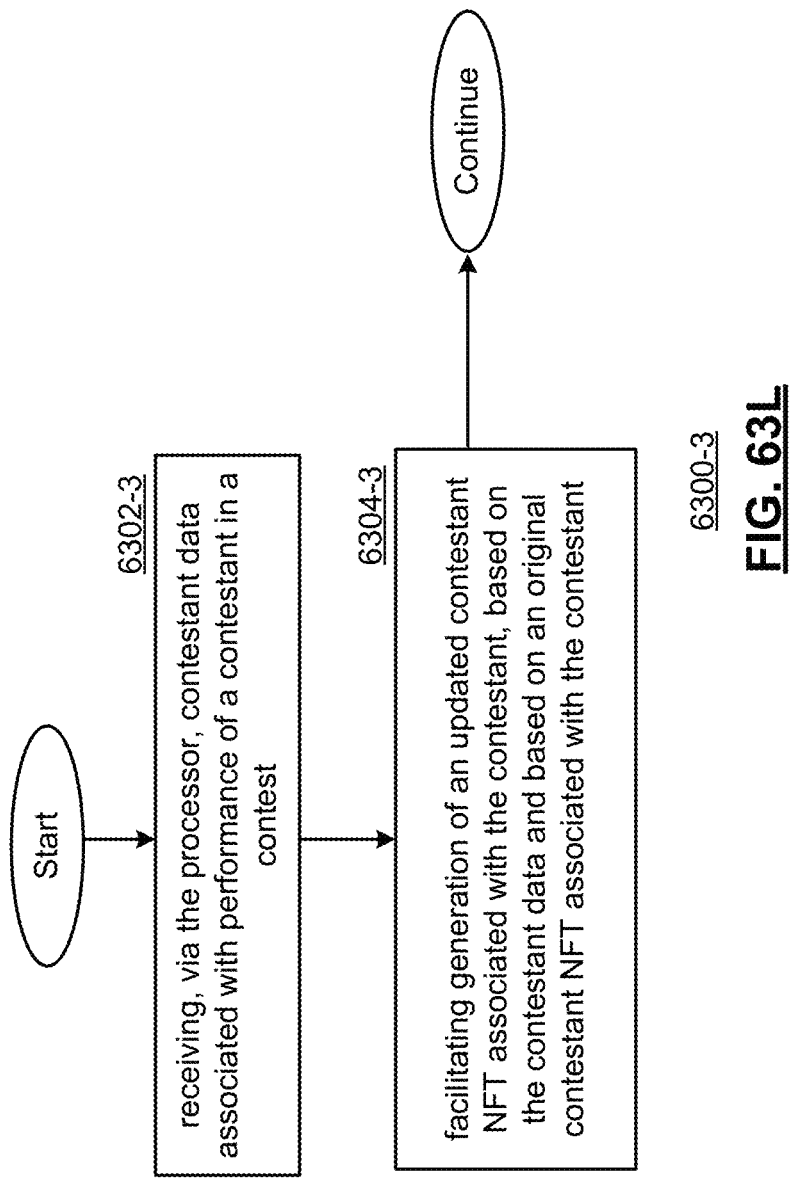

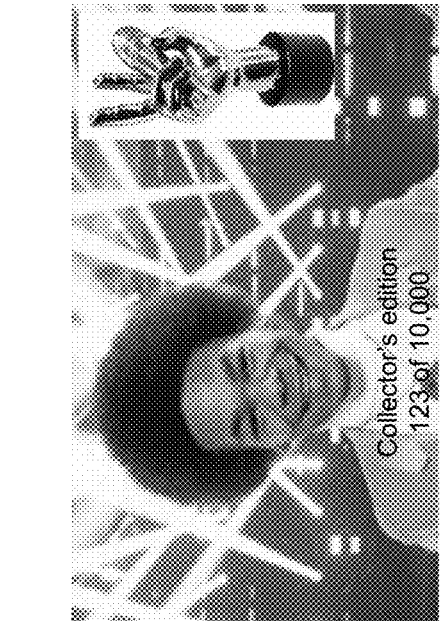
FIG. 63N
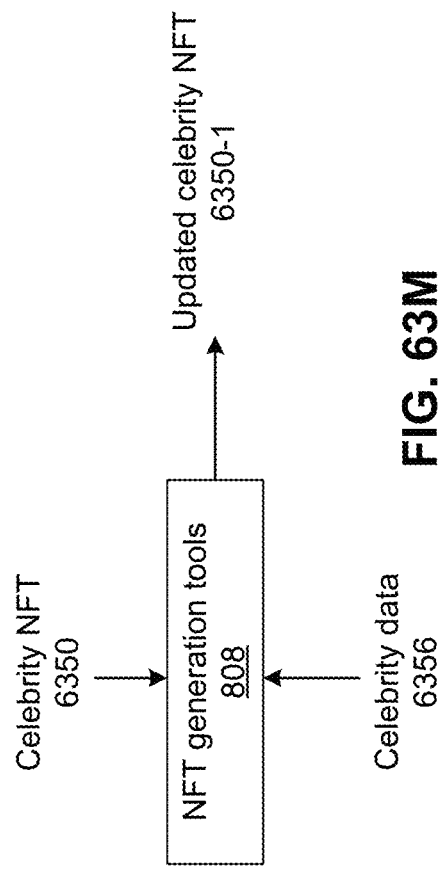
FIG. 63M
FIG. 63O

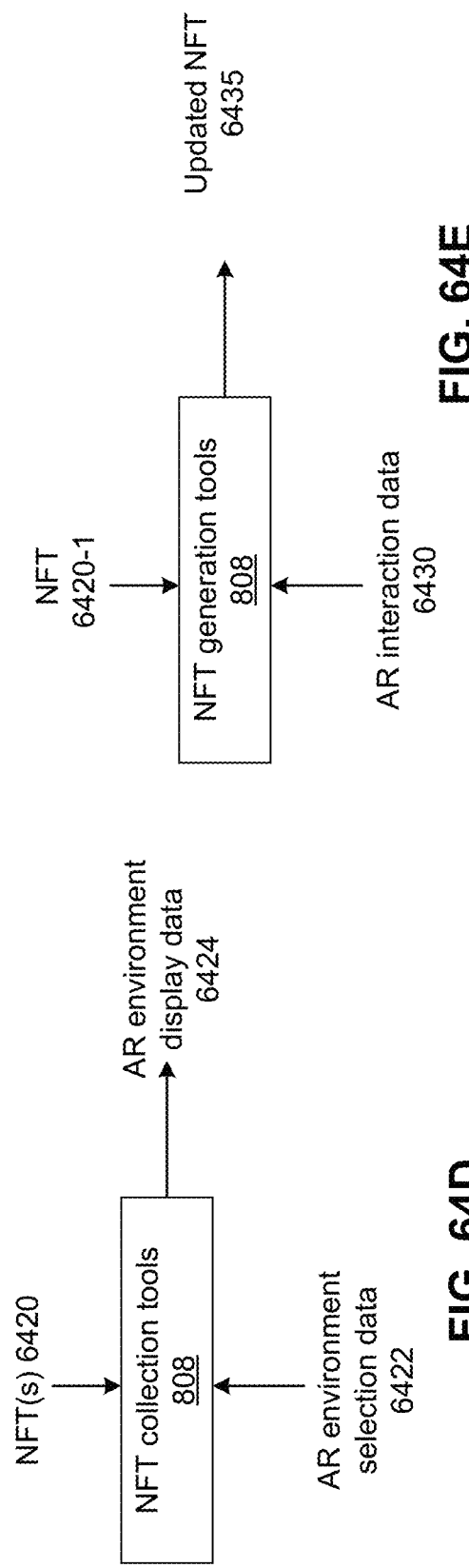
FIG. 64E
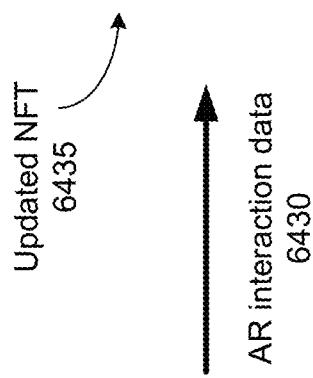
FIG. 64F
FIG. 64D

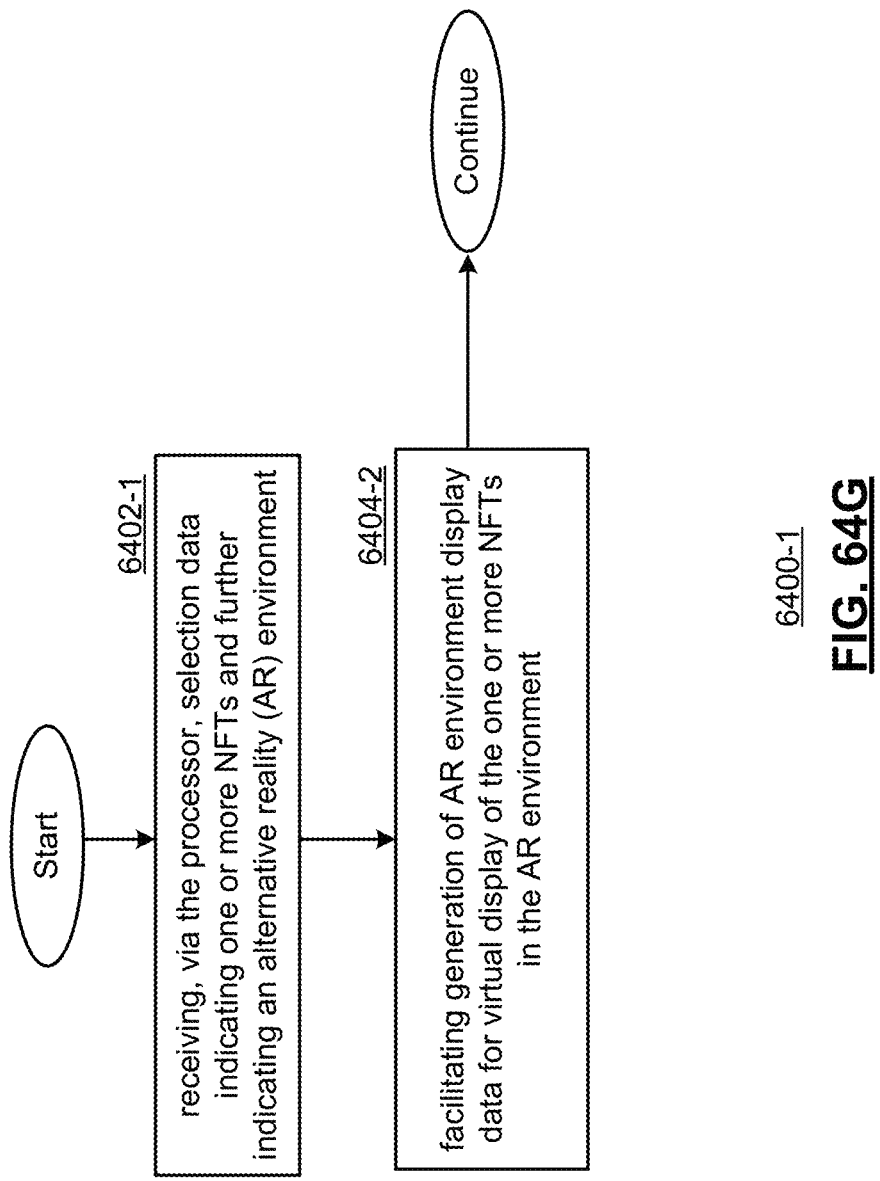

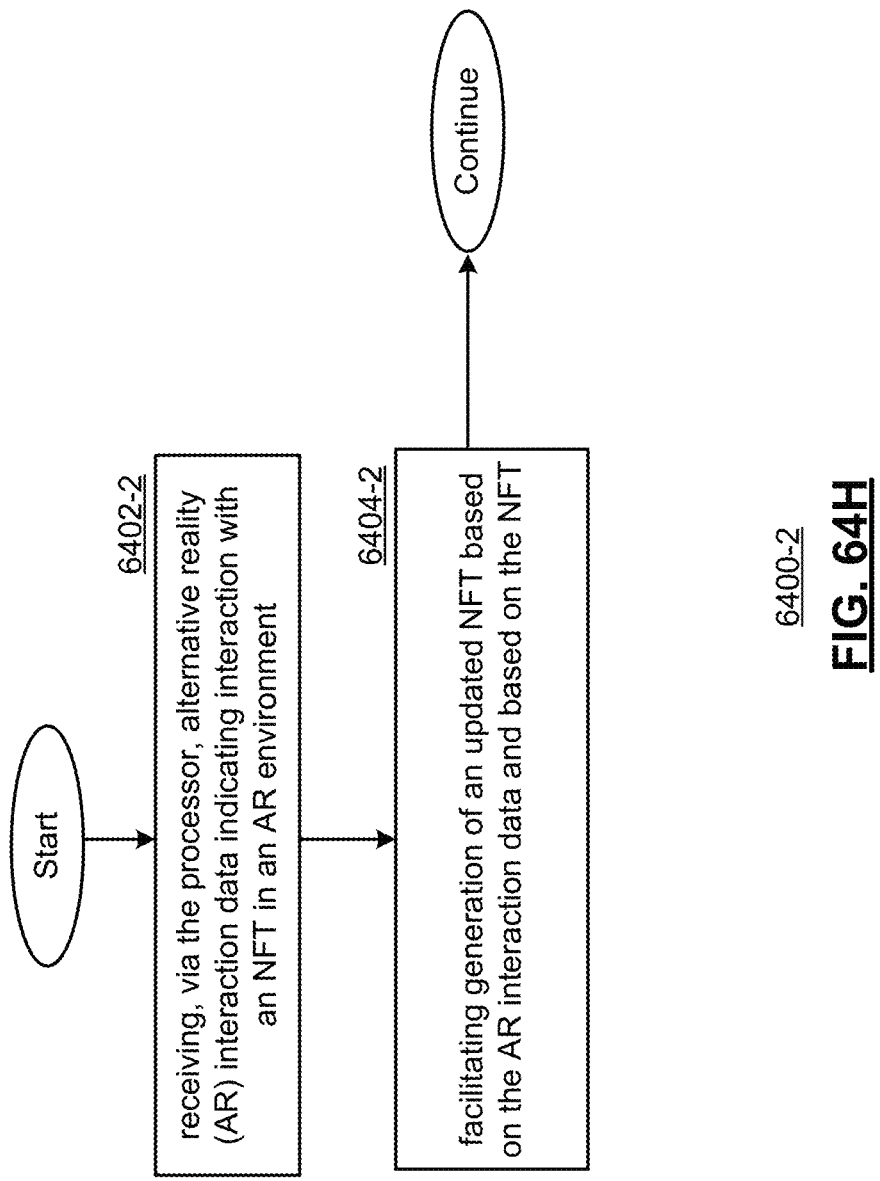

FACILITATING PLAY OF GAMES VIA GENRE CUSTOMIZED DISPLAY OF GAME NFTs

CROSS-REFERENCE TO RELAYED APPLICATIONS

The present U.S. Utility patent application claims priority pursuant to 35 U.S.C. § 120 as a continuation of U.S. Utility application Ser. No. 17/656,084, entitled "FACILITATING PLAY OF GAME NFTS VIA A CLIENT DEVICE", filed Mar. 23, 2022, which claims priority pursuant to 35 U.S.C. § 119(e) to U.S. Provisional Application No. 63/262,536, entitled "NFT COLLECTION PLATFORM AND METHODS FOR USE THEREWITH", filed Oct. 14, 2021; U.S. Provisional Application No. 63/262,762, entitled "NFT COLLECTION PLATFORM FOR PROCESSING NFTS AND DATA AND METHODS FOR USE THEREWITH", filed Oct. 20, 2021; U.S. Provisional Application No. 63/262,858, entitled "NFT COLLECTION PLATFORM FOR PROCESSING NFTS AND DATA AND METHODS FOR USE THEREWITH", filed Oct. 21, 2021; U.S. Provisional Application No. 63/263,844, entitled "NFT COLLECTION PLATFORM FOR RENDERING NFTS IN AN ENVIRONMENT AND METHODS FOR USE THEREWITH", filed Nov. 10, 2021; U.S. Provisional Application No. 63/264,811, entitled "CLIENT DEVICE FOR NFTS AND METHODS FOR USE THEREWITH", filed Dec. 2, 2021; U.S. Provisional Application No. 63/265,754, entitled "REAL ESTATE NFTS AND METHODS FOR USE THEREWITH", filed Dec. 20, 2021; U.S. Provisional Application No. 63/266,478, entitled "AUTHENTICATED LICENSE NFTS AND METHODS FOR USE THEREWITH", filed Jan. 6, 2022; U.S. Provisional Application No. 63/297,394, entitled "GENERATION OF ENHANCEMENT NFTS AND METHODS FOR USE THEREWITH", filed Jan. 7, 2022; U.S. Provisional Application No. 63/302,757, entitled "GENERATION OF NFT GALLERIES AND METHODS FOR USE THEREWITH", filed Jan. 25, 2022; U.S. Provisional Application No. 63/302,768, entitled "ENHANCEMENT OF REAL ESTATE NFTS VIA NFT GALLERIES", filed Jan. 25, 2022; U.S. Provisional Application No. 63/305,559, entitled "AUTHENTICATING NFT TRANSACTIONS VIA CONDITIONAL NFTS", filed Feb. 1, 2022; U.S. Provisional Application No. 63/305,505, entitled "GENERATING A SECURE REAL-TIME NFT REPOSITORY FOR AUTHENTICATING NFT TRANSACTIONS", filed Feb. 1, 2022; U.S. Provisional Application No. 63/306,405, entitled "GENERATING NFTS WITH FRACTIONAL RIGHTS IN ASSETS", filed Feb. 3, 2022; U.S. Provisional Application No. 63/306,412, entitled "GENERATING NFTS WITH FRACTIONAL RIGHTS IN A COLLECTABLE", filed Feb. 3, 2022; U.S. Provisional Application No. 63/307,349, entitled "STREAMING OF VIDEO NFTS TO A CLIENT DEVICE", filed Feb. 7, 2022; U.S. Provisional Application No. 63/308,546, entitled "NODE NFTS WITH TRANSACTION UPDATES", filed Feb. 10, 2022; U.S. Provisional Application No. 63/309,382, entitled "GENERATING PLAYABLE GAME NFTS", filed Feb. 11, 2022; and U.S. Provisional Application No. 63/310,376, entitled "GENERATING UPDATED TEAM NFTS BASED ON TEAM DATA", filed Feb. 15, 2022, all of which are hereby incorporated herein by reference in their entirety and made part of the present U.S. Utility patent application for all purposes.

TECHNICAL FIELD

The present disclosure relates to processing systems and applications used in the collection, generation, display and use of non-fungible tokens (NFTs) or other digital tokens.

BRIEF DESCRIPTION OF THE SEVERAL VIEWS OF THE DRAWINGS

FIG. 3I presents a flowchart representation of an example method.

FIG. 4A presents a flowchart representation of an example method.

FIG. 5A presents a flowchart representation of an example method.

FIG. 6A presents a flowchart representation of an example method.

FIG. 7A presents a flowchart representation of an example method.

FIG. 9A presents a flowchart representation of an example method.

FIG. 10A presents a flowchart representation of an example method.

FIG. 11A presents a flowchart representation of an example method.

FIG. 12B presents a pictorial representations of an example collection NFTs.

FIG. 13A presents a flowchart representation of an example method.

FIG. 14A presents a flowchart representation of an example method.

FIG. 16B presents a flowchart representation of an example method.

FIG. 18B presents a flowchart representation of an example method.

FIG. 19B presents a flowchart representation of an example method.

FIG. 20B presents a flowchart representation of an example method.

FIG. 21C presents a flowchart representation of an example method.

FIG. 22B presents a flowchart representation of an example method.

FIG. 23C presents a flowchart representation of an example method.

FIG. 24A presents a block diagram/flow representation of an example of NFT generation.

FIG. 24B presents a flowchart representation of an example method.

FIG. 25A presents a block diagram/flow representation of an example of NFT generation.

FIG. 25B presents a flowchart representation of an example method.

FIG. 26B presents a flowchart representation of an example method.

FIG. 27A presents a block diagram/flow representation of an example of NFT generation.

FIG. 27B presents a flowchart representation of an example method.

FIG. 28A presents a block diagram representation of an example system.

FIG. 28E presents a flowchart representation of an example method.

FIG. 29B presents a flowchart representation of an example method.

FIG. 30E presents a flowchart representation of an example method.

FIG. 31D presents a flowchart representation of an example method.

FIG. 32B presents a flowchart representation of an example method.

FIG. 33E presents a flowchart representation of an example method.

FIG. 35F presents a flowchart representation of an example method.

FIG. 36A presents a block diagram/flow representation of an example of NFT generation.

FIG. 36B presents a pictorial representation of an example image NFT.

FIG. 36C presents a pictorial representation of an example data NFT.

FIG. 36D presents a pictorial representation of an example game character NFT.

FIG. 36E presents a pictorial representation of an example client device with screen display.

FIG. 41I presents a flowchart representation of an example method.

Figure 42A:
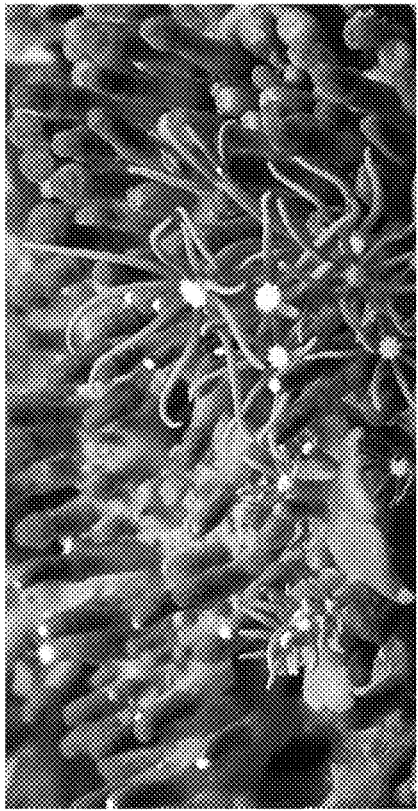

FIG. 42A presents a pictorial representation of an example screen display.

Figure 42B:
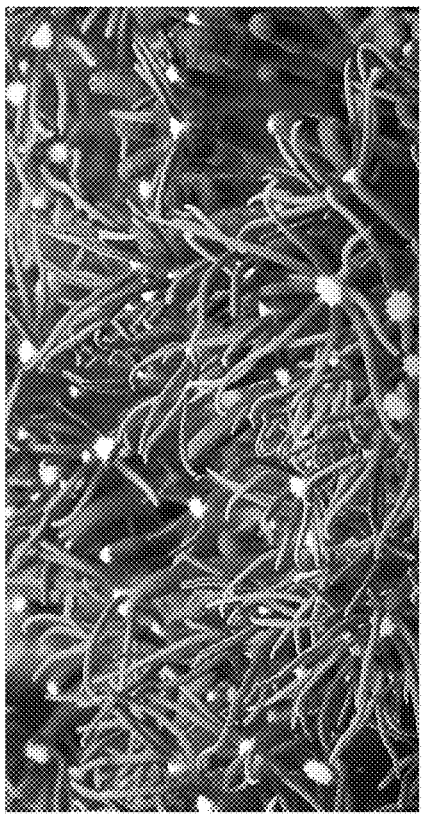

FIG. 42B presents a pictorial representation of an example screen display.

Figure 42C:
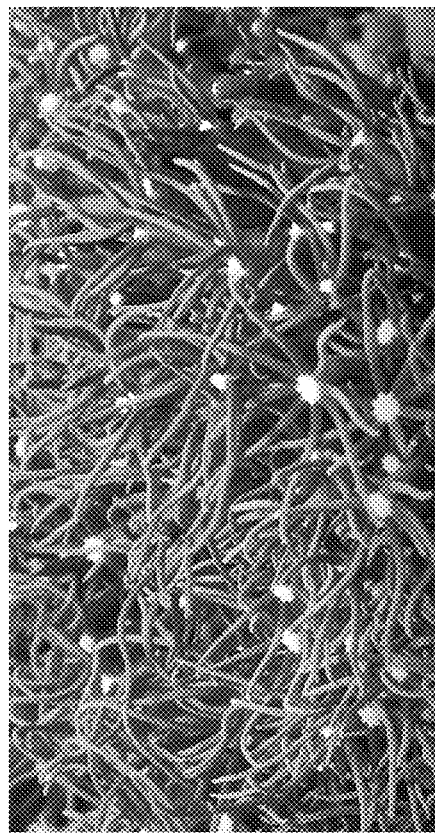

FIG. 42C presents a pictorial representation of an example screen display.

Figure 42D:
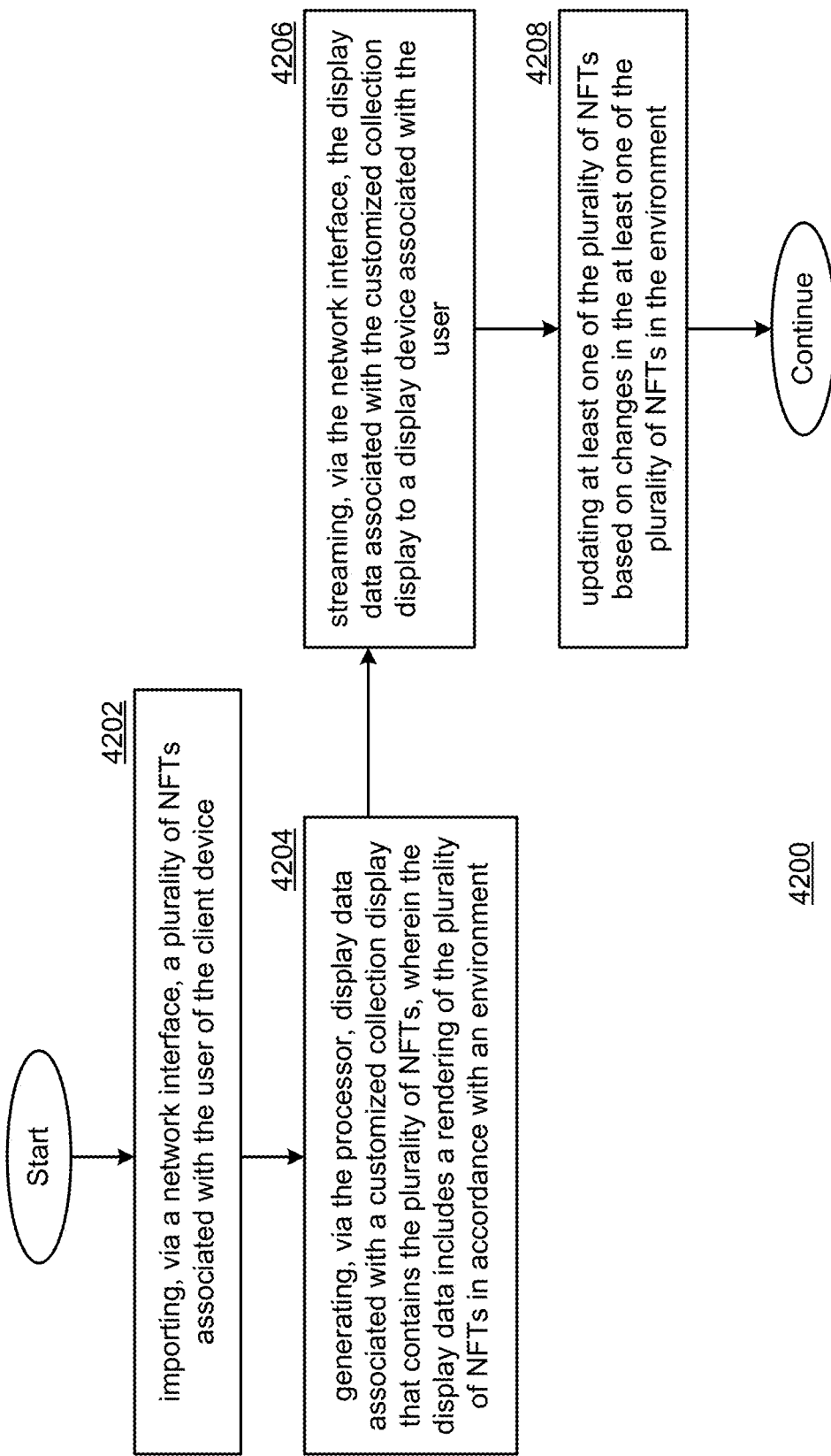

FIG. 42D presents a flowchart representation of an example method.

FIG. 43A presents a block diagram/flow representation of an example of display data generation.

FIG. 43B presents a block diagram/flow representation of an example of display data generation.

Figure 43D:
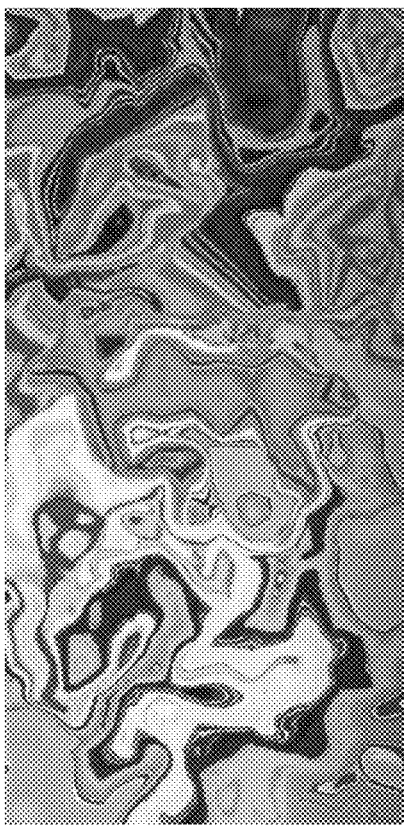
Figure 43C:

FIG. 43C presents a pictorial representation of an example screen display.

FIG. 43D presents a pictorial representation of an example screen display.

Figure 43E:

FIG. 43E presents a pictorial representation of an example screen display.

FIG. 43F presents a flowchart representation of an example method.

FIGS. 43G-43J present graphical representations of display parameter functions.

Figure 43L:
Figure 43K:
Figure 43M:

FIGS. 43K-43M present pictorial representations of example screen displays.

Figure 43O:
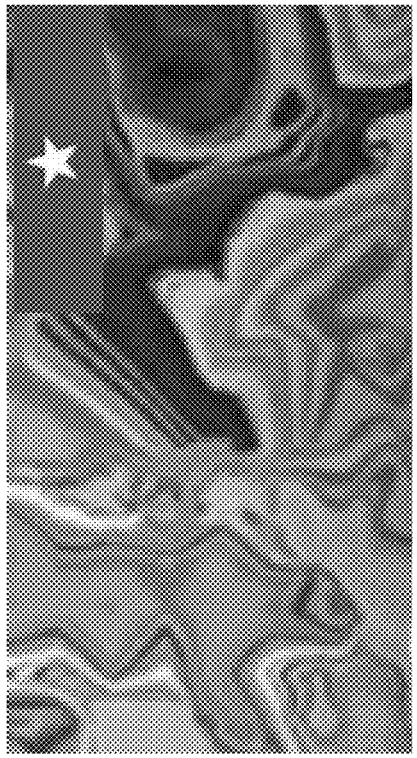
Figure 43P:
Figure 43N:

FIGS. 43N-43P present pictorial representations of example screen displays.

Figure 43Q:
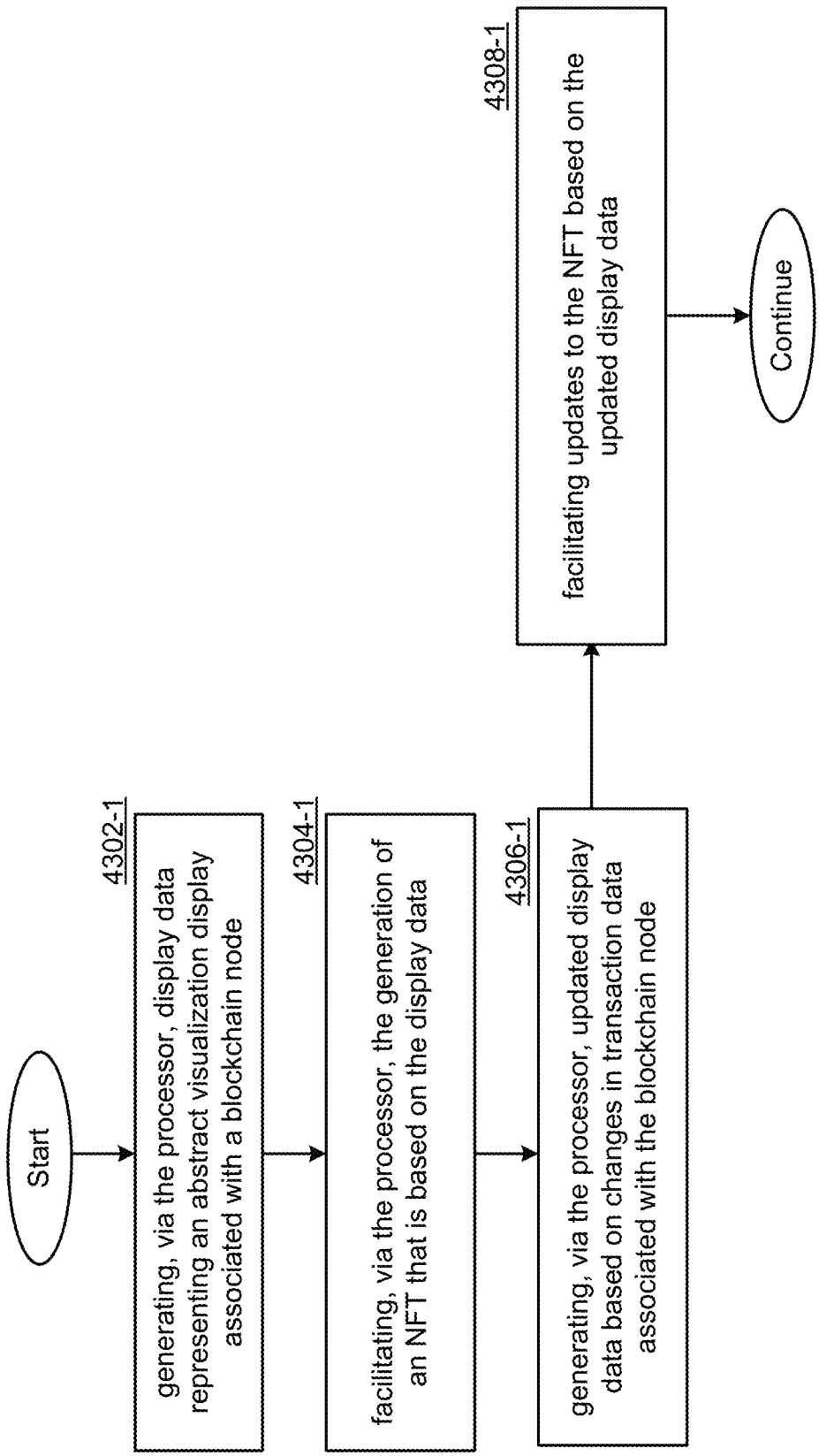

FIG. 43Q presents a flowchart representation of an example method.

FIG. 43R presents a flowchart representation of an example method.

Figure 43S:
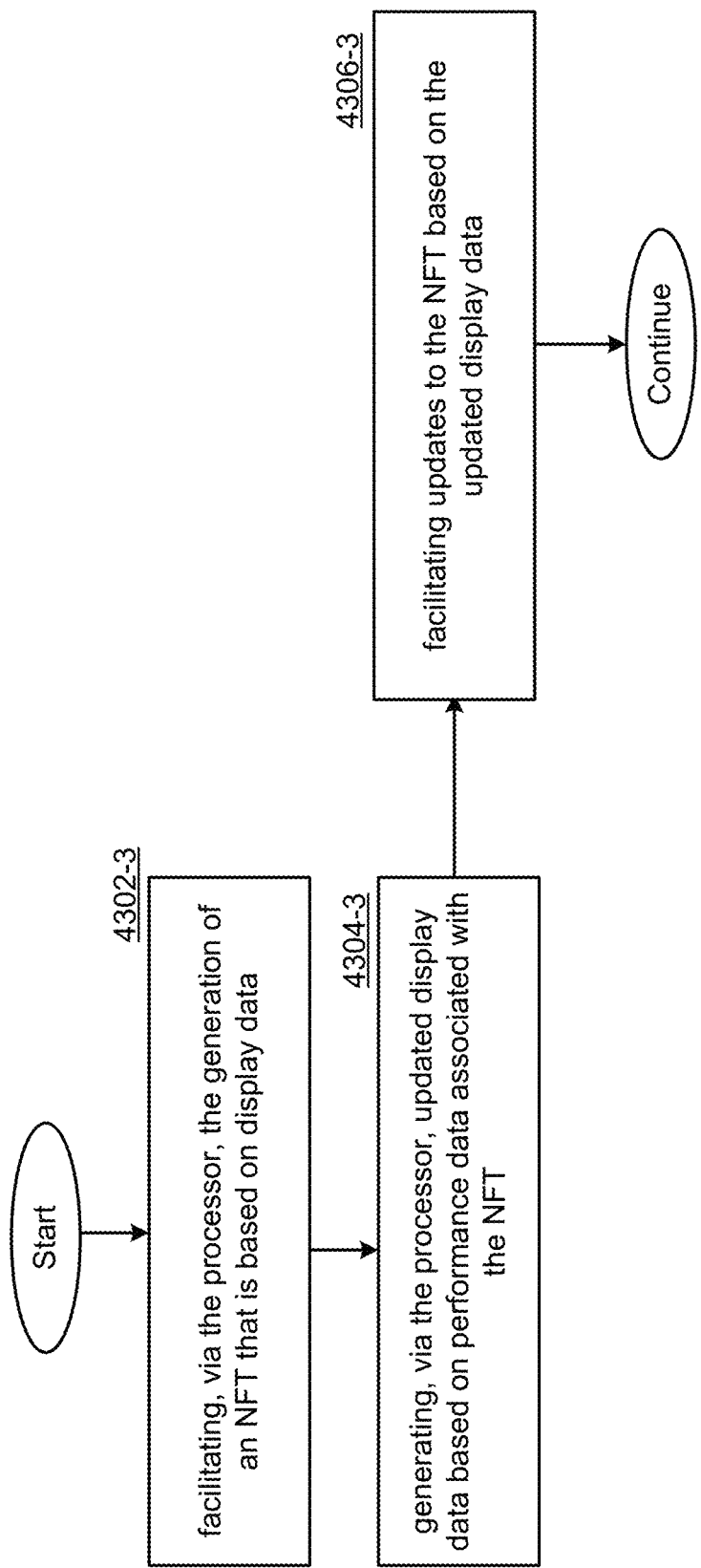

FIG. 43S presents a flowchart representation of an example method.

Figure 44A:
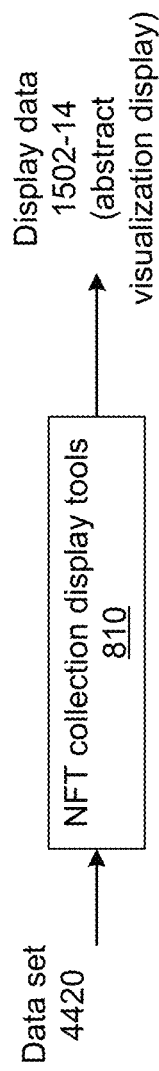

FIG. 44A presents a block diagram/flow representation of an example of display data generation.

Figure 44B:
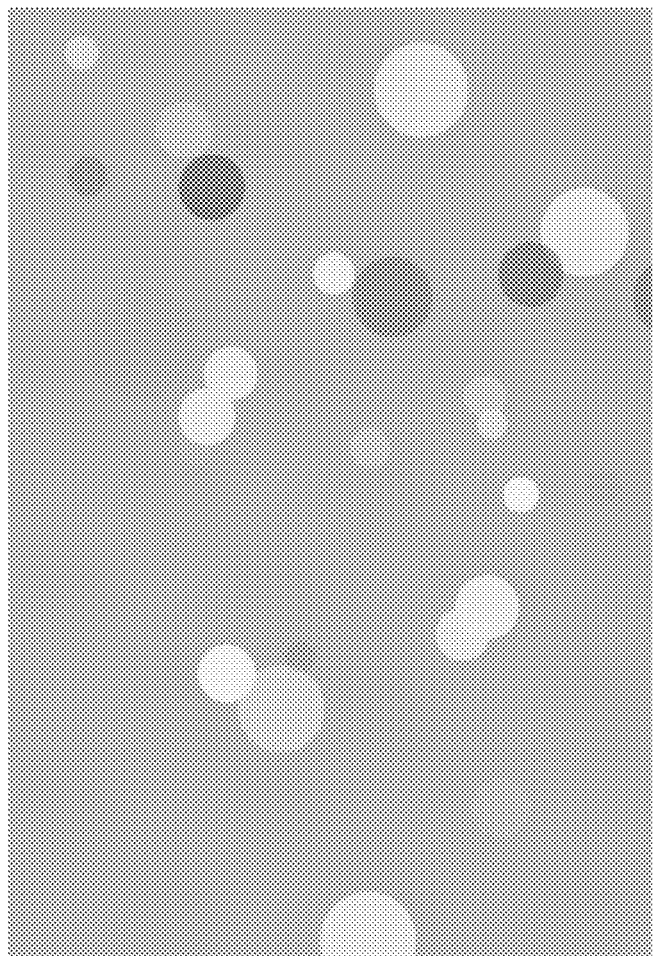

FIG. 44B presents a pictorial representation of an example screen display.

Figure 44C:
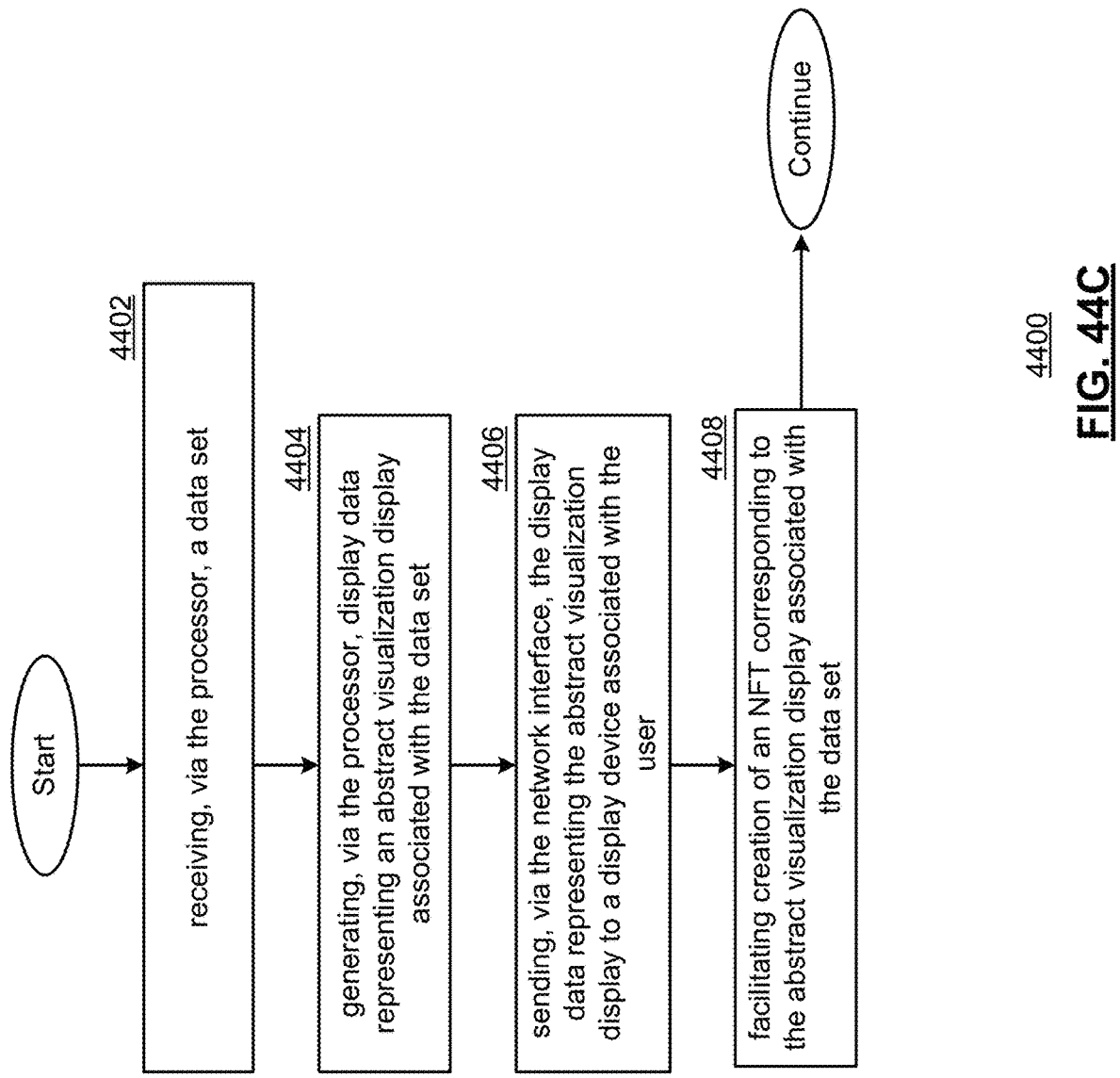

FIG. 44C presents a flowchart representation of an example method.

Figure 45A:
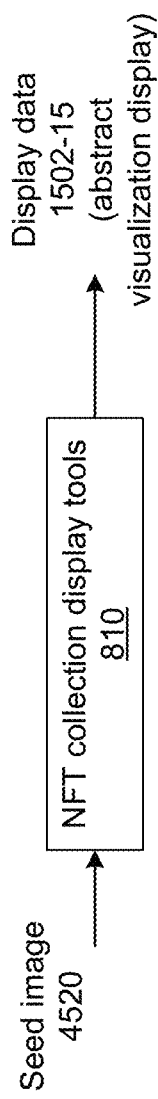

FIG. 45A presents a block diagram/flow representation of an example of display data generation.

Figure 45B:
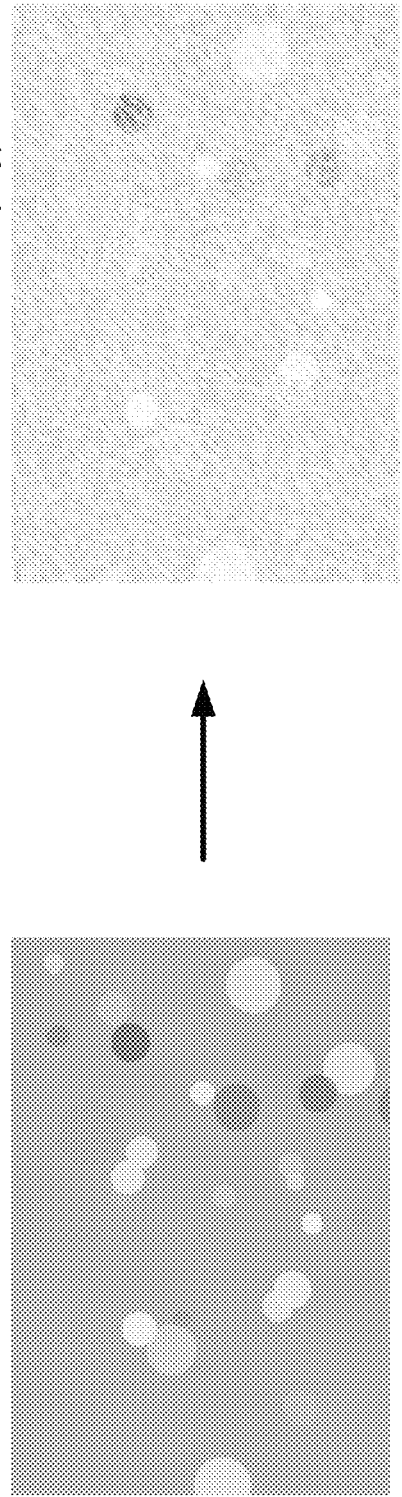

FIG. 45B presents a block flow representation of an example of display data generation.

FIG. 45C presents a flowchart representation of an example method.

FIG. 46A presents a block diagram/flow representation of an example of NFT generation.

FIG. 46B presents a pictorial representation of an example derivative NFT.

FIG. 46C presents a pictorial representation of an example client device.

FIG. 46D presents a block diagram/flow representation of an example of NFT generation.

Figure 46E:
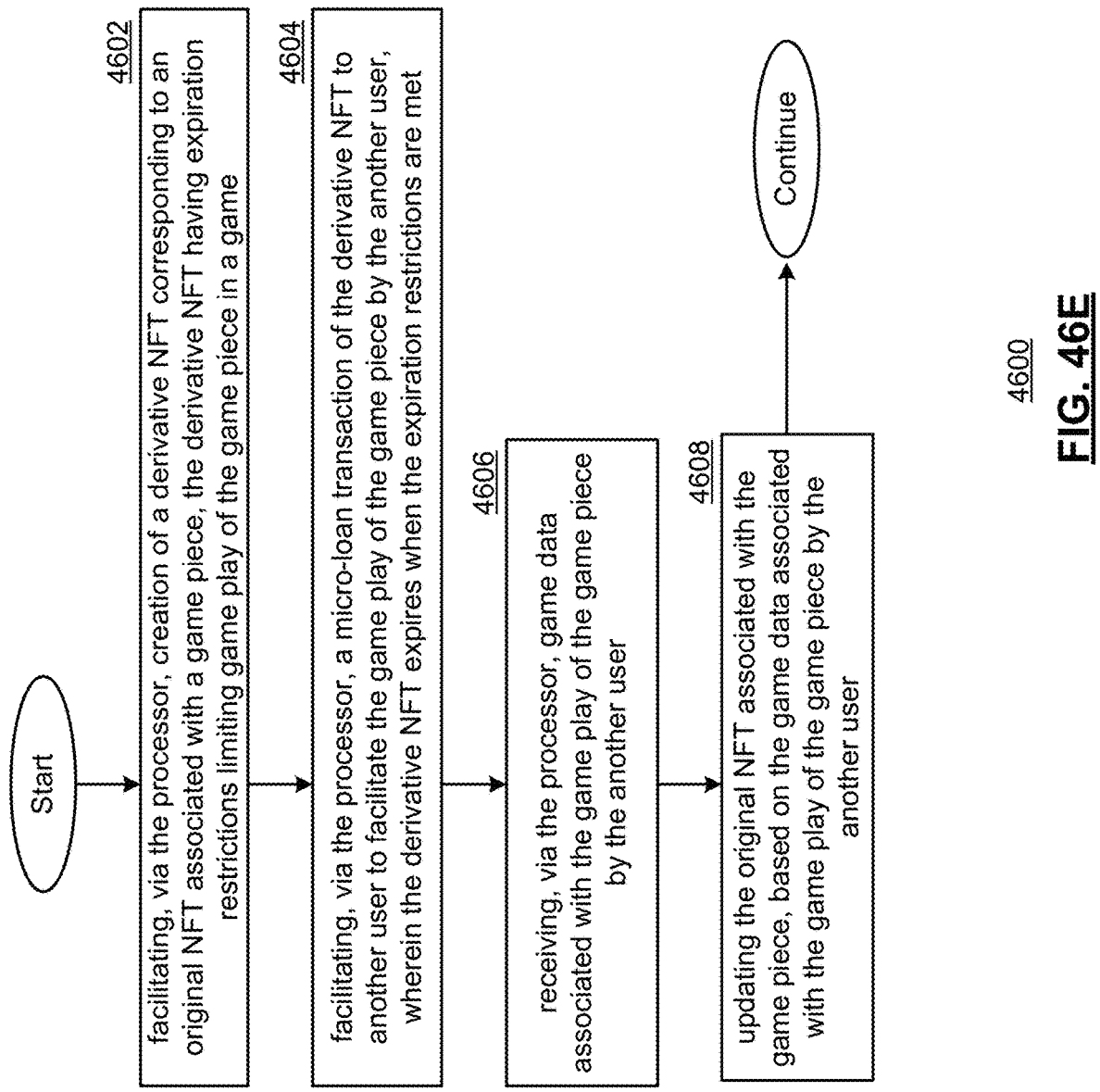

FIG. 46E presents a flowchart representation of an example method.

Figure 47B:
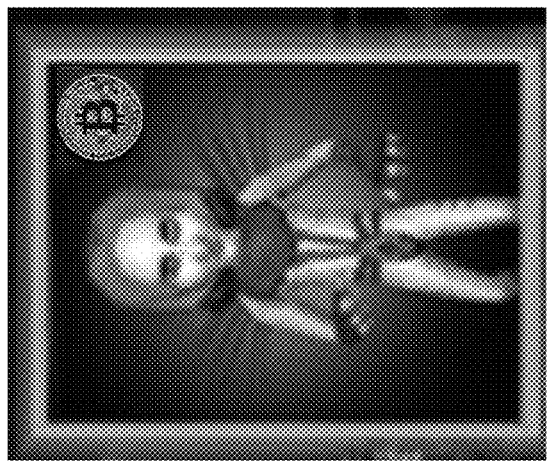
Figure 47C:
Figure 47A:
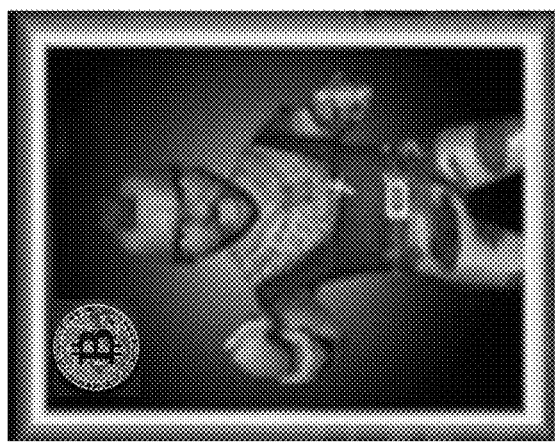

FIG. 47A presents a pictorial representation of an example NFT.

FIG. 47B presents a pictorial representation of an example NFT.

FIG. 47C presents a pictorial representation of an example screen display.

FIG. 47D presents a flowchart representation of an example method.

Figure 48B:
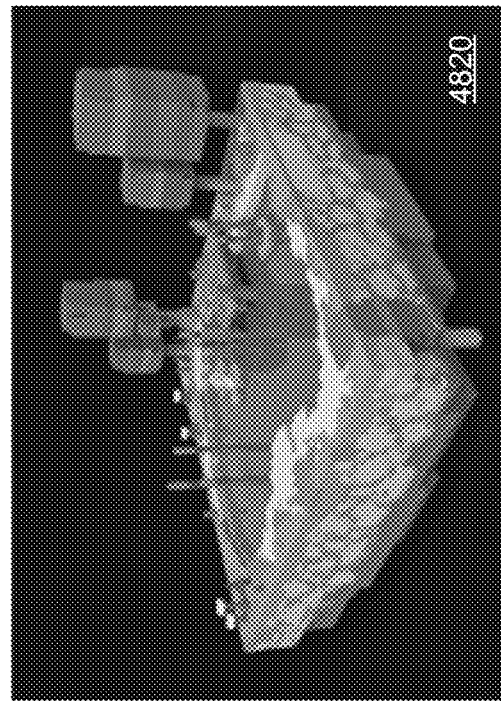
Figure 48C:
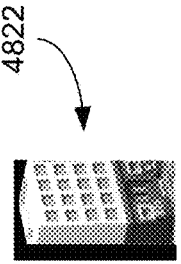
Figure 48A:
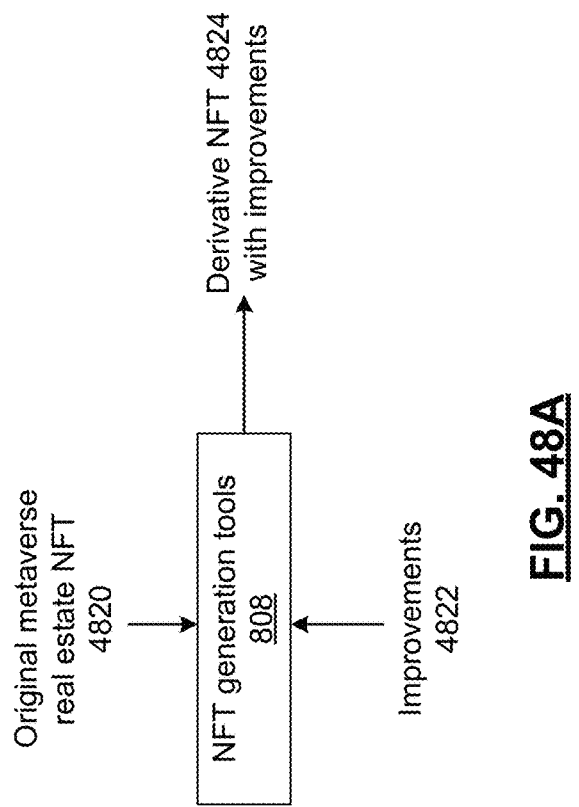

FIG. 48A presents a block diagram/flow representation of an example of NFT generation.

FIG. 48B presents a pictorial representation of an example NFT.

FIG. 48C presents a pictorial representation of an example improvement.

Figure 48D:
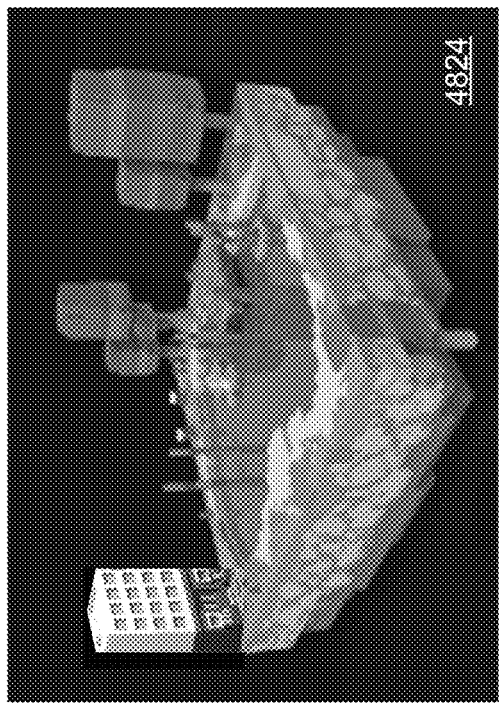

FIG. 48D presents a pictorial representation of an example NFT.

FIG. 48E presents a flowchart representation of an example method.

FIG. 49A presents a block diagram/flow representation of an example of NFT generation.

FIGS. 49B-49J present a pictorial representations of example NFTs.

FIG. 49K presents a flowchart representation of an example method.

Figure 49E:
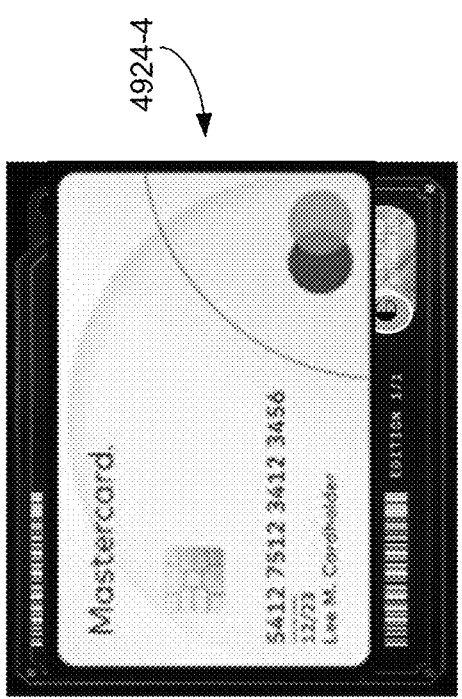
Figure 49F:
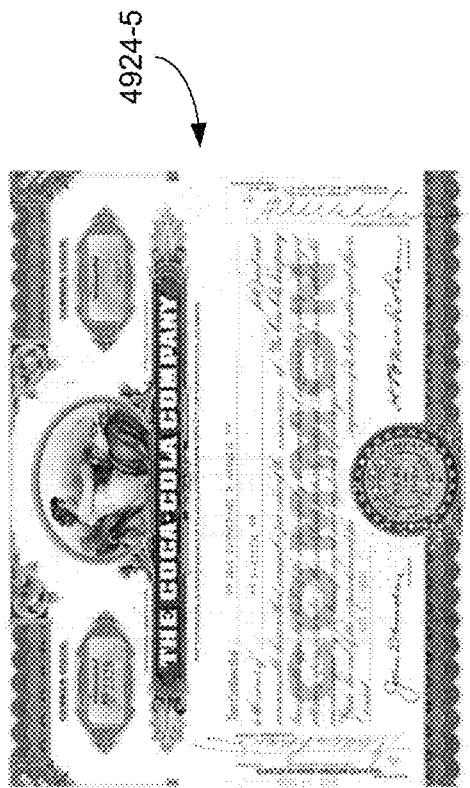
Figure 49G:
Figure 49H:
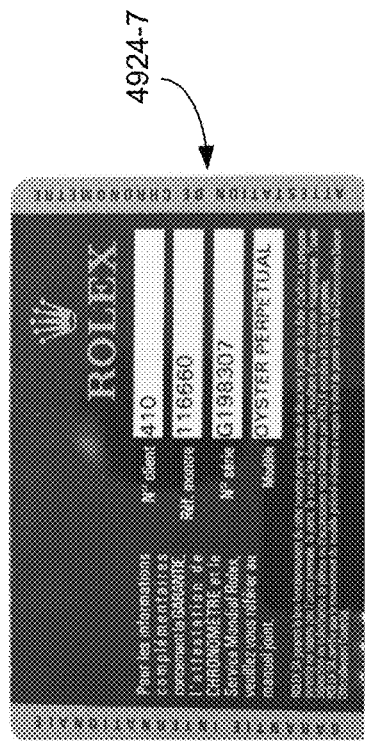
Figure 49I:
Figure 49J:
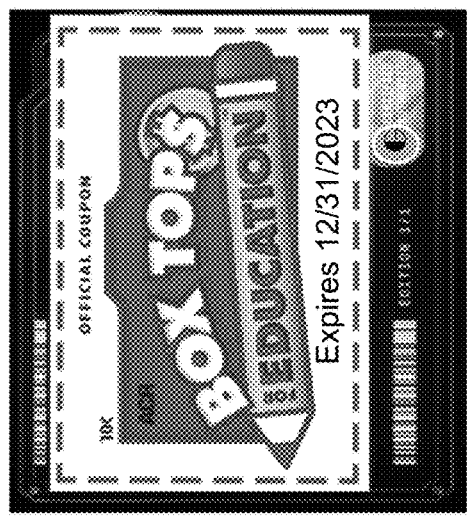
Figure 49L:
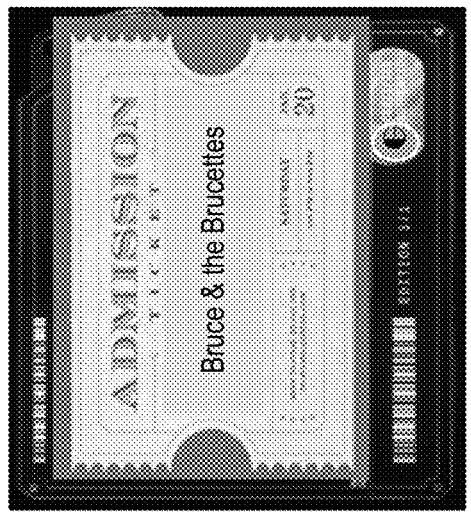
Figure 49M:
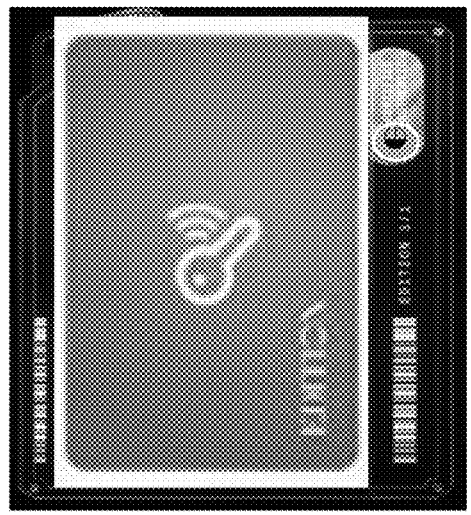

FIGS. 49L-49M present a pictorial representations of example NFTs.

FIG. 49N presents a flowchart representation of an example method.

FIG. 49O presents a flowchart representation of an example method.

FIG. 49P presents a flowchart representation of an example method.

FIG. 49Q presents a flowchart representation of an example method.

FIG. 49R presents a flowchart representation of an example method.

Figure 49S:
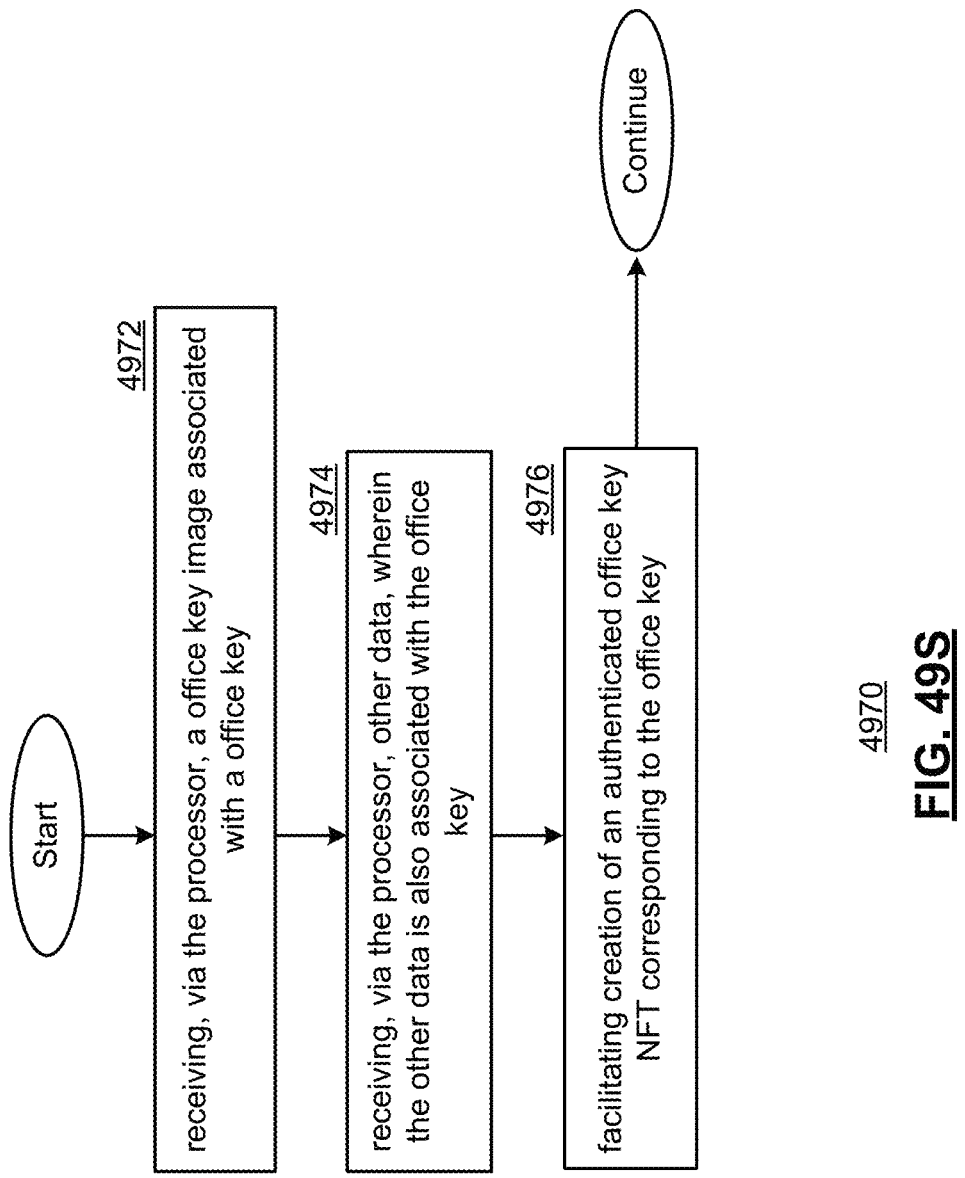

FIG. 49S presents a flowchart representation of an example method.

FIG. 49T presents a flowchart representation of an example method.

FIG. 49U presents a flowchart representation of an example method.

Figure 49V:
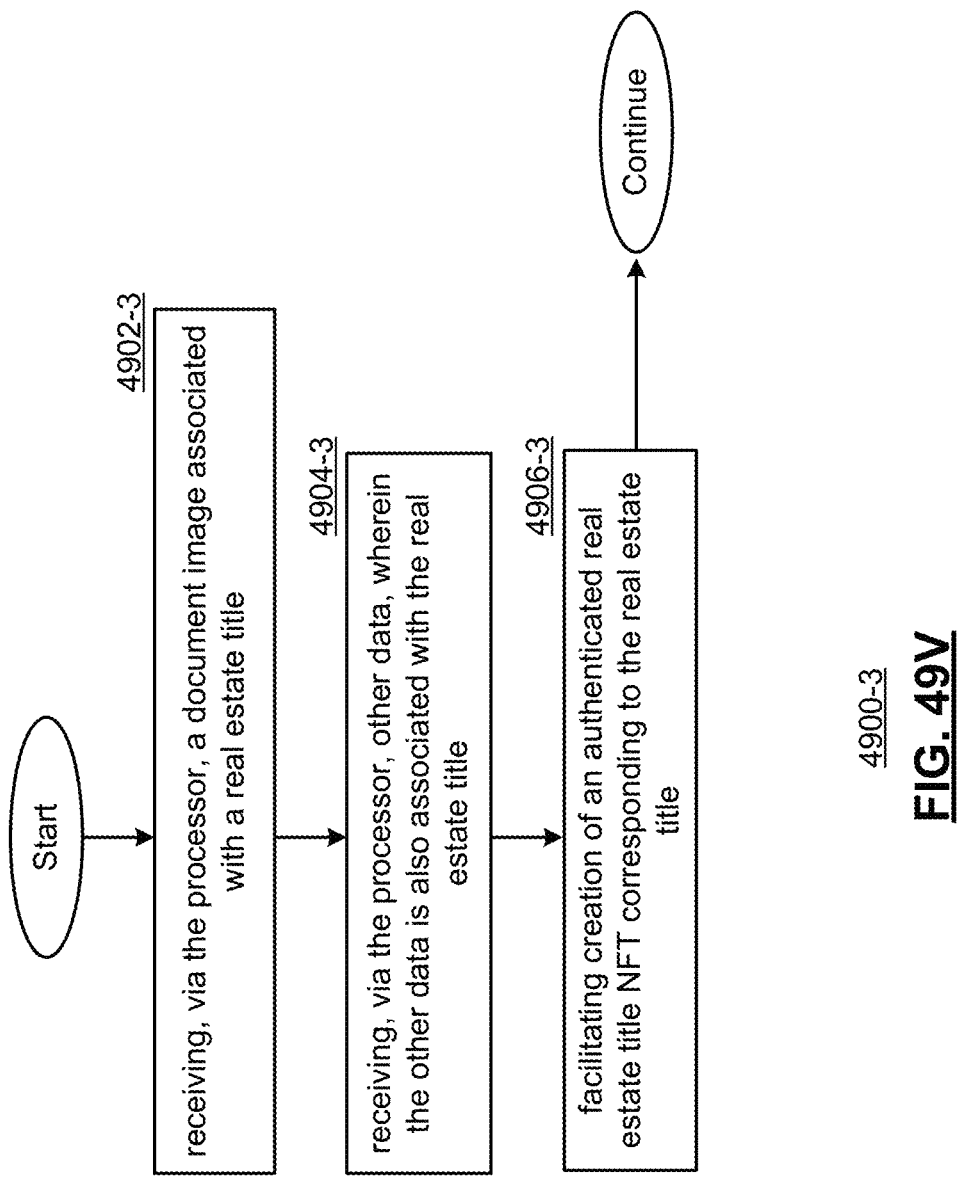

FIG. 49V presents a flowchart representation of an example method.

FIG. 49W presents a flowchart representation of an example method.

Figure 49X:
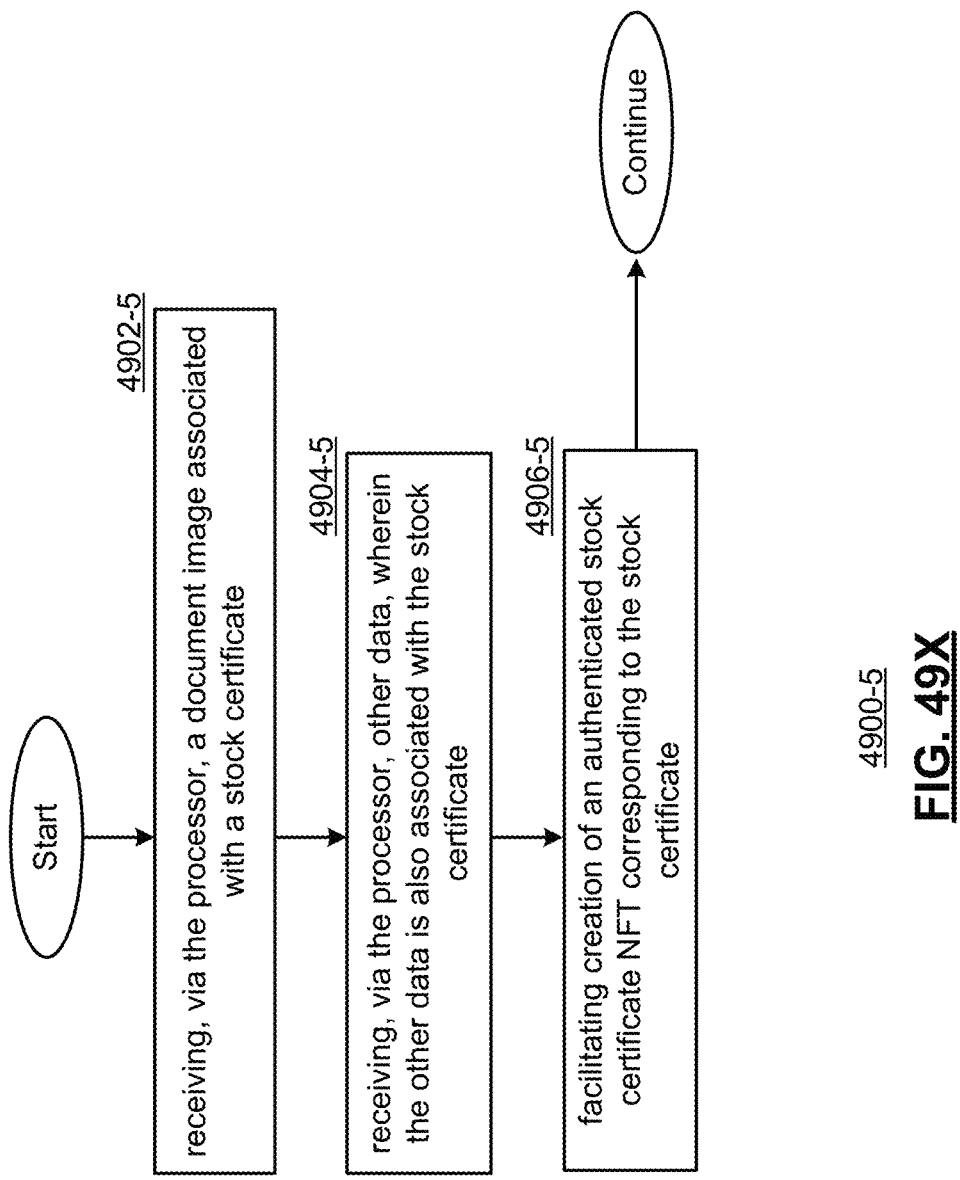

FIG. 49X presents a flowchart representation of an example method.

FIG. 49Y presents a flowchart representation of an example method.

Figure 49Z:
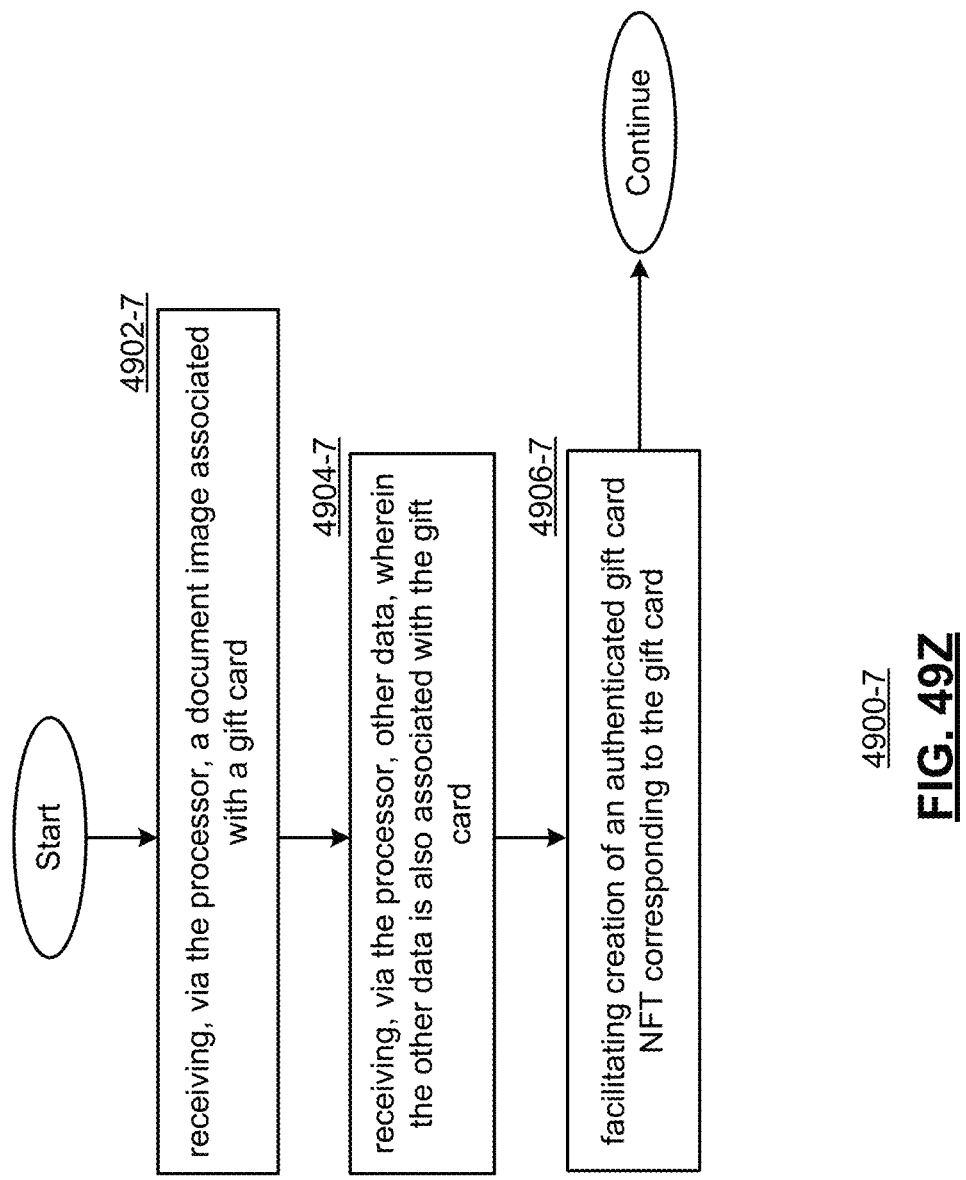

FIG. 49Z presents a flowchart representation of an example method.

FIG. 49AA presents a flowchart representation of an example method.

Figure 49B:
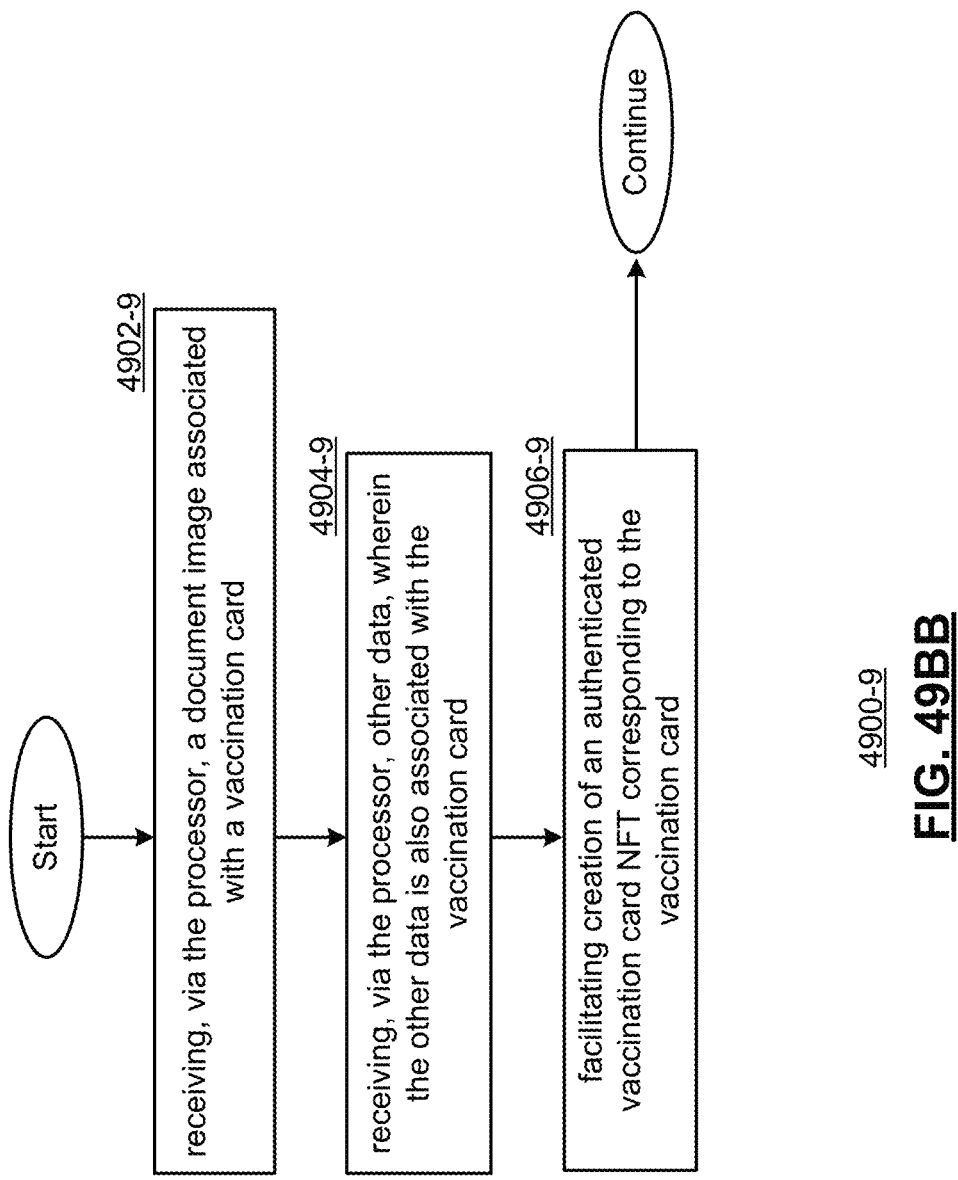

FIG. 49BB presents a flowchart representation of an example method.

Figure 49C:
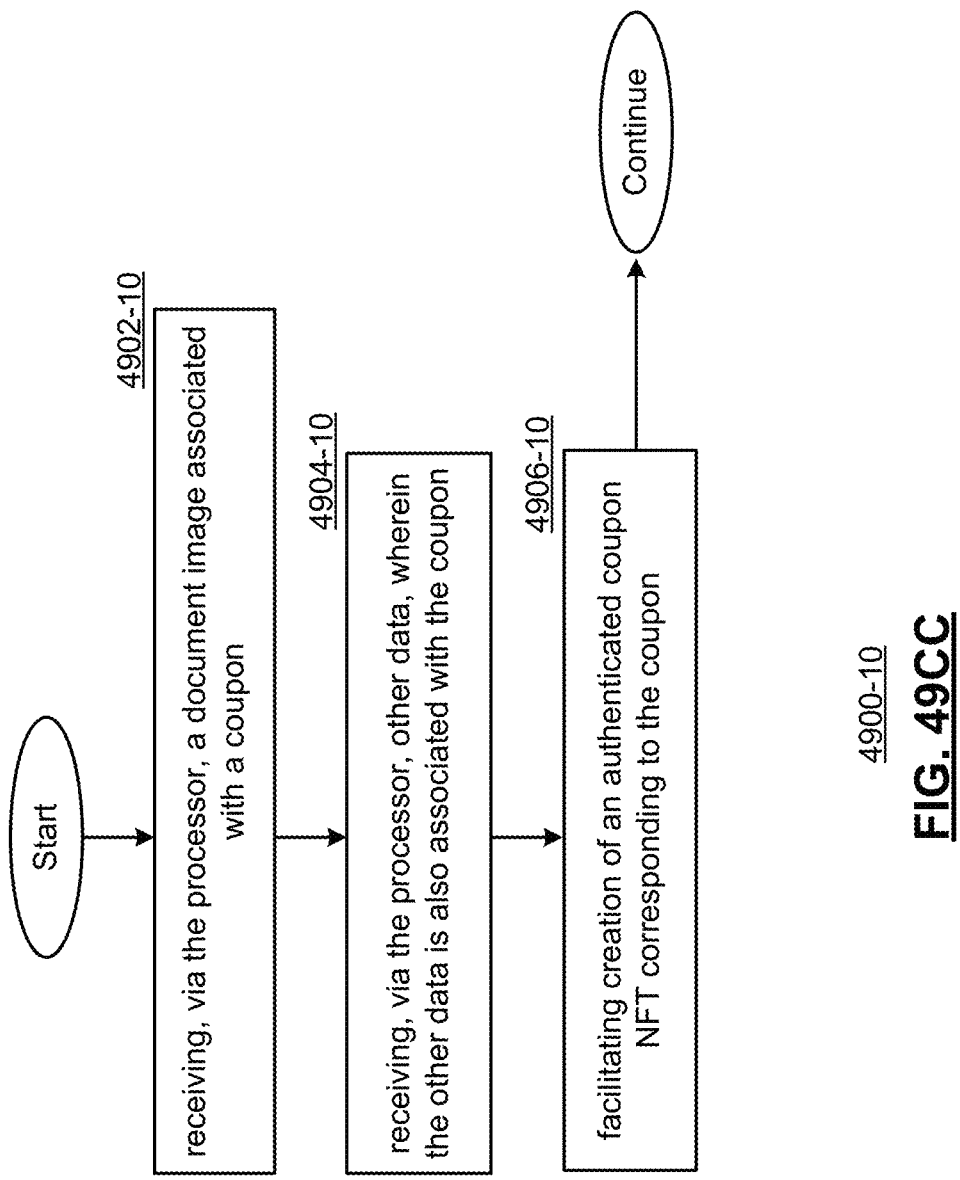

FIG. 49CC presents a flowchart representation of an example method.

Figure 50A:
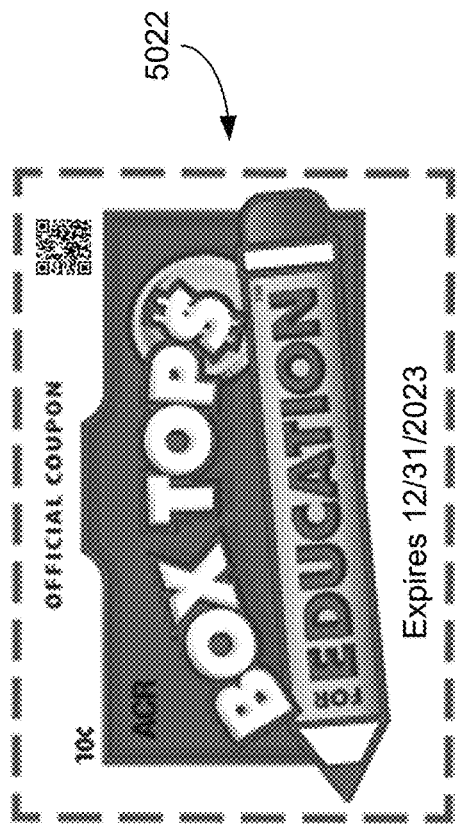

FIG. 50A presents a pictorial representation of an example coupon.

Figure 50B:
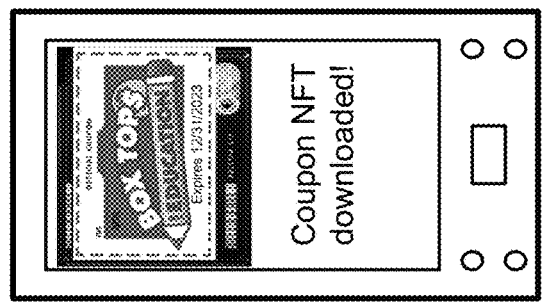

FIG. 50B presents a pictorial representation of an example client device.

FIG. 50C presents a flowchart representation of an example method.

Figure 51B:
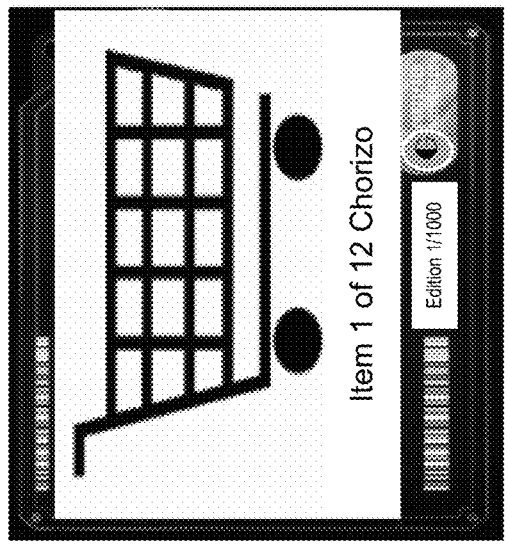
Figure 51A:
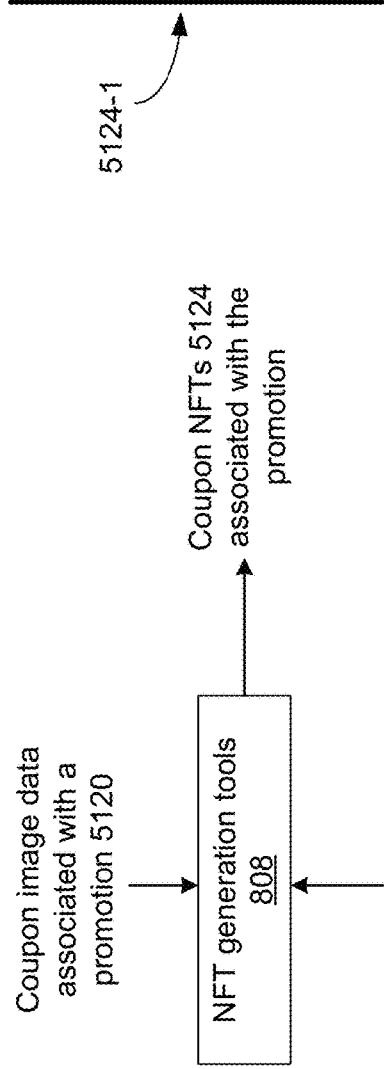

FIG. 51A presents a block diagram/flow representation of an example of NFT generation.

FIG. 51B presents a pictorial representation of an example NFT.

Figure 51C:
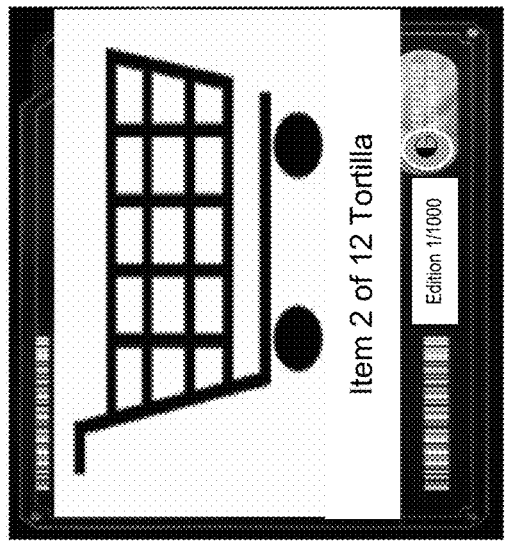

FIG. 51C presents a pictorial representation of an example NFT.

Figure 51D:
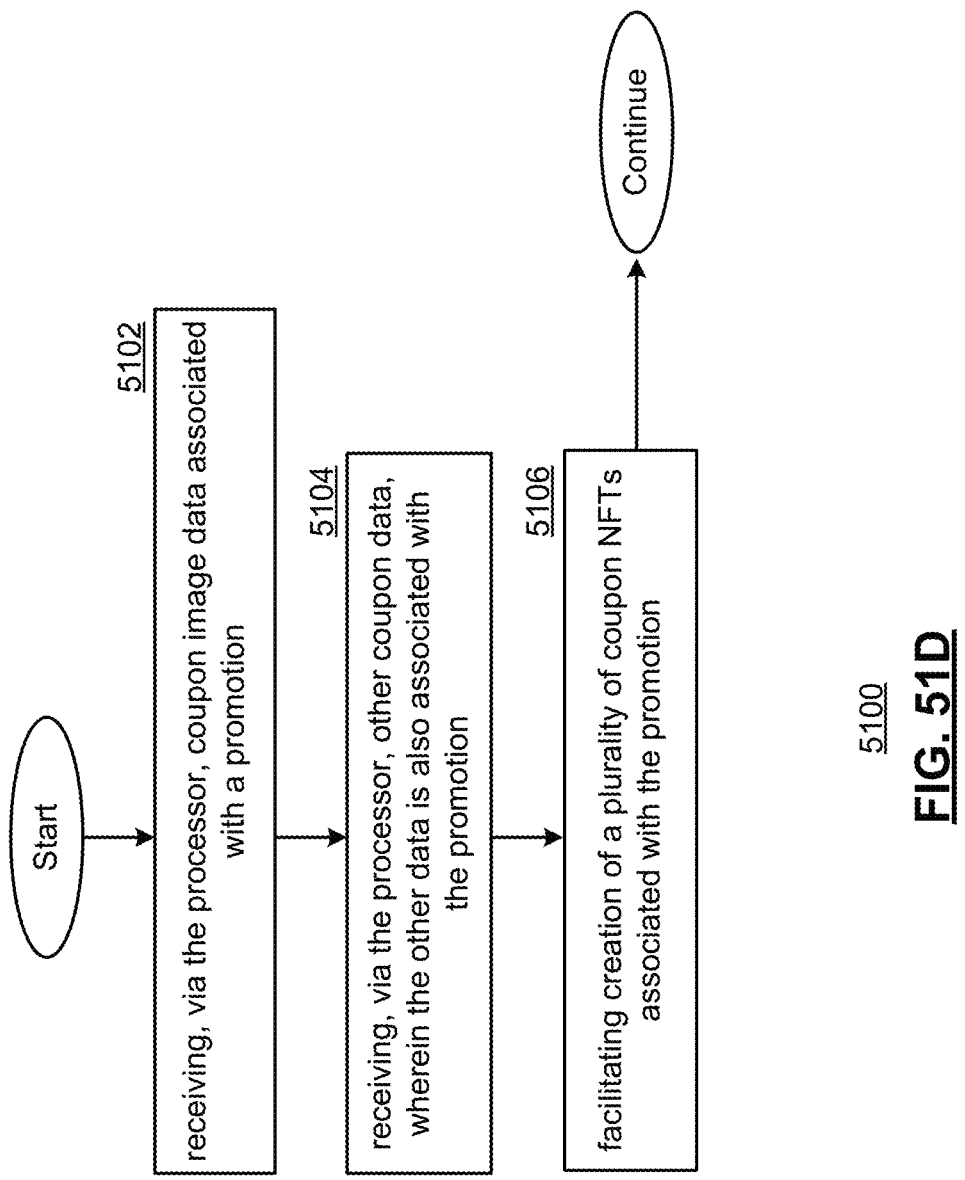

FIG. 51D presents a flowchart representation of an example method.

FIGS. 52A-52B present pictorial representations of example coupons.

FIGS. 52C-52D present pictorial representations of an example client device.

FIG. 52E presents a flowchart representation of an example method.

Figure 53C:
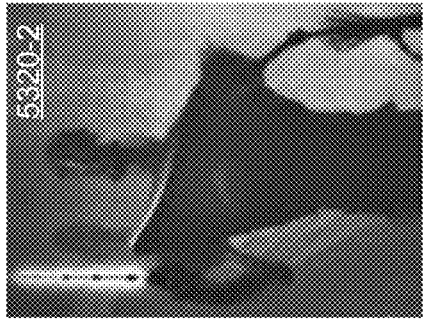
Figure 53B:
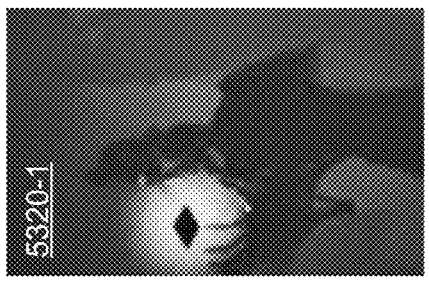
Figure 53E:
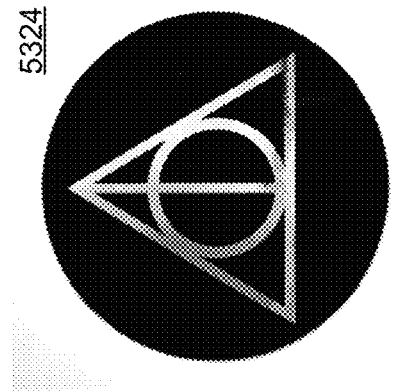
Figure 53D:
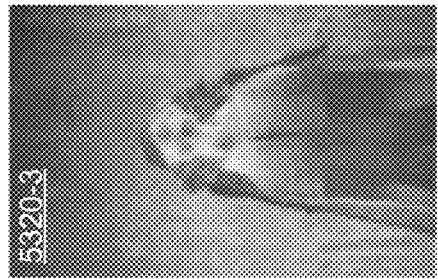
Figure 53A:
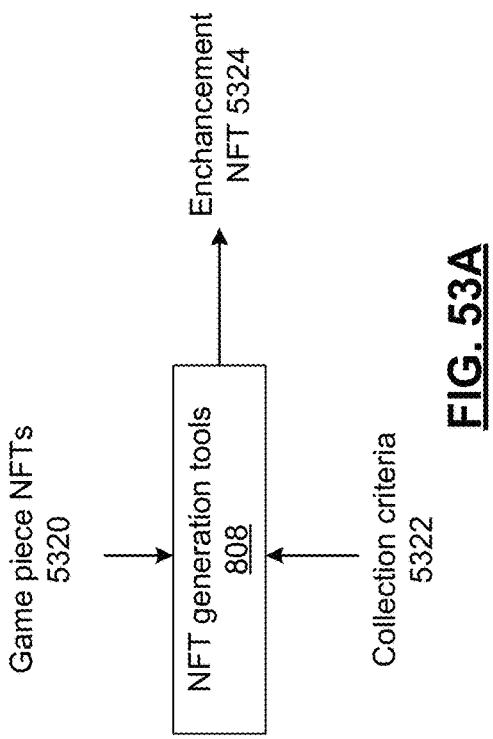

FIG. 53A presents a block diagram/flow representation of an example of NFT generation.

FIG. 53B-53E present a pictorial representations of example NFTs.

Figure 53F:
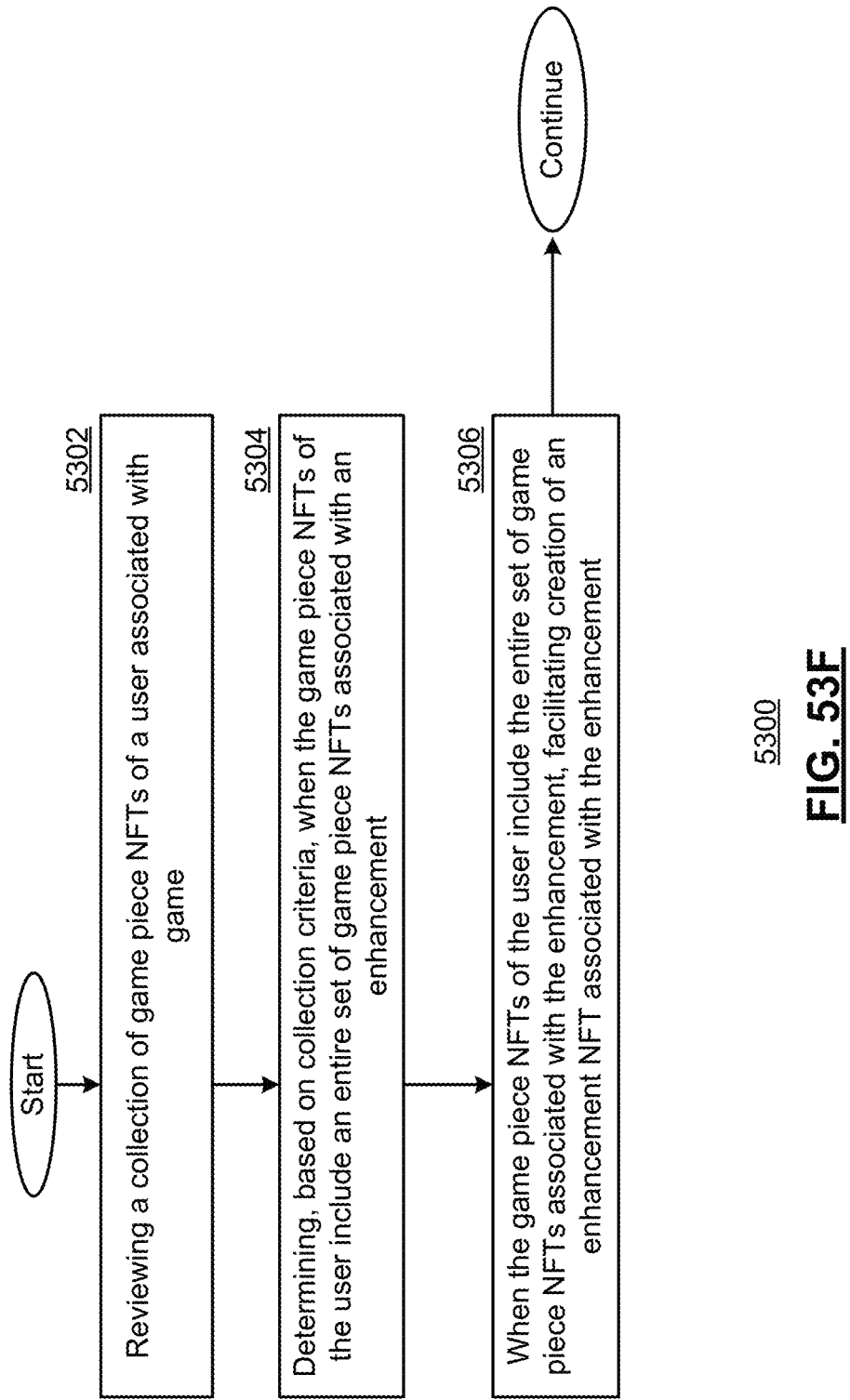

FIG. 53F presents a flowchart representation of an example method.

FIG. 54A presents a block diagram/flow representation of an example of NFT generation.

FIG. 54B-54D present pictorial representation of an example game pieces.

FIG. 54E presents a pictorial representation of an example NFT.

Figure 54F:
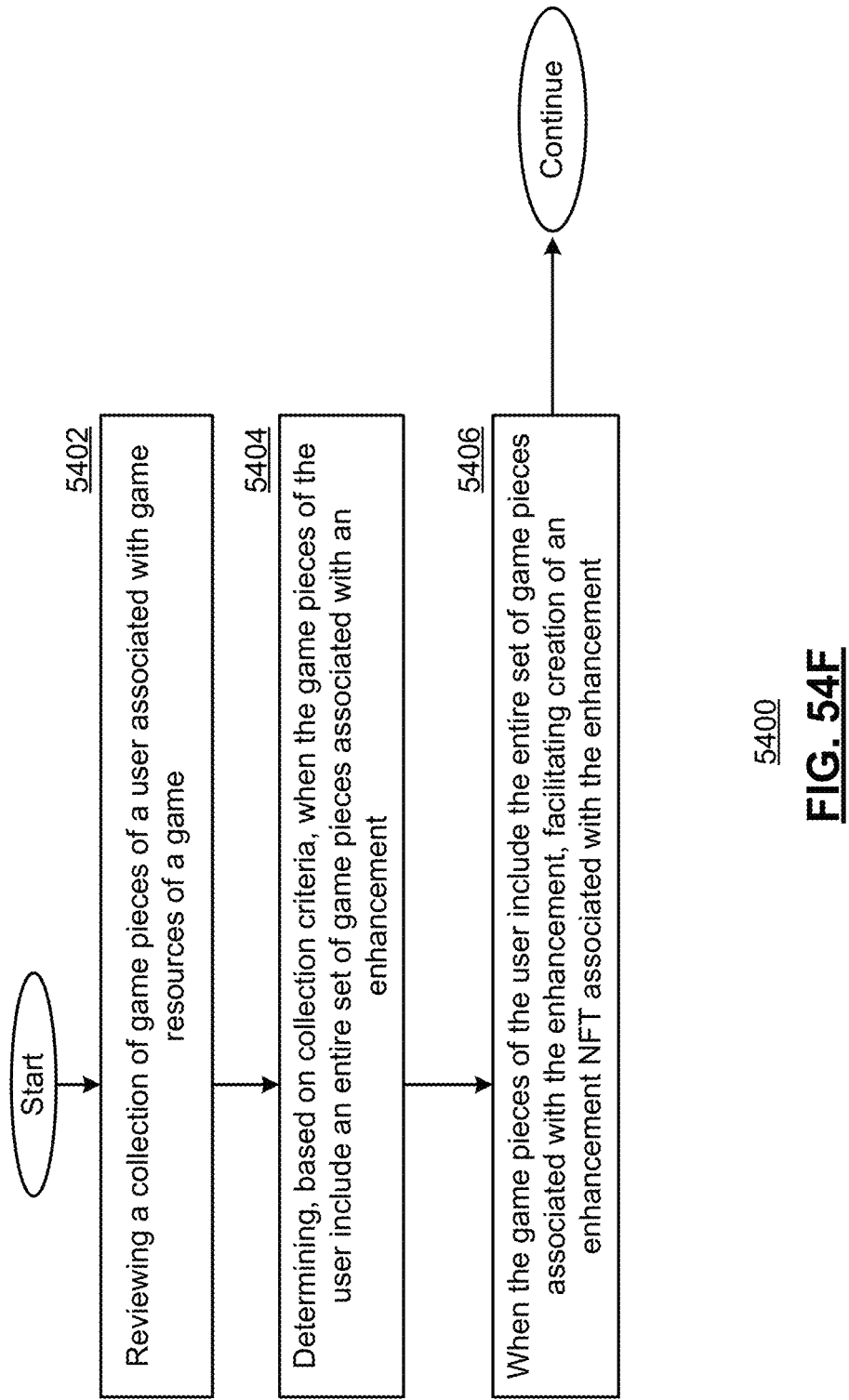

FIG. 54F presents a flowchart representation of an example method.

Figure 55A:
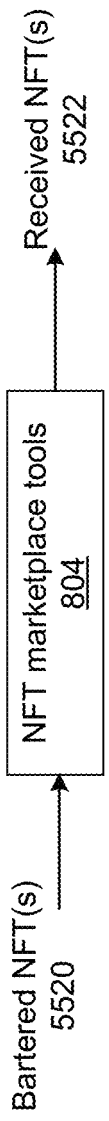

FIG. 55A presents a block diagram/flow representation of an example of an NFT barter transaction.

Figure 55B:
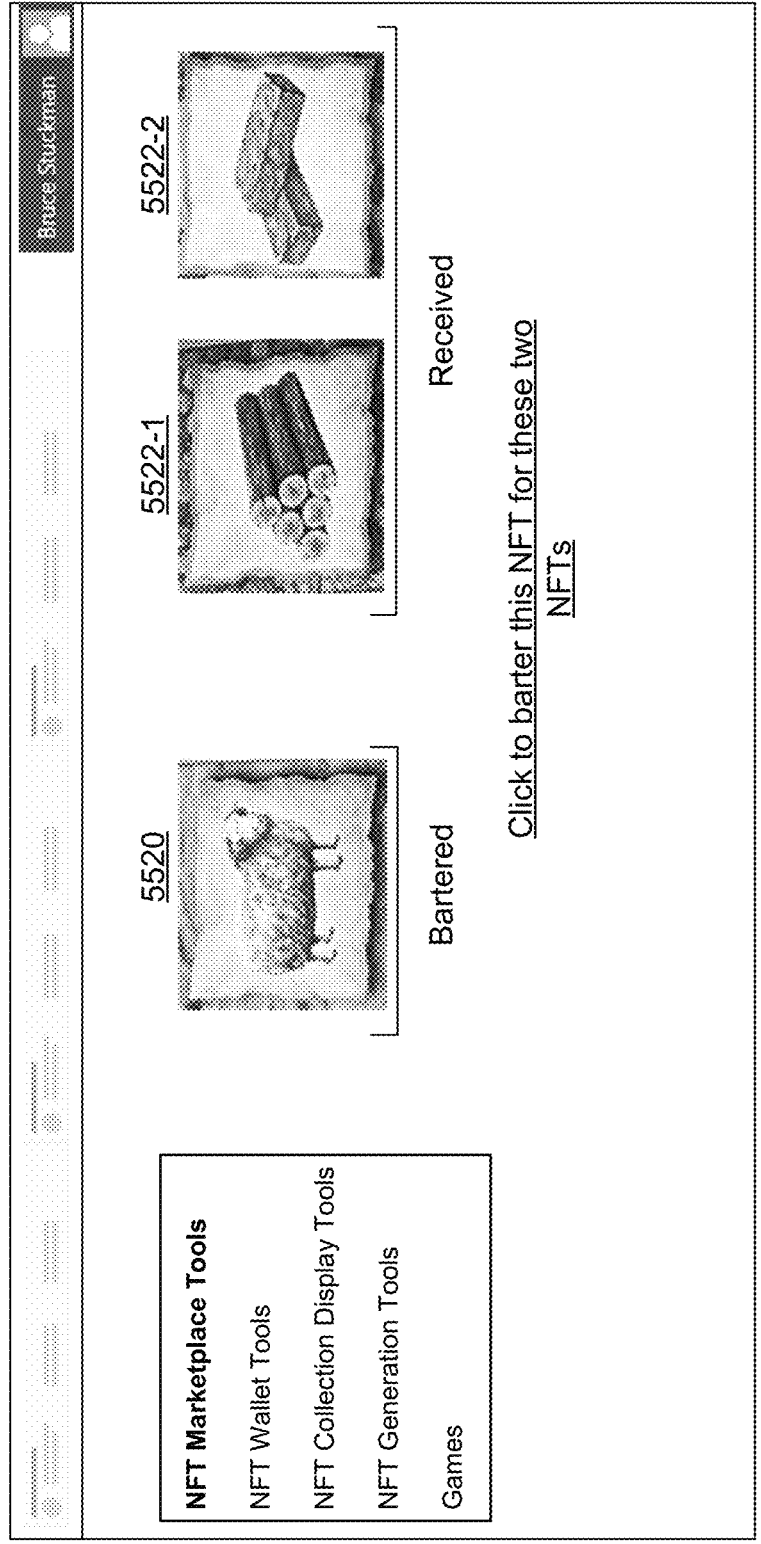
Figure 55C:
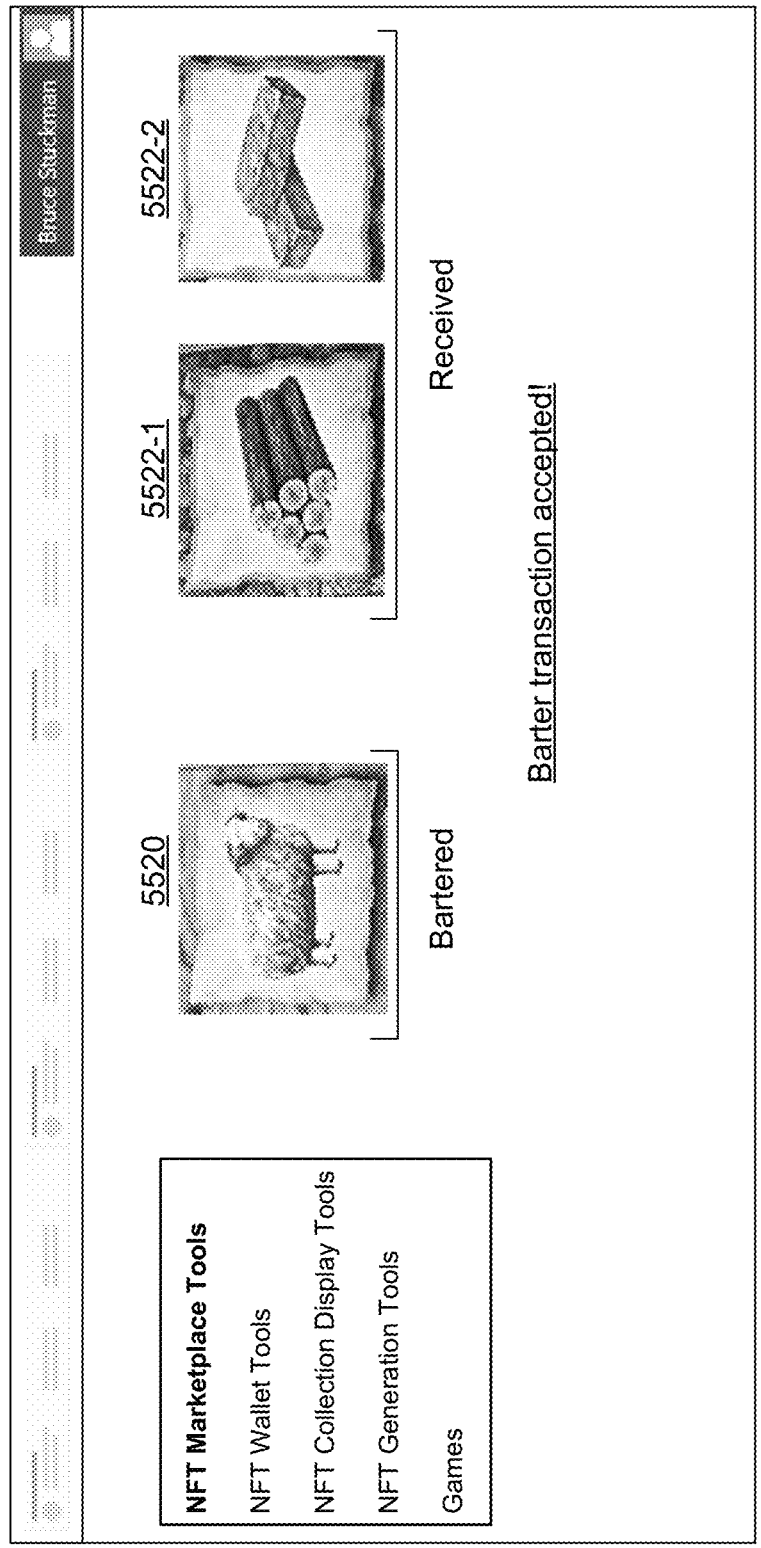

FIG. 55B-55C present pictorial representations of an example user interfaces.

Figure 55D:
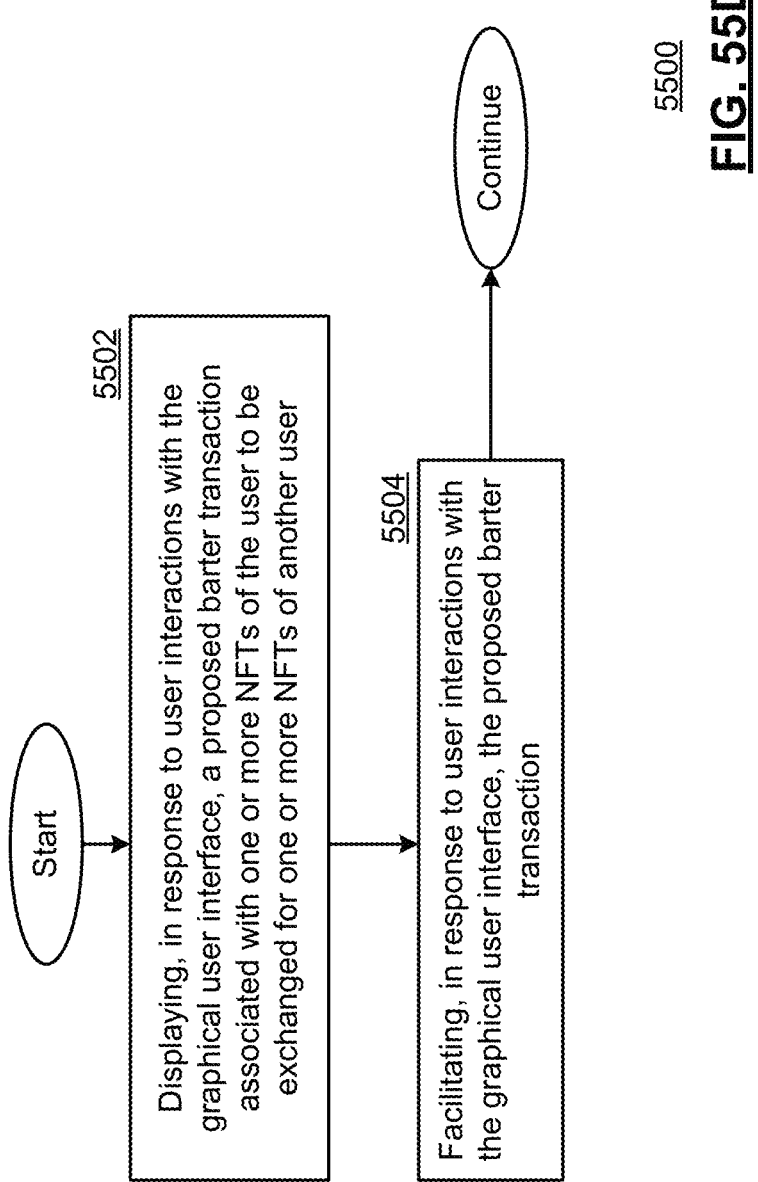

FIG. 55D presents a flowchart representation of an example method.

FIG. 56A presents a block diagram/flow representation of an example of NFT generation.

FIG. 56B presents a pictorial representation of an example NFT.

FIG. 56C presents a pictorial representation of example enhancements.

FIG. 56D presents a pictorial representation of an example NFT.

FIG. 56E presents a flowchart representation of an example method.

FIG. 57A presents a block diagram/flow representation of an example of NFT generation.

FIG. 57B presents a flowchart representation of an example method.

Figure 58B:
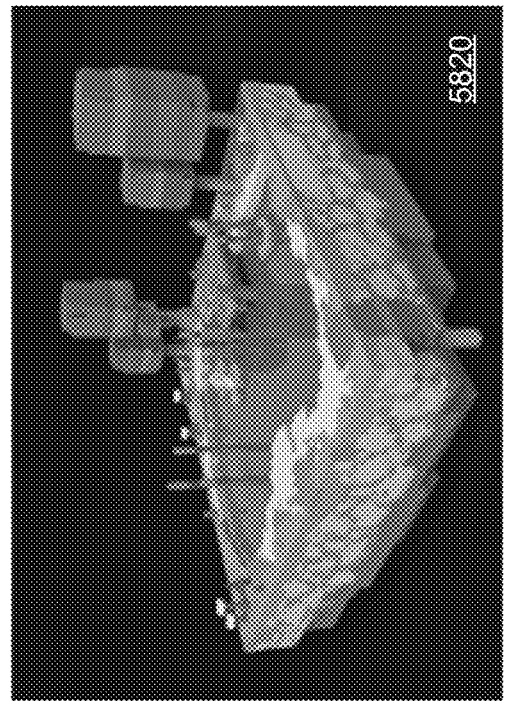
Figure 58C:
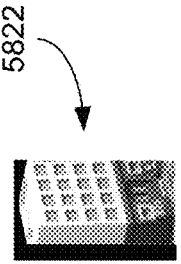
Figure 58A:
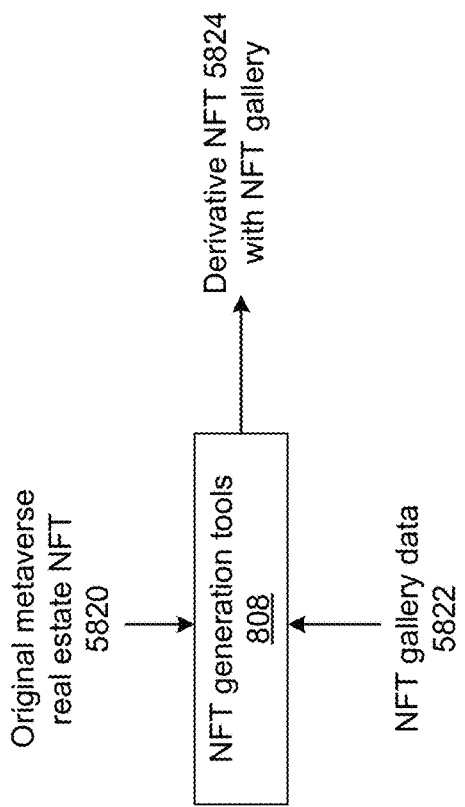

FIG. 58A presents a block diagram/flow representation of an example of NFT generation.

FIG. 58B presents a pictorial representation of an example NFT.

FIG. 58C presents a pictorial representation of an example NFT gallery.

Figure 58D:
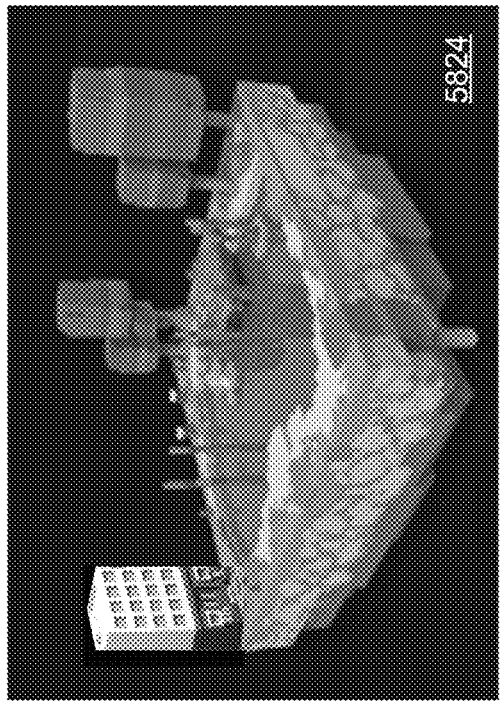

FIG. 58D presents a pictorial representation of an example NFT.

Figure 58E:
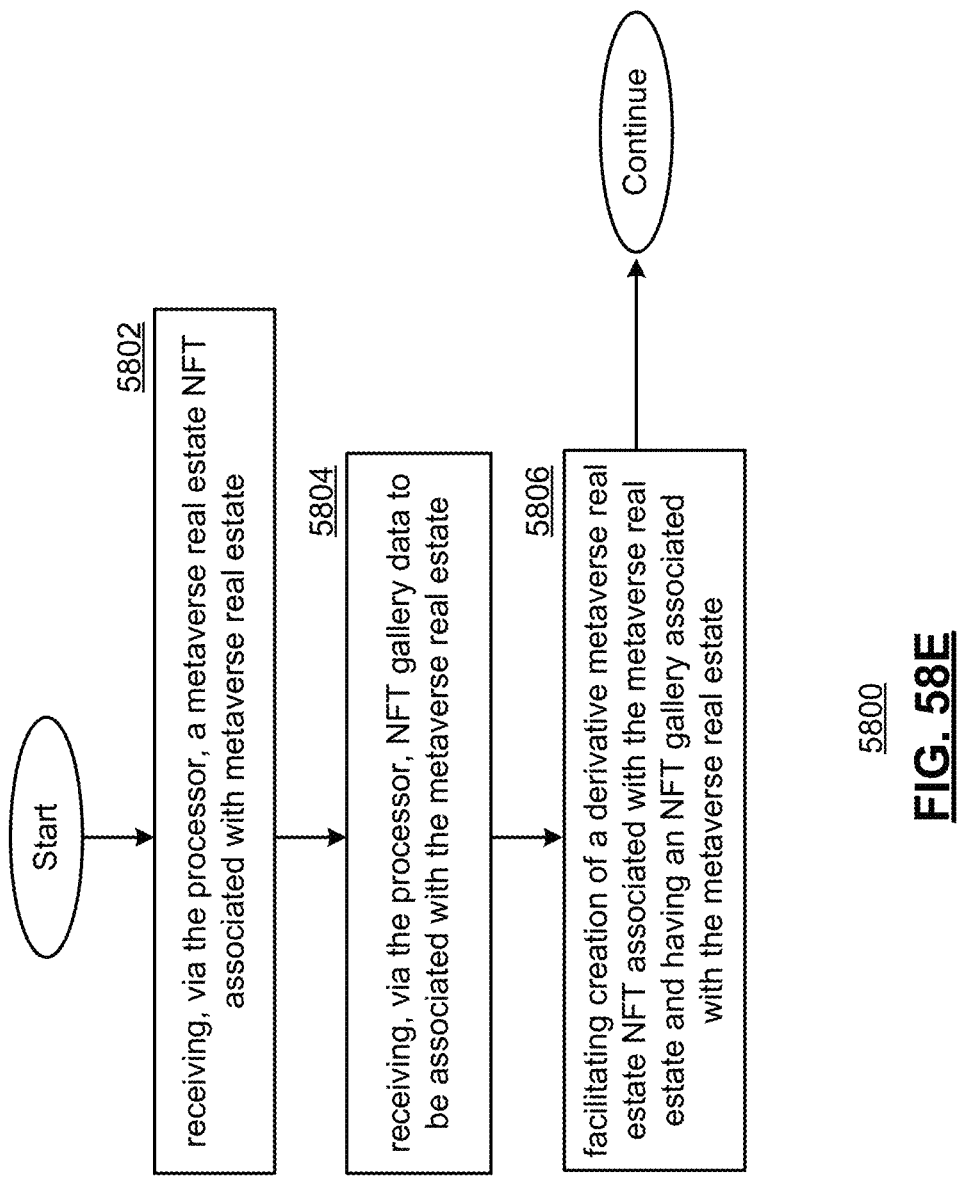

FIG. 58E presents a flowchart representation of an example method.

FIG. 58F presents a flowchart representation of an example method.

Figure 59B:
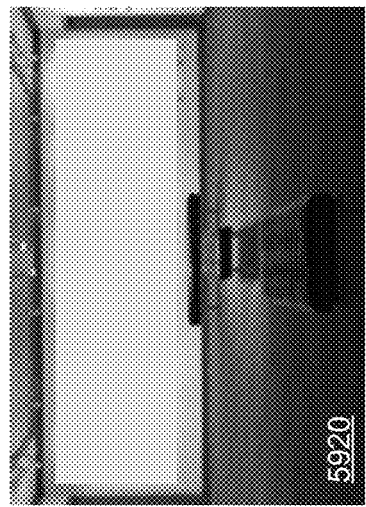
Figure 59C:
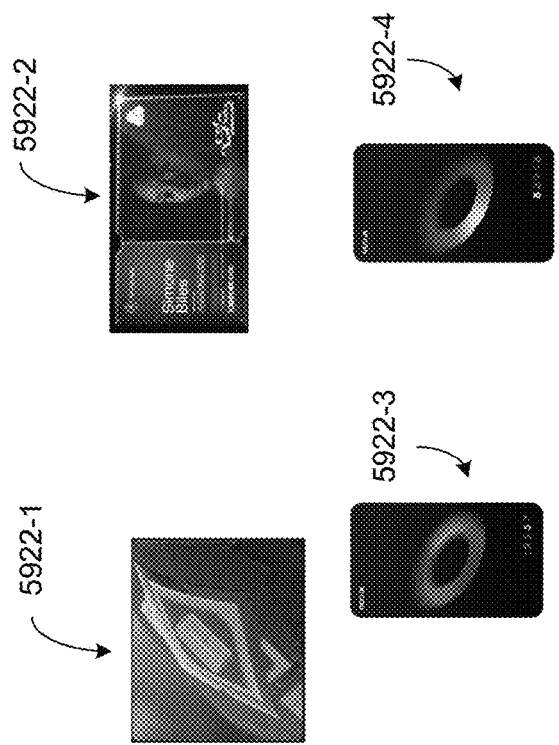
Figure 59A:
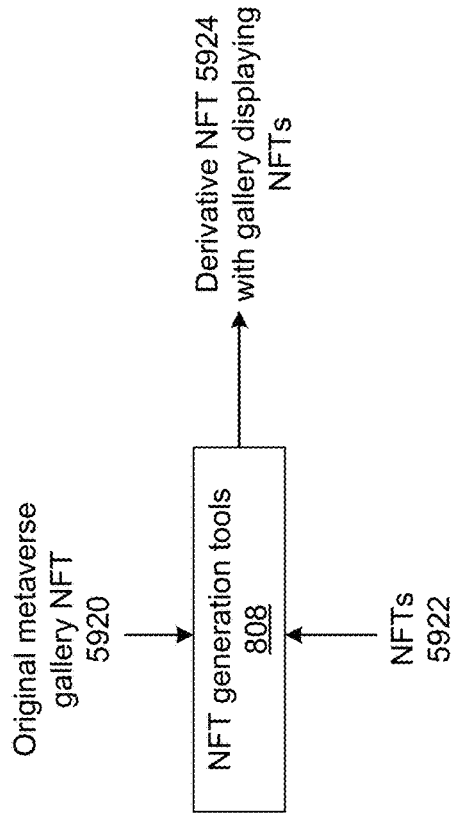

FIG. 59A presents a block diagram/flow representation of an example of NFT generation.

FIG. 59B presents a pictorial representation of an example NFT.

FIG. 59C presents a pictorial representation of example NFTs.

Figure 59D:

FIG. 59D presents a pictorial representation of an example NFT.

FIG. 59E presents a flowchart representation of an example method.

FIG. 60A presents a block diagram of an example system.

FIG. 60B presents a flowchart representation of an example method.

Figure 60C:
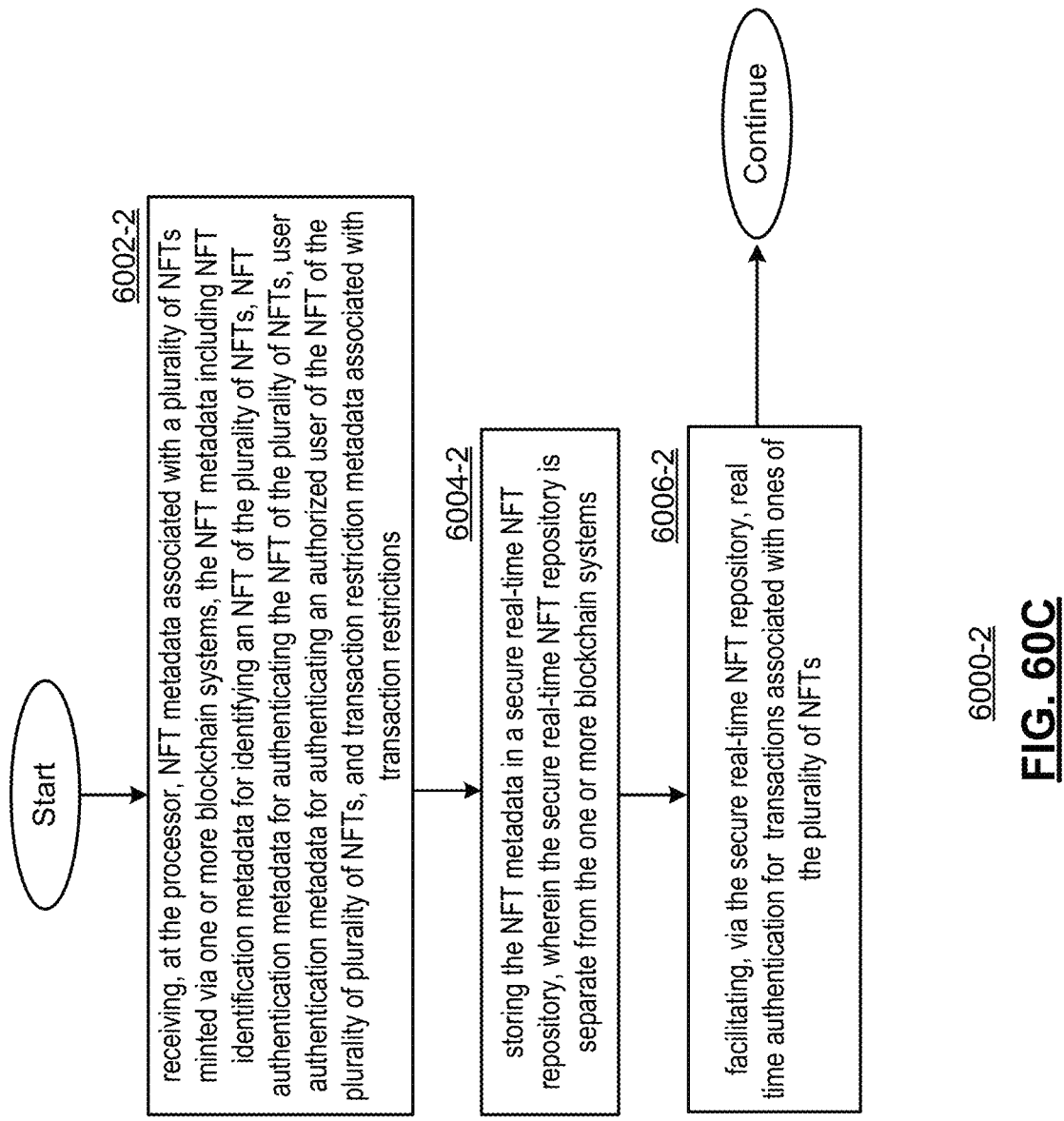

FIG. 60C presents a flowchart representation of an example method.

Figure 60D:
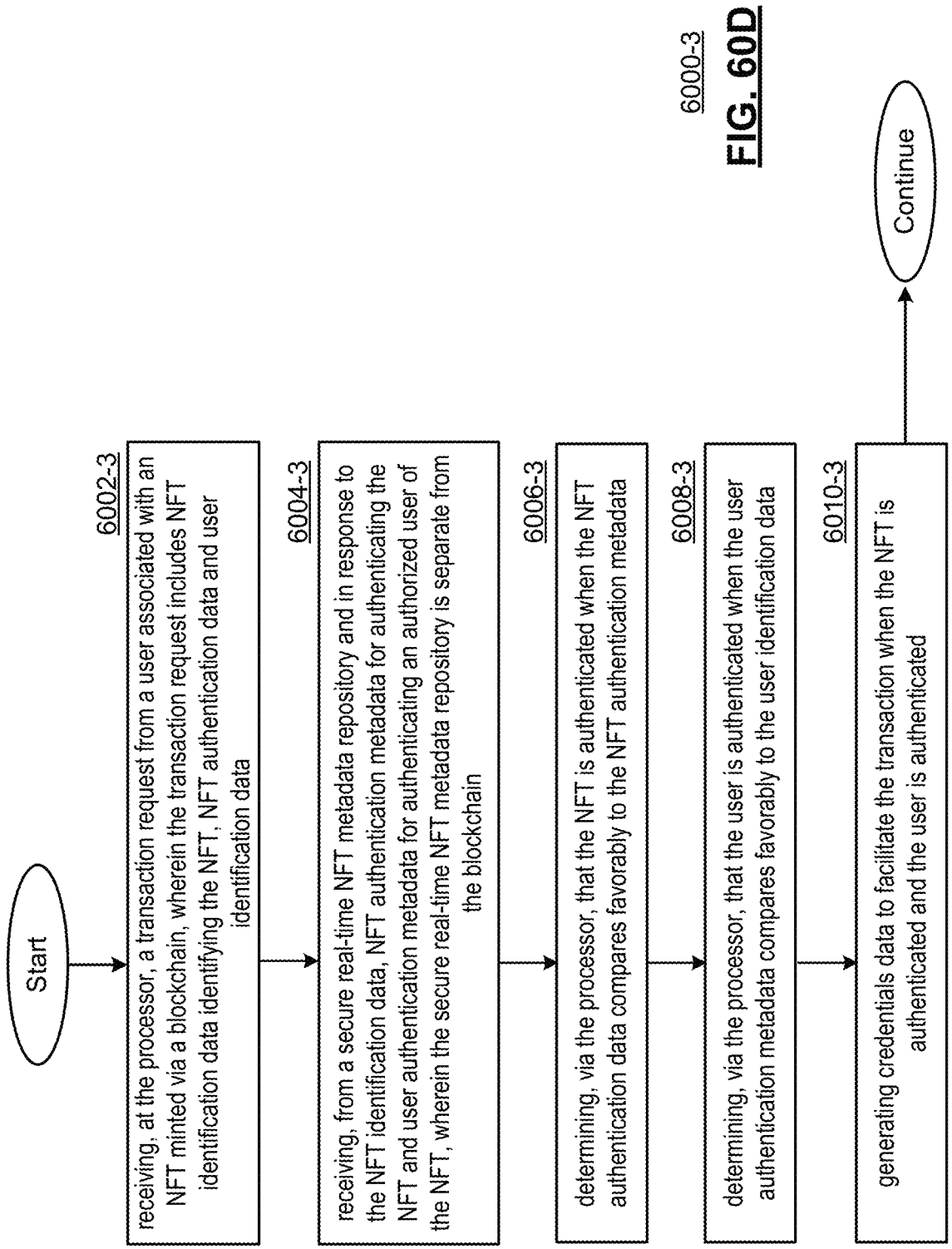

FIG. 60D presents a flowchart representation of an example method.

FIG. 60E presents a flowchart representation of an example method.

FIG. 60F presents a flowchart representation of an example method.

FIG. 60G presents a flowchart representation of an example method.

FIG. 60H presents a flowchart representation of an example method.

FIG. 60I presents a flowchart representation of an example method.

FIG. 60J presents a flowchart representation of an example method.

Figure 60K:
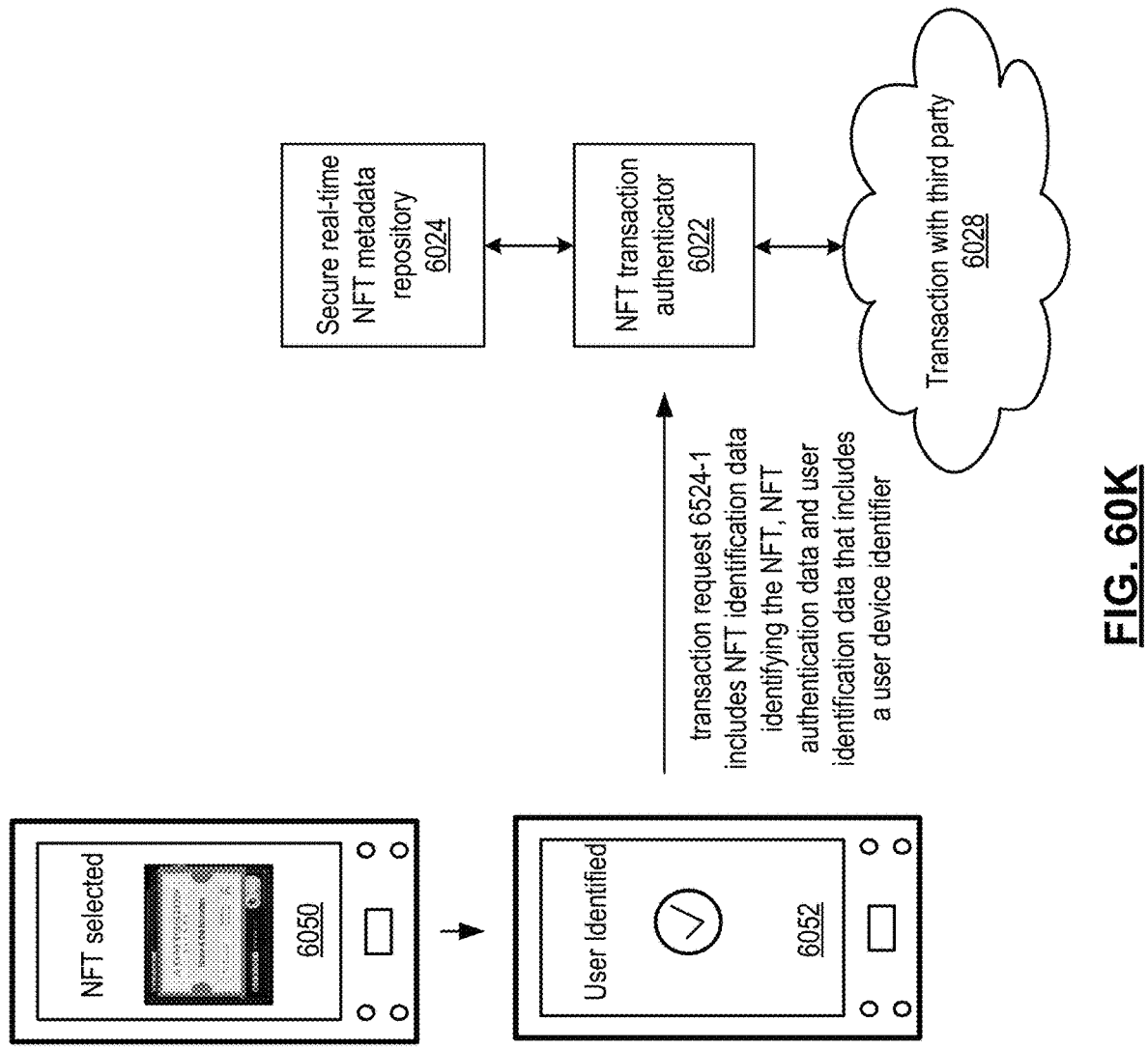

FIG. 60K presents a pictorial block diagram/flow representation of an example of transaction authentication.

Figure 60L:
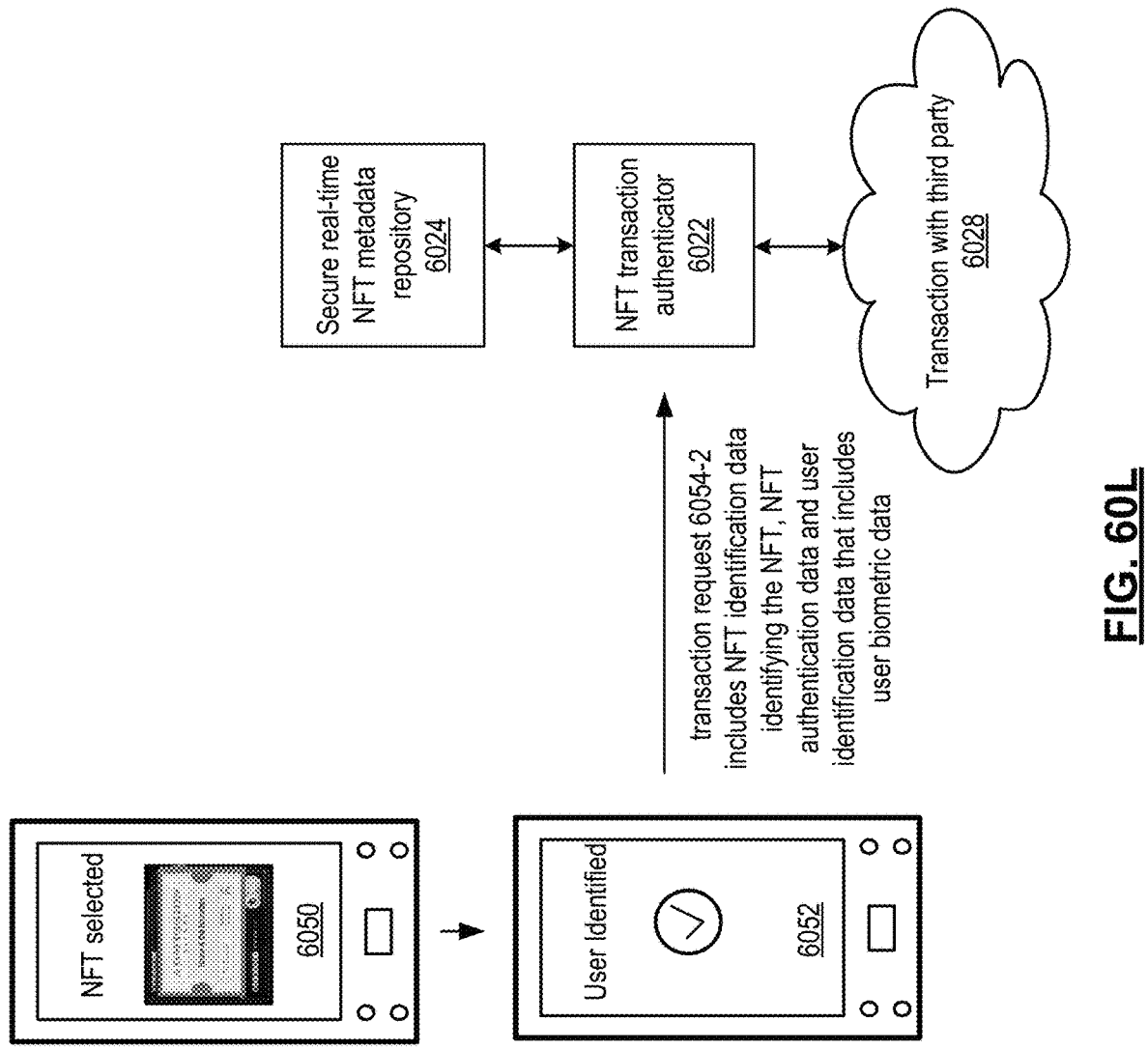

FIG. 60L presents a pictorial block diagram/flow representation of an example of transaction authentication.

FIG. 60M presents a pictorial block diagram/flow representation of an example of transaction authentication.

FIG. 60N presents a flowchart representation of an example method.

FIG. 60O presents a flowchart representation of an example method.

FIG. 60P presents a flowchart representation of an example method.

Figure 61A:
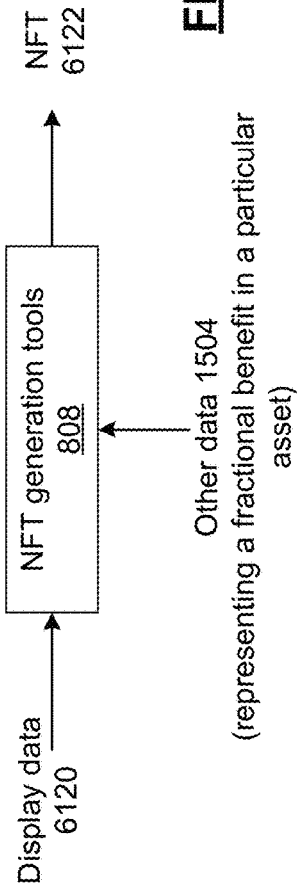

FIG. 61A presents a block diagram/flow representation of an example of NFT generation.

FIGS. 61B-61M present pictorial representations of example NFTs.

FIG. 61N presents a pictorial diagram/flow representation of an example of NFT redemption.

FIGS. 61O-61X present flowchart representations of example methods.

Figure 61B:
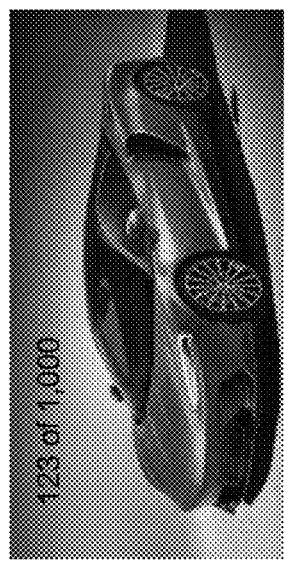
Figure 61C:
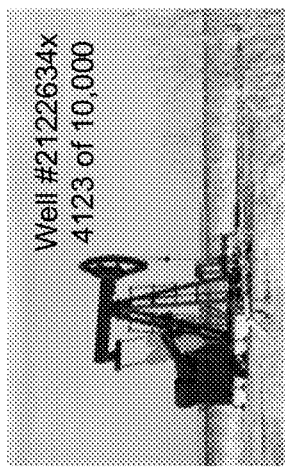
Figure 61D:
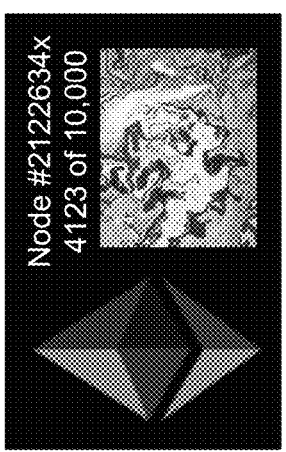
Figure 61E:
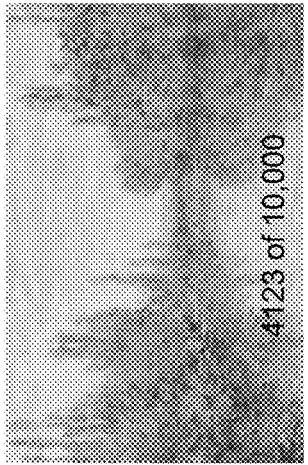
Figure 61F:
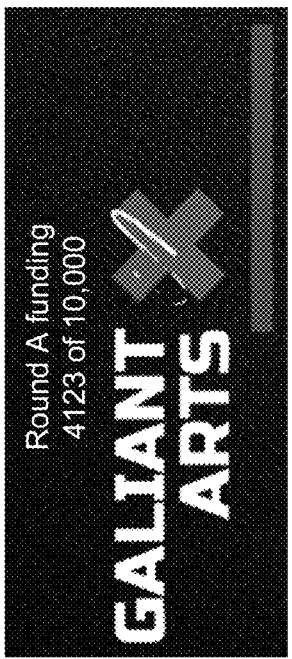
Figure 61Y:
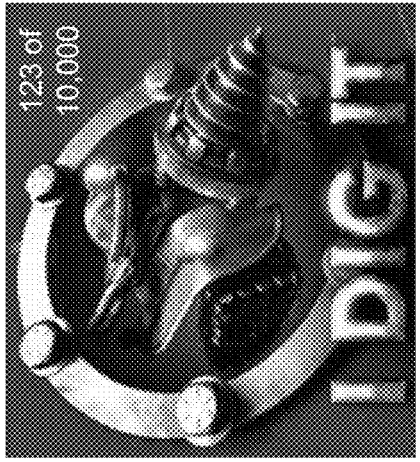

FIG. 61Y presents a pictorial representation of an example NFT.

Figure 61Z:
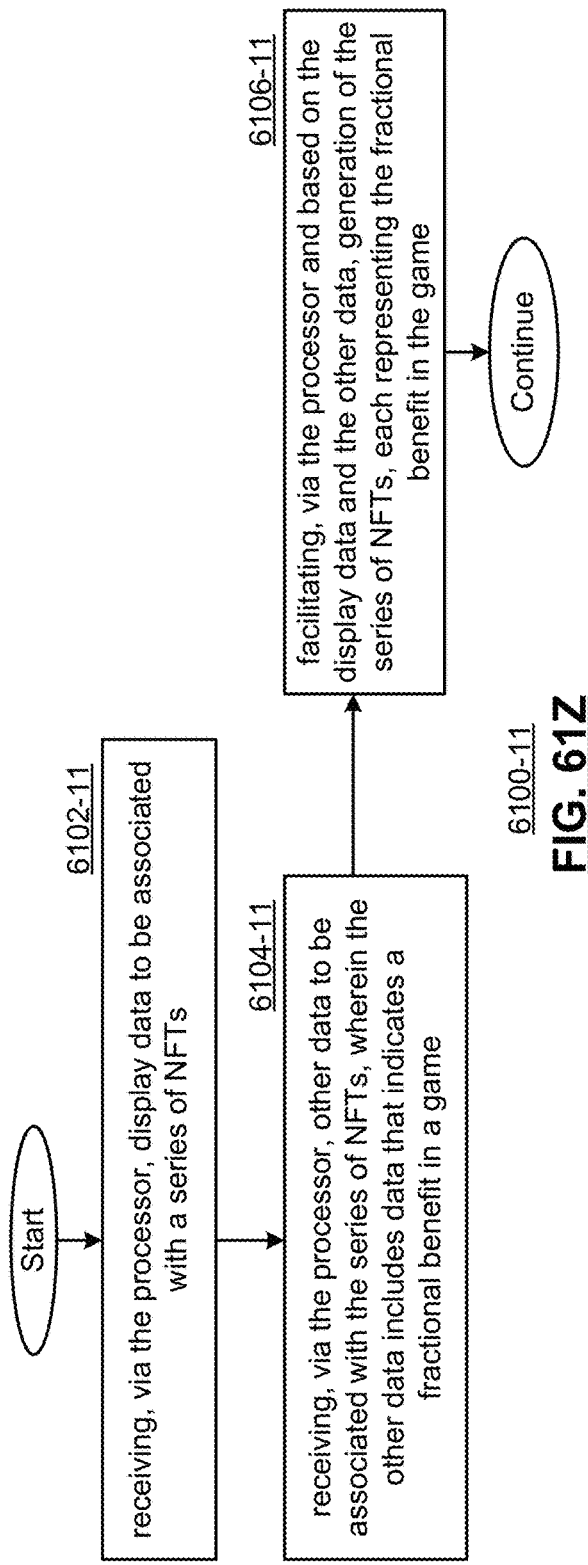
Figure 61A:
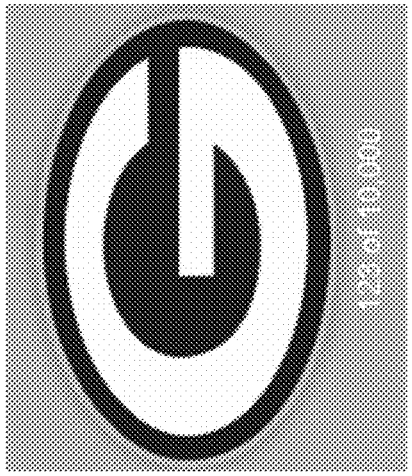
Figure 61B:
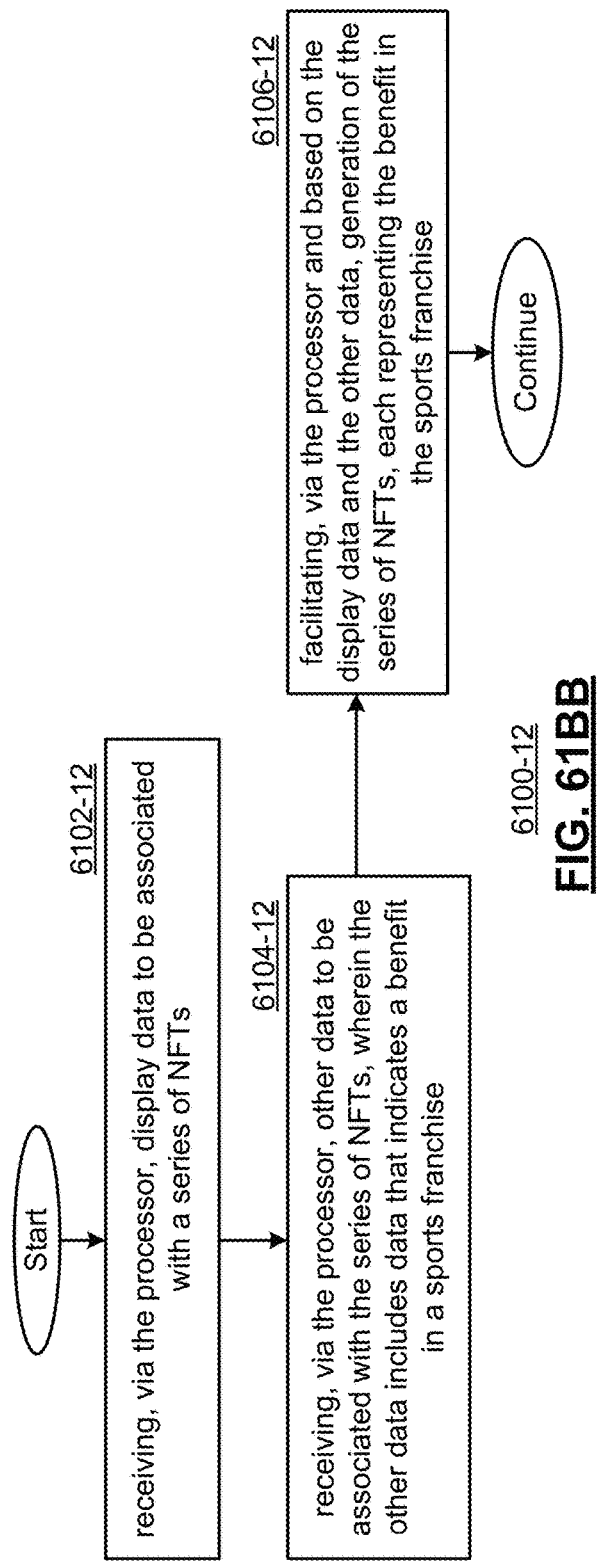
Figure 61C:
Figure 61D:
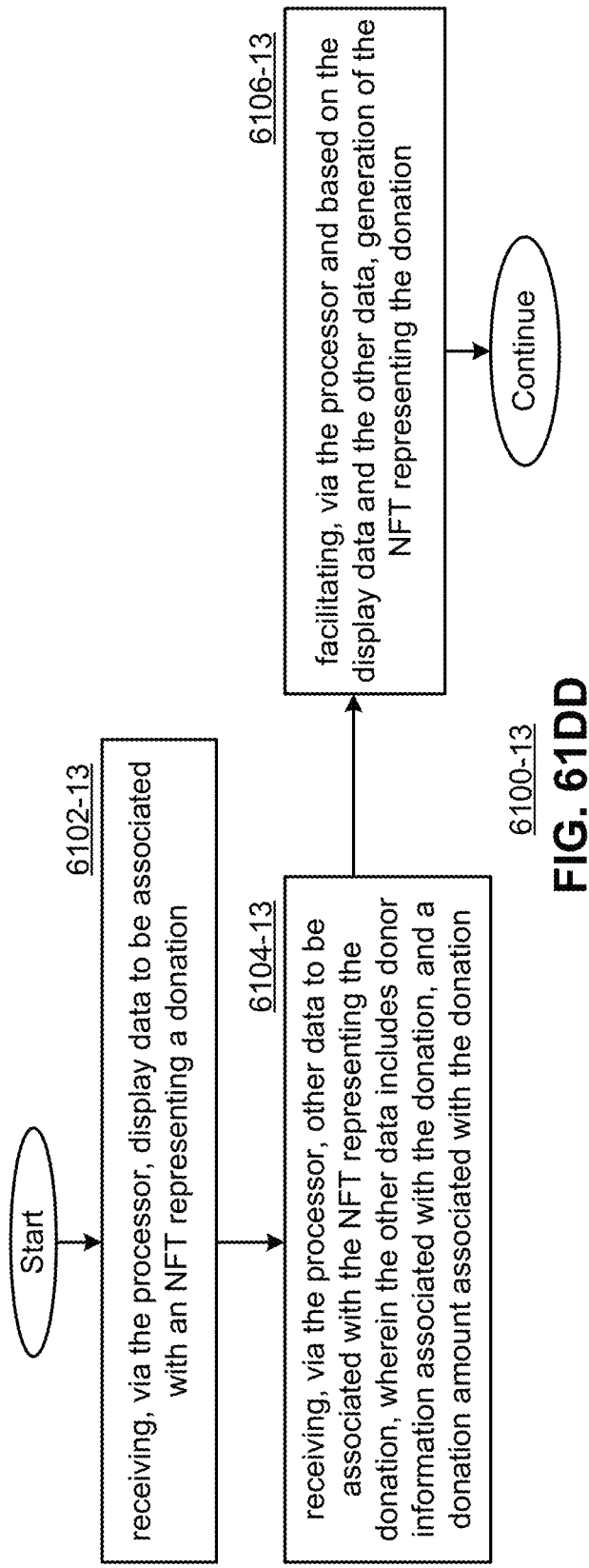

FIG. 61Z presents a flowchart representation of an example method.

FIG. 61AA presents a pictorial representation of an example NFT.

FIG. 61BB presents a flowchart representation of an example method.

FIG. 61CC presents a pictorial representation of an example NFT.

FIG. 61DD presents a flowchart representation of an example method.

Figure 62A:

FIG. 62A presents a pictorial representation of an example NFT.

Figure 62B:
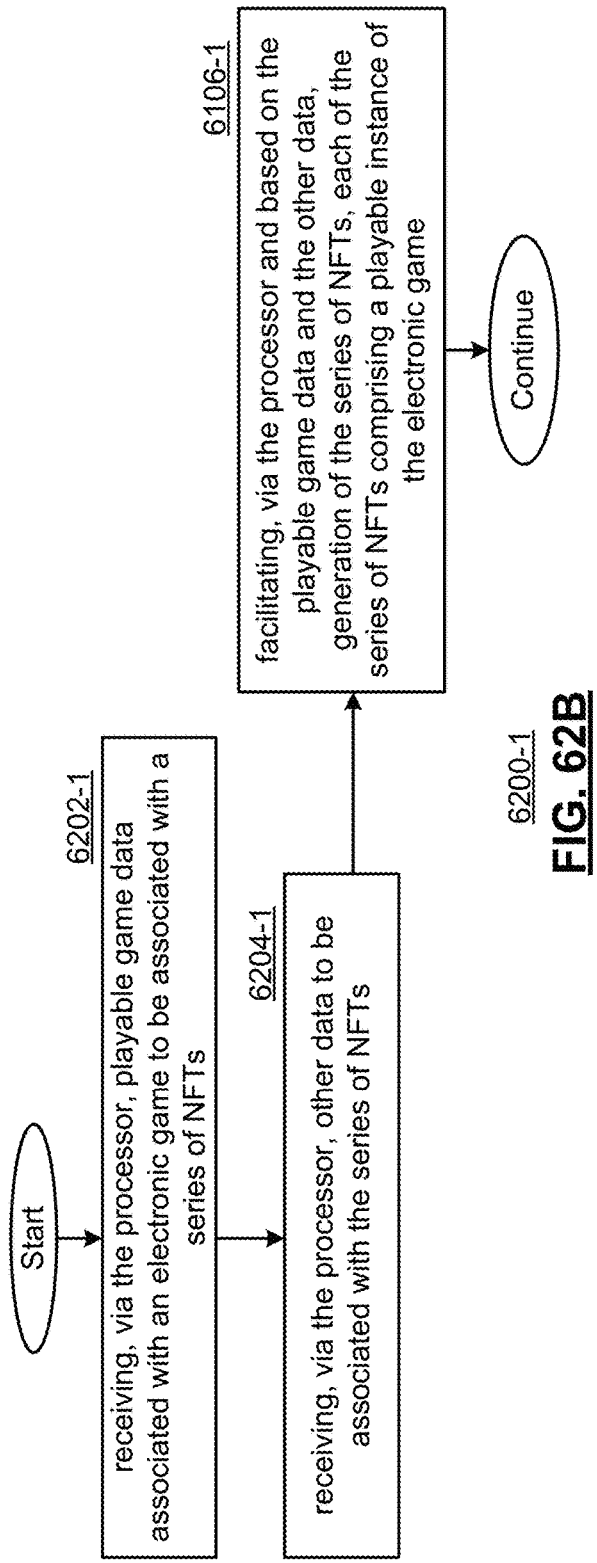

FIG. 62B presents a flowchart representation of an example method.

Figure 62C:
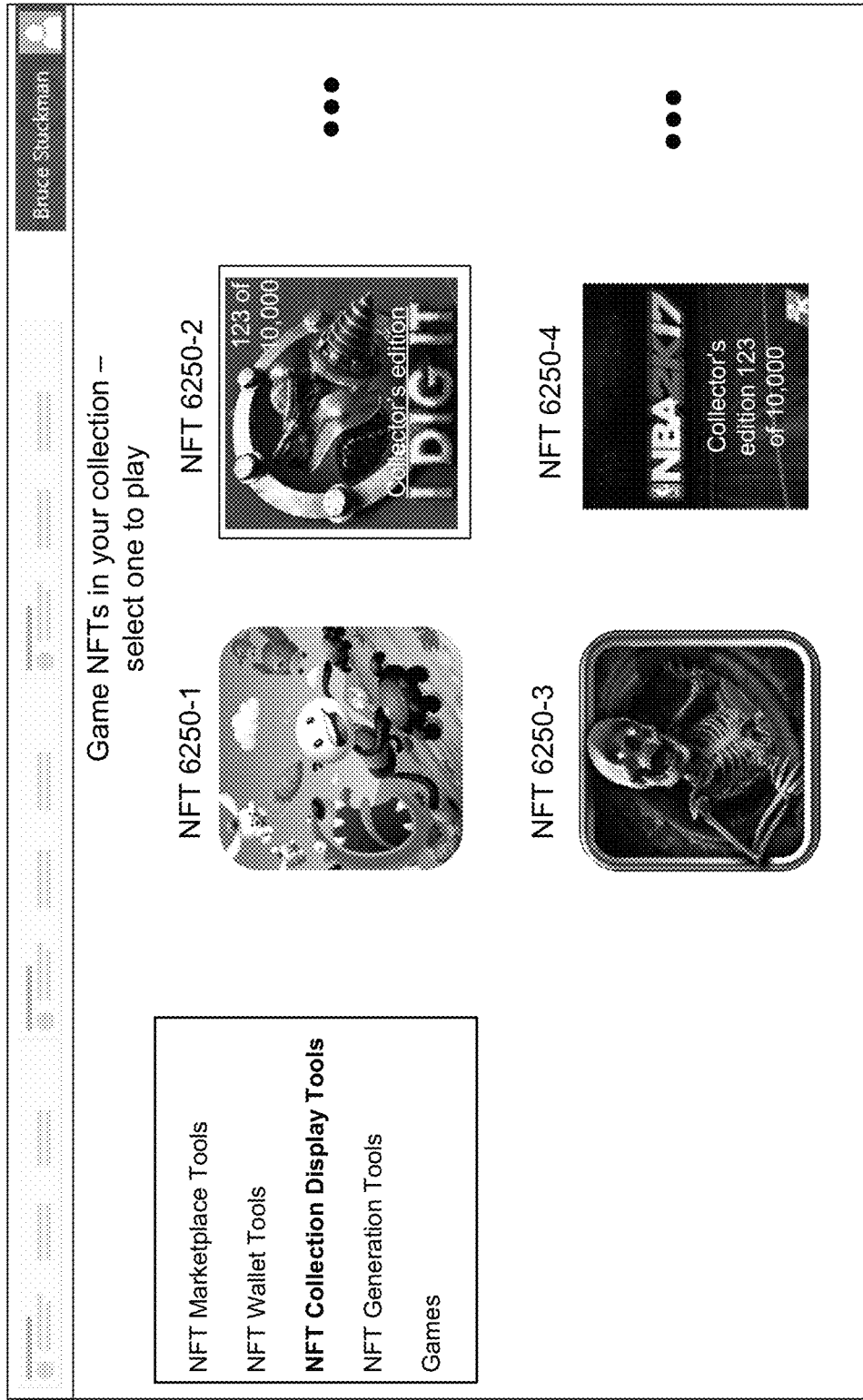

FIG. 62C presents a pictorial representation of an example screen display.

Figure 62D:
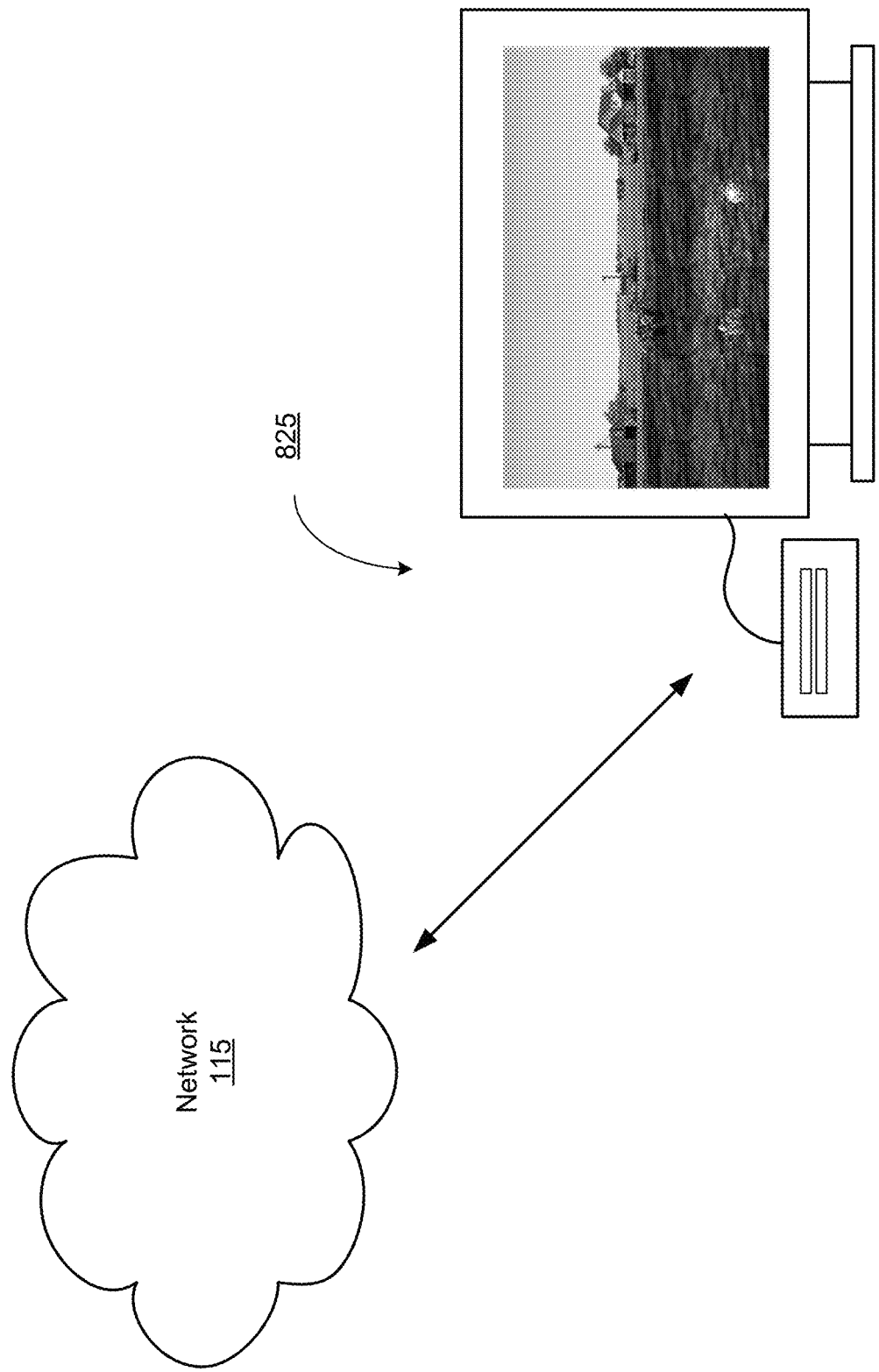

FIG. 62D presents a pictorial/block diagram representation of an example system with screen display.

Figure 62E:
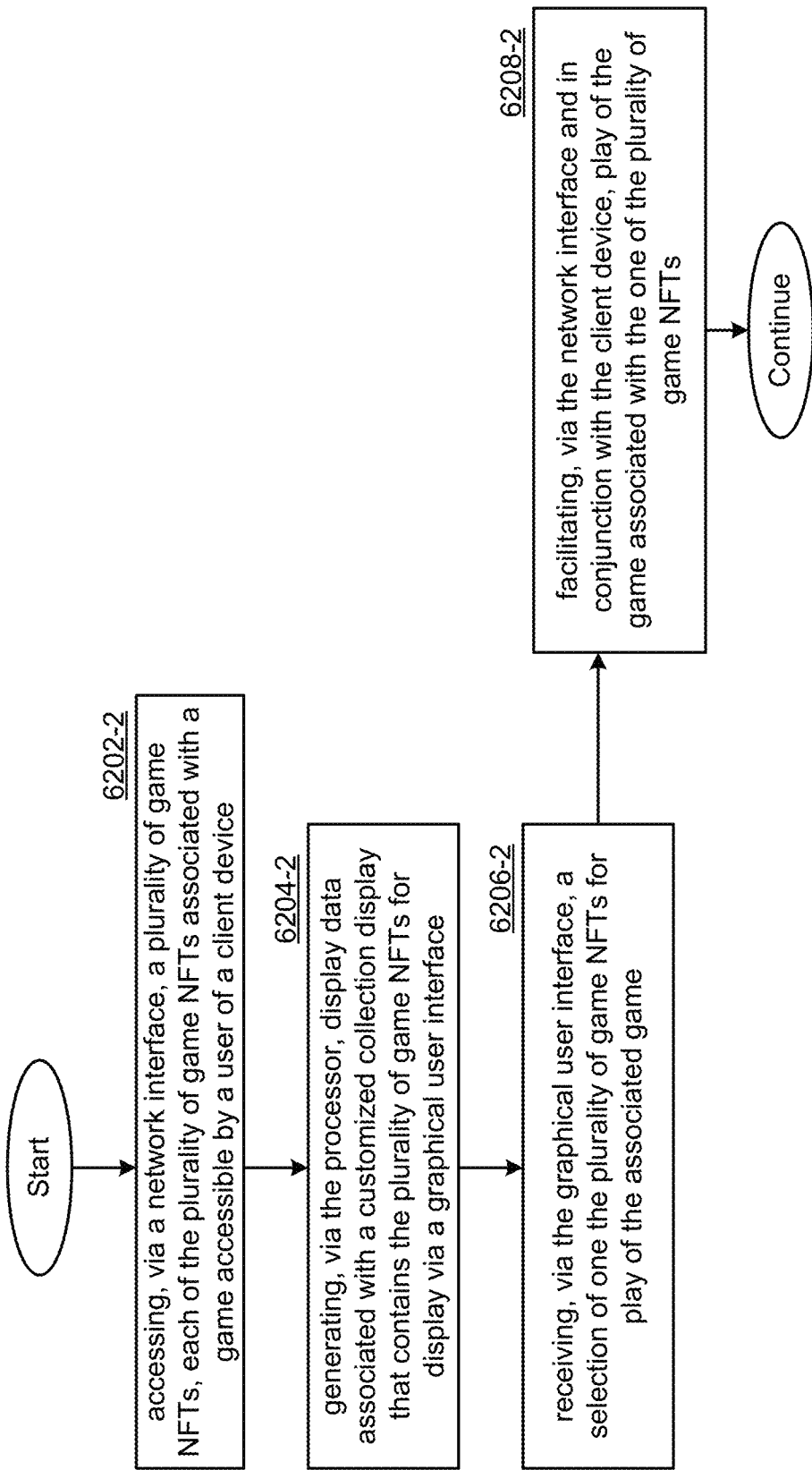

FIG. 62E presents a flowchart representation of an example method.

FIG. 62F presents a block diagram/flow representation of an example of NFT generation.

FIG. 62G presents a pictorial representation of an example NFT.

FIG. 62H presents a pictorial/flow representation of an example update to an NFT.

Figure 62I:
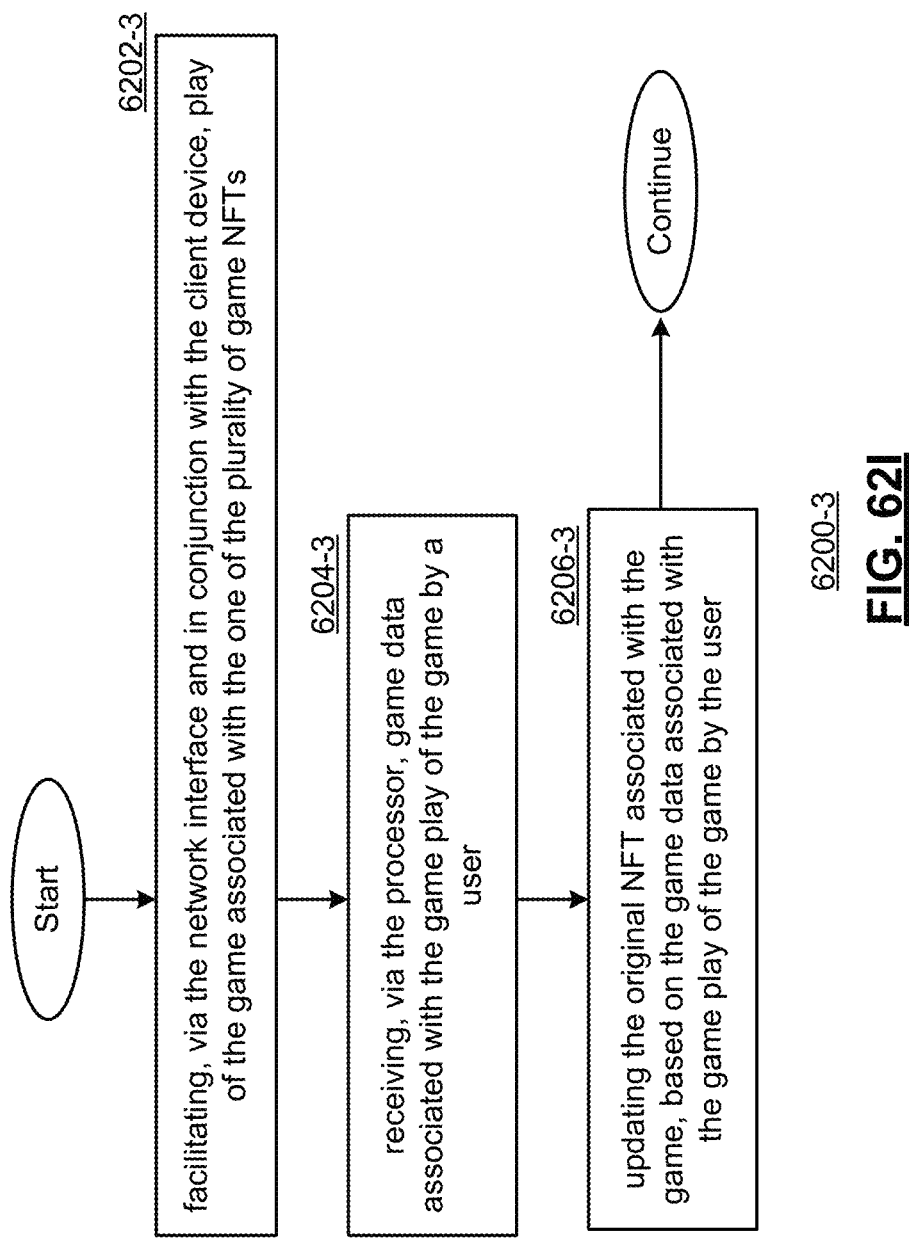

FIG. 62I presents a flowchart representation of an example method.

Figure 62K:
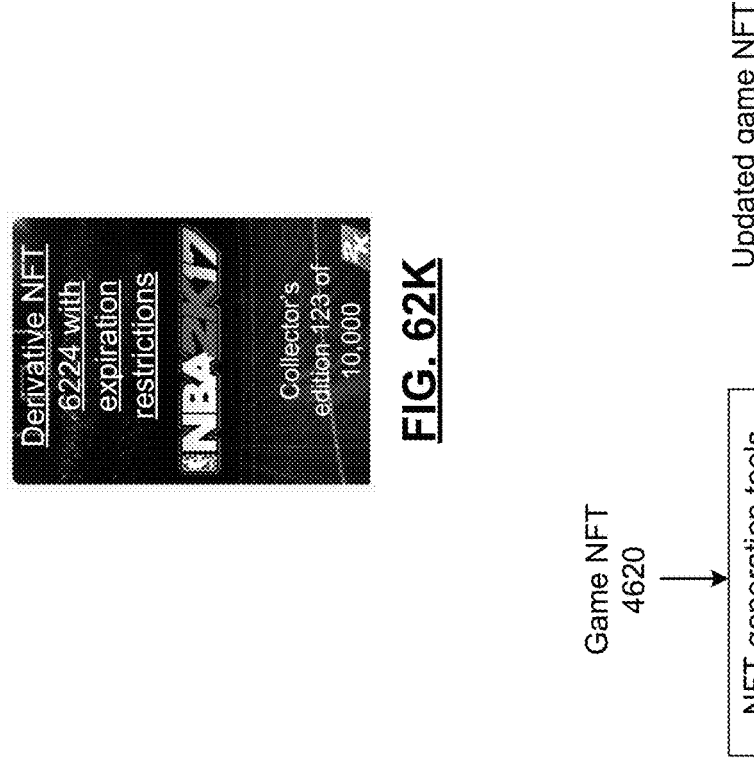
Figure 62M:
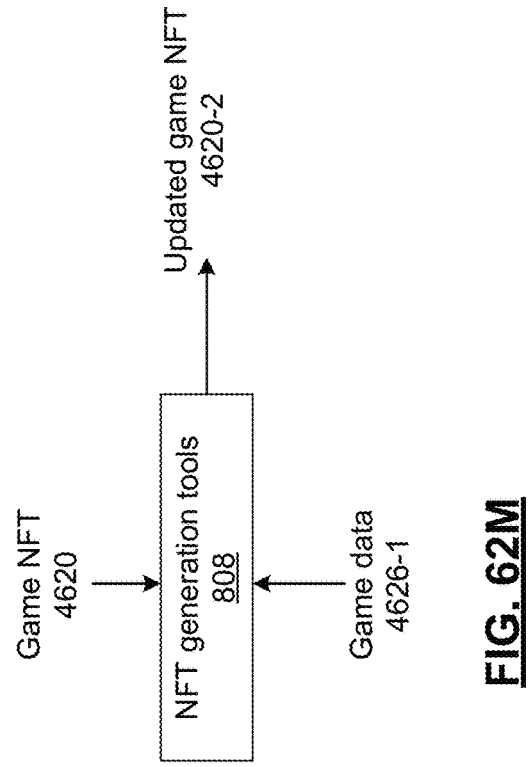
Figure 62J:
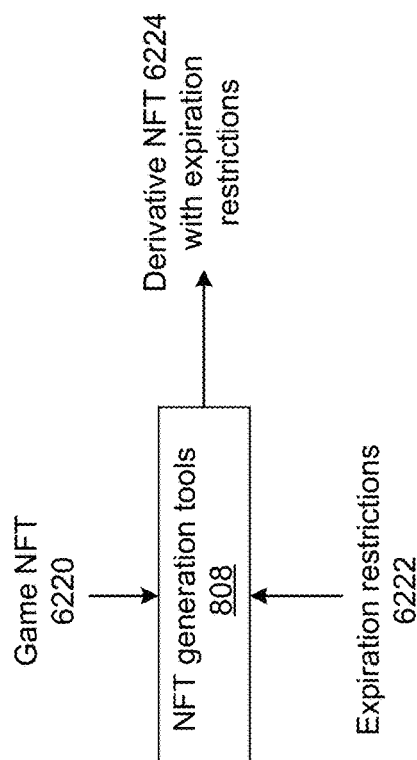

FIG. 62J presents a block diagram/flow representation of an example of NFT generation.

FIG. 62K presents a pictorial representation of an example derivative NFT.

Figure 62L:
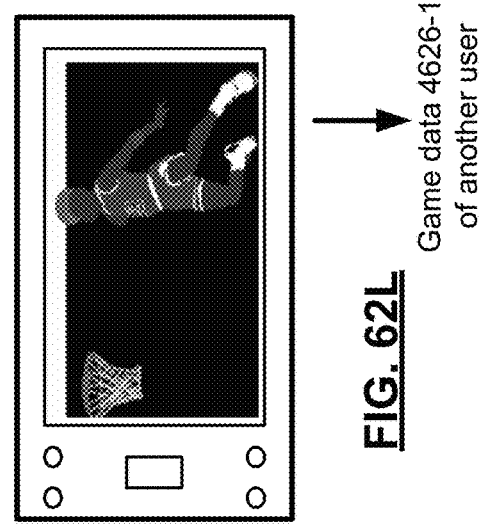

FIG. 62L presents a pictorial representation of an example client device.

FIG. 62M presents a block diagram/flow representation of an example of NFT generation.

Figure 62N:
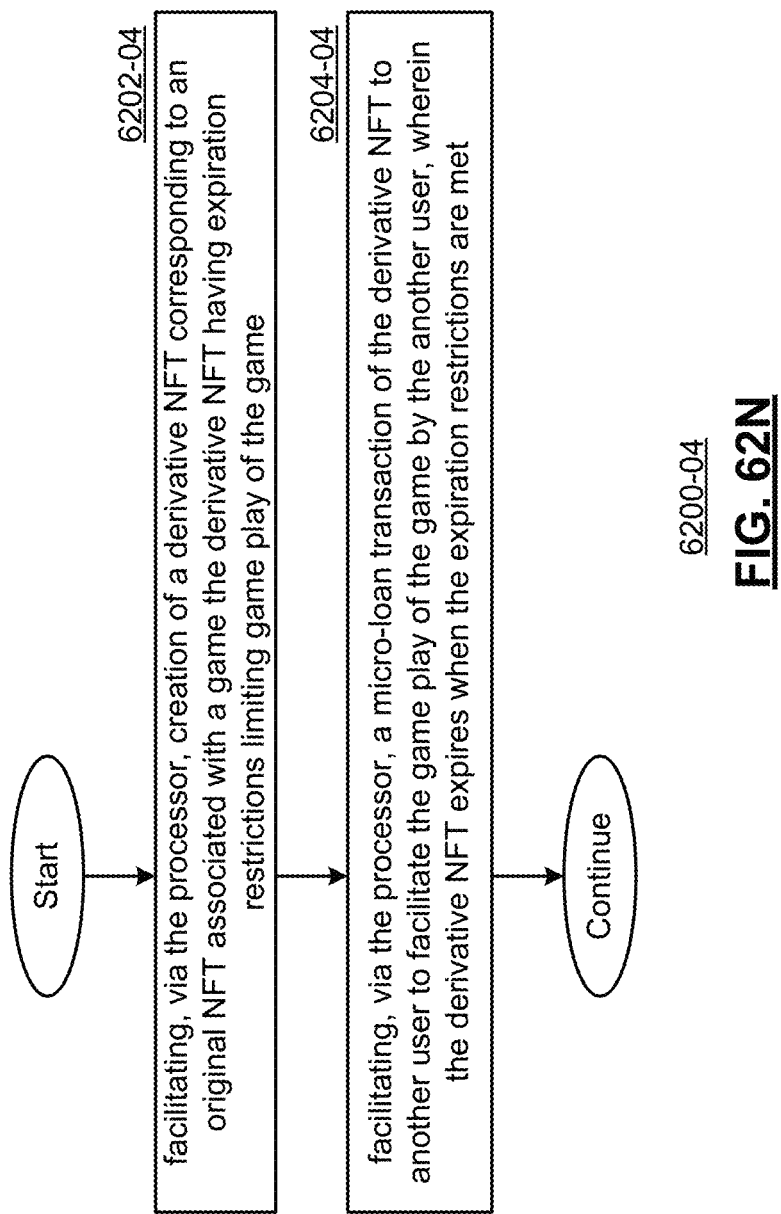

FIG. 62N presents a flowchart representation of an example method.

Figure 62O:
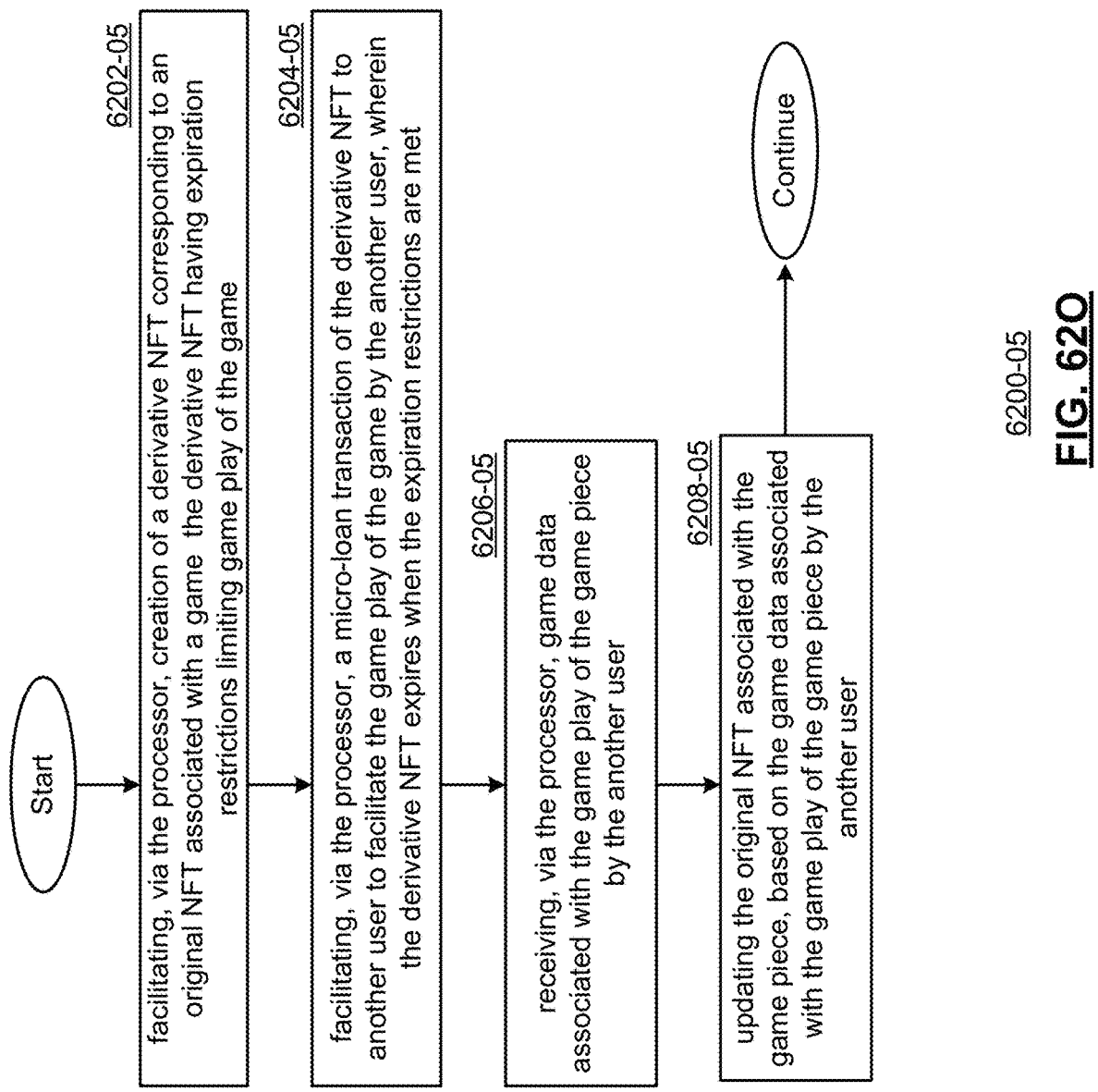

FIG. 62O presents a flowchart representation of an example method.

FIG. 62P presents a flowchart representation of an example method.

Figure 62Q:
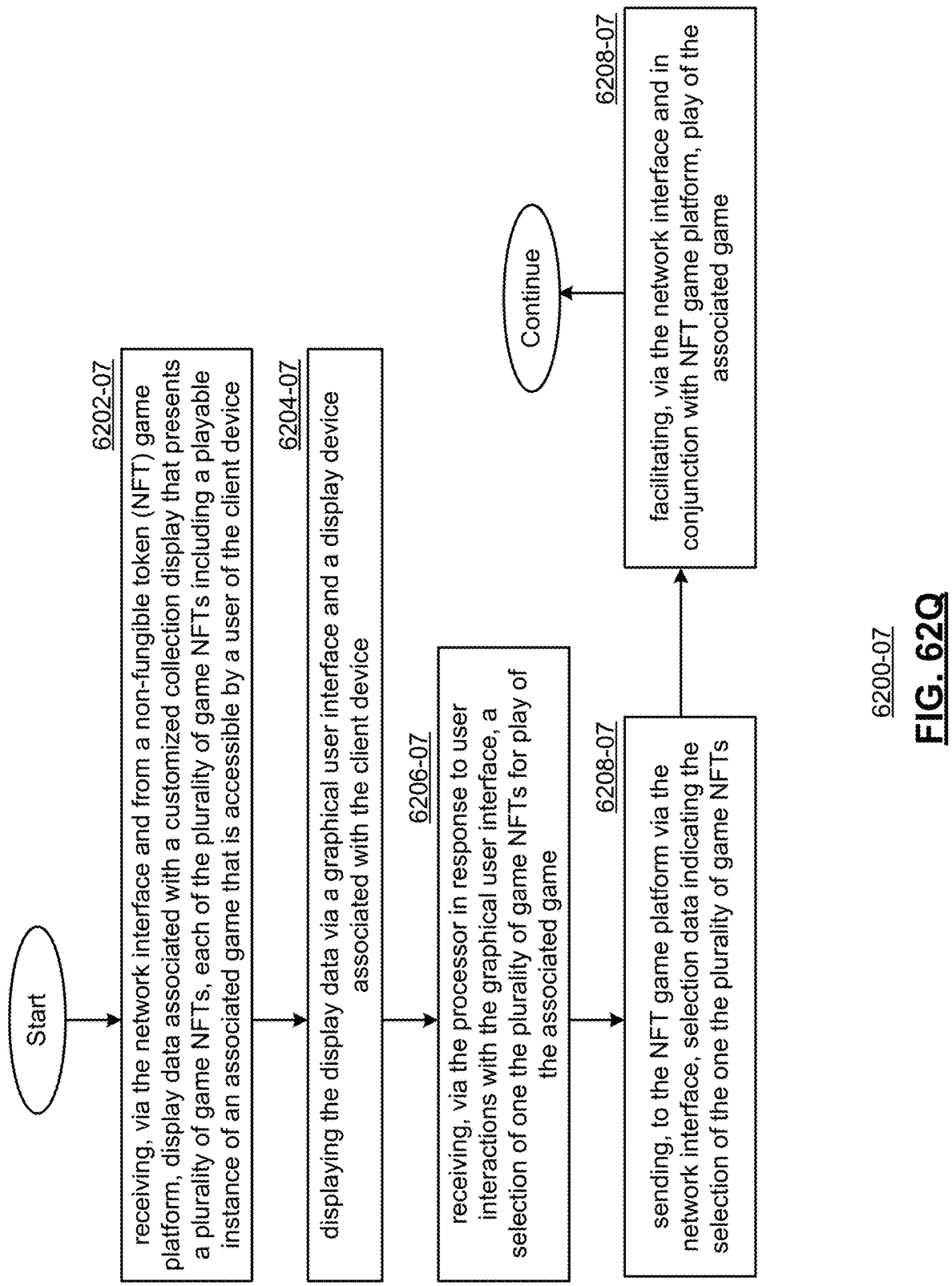

FIG. 62Q presents a flowchart representation of an example method.

Figure 63B:
Figure 63A:

FIG. 63A presents a block diagram/flow representation of an example of NFT generation.

FIG. 63B presents a pictorial representation of an example NFT.

Figure 63C:
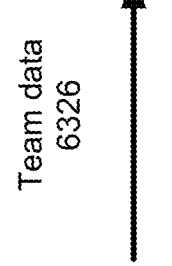

FIG. 63C presents a pictorial/flow representation of an example update to an NFT.

FIG. 63D presents a flowchart representation of an example method.

FIG. 63E presents a block diagram/flow representation of an example of NFT generation.

FIG. 63F presents a pictorial representation of an example NFT.

FIG. 63G presents a pictorial/flow representation of an example update to an NFT.

FIG. 63H presents a flowchart representation of an example method.

FIG. 63I presents a block diagram/flow representation of an example of NFT generation.

FIG. 63J presents a pictorial representation of an example NFT.

FIG. 63K presents a pictorial/flow representation of an example update to an NFT.

FIG. 63L presents a flowchart representation of an example method.

FIG. 63M presents a block diagram/flow representation of an example of NFT generation.

FIG. 63N presents a pictorial representation of an example NFT.

FIG. 63O presents a pictorial/flow representation of an example update to an NFT.

Figure 63P:
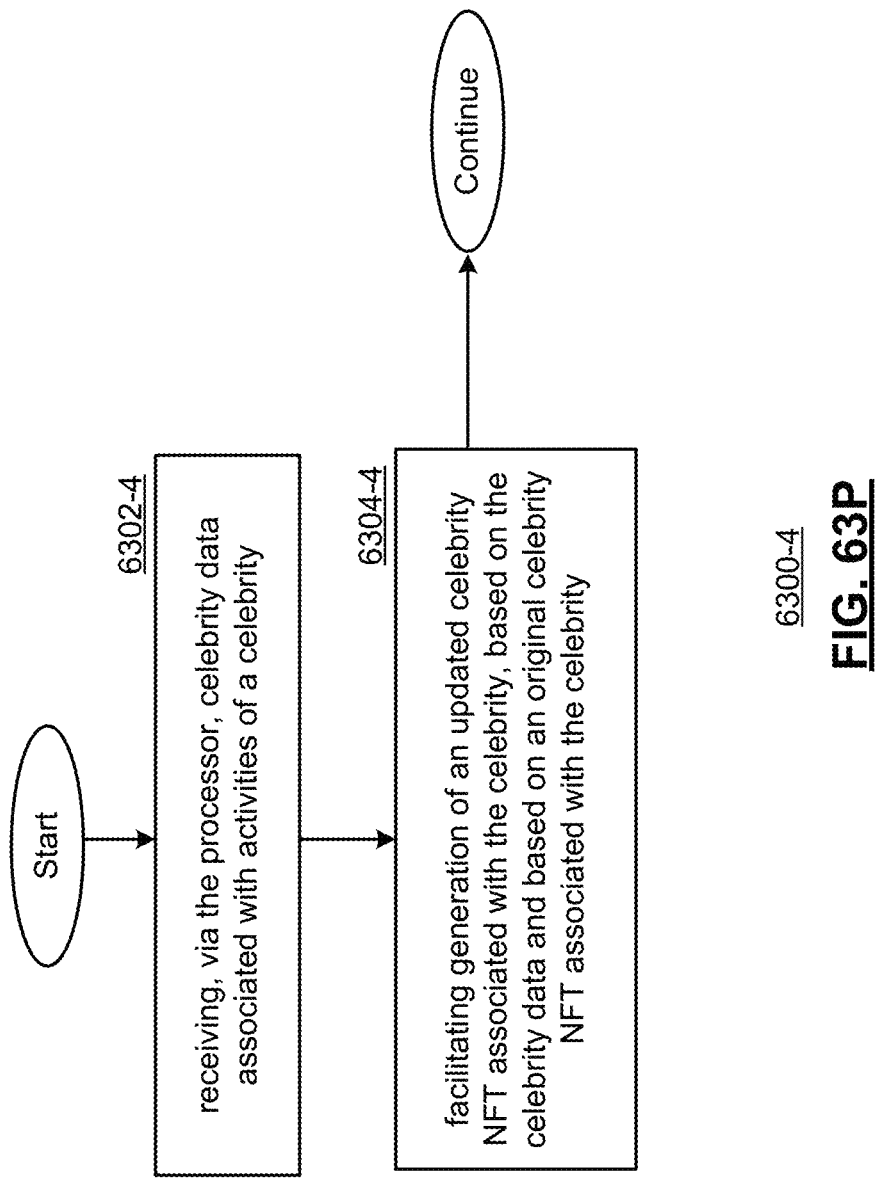

FIG. 63P presents a flowchart representation of an example method.

Figure 64A:
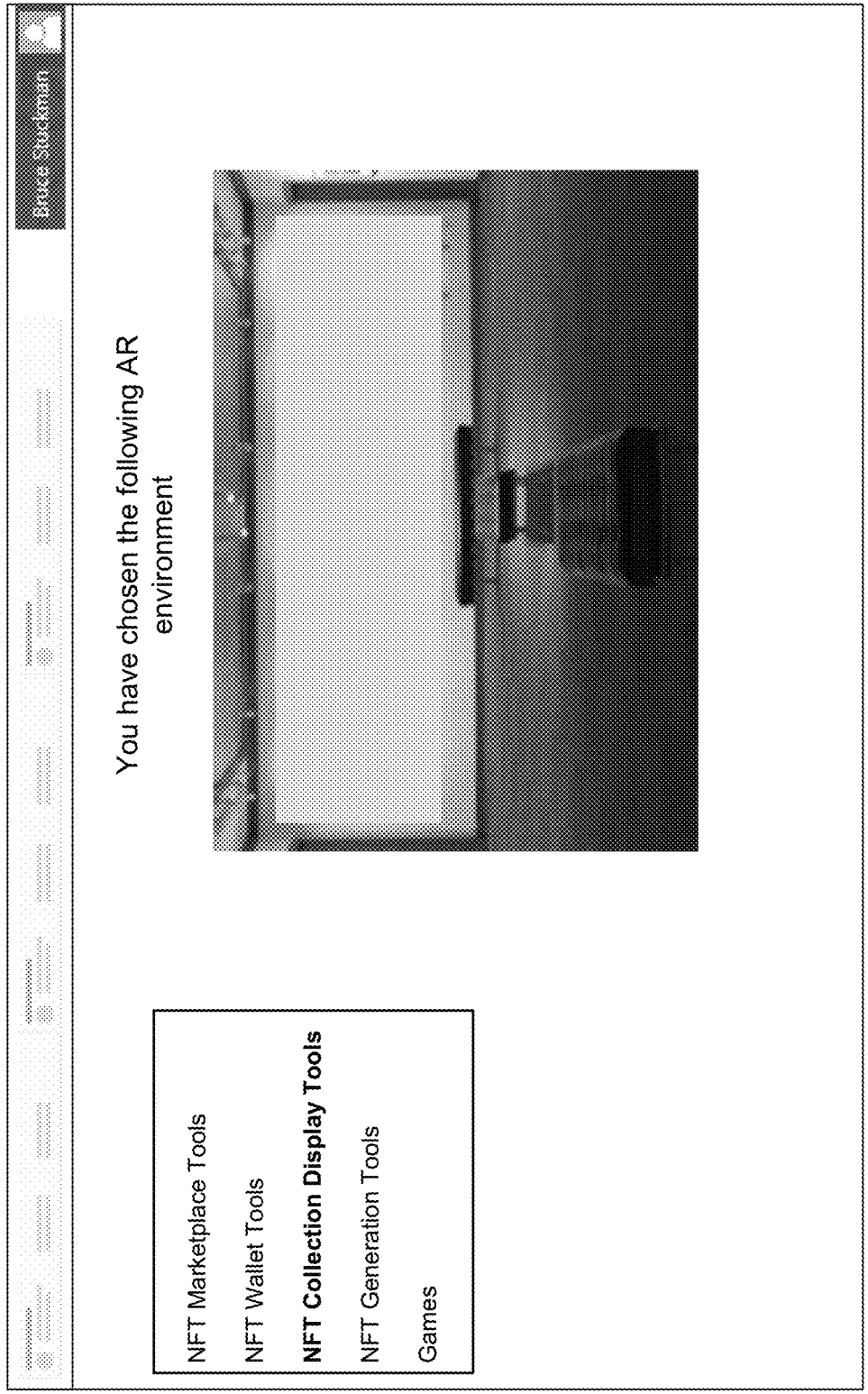

FIG. 64A presents a pictorial representation of an example screen display.

Figure 64B:
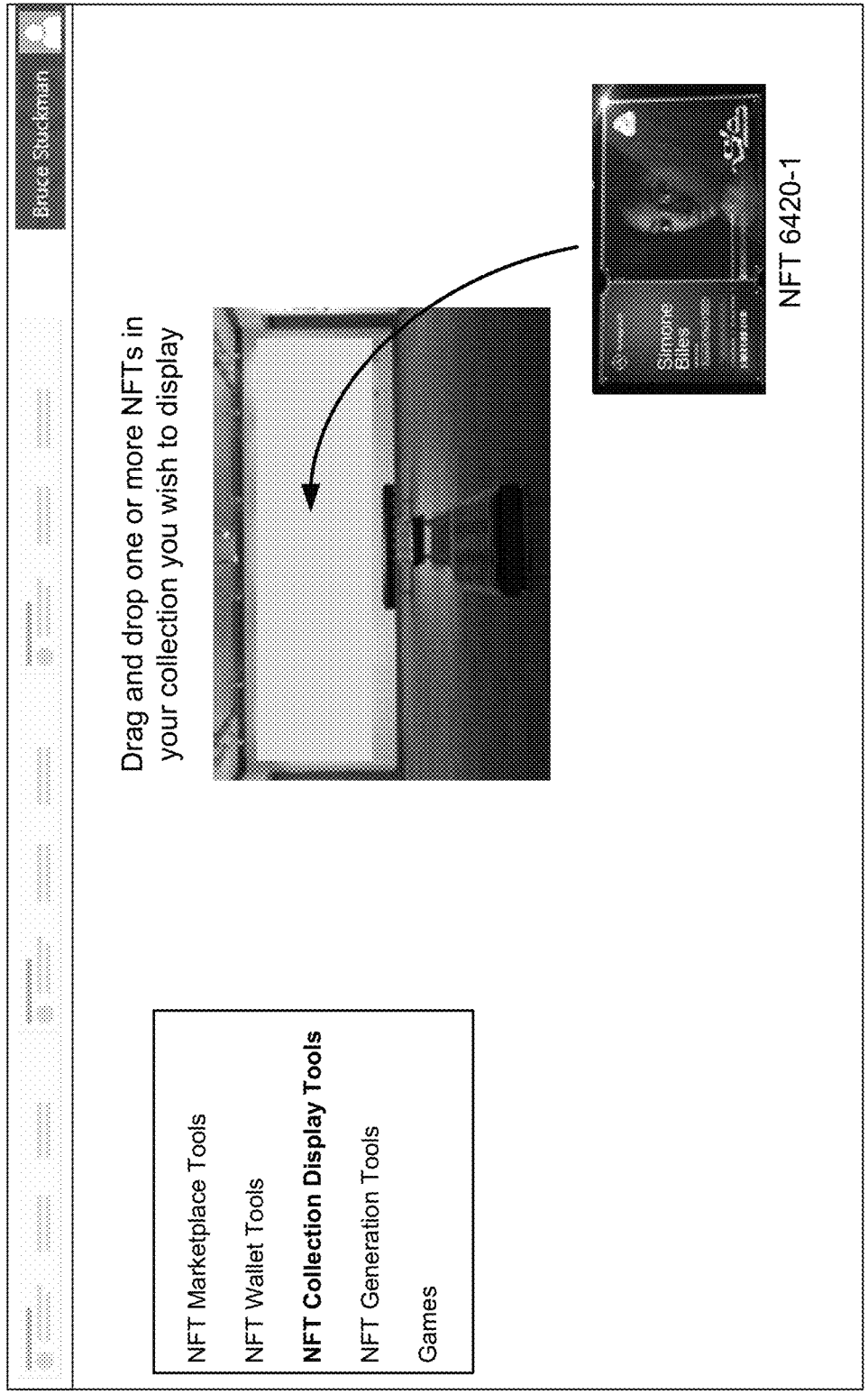

FIG. 64B presents a pictorial representation of an example screen display.

Figure 64C:
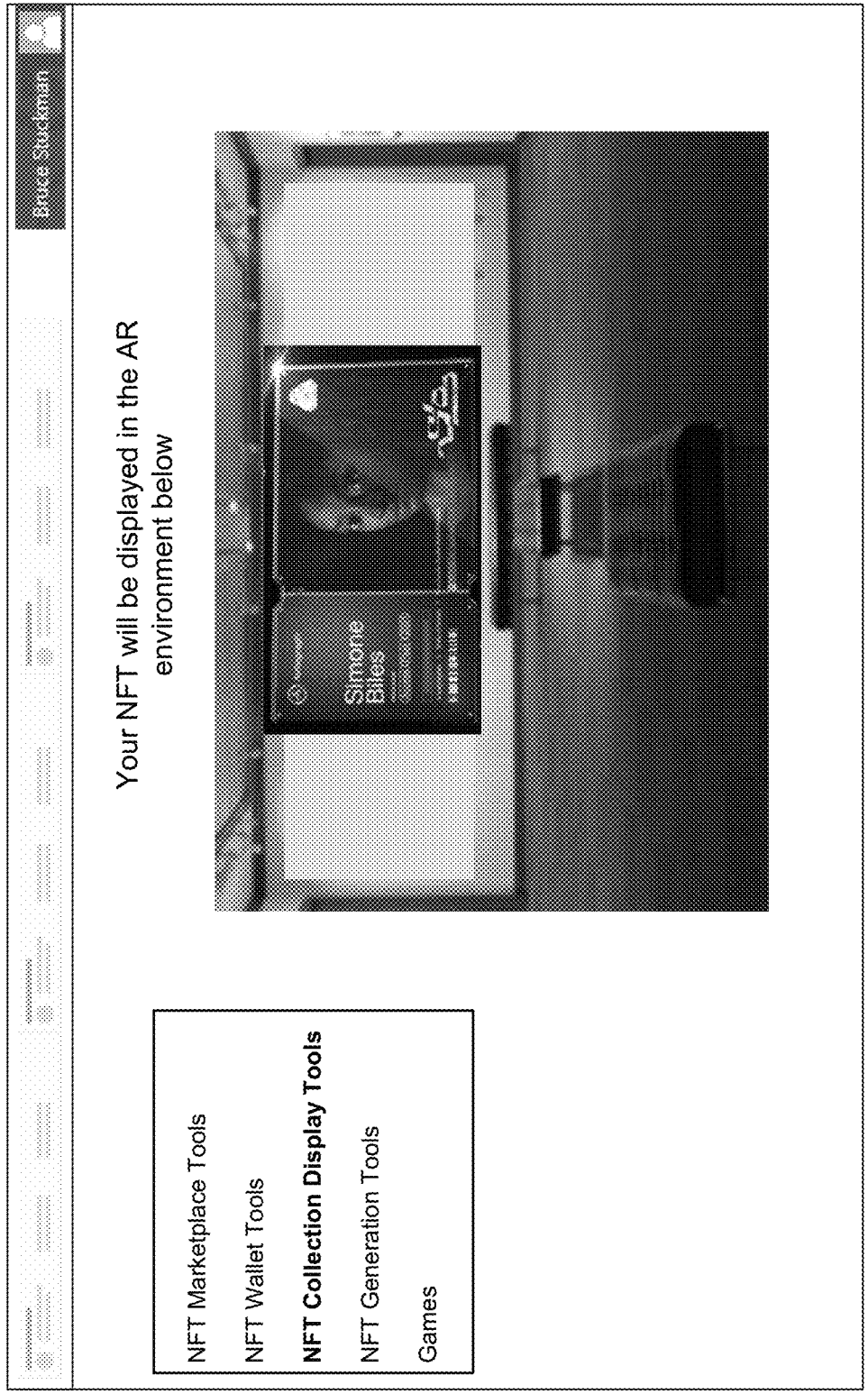

FIG. 64C presents a pictorial representation of an example screen display.

FIG. 64D presents a block diagram/flow representation of an example of the generation of AR environment display data.

FIG. 64E presents a block diagram/flow representation of an example of NFT generation.

FIG. 64F presents a pictorial/flow representation of an example update to an NFT.

FIG. 64G presents a flowchart representation of an example method.

FIG. 64H presents a flowchart representation of an example method.

DETAILED DESCRIPTION

Figure 1A:
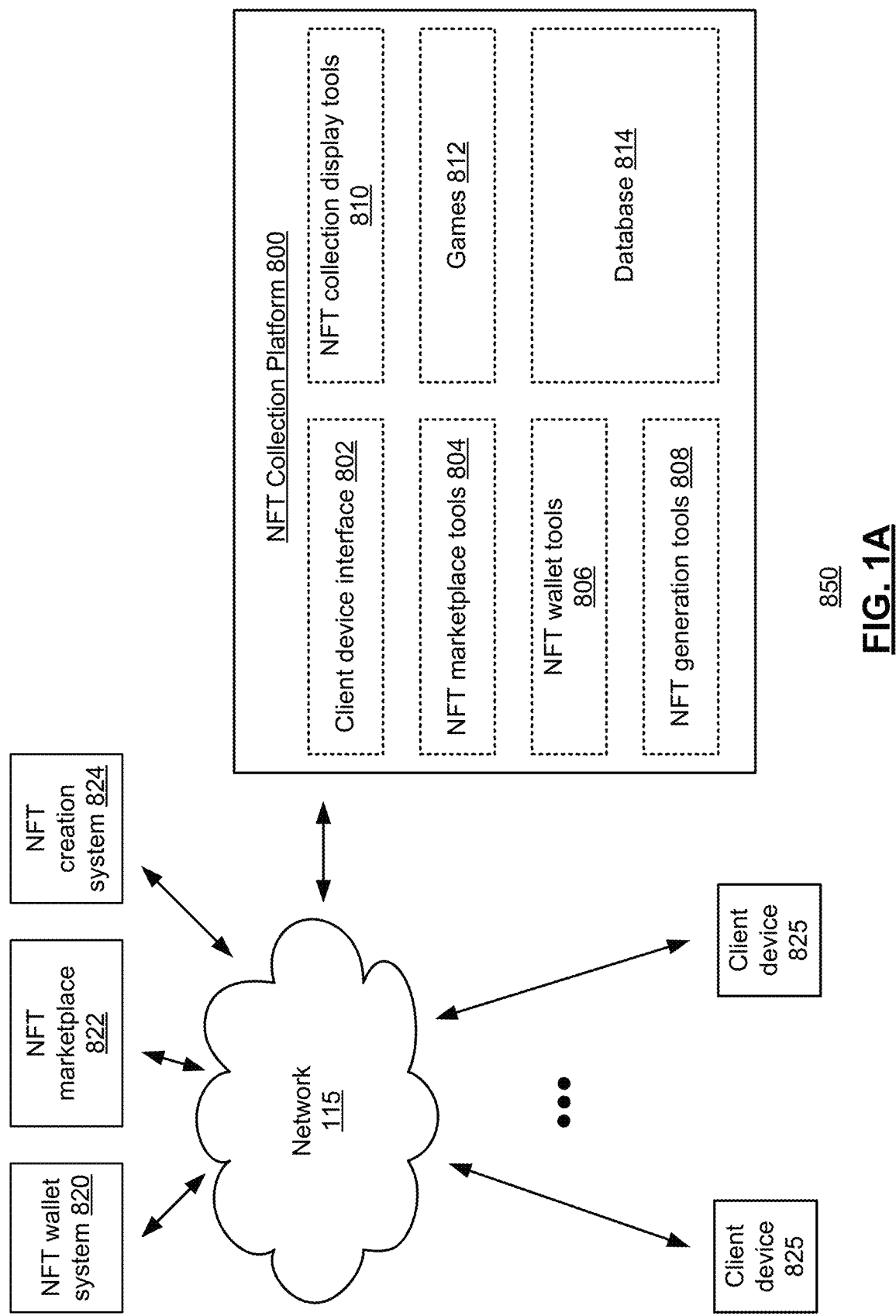
FIG. 1A presents a block diagram representation of an example system.

FIG. 1A presents a block diagram representation of an example system in accordance with various examples. In particular, a system 850 is presented that includes an NFT collection platform 800 that communicates with client devices 825 via a network 115. The network 115 can be the Internet or other wide area or local area network, either public or private. The client devices 825 can be computing devices such as laptops, smartphones, smart watches, tablets, desktops, or other computing devices associated with users, for example, buyers, sellers, collectors and/or users of NFTs.

NFT creation and ownership is growing worldwide. Existing platforms provide tools to create NFTs, marketplaces for buying and selling NFTs and wallets to securely hold them. Many NFT purchasers, however, view NFTs similarly to cryptocurrency, purely as financial investments to be collected and later sold. Unlike cryptocurrencies which are fungible tokens, NFTs have a non-fungible (e.g. unique or limited) component that can correspond to photographs, graphics, art, or other media or imagery that can be displayed.

In the example shown, the NFT collection platform 800 includes a client device interface 802 for interacting with the client devices 825, NFT marketplace tools 804, NFT wallet tools 806, NFT generation tools 808, NFT collection display tools 810, one or more games 812 that can be played using NFTs that have been collected including game NFTs that including playable game content, and a database 814 for storing user and account information, preferences, display settings and other data associated with users of the NFT collection platform 800. The NFT collection platform 800 can include or be implemented via a cloud computing system, InterPlanetary File System (IPFS) or other decentralized or distributed computer system of individual computers and/or nodes and/or a centralized computing system.

For example, the client device interface 802 can operate in conjunction with each client device 825 and via network 115 to generate a graphical user interface. This graphical user interface is based on display data generated by the NFT collection platform 800 in a format for display on a display device associated with the client devices 825. This graphical user interface generates input data that is received by the NFT collection platform 800 from the client devices 825 in response to user interaction with the graphical user interface.

In various examples, the NFT collection platform 800 can serve the needs of a collector of NFTs by providing a system that offers new experiences that support various collector behaviors in the NFT world and metaverse. The NFT collection display tools 810 can include a high-fidelity customizable page builder so each collector can personalize and display their NFTs in an environment. The NFT collection platform 800 can provide and support a collection social media site that, for example, is similar to My Space, Facebook, or OnlyFans, but specifically directed to the arrangement, posting, sharing and/or display of collections of NFTs.

In the most basic mode of operation, the NFT collection platform 800 improves the technology of NFT systems by allowing the user to collect, arrange and display NFTs they have purchased so that the user, and other users, can enjoy and admire the NFTs they have collected. The NFT collection platform 800 not only allows users to curate, display and use their collections, but also allows uses to create a social/professional profile of their NFT property—enabling users to get creative with how their collections are presented, used and displayed. In addition, when a group of NFTs is collected and/or when a personalized/curated collection page, set and/or collection display is built, the NFT collection platform 800 improves the technology of NFT systems by allowing the user to mint a new "collection NFT" using blockchain-based, distributed computer network, and/or other crypto-based NFT creation techniques, for example and authenticated based on the user's ownership of the underlying NFTs.

Furthermore, the NFT collection platform 800 allows users to buy, sell, loan, borrow and trade NFTs with other users, including their own collection NFTs created based on their own collections. In various examples, the NFT collection platform 800 may not include a NFT creator, marketplace or wallet itself. The NFT generation tools 808, NFT wallet tools 806 and NFT marketplace tools 804 can reside on the NFT collection platform 800 and interface with one or more NFT wallet systems 820, NFT marketplaces 822 and/or NFT creation systems 824 to enable transactions/interactions/abilities at a metaverse level, offering collectors new and unique experiences, pre and post purchase, across all different NFT's and blockchains in one place. The NFT collection platform 800 improves the technology of NFT systems by allowing the user to perform the functions above in a fashion, that can be blockchain, wallet, and marketplace agnostic.

It should be noted that the system 850 can operate via blockchain-based technologies. In blockchain, a growing list of records, called "blocks", are linked together using cryptography and spread over a decentralized computer system/network or other distributed network of participants. Each block contains a cryptographic hash of the previous block, a timestamp, and transaction data (generally represented as a Merkle tree). The timestamp proves that the transaction data existed when the block was published in order to get into its hash. As blocks each contain information about the block previous to it, they form a chain, with each additional block reinforcing the ones before it. Therefore, blockchains are resistant to modification of their data because once recorded, the data in any given block cannot be altered retroactively without altering all subsequent blocks. The distributed nature of this process over different nodes, the contemporaneous nature of geographically distinct calculations, coupled with the extreme computational complexity of the required calculations means that these blockchain-based technologies cannot practically be performed by the human mind.

It should be noted, that while the NFT wallet system 820, NFT marketplace 822 and NFT creation system 824 are shown as separate entities and as being external to the NFT collection platform 800, other configurations are possible where two or more of these entities share a common platform and/or the functions and features of one or more of these entities can be incorporated within the NFT collection platform 800 itself.

It should also be noted that while client device interface 802, NFT marketplace tools 804, NFT wallet tools 806, NFT generation tools 808, NFT collection display tools 810, games 812 and database 814 are shown as being internal to the NFT collection platform 800, in other examples, any subset of the various elements of the NFT collection platform 800 can be implemented external to the NFT collection platform 800 and coupled to the other components via the network 115. Furthermore, the NFT collection platform 800 can be implemented in a cloud computing configuration with any or all of the various elements of the NFT collection platform 800 implemented within the cloud.

The further operation of this system will be described in greater detail in conjunction with the figures that follow, including several optional functions and features and examples thereof.

Figure 1B:
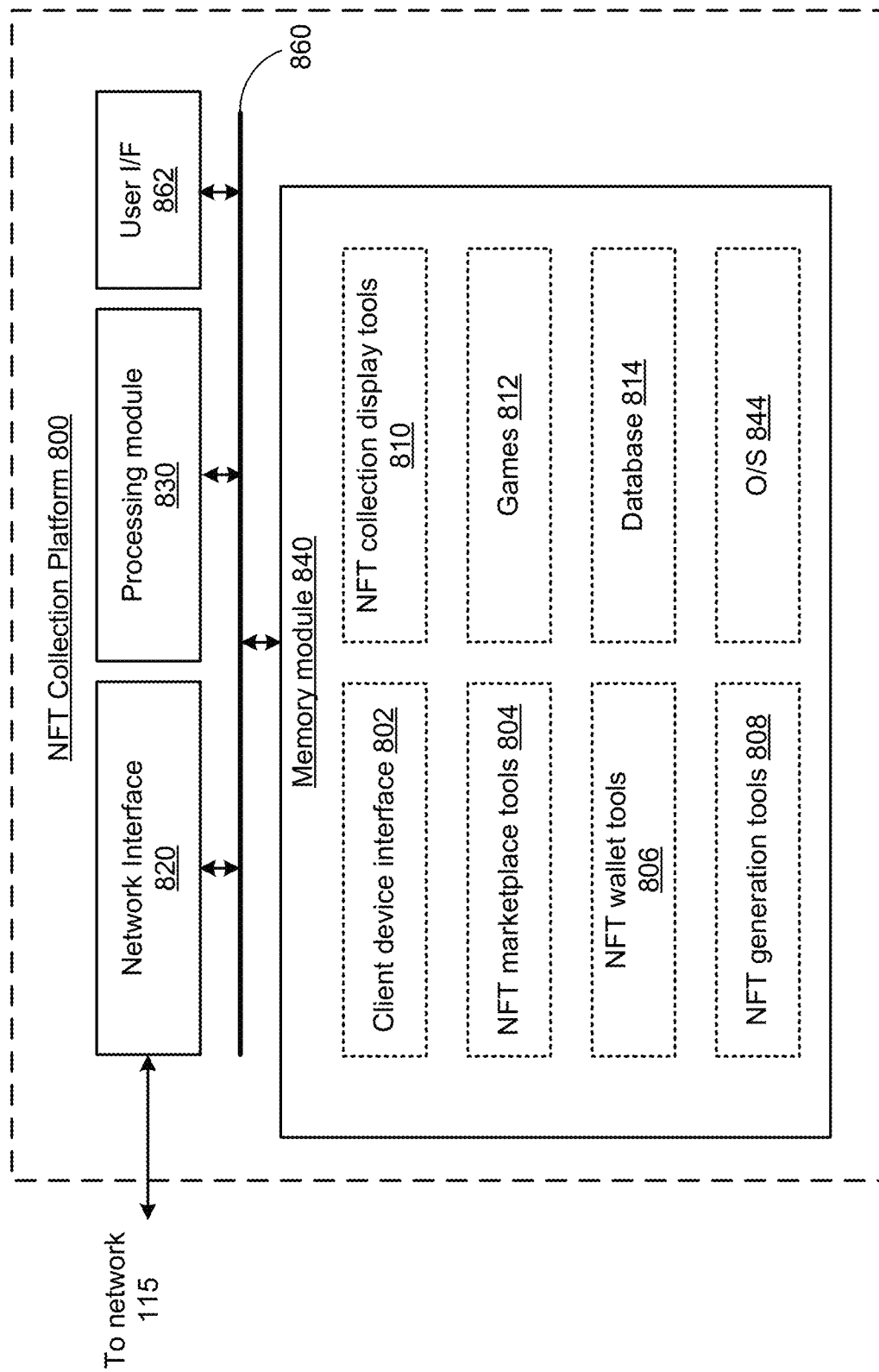
FIG. 1B presents a block diagram representation of an example non-fungible token (NFT) collection platform.

FIG. 1B presents a block diagram representation of an NFT collection platform 800 in accordance with various examples. In particular, the NFT collection platform 800 includes a network interface 820 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via the network 115.

The NFT collection platform 800 also includes a processing module 830 and memory module 840 that stores an operating system (O/S) 844 such as an Apple, Unix, Linux or Microsoft operating system or other operating system, client device interface 802, NFT marketplace tools 804, NFT wallet tools 806, NFT generation tools 808, NFT collection display tools 810, games 812 and database 814. In particular, the O/S 844, the client device interface 802, NFT marketplace tools 804, NFT wallet tools 806, NFT generation tools 808, NFT collection display tools 810, and games 812 each include operational instructions that, when executed by the processing module 830, cooperate to configure the processing module 830 into a special purpose device to perform the particular functions of the NFT collection platform 800 described herein.

The NFT collection platform 800 may include a user interface (I/F) 862 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to an administrator of the NFT collection platform 800 and that generate data in response to the administrator's interaction with NFT collection platform 800.

The processing module 830 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 840. The memory module 840 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 860, other architectures are possible including additional data buses and/or direct connectivity between one or more elements. Further, the NFT collection platform 800 can include one or more additional elements that are not specifically shown.

Figure 2:
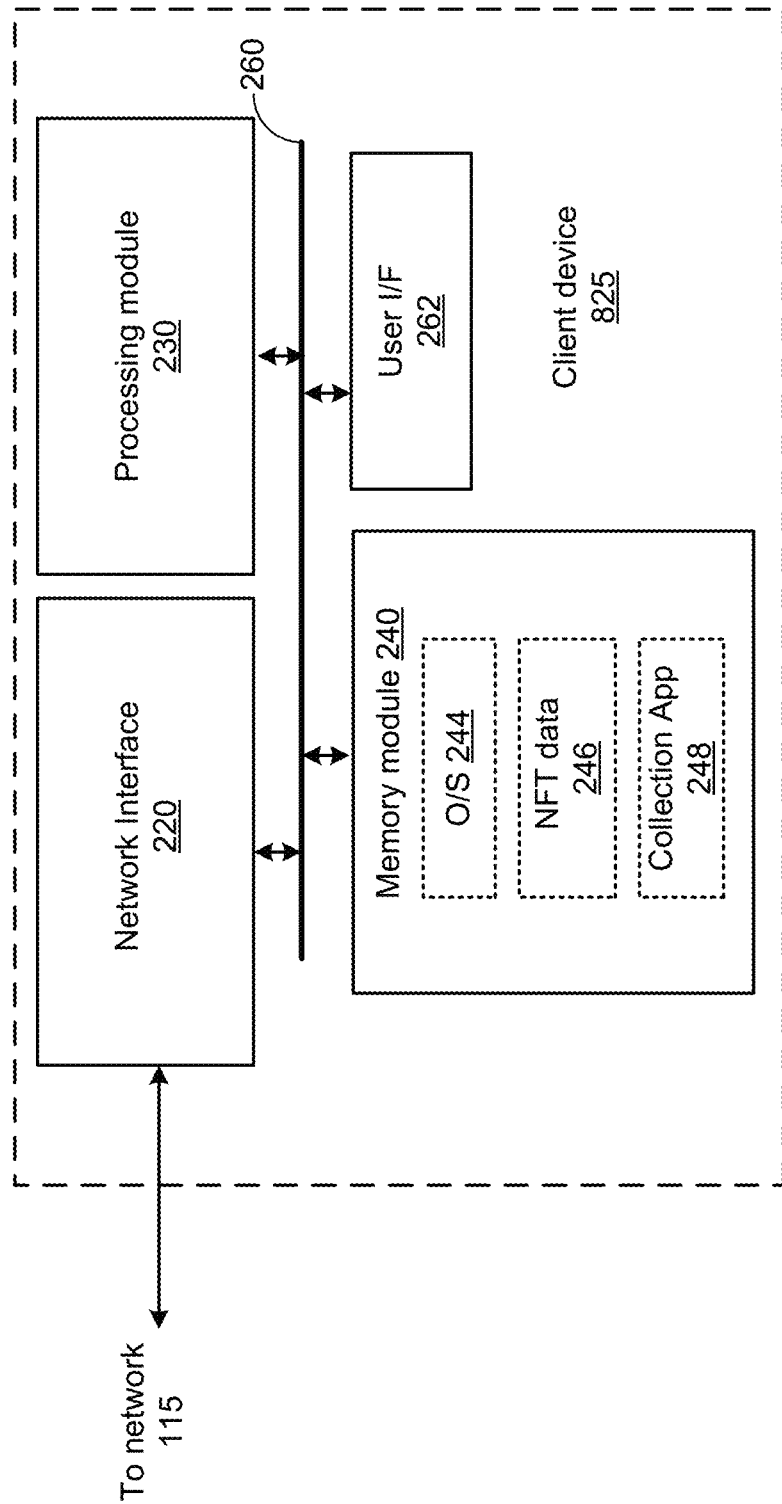
FIG. 2 presents a block diagram representation of an example client device.

FIG. 2 presents a block diagram representation of an example client device in accordance with various examples. In particular, a client device 825 is presented that includes a network interface 220 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via network 115.

The client device 825 also includes a processing module 230 and memory module 240 that stores an operating system (O/S) 244 such as an Apple, Unix, Linux or Microsoft operating system or other operating system, NFT data 246 associated with one or more NFTs owned by the user, and/or a collection applications 248. In particular, the O/S 244 and collection application 248 each include operational instructions that, when executed by the processing module 230, cooperate to configure the processing module into a special purpose device to perform the particular functions of the client device 825 described herein.

The client device 825 also includes a user interface (I/F) 262 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the client device 825 and that generate data in response to the user's interaction with the client device 825.

The processing module 230 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 240. The memory module 240 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the client device 825 can include one or more additional elements that are not specifically shown.

The client device 825 operates, via network interface 220, network 115 and NFT collection platform 800. In various examples, the client device 825 operates to display a graphical user interface generated based on display data from the NFT collection platform 800, including corresponding screen displays. Furthermore, the graphical user interface can operate in response to interactions by a user to generate input data that is sent to the NFT collection platform 800 to control the operation of the NFT collection platform 800 and/or to provide other input.

It should be noted that while the client devices 825 and NFT collection platform 800 are shown as separate devices that communicate via the network 115, it should be noted that any and all of the functionality attributed to the NFT collection platform 800, including the NFT marketplace tools 804, NFT wallet tools 806, NFT generation tools 808, NFT collection display tools 810, games 812, and database 814, etc. can likewise be incorporate directly into the client device 825. In this fashion, a client device 825 through the application of its operating system 244 and one or more applications can provide a graphical user interface to operate via network 115 but independently from any NFT collection platform to perform any of the functions and features described herein. In particular, the client device 825 can perform the functions of both the client device and the NFT collection platform 800 without requiring communications to be sent to the client device 825 from a NFT collection platform and communications sent to a NFT collection platform from the client device 825.

Figure 3A:
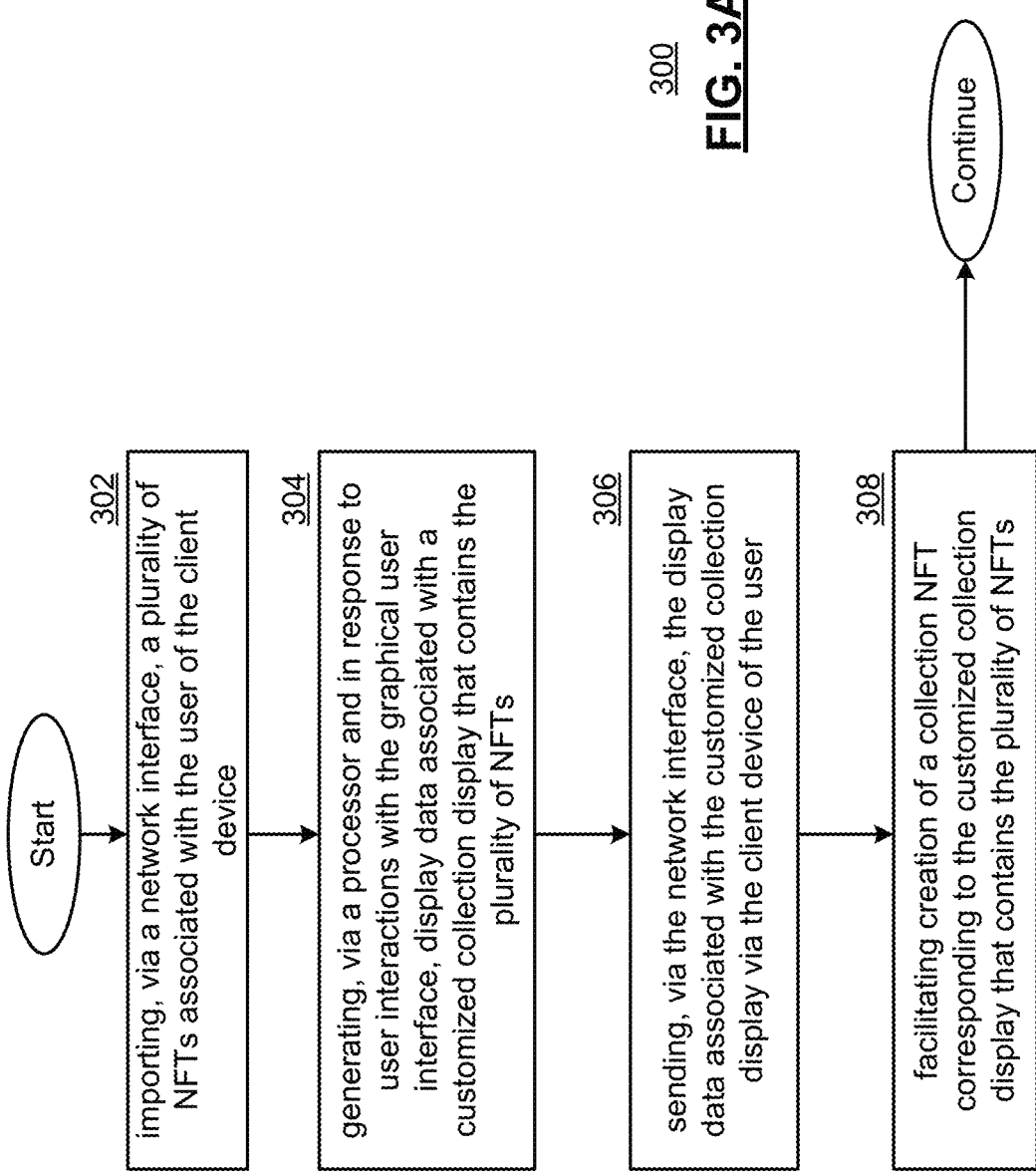
FIG. 3A presents a flowchart representation of an example method.

FIG. 3A presents a flowchart representation of an example method in accordance with various examples. In particular, a method 300 for use in conjunction with any of the functions and features previously described for generating a collection NFT based on NFTs in a user's collection.

Step 302 includes importing, via a network interface, a plurality of NFTs associated with the user of the client device. Step 304 includes generating, via a processor and in response to user interactions with the graphical user interface, display data associated with a customized collection display that contains the plurality of NFTs. Step 306 includes sending, via the network interface, the display data associated with the customized collection display via the client device of the user. Step 308 includes facilitating creation of a collection NFT corresponding to the customized collection display that contains the plurality of NFTs.

FIGS. 3B-3F and 3H present pictorial representations of example screen displays. In particular, screen displays of a graphical user interface generated based on display data from the NFT collection platform 800 are shown. In the example below, three NFTs are used to design and create a new collection NFT based on a common theme, the 1999 Chicago Bulls team in the National Basketball association.

Figure 3B:
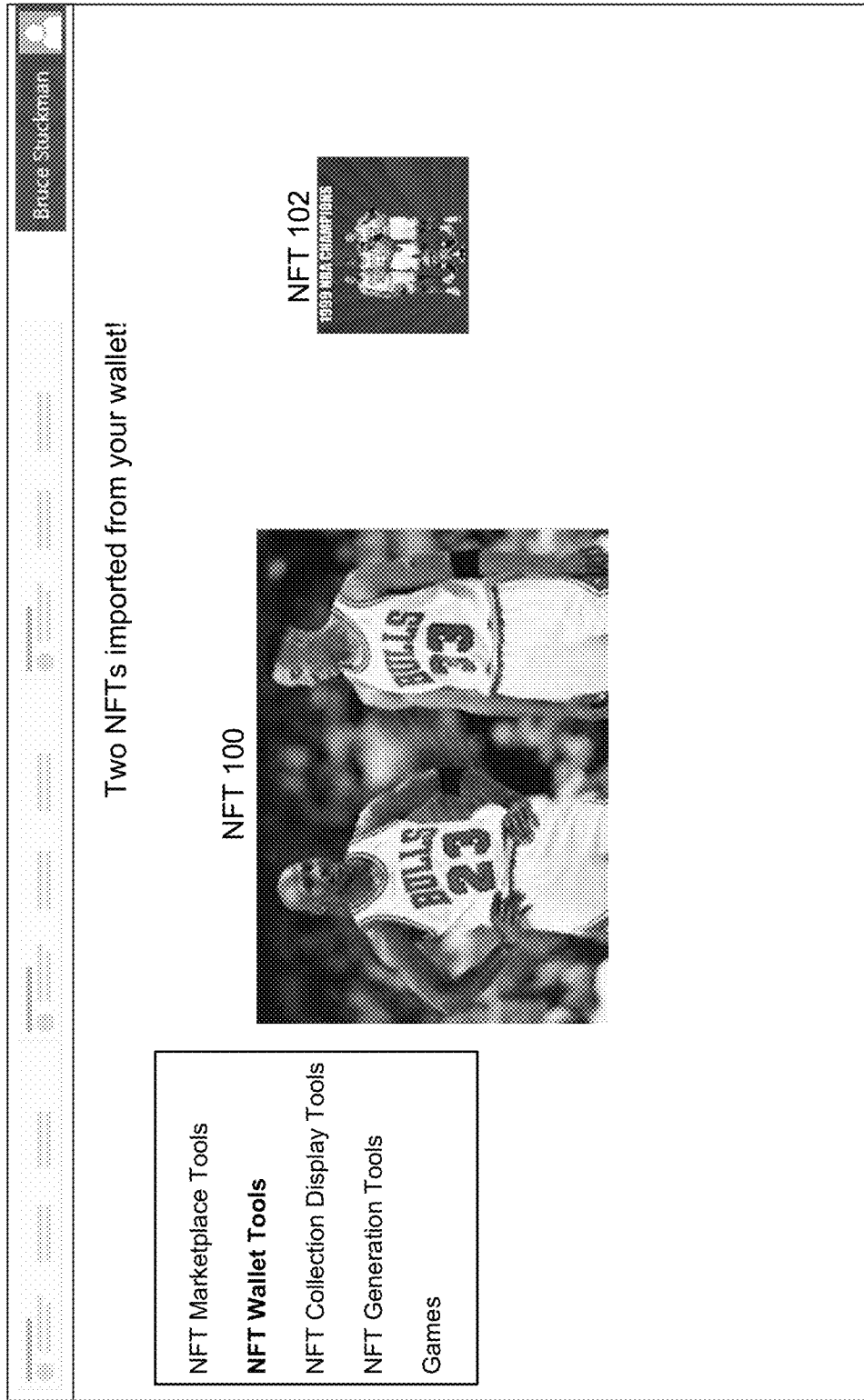
FIGS. 3B-3F and 3H present pictorial representations of example screen displays.

In FIG. 3B, the user "Bruce Stuckman" is logged into the NFT collection platform 800. The user has interacted with NFT wallet tools, such as NFT wallet tools 804, to import NFTs 100 and 102 from his wallet residing in NFT wallet system 820. In this example, the NFTs 100 and 102 are blockchain authenticated original photographs depicting two different images of the 1999 Chicago Bulls.

Figure 3C:
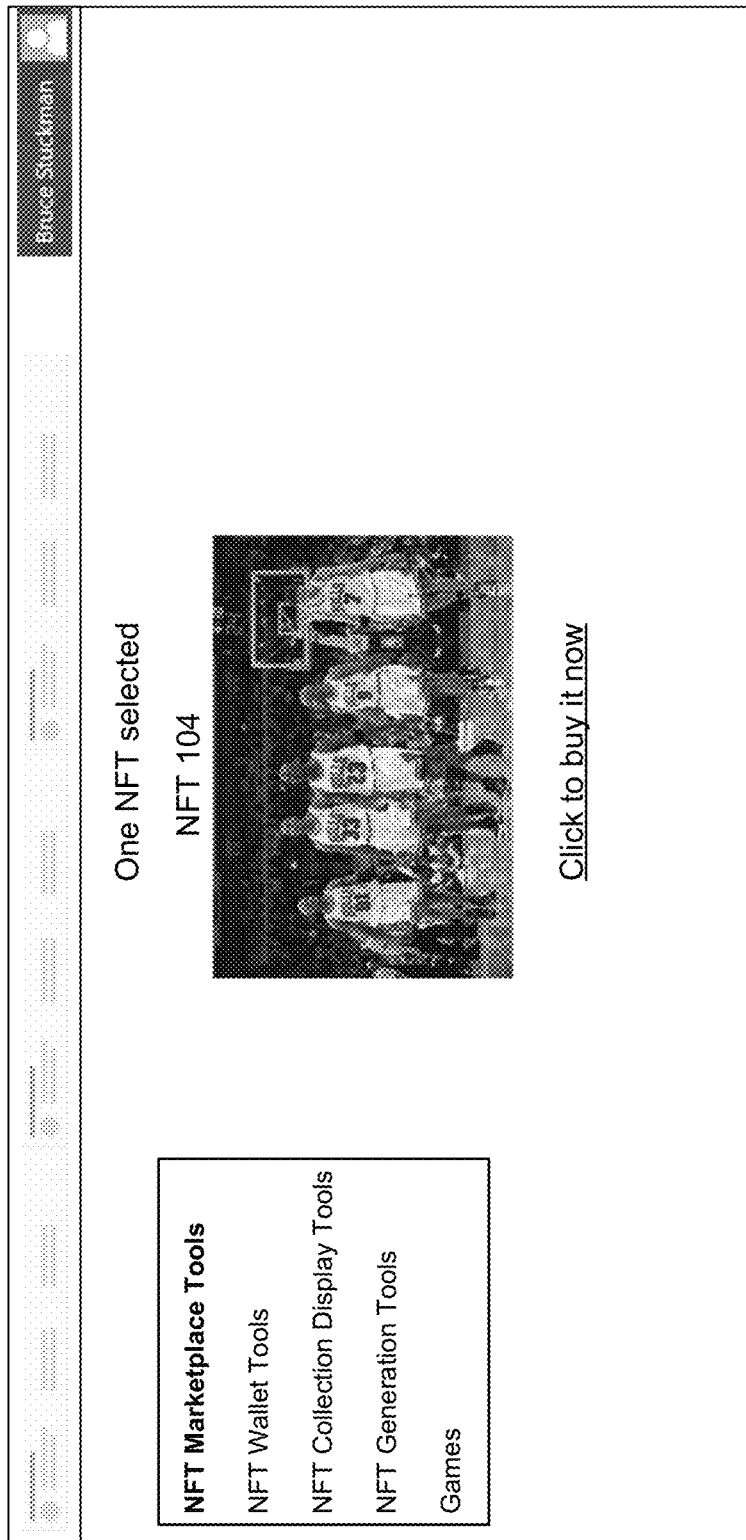
Figure 3D:
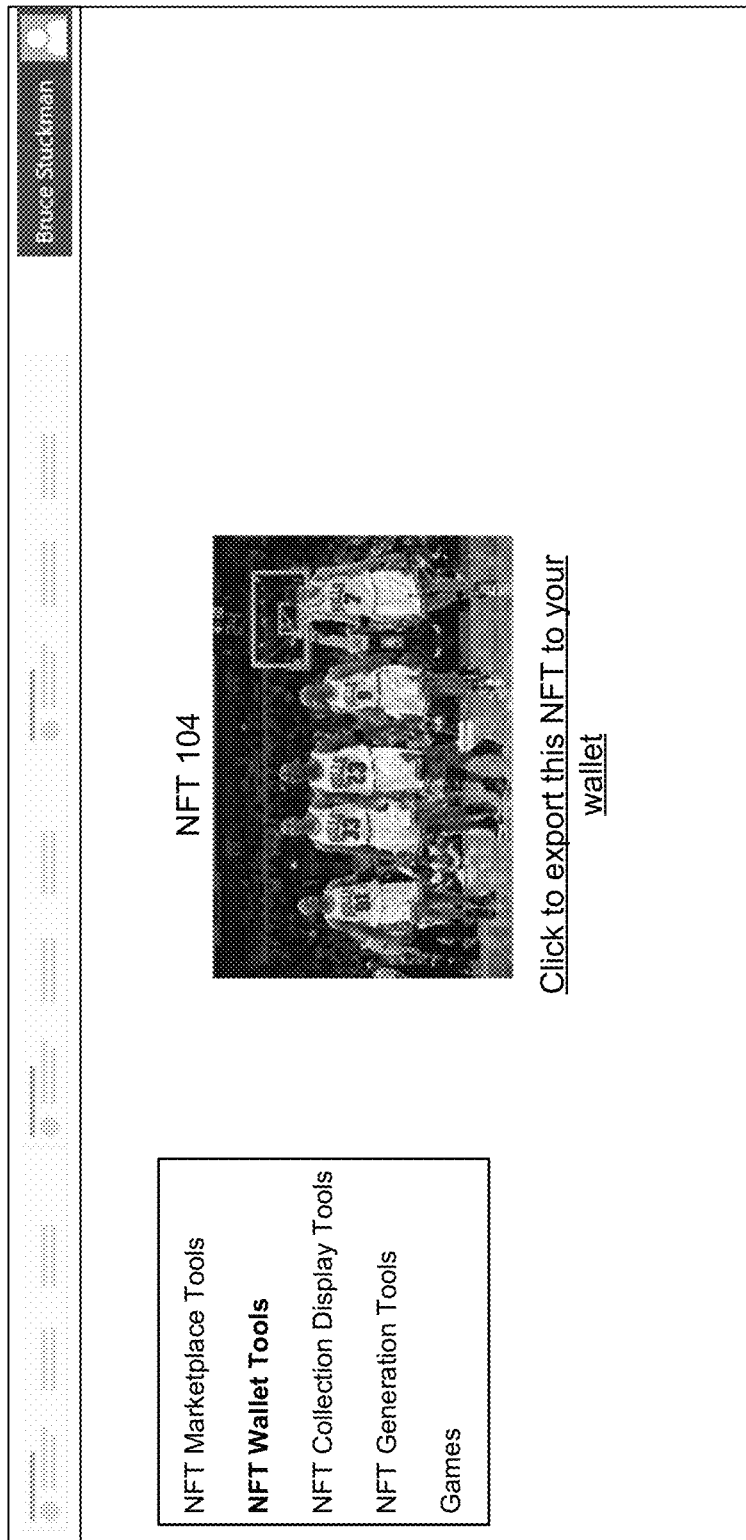
Figure 3E:
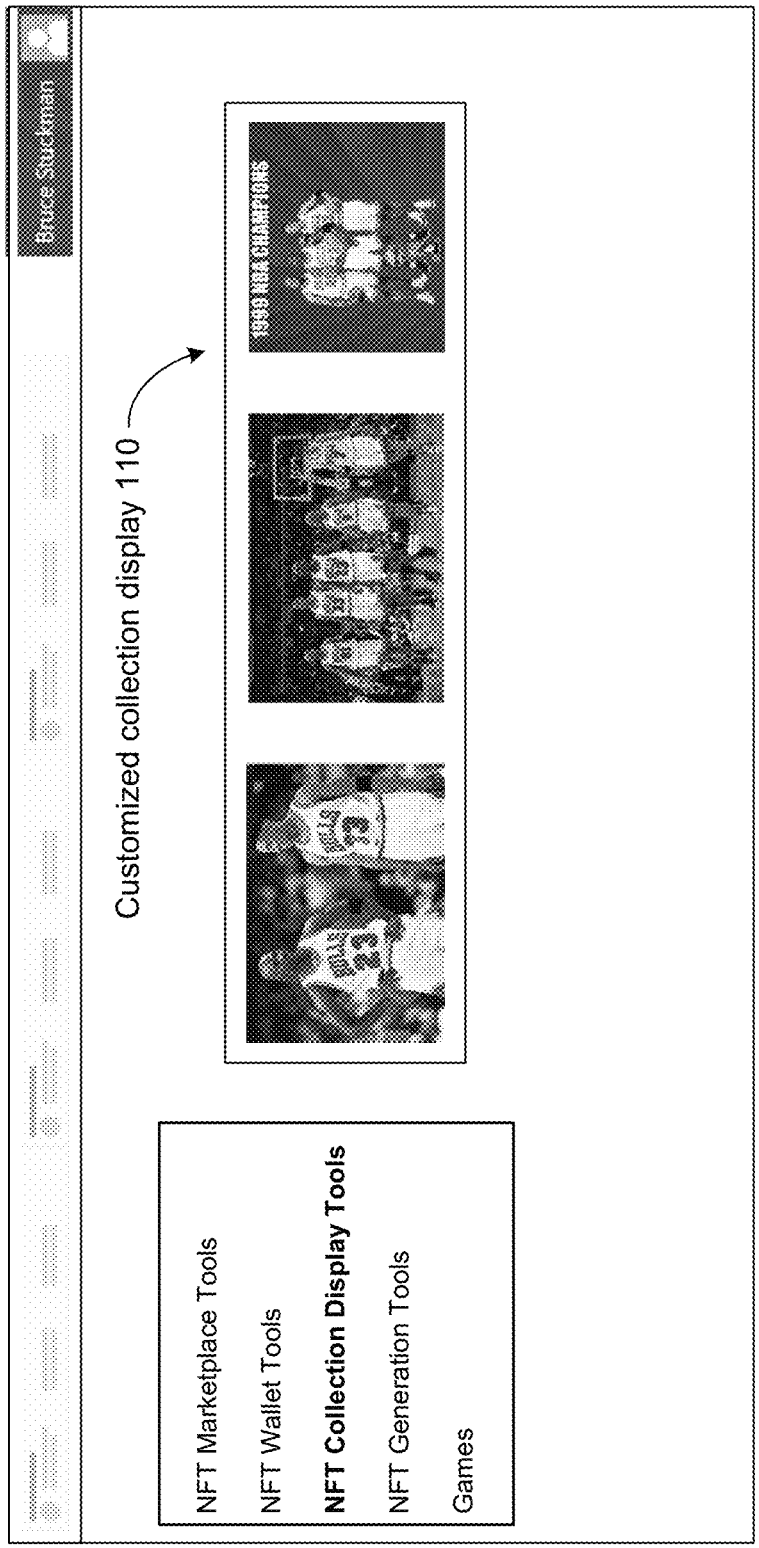

In FIG. 3C, the user has interacted with the NFT marketplace tools, such as NFT marketplace tools 804, to select a new NFT 104 for purchase via an NFT marketplace such as NFT marketplace 822. In FIG. 3D, the wallet tools are used again, this time to export the NFT 104 to the user's wallet. In FIG. 3E, the user has selected and used NFT collection display tools, such as NFT collection display tools 810, to create a customized collection display 110 contain all three 1999 Chicago Bulls-related NFTs he now owns. In the example shown, the user has "dragged and dropped" NFTs he owns in a custom display window and has sized and arranged them into the particular collage that is shown. In other examples, the NFT collection display tools 810 can operate, based on metadata associated with the NFTs of a user indicating content, theme, color themes, subject matter, dates of creation, authorship, ownership, prior ownership, number of prior owners, size, resolution, and other NFT information and metadata, to automatically generate arrangements of custom collection display 110 that may be accepted by the user and/or that may be further arranged by the user to create the final customized collection display 110.

Figure 3F:
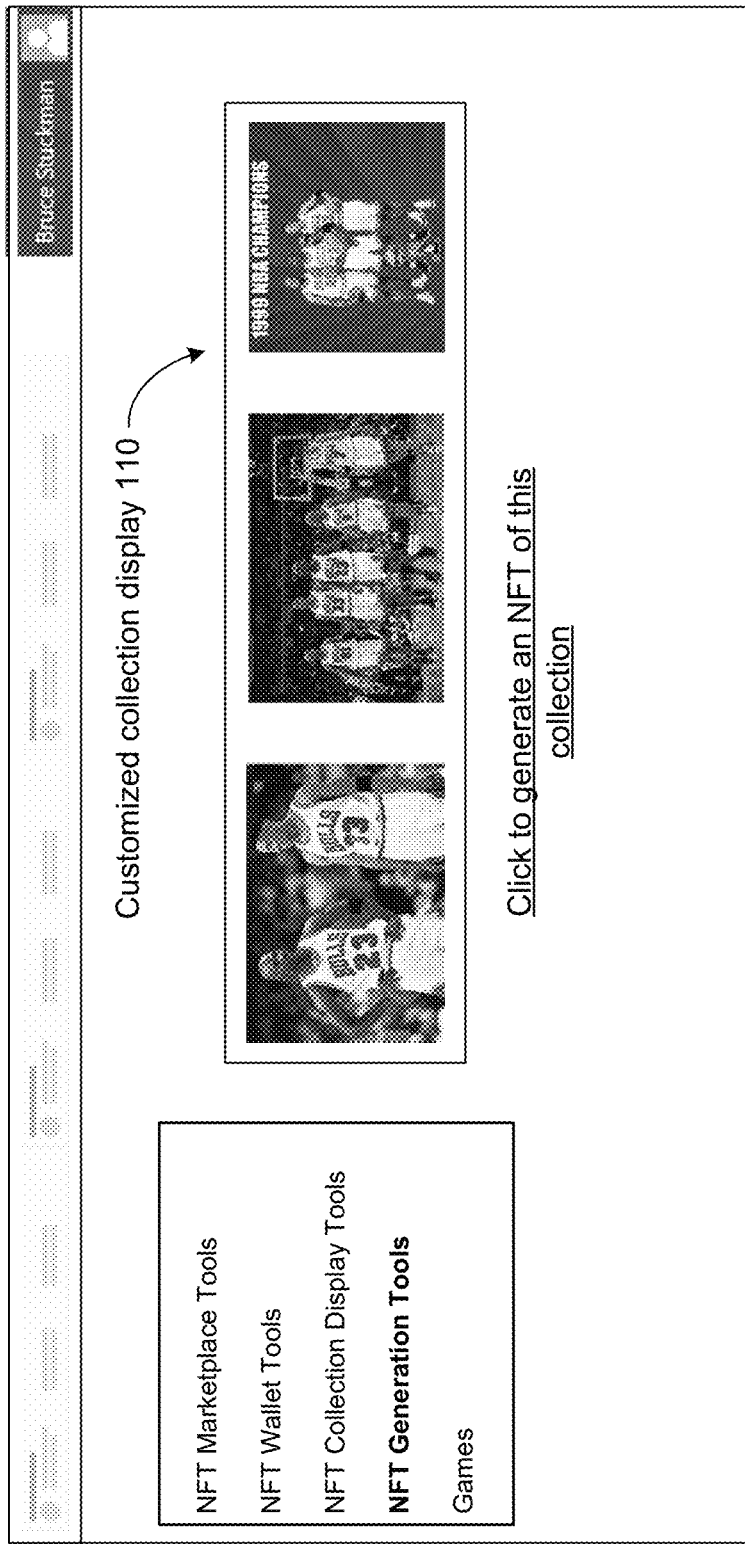

In FIG. 3F, the user has selected NFT generation tools, such as NFT generation tools 808, in order to facilitate, via NFT creation system 824 for example, the creation of a collection NFT from the customized collection display 110.

Figure 3G:
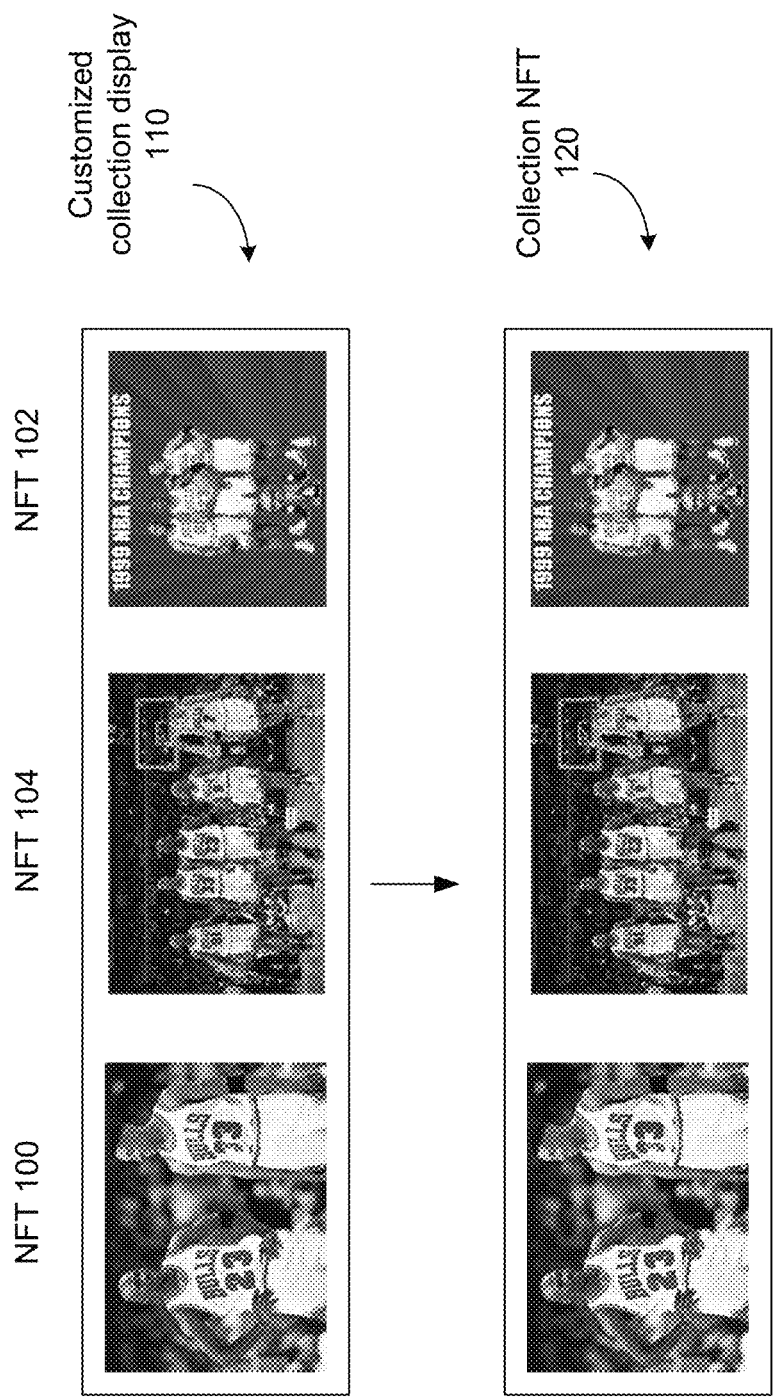
FIG. 3G presents a flow diagram representation of an example process.
Figure 3H:
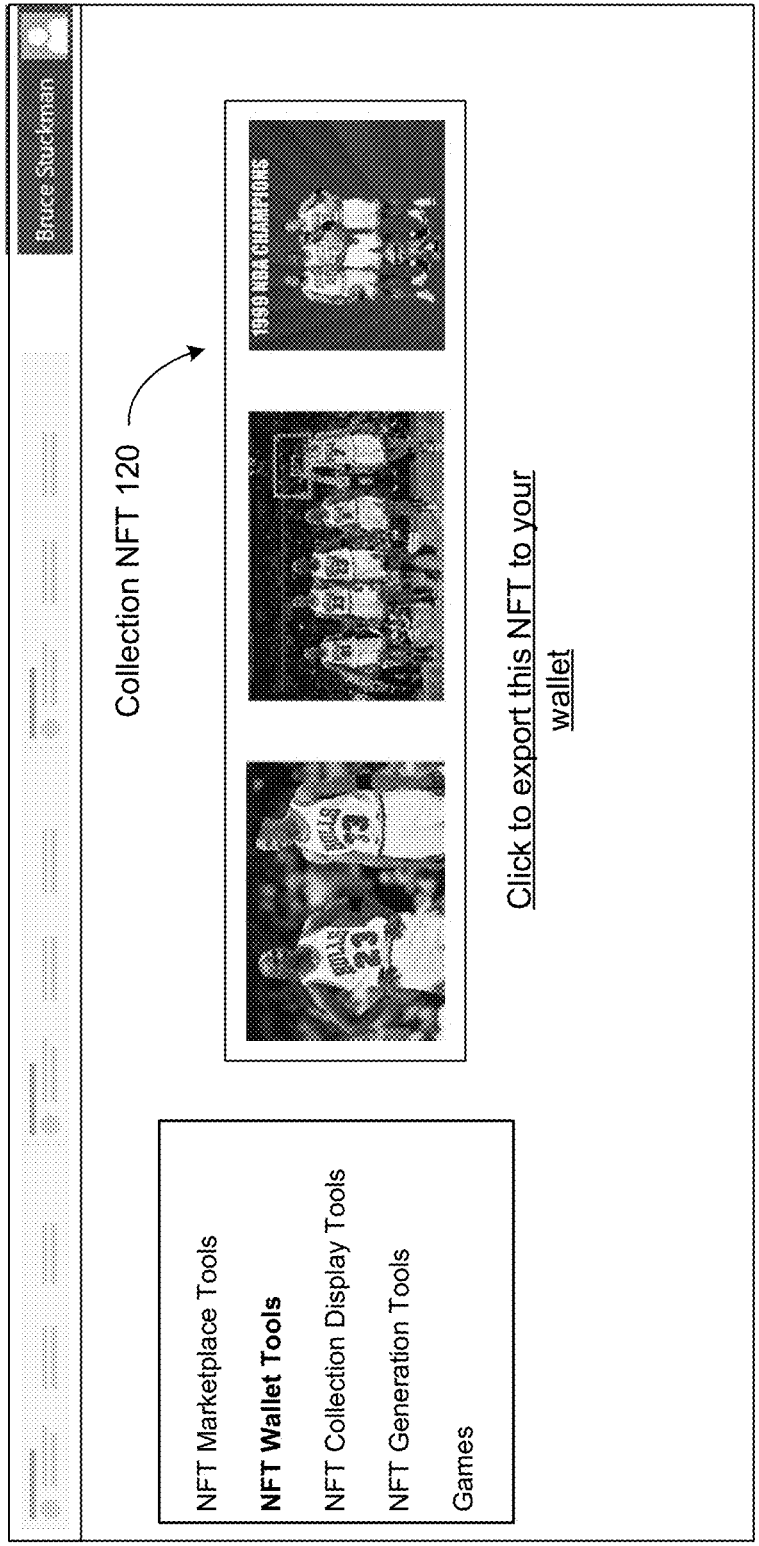

FIG. 3G presents a flow diagram representation of an example process. In the example shown, the collection NFT 120 is created from the customized collection display 110. As previously discussed, the NFT generation tools can operate by, for example, first authenticating the user's rights in the three NFTs and then creating, via NFT creation system 824, a new NFT of the unique customized image with its own blockchain authentication. In various examples, the collection NFT 120 can contain metadata indicating, for example attributions to the sources of the original NFTs in the collection, the creator of the collection NFT, a date of creation, promotion data and coupons related to offers, privileges and/or discounts, title data with respect to title to tangible or intangible real or personal property, warrant data with respect to tangible or intangible real or personal property, transaction data regarding one or more transactions, and/or other metadata. This metadata can be protected via the blockchain and/or other crypto-based NFT creation technology that is employed to create and protect the collection NFT itself—with or without associated image data. In FIG. 3H, the wallet tools are used again, this time to export the collection NFT 120 to the user's wallet.

FIG. 3I presents a flowchart representation of an example method in accordance with various examples. In particular, a method 310 is presented for use in conjunction with any of the functions and features previously described for generating a collection NFT based on NFTs in a user's collection.

Step 312 includes importing, via a network interface, a plurality of NFTs associated with the user of the client device. Step 314 includes generating, via a processor and in response to metadata associated with the plurality of NFTs, display data associated with a customized collection display that contains the plurality of NFTs. Step 316 includes sending, via the network interface, the display data associated with the customized collection display via the client device of the user. Step 318 includes facilitating creation of a collection NFT corresponding to the customized collection display that contains the plurality of NFTs.

FIG. 4A presents a flowchart representation of an example method. In particular, a method 400 for use in conjunction with any of the functions and features previously described in generating a collection NFT based on at least one NFT accessed via a temporary micro-loan.

Step 402 includes facilitating, via a processor and in response to user interactions with the graphical user interface, a temporary micro-loan of at least one NFT. Step 404 includes generating, via the processor and in response to user interactions with the graphical user interface, display data associated with a customized collection display that contains a plurality of NFTs including the at least one NFT. Step 406 includes sending, via the network interface, the display data associated with the customized collection display via the client device of the user. Step 408 includes facilitating creation of a collection NFT corresponding to the customized collection display that contains the plurality of NFTs including the at least one NFT.

Figure 4B:
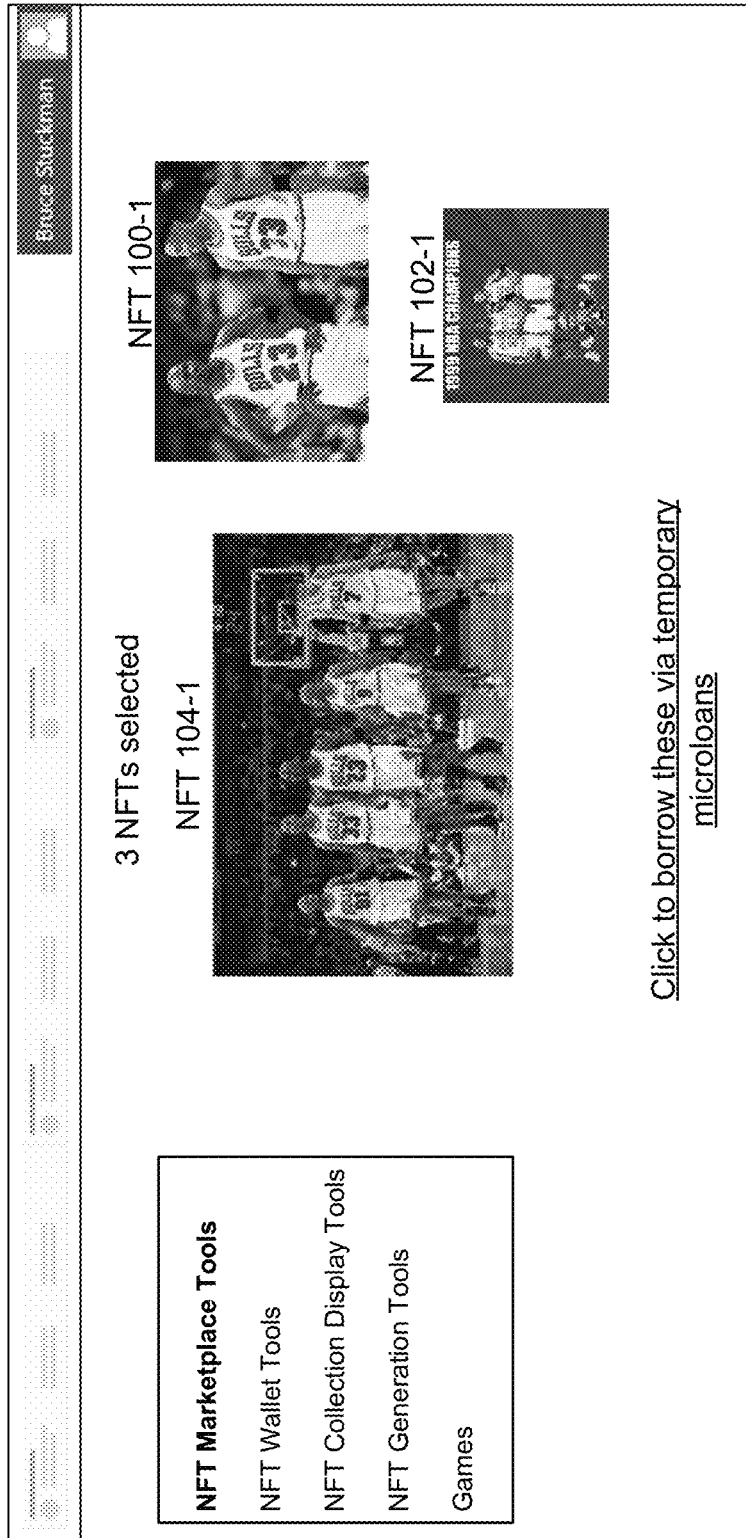
FIG. 4B presents a pictorial representation of an example screen display.

FIG. 4B presents a pictorial representation of an example screen display. In particular, the user has used the marketplace tools to select NFTs 100-1, 102-1, and 104-1. Instead of putting these NFTs up for purchase, the original owners have made them available for temporary micro-loan. This process allows the users can engage to, in exchange for a fee, "borrow" NFTs in order to create a collection NFT. After the Collection NFT is created, or upon the expiration of some predetermined time period (such as 15 minutes, 30 minutes, an hour, a day, etc.) the micro-loaned NFT(s) are returned, expire, deleted or destroyed. Transaction fees apply, a portion of which can be credited to the original NFT owner, the author, including an upfront cost, reward-based payment based on the use and/or performance of the micro-loaned NFT etc. In the alternative, a fixed fee could be charged to the user and credited to the original NFT owner. In various examples, the NFT collection platform 800 may be configured to operate with a single user and/or within a single wallet, and/or to otherwise prohibit the sale or borrowing of micro-loaned NFTs to avoid dilution of the value of the original itself. Furthermore, original and/or derivative NFTs can include restrictions on the total number of micro-loan transactions, the number of simultaneous/contemporaneous micro-loans, restrictions on types of microloan transactions such as normal use loans, staking loans, death match loans, loans less than a predetermined length of time, loans greater than a predetermined length of time, etc.

Consider the following example where an NFT is put up for loan. The proposed loan transaction can include restrictions including an expiration time and/or date, one or N time use in creating a collection NFT or in a game, tournament or challenge, etc. Once the loan is accepted by the borrower, an additional NFT, such as a derivative NFT of the original NFT being loaned, is created on a side chain, layer 1 or 2 blockchain (or "parachain") that can be different from (and/or independent from) the blockchain used to create the original NFT. This new NFT can be created and transferred to the wallet of the borrower via a smart contract that is based on the restrictions. A cryptocurrency market can be used to fund the transaction and/or to collateralize the micro-loan. The new NFT can then be set via the smart contract to automatically expire (e.g. be deleted from the wallet, destroyed or otherwise disabled), when the restrictions are met. In this fashion, if the purpose of the micro-loan is the creation of a collection NFT, the borrowed NFT can automatically expire once the collection NFT is created. It should be noted that the collection NFT can be created via the same blockchain platform (e.g. Ethereum) used to create the original NFT (e.g. not the parachain).

Figure 4C:
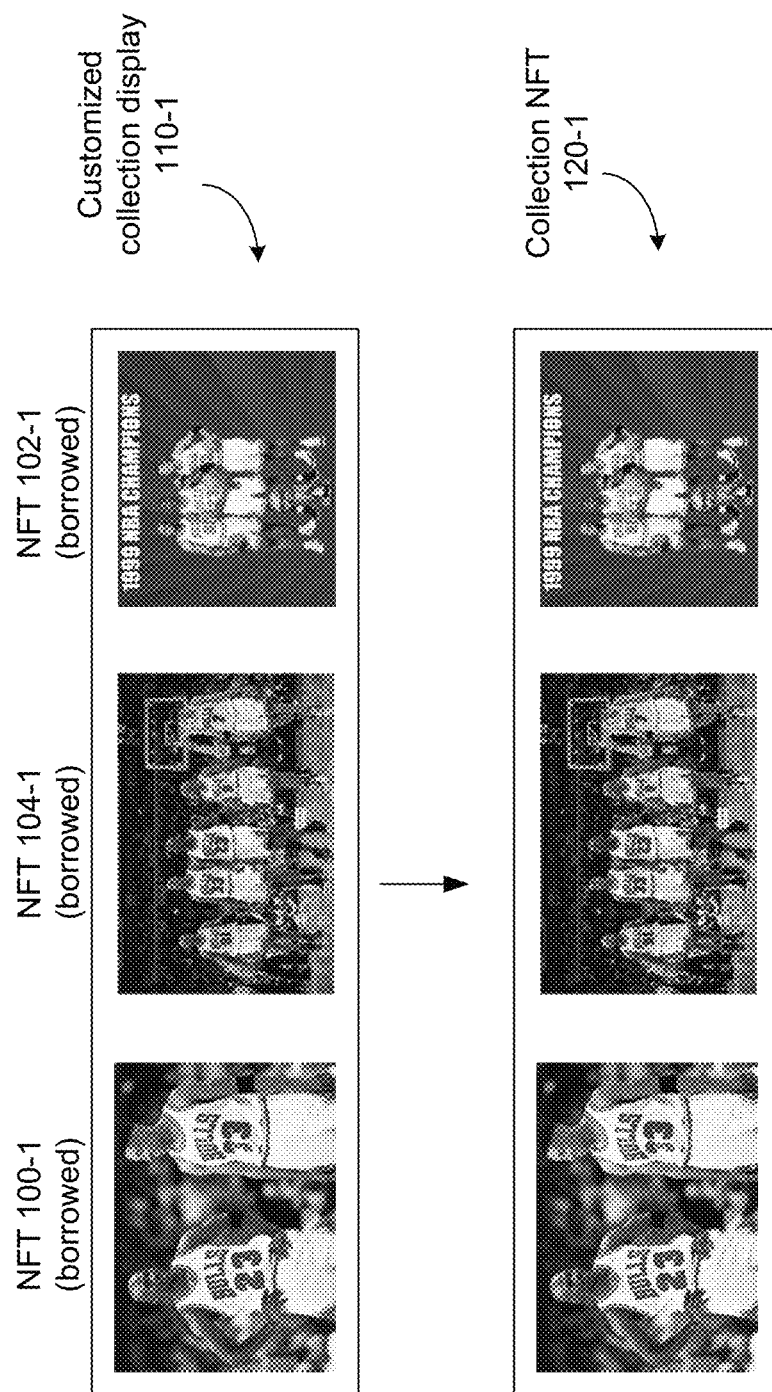
FIG. 4C presents a flow diagram representation of an example process.

FIG. 4C presents a flow diagram representation of an example process where a collection NFT 120-1 is generated based on a customized collection display 110-1 created by the user based on the borrowed NFTs 100-1, 102-1 and 104-1. In various examples, the collection NFT 120-1 metadata can also indicate the original sources of the micro-loans as well as the micro-loaned status of NFTs 100-1, 102-1 and 104-1. While not expressly shown, the collection NFTs based on one or more micro-loaned NFTs, can be created with a visual indication of the original vs. micro-loaned status of the NFTs as appropriate.

FIG. 5A presents a flowchart representation of an example method. In particular, a method 500 for use in conjunction with any of the functions and features previously described where a collection NFT is created based on at least one derivative NFT created from an original NFT.

Step 502 includes importing, via a network interface, a plurality of NFTs associated with the user of the client device, wherein at least one of the plurality of NFTs is a derivative NFT created from an original NFT. Step 504 includes generating, via a processor and in response to user interactions with the graphical user interface, display data associated with a customized collection display that contains the plurality of NFTs. Step 506 includes sending, via the network interface, the display data associated with the customized collection display via the client device of the user. Step 508 includes facilitating creation of a collection NFT corresponding to the customized collection display that contains the plurality of NFTs.

Figure 5B:
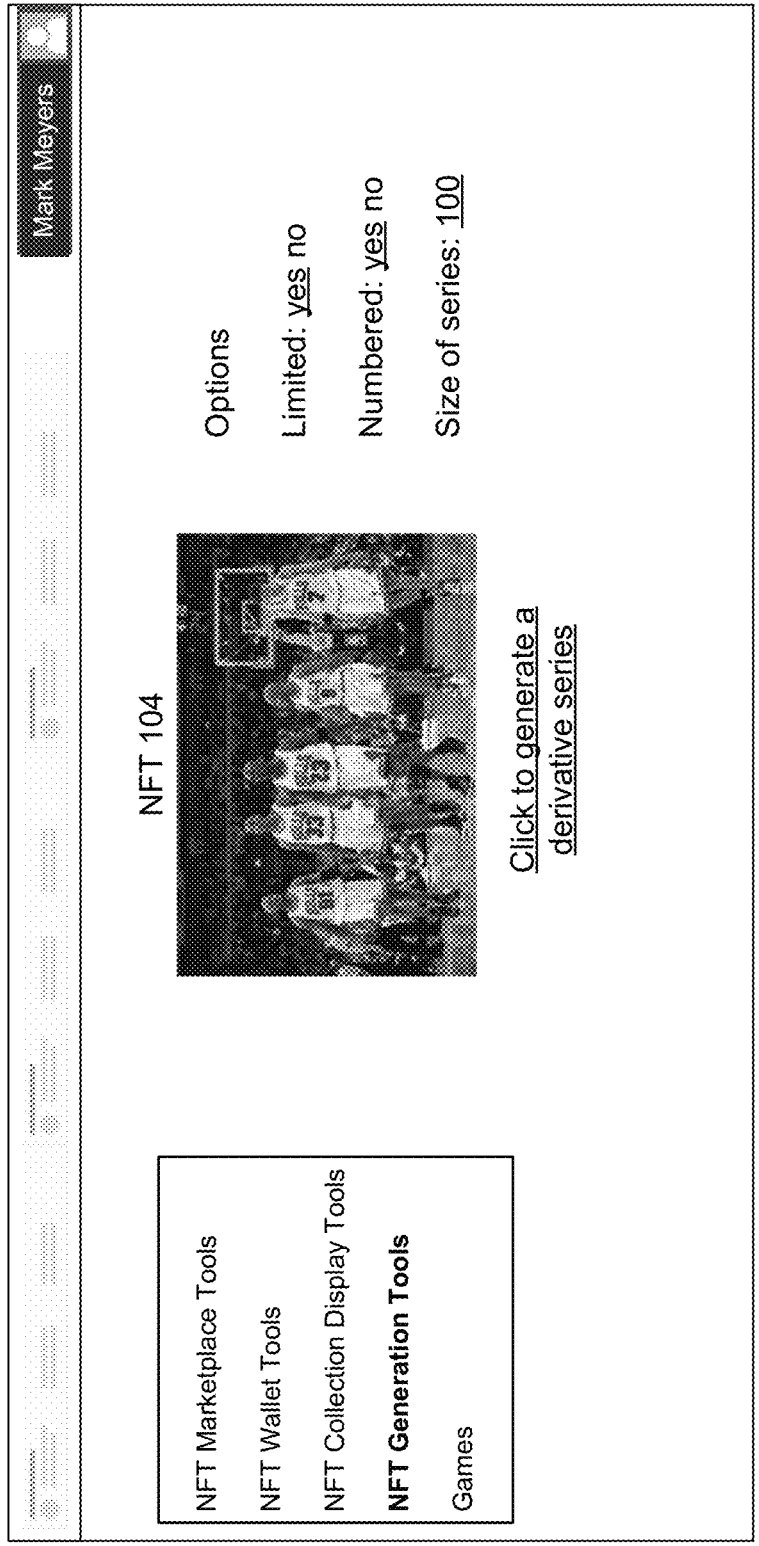
FIGS. 5B and 5C present pictorial representations of example screen displays.
Figure 5C:
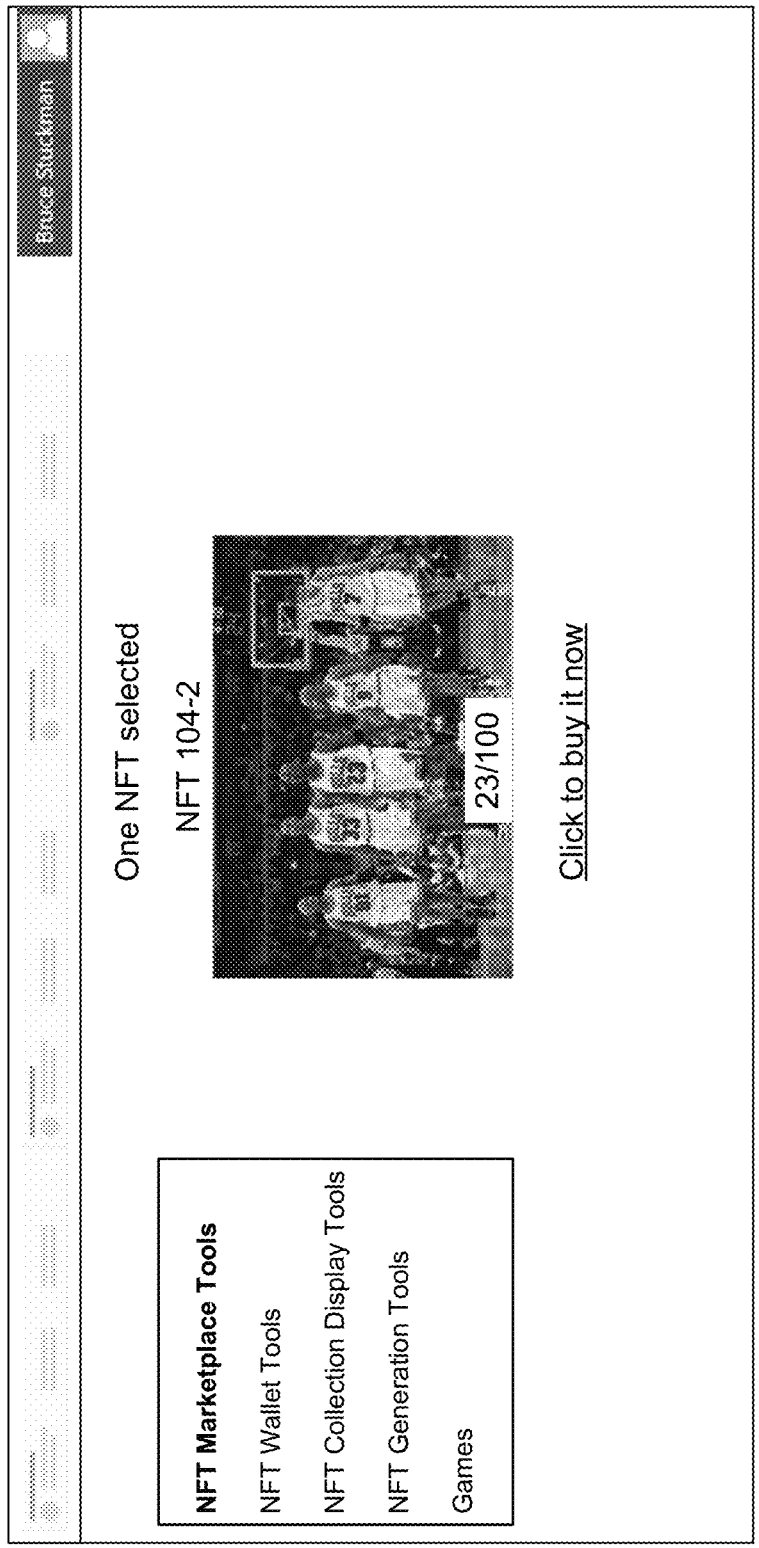

FIGS. 5B and 5C present pictorial representations of an example screen displays. In FIG. 5B, a user Mark Meyers is using the NFT generation tools to create a limited and numbered series of derivative NFTs based on an NFT 104 that is owned by the user. In accordance with the options selected, 100 new derivative NFTs are generated, each designed with a series number (e.g. 1/100, 2/100, 3/100 . . . 100/100) to differentiate the derivative NFTs from the original. In various examples, the NFT collection platform 800 may limit the creation of derivative NFTs to only original NFTs and prohibit the creation of derivative NFTs from other derivative NFTs to avoid dilution of the value of the original itself. Furthermore, derivative NFTs can be created to contain metadata indicating the status as a derivative (protected by the blockchain or other crypto-based NFT creation technique) as well as a visual indication of their status as a derivative. In the example shown, a label with a series number is used as such a visual indication but other visual indicators such as frames, badges, bars, etc. could likewise be employed.

Figure 5D:
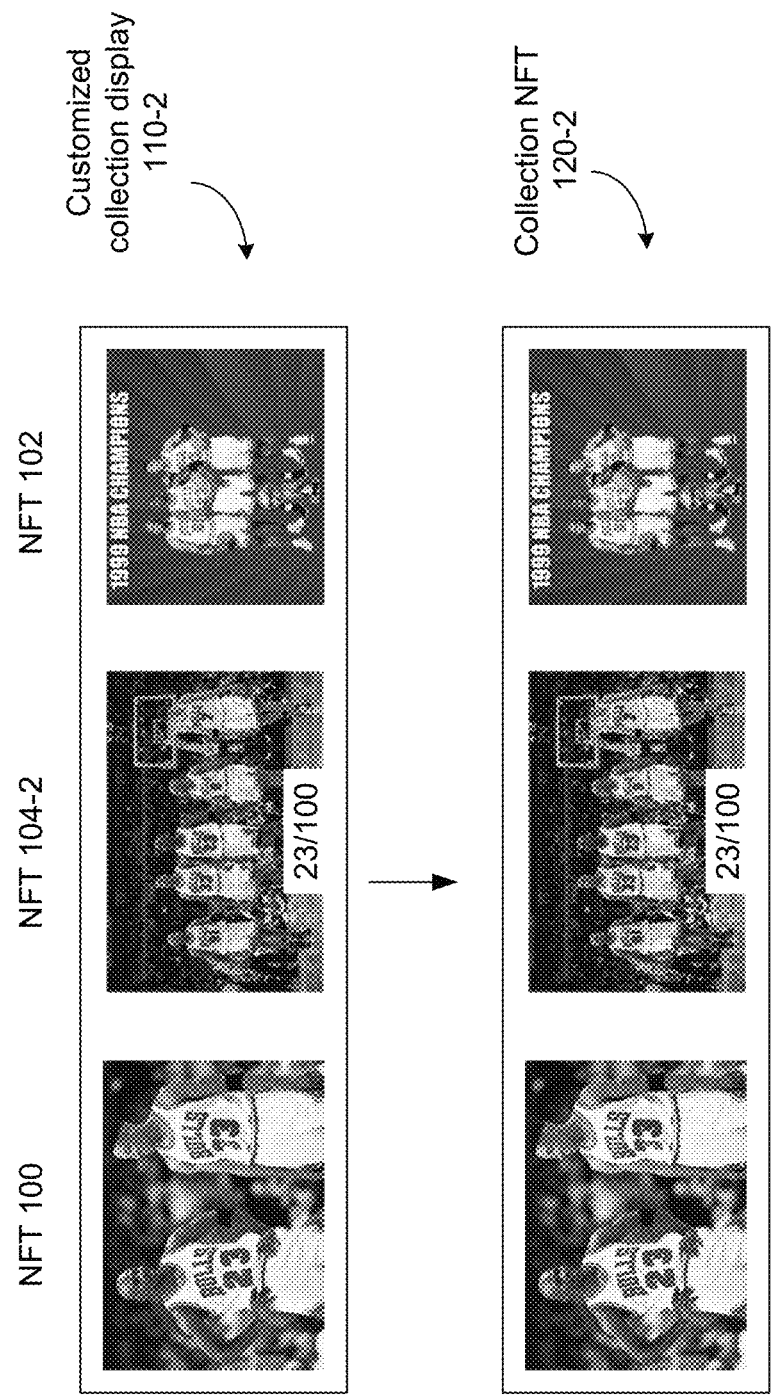
FIG. 5D presents a flow diagram representation of an example process.

In FIG. 5C, a different user Bruce Stuckman is using the NFT marketplace tools to purchase the NFT 104-2, which is a derivative NFT (number 23 in the limited series of 100). FIG. 5D presents a flow diagram representation of an example process where a collection NFT 120-2 is generated based on a customized collection display 110-2 created by the user that includes the derivative NFT 104-2. In various examples, the collection NFT 120-2 metadata can also indicate the original status of NFTs 102 and 100, the original source of the derivative NFT 104-2 as well as the derivative status of NFT 104-2. While not expressly shown, the collection NFTs based on one or more micro-loaned NFTs, can be created with a visual indication of the original vs. micro-loaned status of the NFTs as appropriate.

FIG. 6A presents a flowchart representation of an example method. In particular, a method 600 for use in conjunction with any of the functions and features previously described where a collection NFT is created based on at least one micro-loaned NFT along with one or more other NFTs of the user.

Step 602 includes importing, via a network interface, at least one NFT associated with the user of the client device. Step 604 includes facilitating, via a processor and in response to user interactions with the graphical user interface, a temporary micro-loan of at least one other NFT. Step 606 includes generating, via the processor and in response to user interactions with the graphical user interface, display data associated with a customized collection display that contains the at least one NFT and the at least one other NFT. Step 608 includes sending, via the network interface, the display data associated with the customized collection display via the client device of the user. Step 610 includes facilitating creation of a collection NFT corresponding to the customized collection display that contains the at least one NFT and the at least one other NFT.

Figure 6B:
FIG. 6B presents a pictorial representation of an example screen display.
Figure 6C:
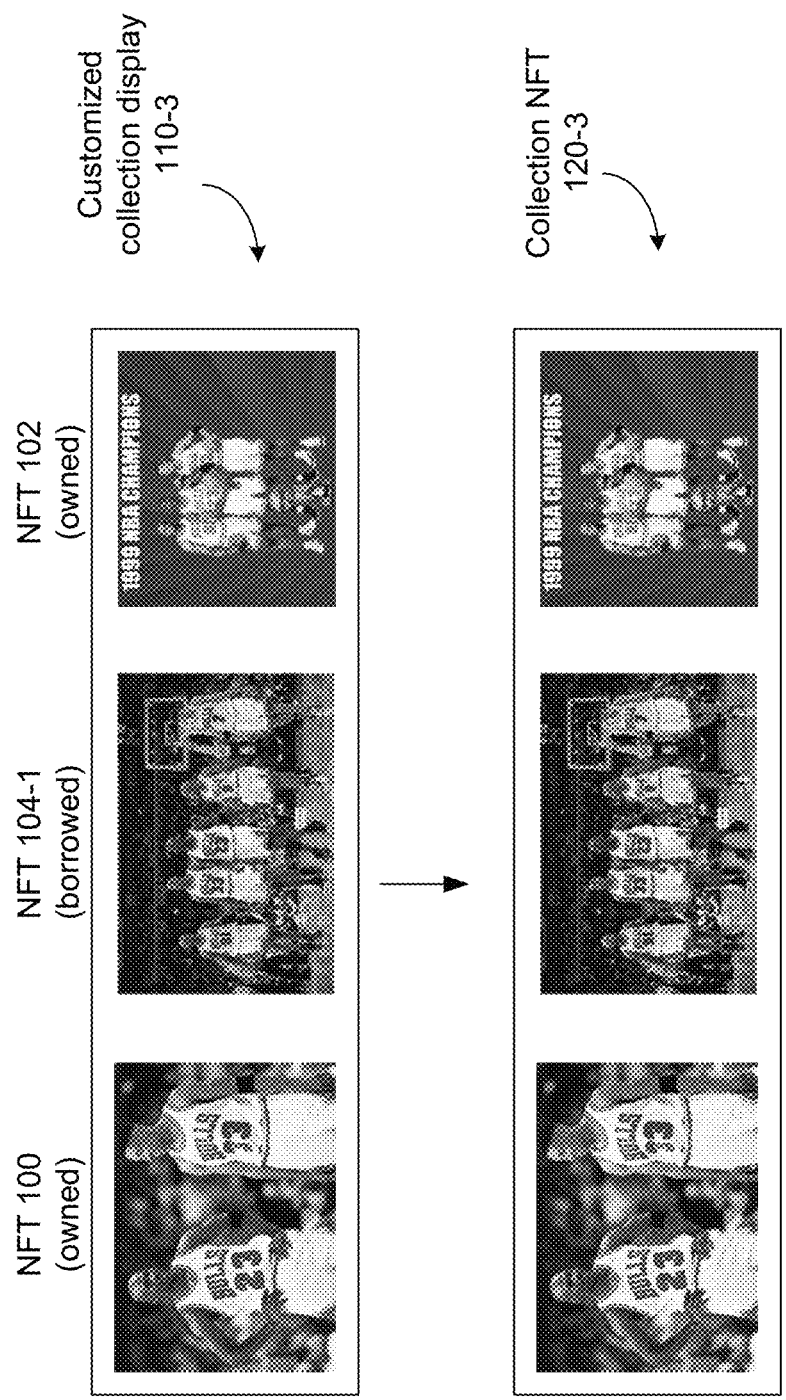
FIG. 6C presents a flow diagram representation of an example process.

FIG. 6B presents a pictorial representation of an example screen display where the user is engaging in a temporary micro-loan of the NFT 104-01. FIG. 6C presents a flow diagram representation of an example process where a collection NFT 120-3 is generated based on a customized collection display 110-3 created by the user based on the borrowed NFT 104-1 and other NFTs 100 and 102. In various examples, the collection NFT 120-3 metadata can also indicate the original status of NFTs 102 and 100, the original source of the micro-loaned NFT 104-1 as well as the micro-loaned status of NFT 104-1.

FIG. 7A presents a flowchart representation of an example method. In particular, a method 700 for use in conjunction with any of the functions and features previously described in generating a collection NFT based on at least one derivative NFT accessed via a temporary micro-loan. Step 702 includes facilitating, via a processor and in response to user interactions with the graphical user interface, a temporary micro-loan of at least one NFT that is a derivative NFT created from an original NFT. Step 704 includes generating, via the processor and in response to user interactions with the graphical user interface, display data associated with a customized collection display that contains a plurality of NFTs including the at least one NFT. Step 706 includes sending, via the network interface, the display data associated with the customized collection display via the client device of the user. Step 708 includes facilitating creation of a collection NFT corresponding to the customized collection display that contains the plurality of NFTs including the at least one NFT.

Figure 7B:
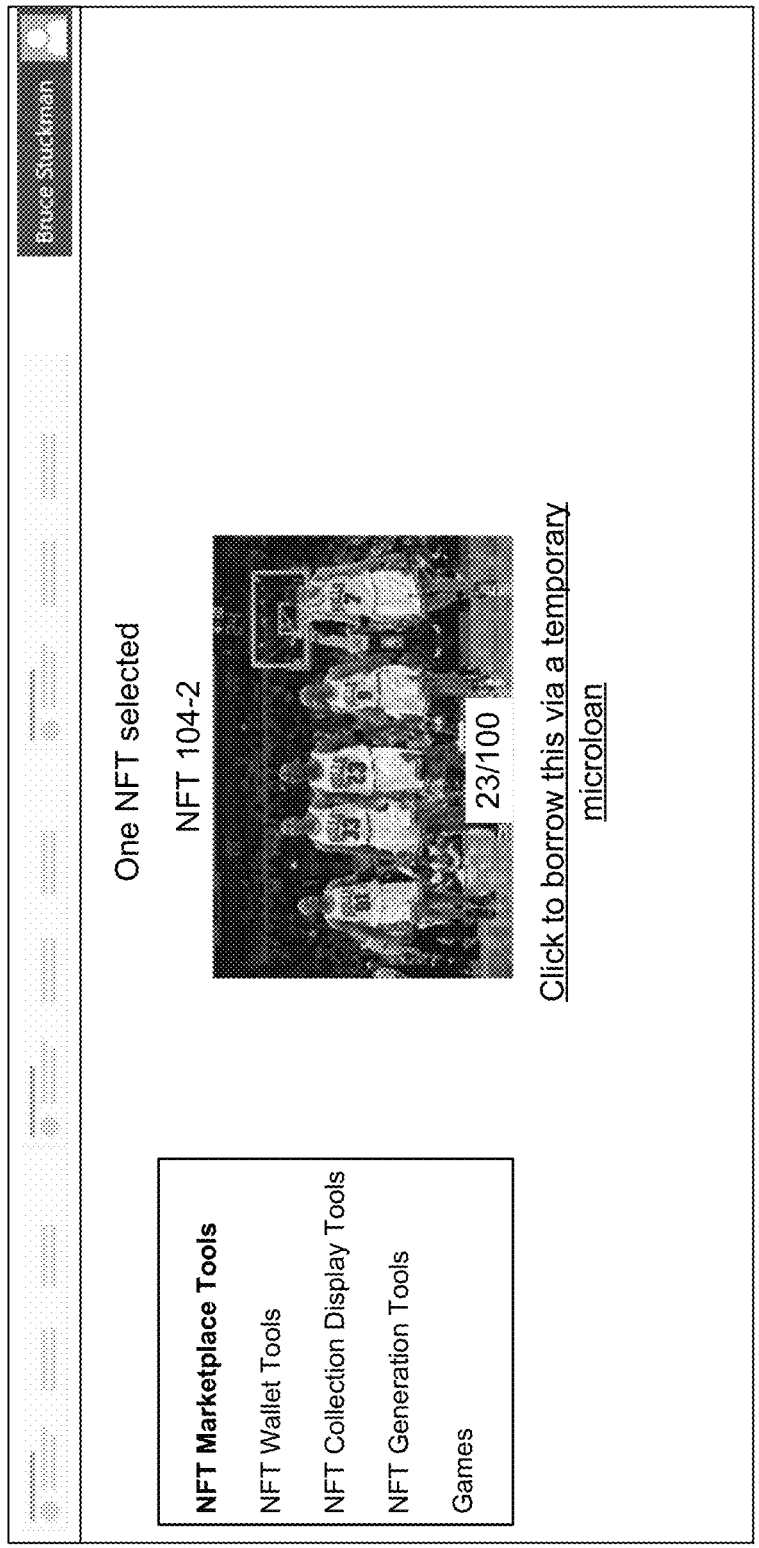
FIG. 7B presents a pictorial representation of an example screen display.
Figure 7C:
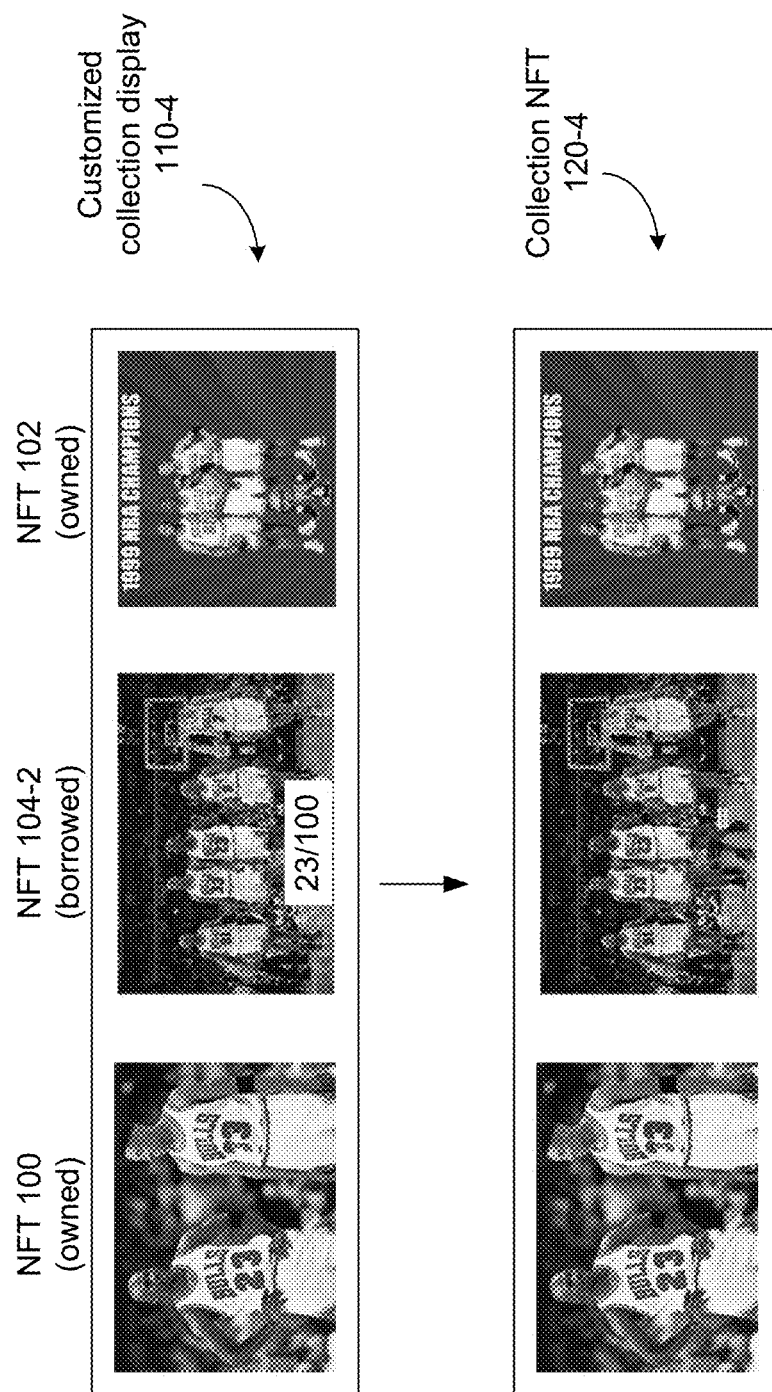
FIG. 7C presents a flow diagram representation of an example process.

FIG. 7B presents a pictorial representation of an example screen display where the user is engaging in a temporary micro-loan of the derivative NFT 104-02. FIG. 7C presents a flow diagram representation of an example process where a collection NFT 120-4 is generated based on a customized collection display 110-4 created by the user based on the borrowed derivative NFT 104-2 and other NFTs 100 and 102. In various examples, the collection NFT 120-4 metadata can also indicate the original status of NFTs 102 and 100, the original source of NFT 104 and the derivative NFT 104-2 as well as the derivative and micro-loaned status of NFT 104-2. While not expressly shown, the collection NFTs based on one or more micro-loaned derivative NFTs, can be created with a visual indication of the micro-loaned and derivative status of the NFTs as appropriate.

Figure 8A:
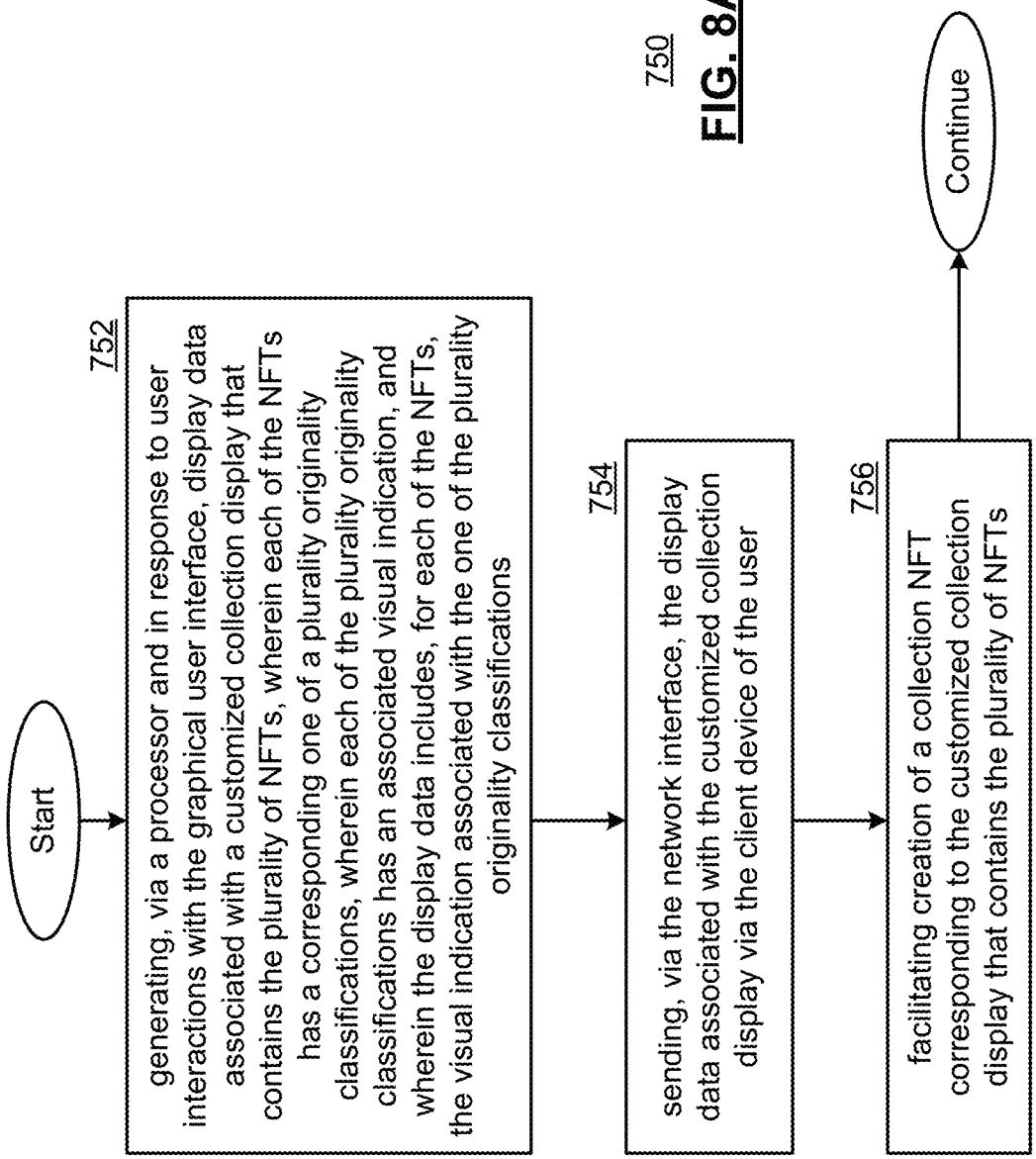
FIG. 8A presents a flowchart representation of an example method.

FIG. 8A presents a flowchart representation of an example method. In particular, a method 750 for use in conjunction with any of the functions and features previously described where customized collection displays and any resulting collection NFTs are generated with visual indications that indicate the originality classification associated with each of the NFTs in the collection.

Step 752 includes generating, via a processor and in response to user interactions with the graphical user interface, display data associated with a customized collection display that contains a plurality of NFTs, wherein each of the NFTs has a corresponding one of a plurality originality classifications, wherein each of the plurality originality classifications has an associated visual indication, and wherein the display data includes, for each of the NFTs, the visual indication associated with the one of the plurality originality classifications. Step 754 includes sending, via the network interface, the display data associated with the customized collection display via the client device of the user. Step 756 includes facilitating creation of a collection NFT corresponding to the customized collection display that contains the plurality of NFTs.

In various examples, different original classifications can be applied for original NFTs, derivative NFTs, micro-loaned original NFTs, micro-loaned derivative NFTs, etc. In the example shown, the color of the bars above and below the image provide an indication of the originality classification however different badges, stars, scores or other indication could likewise be employed. Furthermore, collection NFTs could also include one or more attributions (an optionally with links to collections from) the original source or sources of the other collection NFTs, loaned NFTs, derivative NFTs, etc. that make up the collection NFT.

Figure 8B:
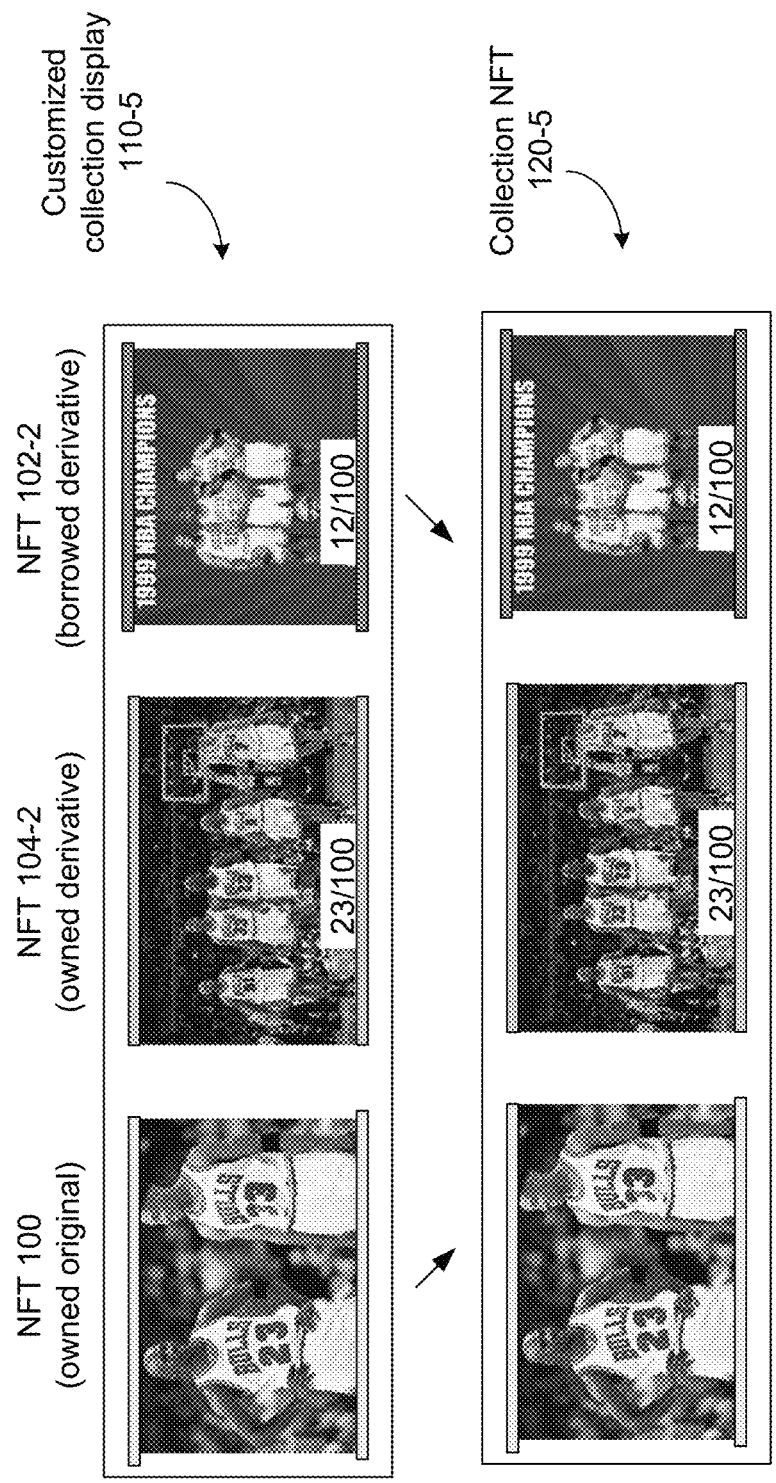
FIG. 8B presents a flow diagram representation of an example process.

FIG. 8B presents a flow diagram representation of an example process where a collection NFT 120-5 is generated based on a customized collection display 110-5 created by the user based on the borrowed derivative NFT 102-2, owned derivative 104-2 and original NFT 100. In addition to the visual indications, the originality classifications can be included in the collection NFT 120-5 metadata along with the corresponding attributions. It should be noted that collection NFTs generated using the NFT collection platform 800 can, for example, themselves be bought, sold, traded and micro-loaned, and used to create derivatives that also can be bought, sold, traded and micro-loaned.

FIG. 9A presents a flowchart representation of an example method. In particular, a method 900 for use in conjunction with any of the functions and features previously described involving derivative collection NFTs. Step 902 includes importing, via a network interface, a plurality of NFTs associated with the user of the client device, wherein at least one of the plurality of NFTs is a derivative collection NFT created from an original collection NFT.

Step 904 includes generating, via a processor and in response to user interactions with the graphical user interface, display data associated with a customized collection display that contains the plurality of NFTs. Step 906 includes sending, via the network interface, the display data associated with the customized collection display via the client device of the user. Step 908 includes facilitating creation of a collection NFT corresponding to the customized collection display that contains the plurality of NFTs.

Figure 9B:
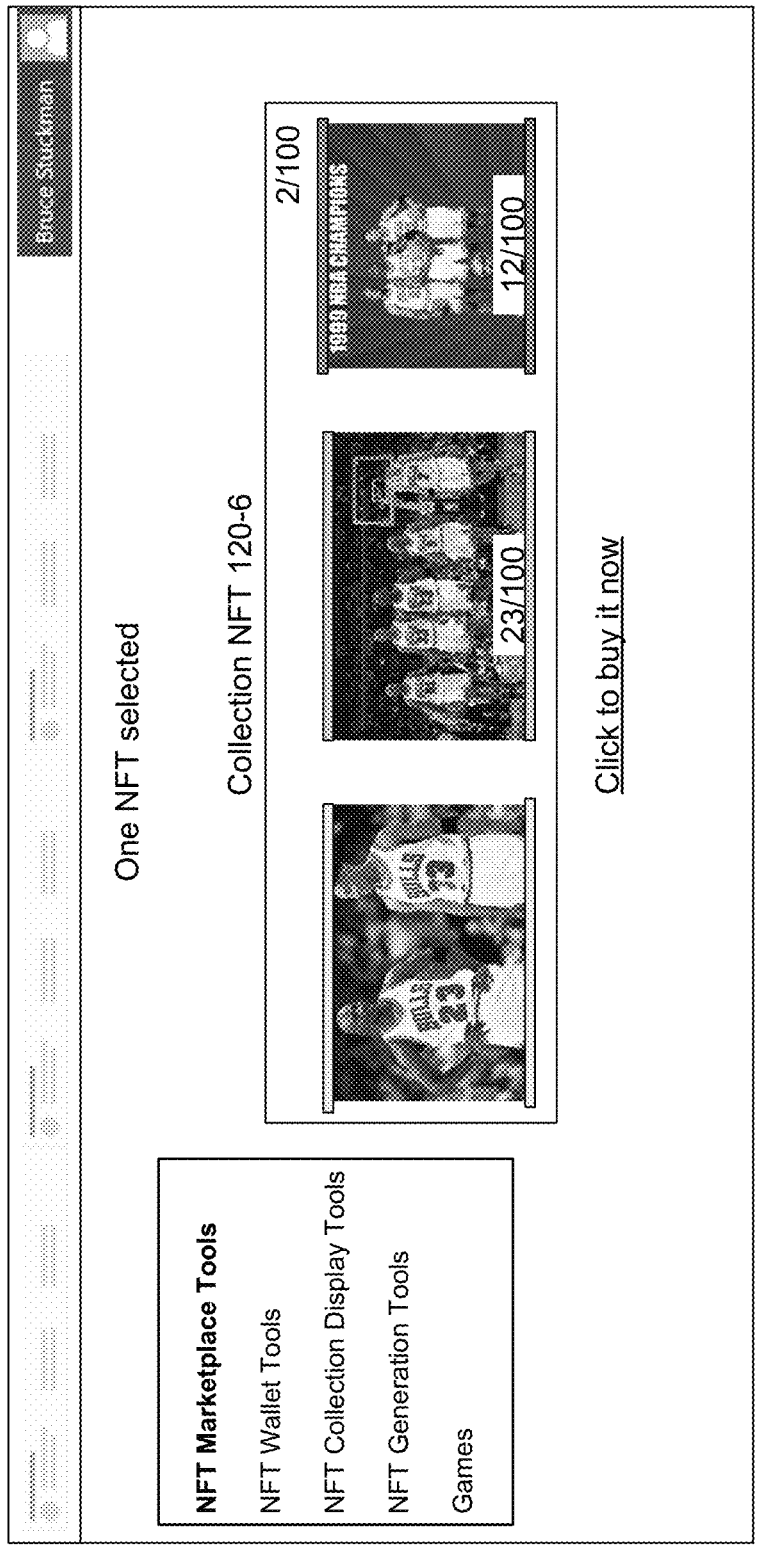
FIG. 9B presents a pictorial representation of an example screen display.

FIG. 9B presents a pictorial representation of an example screen display where a user created a derivative collection NFT 120-6 is put up for purchase. The example shown is one of a derivative series of 100 (2/100) created from the collection NFT 120-5 via NFT generation tools. In various examples, the collection NFT 120-6 metadata can also indicate the derivative status of this collection NFT as well as its associated attribution and the attributions associated with its elemental NFTs.

FIG. 10A presents a flowchart representation of an example method. In particular, a method 1000 for use in conjunction with any of the functions and features previously described involving micro-loans of collection NFTs.

Figure 10B:
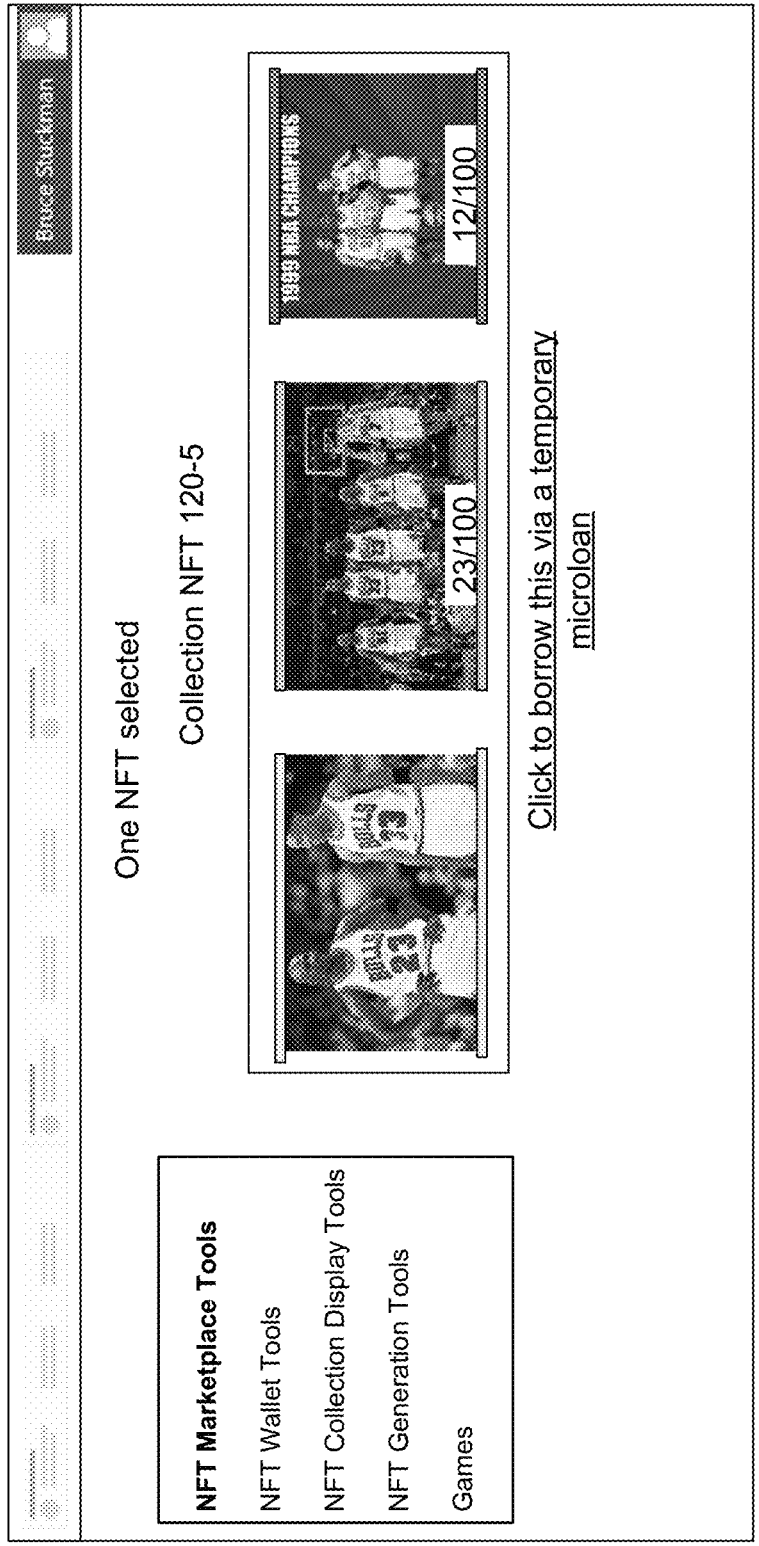
FIG. 10B presents a pictorial representation of an example screen display.

Step 1002 includes importing, via a network interface, at least one NFT associated with the user of the client device. Step 1004 includes facilitating, via a processor and in response to user interactions with the graphical user interface, a temporary micro-loan of at least one other NFT, wherein the at least one other NFT is an original collection NFT. Step 1006 includes generating, via the processor and in response to user interactions with the graphical user interface, display data associated with a customized collection display that contains the at least one NFT and the at least one other NFT. Step 1008 includes sending, via the network interface, the display data associated with the customized collection display via the client device of the user. Step 1010 includes facilitating creation of a collection NFT corresponding to the customized collection display that contains the at least one NFT and the at least one other NFT. FIG. 10B presents a pictorial representation of an example screen display where a user is engaged in a micro-loan of a collection NFT 120-5. It should be noted that a new collection NFT can be created with other collection NFTs that have been created, borrowed, or purchased by the user.

Figure 11B:
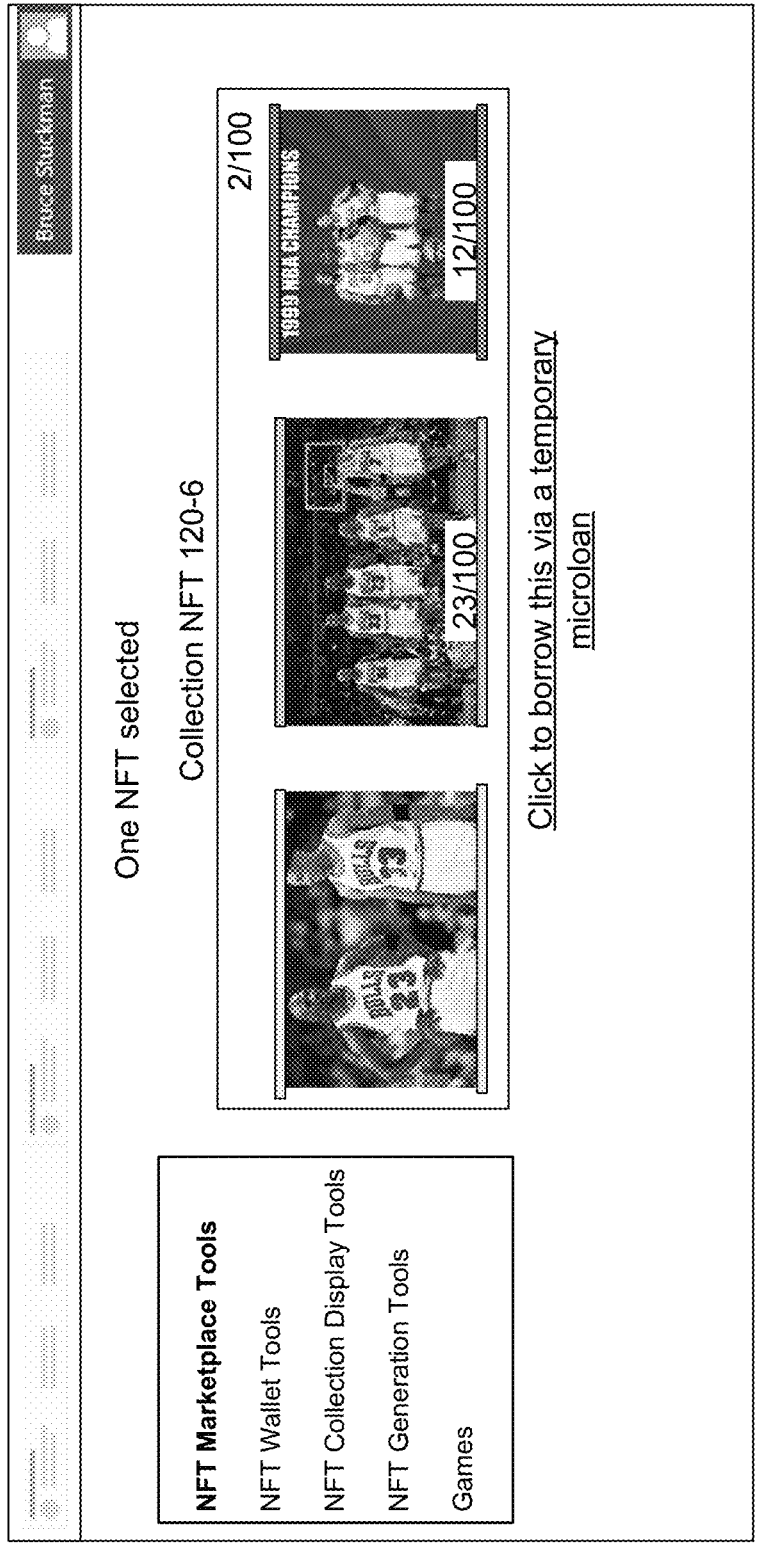
FIG. 11B presents a pictorial representation of an example screen display.

FIG. 11A presents a flowchart representation of an example method. In particular, a method 1100 for use in conjunction with any of the functions and features previously described involving micro-loans of derivative collection NFTs. Step 1102 includes facilitating, via a processor and in response to user interactions with the graphical user interface, a temporary micro-loan of at least one NFT that is a derivative collection NFT created from an original collection NFT. Step 1104 includes generating, via the processor and in response to user interactions with the graphical user interface, display data associated with a customized collection display that contains a plurality of NFTs including the at least one NFT. Step 1106 includes sending, via the network interface, the display data associated with the customized collection display via the client device of the user. Step 1108 incudes facilitating creation of a collection NFT corresponding to the customized collection display that contains the plurality of NFTs including the at least one NFT. FIG. 11B presents a pictorial representation of an example screen display where a user is engaged in a micro-loan of a derivative collection NFT 120-6.

Figure 12A:
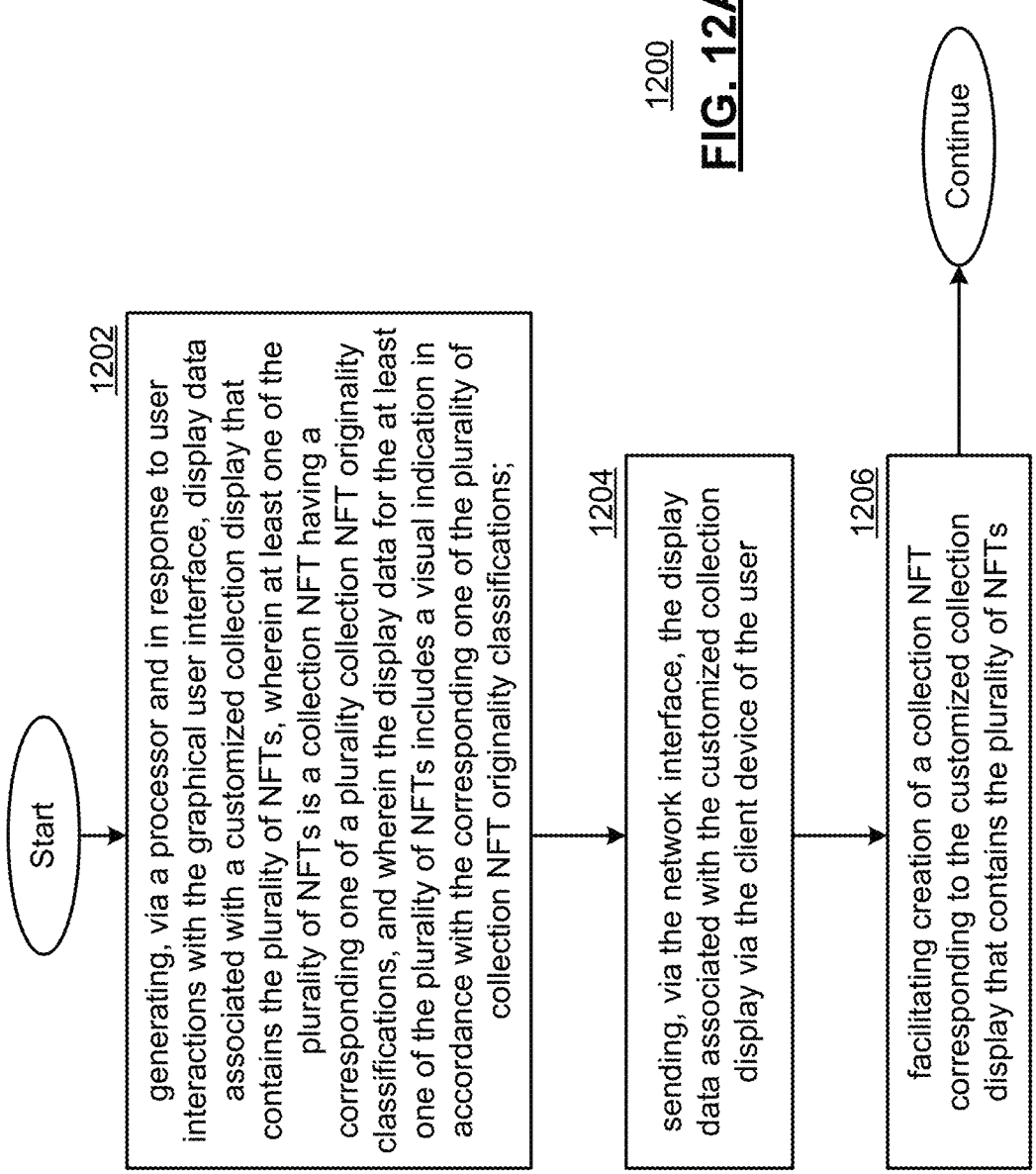
FIG. 12A presents a flowchart representation of an example method.

FIG. 12A presents a flowchart representation of an example method. In particular, a method 1200 for use in conjunction with any of the functions and features previously described to create collection NFTs with visual indications of their degree of originality.

Step 1202 includes generating, via a processor and in response to user interactions with the graphical user interface, display data associated with a customized collection display that contains a plurality of NFTs, wherein at least one of the plurality of NFTs is a collection NFT having a corresponding one of a plurality collection NFT originality classifications, and wherein the display data for the at least one of the plurality of NFTs includes a visual indication in accordance with the corresponding one of the plurality of collection NFT originality classifications. Step 1204 includes sending, via the network interface, the display data associated with the customized collection display via the client device of the user. Step 1206 includes facilitating creation of a collection NFT corresponding to the customized collection display that contains the plurality of NFTs.

FIG. 12B presents a pictorial representations of an example collection NFTs. In the example shown three different collection NFT originality classifications are represented including a micro-loaned (e.g. borrowed) collection NFT 1220, a purchased collection NFT 1230 and a purchased derivative collection NFT 1240. An additional classification could apply to an original collection NFT that was created by the user—rather than being purchased. In the example shown, the color of the surrounding frame provides a visual indication of the originality classification however different badges, stars, scores or other indication could likewise be employed. In the purchase derivative collection NFT 1240 the colored bars of the underlying NFTs are removed in lieu of the demoted status/originality classification of the collection NFT as merely a derivative.

FIG. 13A presents a flowchart representation of an example method. In particular, a method 1300 for use in conjunction with any of the functions and features previously described facilitates the collection of endorsements associated with an NFT. Step 1302 includes importing, via a network interface, an NFT associated with the user of the client device. Step 1304 includes collecting, via a processor and in response to user interactions with the graphical user interface, endorsement data associated with the NFT. Step 1306 includes generating, via the processor and in response to user interactions with the graphical user interface, display data associated with a customized collection display that contains the NFT and the endorsement data. Step 1308 includes sending, via the network interface, the display data associated with the customized collection display via the client device of the user. Step 1310 includes facilitating creation of a collection NFT corresponding to the customized collection display.

Figure 13B:
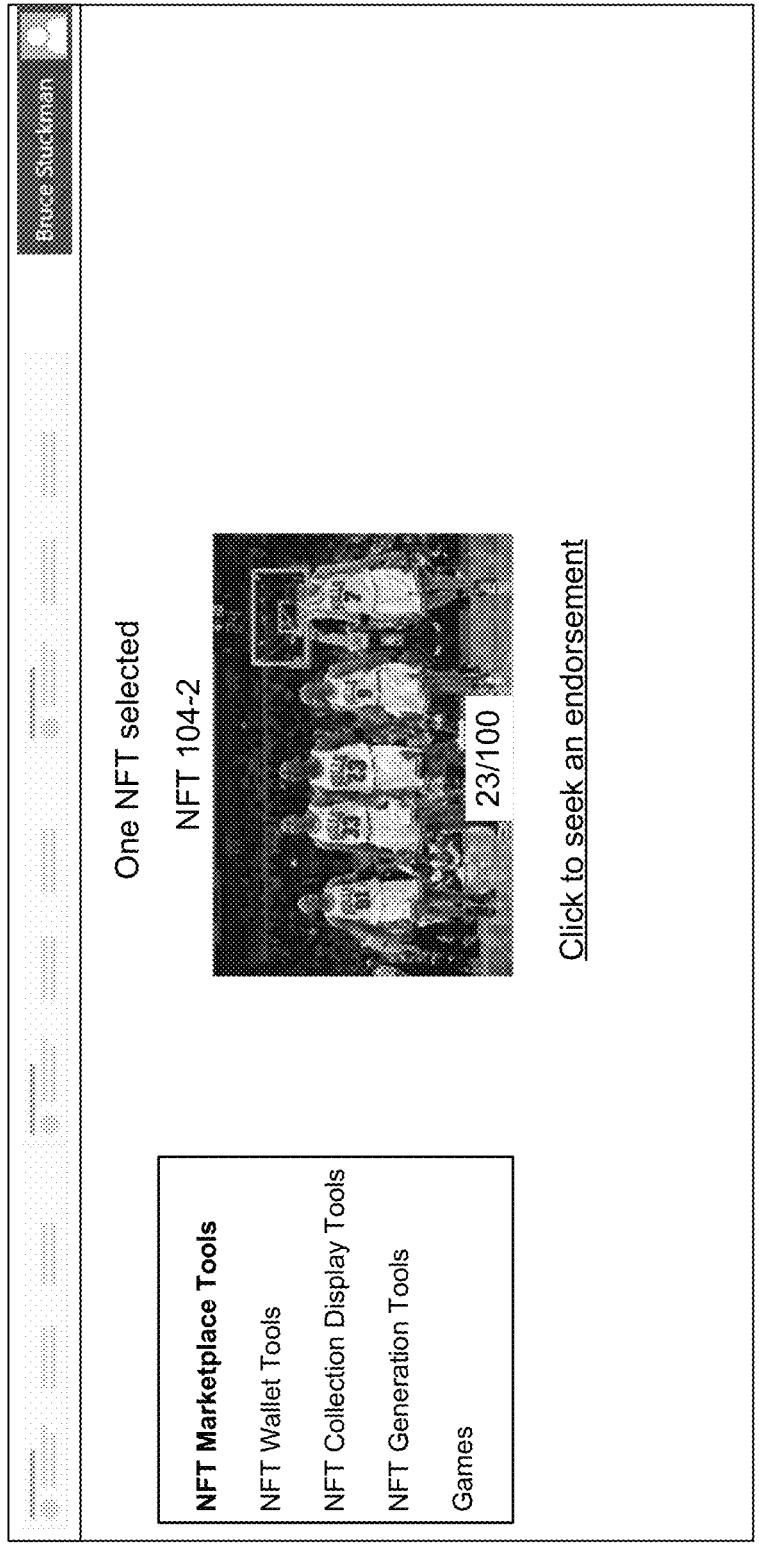
FIGS. 13B-13D present pictorial representations of example screen displays.
Figure 13C:
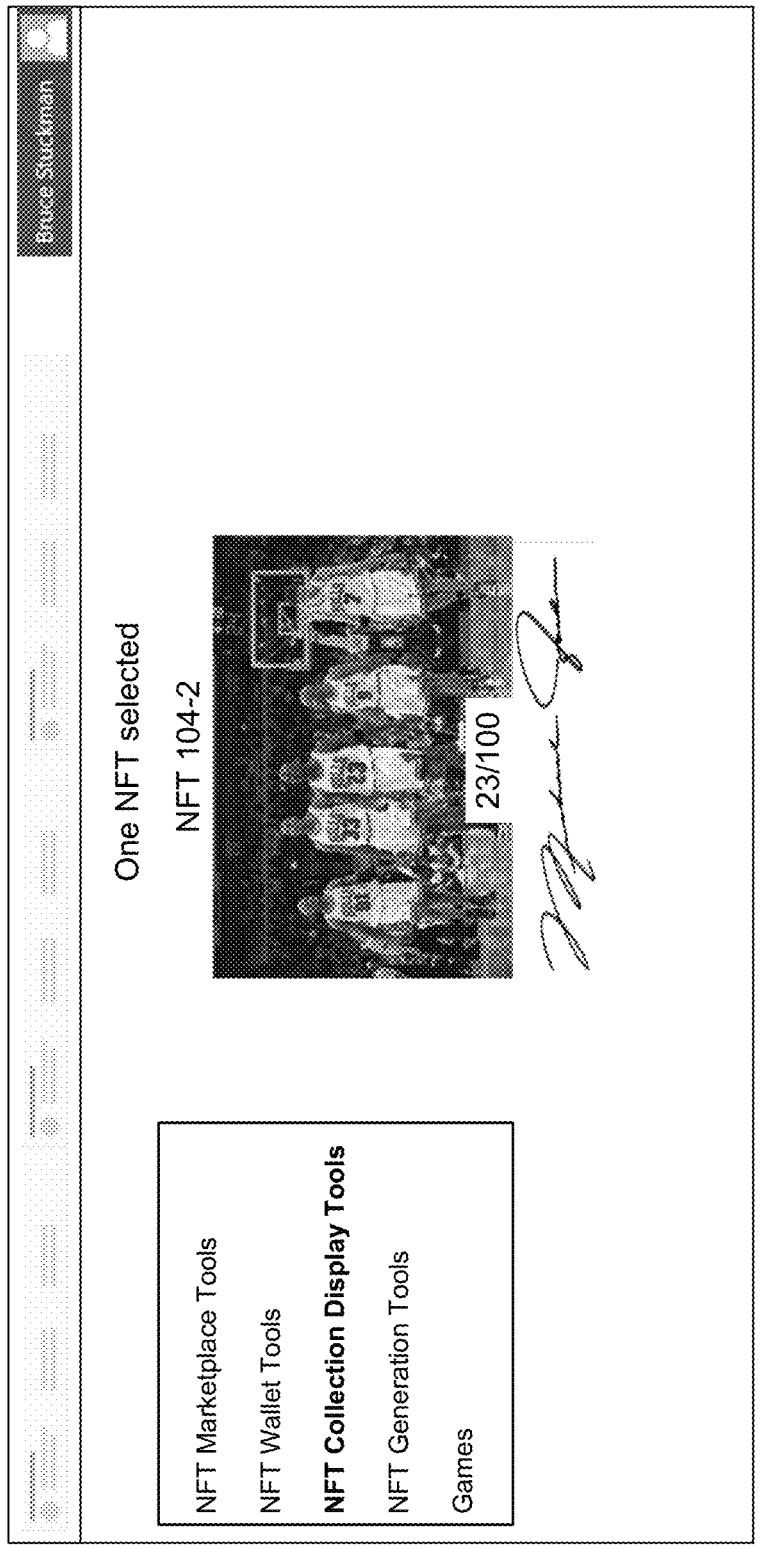
Figure 13D:
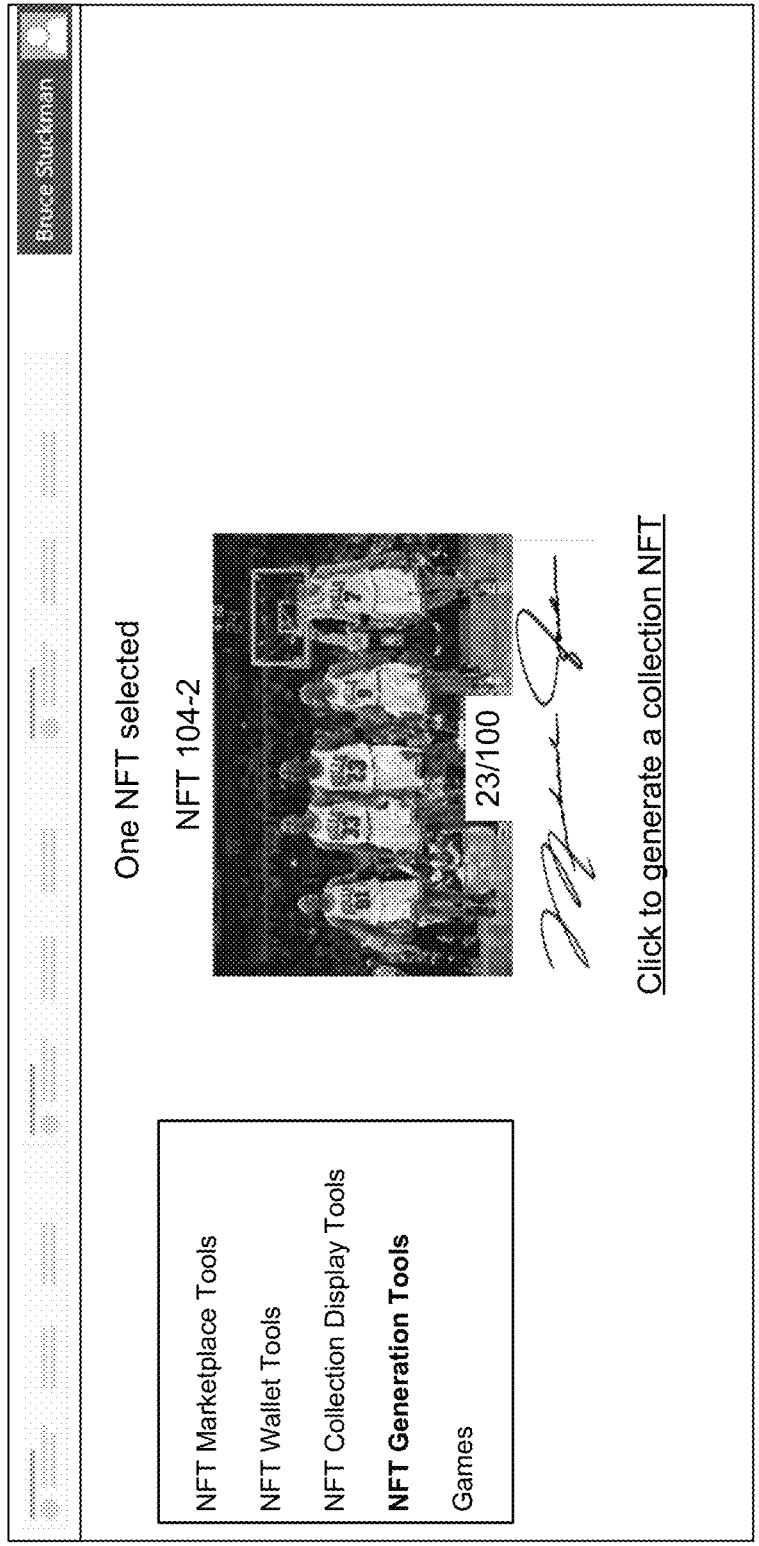

FIGS. 13B-13D present pictorial representations of example screen displays. In FIG. 13B, the user is interacting with the graphical user interface to use the NFT marketplace tools to seek an endorsement for a selected NFT. In FIG. 13C, an endorsement in the form of a signature has been received and appended to the customized collection display of the NFT. In FIG. 13D, the user interacts with the NFT generation tools to generate a collection NFT that includes both the NFT and the signature. In various examples, this collection NFT 120-6 metadata can also indicate an attribution associated the endorsement itself. Furthermore, the endorsement itself can be an original NFT, a derivative NFT, a micro-loaned NFT or other NFT.

Figure 14B:
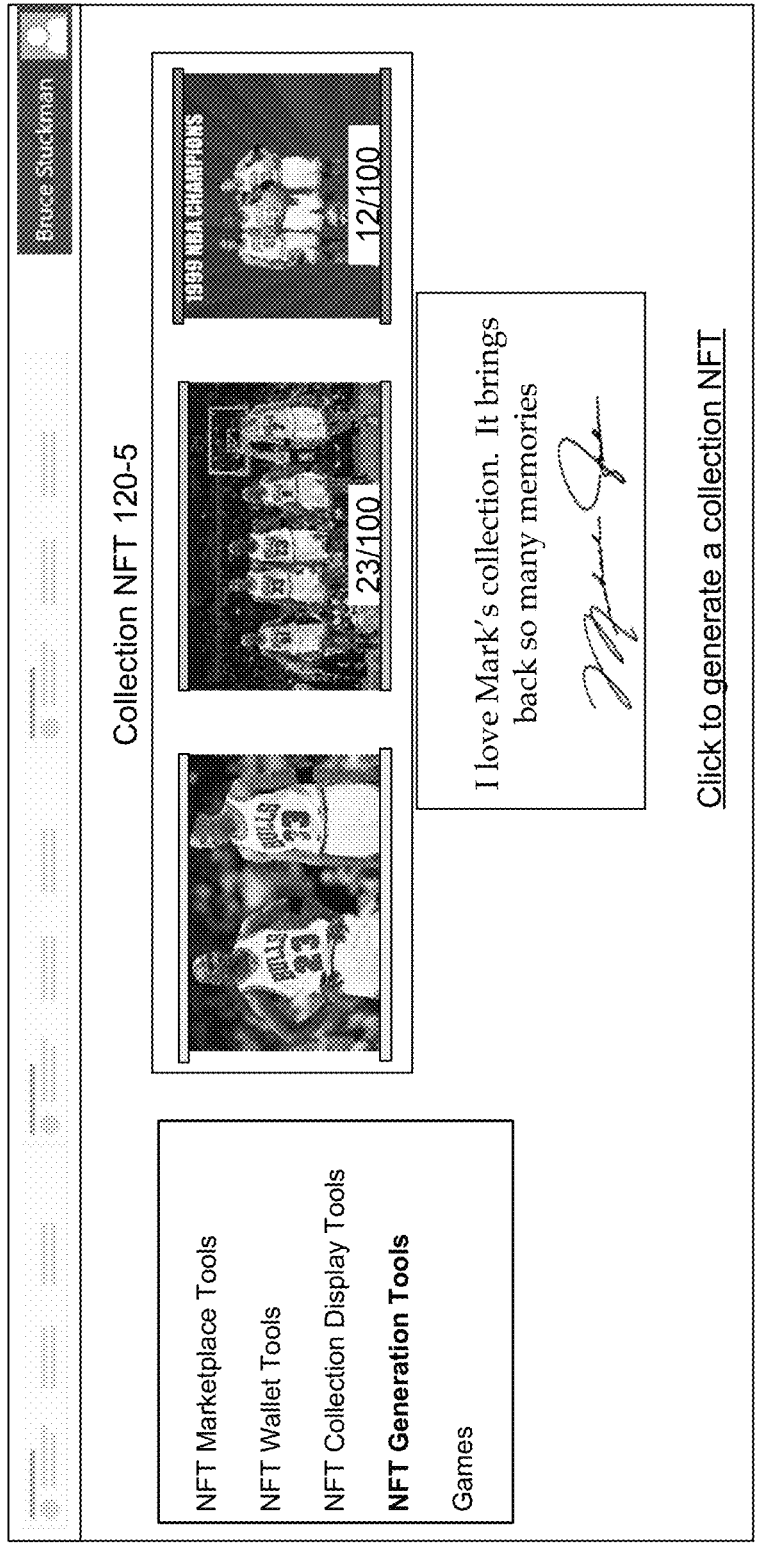
FIG. 14B presents a pictorial representation of an example screen display.

FIG. 14A presents a flowchart representation of an example method. In particular, a method 1400 for use in conjunction with any of the functions and features previously described facilitates the collection of endorsements associated with a collection NFT.

Step 1402 includes collecting, via a processor and in response to user interactions with the graphical user interface, endorsement data associated with a collection NFT. Step 1404 includes generating, via the processor and in response to user interactions with the graphical user interface, display data associated with a customized collection display that contains the collection NFT and the endorsement data. Step 1406 includes sending, via the network interface, the display data associated with the customized collection display via the client device of the user. Step 1408 includes facilitating creation of an endorsed collection NFT corresponding to the customized collection display.

In FIG. 14D, the user has obtained an endorsement for a collection NFT 120-5 and interacts with the NFT generation tools to generate a new collection NFT that includes both the NFT and the endorsement with associated metadata.

Figure 15:
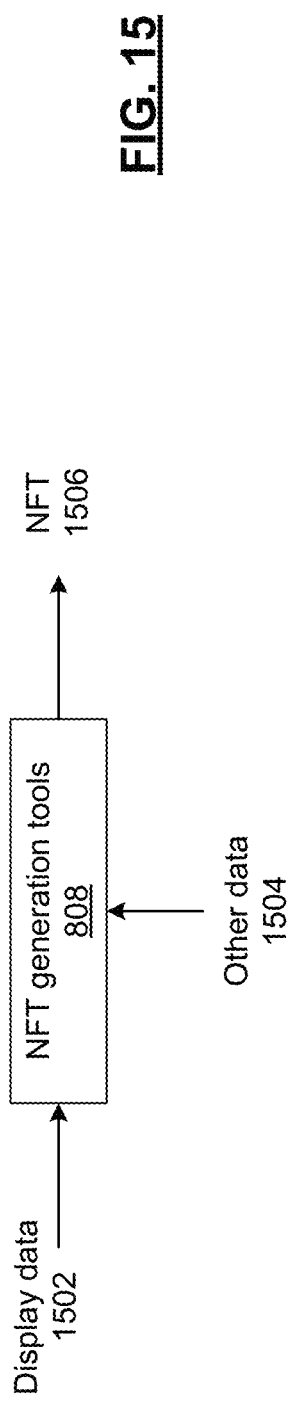
FIG. 15 presents a block diagram/flow representation of an example of NFT generation.

FIG. 15 presents a block diagram/flow representation of an example of NFT generation. In the example shown, NFT generation tools 808 operate to convert display data 1502 and other data 1504 into an NFT 1506. The display data 1502 can correspond to an original NFT, borrowed (e.g. temporary micro-loaned) NFT, a derivative NFT, a customized collection display 110, an original image, and/or other derivatives or micro-loans thereof or other display or image data. In various examples, the NFT generation tools 808 can operate to verify the credentials of any NFTs whose images are contained in the display data 1502, prior to creating the NFT 1506. In this fashion, derivative NFTs can only be created when the source NFT or NFTs are verified—preventing the creation of unauthorized or counterfeit NFTs.

The other data 1504, can be image data including signatures and other endorsement images, visual indications of derivative series, originality classification, attributions, or other image data, metadata of all kinds including metadata indicating one or more originality classifications, attributions, endorsement data, other derivative data indicating the series number and total number in a derivative series, restrictions on micro-loans or other derivatives, restrictions on derivatives with artistic effects, restrictions that derivatives must include attributions to the original source, restrictions on numbers of derivatives or micro-loans or the sizes of derivative series, restrictions on the creation of collection NFTs, the number of collection NFTs, the creation of collection NFTs including NFTs from other sources, from prohibited sources or with prohibited content, geographical restrictions, time restrictions (e.g., can be used to create derivatives or collection NFTs or can be temporarily micro-loaned for 1 month, one year, etc., other restrictions and/or other data associated with, or to be associated with, the display data 1502.

This other data 1504 can be used to generate an NFT and/or combined with the display data 1502 to create a dataset that includes both the display data 1502 and the other data 1504. This other data 1504 or combined dataset can be protected via the blockchain and/or other crypto-based NFT creation technology that is employed by the NFT generation tools 808 and via the NFT creation system 824 to create and protect the new NFT 1506 itself. It should be noted that the NFT 1506 can include a single derivative or a number of derivatives, including a limited series of derivatives. It should be noted further that some or all of the other data 1504, including restriction data and/or attribution data, can be derived from one or more original NFTs whose images are associated with the display data 1502. Furthermore, some or all of the other data 1504 can be generated in response to user interactions with a graphical user interface generated in conjunction with the NFT collection platform 800.

Figure 16A:
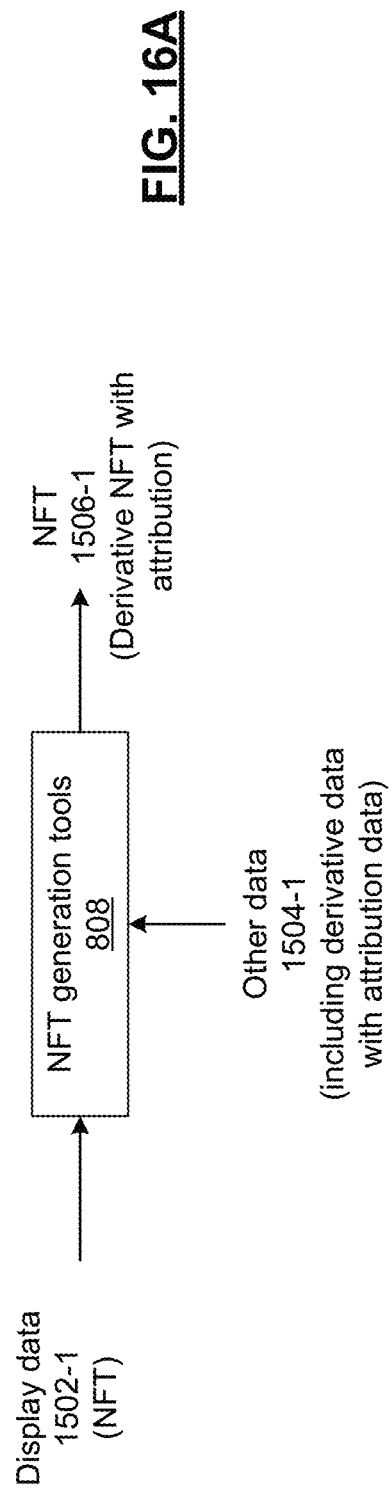
FIG. 16A presents a block diagram/flow representation of an example of NFT generation.

FIG. 16A presents a block diagram/flow representation of an example of NFT generation. In the example shown, display data 1502-1 associated with an NFT (e.g. an original NFT or collection NFT owned by the user) is combined with other data 1504-1 that includes derivative data. The derivative data can include information about the derivative(s) including restrictions, information on a derivative series and visual indications to be associated with the derivative(s) along with attribution data associated with one or more attributions and used to create a derivative NFT 1506-1 that includes the attribution(s). For example, an original NFT can be used to create a derivative NFT that includes an attribution to the source of the original NFT. This attribution can be used, for example, to give credit to the original source, to provide financial remuneration to the source based on the display and/or use of the derivative in collections, micro-loans, etc., to set an originality classification of the resulting derivative NFT and/or for other purposes.

FIG. 16B presents a flowchart representation of an example method. In particular, a method 1600 is presented for use in conjunction with any of the functions and features previously described. Step 1602 includes importing, via a network interface, an NFT associated with the user of the client device. Step 1604 includes generating derivative data via the processor and in response to user interactions with the graphical user interface, wherein the derivative data includes attribution data associated with at least one source of the NFT. Step 1606 includes facilitating creation of at least one derivative NFT corresponding to the NFT that includes the attribution data.

Figure 17A:
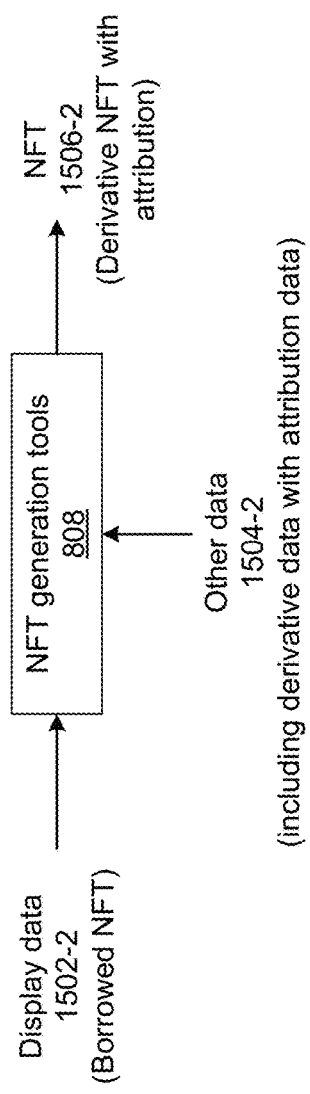
FIG. 17A presents a block diagram/flow representation of an example of NFT generation.

FIG. 17A presents a block diagram/flow representation of an example of NFT generation. In the example shown, display data 1502-2 associated with an NFT (e.g. an original NFT or collection NFT borrowed by the user) is combined with other data 1504-2 that includes derivative data. The derivative data can include information about the derivative(s) including restrictions, information on a derivative series and visual indications to be associated with the derivative(s) along with attribution data associated with one or more attributions and used to create a derivative NFT 1506-2 that includes the attribution(s). For example, an original NFT temporarily micro-loaned to the user (borrowed) can be used to create a derivative NFT that includes an attribution to the source of the original NFT.

Figure 17B:
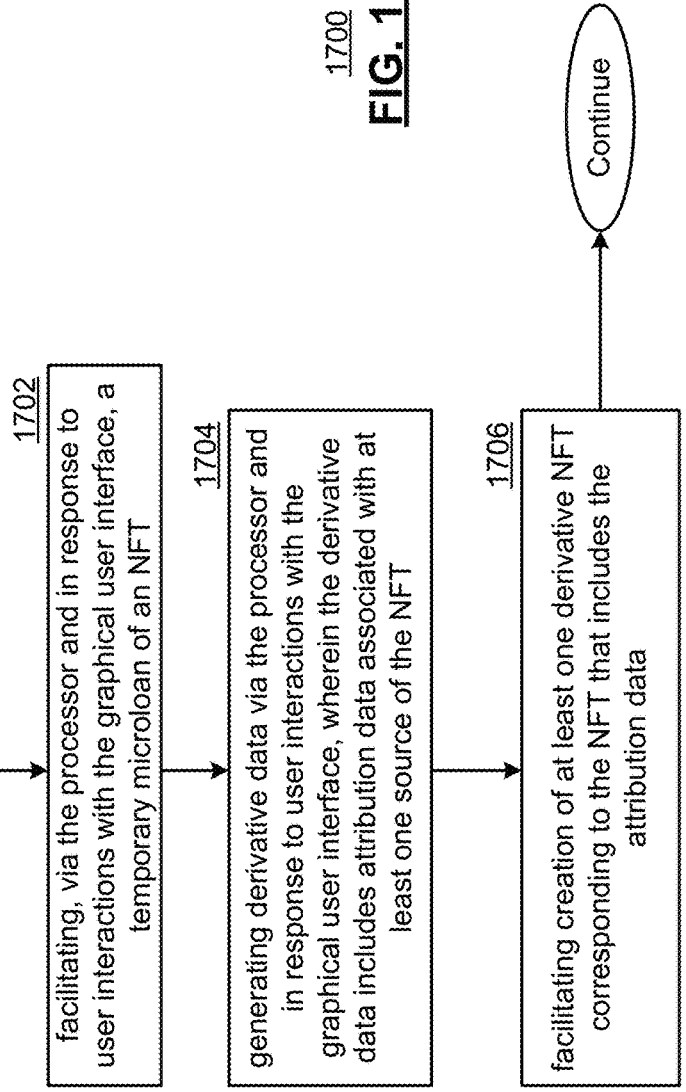
FIG. 17B presents a flowchart representation of an example method.

FIG. 17B presents a flowchart representation of an example method. In particular, a method 1700 is presented for use in conjunction with any of the functions and features previously described. Step 1702 includes facilitating, via the processor and in response to user interactions with the graphical user interface, a temporary micro-loan of an NFT. Step 1704 includes generating derivative data via the processor and in response to user interactions with the graphical user interface, wherein the derivative data includes attribution data associated with at least one source of the NFT. Step 1706 includes facilitating creation of at least one derivative NFT corresponding to the NFT that includes the attribution data.

Figure 18A:
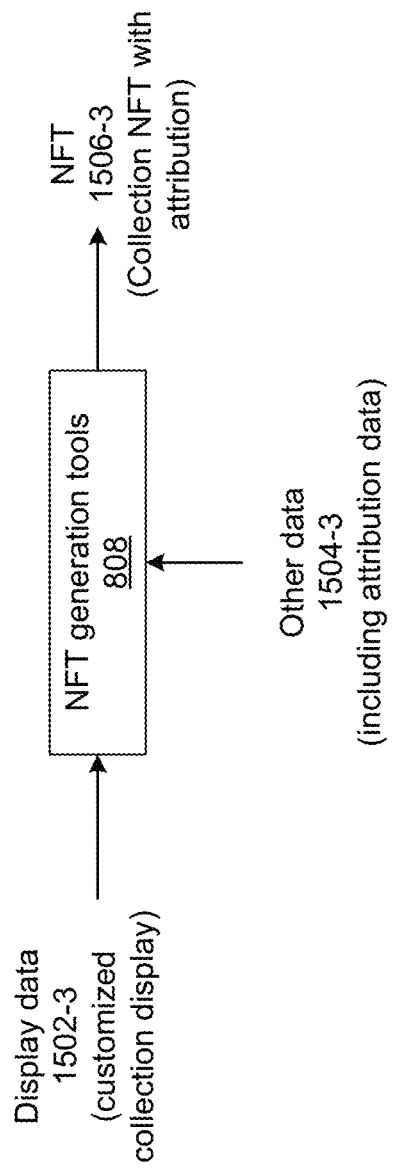
FIG. 18A presents a block diagram/flow representation of an example of NFT generation.

FIG. 18A presents a block diagram/flow representation of an example of NFT generation. In the example shown, display data 1502-3 corresponds to a customized collection display created by the user based on multiple NFTs (e.g. original NFTs, derivative NFTs, borrowed NFTs, collection NFTs, etc.) are combined with other data 1504-3 that includes attribution data associated with one or more attributions and used to create a collection NFT 1506-3 that includes the attributions to any original NFTs, derivative NFTs and their own original NFTs, borrowed NFTs, other collection NFTs and their original NFT sources, etc.

FIG. 18B presents a flowchart representation of an example method. In particular, a method 1800 is presented for use in conjunction with any of the functions and features previously described. Step 1802 includes importing, via a network interface, a plurality of NFTs associated with the user of the client device. Step 1804 includes generating, via the processor and in response to user interactions with the graphical user interface, display data associated with a customized collection display that contains the plurality of NFTs.

Step 1806 includes sending, via the network interface, the display data associated with the customized collection display via the client device of the user. Step 1808 includes facilitating creation of a collection NFT corresponding to the customized collection display that contains the plurality of NFTs and attribution data indicating one or more sources associated with the plurality of NFTs.

Figure 19A:
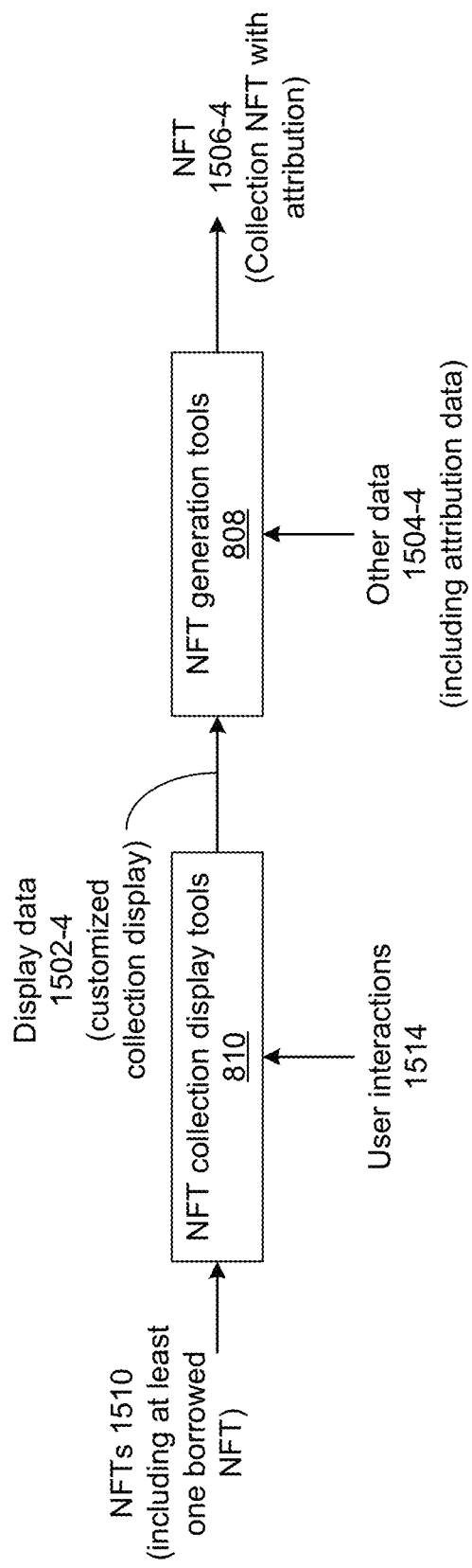
FIG. 19A presents a block diagram/flow representation of an example of NFT generation.

FIG. 19A presents a block diagram/flow representation of an example of NFT generation. In the example shown, display data 1502-4 is generated from a plurality of NFTs 1510 (including at least one borrowed NFT) based on user interactions 1514 with the NFT collection display tools 810. In particular, display data 1502-4 corresponds to a customized collection display created by the user based on multiple NFTs (e.g. original NFTs, derivative NFTs, collection NFTs, and at least one borrowed NFT, etc.) that are combined with other data 1504-4 that includes attribution data associated with one or more attributions associated with the NFTs of the collection and used to create a collection NFT 1506-4. In particular, the NFT 1506-4 includes the attributions to any original NFTs, derivative NFTs and their own original NFTs, the borrowed NFT(s), other collection NFTs and their original NFT sources, etc.

FIG. 19B presents a flowchart representation of an example method. In particular, a method 1900 is presented for use in conjunction with any of the functions and features previously described. Step 1902 includes facilitating, via the processor and in response to user interactions with the graphical user interface, a temporary micro-loan of at least one NFT. Step 1904 includes generating, via the processor and in response to user interactions with the graphical user interface, display data associated with a customized collection display that contains a plurality of NFTs including the at least one NFT. Step 1906 includes sending, via the network interface, the display data associated with the customized collection display via the client device of the user. Step 1908 includes facilitating creation of a collection NFT corresponding to the customized collection display that contains the plurality of NFTs and attribution data indicating one or more sources associated with the plurality of NFTs.

Figure 20A:
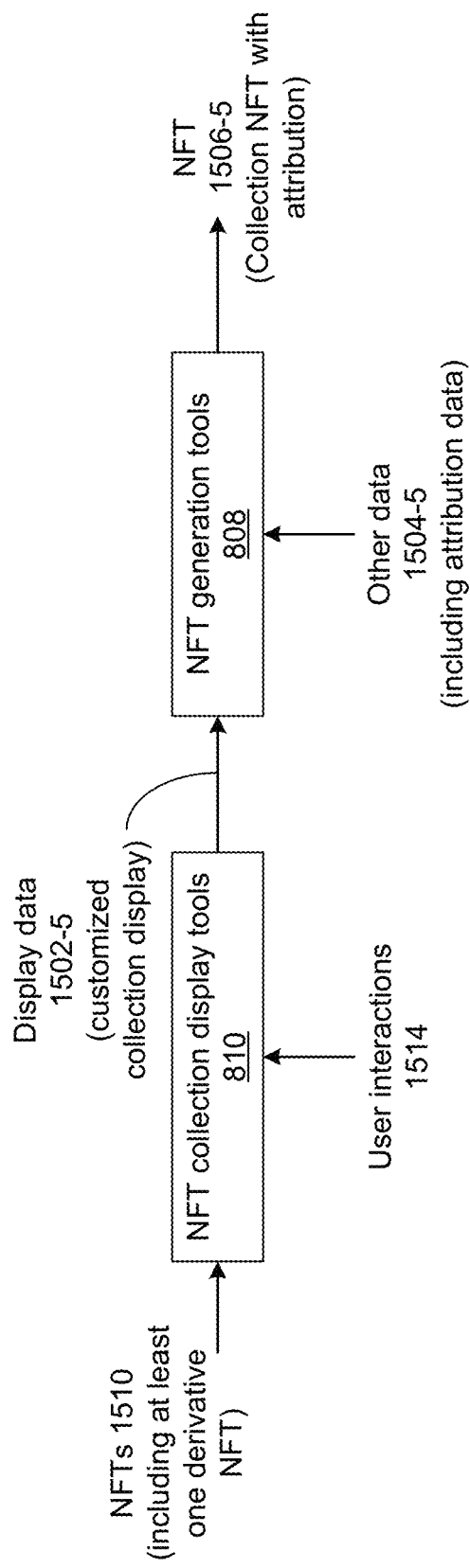
FIG. 20A presents a block diagram/flow representation of an example of NFT generation.

FIG. 20A presents a block diagram/flow representation of an example of NFT generation. In the example shown, display data 1502-5 is generated from a plurality of NFTs 1510 (including at least one derivative NFT) based on user interactions 1514 with the NFT collection display tools 810. In particular, display data 1502-5 corresponds to a customized collection display created by the user based on multiple NFTs (e.g. original NFTs, collection NFTs, borrowed NFT, at least one derivative NFT etc.) that are combined with other data 1504-5 that includes attribution data associated with one or more attributions associated with the NFTs of the collection and used to create a collection NFT 1506-5. In particular, the NFT 1506-5 includes the attributions to any original NFTs, derivative NFTs and their own original NFTs, the borrowed NFT(s), other collection NFTs and their original NFT sources, etc.

FIG. 20B presents a flowchart representation of an example method. In particular, a method 2000 is presented for use in conjunction with any of the functions and features previously described. Step 2002 includes importing, via a network interface, a plurality of NFTs associated with the user of the client device, wherein at least one of the plurality of NFTs is a derivative NFT created from an original NFT. Step 2004 includes generating, via the processor and in response to user interactions with the graphical user interface, display data associated with a customized collection display that contains the plurality of NFTs. Step 2006 includes sending, via the network interface, the display data associated with the customized collection display via the client device of the user. Step 2008 includes facilitating creation of a collection NFT corresponding to the customized collection display that contains the plurality of NFTs and attribution data indicating one or more sources associated with the plurality of NFTs including at least one source associated with the original NFT.

Figure 21A:
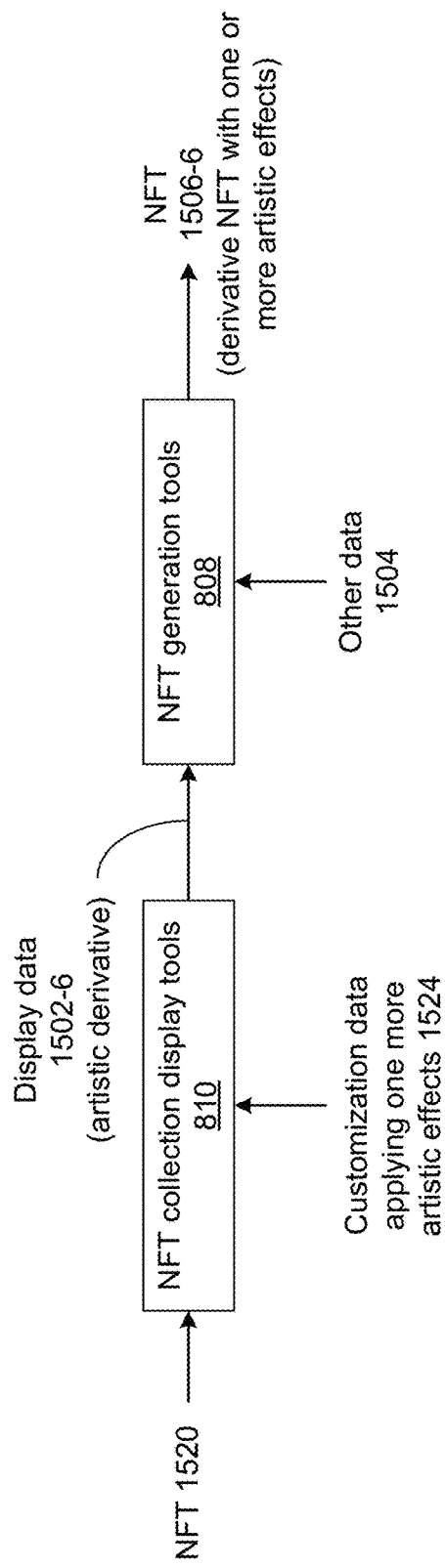
FIG. 21A presents a block diagram/flow representation of an example of NFT generation.

FIG. 21A presents a block diagram/flow representation of an example of NFT generation. In the example shown, display data 1502-6 is an artistic derivative generated from an NFT 1520 and customization data applying one or more artistic effects 1524 generated based on user interactions with the NFT collection display tools 810. In particular, display data 1502-6 corresponds to artistic customization of the NFT 1520 created by the user that is used to create an NFT 1506-6 that is a derivative NFT having the one or more artistic effects.

In various examples, the artistic effects include computerized, autistic techniques (or special effects) that can be applied to an image or collection of images. The effects can be changes in contrast, brightness, shading, fill, background, borders, aspect ratio, rotations, cropping, color, and further include filters and other transformation functions that enable user to modify images that simulate autistic styles such as colored pencils, watercolors chalk pastels, charcoal, pen and inks crayons, line drawings, gray scale images, cartoons, caricatures, and/other artistic effects.

Figure 21B:
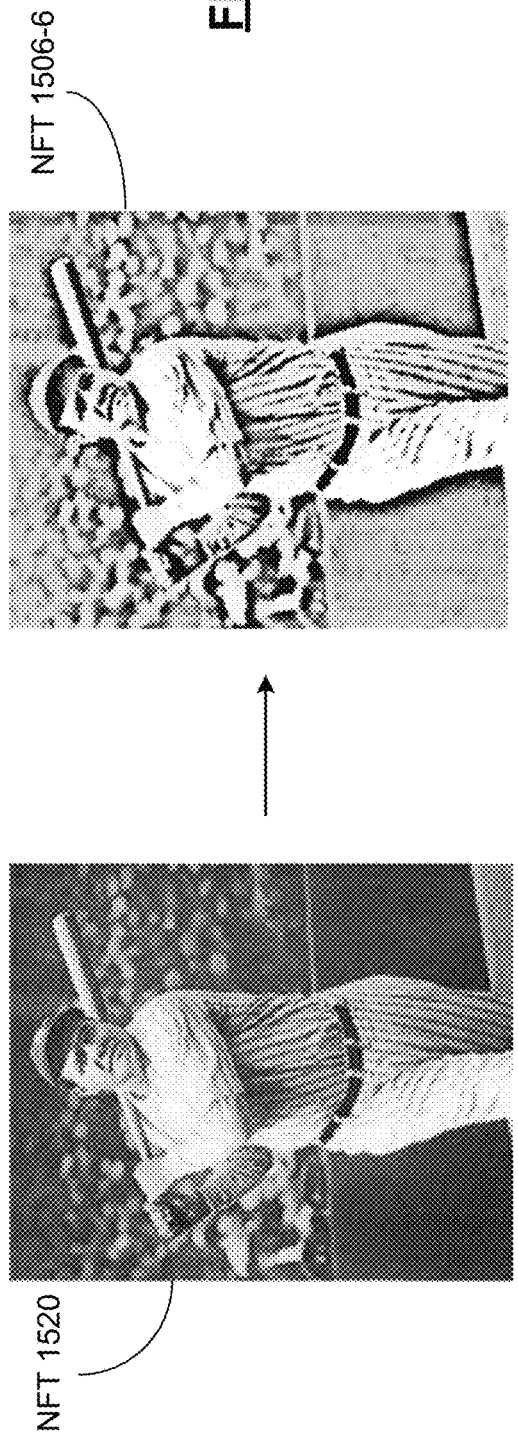
FIG. 21B presents a pictorial representation of example results of applying artistic effects.

FIG. 21B presents a pictorial representation of example results of applying artistic effects. In the example shown, the NFT 1520 corresponds to an original image of Babe Ruth from 1927. The user has applied one or more artistic effects to the image and generated NFT 1506-6 that includes those artistic effect(s).

FIG. 21C presents a flowchart representation of an example method. In particular, a method 2100 is presented for use in conjunction with any of the functions and features previously described. Step 2102 includes importing, via a network interface, an NFT associated with the user of the client device. Step 2104 includes generating customization data via the processor and in response to user interactions with the graphical user interface, wherein the customization data applies one or more artistic effects to the NFT. Step 2106 includes facilitating creation of at least one derivative NFT corresponding to the NFT that includes the one or more artistic effects.

Figure 22A:
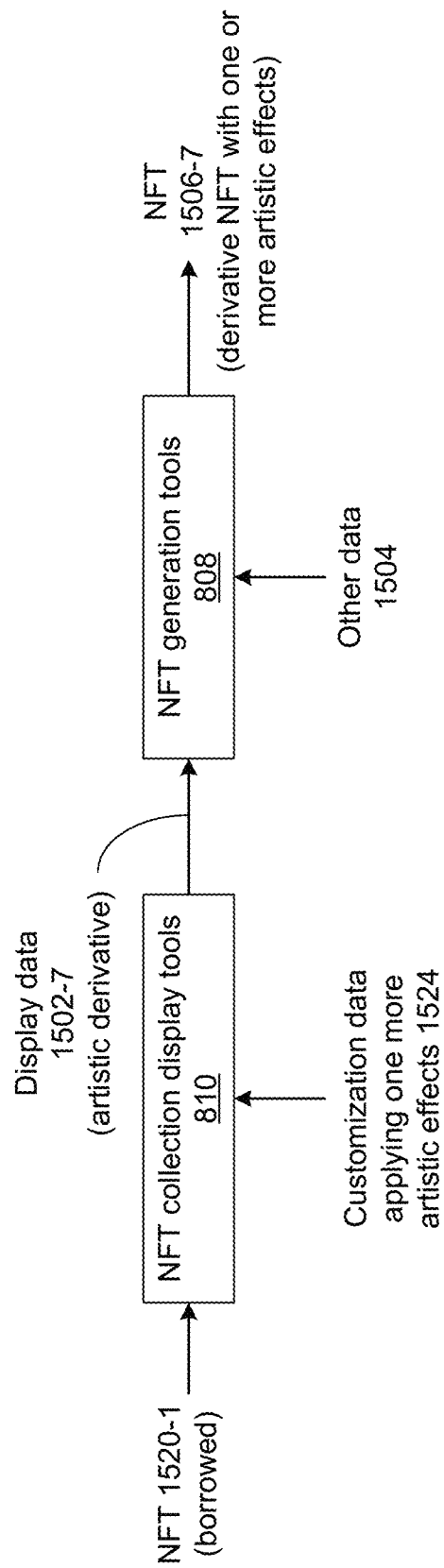
FIG. 22A presents a block diagram/flow representation of an example of NFT generation.

FIG. 22A presents a block diagram/flow representation of an example of NFT generation. In the example shown, display data 1502-7 is an artistic derivative generated from a borrowed NFT 1520-1 and customization data applying one or more artistic effects 1524 generated based on user interactions with the NFT collection display tools 810. In particular, display data 1502-7 corresponds to artistic customization of the NFT 1520-1 created by the user that is used to create an NFT 1506-7 that is a derivative NFT having the one or more artistic effects.

FIG. 22B presents a flowchart representation of an example method. In particular, a method 2200 is presented for use in conjunction with any of the functions and features previously described. Step 2202 includes facilitating, via the processor and in response to user interactions with the graphical user interface, a temporary micro-loan of an NFT. Step 2204 includes generating customization data via the processor and in response to user interactions with the graphical user interface, wherein the customization data applies one or more artistic effects to the NFT. Step 2206 includes facilitating creation of at least one derivative NFT corresponding to the NFT that includes the one or more artistic effects.

Figure 23A:
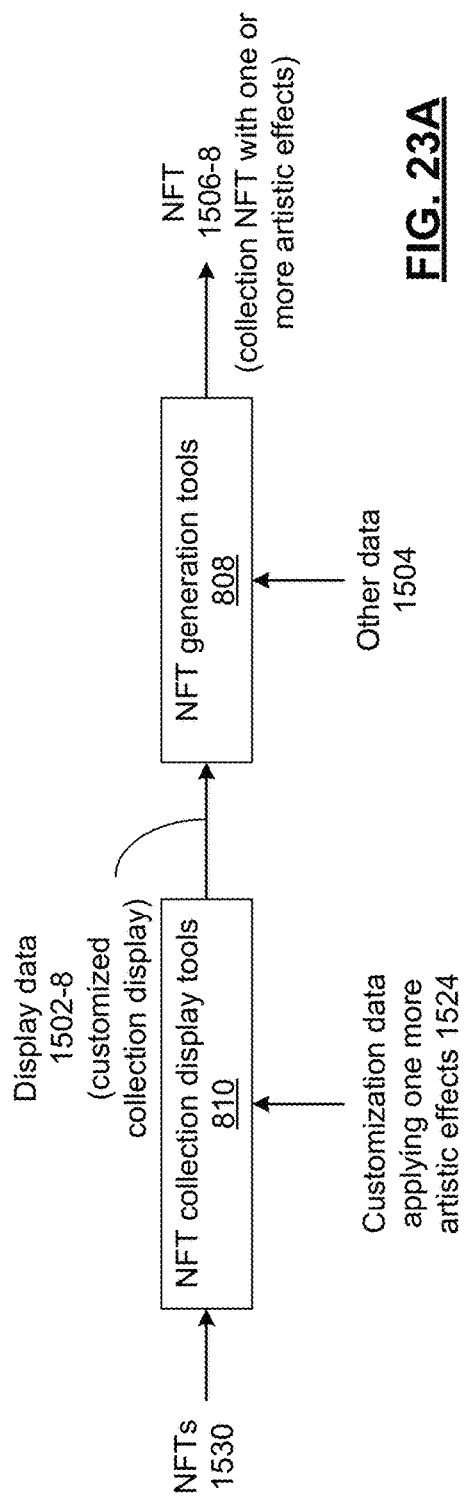
FIG. 23A presents a block diagram/flow representation of an example of NFT generation.

FIG. 23A presents a block diagram/flow representation of an example of NFT generation. In the example shown, display data 1502-8 is a customized collection display generated from NFTs 1530 and customization data applying one or more artistic effects 1524 generated based on user interactions with the NFT collection display tools 810. In particular, display data 1502-8 corresponds to artistic arrangement and customization of the multiple NFTs 1530 (e.g., original NFTs, collection NFTs, borrowed NFT, and/or derivative NFT, etc.) created by the user that is used to create an NFT 1506-8 that is a collection NFT having the one or more artistic effects.

Figure 23B:
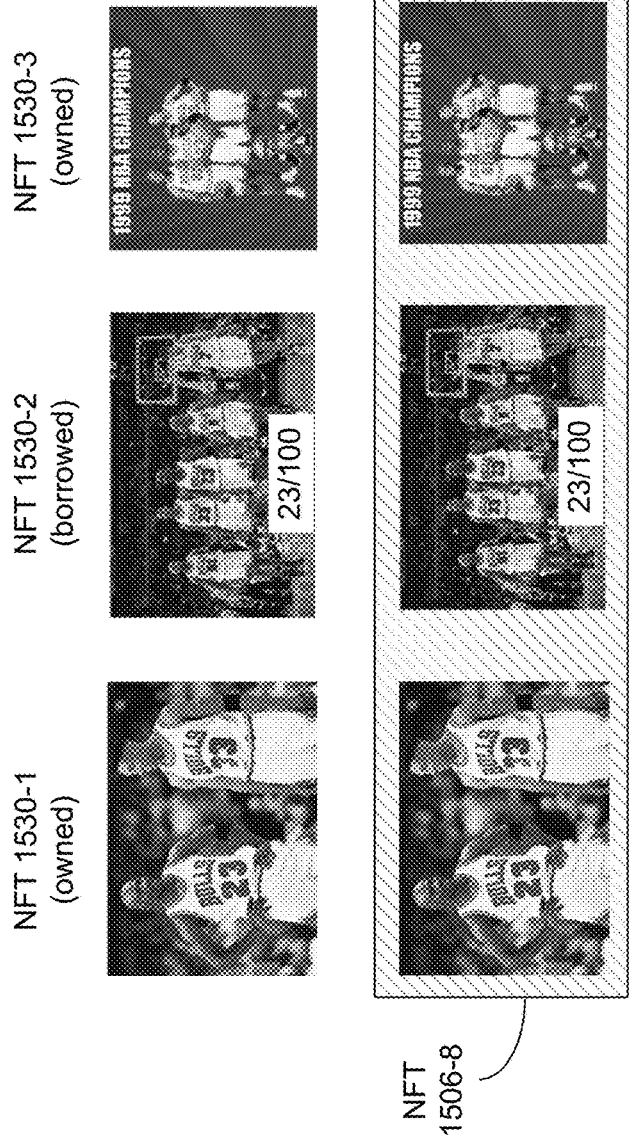
FIG. 23B presents a pictorial representation of example results of applying artistic effects.

FIG. 23B presents a pictorial representation of example results of applying artistic effects. In the example shown, the NFTs 1530 corresponds to three images of the 1999 Chicago Bulls, where NFTs 1530-1 and 1530-3 are owned originals and NFT 1530-2 is a borrowed derivative. The user has applied one or more artistic effects to the image in the form of an arrangement and a shaded color background and generated NFT 1506-8 that includes those artistic effects.

FIG. 23C presents a flowchart representation of an example method. In particular, a method 2300 is presented for use in conjunction with any of the functions and features previously described. Step 2302 includes importing, via a network interface, a plurality of NFTs associated with the user of the client device. Step 2304 includes generating, via the processor and in response to user interactions with the graphical user interface, display data associated with a customized collection display that contains the plurality of NFTs and applies one or more artistic effects. Step 2306 includes sending, via the network interface, the display data associated with the customized collection display via the client device of the user. Step 2308 includes facilitating creation of a collection NFT corresponding to the customized collection display that contains the plurality of NFTs in accordance with the one or more artistic effects.

FIG. 24A presents a block diagram/flow representation of an example of NFT generation. In the example shown, display data 1502-9 is associated with a borrowed NFT that includes restriction data that indicate one or more restrictions. The NFT generation tools receive other data 1504-9 that includes derivative data including its own proposed derivative information, for example, the size of the series, visualization of series numbers, restrictions. The NFT generation tools compare the restrictions data to the derivative data and only allow the creation of the NFT derivative(s)

1506-9 if all of the restrictions indicated by the restriction data of the borrowed NFT are met. This prohibits generation of one or more derivative NFTs in circumstances where, for example, no derivatives are allowed, or where the proposed derivatives lack the required attribution, include prohibited artistic effects, the size of the series is too large, or one or more other restrictions would be violated.

FIG. 24B presents a flowchart representation of an example method. In particular, a method 2400 is presented for use in conjunction with any of the functions and features previously described. Step 2402 includes facilitating, via the processor and in response to user interactions with the graphical user interface, a temporary micro-loan of an NFT, wherein the NFT includes restriction data associated with one or more restrictions. Step 2404 includes generating derivative data via the processor and in response to user interactions with the graphical user interface. Step 2406 includes comparing the derivative data to the restriction data. Step 2408 includes facilitating creation of at least one derivative NFT corresponding to the NFT in accordance with the derivative data when the derivative data indicates no violation of any of the one or more restrictions. Step 2410 includes prohibiting creation of at least one derivative NFT corresponding to the NFT when the derivative data indicates a violation of any of the one or more restrictions.

FIG. 25A presents a block diagram/flow representation of an example of NFT generation. In the example shown, display data 1502-10 associated with an NFT (e.g. an original NFT or collection NFT owned by the user) is combined with other data 1504-10 that includes derivative data with one or more restrictions that is used to create a derivative NFT 1506-10 that includes the restrictions(s).

FIG. 25B presents a flowchart representation of an example method. In particular, a method 2500 is presented for use in conjunction with any of the functions and features previously described. Step 2502 includes importing, via a network interface, an NFT associated with the user of the client device. In step 2504 includes generating derivative data via the processor and in response to user interactions with the graphical user interface, wherein the derivative data includes restriction data associated with one or more restrictions. Step 2506 includes facilitating creation of at least one derivative NFT corresponding to the NFT that includes the restriction data.

Figure 26A:
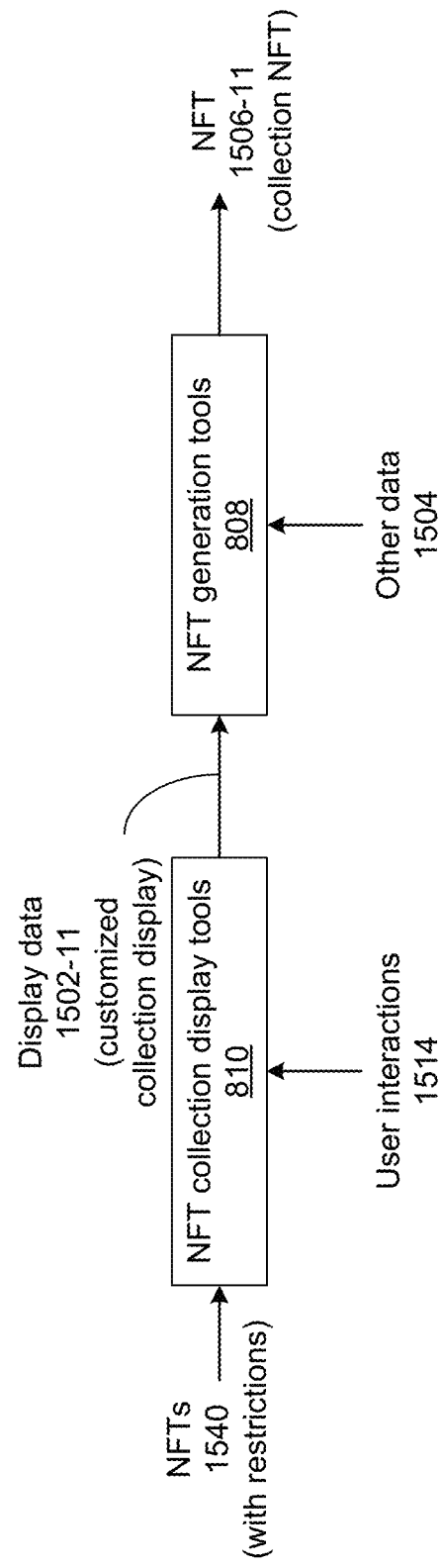
FIG. 26A presents a block diagram/flow representation of an example of NFT generation.

FIG. 26A presents a block diagram/flow representation of an example of NFT generation. In the example shown, display data 1502-11 is associated with a customized collection display of NFTs 1540 generated in response to user interactions 1514 with the NFT collection display tools 810. One or more of the NFTs 1540 include restriction data that indicate one or more restrictions. The NFT generation tools 808 only allow the creation of the collection NFT derivative 1506-11 if all of the restrictions indicated by the restriction data of the NFTs 1540 are met. This prohibits generation of one or more collection NFTs in circumstances where, for example, no collections are allowed, or where the proposed collection lacks the required attribution, includes prohibited artistic effects includes prohibited sources or content, is too large, includes other collections and/or one or more other restrictions would be violated.

FIG. 26B presents a flowchart representation of an example method. In particular, a method 2600 is presented for use in conjunction with any of the functions and features previously described. Step 2602 includes importing, via a network interface, a plurality of NFTs associated with the user of the client device, wherein at least one of the plurality of NFTs includes restriction data associated with one or more restrictions. Step 2604 includes generating, via the processor and in response to user interactions with the graphical user interface, display data associated with a customized collection display that contains the plurality of NFTs. Step 2606 includes sending, via the network interface, the display data associated with the customized collection display via the client device of the user. Step 2608 includes facilitating creation of a collection NFT corresponding to the customized collection display when the creation does not violate any of the one or more restrictions. Step 2610 includes prohibiting creation of the collection NFT corresponding to the customized collection display when the creation would violate any of the one or more restrictions.

FIG. 27A presents a block diagram/flow representation of an example of NFT generation. In the example shown, display data 1502-12 is associated with a customized collection display of NFTs 1550 generated in response to user interactions 1514 with the NFT collection display tools 810. The NFTs 1540 include at least one image NFT and one data NFT (i.e., without a corresponding image). The NFT generation tools generate a collection NFT 1506-12, not only with other data 1504, but also with the data from the corresponding data NFT(s) of NFTs 1550.

FIG. 27B presents a flowchart representation of an example method. In particular, a method 2700 is presented for use in conjunction with any of the functions and features previously described. Step 2702 includes importing, via a network interface, a plurality of NFTs associated with the user of the client device, wherein the plurality of NFTs includes at least one image NFT and at least one data NFT. Step 2704 includes generating, via the processor and in response to user interactions with the graphical user interface, collection data containing the at least one image NFT and further containing data associated with the at least one data NFT. Step 2706 includes facilitating creation of a collection NFT corresponding to the collection data containing the at least one image NFT and further containing the data associated with the at least one data NFT.

FIG. 28A presents a block diagram representation of an example system. In particular, a system 2850 is presented that includes an NFT distribution platform 2800 that communicates with client devices 825 via a network 115. The network 115 can be the Internet or other wide area or local area network, either public or private. The client devices 825 can be computing devices associated with users, for example, buyers, sellers, collectors and/or users of NFTs.

In the example shown, the NFT distribution platform 2800 includes a client device interface 2802 for interacting with the client devices 825, NFTs 2804 to be distributed, and an operating system 2844. One or more of the NFTs 2804 can have geographical restrictions as to distribution that are either part of the NFTs themselves or have restriction data that is stored separately.

The NFT distribution platform 2800 includes a network interface 2820 such as a 3G, 4G, 5G or another cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via the network 115.

The NFT distribution platform 2800 also includes a processing module 2830 and memory module 2840 that stores an operating system (O/S) 2844 such as an Apple, Unix, Linux or Microsoft operating system or another operating system, the client device interface 2802, and the NFTs

2804. The O/S 2844 and the client device interface 802 each include operational instructions that, when executed by the processing module 830, cooperate to configure the processing module 830 into a special purpose device to perform the particular functions of the NFT distribution platform 2800 described herein.

The NFT distribution platform 2800 may include a user interface (I/F) 2862 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to an administrator of the NFT distribution platform 2800 and that generate data in response to the administrator's interaction with NFT distribution platform 2800.

The processing module 2830 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 2840. The memory module 2840 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 2860, other architectures are possible including additional data buses and/or direct connectivity between one or more elements. Further, the NFT distribution platform 2800 can include one or more additional elements that are not specifically shown.

For example, the client device interface 2802 can operate in conjunction with each client device 825 and via network 115 to generate a graphical user interface. This graphical user interface is based on display data generated by the NFT distribution platform 2800 in a format for display on a display device associated with the client devices 825. This graphical user interface generates input data that is received by the NFT distribution platform 2800 from the client devices 825 in response to user interaction with the graphical user interface.

In various examples, the NFT distribution platform 2800 can operate to respond to input data from client devices in the form of read requests for NFTs and geolocation data such as GPS coordinates, connection to or proximity with a network element of network 115 or other location data indicating a location of the client device 825. The NFT distribution platform 2800 sends the requested NFT(s) to the requesting client device—only when the geolocation data conforms with restriction data—for example, when the geolocation data indicates a position of the requesting client device within a limited area or proximity indicated by the restriction data.

Figure 28C:
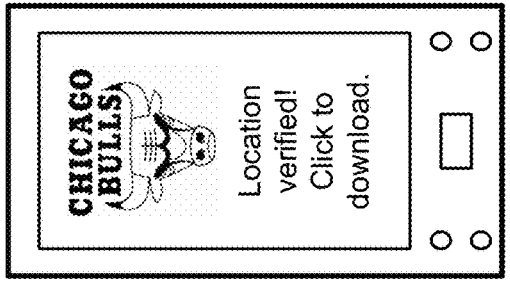
FIG. 28C presents a pictorial representation of an example client device display.
Figure 28D:
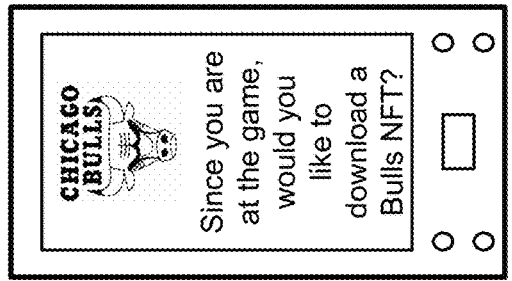
FIG. 28D presents a pictorial representation of an example client device display.
Figure 28B:
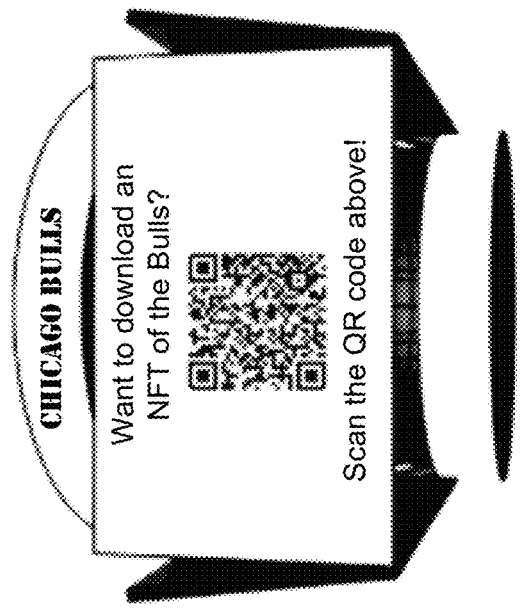
FIG. 28B presents a pictorial representation of an example jumbotron display.

FIG. 28B presents a pictorial representation of an example jumbotron display. In particular, the jumbotron of a sports stadium is shown that displays a prompt to attendees of the event to download NFTs by scanning the QR code with their mobile phones (client devices 825). When the QR code is scanned, the NFT distribution platform 2800 is automatically accessed by the client device 825 which receives geolocation data along with a request for an NFT. In this example, NFTs are restricted to attendees that are physically present at the event. This prevents an attendee from capturing and posting the QR code for use by others that are not present.

FIG. 28C presents a pictorial representation of an example client device display. In this example, a screen display is shown of client device 825 where the NFT distribution platform 2800 has verified that the location of the client device is within the stadium and has allowed the download of an NFT.

FIG. 28D presents a pictorial representation of an example client device display. In the prior example, the process began with the user of a client device scanning a displayed QR code. In this further example, the NFT distribution platform 2800 has automatically detected the presence of the user at the venue based on geolocation data received from the user's client device 825 and automatically prompted the user to click to send a read request. In this fashion, the user is geo-authorized, before the request.

FIG. 28E presents a flowchart representation of an example method. In particular, a method 2800 is presented for use in conjunction with any of the functions and features previously described. Step 2802 includes receiving from a client device, via a network interface, a read request associated with an NFT, the NFT including restriction data associated with one or more geographical restrictions. Step 2804 includes receiving, via the network interface, geolocation data associated with the client device. Step 2806 includes determining, via a processor, when the geolocation data associated with the client device conforms with the restriction data. Step 2808 includes sending the NFT to the client device via the network interface when the geolocation data associated with the client device conforms with the restriction data. As noted above, steps 2802 and 2804 can be performed in a different order.

Figure 29A:
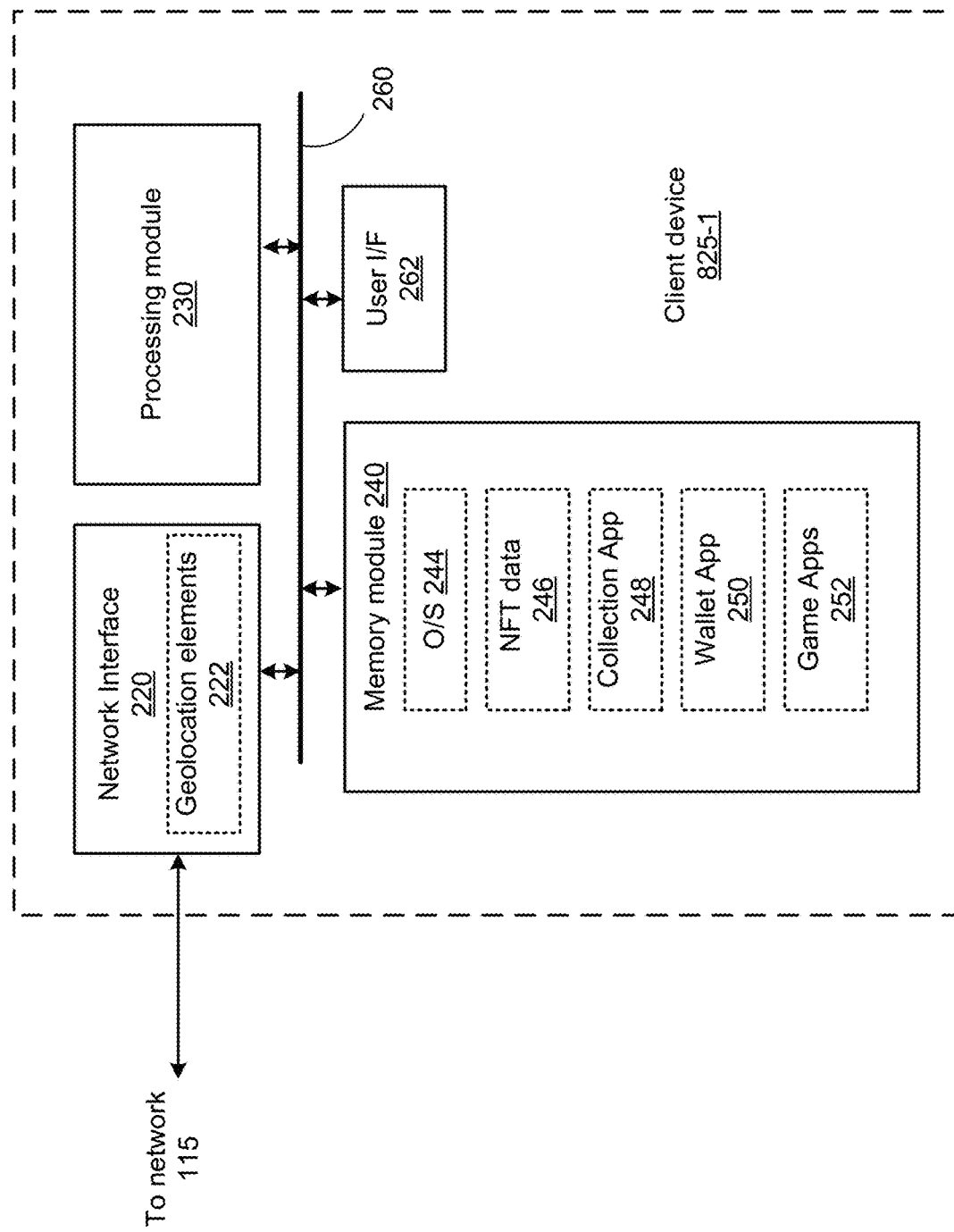
FIG. 29A presents a block diagram representation of an example client device.

FIG. 29A presents a block diagram representation of an example client device. In particular, a client device 825-1 is presented that functions similarly to client device 825, and includes several elements of client device 825 that are referred to by common reference numerals. The client device 815-1 is capable of operating to client device 825 previously described.

In addition, the memory module 240 includes a wallet application (app) 250 that is capable of engaging in financial transactions including credit card transactions and traditional digital payments, is capable of holding crypto-currency and engaging in crypto-currency transactions and is further capable of storing one or more NFTs that are either original NFTs, derivative NFTs, borrowed (temporarily micro-loaned) NFTs, collection NFTs and/or combinations thereof. In various examples, the wallet app 250 is capable of operating in conjunction with the NFT collection platform 800, the NFT distribution platform 2800, the NFT wallet system 820, the NFT marketplace 822, and/or the NFT creation system 824 via network 115.

Also, the memory module 240 includes one or more game apps 252 that represent either stand alone games of the client device 825-1 or that operate in conjunction with the games 813 of the NFT collection platform 800 and/or interface with the NFT distribution platform 2800. This allows, for example, a user of client device 825-1 to engage in games that involve the acquisition, collection, display, distribution, and/or use of one or more NFTs that are either original NFTs, derivative NFTs, borrowed (temporarily microloaned) NFTs, collection NFTs and/or combinations thereof.

Furthermore, the network interface 220 includes one more geolocations elements 222 such as a GPS receiver, a ultra-wideband (UWB) transceiver, a Bluetooth transceiver and/or other component(s) that that facilitate the generation of geolocation data and/or facilitate other location-based services. Consider the case where the client device 825 is a smartphone or tablet and the wallet app 250 is an Apple or Android wallet or mobile wallet card that is in a Apple or Android wallet. Once the wallet app 250 is activated, NFTs can be easily added to the wallet. In addition, the wallet app 250 can access the location services of the device, and for example, generate push notifications regarding NFTs that are available near the current location.

In various examples, the geolocation data generating in such a fashion can facilitate the generation of geolocation data discussed in conjunction with the operation of NFT distribution platform 2800. In particular, the NFT distribution platform 2800 can automatically detect the presence of the user at a venue based on geolocation data received from the user's client device 825-1 and automatically prompted the user to click to send a read request. In this fashion, the user can be geo-authorized, before the request.

Furthermore, while the client device 825-1 and NFT collection platform 800 are shown as separate devices that communicate via the network 115, it should be noted that any and all of the functionality attributed to the NFT collection platform 800, including the NFT marketplace tools 804, NFT wallet tools 806, NFT generation tools 808, NFT collection display tools 810, games 812, and database 814, etc. can likewise be incorporate directly into the client device 825. In this fashion, a client device 825 through the application of its operating system 244 and one or more applications can provide a graphical user interface to operate via network 115 but independently from any NFT collection platform to perform any of the functions and features described herein. In particular, the client device 825 can perform the functions of both the client device and the NFT collection platform 800 without requiring communications to be sent to the client device 825 from a NFT collection platform and communications sent to a NFT collection platform from the client device 825.

In addition, NFT generation tools 808 can be used to protect, encrypt and/or authenticate any digital information that could be stored in the wallet app 250, including for example rewards cards, coupons, movie tickets, event tickets, boarding passes, public transit cards, student ID cards, credit cards, debit cards, prepaid cards, and loyalty cards. In addition, the functionality of the wallet app 250 can be further expanded to protect other information such as vehicle titles, warranty cards, driver's licenses and other IDs, vaccination records, prescriptions, and/or other medical records, social security cards, financial records, authentication tokens, insurance cards, passwords, user IDs and/or other images and information of a personal and/or sensitive nature. Any of these types of digital information can be protected via an NFT or other blockchain transaction in conjunction, with or without associated image or display data, and with or without metadata and/or "other data" as that term has been used herein in association with the NFT generation tools 808.

FIG. 29B presents a flowchart representation of an example method. In particular, a method 2900 is presented for use in conjunction with any of the functions and features previously described. Step 2902 includes sending to a NFT distribution platform and via a network interface, geolocation data associated with the client device. Step 2904 includes generating a prompt associated with an NFT, the NFT including restriction data associated with one or more geographical restrictions, wherein the prompt is triggered when the geolocation data associated with the client device conforms with the restriction data. Step 2906 includes sending the NFT distribution platform and via the network interface a read request for the NFT. Step 2908 includes receiving the NFT from the NFT distribution platform in response to the read request.

Figure 30A:
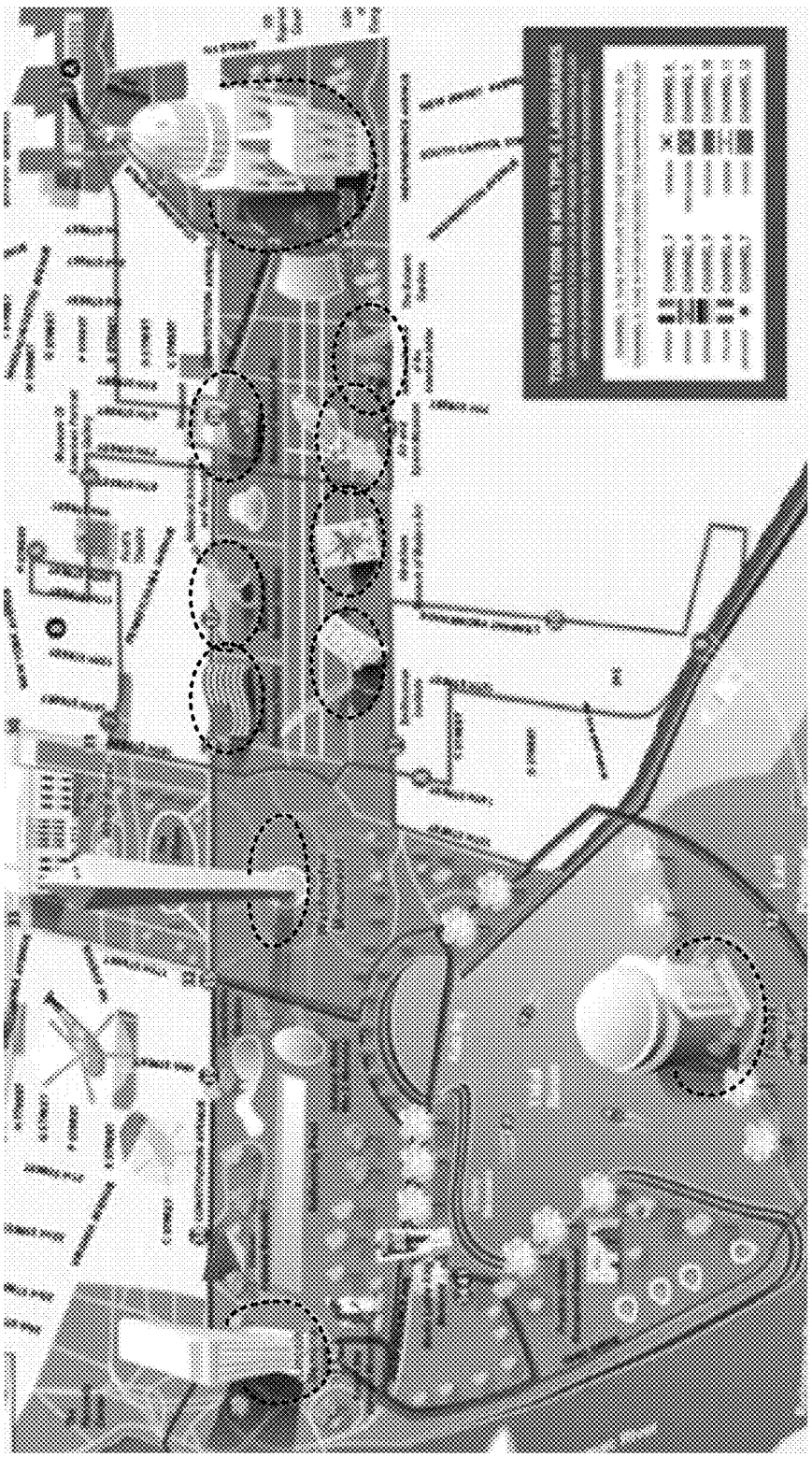
FIG. 30A presents a pictorial representation of an example screen display.

FIG. 30A presents a pictorial representation of an example screen display. In the example shown, a screen display of a client device 825-1 is shown corresponding to a game app 252, or other game or procedure that operates in conjunction with NFT distribution platform 2800. The object of the game is to visit each of the locations shown on the map of the national mall in Washington, D.C. When geolocation data from the client device 825-1 indicates the user has visited each of these locations with the client device 825-1, the NFT distribution platform 2800 unlocks access to a special (e.g., a commemorative derivative) NFT by the client device 825-1 that can be, for example, downloaded to the wallet app 250.

Figure 30D:
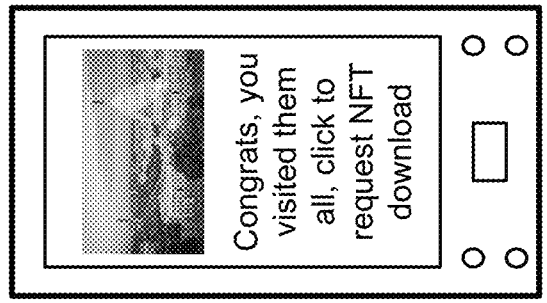
FIGS. 30B-30D present pictorial representations of example client devices with screen displays.
Figure 30C:
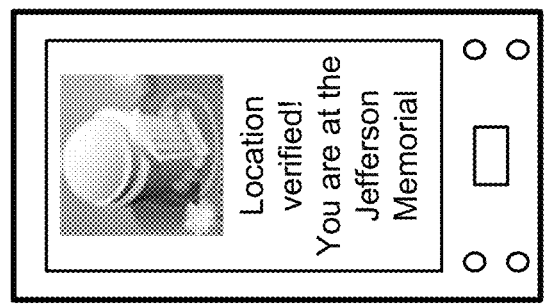
Figure 30B:
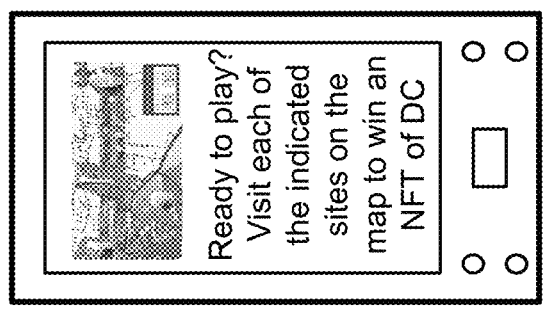

FIGS. 30B-30D present pictorial representations of example client devices with screen displays. In FIG. 30B, the game begins and the user is prompted to visit each of the indicated sites. In FIG. 30C, the geolocation data from the client device has indicated with the user is within a predetermined geofence around the Jefferson Memorial. In FIG. 30D, the screen display indicates that the visitor has completed the challenge and is prompted to request download of the NFT.

FIG. 30E presents a flowchart representation of an example method. In particular, a method 3000 is presented for use in conjunction with any of the functions and features previously described. Step 3002 includes sending to a NFT distribution platform and via a network interface, geolocation data associated with the client device, wherein the client device is relocated to a plurality of distinct positions and the geolocation data indicates the plurality of distinct positions. Step 3004 includes generating a prompt associated with an NFT, the NFT including restriction data including geographical restrictions that includes a plurality of regions, wherein the prompt is triggered when the geolocation data associated with the client device conforms with the restriction data. Step 3006 includes sending the NFT distribution platform and via the network interface a read request for the NFT. Step 3008 includes receiving the NFT from the NFT distribution platform in response to the read request.

Figure 31A:
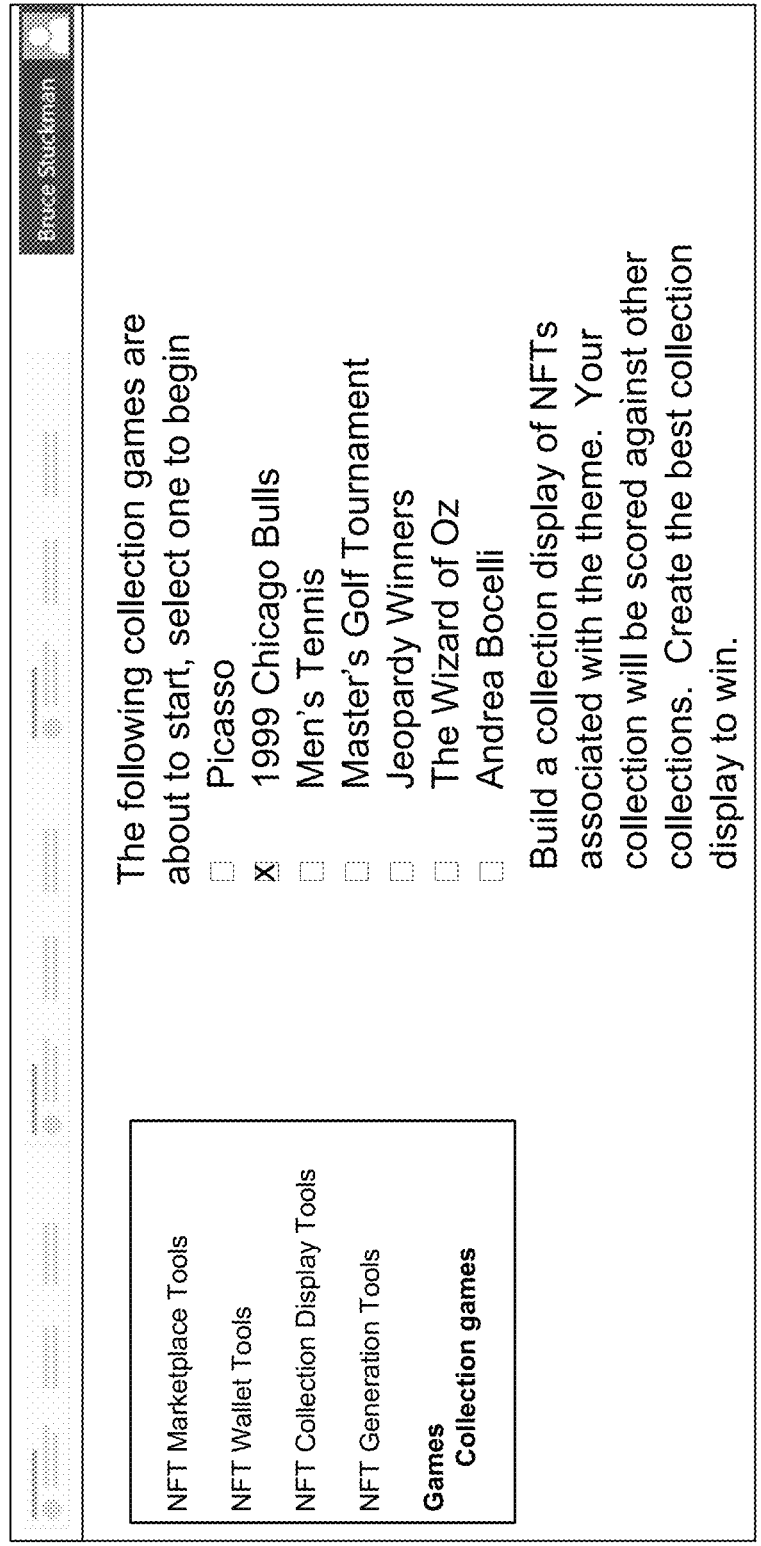
FIGS. 31A-31C present pictorial representations of example screen displays.
Figure 31B:
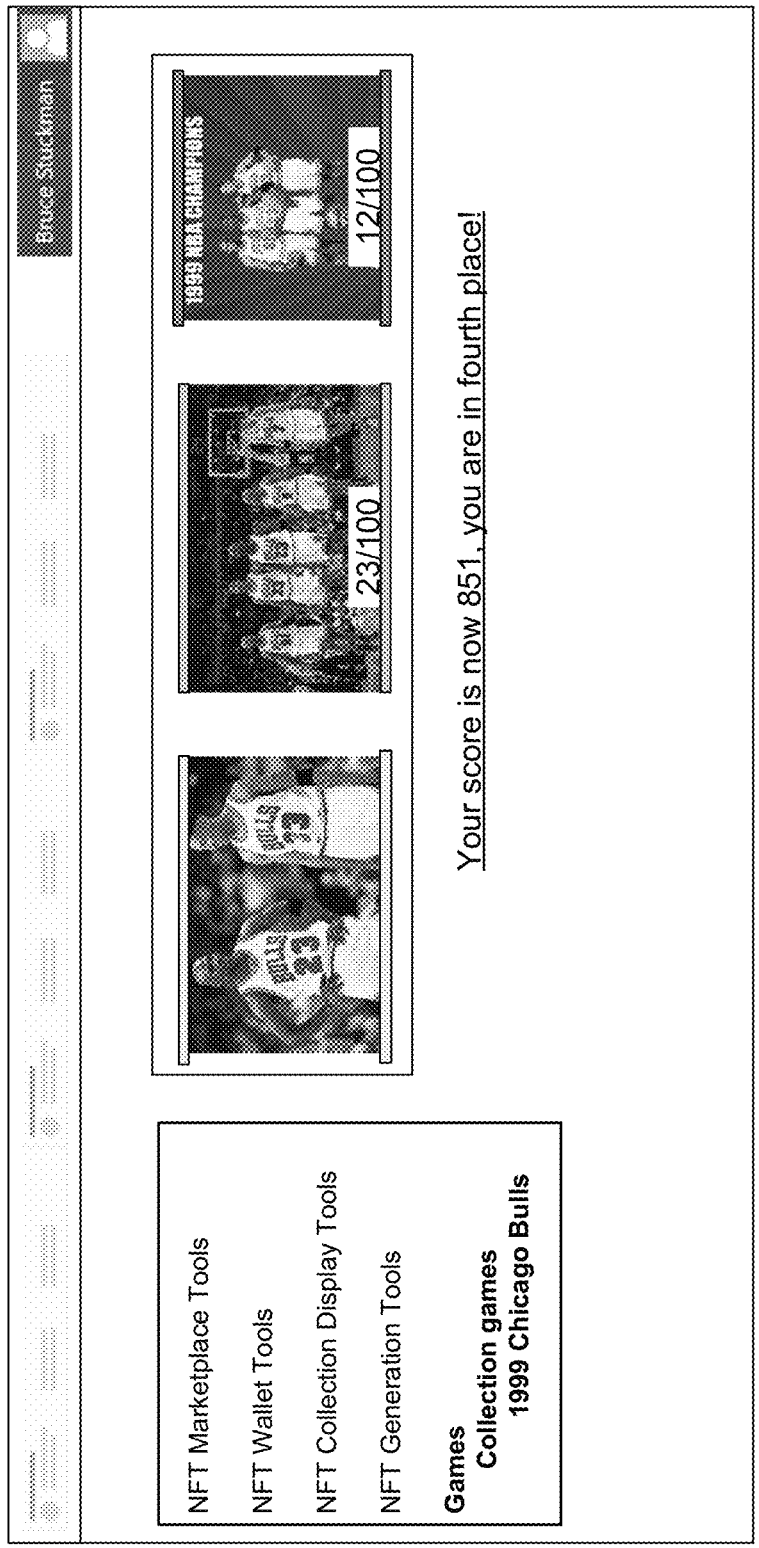
Figure 31C:
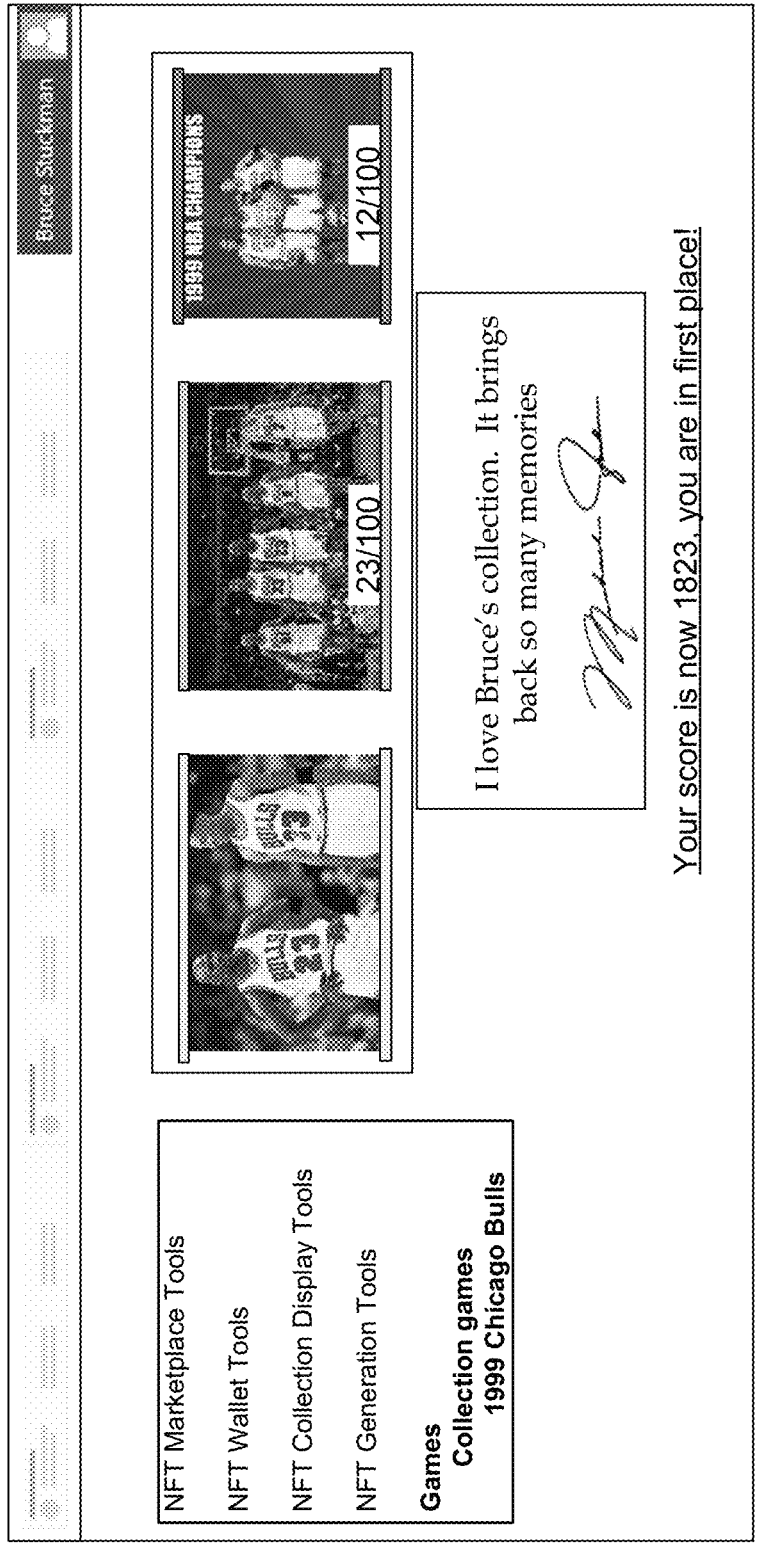

FIGS. 31A-31C present pictorial representations of example screen displays. In particular, screen displays are shown in conjunction with user interaction with the NFT collection platform 800. As previously discussed, NFT collection platform 800 supports game play by users of client devices 825 (including 825-1) of one or more games 813. These games 813 can include games around a gamified collection experience across the meta-verse that allow users to compete with and share their collection experiences with others.

In FIG. 31A, the user has selected "collection games" and is offered a series of collection games associated with particular themes or categories. In the example shown, the user has elected to enter a collection competition for NFTs pertaining to the 1999 Chicago bulls. The user is prompted to build a collection display of NFTs associated with the chosen theme—however, a user with existing collection display can also participate. A predetermined time period, such as (e.g., one day, one week, etc.) may apply to the game. The user's customized collection display data are submitted to the NFT collection platform 800 (or a corresponding collection NFT can be temporarily micro-loaned) wherein the collection can be scored against other collections. The user that has created the best collection display involving the theme can win a prize, such as a special NFT, an amount of cryptocurrency, etc.

In various examples, the user's collections are scored via a plurality of scoring criteria that could include, for example:
  Breadth, size and/or scope of the collection (or Collection NFT) and relationship to the theme or category, (if there is a theme or category)
  The quality and originality of the arrangement and overall content of the NFTs in the display
  Originality scoring of the individual NFTs in the display that assigns different weights/scores based on:
    Originality classifications that assign different scores for:
      a) Original NFTs
      b) Derivative NFTs and further the series number in derivative NFTs (#12 of 100, is better than #9 of 200, that is better than #37 of 100 and better than #123 of an unlimited series, etc.
      c) Borrowed NFTs
      d) Collection NFTs
      e) Nested derivatives or loans of borrowed NFTs, derivative NFT and collection NFTs, etc.
    NFT-theme rarity (e.g., how many cyber punks exist, how many Michael Jordon cards exist, etc.)
    Endorsed NFTs
    Signed NFTs
    Bonus for the number of times other users have included your collection NFT in their own collections
    Etc.
Collections can be ranked via the scoring model and ranked results can be shown to collectors, providing an incentive to improve their collection.

In FIG. 31B, the user has submitted their customized collection display for scoring and is determined to be currently in fourth place. In FIG. 31C, the user has upgraded their customized collection display by obtaining a specific endorsement from Michael Jordon.

FIG. 31D presents a flowchart representation of an example method. In particular, a method 3100 is presented for use in conjunction with any of the functions and features previously described. Step 3102 includes importing, via a network interface, customized collection display data associated with a collection of NFTs of the user of the client device. Step 3104 includes generating, via the processor and based on the customized collection display data, a score associated with a collection game, and wherein the score is generated in accordance with a plurality of scoring criteria associated with the collection game. Step 3106 includes sending, via the network interface, the score to the client device for display via the graphical user interface.

Figure 32A:
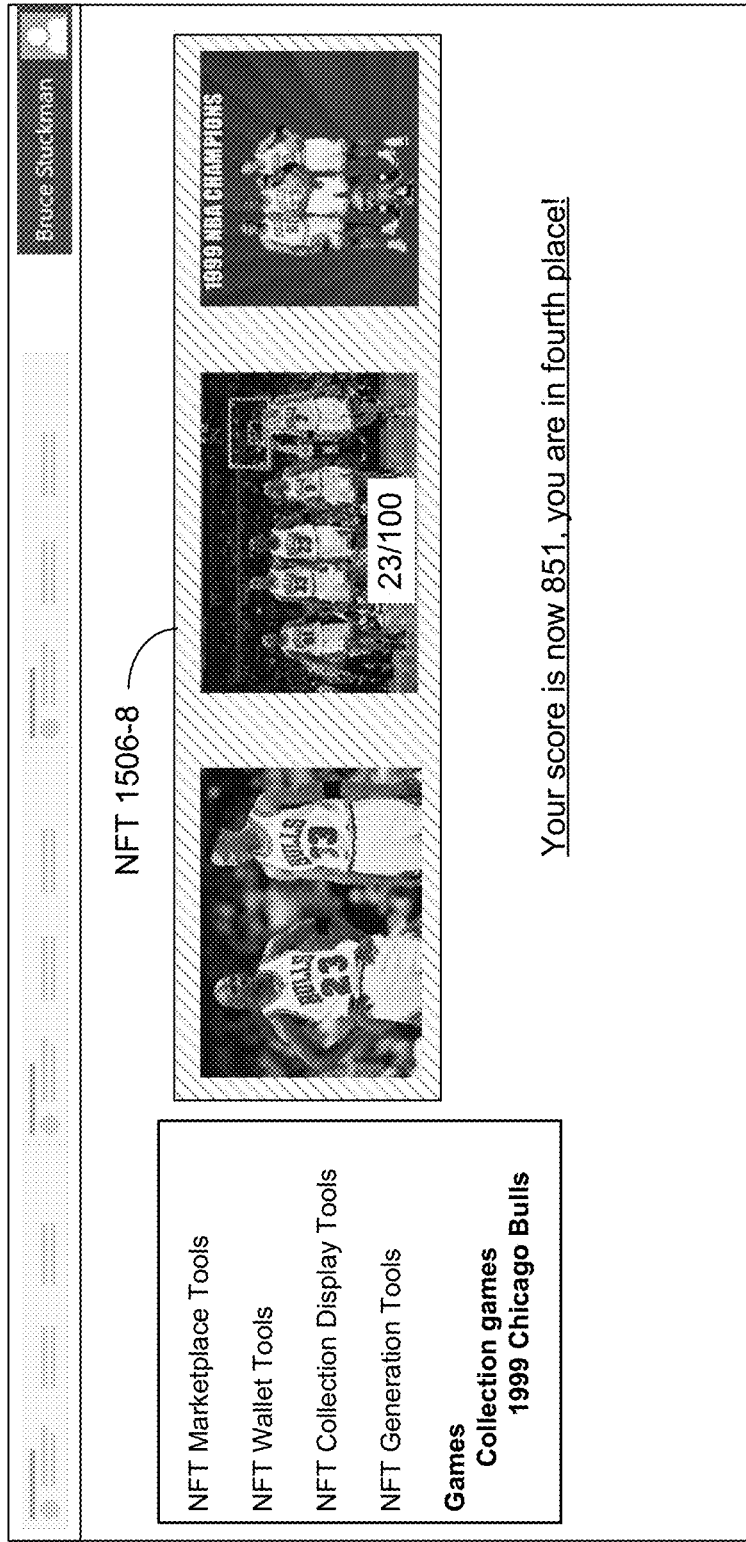
FIG. 32A presents a pictorial representation of an example screen display.

FIG. 32A presents a pictorial representation of an example screen display. As discussed above, instead of the user's customized collection display data being submitted to the NFT collection platform 800 for scoring, a corresponding collection NFT can be temporarily micro-loaned or otherwise submitted for evaluation and can be scored against other collections. In the example shown, the collection NFT 1506-8 has been submitted to the tourney/challenge collection game involving the 1999 Chicago Bulls.

FIG. 32B presents a flowchart representation of an example method. In particular, a method 3200 is presented for use in conjunction with any of the functions and features previously described. Step 3202 includes generating, via the processor and based on a customized collection display of a collection NFT associated with a collection of NFTs of the user of the client device, a score associated with a collection game, wherein the score is generated in accordance with a plurality of scoring criteria associated with the collection game. Step 3204 includes sending, via the network interface, the score to the client device for display via the graphical user interface.

FIGS. 33A-33D present pictorial representations of example screen displays. While the prior examples have focused on collection games where collections are evaluated based on their content, the games 813 can also include collection games around fantasy leagues, such as fantasy sports.

Figure 33A:
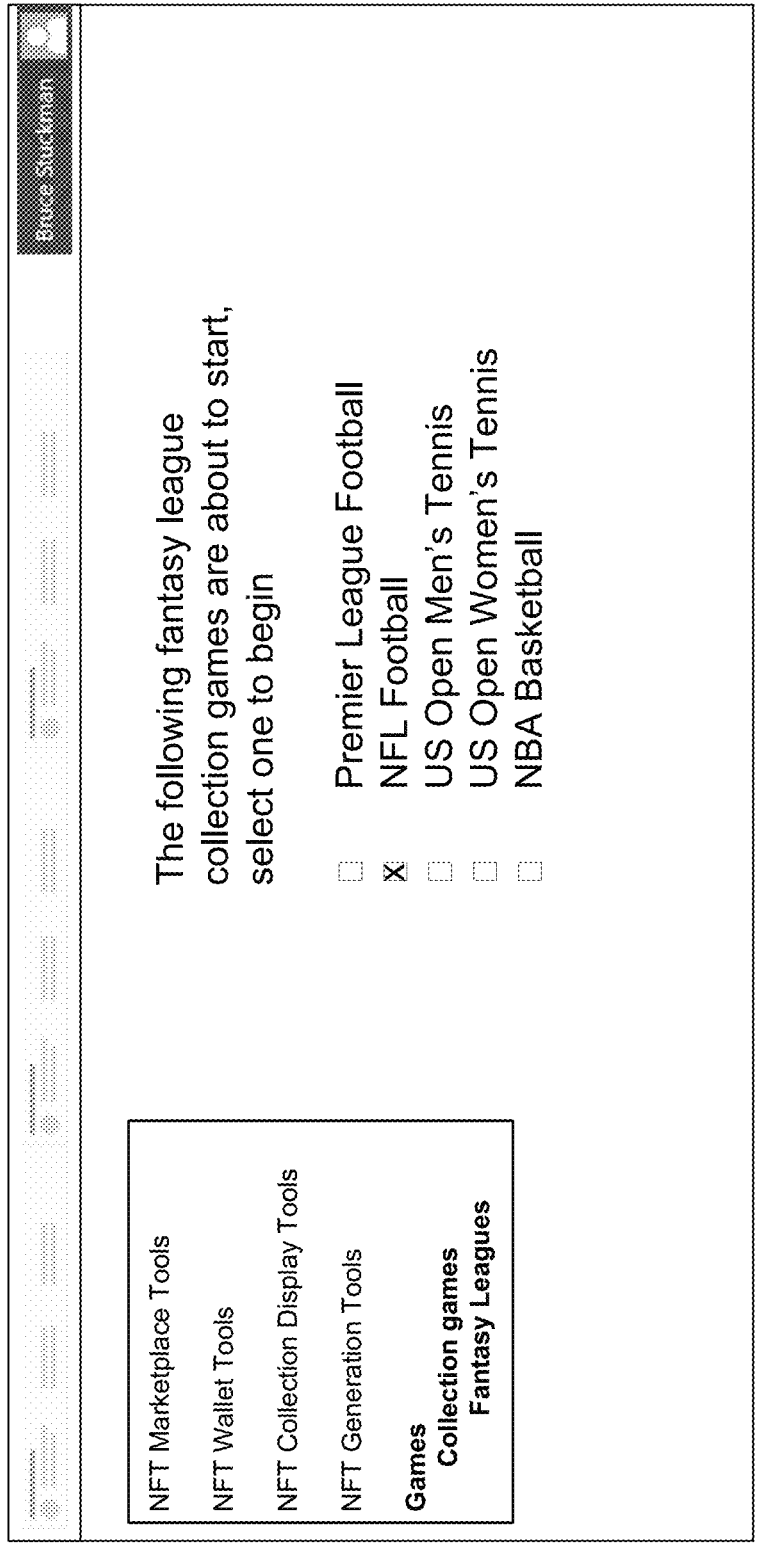
FIGS. 33A-33D present pictorial representations of example screen displays.
Figure 33B:
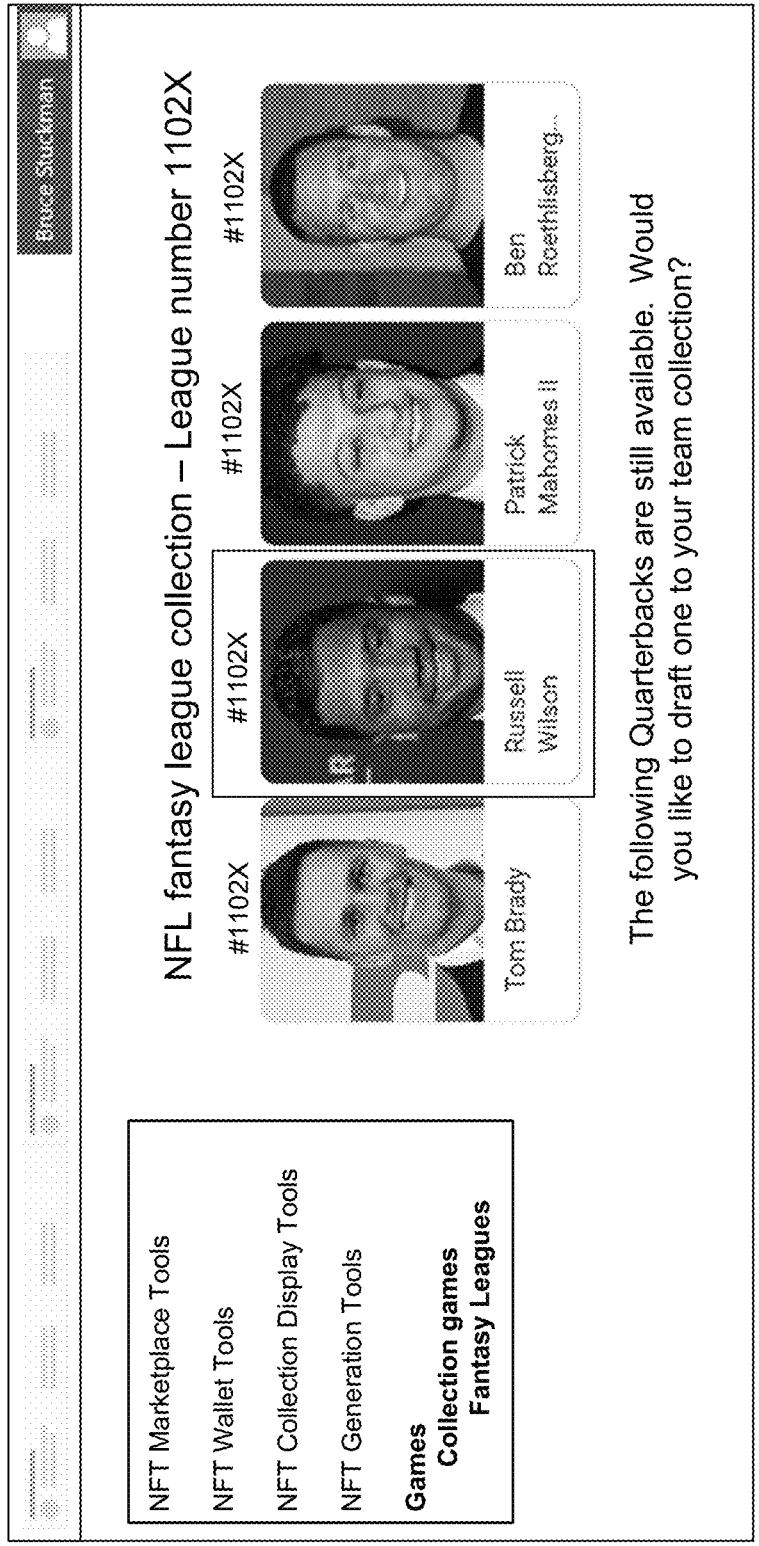

In FIG. 33A, the user of client device 825 or 825-1 has chosen to take part in a fantasy NFL football league. In FIG. 33B, the user has been assigned, formed or chosen to participate in a particular league (designated #1102X) for an upcoming NFL season. In various examples, the NFT collection platform 800 has generated a set of NFTs for each league. In this fashion, league 1102X has a set of derivative NFTs corresponding to the NFL players available for drafting/collection by the participants in the league. Each participant builds his/her team by drafting or otherwise purchasing, acquiring or collecting the NFTs associated with their own players from the NFL players that are currently available as part of a draft, an auction—or other more or less structured collection process.

In the example shown, the participant/user is choosing a quarterback Russell Wilson from the currently available quarterbacks in league 1102X. Once the selection is made, the participant receives the league 1102X derivative NFT of Russell Wilson, and furthermore Russell Wilson is added to their team. Thereafter, Russell Wilson can be loaned, sold or traded with/to other participants in League 1102X by loaning, selling and/or trading the associated NFT. In various examples, the NFTs for league 1102X have restrictions that only allow them to be loaned, sold or traded with/to other participants in League 1102X during the time period of the season, but these restrictions can expire when the season is over. Other sets of restrictions are likewise possible allowing a limited number of interleague transactions, but with discounted scoring for example for players that came for a different league.

Like other fantasy sports leagues, participants are scored based on the members on their team during each week of the season, and for example, whether they are active or benched. The active members of each team correspond to the player NFTs held by the participant that week. If the user plans to bench a player for a period of time, the user may choose to enter into a transaction to micro-loan the NFT of that player to another league participant for this period of time.

Figure 33C:
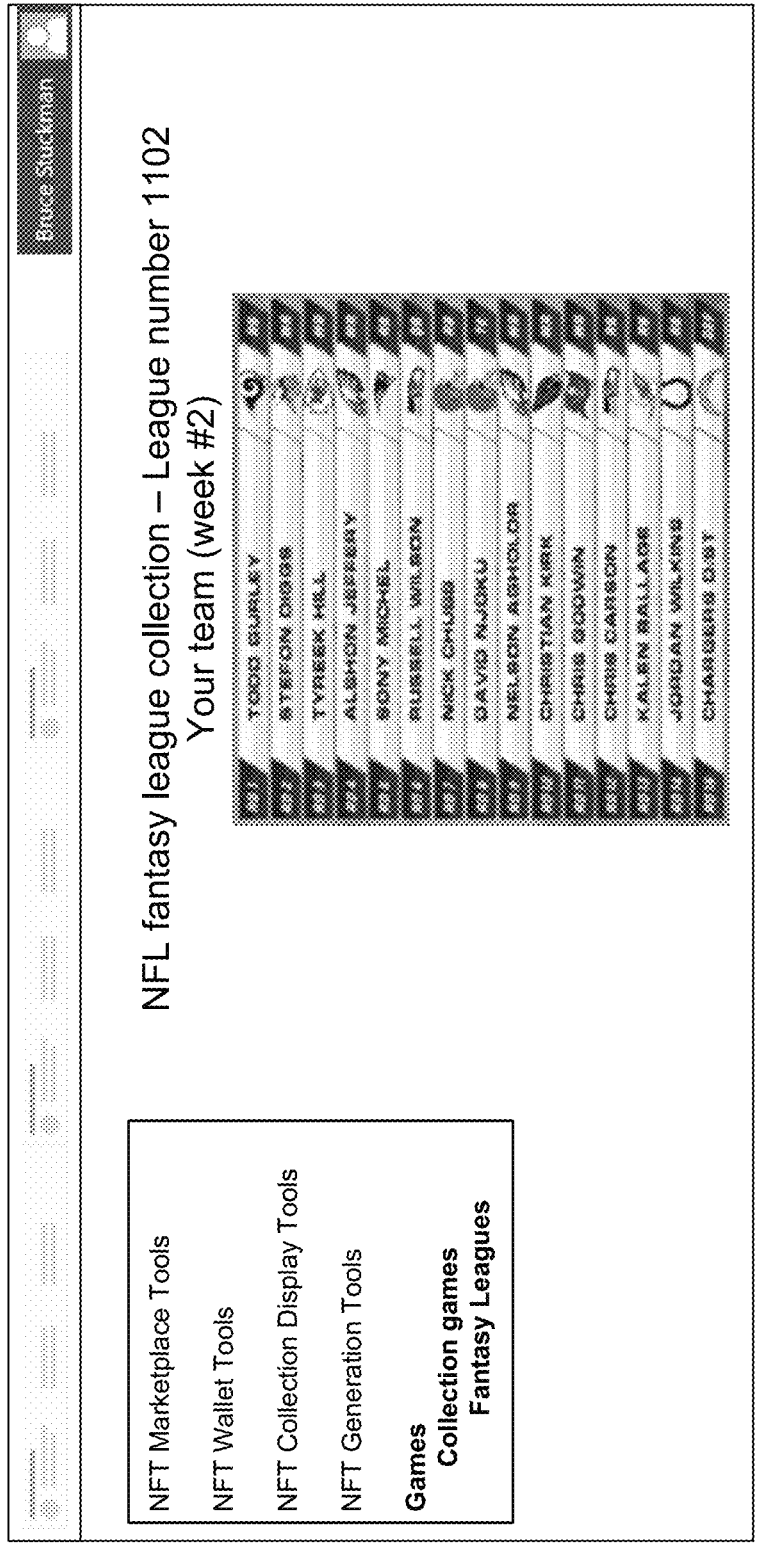
Figure 33D:
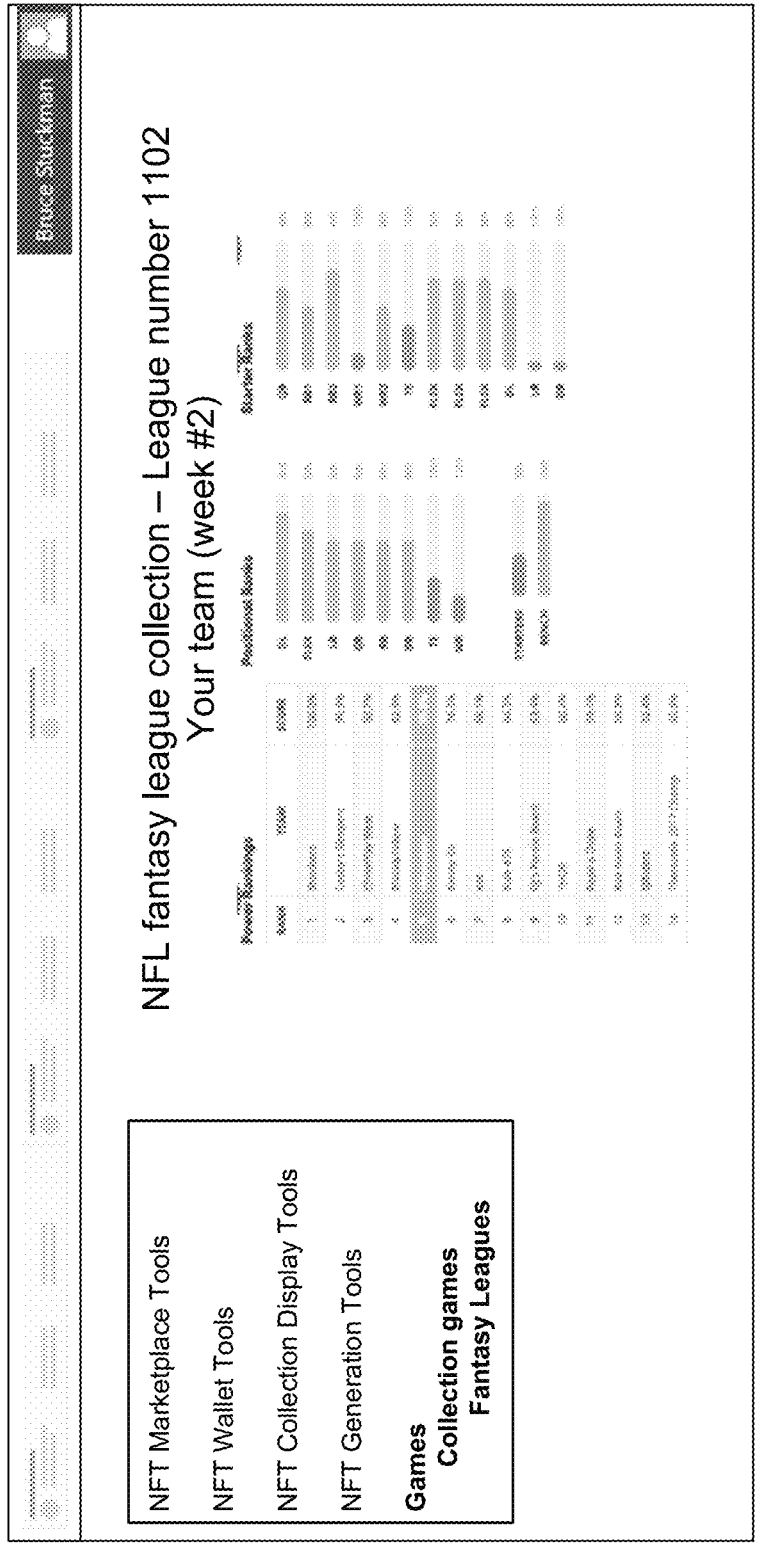

Scores can also be subject to any of the additional scoring mechanism discussed previously in conjunction with other collection games, with additional fantasy league scores be attributed to players whose NFTs have been player signed or endorsed, for example. In FIG. 33C, the user (league participant) is viewing the current members of his team (the players for which he currently holds the associated NFTs) after week #2 of the season. In FIG. 33D, the user's team has been scored against other participants and is currently in $5^{th}$ place.

While the examples above has focused on a fantasy football league, the techniques described herein could likewise be employed in other sports fantasy leagues, in other sporting based contests or tournaments, in reality/contest based television programs, such as Survivor, American Idol, The Voice, Jeopardy, The Bachelor, or other television based contests, in the Olympics, sports playoffs, and in other tournaments, contests and/or other events, sporting or non-sporting.

FIG. 33E presents a flowchart representation of an example method. In particular, a method 3300 is presented for use in conjunction with any of the functions and features previously described. Step 3302 includes facilitating, via the processor and in response to user interactions with the graphical user interface, collection of NFTs corresponding to a team of players associated with the user in a fantasy league. Step 3304 includes generating, via the processor, a score associated with the team of players associated with the user in the fantasy league. Step 3306 includes sending, via the network interface, the score to the client device for display via the graphical user interface. Step 3308 includes facilitating transactions regarding the collection of NFTs between the user and other users in the fantasy league.

Figure 34A:
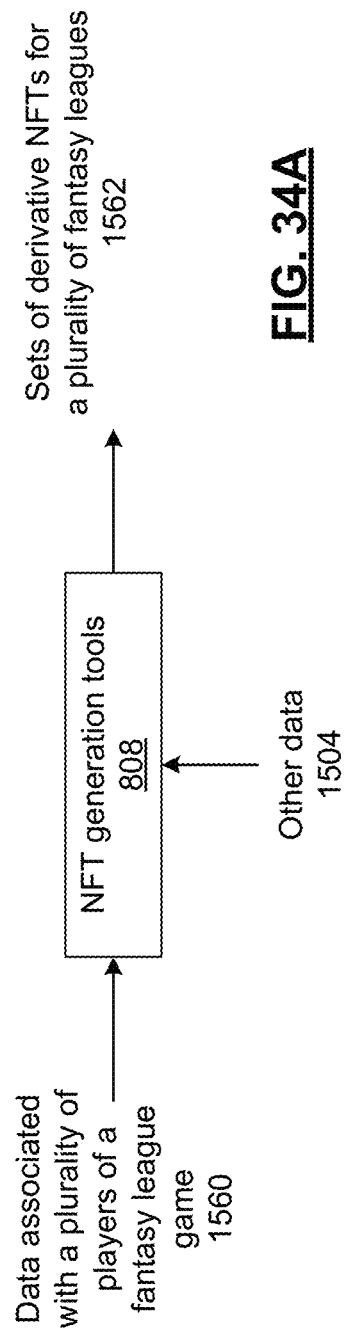
FIG. 34A presents a block diagram/flow representation of an example of NFT generation.

FIG. 34A presents a block diagram/flow representation of an example of NFT generation. In particular, a process is shown where data associated with a plurality of players of a fantasy league game 1560, such as original NFTs or other display data, is used in conjunction with other data 1504 to generate sets of derivative NFTs for a plurality of different fantasy leagues. The other data 1504 can include restrictions on interleague transfers, time restrictions, league numbers and visualization parameters regarding the league numbers in the derivative NFTs, etc.

Figure 34B:
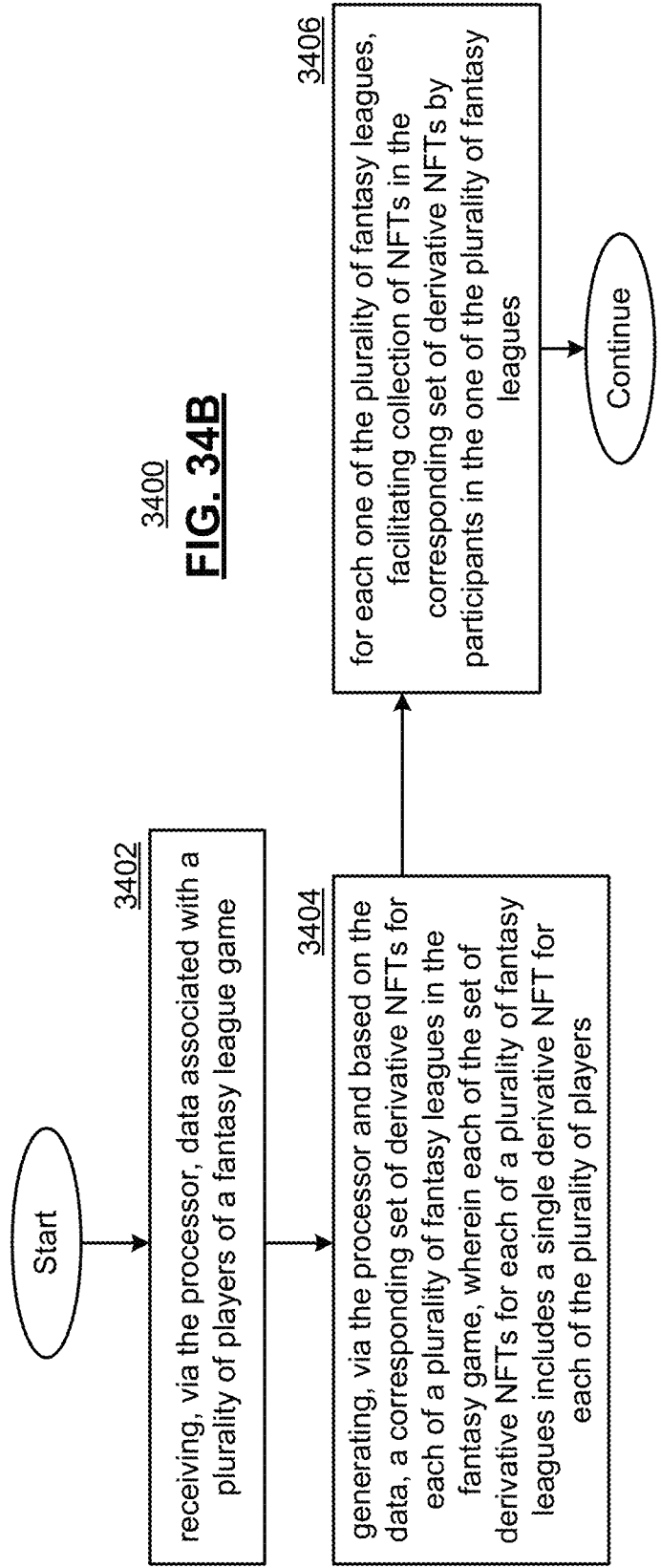
FIG. 34B presents a flowchart representation of an example method.

FIG. 34B presents a flowchart representation of an example method. In particular, a method 3400 is presented for use in conjunction with any of the functions and features previously described. Step 3402 includes receiving, via the processor, data associated with a plurality of players of a fantasy league game. Step 3404 includes generating, via the processor and based on the data, a corresponding set of derivative NFTs for each of a plurality of fantasy leagues in the fantasy game, wherein each of the set of derivative NFTs for each of a plurality of fantasy leagues includes a single derivative NFT for each of the plurality of players. Step 3406 includes, for each one of the plurality of fantasy leagues, facilitating collection of NFTs in the corresponding set of derivative NFTs by participants in the one of the plurality of fantasy leagues. As previously discussed, this collection process can be via draft, auction or other process, either more or less structured.

Figure 35A:
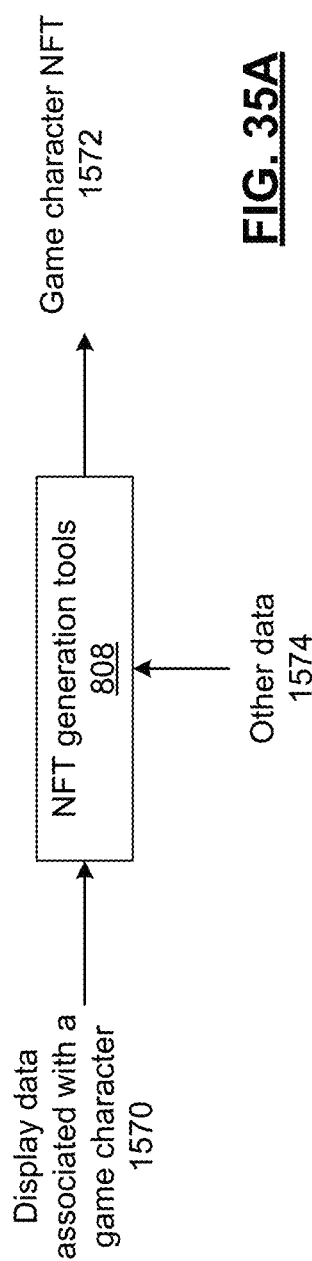
FIG. 35A presents a block diagram/flow representation of an example of NFT generation.

FIG. 35A presents a block diagram/flow representation of an example of NFT generation. In particular, the NFT collection platform 800 may be used to not only facilitate the generation, collection and display of NFT and the playing of collection and other NFT related game, the NFT collection platform 800 can also be used to generate game characters and game character NFTs that are used in the play of any of the games 813 and/or other games.

In the example shown, display data to be associated with a game character 1570, together with other data 1574, is used to generate a game character NFT 1572. In various examples, the other data 1574 can include performance data to be associated with the game character as well as other character parameters and/or attributes that are used in the game to dictate the performance of the game character. Furthermore, other data 1574 can include any of the other data 1504 discussed herein.

Figure 35E:
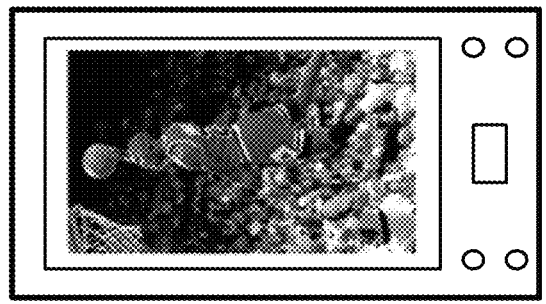
FIG. 35E presents a pictorial representation of an example client device with screen display.
Figure 35D:
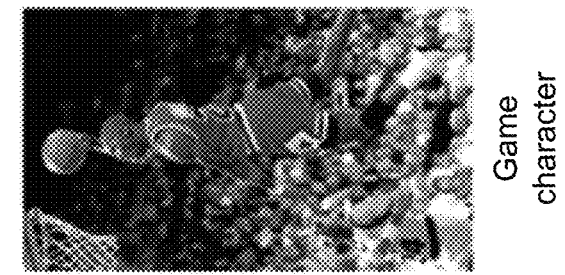
FIG. 35D presents a pictorial representation of an example game character NFT.
Figure 35C:
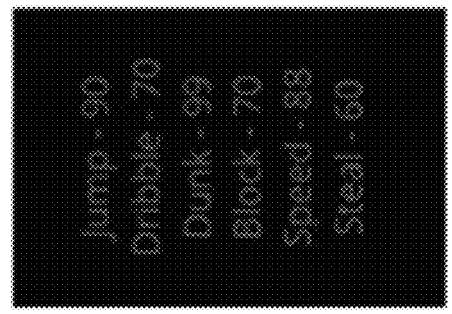
FIG. 35C presents a pictorial representation of example data.
Figure 35B:
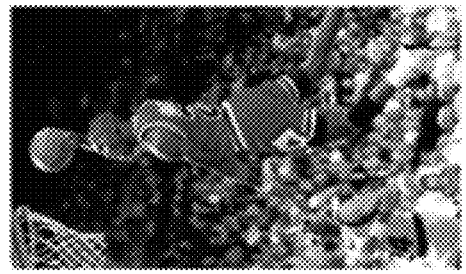
FIG. 35B presents a pictorial representation of example display data.

FIG. 35B presents a pictorial representation of example display data. In particular, display data to be associated with a game character 1570 corresponds to an image of Michael Jordon. FIG. 35C presents a pictorial representation of example of other data 1574 that corresponds to performance data including various parameters to be associated with the character in the game. FIG. 35D presents a pictorial representation of an example game character NFT 1572 generated in such a fashion and FIG. 35E presents a pictorial representation of an example client device with screen display of the game character used in a game.

FIG. 35F presents a flowchart representation of an example method. In particular, a method 3500 is presented for use in conjunction with any of the functions and features previously described. Step 3502 includes receiving, via the processor, display data to be associated with a game character and other data to be associated with performance of the game character. Step 3504 includes generating, via the processor and based on the display data and the other data, a game character NFT associated with the game character that includes the display data to be associated with the game character and that further includes the other data to be associated with performance of the game character. Step 3506 includes facilitating play of a game by the user in response to user interactions with the graphical user interface, wherein the game includes the game character and the performance of the game character in the game is in accordance with the other data.

FIG. 36A presents a block diagram/flow representation of an example of NFT generation. In the example shown, display data from an image NFT 1580 to be associated with a game character, together with other data from a data NFT 1584, is used to generate a game character NFT 1582. In various examples, the other data from the data NFT 1584 can include performance data to be associated with the game character as well as other character parameters and/or attributes that are used in the game to dictate the performance of the game character. Furthermore, other data from the data NFT 1584 can include any of the other data 1504 discussed herein.

FIG. 36B presents a pictorial representation of an example image NFT. In particular, display data from an image NFT 1580 to be associated with a game character corresponds to an image of Michael Jordon. FIG. 36C presents a pictorial representation of example of other data from a data NFT 1584 that corresponds to performance data including various parameters to be associated with the character in the game. FIG. 36D presents a pictorial representation of an example game character NFT 1582 generated in such a fashion and FIG. 36E presents a pictorial representation of an example client device with screen display of the game character used in a game.

Figure 36F:
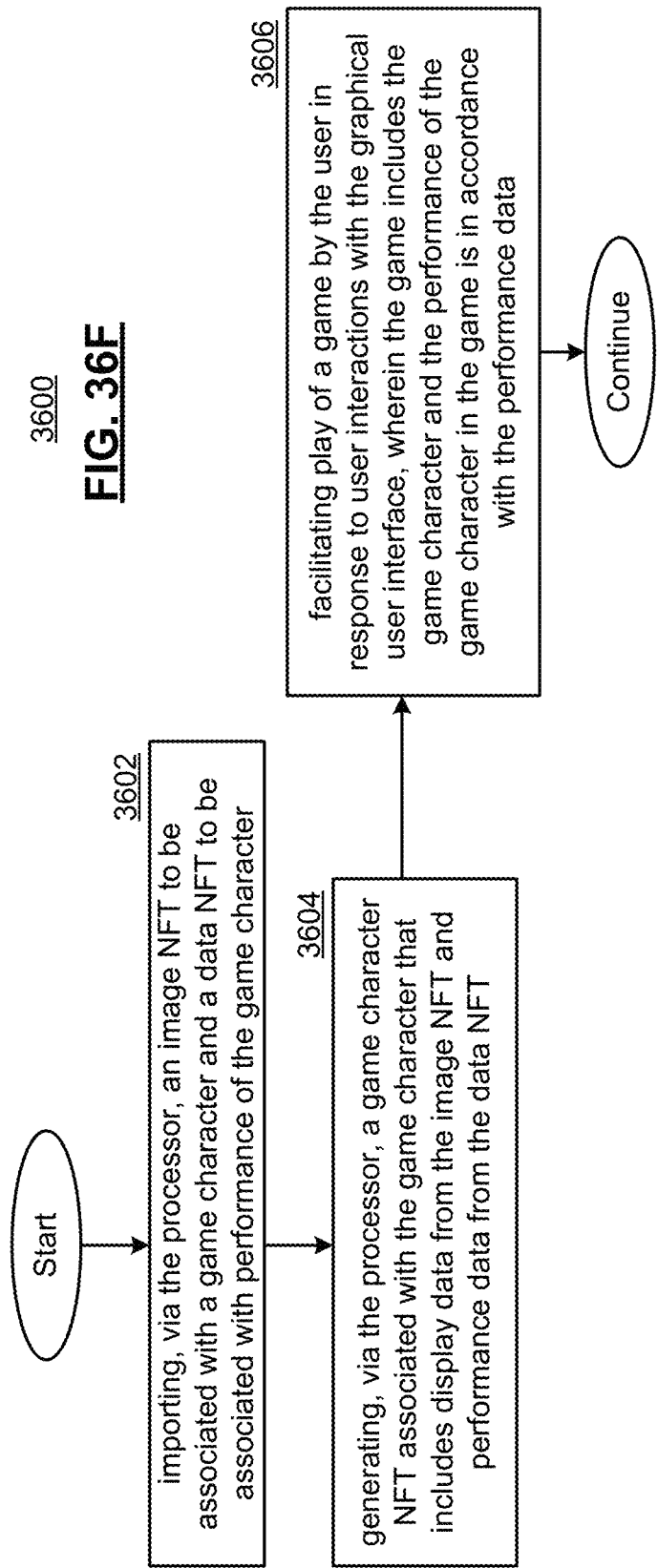
FIG. 36F presents a flowchart representation of an example method.

FIG. 36F presents a flowchart representation of an example method. In particular, a method 3600 is presented for use in conjunction with any of the functions and features previously described. Step 3602 includes importing, via the processor, an image NFT to be associated with a game character and a data NFT to be associated with performance of the game character. Step 3604 includes generating, via the processor, a game character NFT associated with the game character that includes display data from the image NFT and performance data from the data NFT. Step 3606 includes facilitating play of a game by the user in response to user interactions with the graphical user interface, wherein the game includes the game character and the performance of the game character in the game is in accordance with the performance data.

Figure 37A:
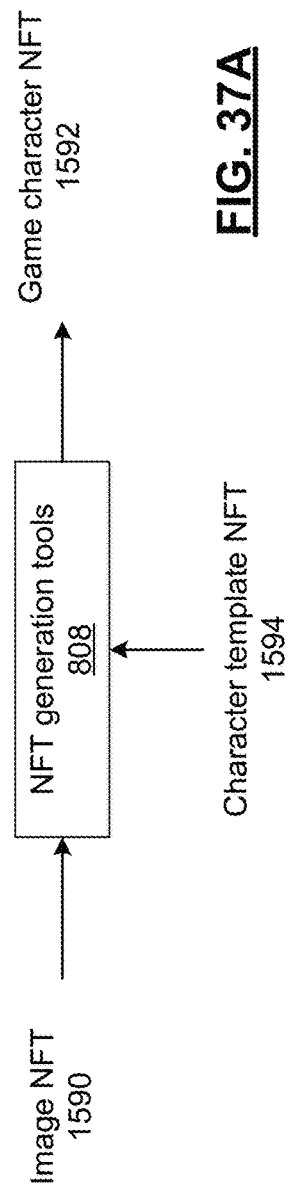
FIG. 37A presents a block diagram/flow representation of an example of NFT generation.

FIG. 37A presents a block diagram/flow representation of an example of NFT generation. In the example shown, display data from an image NFT 1590 to be associated with a game character, together with other data from a character template NFT 1594, is used to generate a game character NFT 1592. In various examples, the other data from the data NFT 1594 can include imagery, artistic effects and/or performance data to be morphed or otherwise combined with the display data of the image NFT 1590 into the creation of game character NFT 1592. Furthermore, other data from the character template NFT 1594 can include any of the other data 1504 discussed herein.

Figure 37D:
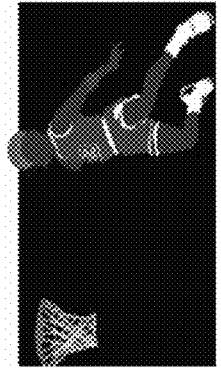
FIG. 37D presents a pictorial representation of an example game character NFT.
Figure 37C:
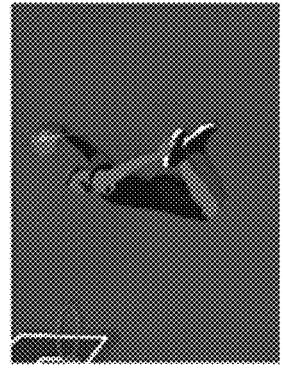
FIG. 37C presents a pictorial representation of an example template NFT.
Figure 37B:
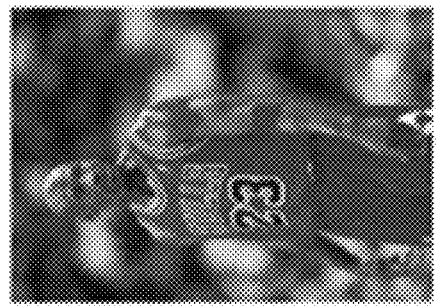
FIG. 37B presents a pictorial representation of an example image NFT.
Figure 37E:
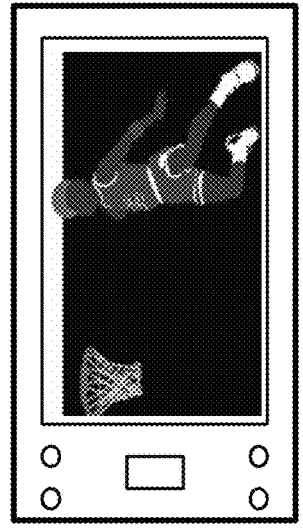
FIG. 37E presents a pictorial representation of an example client device with screen display.

FIG. 37B presents a pictorial representation of an example image NFT. In particular, display data from an image NFT 1590 to be associated with a game character corresponds to an image of Michael Jordon. FIG. 37C presents a pictorial representation of example of character template NFT 1594 with associated artistic effects used by characters in the game. FIG. 37D presents a pictorial representation of an example game character NFT 1592 generated in such a fashion and FIG. 37E presents a pictorial representation of an example client device with screen display of the game character used in a game.

Figure 37F:
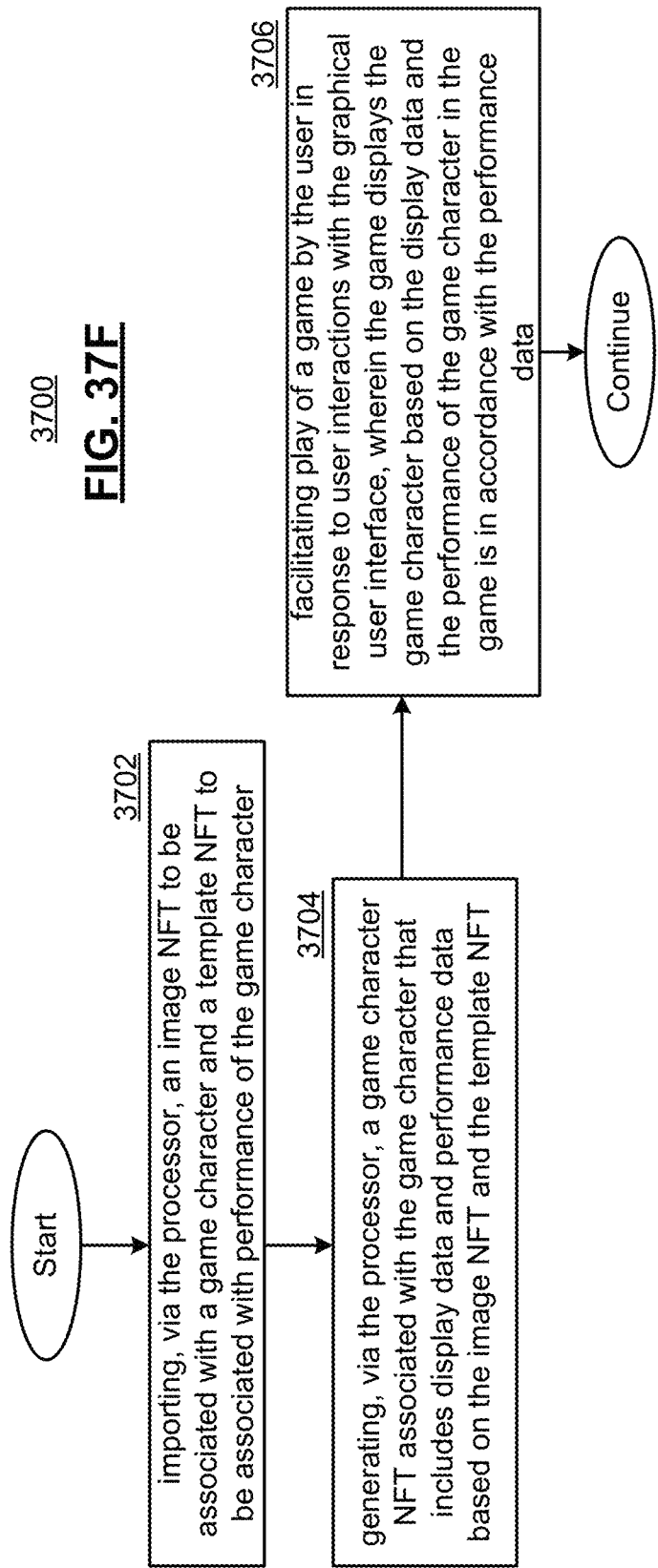
FIG. 37F presents a flowchart representation of an example method.

FIG. 37F presents a flowchart representation of an example method. In particular, a method 3700 is presented for use in conjunction with any of the functions and features previously described. Step 3702 includes importing, via the processor, an image NFT to be associated with a game character and a template NFT to be associated with performance of the game character. Step 3704 includes generating, via the processor, a game character NFT associated with the game character that includes display data and performance data based on the image NFT and the template NFT. Step 3706 includes facilitating play of a game by the user in response to user interactions with the graphical user interface, wherein the game displays the game character based on the display data and the performance of the game character in the game is in accordance with the performance data.

Figure 38A:
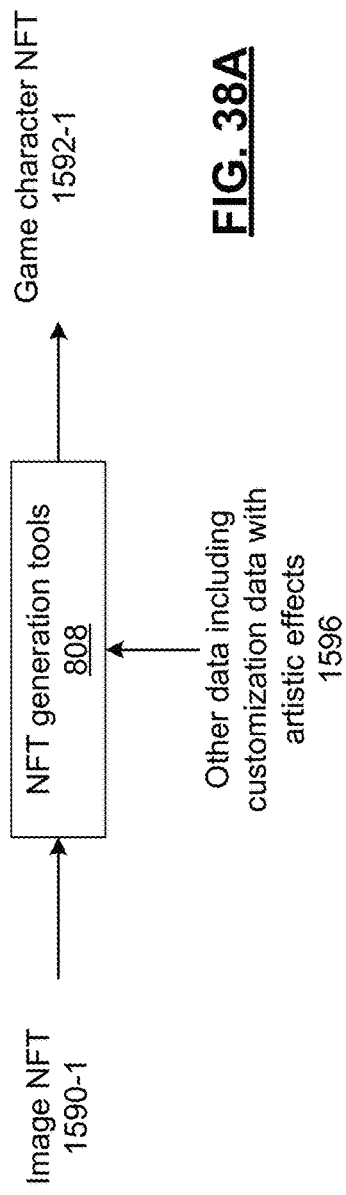
FIG. 38A presents a block diagram/flow representation of an example of NFT generation.

FIG. 38A presents a block diagram/flow representation of an example of NFT generation. In the example shown, display data from an image NFT 1590-1 to be associated with a game character, together with other data including customization data with artistic effects 1596, is used to generate a game character NFT 1592-1. In various examples, the other data including customization data with artistic effects 1596 can include imagery, artistic effects to be applied, morphed or otherwise combined with the display data of the image NFT 1590-1 into the creation of game character NFT 1592-1. Furthermore, other data including customization data with artistic effects 1596 can include any of the other data 1504 discussed herein.

Figure 38C:
FIG. 38C presents a pictorial representation of an example game character NFT.
Figure 38D:
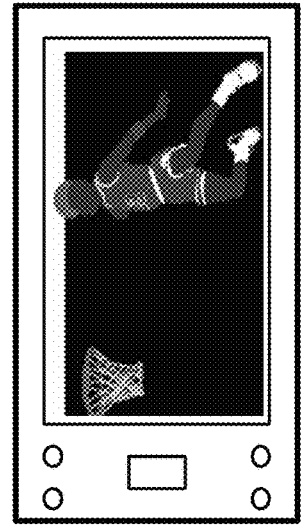
FIG. 38D presents a pictorial representation of an example client device with screen display.
Figure 38B:
FIG. 38B presents a pictorial representation of an example image NFT.

FIG. 38B presents a pictorial representation of an example image NFT. In particular, display data from an image NFT 1590-1 to be associated with a game character corresponds to an image of Michael Jordon. FIG. 38C presents a pictorial representation of an example game character NFT 1592-1 generated in such a fashion and FIG. 38D presents a pictorial representation of an example client device with screen display of the game character used in a game.

Figure 38E:
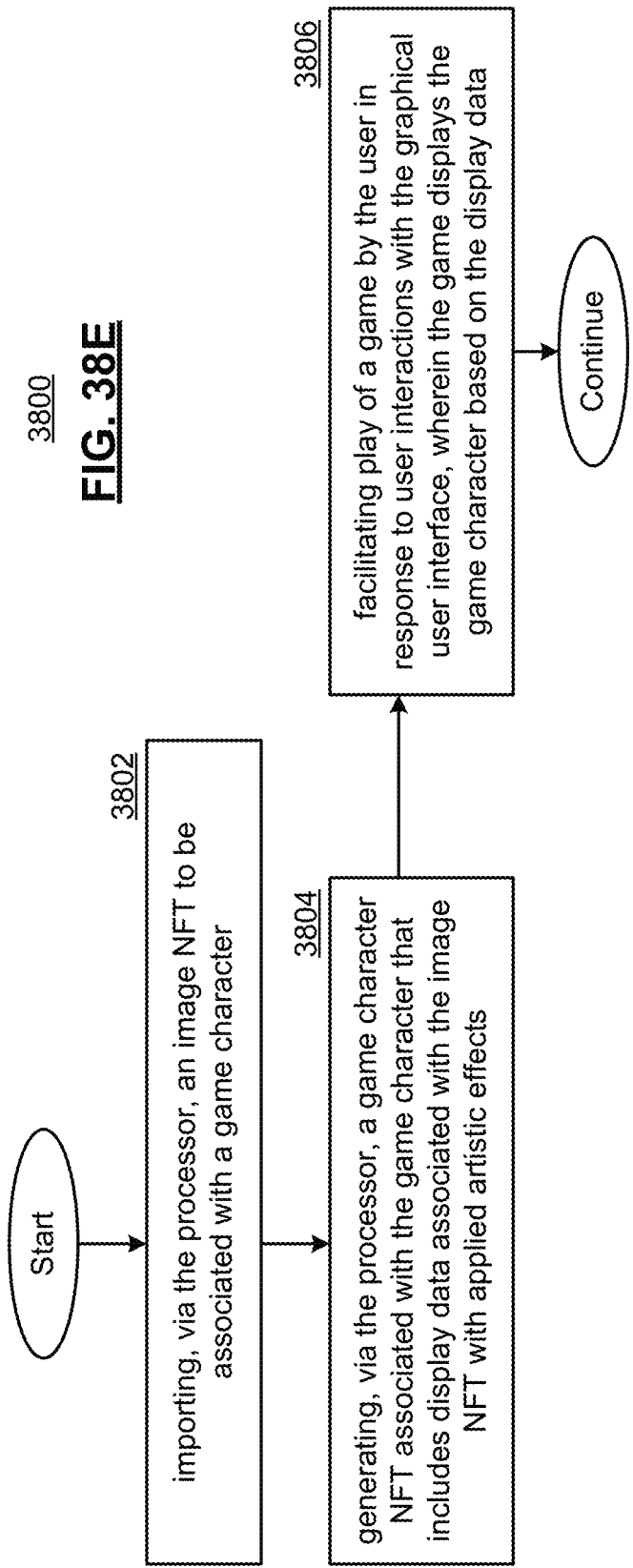
FIG. 38E presents a flowchart representation of an example method.

FIG. 38E presents a flowchart representation of an example method. In particular, a method 3800 is presented for use in conjunction with any of the functions and features previously described. Step 3802 includes importing, via the processor, an image NFT to be associated with a game character. Step 3804 includes generating, via the processor, a game character NFT associated with the game character that includes display data associated with the image NFT with applied artistic effects. Step 3806 includes facilitating play of a game by the user in response to user interactions with the graphical user interface, wherein the game displays the game character based on the display data.

Figure 39A:
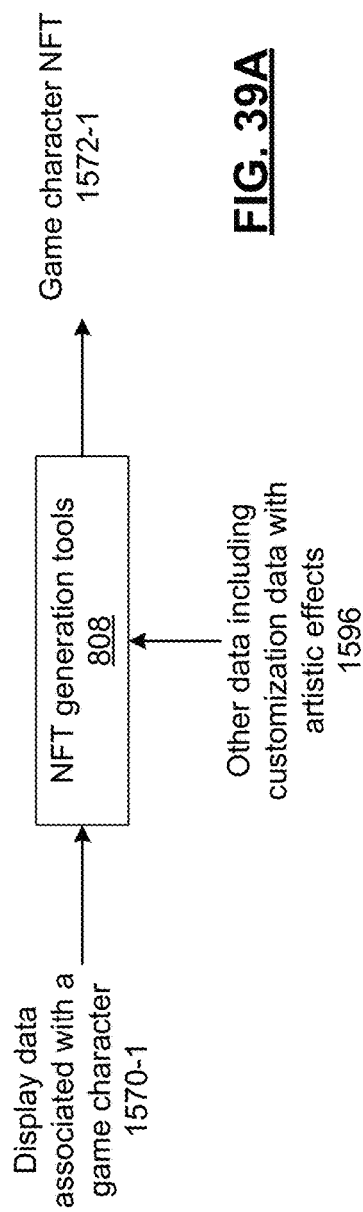
FIG. 39A presents a block diagram/flow representation of an example of NFT generation.

FIG. 39A presents a block diagram/flow representation of an example of NFT generation. In the example shown, display data 1570-1 to be associated with a game character, together with other data including customization data with artistic effects 1596, is used to generate a game character NFT 1572-1. In various examples, the other data including customization data with artistic effects 1596 can include imagery, artistic effects to be applied, morphed or otherwise combined with the display data 1570-1 into the creation of game character NFT 1572-1. Furthermore, other data including customization data with artistic effects 1596 can include any of the other data 1504 discussed herein.

Figure 39B:
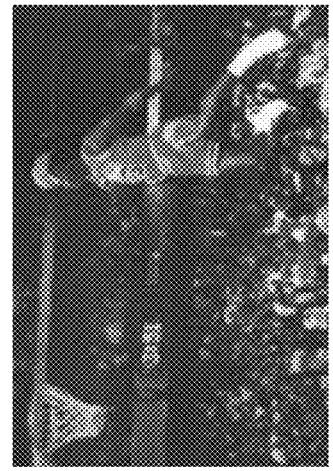
FIG. 39B presents a pictorial representation of example display data.
Figure 39C:
FIG. 39C presents a pictorial representation of an example game character NFT.
Figure 39D:
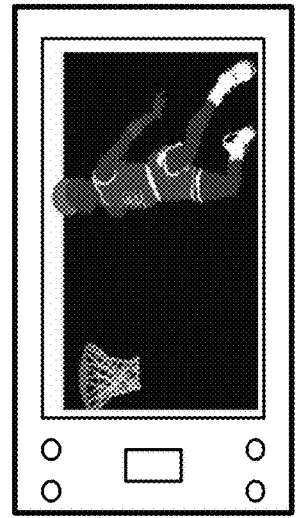
FIG. 39D presents a pictorial representation of an example client device with screen display.

FIG. 39B presents a pictorial representation of example display data. In particular, display data 1570-1 to be associated with a game character corresponds to an image of Michael Jordon. FIG. 39C presents a pictorial representation of an example game character NFT 1572-1 generated in such a fashion and FIG. 39D presents a pictorial representation of an example client device with screen display of the game character used in a game.

Figure 39E:
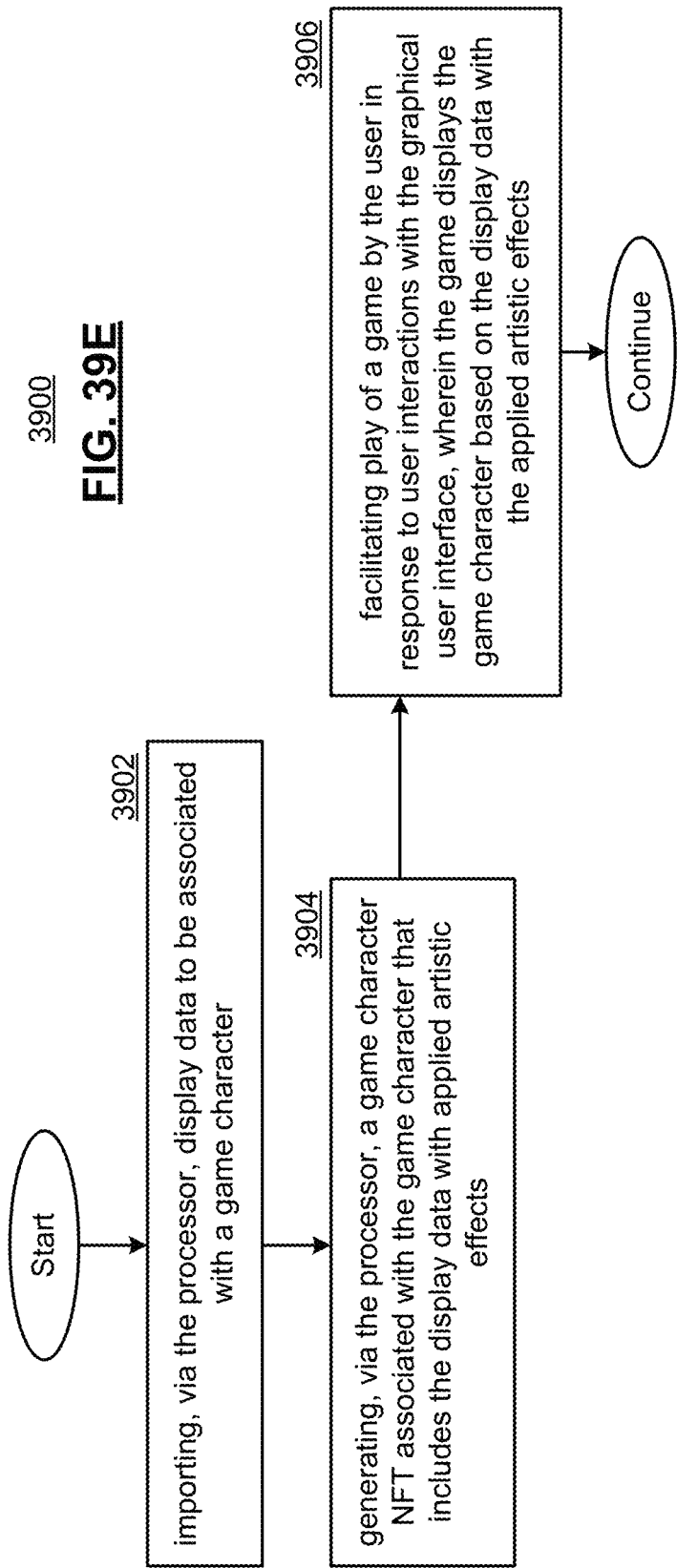
FIG. 39E presents a flowchart representation of an example method.

FIG. 39E presents a flowchart representation of an example method. In particular, a method 3900 is presented for use in conjunction with any of the functions and features previously described. Step 3902 includes importing, via the processor, display data to be associated with a game character. Step 3904 includes generating, via the processor, a game character NFT associated with the game character that includes the display data with applied artistic effects. Step 3906 includes facilitating play of a game by the user in response to user interactions with the graphical user interface, wherein the game displays the game character based on the display data with the applied artistic effects.

Figure 40A:
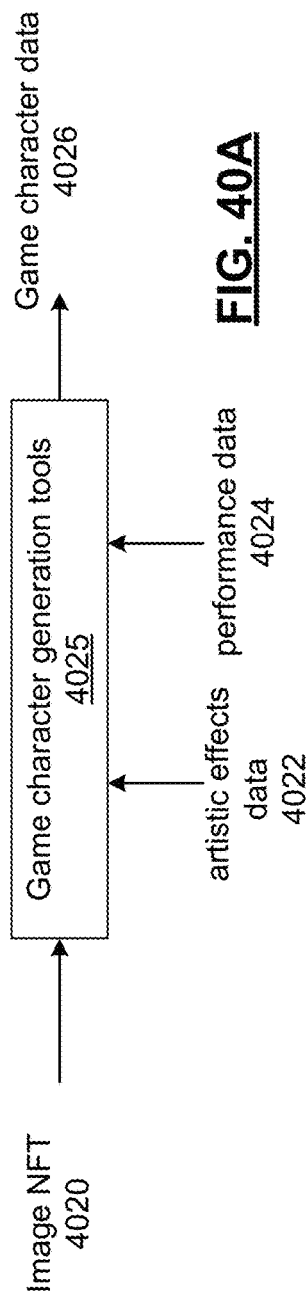
FIG. 40A presents a block diagram/flow representation of an example of game character data generation.

FIG. 40A presents a block diagram/flow representation of an example of game character data generation. It should be noted that the prior methods, processes and systems used for generating game character NFTs could likewise be similarly applied to generating game character display data. This game character display data could be directly used by a game without the additional step(s) required to generate a game character NFT itself.

In particular, game character generation tools 4025 are included that can be implemented as part of the games 813 of NFT collection platform 800 or otherwise by the processing module 830 of the NFT collection platform 800 or the processing module 230 of the client device 825 or 825-1. In the example shown, display data from an image NFT 4020 to be associated with a game character, together with other data including artistic effects data 4022 and performance data 4024, is used to generate game character data 4026.

Figure 40C:
FIG. 40C presents a pictorial representation of an example game character NFT.
Figure 40D:
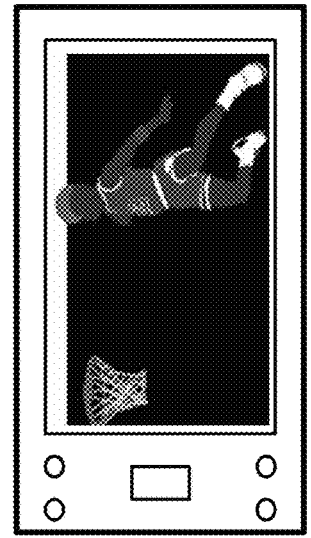
FIG. 40D presents a pictorial representation of an example client device with screen display.
Figure 40B:
FIG. 40B presents a pictorial representation of an example image NFT.

FIG. 40B presents a pictorial representation of example display data of an image NFT 4020. In particular, display data of image NFT 4020 to be associated with a game character corresponds to an image of Michael Jordon. FIG. 40C presents a pictorial representation of an example game character data 4024 generated in such a fashion and FIG. 40D presents a pictorial representation of an example client device with screen display of the game character used in a game.

Figure 40E:
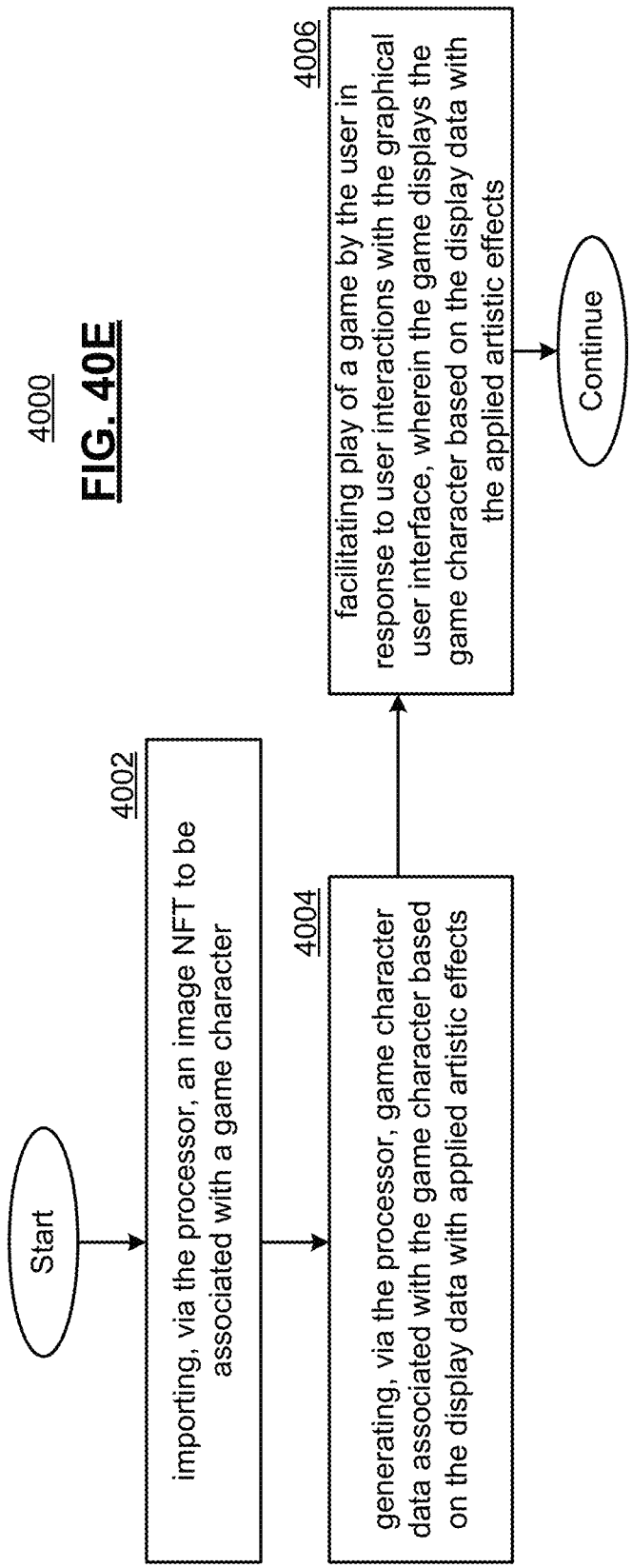
FIG. 40E presents a flowchart representation of an example method.

FIG. 40E presents a flowchart representation of an example method. In particular, a method 4000 is presented for use in conjunction with any of the functions and features previously described. Step 4002 includes importing, via the processor, an image NFT with display data to be associated with a game character. Step 4004 includes generating, via the processor, game character data associated with the game character based on the display data with applied artistic effects data and further based on performance data. Step 4006 includes facilitating play of a game by the user in response to user interactions with the graphical user interface, wherein the game displays the game character data based on the display data with the applied artistic effects.

Figure 41A:
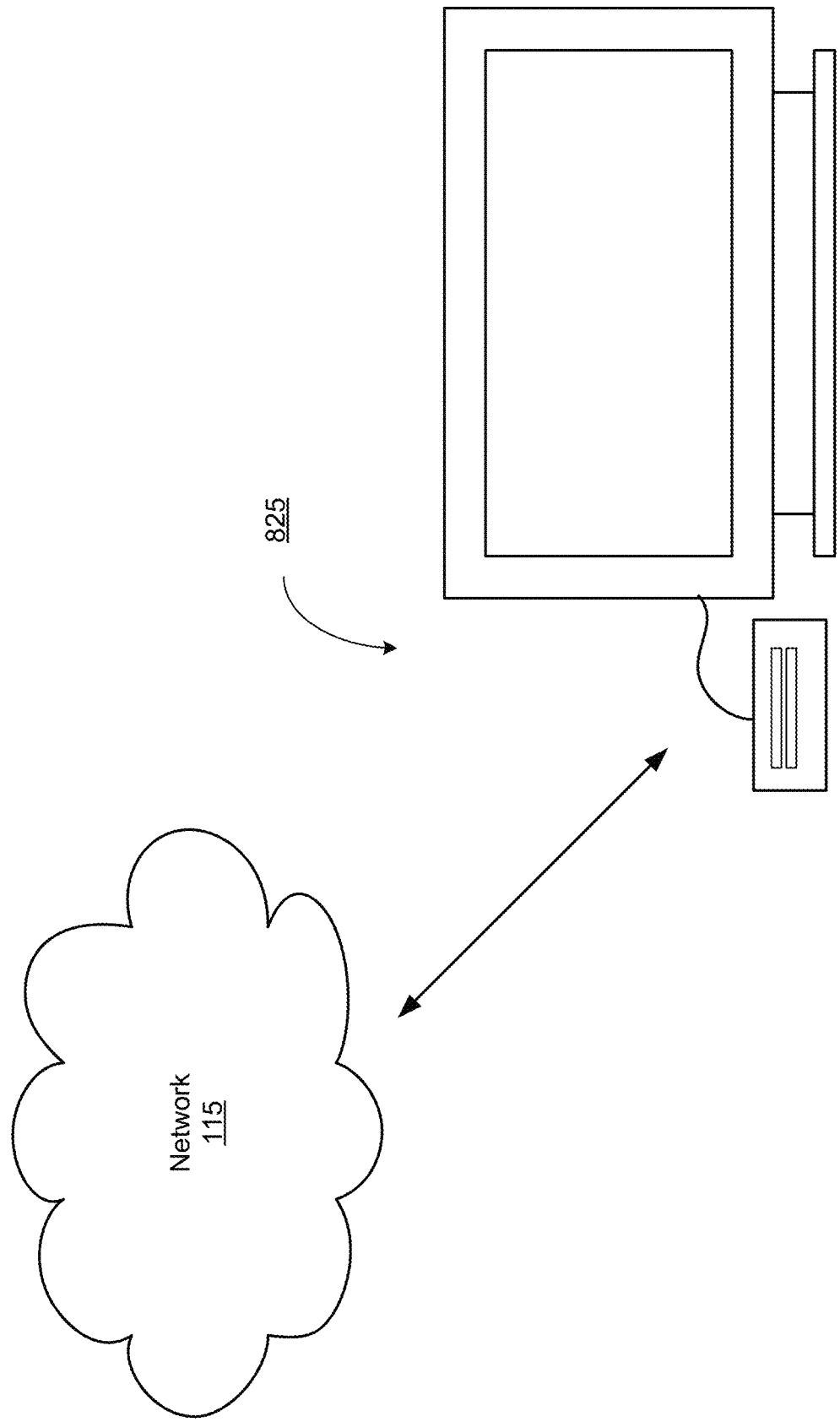
FIG. 41A presents a pictorial/block diagram representation of an example system.

FIG. 41A presents a pictorial/block diagram representation of an example system. While prior descriptions have focused on client devices 825 such as laptops, smartphones, smart watches, tablets and desktops, one or more client devices 825 can be implemented as other devices including streaming devices such as Roku players, Amazon Fire sticks, Apple TV devices, smart TVs, Chromecast, mobile devices, PCs, game consoles and/or other streaming devices that can include or connect to a television monitor or other display and present display data in the form of still images, animations and/or video to a user of the client device 825. In the example shown, a streaming device 4122 is connected to a television or monitor 4120.

While many of the prior examples have focused on customized collection displays of NFTs designed by the user, in other examples, a user can pick an environment for displaying his or her NFTs and the customized collection display can be automatically generated, rendered and/or streamed to the user's client device 825. Consider an example where the user wishes to display his or her NFTs in an art gallery format. The user can select an appropriate art gallery environment that fits his or her tastes and matches the style of his or her NFT collection. The customized collection display can then be automatically generated in the chosen environment, allowing the user to show off the collection to others via the user's streaming devices.

In various examples, the user's NFT gallery runs on the NFT collection platform 800 via a content delivery server or other cloud implementation and operates in conjunction with the wallet app 250 to present the customized collection display. The client device 825 can operate similar to an interactive TV that is connected to the user's NFT library and allows the user to navigate through the collection (and the environment) via a remote control device such as dedicated device remote or mobile device via a dedicated application. Furthermore, in addition to providing a mechanism to show off a user's NFT in their own living room for example, the customized collection display can be used as a screen-saver or other display associated with other personal/work situations.

In various examples, this cloud environment corresponds to the location of an NFT's content (dynamic location/address). Users each have an instance (one environment) in that world (or in a corresponding metaverse) where their NFT's reside. That environment can be streamed in real-time to whatever device you choose. Unlike other NFT wallets, the location can move to another world or environment via selection or transaction. The NFT's displays can be influenced by the environment and the other NFT's in the environment. The properties of the NFTs can be dynamic based on AI models, animation functions and other tools included in NFT collection platform 800.

Figure 41B:
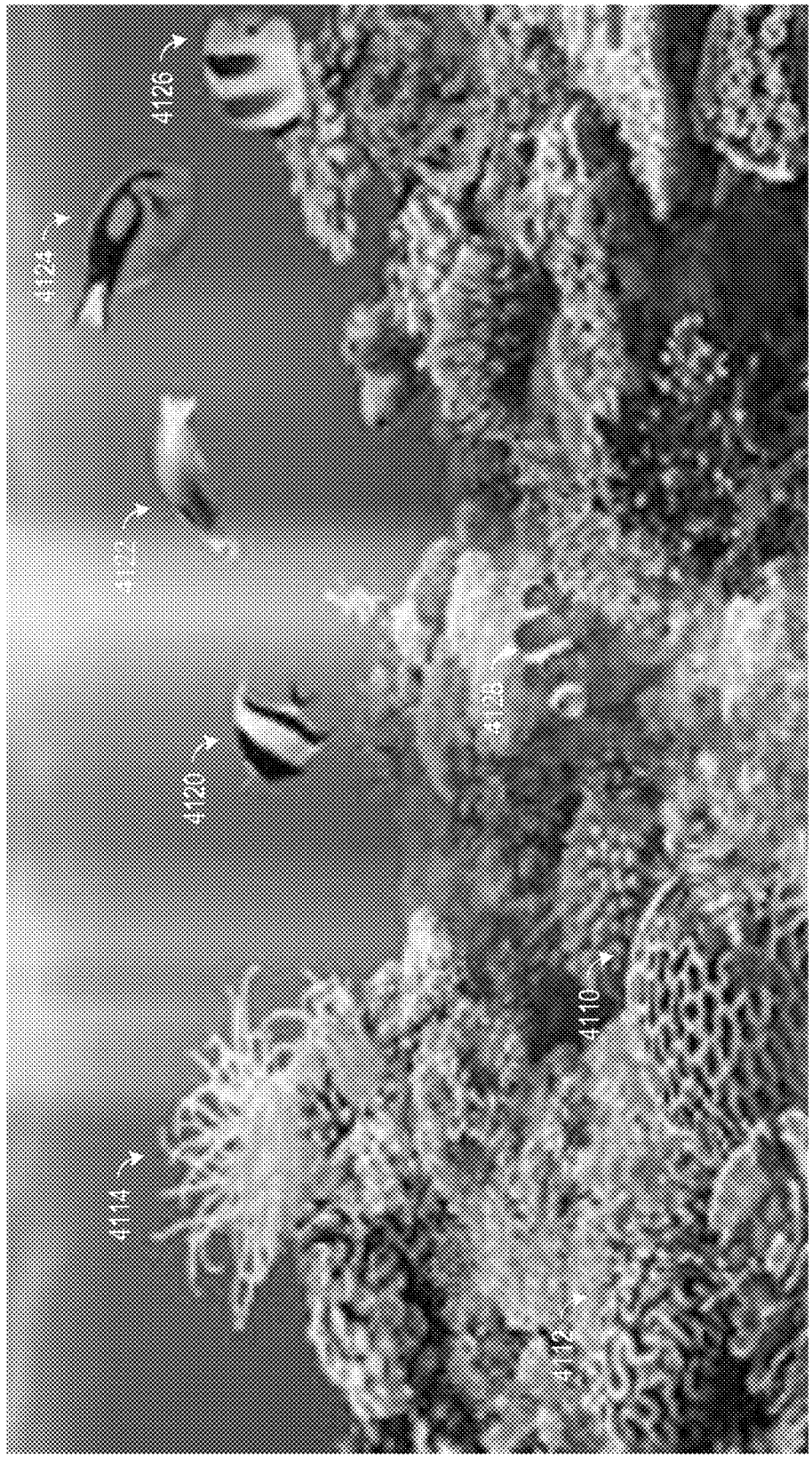
FIG. 41B presents a pictorial representation of an example screen display.

FIG. 41B presents a pictorial representation of an example screen display. In the example shown, the user has collected several undersea-related NFTs corresponding to fish, coral and other sea creatures. Furthermore, the user has selected an undersea/aquarium environment to display these NFTs. The NFT collection display tools 810 of NFT collection platform 800 including animation and rendering tools that covert the image data from the various NFTs into objects, such as virtual "living" animals, that are placed in the environment. Coral NFTs result in virtual coral 4110 and 4112 that are a static part of the display and match the image data of their corresponding NFTs. Similarly, a sea anemone NFT results in a corresponding virtual anemone 4114, but in this case the tentacles of the animal are animated by the NFT collection display tools so as to sway with the motion of virtual currents. Fish NFTs result in virtual fish 4120, 4122, 4124, 4126 and 4128 that appear as their corresponding NFTs, yet "swim" about the environment, and interact with one another as well as other animals and features in the environment.

In various examples, and as previously discussed, the display data corresponding to the customized collection display of the environment can not only be used to create a living wallet display of an NFT collection, but also can be used to generate one or more new collection NFTs. The dynamic nature of the environment, in particular, can produce many different static displays, video clips, GIFs, etc., that themselves can be used to generate a corresponding group of collection NFTs.

Figure 41C:
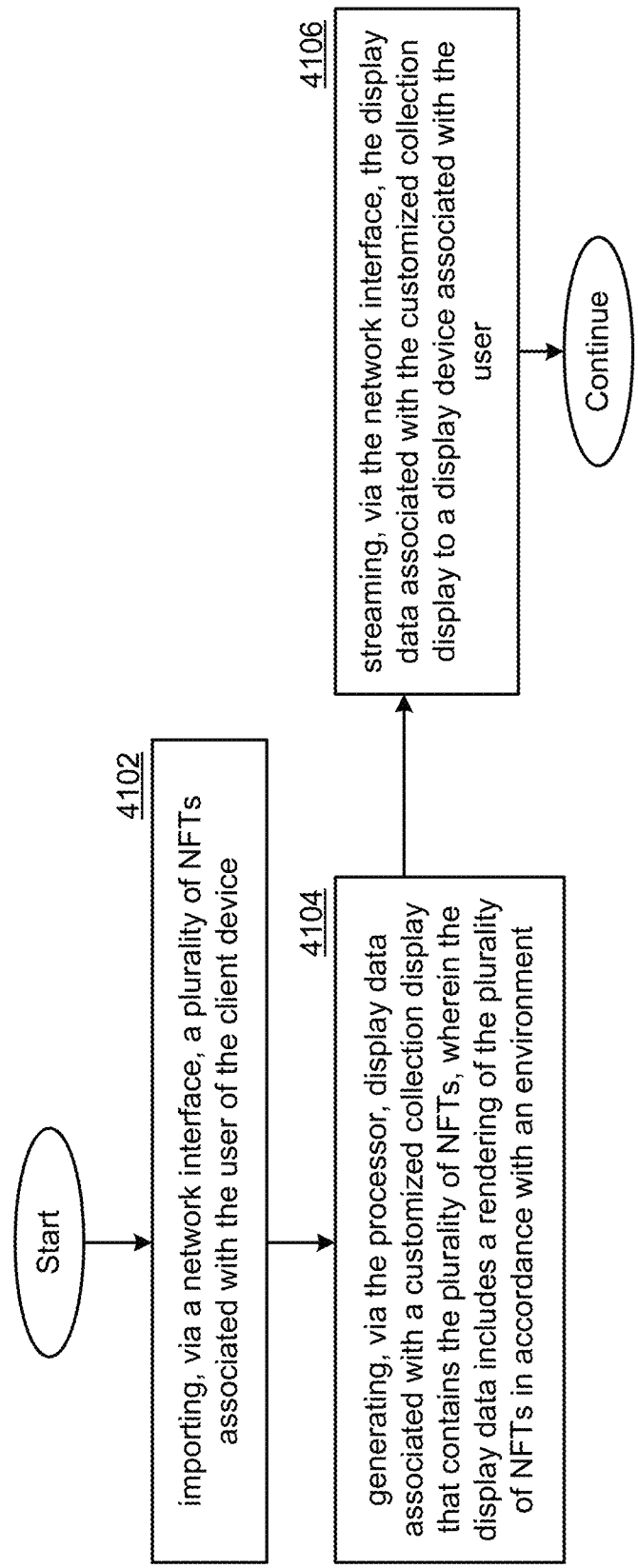
FIG. 41C presents a flowchart representation of an example method.

FIG. 41C presents a flowchart representation of an example method. In particular, a method 4100 is presented for use in conjunction with any of the functions and features previously described. Step 4102 includes importing, via a network interface, a plurality of NFTs associated with the user of the client device. Step 4104 includes generating, via the processor, display data associated with a customized collection display that contains the plurality of NFTs, wherein the display data includes a rendering of the plurality of NFTs in accordance with an environment. Step 4106 includes streaming, via the network interface, the display data associated with the customized collection display to a display device associated with the user.

Figure 41D:
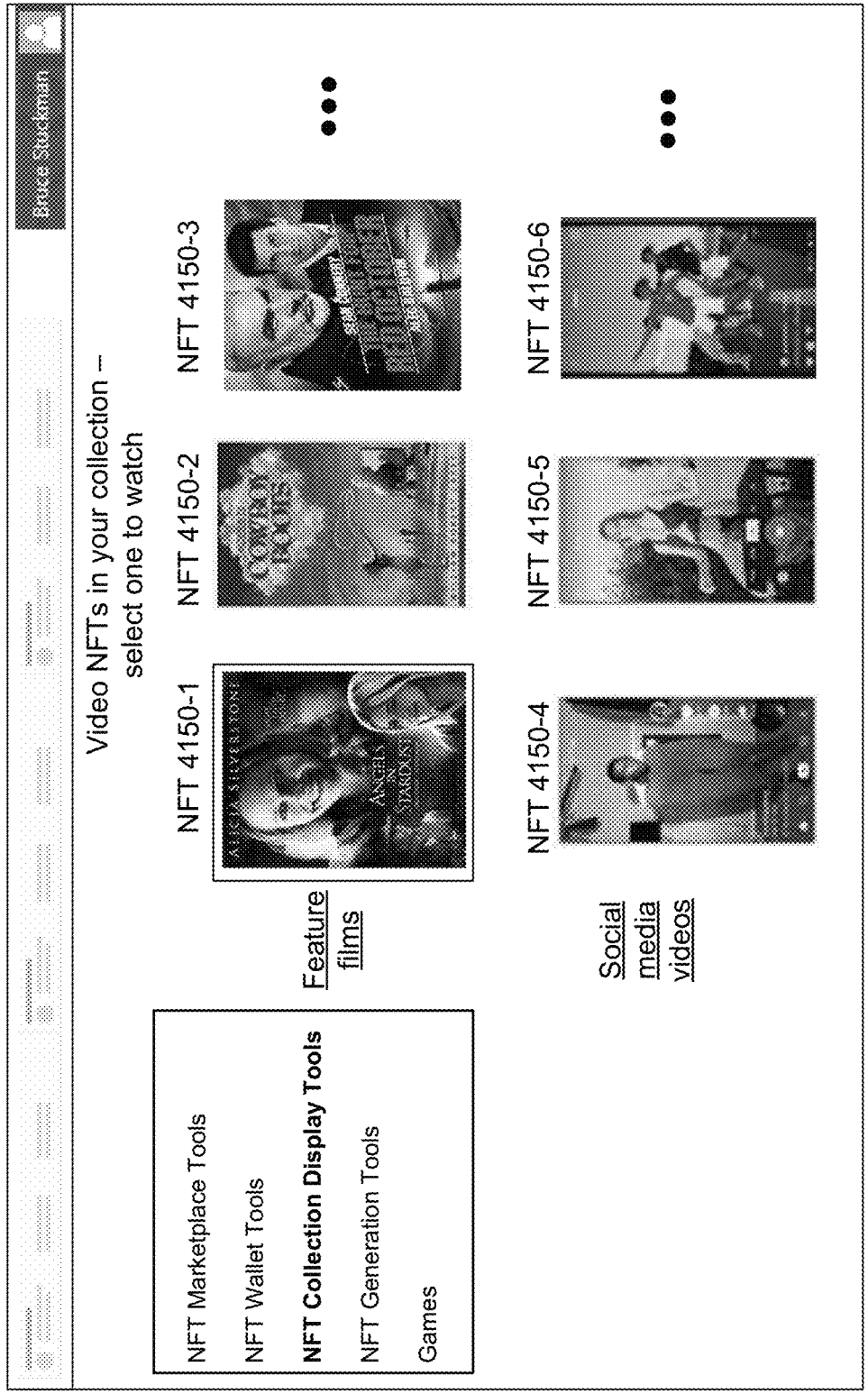
FIG. 41D presents a pictorial representation of an example screen display.

FIG. 41D presents a pictorial representation of an example screen display. In the example shown, a user of an NFT platform, such as NFT collection platform 800, has accessed, via a client device associated with the user such as client device 825, a plurality of video NFTs associated with the user. In this case, the user's collection of video NFTs includes feature films, 4150-1, 4150-2, 4150-3, etc. The user's collection of video NFTs also includes a set of social media video NFTs 4150-4, 4150-5, 4150-6, etc. While two types of video NFTs have been illustrated, it should be noted that video NFTs associated with other types of videos can be collected as well, including instructional videos, short films, cartoons and other animated features, and other videos, etc.

Figure 41E:
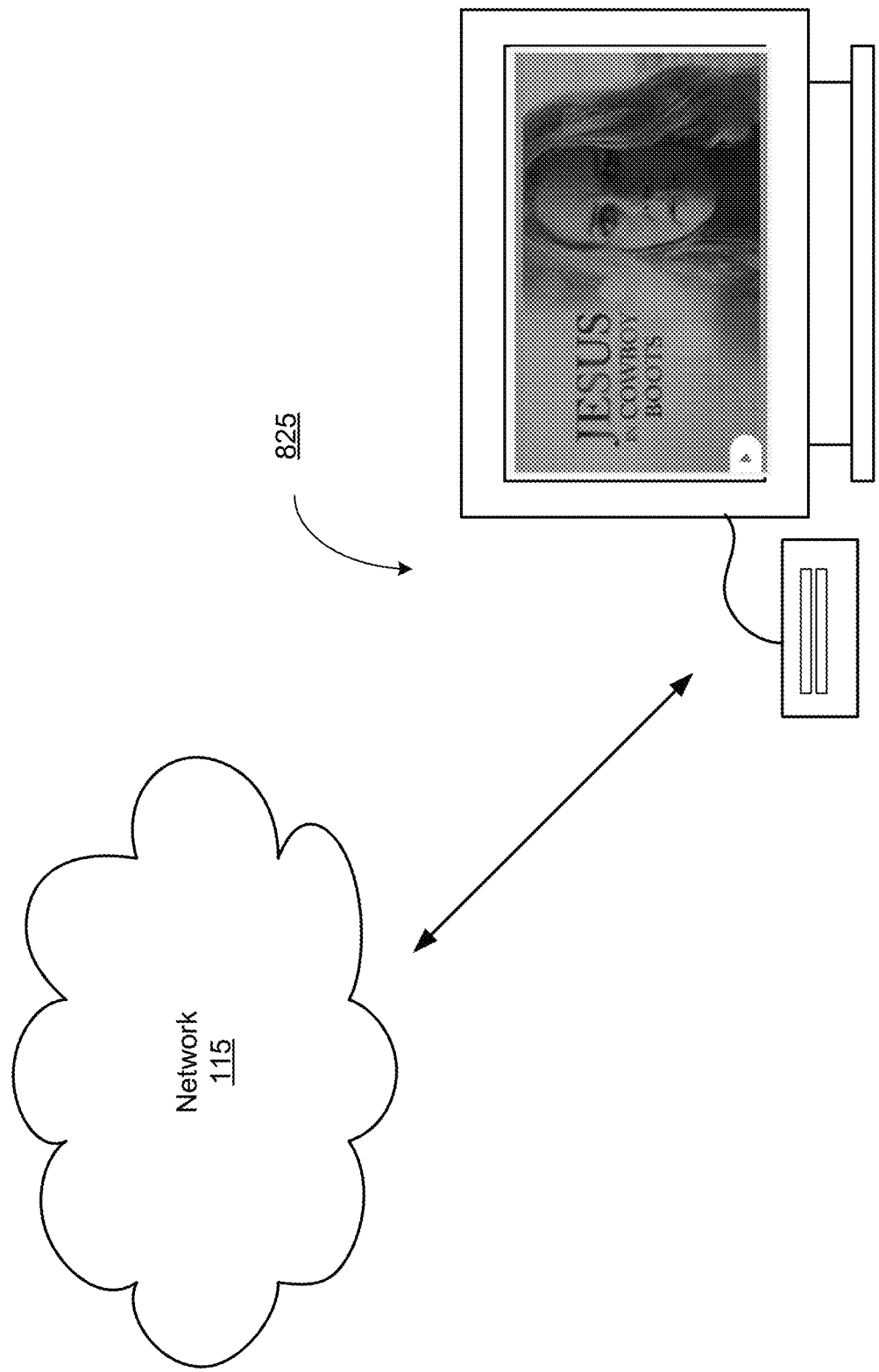
FIG. 41E presents a pictorial/block diagram representation of an example system with screen display.

In the screen display shown, the platform has generated display data associated with a customized collection display that contains the plurality of video NFTs for display via a graphical user interface associated with the client device. Furthermore, the user has interacted with the graphical user interface and indicated a selection of one the plurality of video NFTs for playback—in this case, the movie "Angel's in Stardust". The selection is received by the platform which responds by streaming, via the network 115, the video associated with the selected video NFTs to the client device 825 of the user as shown in FIG. 41E.

Figure 41F:
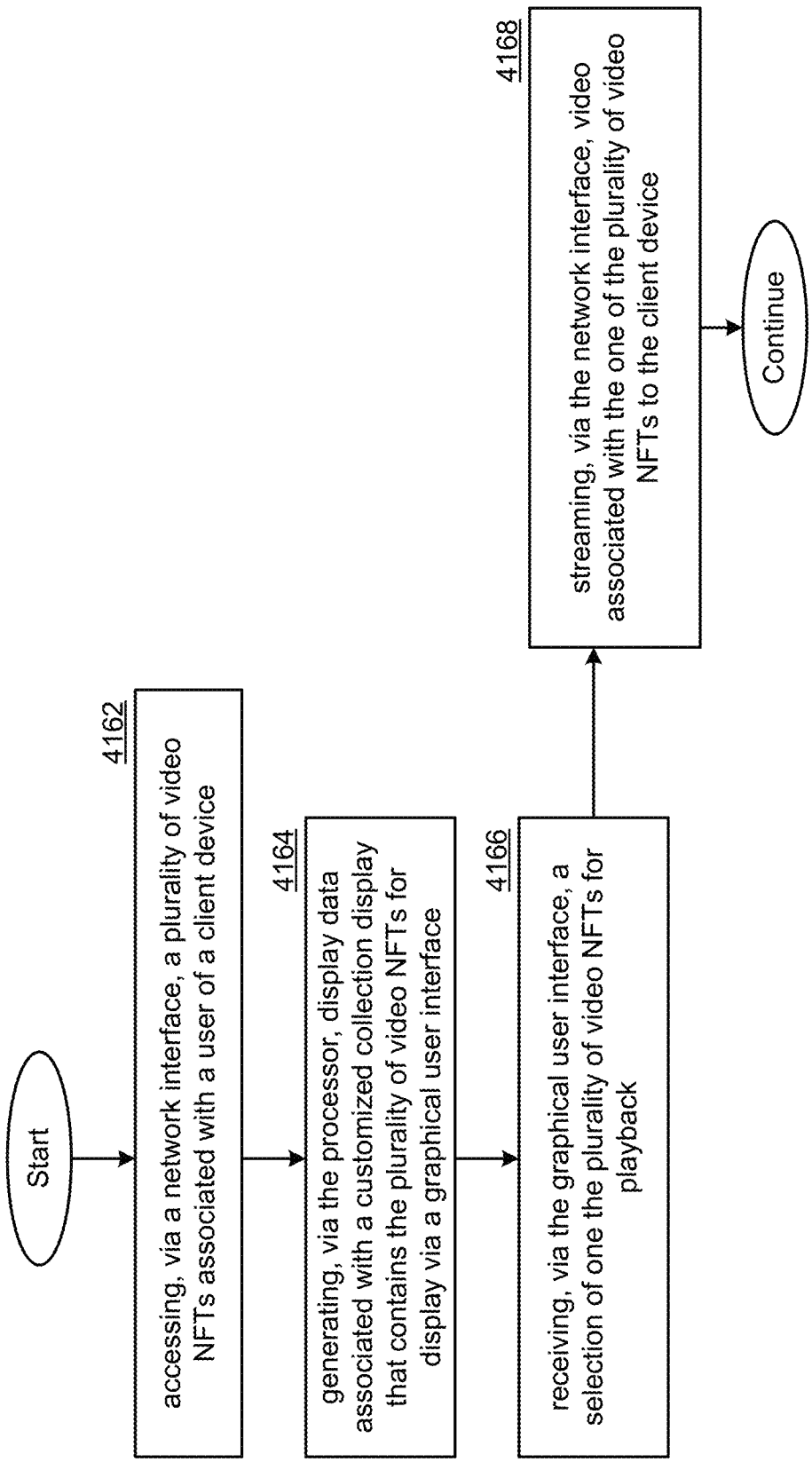
FIG. 41F presents a flowchart representation of an example method.

FIG. 41F presents a flowchart representation of an example method. In particular, a method 4160 is presented for use in conjunction with any of the functions and features previously described. Step 4162 includes accessing, via a network interface, a plurality of video NFTs associated with a user of a client device. Step 4164 includes generating, via the processor, display data associated with a customized collection display that contains the plurality of video NFTs for display via a graphical user interface. Step 4166 includes receiving, via the graphical user interface, a selection of one of the plurality of video NFTs for playback. Step 4168 includes streaming, via the network interface, video associated with the one of the plurality of video NFTs to the client device.

Figure 41G:
FIG. 41G presents a pictorial representation of an example screen display.
Figure 41H:
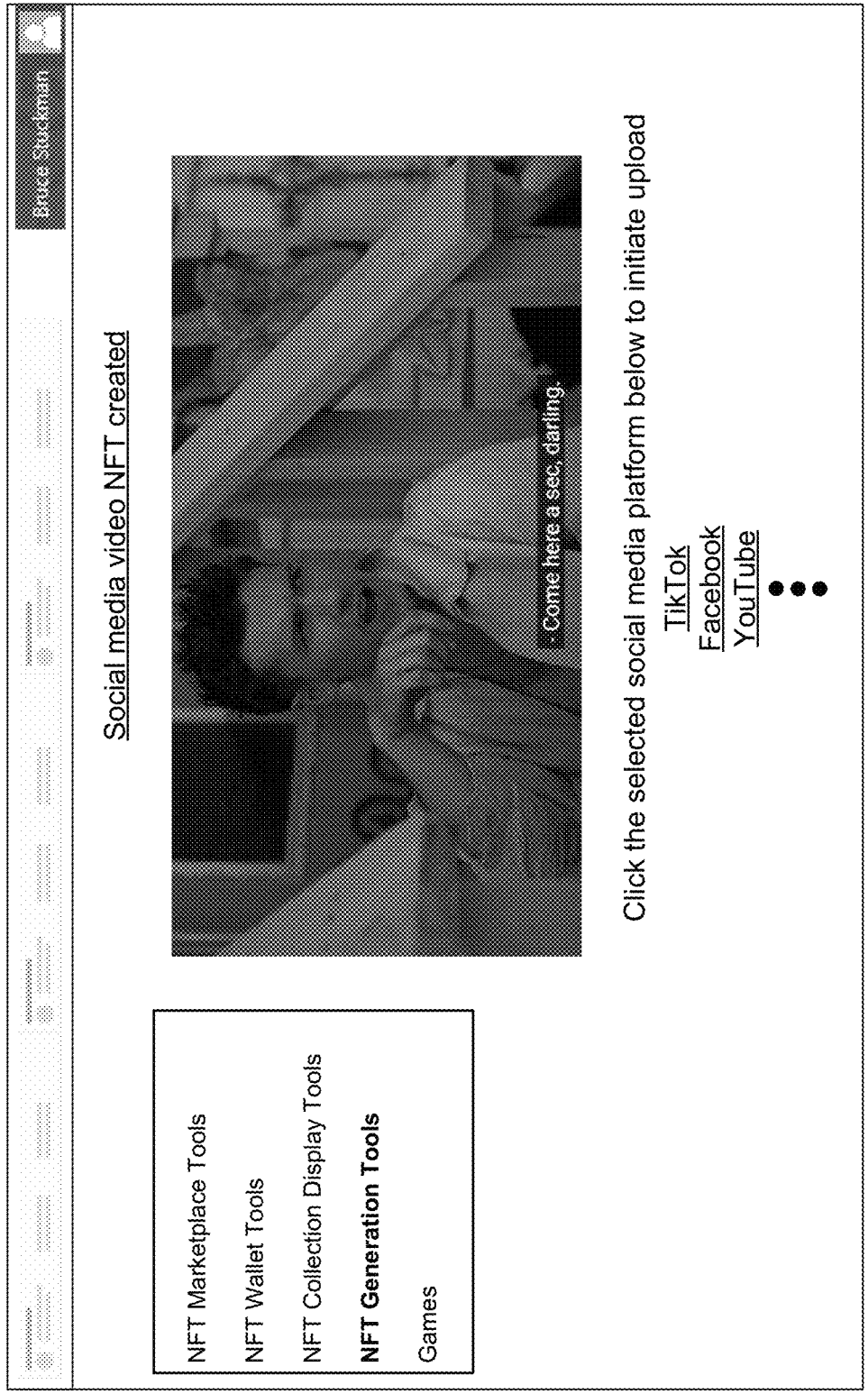
FIG. 41H presents a pictorial representation of an example screen display.

FIG. 41G presents a pictorial representation of an example screen display. In the example shown, the platform has received a social media video associated with the user of the client device and facilitates, via NFT generation tools, the generation of a social video NFT containing the social media video. The platform further operates to facilitate, as shown in FIG. 41H posting of the social media video NFT to a selected social media platform.

Once the social media video NFT is posted, performance data associated with the social media video NFT can be collected, such as the number of viewings, the number of "likes" or other positive comments, the number of times links to the NFT has been "shared" and/or other performance data. This performance data can be used as a basis of creating an updated social media video NFT that, for example, includes the performance data as metadata and/or visually indicates the performance data in the imagery of the NFT.

FIG. 41I presents a flowchart representation of an example method. In particular, a method 4170 is presented for use in conjunction with any of the functions and features previously described. Step 4172 includes receiving a social media video associated with the user of the client device. Step 4174 includes facilitating, via the processor, generation of a social video NFT containing the social media video. Step 4176 includes facilitating, via the processor, posting of the social media video NFT to a social media platform.

FIGS. 42A-42C present a pictorial representations of example screen displays. As previously discussed, a dynamic environment can be used to create the customized collection display. The dynamic nature of this environment/world can lead to other opportunities to support both games and other features associated with a collection of NFTs. The environment with the user's collection of NFTs is not only rendered in real-time, but also can be ever-changing based on environment conditions, the interaction between objects/NFTs in the environment, the presence of other objects/NFTs in the environment, and/or based on external stimuli put into the environment. Such stimulus could be an amount of attention by the user, cryptocurrency used to purchase light, maintain temperature, provide food, cleaning and other NFT's in the eco-system. Living objects in an environment can virtually live, grow, get sick, die, establish friendships, mate with other animals, be killed by other animals, and/or exhibit other functions of a living organism or other dynamic feature in order to simulate an actual ecosystem.

The customized collection display of the environment that is rendered as display data is streamed out is the current state of the environment as well as the individual NFTs in that environment. In addition, the individual NFTs in the collection and/or derivative NFTs created therefrom, can themselves be updated based on their status in the environment. New characteristics and parameters of each NFT can be loaded onto the blockchain periodically and/or as changes occur. In this fashion, NFTs can change and grow as they matures and resources are put into the environment.

Turning to the examples of FIGS. 42A-42C, a patch of coral corresponding to an NFT of the user grows with time and becomes more complex. Not only does the coral begin to take on take on characteristics of that environment, adapting to the underwater landscape, for example, the coral can grow, mature and die based on the environment conditions. As discussed above, the NFTs of the user, and/or derivative NFTs thereof, can be updated based on these changes. Furthermore, the display data of the customized collection display can be used to create corresponding collection NFTs, based on the state of the environment (and the coral) at various times.

This example is well-suited to support a form of gaming where the NFTs correspond to characters in the game of virtual life. The growth of the virtual coral generated based on a single NFT could be similar to an actual coral growing based on elements in that environment such as light, temperature, food and other animals and environmental factors in the eco-system of this particular simulated game environment which is rendered. The coral could level-up as it grows and become a stronger character with more advanced features and/or abilities. Also, the coral can change, when new objects/animals enter the environment and change the characteristics of that eco-system. Furthermore, the presence and growth of the coral itself can change the characteristics of the eco-system for other objects/animals based on other NFTs. In addition, the coral can be taken out of that environment and moved into another environment, at first utilizing the characteristics updated from the prior environment, but then further adapting to its new environment.

Further examples are likewise possible. An NFT corresponding to a painting can change, continually becoming more complex. The painting can start as a simple dot on a canvas, then become more complex and colorful based on an AI model and/or a random art generation function. As time passes, the painting becomes more complex, colorful and/or animated. In a further example, a portrait or a person can "age" based on artistic aging tools. The painting can be rendered in real-time as changes occur.

FIG. 42D presents a flowchart representation of an example method. In particular, a method 4200 is presented for use in conjunction with any of the functions and features previously described. Step 4202 includes importing, via a network interface, a plurality of NFTs associated with the user of the client device. Step 4204 includes generating, via the processor, display data associated with a customized collection display that contains the plurality of NFTs, wherein the display data includes a rendering of the plurality of NFTs in accordance with an environment. Step 4206 includes streaming, via the network interface, the display data associated with the customized collection display to a display device associated with the user. Step 4208 includes updating at least one of the plurality of NFTs based on changes in the at least one of the plurality of NFTs in the environment.

FIG. 43A presents a block diagram/flow representation of an example of display data generation. In the example shown, a blockchain node 4325 is presented, such as an Ethereum node, Corda Blockchain node, a Hyperledger Fabric Blockchain Network node or other node that runs a blockchain application to support cryptocurrency, NFTs and/or other blockchain transactions.

The blockchain node 4325 generates blockchain data 4320-1 such as streams of raw blockchain transaction data, hashes, samples, random samples or other functions or transformations of the blockchain transaction data, node performance data such as transactions per second, storage, packet loss statistics, traffic volumes, the number of successful/unsuccessful connections with other peers/nodes, memory/cache under load statistics, network performance or other metrics/parameters or data associated with the node. The blockchain data 4320-1 can be transformed via the NFT collection display tools 810 to display data 1502-12 indicating an abstract visualization display of the blockchain data 4320-1. As the blockchain data 4320-1 is updated later as blockchain data 4320-2 shown in FIG. 43B, the abstract visualization display is updated as updated display data 1502-13. The display data corresponding to the abstract visualization display can be used to create corresponding NFTs, based on the current state of the display data at various times.

In various examples, the NFT collection display tools 810 include a random art generator or other function that converts the blockchain data 4320-1 to an abstract visualization display. In effect, the blockchain data 4320-1 can be viewed as a source of random data that is constantly changing and being updated. The changing nature of the blockchain data 4320-1, 4320-02, . . . causes the abstract visualization display to change as well, creating for example, constantly or periodically changing artistic representations of the "random" data from the blockchain node 4325. Node builders, or partial builders that are staked by other users, can follow the growth and generate revenue from of the NFTs created therefrom and the abstract visualization display that itself becomes a character (a virtual living thing) on its own.

As used herein, the term "abstract" in the term "abstract visualization display" refers to the abstract visualization of the blockchain data from the blockchain node and further makes reference to the abstraction that necessarily occurs in representing this source of random (non-visual) data as a visual display. It should be noted that the abstract visualization display can be, but need not be, classified as "abstract art".

FIGS. 43C-43E present pictorial representations of an example screen displays. In particular, screen displays are shown of display data corresponding to abstract visualization displays created from blockchain data from a blockchain node at three different times. As shown, the abstract visualization displays change with time, each presenting a unique image that can each be used to create a corresponding NFT.

FIG. 43F presents a flowchart representation of an example method. In particular, a method 4300 is presented for use in conjunction with any of the functions and features previously described. Step 4302 includes hosting, via the processor, a blockchain node. Step 4304 includes generating, via the processor, display data representing an abstract visualization display associated with the blockchain node. Step 4306 includes sending, via the network interface, the display data representing the abstract visualization display to a display device associated with the user. Step 4308 includes generating, via the processor, updated display data based on changes in the blockchain node. Step 4310 includes sending, via the network interface, the updated display data representing the abstract visualization display to the display device associated with the user.

FIGS. 43G-43J present graphical representations of display parameter functions. Prior examples have discussed generation of display data 1502-12 indicating an abstract visualization display associated with a blockchain node or other node of a distributed computer network. This display data can be displayed via a client device of the user directly and/or can be used to generate and update one or more NFTs associated with the particular node. It should also be noted that performance data including cumulative features and/or other transaction data associated with either the node or an NFT associated therewith, can be used to modify and/or further modify and update the display data. These modifications can be, for example, based on changes in various display parameters such as color, color contrast, brightness, contrast, image complexity, blurriness/focus, resolution and/or other image parameters. These modifications can also include, for example, the addition of and/or changes to various icons, overlays, frames, award designators or other image variations and combinations thereof. Examples of such performance data include time, time since creation, inception or initiation or other indicators of NFT or node age, cumulative transaction volume, cumulative earnings, an indicator of a largest transaction associated with a node or NFT, a highest transaction day associated with a node or NFT, the current marketplace value of a node or NFT, how many times an NFT has been viewed, exhibited or shown, awards received by an NFT or node, and other indicators of how seasoned and/or successful a node or NFT is, as well as combinations thereof.

Consider the example of FIG. 43G. In this case, the color contrast increases as a continuous monotonically increasing function of time. In FIG. 43H, the image complexity increases as a continuous monotonically increasing function of NFT age. In FIG. 43I, the brightness increases as a discrete monotonically increasing function of cumulative transaction value for either a node or an NFT. In various examples, step increases can occur when milestone levels are met. In FIG. 43J, the image focus increases as a discrete monotonically increasing function of highest transaction day for either a node or an NFT since inception. While the examples above are based on monotonically increasing functions, other functions including non-monotonic functions and/or decreasing functions including monotonically decreasing functions can likewise be employed.

FIGS. 43K-43M present pictorial representations of example screen displays. In the example shown, while the image is itself static, the color contrast of the image increases with time. In FIGS. 43N-43P, the images change with the number of cumulative transactions with increasing focus and complexity. Furthermore, in FIG. 43O, the node and/or NFT has earned a star for performance. At a later time shown in FIG. 43P, the node and/or NFT has earned an additional two stars for performance.

FIG. 43Q presents a flowchart representation of an example method. In particular, a method 4300-1 is presented for use in conjunction with any of the functions and features previously described. Step 4302-1 includes generating, via the processor, display data representing an abstract visualization display associated with a blockchain node. Step 4204-1 includes facilitating, via the processor, the generation of an NFT that is based on the display data. Step 4306-1 includes generating, via the processor, updated display data based on changes in transaction data associated with the blockchain node. Step 4308-1 includes facilitating updates to the NFT based on the updated display data.

FIG. 43R presents a flowchart representation of an example method. In particular, a method 4300-2 is presented for use in conjunction with any of the functions and features previously described. Step 4302-2 includes generating, via the processor, display data representing an abstract visualization display associated with a blockchain node. Step 4304-2 includes facilitating, via the processor, the generation of an NFT that is based on the display data. Step 4306-2 includes generating, via the processor, updated display data based on an age associated with the NFT. Step 4308-2 includes facilitating updates to the NFT based on the updated display data.

FIG. 43S presents a flowchart representation of an example method. In particular, a method 4300-3 is presented for use in conjunction with any of the functions and features previously described. Step 4302-3 includes facilitating, via the processor, the generation of an NFT that is based on display data. Step 4304-3 includes generating, via the processor, updated display data based on performance data associated with the NFT. Step 4306-3 includes facilitating updates to the NFT based on the updated display data.

FIG. 44A presents a block diagram/flow representation of an example of display data generation. As discussed in prior examples, the blockchain data 4320-1 was viewed as a source of random data that can be converted to an abstract visualization display. It should be noted that other data sets corresponding to other non-visual data can likewise be used to similar effect. In the example shown, the dataset 4420 is converted to display data 1502-14 associated with an abstract visualization display. The display data corresponding to the abstract visualization display can be used to create a corresponding NFT. In circumstances where the dataset 4420 is a dynamically changing set of data, the display data corresponding to the abstract visualization display can be used to create corresponding NFTs, based on the current state of the display data at various times.

FIG. 44B presents a pictorial representation of an example screen display. In particular, a screen display is shown corresponding to an example abstract visualization display created based on an input data set.

FIG. 44C presents a flowchart representation of an example method. In particular, a method 4400 is presented for use in conjunction with any of the functions and features previously described. Step 4402 includes receiving, via the processor, a data set. Step 4404 includes generating, via the processor, display data representing an abstract visualization display associated with the data set. Step 4404 includes sending, via the network interface, the display data representing the abstract visualization display to a display device associated with the user. Step 4408 includes facilitating creation of an NFT corresponding to the abstract visualization display associated with the data set.

FIG. 45A presents a block diagram/flow representation of an example of display data generation. As discussed in prior examples, the blockchain data or other data set is viewed as a source of random data that can be converted to an abstract visualization display. It should be noted that NFT collection display tools can operate based on a seen image 4520 rather than a mere random data set. In operation, the NFT collection display tools include operate based on artistic effects, and other image transformations (either random or deterministic) to convert the seed image 4520 to display data 1502-15 associated with an abstract visualization display. In this context the term "abstract" refers to the abstraction of the seed image performed by the NFT collection tools 810.

The display data corresponding to the abstract visualization display can be used to create a corresponding NFT. In circumstances where the seed image 4520 is a video, GIG or other dynamically changing image, the display data corresponding to the abstract visualization display can be used to create corresponding NFTs, based on the current state of the display data at various times.

FIG. 45B presents a block flow representation of an example of display data generation. In particular, a screen display is shown corresponding to example display data associated with abstract visualization display 1502-16 created based on an input seed image 4520-16.

FIG. 45C presents a flowchart representation of an example method. In particular, a method 4500 is presented for use in conjunction with any of the functions and features previously described. Step 4502 includes receiving, via the processor, a seed image. Step 4504 includes generating, via the processor, display data representing an abstract visualization display associated with the seed image. Step 4506 includes sending, via the network interface, the display data representing the abstract visualization display to a display device associated with the user. Step 4508 includes facilitating creation of an NFT corresponding to the abstract visualization display associated with the seed image.

FIG. 46A presents a block diagram/flow representation of an example of NFT generation. In the example shown, an original NFT 4620 corresponds to a game piece such as a game character, an ancillary article or other article or object that is used in a game. The original NFT 4620 can be purchased by the user, created or leveled-up via game play or otherwise acquired by the user.

The NFT generation tools 808 are used to generate a derivative NFT 4624 based on the expiration restrictions 4622 shown in FIG. 46B. The expiration restrictions can correspond to, for example, an expiration time and/or date, one or N time use in a game, tournament or challenge, etc. This derivative NFT 4624 can be created on a parachain or other sidechain that is different from the blockchain on which the original NFT 4620 resides. Furthermore, this derivative NFT 4624 can be micro-loaned or otherwise staked to another user for game play—subject to the expiration restrictions. In this fashion, for example, other users can play with the character/game piece in exchange for a price (payment, bounty, experience, etc.).

In FIG. 46C, the derivative NFT 4624 has been temporarily loaned to another user who uses the player in a challenge tournament. At the end of the loan (e.g. when the expiration restrictions are met) the loaned player is automatically deleted, destroyed, disabled or otherwise "burned" and game data 4626 indicating the escrow, stats and experience or other game performance metrics earned by the other user using the player are retrieved and can be stored by the user on the blockchain with the original NFT 4620 to generate updated NFT 4620', as shown in FIG. 46D.

FIG. 46E presents a flowchart representation of an example method. In particular, a method 4600 is presented for use in conjunction with any of the functions and features previously described. Step 4602 includes facilitating, via the processor, creation of a derivative NFT corresponding to an original NFT associated with a game piece, the derivative NFT having expiration restrictions limiting game play of the game piece in a game. Step 4604 includes facilitating, via the processor, a micro-loan transaction of the derivative NFT to another user to facilitate the game play of the game piece by the another user, wherein the derivative NFT expires when the expiration restrictions are met. Step 4606 includes receiving, via the processor, game data associated with the game play of the game piece by the another user. Step 4608 includes updating the original NFT associated with the game piece, based on the game data associated with the game play of the game piece by the another user.

FIGS. 47A and 47B present pictorial representations of example NFTs. In particular, each NFT has been selected by a corresponding user to do battle with one another. These NFTs can be derivative NFTs created for the battle or other NFTs owned by the users. Each of the NFTs has an amount of currency, such as cryptocurrency associated with it. In the example shown, each NFT has an associated bit coin which is visually represented in the NFT, however, other currencies and non-visual representations may be used as well.

FIG. 47C presents a pictorial representation of an example screen display. In particular a screen display of a game 812 is presented where the battle has commenced between two characters associated with the NFTs of FIGS. 47A and 47B. If the character associated with the NFT of FIG. 47A wins the battle in the game, the NFT of FIG. 47B is deleted, destroyed, disabled or otherwise burned and the currency associated with this NFT is ceded to the user associated with the NFT of FIG. 47A. Conversely, if the character associated with the NFT of FIG. 47B wins the battle in the game, the NFT of FIG. 47A is deleted, destroyed, disabled or otherwise burned and the currency associated with this NFT is ceded to the user associated with the NFT of FIG. 47B.

In various embodiments, the user's NFTs are transferred from their wallets during the game. The winner's NFT is transferred back to the wallet at the end of the game. In addition, the currency asset of the loser's NFT (the bit coin in the example shown) can be converted into anything the wallet had contracted, e.g. USDT, AMP, BTC, ETH, etc. The winner's currency asset can be treated in a similar fashion, or kept in the winning NFT for use in future battles.

FIG. 47D presents a flowchart representation of an example method. In particular, a method 4700 is presented for use in conjunction with any of the functions and features previously described. Step 4702 includes associating an amount of cryptocurrency with an NFT associated with a game piece. Step 4704 includes receiving, via the processor, game data associated with game play by the user against at least one other user, the game play by the user utilizing the game piece. Step 4706 includes expiring the NFT and ceding the cryptocurrency to the at least one other player when the game data indicates a loss by the user. Step 4708 includes collecting cryptocurrency of the at least one other player when the game data indicates a win by the user.

FIG. 48A presents a block diagram/flow representation of an example of NFT generation. In the example shown, an original metaverse real estate NFT 4820 corresponds to a portion/plot of real estate that is used in a game or metaverse application. An example is shown in FIG. 48B. The original metaverse real estate NFT 4820 can be purchased by the user, created or leveled-up via game play or otherwise acquired by the user of a metaverse application or game.

The NFT generation tools 808 are used to generate a derivative NFT 4824 or other metaverse real estate NFT that is based on the improvements 4822 shown in FIG. 48C. In the example shown the improvements 4822 correspond to a building or other structure, however, other real estate improvements can likewise be implemented. In various example, the derivative NFT 4824 with improvements shown in FIG. 48D can be created on a parachain or other sidechain that is different from the blockchain on which the original metaverse real estate NFT 4820 resides or the same blockchain on which the original metaverse real estate NFT 4820 resides.

FIG. 48E presents a flowchart representation of an example method. In particular, a method 4800 is presented for use in conjunction with any of the functions and features previously described. Step 4802 includes receiving, via the processor, a metaverse real estate NFT associated with metaverse real estate. Step 4804 includes receiving, via the processor, improvements data associated with the metaverse real estate. Step 4806 includes facilitating creation of a derivative NFT associated with the metaverse real estate and having improvements associated with metaverse real estate.

FIG. 49A presents a block diagram/flow representation of an example of NFT generation. In the example shown, document image data 4920 and other data corresponding to a document are used to generate an authenticated document NFT 4924 via the NFT generation tools 808. These authenticated document NFT 4924 can be stored in an NFT wallet associated with the mobile phone or other client device associated with the user and can be used, for example, in place of coupons, cards, legal documents, medical documents, financial documents, IDs, credit cards, licenses and/ or other important documents associated with a user that normally exist in non-digital, e.g. paper or plastic form. The authenticated document NFT 4924 can be used to prevent fraud and/or promote privacy in transactions via secure user and/or document authentication. In various examples, the authenticated document NFT 4924 can be presented and analyzed via secured blockchain or other crypto transactions at the time of a transaction in order to authenticate the identity of the user and/or to verify the accuracy and authentic nature of the other data 4922 and/or to facilitate the security of the transaction.

Turning to FIG. 49B, authenticated document NFT 4924-1 corresponds to a driver's license and the other data 4922 includes various driver license data and identification data associated with the holder and/or other data that can be used to authenticate the owner via the authenticated document NFT 4924-1 when stored on in a wallet associated with the mobile phone or other client device.

Turning to FIG. 49C, authenticated document NFT 4924-2 corresponds to a vehicle title and the other data 4922 includes various vehicle data and identification data associated with the owner(s), with the vehicle and/or other data that can be used to authenticate a transaction via the authenticated document NFT 4924-2 when stored on in a wallet associated with the mobile phone or other client device.

Turning to FIG. 49D, authenticated document NFT 4924-3 corresponds to a real estate title and the other data 4922 includes various title data and identification data associated with the owner(s) and the property and/or other data that can be used to authenticate a transaction via the authenticated document NFT 4924-3 when stored on in a wallet associated with the mobile phone or other client device.

Turning to FIG. 49E, authenticated document NFT 4924-4 corresponds to a credit card and the other data 4922 includes credit and other financial data associated with the owner(s). In particular, the other data 4922 can include identification data associated with the owner(s) and any of the data accessible via the credit card chip on a chip card and/or other data that can be used to authenticate a transaction via the authenticated document NFT 4924-4 when stored on in a wallet associated with the mobile phone or other client device.

Turning to FIG. 49F, authenticated document NFT 4924-5 corresponds to a stock or bond certificate and the other data 4922 includes identification data associated with the owner(s), financial data associated with the owner(s) and the associate stocks or bonds and/or other data that can be used to authenticate a transaction via the authenticated document NFT 4924-5 when stored on in a wallet associated with the mobile phone or other client device.

Turning to FIG. 49G, authenticated document NFT 4924-6 corresponds to a gift card and the other data 4922 includes gift card balance data, redemption information and/or identification data associated with the owner(s) and/ or other data that can be used to authenticate a transaction via the authenticated document NFT 4924-6 when stored on in a wallet associated with the mobile phone or other client device.

Turning to FIG. 49H, authenticated document NFT 4924-7 corresponds to a warranty card and the other data 4922 includes warranty data, data on the warranted item redemption information, identification data associated with the owner(s) and/or other data that can be used to authenticate a transaction via the authenticated document NFT 4924-7 when stored on in a wallet associated with the mobile phone or other client device.

Turning to FIG. 49I, authenticated document NFT 4924-8 corresponds to a vaccination card and the other data 4922 includes vaccination data, other medical information and/or identification data associated with the particular patient and/or other data that can be used to authenticate a patient's vaccination status via the authenticated document NFT 4924-8 when stored on in a wallet associated with the mobile phone or other client device.

Turning to FIG. 49J, authenticated document NFT 4924-9 corresponds to a coupon and the other data 4922 includes coupon terms, redemption information and/or identification data associated with the owner(s) and/or other data that can be used to authenticate a transaction via the authenticated document NFT 4924-9 when stored on in a wallet associated with the mobile phone or other client device.

FIG. 49K presents a flowchart representation of an example method. In particular, a method 4900 is presented for use in conjunction with any of the functions and features previously described. Step 4902 includes receiving, via the processor, a document image associated with a document. Step 4904 includes receiving, via the processor, other data, wherein the other data is also associated with the document. Step 4906 includes facilitating creation of an authenticated document NFT corresponding to the document.

Turning to FIG. 49L, authenticated document NFT 4924-10 corresponds to a venue ticket and the other data 4922 includes event date and other ticket information such as section row, seat, etc. and/or identification data associated with the owner(s) and/or other data that can be used to authenticate a transaction such as event admission via the authenticated venue ticket NFT 4924-9 when stored on in a wallet associated with the mobile phone or other client device.

Turning to FIG. 49M, NFT 4924-11 corresponds to a key, such as a vehicle key, hotel key, dwelling key, office key, valet key or other key and the other data 4922 includes identification data associated with the owner(s), restriction data as to time periods, time of day, and other restrictions on use and/or other data that can be used to authenticate a transaction such as an entry via the authenticated key NFT 4924-11 when stored on in a wallet associated with the mobile phone or other client device.

FIG. 49N presents a flowchart representation of an example method. In particular, a method 4910 is presented for use in conjunction with any of the functions and features previously described. Step 4912 includes receiving, via the processor, a venue ticket image associated with a venue ticket. Step 4914 includes receiving, via the processor, other data, wherein the other data is also associated with the venue ticket. Step 4916 includes facilitating creation of an authenticated venue ticket NFT corresponding to the venue ticket.

FIG. 49O presents a flowchart representation of an example method. In particular, a method 4930 is presented for use in conjunction with any of the functions and features previously described. Step 4932 includes receiving, via the processor, a vehicle key image associated with a vehicle key. Step 4934 includes receiving, via the processor, other data, wherein the other data is also associated with the vehicle key. Step 4936 includes facilitating creation of an authenticated vehicle key NFT corresponding to the vehicle key.

FIG. 49P presents a flowchart representation of an example method. In particular, a method 4940 is presented for use in conjunction with any of the functions and features previously described. Step 4942 includes receiving, via the processor, a hotel key image associated with a hotel key. Step 4944 includes receiving, via the processor, other data, wherein the other data is also associated with the hotel key. Step 4946 includes facilitating creation of an authenticated hotel key NFT corresponding to the hotel key.

FIG. 49Q presents a flowchart representation of an example method. In particular, a method 4950 is presented for use in conjunction with any of the functions and features previously described. Step 4952 includes receiving, via the processor, a valet key image associated with a valet key. Step 4954 includes receiving, via the processor, other data, wherein the other data is also associated with the valet key. Step 4956 includes facilitating creation of an authenticated valet key NFT corresponding to the valet key.

Step 4958 includes facilitating a micro-loan transaction associated with the valet key NFT. In this fashion, for example, a valet key can be created with appropriate restrictions on use of an associated vehicle that can be micro-loaned to a valet, subject to those restrictions.

FIG. 49R presents a flowchart representation of an example method. In particular, a method 4960 is presented for use in conjunction with any of the functions and features previously described. Step 4962 includes receiving, via the processor, a dwelling key image associated with a dwelling key. Step 4964 includes receiving, via the processor, other data, wherein the other data is also associated with the dwelling key. Step 4966 includes facilitating creation of an authenticated dwelling key NFT corresponding to the dwelling key.

FIG. 49S presents a flowchart representation of an example method. In particular, a method 4970 is presented for use in conjunction with any of the functions and features previously described. Step 4972 includes receiving, via the processor, an office key image associated with an office key. Step 4974 includes receiving, via the processor, other data, wherein the other data is also associated with the office key. Step 4976 includes facilitating creation of an authenticated office key NFT corresponding to the office key.

FIG. 49T presents a flowchart representation of an example method. In particular, a method 4900-1 is presented for use in conjunction with any of the functions and features previously described. Step 4902-1 includes receiving, via the processor, a license image associated with a license. Step 4904-1 includes receiving, via the processor, other data, wherein the other data is also associated with the license. Step 4906-1 includes facilitating creation of an authenticated license NFT corresponding to the license.

FIG. 49U presents a flowchart representation of an example method. In particular, a method 4900-2 is presented for use in conjunction with any of the functions and features previously described. Step 4902-2 includes receiving, via the processor, a vehicle title image associated with a vehicle title. Step 4904-2 includes receiving, via the processor, other data, wherein the other data is also associated with the vehicle title. Step 4906-2 includes facilitating creation of an authenticated vehicle title NFT corresponding to the vehicle title.

FIG. 49V presents a flowchart representation of an example method. In particular, a method 4900-3 is presented for use in conjunction with any of the functions and features previously described. Step 4902-3 includes receiving, via the processor, a real estate title image associated with a real estate title. Step 4904-3 includes receiving, via the processor, other data, wherein the other data is also associated with the real estate title. Step 4906-3 includes facilitating creation of an authenticated real estate title NFT corresponding to the real estate title.

FIG. 49W presents a flowchart representation of an example method. In particular, a method 4900-4 is presented for use in conjunction with any of the functions and features previously described. Step 4902-4 includes receiving, via the processor, a bank card image associated with a bank card. Step 4904-4 includes receiving, via the processor, other data, wherein the other data is also associated with the bank card. Step 4906-4 includes facilitating creation of an authenticated bank card NFT corresponding to the bank card.

FIG. 49X presents a flowchart representation of an example method. In particular, a method 4900-5 is presented for use in conjunction with any of the functions and features previously described. Step 4902-5 includes receiving, via the processor, a stock certificate image associated with a stock certificate. Step 4904-5 includes receiving, via the processor, other data, wherein the other data is also associated with the stock certificate. Step 4906-5 includes facilitating creation of an authenticated stock certificate NFT corresponding to the stock certificate.

FIG. 49Y presents a flowchart representation of an example method. In particular, a method 4900-6 is presented for use in conjunction with any of the functions and features previously described. Step 4902-6 includes receiving, via the processor, a bond certificate image associated with a bond certificate. Step 4904-6 includes receiving, via the processor, other data, wherein the other data is also associated with the bond certificate. Step 4906-6 includes facilitating creation of an authenticated bond certificate NFT corresponding to the bond certificate.

FIG. 49Z presents a flowchart representation of an example method. In particular, a method 4900-7 is presented for use in conjunction with any of the functions and features previously described. Step 4902-7 includes receiving, via the processor, a gift card image associated with a gift card. Step 4904-7 includes receiving, via the processor, other data, wherein the other data is also associated with the gift card. Step 4906-7 includes facilitating creation of an authenticated gift card NFT corresponding to the gift card.

FIG. 49AA presents a flowchart representation of an example method. In particular, a method 4900-8 is presented for use in conjunction with any of the functions and features previously described. Step 4902-8 includes receiving, via the processor, a warranty card image associated with a warranty card. Step 4904-8 includes receiving, via the processor, other data, wherein the other data is also associated with the warranty card. Step 4906-8 includes facilitating creation of an authenticated warranty card NFT corresponding to the warranty card.

FIG. 49BB presents a flowchart representation of an example method. In particular, a method 4900-9 is presented for use in conjunction with any of the functions and features previously described. Step 4902-9 includes receiving, via the processor, a vaccination card image associated with a vaccination card. Step 4904-9 includes receiving, via the processor, other data, wherein the other data is also associated with the vaccination card. Step 4906-9 includes facilitating creation of an authenticated vaccination card NFT corresponding to the vaccination card.

FIG. 49CC presents a flowchart representation of an example method. In particular, a method 4900-10 is presented for use in conjunction with any of the functions and features previously described. Step 4902-10 includes receiving, via the processor, a coupon image associated with a coupon. Step 4904-10 includes receiving, via the processor, other data, wherein the other data is also associated with the coupon. Step 4906-10 includes facilitating creation of an authenticated coupon NFT corresponding to the coupon.

FIG. 50A presents a pictorial representation of an example coupon. In the example shown, a box top or other coupon 5022 includes an optical code such as the QR code that is shown that provides a link to an associated coupon NFT—such as authenticated document NFT 4924-9.

FIG. 50B presents a pictorial representation of an example client device. In the example shown, the user of the client device has scanned the QR code and collected the coupon NFT for later redemption.

While the foregoing has focused on the use of QR codes in association with the distribution of coupon NFTs, other types of NFTs can be sold and/or distributed in a similar fashion. Consider an application where a user wishes to sell, loan or otherwise distribute an NFT to another user. The other user can be provided with a physical item having a QR code such as coupon, card, or other item and/or send an electronic representation of a QR code via email, text message or other messaging the other user. Once the other user receives the QR code, they can scan the code and receive the associated NFT, for example, via a platform such as an NFT distribution platform. These types of transactions can be authenticated, for example, via any of the authentication techniques described herein.

FIG. 50C presents a flowchart representation of an example method. In particular, a method 5000 is presented for use in conjunction with any of the functions and features previously described. Step 5002 includes reading, via a client device, an optical code associated with a coupon. Step 5004 includes sending, via the client device and in response to reading the optical code, a request to download a coupon NFT associated with the coupon from an NFT distribution platform. Step 5006 includes receiving from the NFT distribution platform, via the client device, the coupon NFT associated with the coupon.

FIG. 51A presents a block diagram/flow representation of an example of NFT generation. In the example shown, coupon image data associated with a promotion 5120 and other coupon data 5122 are used to generate, via the NFT generation tools 808, coupon NFTs 5124 associated with the promotion.

Consider an example where the promotion is a market basket promotion where, as selected items are purchased, corresponding coupon NFTs can be collected. When a required number of the selected items are purchased, the collection/set of corresponding coupon NFTs can be used to trigger/unlock the acquisition of an asset or other reward such as an amount of cash, an amount of crypto currency, a limited edition NFT, a special bonus item, a game piece or other game item, a product, a purchase discount and/or other award. FIGS. 51B and 51C present two such examples of coupon NFTs 5124-1 and 5124-2 of a set of 12 such items.

FIG. 51D presents a flowchart representation of an example method. In particular, a method 5100 is presented for use in conjunction with any of the functions and features previously described. Step 5102 includes receiving, via the processor, coupon image data associated with a promotion. Step 5104 includes receiving, via the processor, other coupon data, wherein the other data is also associated with the promotion. Step 5106 includes facilitating creation of a plurality of coupon NFTs associated with the promotion.

FIGS. 52A-52B present pictorial representations of example coupons in accordance with the example promotion presented in conjunction with FIGS. 51A-51D. The coupons 5222-1 and 5222-2 are presented in association with the sale of the items "chorizo" and "tortillas" and each include links to the corresponding coupon NFTs 5124-1 and 5124-2. In various examples, the coupons could be included with the items themselves and/or printed on a receipt for each item, verifying that the item has been purchased. While shown as individual coupons and QR codes, in other examples, these can be combined with multiple items being represented by a single coupon/QR code when all or some proper subset of the items are purchased together.

FIGS. 52C-52D present pictorial representations of an example client device. In FIG. 52C, the user has purchased the tortillas and chorizo and consequently has been able to download the corresponding coupon NFTs 5124-1 and 5124-2. In FIG. 52D, all 12 coupon NFTs in the promotion have been downloaded and authenticated, facilitating the collection of the asset reward.

FIG. 52E presents a flowchart representation of an example method. In particular, a method 5200 is presented for use in conjunction with any of the functions and features previously described. Step 5202 includes reading, via a client device, via an optical code associated with a coupon. Step 5204 includes sending, via the client device and in response to reading the optical code, a request to download a coupon NFT associated with the coupon to an NFT distribution platform. Step 5206 includes receiving from the NFT distribution platform, via the client device, the coupon NFT associated with the coupon. Step 5208 includes determining when the client device has downloaded coupon NFTs associated with each coupon of the series of coupons. Step 5210 includes facilitating collection of an asset, via the client device, when the client device has downloaded coupon NFTs associated with each coupon of the series of coupons.

FIG. 53A presents a block diagram/flow representation of an example of NFT generation. In the example shown, the NFT generation tools 808 operate to review a collection of game piece NFTs 5320 of a user (e.g., a game player) associated with a game, and further to determine, based on collection criteria 5322, when the game piece NFTs of the user 5320 include an entire set of game piece NFTs associated with an enhancement. When the game piece NFTs of the user include an entire set of game piece NFTs associated with an enhancement, the NFT generation tools 808 facilitate creation of an enhancement NFT 5324 associated with the enhancement. In various examples, the enhancement is a player enhancement that can be used in the game, such as an additional power/skill of the player, an additional game piece, a level-up of the player, a level-up of one or more game pieces and/or other enhancement of the player or his/her game pieces.

Consider the examples shown in FIGS. 53B-53E where the game is a Harry Potter related game. If a player succeeds in collecting of all three of the game piece NFTs 5320-1, 5320-2 and 5320-3—corresponding to the three deadly hollows, an enhancement NFT 5324 NFT is generated, indicated that the player is now has an enhanced power in the game associated with being "the Master of Death".

FIG. 53F presents a flowchart representation of an example method. In particular, a method 5300 is presented for use in conjunction with any of the functions and features previously described. Step 5302 includes reviewing a collection of game piece NFTs of a user associated with a game. Step 5304 includes determining, based on collection criteria, when the game piece NFTs of the user include an entire set of game piece NFTs associated with an enhancement. Step 5306 includes, when the game piece NFTs of the user include an entire set of game piece NFTs associated with an enhancement, facilitating creation of an enhancement NFT associated with the enhancement.

FIG. 54A presents a block diagram/flow representation of an example of NFT generation. In the example shown, the NFT generation tools 808 operate to review a collection of game pieces 5420 of a user (e.g., a game player) associated with a game, and further to determine, based on collection criteria 5422, when the game pieces of the user 5420 include an entire set of game pieces associated with an enhancement. When the game pieces of the user include an entire set of game pieces associated with an enhancement, the NFT generation tools 808 facilitate creation of an enhancement NFT 5424 associated with the enhancement. As previously discussed, the enhancement can be a player enhancement that can be used in the game, such as an additional power/skill of the player, an additional game piece, a level-up of the player, a level-up of one or more game pieces and/or other enhancement of the player or his/her game pieces.

Consider the example shown in FIGS. 54B-54E. If a player succeeds in collecting of all three of the game pieces 5420-1, 5420-2 and 5420-3—corresponding to charcoal, sulfur and saltpeter (or saltpetre), the ingredients for gunpowder, an enhancement NFT 5424 NFT is generated, indicated that the player now possesses gunpowder in the game.

FIG. 54F presents a flowchart representation of an example method. In particular, a method 5400 is presented for use in conjunction with any of the functions and features previously described. Step 5402 includes reviewing a collection of game pieces of a user associated with a game. Step 5404 includes determining, based on collection criteria, when the game pieces of the user include an entire set of game pieces associated with an enhancement. Step 5406 includes, when the game pieces of the user include an entire set of game pieces associated with an enhancement, facilitating creation of an enhancement NFT associated with the enhancement.

FIG. 55A presents a block diagram/flow representation of an example of an NFT barter transaction. While prior examples have discussed many possible types of transactions and uses of NFTs in the example shown, the NFT marketplace tools 804 are used to facilitate a user's barter transaction where one or more bartered NFTs 5520 of the user are exchanged for one or more received NFTs 5522—such as NFTs of another user.

FIG. 55B-55C present pictorial representations of an example user interfaces. In FIG. 55B, a user is a player of Catan and has used the marketplace tools 804 to set up a possible barter of one sheep NFT 5420 for the wood and clay NFTs 5422-1 and 5422-02 of another player. In FIG. 55C, the barter has been accepted by both players and, as a result, the NFTs are exchanged, with the wallets of each player corresponding to the game being updated accordingly.

FIG. 55D presents a flowchart representation of an example method. In particular, a method 5500 is presented for use in conjunction with any of the functions and features previously described. Step 5502 includes displaying, in response to user interactions with the graphical user interface, a proposed barter transaction associated with one or more NFTs of the user to be exchanged for one or more NFTs of another user. Step 5504 includes facilitating, in response to user interactions with the graphical user interface, the proposed barter transaction.

FIG. 56A presents a block diagram/flow representation of an example of NFT generation. The NFT generation tools 808 are used to generate a derivative NFT 5624 based on an original metaverse real estate NFT 5620 and based on the enhancement data 5622.

In the example shown in FIG. 56B, an original metaverse real estate NFT 5620 corresponds to real estate having an interior room that is used in a game or metaverse application. The original metaverse real estate NFT 5620 can be purchased by the user, created or leveled-up via game play or otherwise acquired by the user of a metaverse application or game.

The NFT generation tools 808 are used to generate a derivative NFT 5624 or other metaverse real estate NFT that is based on the enhancements data 5622 shown in FIG. 56C. In the example shown the enhancements 5622-1 and 5622-2 correspond to a Moet & Chandon vending machine and a Jackson Pollock painting that are acquired either as image data or as individual NFTs. While particular enhancements are shown, other real estate enhancements can likewise be implemented including statues and other art, rugs, lamps, furniture and other furnishings and accessories, outdoor objects, appliances, knick-knacks, machinery and other virtual objects for decorating or finishing an office, home, factory, venue or other real estate. In the example shown in FIG. 56D, the user has placed the enhancements 5622-1 and 5622-2 as desired before creating the derivative NFT 5624. The derivative NFT 5624 with improvements shown can be created on a parachain or other sidechain that is different from the blockchain on which the original metaverse real estate NFT 5620 resides or the same blockchain on which the original metaverse real estate NFT 5620 resides.

FIG. 56E presents a flowchart representation of an example method. In particular, a method 5600 is presented for use in conjunction with any of the functions and features previously described. Step 5602 includes receiving, via the processor, a metaverse real estate NFT associated with metaverse real estate. Step 5604 includes receiving, via the processor, enhancement data associated with the metaverse real estate. Step 5606 includes facilitating creation of a derivative NFT associated with the metaverse real estate and having enhancements associated with metaverse real estate.

FIG. 57A presents a block diagram/flow representation of an example of NFT generation. An original metaverse real estate NFT 5720 corresponds to virtual metaverse real estate. The NFT generation tools 808 are used to generate a derivative NFT 5724 from the original metaverse real estate NFT 5720—based on one or more enhancement NFTs 5722, such as enhancement data 5622 comprising one or more NFTs.

FIG. 57B presents a flowchart representation of an example method. In particular, a method 5700 is presented for use in conjunction with any of the functions and features previously described. Step 5702 includes receiving, via the processor, a metaverse real estate NFT associated with metaverse real estate. Step 5704 includes receiving, via the processor, one or more enhancement NFTs to be associated with the metaverse real estate. Step 5706 includes facilitating creation of a derivative NFT associated with the metaverse real estate and having enhancements associated with the one or more enhancement NFTs.

FIG. 58A presents a block diagram/flow representation of an example of NFT generation. In the example shown, an original metaverse real estate NFT 5820 corresponds to a portion/plot of real estate that is used in a game or metaverse application. An example is shown in FIG. 58B. The original metaverse real estate NFT 5820 can be purchased by the user, created or leveled-up via game play or otherwise acquired by the user of a metaverse application or game.

The NFT generation tools 808 are used to generate a derivative NFT 5824 or other metaverse real estate NFT that is based on the NFT gallery data corresponding to an NFT gallery shown in FIG. 58C. In the example shown, the NFT gallery 5822 corresponds to a building or other structure with one or more individual and galleries, walls and/or rooms, such as virtual art galleries configured to display NFTs in the associated metaverse of the metaverse real estate, however, other NFT gallery configurations can likewise be implemented. In various examples, the derivative NFT 5824 with NFT gallery shown in FIG. 58D can be created on a parachain or other sidechain that is different from the blockchain on which the original metaverse real estate NFT 5820 resides or the same blockchain on which the original metaverse real estate NFT 5820 resides.

FIG. 58E presents a flowchart representation of an example method. In particular, a method 5800 is presented for use in conjunction with any of the functions and features previously described. Step 5802 includes receiving, via the processor, a metaverse real estate NFT associated with metaverse real estate. Step 5804 includes receiving, via the processor, NFT gallery data to be associated with the metaverse real estate. Step 5806 includes facilitating creation of a derivative NFT associated with the metaverse real estate and having an NFT gallery associated with metaverse real estate.

FIG. 58F presents a flowchart representation of an example method. In particular, a method 5810 is presented for use in conjunction with any of the functions and features previously described. Step 5812 includes receiving a derivative NFT associated with the metaverse real estate and having an NFT gallery associated with metaverse real estate. Step 5814 includes facilitating, via the processor, a lease of the NFT gallery associated with metaverse real estate to a leasor for display of NFTs of a leasor.

FIG. 59A presents a block diagram/flow representation of an example of NFT generation. The NFT generation tools 808 are used to generate a derivative NFT 5924 based on an original metaverse gallery NFT 5920 and based on NFTs 5922 of a user.

In the example shown in FIG. 59B, an original metaverse gallery NFT 5920 corresponds to an NFT gallery having an interior room that is used in a game or metaverse application that is configured to display NFTs of the NFT gallery owner or a leasor thereof. The original metaverse gallery NFT 5920 can be purchased or leased by the user, created or leveled-up via game play or otherwise acquired by the user of a metaverse application or game.

The NFT generation tools 808 are used to generate a derivative NFT 5924 or other metaverse gallery NFT that is based on the NFTs shown in FIG. 59C. In the example shown the NFTs 5922-1, 5922-2, 5922-3 and 5922-4 are NFTs of the user that are either selected by the user for display, or part of a curated display that is automatically generated by the NFT collection platform based, for example, on metadata included with each of the NFTs 5922. While particular NFTs are shown, other NFTs enhancements can likewise be implemented including statues, rugs, lamps, furniture and other furnishings and accessories, outdoor objects, appliances, knick-knacks, machinery and other virtual objects of art. In the example shown in FIG. 59D, the user has placed the NFTs 5922-1 through 5922-4 as desired before creating the derivative NFT 5924. The derivative NFT 5924 gallery can be created on a parachain or other sidechain that is different from the blockchain on which the original metaverse gallery NFT 5920 resides or the same blockchain on which the original metaverse gallery NFT 5920 resides. In this fashion, visitors to the metaverse can view the gallery and "see" the NFTs of the user displayed in the user, as selected or automatically curated. In various examples, the NFT gallery can be open to the metaverse public, subject to admission fees, and/or limited to the user, selected friends of the user, etc.

FIG. 59E presents a flowchart representation of an example method. In particular, a method 5900 is presented for use in conjunction with any of the functions and features previously described. Step 5902 includes receiving, via the processor, a metaverse gallery NFT associated with a metaverse gallery. Step 5904 includes receiving, via the processor, one or more NFTs to be displayed via the metaverse gallery. Step 5906 includes facilitating creation of a derivative NFT associated with the metaverse gallery displaying the one or more NFTs.

FIG. 60A presents a block diagram of an example system. In particular, a system is shown that can be implemented similarly to, or in conjunction with, NFT collection platform 800. The system includes an NFT transaction authenticator 6022 and a secure real-time NFT metadata repository 6024. In various examples, the NFT transaction authenticator 6022 and the secure real-time NFT metadata repository 6024 can be implemented via one or more modules that include a network interface, processing circuitry and memory. The secure real-time NFT metadata repository 6024 stores NFT metadata received in conjunction with NFTs created via metadata source 6026, such as one or more NFT creation systems 824. The NFTs are associated with one or more users 6020.

In operation, the NFT transaction authenticator 6022 responds to transaction requests from a user associated with an NFT to authenticate the NFT and the user and to otherwise determine the validity of the transaction that is requested. If the user and the NFT are both authenticated, and the requested transaction is otherwise permissible (e.g. not restricted by conditions on use or other transaction restrictions), then the NFT transaction authenticator 6022 responds by issuing credentials to facilitate the transaction with a third party 6028. As will be discussed herein, the maintenance and use of the secure real-time NFT metadata repository 6024 allows authentication of NFT related transactions in real-time—avoiding possible delays in performing, for example, complex blockchain transactions via an NFT source 6026 where the NFT was minted and/or otherwise maintained.

Consider the following example where an NFT is created via NFT source 6026. In addition to other NFT data, the NFT has metadata that uniquely identifies the NFT, a hash or other NFT authentication metadata that can be used to authenticate the NFT and/or transaction restriction metadata indicating possible restrictions on transactions/use conditions involving the NFT. Furthermore, when the NFT is created and/or acquired by a user, user-specific user authentication metadata is acquired or created and stored on the blockchain with the NFT with the other metadata. This user authentication metadata can include one or more passwords, answers to security questions, identifiers of recognized devices such as a device identifier of a personal cellphone, laptop, tablet, computer or other known and/or trusted device, one or more trusted networks of the user, other multifactor authentication data such as personal information, known answers to security questions, biometric data related to fingerprints, retinal scans, facial features or other biometrics of the user and/or other user authentication data that can be used to determine if a user is the owner of the NFT or otherwise an authorized user and in particular, whether or not the user is (or is not) who they claim to be.

The metadata associated with the NFT is indexed by NFT identifier and stored on the secure real-time NFT metadata repository 6024 for use by the NFT transaction authenticator 6022 in authenticating NFT-related transactions. This metadata is available from the repository on a real-time basis (e.g., is available with an acceptable amount of latency associated with a corresponding transaction). The metadata in the secure real-time NFT metadata repository 6024 is also synced periodically with the NFT via the NFT source 6026 to reflect any changes in the NFT itself. While some metadata, such as an NFT identifier, NFT authentication metadata and/or transaction restriction metadata may be made accessible to the user who holds the NFT, in various examples, the user authentication metadata in particular, can be encrypted in such a fashion that is decryptable by the secure real-time NFT metadata repository 6024— but not by the user. In various examples, the secure real-time NFT metadata repository 6024 lacks a general network connection and is connected to the NFT transaction authenticator 6022 via a dedicated and/or otherwise secured connection or is otherwise walled-off from other network connections of the NFT transaction authenticator 6022. This helps prevent unauthorized tampering with the sensitive data stored therein.

When a user 6020 proposes an NFT-related transaction, the NFT transaction authenticator 6022 collects from the user as part of the transaction request (a) an identifier of the NFT, and NFT authentication data corresponding to the NFT (b) user authentication data user, and (c) information on the proposed transaction. The NFT transaction authenticator 6022 determines whether or not the identifier corresponds to a valid NFT. If so, it retrieves the metadata associated with the NFT from secure real-time NFT metadata repository 6024. The NFT transaction authenticator 6022 authenticates the NFT by comparing the NFT authentication data to the NFT authentication metadata to determine if they match. The NFT transaction authenticator 6022 can also authenticate the user 6020 to the NFT by comparing the user authentication data to the user authentication metadata to determine if they match. If authentication succeeds, the NFT transaction authenticator 6022 facilitates the transaction with the third party 6028 by authorizing completion of the transaction, e.g. by issuing a credential to the third party 6028. The credential can include any message, object, or data structure that vouches for the identity of the user, the authenticity of the NFT and/or the validity of the transaction, through some method of security, trust and/or authentication.

In this fashion, the NFT transaction authenticator 6022 can authenticate transactions such as access to a flight via a driver's license or passport NFT, sale of a vehicle, real estate via a title NFT, a credit, debit or gift card transaction via a credit, debit or gift card NFT, the sale of a stock or bond via a stock or bond certificate NFT, warranty transactions via a warranty card NFT, access to events via venue ticket NFTs and/or vaccination card NFTs, coupon redemption via a coupon NFT, access to a vehicle, dwelling or office via a key NFT, etc. Furthermore, the NFT transaction authenticator 6022 can authenticate transactions such as sales and/or micro-loans of NFTs itself.

It should be noted that some NFTs are conditional, e.g. that have restrictions on their use and/or the transactions that are permitted. Depending on the type of transaction, the NFT transaction authenticator 6022 can also operate to compare transaction data received from the user to transaction restrictions metadata to determine if a transaction is permitted—before it is authorized. In this fashion, a credit, debit or gift card transaction can be halted if an expiration date or transaction limit has been exceeded. A warranty transaction can be halted if the warranty has expired. A key access for a pool, gym or office can be halted based on date, day of week or time of day restrictions, etc.

Furthermore, in sales transactions and/or micro-loans that have been authorized, the NFT transaction authenticator 6022 can also operate to note the pending sale or micro-loan in the secure real-time NFT metadata repository 6024 or otherwise place a hold on the NFT to prevent another sales or micro-loan until the repository is updated in a future sync with the NFT source 6026. Furthermore, in some cases the NFT corresponds to an expendable asset such as a venue ticket, gift card, coupon, etc. The NFT transaction authenticator 6022 can also operate to determine that the NFT is expended, based on the transaction restrictions metadata and the transaction data. In response to such a determination, NFT transaction authenticator 6022 can then update the secure real-time NFT metadata repository to indicate the NFT is expended. In any of these cases above, the secure real-time NFT metadata repository may facilitate updating of the NFT source 6026 to reflect an authorized transaction via notifications and/or that an NFT has been expended.

FIG. 60B presents a flowchart representation of an example method. In particular, a method 6000-1 is presented for use in conjunction with any of the functions and features previously described. Step 6002-1 includes receiving, at the processor, NFT metadata associated with a plurality of NFTs minted via one or more blockchain systems, the NFT metadata including NFT identification metadata for identifying an NFT of the plurality of NFTs, NFT authentication metadata for authenticating the NFT of the plurality of NFTs, and user authentication metadata for authenticating an authorized user of the NFT of the plurality of plurality of NFTs. Step 6004-1 includes storing the NFT metadata in a secure real-time NFT repository, wherein the secure real-time NFT repository is separate from the one or more blockchain systems. Step 6006-1 includes facilitating, via the secure real-time NFT repository, real time authentication for transactions associated with ones of the plurality of NFTs.

FIG. 60C presents a flowchart representation of an example method. In particular, a method 6000-2 is presented for use in conjunction with any of the functions and features previously described. Step 6002-2 includes receiving, at the processor, NFT metadata associated with a plurality of NFTs minted via one or more blockchain systems, the NFT metadata including NFT identification metadata for identifying an NFT of the plurality of NFTs, NFT authentication metadata for authenticating the NFT of the plurality of NFTs, user authentication metadata for authenticating an authorized user of the NFT of the plurality of plurality of NFTs, and transaction restriction metadata associated with transaction restrictions. Step 6004-2 includes storing the NFT metadata in a secure real-time NFT repository, wherein the secure real-time NFT repository is separate from the one or more blockchain systems. Step 6006-2 includes facilitating, via the secure real-time NFT repository, real time authentication for transactions associated with ones of the plurality of NFTs.

FIG. 60D presents a flowchart representation of an example method. In particular, a method 6000-3 is presented for use in conjunction with any of the functions and features previously described. Step 6002-3 includes receiving, at the processor, a transaction request from a user associated with an NFT minted via a blockchain, wherein the transaction request includes NFT identification data identifying the NFT, NFT authentication data and user identification data. Step 6004-3 includes receiving, from a secure real-time NFT metadata repository and in response to the NFT identification data, NFT authentication metadata for authenticating the NFT and user authentication metadata for authenticating an authorized user of the NFT, wherein the secure real-time NFT metadata repository is separate from the blockchain.

Step 6006-3 includes determining, via the processor, that the NFT is authenticated when the NFT authentication data compares favorably to the NFT authentication metadata. Step 6008-4 includes determining, via the processor, that the user is authenticated when the user authentication metadata compares favorably to the user identification data. Step 6010-3 includes generating credentials data to facilitate the transaction when the NFT is authenticated and the user is authenticated.

FIG. 60E presents a flowchart representation of an example method. In particular, a method 6000-4 is presented for use in conjunction with any of the functions and features previously described. Step 6002-4 includes receiving, at the processor, a transaction request from a user associated with an NFT minted via a blockchain, wherein the transaction request includes NFT identification data identifying the NFT, NFT authentication data, user identification data and transaction data associated with the transaction. Step 6004-4 includes receiving, from a secure real-time NFT metadata repository and in response to the NFT identification data, NFT authentication metadata for authenticating the NFT, user authentication metadata for authenticating an authorized user of the NFT, and transaction restrictions data associated with the NFT, wherein the secure real-time NFT metadata repository is separate from the blockchain.

Step 6006-4 includes determining, via the processor, that the NFT is authenticated when the NFT authentication data compares favorably to the NFT authentication metadata. Step 6008-4 includes determining, via the processor, that the user is authenticated when the user authentication metadata compares favorably to the user identification data. Step 6010-4 includes determining, via the processor, that the transaction is authorized when the transaction restrictions metadata compares favorably to the transaction data. Step 6012-4 includes generating credentials data to facilitate the transaction when the NFT is authenticated, the user is authenticated and the transaction is authorized.

FIG. 60F presents a flowchart representation of an example method. In particular, a method 6000-5 is presented for use in conjunction with any of the functions and features previously described. Step 6002-5 includes receiving, at the processor, a transaction request from a user associated with an NFT minted via a blockchain, wherein the transaction request includes NFT identification data identifying the NFT, NFT authentication data, user identification data and transaction data associated with the transaction, wherein the NFT is a conditional NFT having conditions on use. Step 6004-5 includes receiving, from a secure real-time NFT metadata repository and in response to the NFT identification data, NFT authentication metadata for authenticating the NFT, user authentication metadata for authenticating an authorized user of the NFT, and transaction restrictions data associated with the NFT indicating the conditions on use, wherein the secure real-time NFT metadata repository is separate from the blockchain.

Step 6006-5 includes determining, via the processor, that the NFT is authenticated when the NFT authentication data compares favorably to the NFT authentication metadata.

Step 6008-5 includes determining, via the processor, that the user is authenticated when the user authentication metadata compares favorably to the user identification data. Step 6010-5 includes determining, via the processor, that the transaction is authorized when the transaction restrictions metadata compares favorably to the transaction data. Step 6012-5 includes generating credentials data to facilitate the transaction when the NFT is authenticated, the user is authenticated and the transaction is authorized.

FIG. 60G presents a flowchart representation of an example method. In particular, a method 6000-6 is presented for use in conjunction with any of the functions and features previously described. Step 6002-6 includes receiving, at the processor, a transaction request from a user associated with an NFT minted via a blockchain, wherein the transaction request includes NFT identification data identifying the NFT, NFT authentication data, user identification data and transaction data indicating that the transaction corresponds to a sale. Step 6004-6 includes receiving, from a secure real-time NFT metadata repository and in response to the NFT identification data, NFT authentication metadata for authenticating the NFT and user authentication metadata for authenticating an authorized user of the NFT, wherein the secure real-time NFT metadata repository is separate from the blockchain.

Step 6006-6 includes determining, via the processor, that the NFT is authenticated when the NFT authentication data compares favorably to the NFT authentication metadata. Step 6008-6 includes determining, via the processor, that the user is authenticated when the user authentication metadata compares favorably to the user identification data. Step 6010-6 includes generating credentials data to facilitate the transaction when the NFT is authenticated and the user is authenticated. Step 6012-6 includes updating the secure real-time NFT metadata repository to indicate the pending sale.

FIG. 60H presents a flowchart representation of an example method. In particular, a method 6000-7 is presented for use in conjunction with any of the functions and features previously described. Step 6002-7 includes receiving, at the processor, a transaction request from a user associated with an NFT minted via a blockchain, wherein the transaction request includes NFT identification data identifying the NFT, NFT authentication data, user identification data and transaction data indicating that the transaction corresponds to a sale of the NFT. Step 6004-7 includes receiving, from a secure real-time NFT metadata repository and in response to the NFT identification data, NFT authentication metadata for authenticating the NFT and user authentication metadata for authenticating an authorized user of the NFT, wherein the secure real-time NFT metadata repository is separate from the blockchain.

Step 6006-7 includes determining, via the processor, that the NFT is authenticated when the NFT authentication data compares favorably to the NFT authentication metadata. Step 6008-7 includes determining, via the processor, that the user is authenticated when the user authentication metadata compares favorably to the user identification data. Step 6010-7 includes generating credentials data to facilitate the transaction when the NFT is authenticated and the user is authenticated. Step 6012-7 includes updating the secure real-time NFT metadata repository to indicate the pending sale of the NFT.

FIG. 60I presents a flowchart representation of an example method. In particular, a method 6000-8 is presented for use in conjunction with any of the functions and features previously described. Step 6002-8 includes receiving, at the processor, a transaction request from a user associated with an NFT minted via a blockchain, wherein the transaction request includes NFT identification data identifying the NFT, NFT authentication data, user identification data and transaction data indicating that the transaction corresponds to a micro-loan of the NFT. Step 6004-8 includes receiving, from a secure real-time NFT metadata repository and in response to the NFT identification data, NFT authentication metadata for authenticating the NFT and user authentication metadata for authenticating an authorized user of the NFT, wherein the secure real-time NFT metadata repository is separate from the blockchain.

Step 6006-8 includes determining, via the processor, that the NFT is authenticated when the NFT authentication data compares favorably to the NFT authentication metadata. Step 6008-8 includes determining, via the processor, that the user is authenticated when the user authentication metadata compares favorably to the user identification data. Step 6010-8 includes generating credentials data to facilitate the transaction when the NFT is authenticated and the user is authenticated. Step 6012-8 includes updating the secure real-time NFT metadata repository to indicate the micro-loan of the NFT.

FIG. 60J presents a flowchart representation of an example method. In particular, a method 6000-9 is presented for use in conjunction with any of the functions and features previously described. Step 6002-9 includes receiving, at the processor, a transaction request from a user associated with an NFT minted via a blockchain, wherein the transaction request includes NFT identification data identifying the NFT, NFT authentication data, user identification data and transaction data associated with the transaction. Step 6004-9 includes receiving, from a secure real-time NFT metadata repository and in response to the NFT identification data, NFT authentication metadata for authenticating the NFT, user authentication metadata for authenticating an authorized user of the NFT, and transaction restrictions data associated with the NFT, wherein the secure real-time NFT metadata repository is separate from the blockchain.

Step 6006-9 includes determining, via the processor, that the NFT is authenticated when the NFT authentication data compares favorably to the NFT authentication metadata. Step 6008-9 includes determining, via the processor, that the user is authenticated when the user authentication metadata compares favorably to the user identification data. Step 6010-9 includes generating credentials data to facilitate the transaction when the NFT is authenticated and the user is authenticated. Step 6012-9 includes determining, via the processor, that the NFT is expended, based on the transaction restrictions metadata and the transaction data and, in response, updating the secure real-time NFT metadata repository to indicate the NFT is expended.

FIG. 60K presents a pictorial block diagram/flow representation of an example of transaction authentication. A client device, such as client device 825, presents a screen display 6050 indicating that a particular NFT has been selected in conjunction with a proposed transaction. In the example shown, the user has chosen to redeem a venue ticket for admission into an event venue for a corresponding event. The user then identifies himself/herself to the client device via biometrics such as fingerprints, facial recognition, retinal scan and/or other biometrics and/or other authentication data. When the user is positively identified, as indicated in display screen 6052, the client device forwards the transaction request 6054-1 to the NFT transaction authenticator 6022. In this case, the transaction request 6054-1 includes NFT identification data identifying the NFT, NFT authentication data, and also user identification data that includes a user device identifier.

The NFT transaction authenticator 6022 can operate in conjunction with the secure real-time NFT metadata repository 6024 for example, to authenticate the transaction with the third party 6028. In this case, the user authentication mechanisms of the client device are used in the transaction of the authentication process. Once the user is identified by a trusted device, only the identification of the trusted device is required as user authentication data forwarded as part of the request.

FIG. 60L presents a pictorial block diagram/flow representation of a further example of transaction authentication. In this case, the transaction request 6054-2 includes NFT identification data identifying the NFT, NFT authentication data, and also user identification data that includes user biometric data that was collected via the client device 825 as part of its own user authentication process.

Again, the NFT transaction authenticator 6022 can operate in conjunction with the secure real-time NFT metadata repository 6024 for example, to authenticate the transaction with the third party 6028. In this case, the user authentication mechanisms of the client device are again used in the transaction of the authentication process. Once the user biometric data is collected, it is forwarded as part of the request for use in authenticating the user—without the need for identification of the device itself.

FIG. 62M presents a pictorial block diagram/flow representation of a further example of transaction authentication. In this case, the transaction request 6054-1 includes NFT identification data identifying the NFT, NFT authentication data, and also user identification data that includes both a user device identifier and user biometric data that was collected via the client device 825 as part of its own user authentication process.

Again, the NFT transaction authenticator 6022 can operate in conjunction with the secure real-time NFT metadata repository 6024 for example, to authenticate the transaction with the third party 6028. In this additional case, the user authentication mechanisms of the client device are used in the transaction of the authentication process. Once the user is identified by a trusted device, the device identifier of the trusted device can be in combination with the user biometrics collected by that device to provide further security for the proposed transaction.

FIG. 60N presents a flowchart representation of an example method. In particular, a method 6000-10 is presented for use in conjunction with any of the functions and features previously described. Step 6002-10 includes receiving, at the processor, a transaction request from a user associated with an NFT minted via a blockchain, wherein the transaction request includes NFT identification data identifying the NFT, NFT authentication data and user identification data that includes a user device identifier. Step 6004-10 includes receiving, from a secure real-time NFT metadata repository and in response to the NFT identification data, NFT authentication metadata for authenticating the NFT and user authentication metadata for authenticating an authorized user of the NFT, wherein the secure real-time NFT metadata repository is separate from the blockchain.

Step 6006-10 includes determining, via the processor, that the NFT is authenticated when the NFT authentication data compares favorably to the NFT authentication metadata. Step 6008-10 includes determining, via the processor, that the user is authenticated when the user authentication metadata compares favorably to the user identification data. Step 6010-10 includes generating credentials data to facilitate the transaction when the NFT is authenticated and the user is authenticated.

FIG. 60O presents a flowchart representation of an example method. In particular, a method 6000-11 is presented for use in conjunction with any of the functions and features previously described. Step 6002-11 includes receiving, at the processor, a transaction request from a user associated with an NFT minted via a blockchain, wherein the transaction request includes NFT identification data identifying the NFT, NFT authentication data and user identification data that includes user biometric data. Step 6004-11 includes receiving, from a secure real-time NFT metadata repository and in response to the NFT identification data, NFT authentication metadata for authenticating the NFT and user authentication metadata for authenticating an authorized user of the NFT, wherein the secure real-time NFT metadata repository is separate from the blockchain.

Step 6006-11 includes determining, via the processor, that the NFT is authenticated when the NFT authentication data compares favorably to the NFT authentication metadata. Step 6008-11 includes determining, via the processor, that the user is authenticated when the user authentication metadata compares favorably to the user identification data. Step 6010-11 includes generating credentials data to facilitate the transaction when the NFT is authenticated and the user is authenticated.

FIG. 60P presents a flowchart representation of an example method. In particular, a method 6000-12 is presented for use in conjunction with any of the functions and features previously described. Step 6002-12 includes receiving, at the processor, a transaction request from a user associated with an NFT minted via a blockchain, wherein the transaction request includes NFT identification data identifying the NFT, NFT authentication data and user identification data that includes a user device identifier and user biometric data. Step 6004-12 includes receiving, from a secure real-time NFT metadata repository and in response to the NFT identification data, NFT authentication metadata for authenticating the NFT and user authentication metadata for authenticating an authorized user of the NFT, wherein the secure real-time NFT metadata repository is separate from the blockchain.

Step 6006-12 includes determining, via the processor, that the NFT is authenticated when the NFT authentication data compares favorably to the NFT authentication metadata. Step 6008-12 includes determining, via the processor, that the user is authenticated when the user authentication metadata compares favorably to the user identification data. Step 6010-12 includes generating credentials data to facilitate the transaction when the NFT is authenticated and the user is authenticated.

FIG. 61A presents a block diagram/flow representation of an example of NFT generation. In the example shown, NFT generation tools 808 are used to facilitate the generation of NFT 6122, based display data 6120 and other data 1504. The display data 6120 can be derived from an original NFT, generated specifically for the purpose of generating NFT 6122, can be a stream of data such as display data 1502-12 that presents an abstract visualization, and/or other display data 1502, either static or streaming. In various examples, the other data 1504 can include metadata, restrictions/conditions, derivative series data or other data regarding generation of a series/set of NFTs that include NFT 6122 and furthermore includes data that indicates a fractional benefit in a particular asset.

In various examples, the particular asset can be blockchain node such as blockchain node 4325 or other node used as either a main or side chain in minting and/or securing a cryptocurrency transaction, an NFT transaction, etc. The particular asset can also be a section of real estate and/or mineral rights such as oil/gas rights, mining rights or other mineral rights. The particular asset can also be collectable or a commodity. The particular asset can also be an intellectual property right such as a patent, patent application, trademark, service mark, a copyright in music, art, literature, film or other video, software, database and/or other media, or a trade secret, etc. The particular asset can also be a financial instrument such as a stock, bond, commodity contract, futures contract, annuity, insurance policy, a mortgage or loan, and/or other financial instrument. The particular asset can also be an interest or right in a public or private company or a membership associated with a business enterprise. In various examples, the fractional benefit can correspond to a fraction of a total benefit such as rights of ownership, royalties, earnings, dividends, revenue and other earnings, profits, rental receipts, lease payments, loan payments, balloon payments, debt collections, treasure finds, bonuses, contingency fees, conditional payments, rewards, and other benefits, financial or otherwise.

Consider an example where the asset is an original work of art by Oscar-Claude Monet. The price of the artwork would be impossible for most people to afford. The asset could be expected to appreciate in value at above-market rates, given its rarity. In one example, the artwork is acquired and some number of NFT's (a set or series of 10,000 derivative NFTs, for example) are generated, each representing a fractional share of the work (and/or benefits therefrom) in inverse proportion to the number of NFTs in the series. These NFT's could be sold, traded and bartered, and eventually be redeemed by the then current NFT owners in the event of a sale of the artwork. Not only can the NFT provide a tangible and/or digital representation of the fractional rights in the holder/owner of the NFT, but the NFT can facilitate a marketplace for the owner's interest with authentication of the NFT, authentication of the owner and/or the owner's rights in the event of a transfer, sale or other transaction involving the NFT.

In various embodiments, the fractional rights in the assets can be conditional. For example, the NFT must be held for a certain length of time, the rights pertain to future earnings that begin after a beginning date or that terminate after a termination date, etc. Redemption, if any, can be automatically triggered based on a sale of the asset, a change in control, a date certain such as a predetermined redemption date, and/or the occurrence of one or more other conditions. Upon redemption, the NFT can be turned in or retained but the NFT no longer enjoying the factional benefits in the asset and having only NFT collectors value. In a further example, a different redemption NFT is generated and given to the owner of the redeemed NFT.

Consider a further example, where the asset is an Ethereum node or other blockchain node that generates earnings based on the transactions that are processed using the node. The node is acquired and some number of NFT's (10,000 for example) are generated, each representing a 1-10,000$^{th}$ share of the earnings from the node and/or the value of the node itself. These NFT's could be sold, traded and bartered, and eventually be redeemed by the then current NFT owners in the event of a sale of the node, a distribution of earnings, or other revenue transaction.

FIGS. 61B-61M present pictorial representations of example NFTs 6122. In FIG. 61B, an NFT represents a fractional interest in an Ethereum node. Furthermore, the NFT includes a streaming display of display data, such as display data 1502-12 that provides an abstract visualization of the operation of the node. In FIG. 61C, an NFT represents a fractional interest in an oil lease. In FIG. 61D, an NFT represents a fractional interest in a round A funding of a company. In FIG. 61E, an NFT represents a fractional interest in a rare automobile. In FIG. 61F, an NFT represents a fractional interest in a Monet.

In FIG. 61G, an NFT represents a fractional interest in a patent. In FIG. 61H, an NFT represents a fractional interest in a feature length film. In FIG. 61I, an NFT represents a fractional interest in a rare original NFT. In FIG. 61J, an NFT represents a fractional interest in a literary work, in this case a poem. In FIG. 61K, an NFT represents a fractional interest in a Stradivarius violin. In FIG. 61L, an NFT represents a fractional interest in a financial instrument, in this case an annuity. In FIG. 61M, an NFT represents a fractional interest in a commodity, in this case an amount of gold.

FIG. 61N presents a pictorial diagram/flow representation of an example of NFT redemption. In this case an NFT 6122-1 represents a fractional interest in an Ethereum node. The NFT 6122-1 includes a streaming display of display data, such as display data 1502-12 that provides an abstract visualization of the operation of the node. Upon redemption of the NFT 6122-1 due to a triggering event, the redeeming owner receives a legacy NFT 6122-2, that is static with a fixed image—without the streaming visualization display.

FIG. 61O presents a flowchart representation of an example method. In particular, a method 6100-1 is presented for use in conjunction with any of the functions and features previously described. Step 6102-1 includes receiving, via the processor, display data to be associated with a series of NFTs. Step 6104-1 includes receiving, via the processor, other data to be associated with the series of NFTs, wherein the other data includes data that indicates a fractional benefit in a particular asset. Step 6106-1 includes facilitating, via the processor and based on the display data and the other data, generation of the series of NFTs, each representing the fractional benefit in the particular asset.

FIG. 61P presents a flowchart representation of an example method. In particular, a method 6100-2 is presented for use in conjunction with any of the functions and features previously described. Step 6102-2 includes receiving, via the processor, display data to be associated with a series of NFTs. Step 6104-2 includes receiving, via the processor, other data to be associated with the series of NFTs, wherein the other data includes data that indicates a fractional benefit in a blockchain node. Step 6106-1 includes facilitating, via the processor and based on the display data and the other data, generation of the series of NFTs, each representing the fractional benefit in the blockchain node.

FIG. 61Q presents a flowchart representation of an example method. In particular, a method 6100-3 is presented for use in conjunction with any of the functions and features previously described. Step 6102-3 includes receiving, via the processor, display data to be associated with a series of NFTs. Step 6104-3 includes receiving, via the processor, other data to be associated with the series of NFTs, wherein the other data includes data that indicates a fractional benefit in real estate. Step 6106-3 includes facilitating, via the processor and based on the display data and the other data, generation of the series of NFTs, each representing the fractional benefit in the real estate.

FIG. 61R presents a flowchart representation of an example method. In particular, a method 6100-4 is presented for use in conjunction with any of the functions and features previously described. Step 6102-4 includes receiving, via the processor, display data to be associated with a series of NFTs. Step 6104-4 includes receiving, via the processor, other data to be associated with the series of NFTs, wherein the other data includes data that indicates a fractional benefit in a mineral right. Step 6106-4 includes facilitating, via the processor and based on the display data and the other data, generation of the series of NFTs, each representing the fractional benefit in the mineral right.

FIG. 61S presents a flowchart representation of an example method. In particular, a method 6100-5 is presented for use in conjunction with any of the functions and features previously described. Step 6102-5 includes receiving, via the processor, display data to be associated with a series of NFTs. Step 6104-5 includes receiving, via the processor, other data to be associated with the series of NFTs, wherein the other data includes data that indicates a fractional benefit in a collectable. Step 6106-5 includes facilitating, via the processor and based on the display data and the other data, generation of the series of NFTs, each representing the fractional benefit in the collectable.

FIG. 61T presents a flowchart representation of an example method. In particular, a method 6100-6 is presented for use in conjunction with any of the functions and features previously described. Step 6102-6 includes receiving, via the processor, display data to be associated with a series of NFTs. Step 6104-6 includes receiving, via the processor, other data to be associated with the series of NFTs, wherein the other data includes data that indicates a fractional benefit in a company. Step 6106-6 includes facilitating, via the processor and based on the display data and the other data, generation of the series of NFTs, each representing the fractional benefit in the company.

FIG. 61U presents a flowchart representation of an example method. In particular, a method 6100-7 is presented for use in conjunction with any of the functions and features previously described. Step 6102-7 includes receiving, via the processor, display data to be associated with a series of NFTs. Step 6104-7 includes receiving, via the processor, other data to be associated with the series of NFTs, wherein the other data includes data that indicates a fractional benefit in an intellectual property right. Step 6106-7 includes facilitating, via the processor and based on the display data and the other data, generation of the series of NFTs, each representing the fractional benefit in the intellectual property right.

FIG. 61V presents a flowchart representation of an example method. In particular, a method 6100-8 is presented for use in conjunction with any of the functions and features previously described. Step 6102-8 includes receiving, via the processor, display data to be associated with a series of NFTs. Step 6104-8 includes receiving, via the processor, other data to be associated with the series of NFTs, wherein the other data includes data that indicates a fractional benefit in a financial instrument. Step 6106-8 includes facilitating, via the processor and based on the display data and the other data, generation of the series of NFTs, each representing the fractional benefit in the financial instrument.

FIG. 61W presents a flowchart representation of an example method. In particular, a method 6100-9 is presented for use in conjunction with any of the functions and features previously described. Step 6102-9 includes receiving, via the processor, display data to be associated with a series of NFTs. Step 6104-9 includes receiving, via the processor, other data to be associated with the series of NFTs, wherein the other data includes data that indicates a fractional benefit in a commodity. Step 6106-9 includes facilitating, via the processor and based on the display data and the other data, generation of the series of NFTs, each representing the fractional benefit in the commodity.

FIG. 61X presents a flowchart representation of an example method. In particular, a method 6100-10 is presented for use in conjunction with any of the functions and features previously described. Step 6102-10 includes receiving, via the processor, display data to be associated with a series of NFTs. Step 6104-10 includes receiving, via the processor, other data to be associated with the series of NFTs, wherein the other data includes data that indicates a fractional benefit in a membership. Step 6106-10 includes facilitating, via the processor and based on the display data and the other data, generation of the series of NFTs, each representing the fractional benefit in the membership.

In FIG. 61Y, an NFT represents a fractional interest in the benefits from a game, such as an online game, a game for a mobile device, a video game, board game, metaverse or other game. In various examples, the interest/benefit entitles the holder to a fraction interest in sales of the game itself, to ad revenue and/or other benefits. In various examples, these benefits are only a fractional interest in the sales and/or ad revenue and are not tied to a particular game piece or game pieces of the game, the use of the game pieces by others and are completely independent of the NFT holder's play of the game.

FIG. 61Z presents a flowchart representation of an example method. In particular, a method 6100-11 is presented for use in conjunction with any of the functions and features previously described. Step 6102-11 includes receiving, via the processor, display data to be associated with a series of NFTs. Step 6104-11 includes receiving, via the processor, other data to be associated with the series of NFTs, wherein the other data includes data that indicates a fractional benefit in a game. Step 6106-11 includes facilitating, via the processor and based on the display data and the other data, generation of the series of NFTs, each representing the fractional benefit in the game.

In FIG. 61AA, an NFT represents benefits from a sports franchise. The benefits can be the status as a commemorative shareholder, guaranteed admission to a commemorative shareholder meeting and/or other events, entitlement to certain items of sports merchandise or other swag.

FIG. 61BB presents a flowchart representation of an example method. In particular, a method 6100-12 is presented for use in conjunction with any of the functions and features previously described. Step 6102-12 includes receiving, via the processor, display data to be associated with a series of NFTs. Step 6104-12 includes receiving, via the processor, other data to be associated with the series of NFTs, wherein the other data includes data that indicates a benefit in a sports franchise. Step 6106-12 includes facilitating, via the processor and based on the display data and the other data, generation of the series of NFTs, each representing the benefit in the sports franchise.

In FIG. 61CC, an NFT represents a donation. The donation can be to a charitable organization or other group and the NFT can include metadata that indicates donation information such as the tax year, type of donation, donor information identifying the donor(s) associated with the donation, the donation amount associated with donation, and/or other information.

In the example shown, a donor has donated to Heifer International at the one Water Buffalo level and a corresponding NFT has been issued to the donor. The NFT may be issued, for example, only when the dollar value of the donation exceeds some threshold value. The NFT can commemorate the donation and furthermore can be used to verify the donation to tax authorities (as may be required based on its sufficiently high dollar value), and may for example, entitle the donor to other subsidiary benefits associated the donation, such as access and/or free drinks at donor events, access to a special donor lounge, partner benefits associated with the charity's partners, etc.

FIG. 61DD presents a flowchart representation of an example method. In particular, a method 6100-13 is presented for use in conjunction with any of the functions and features previously described. Step 6102-13 includes receiving, via the processor, display data to be associated with an NFT representing a donation. Step 6104-13 includes receiving, via the processor, other data to be associated with the NFT representing the donation, wherein the other data includes donor information associated with the donation, and a donation amount associated with the donation. Step 6106-13 includes facilitating, via the processor and based on the display data and the other data, generation of the NFT representing the donation.

In FIG. 62A, an NFT includes a playable version of an electronic game (or more simply, a "game"), such as an online game, cloud-based game, a game application for a mobile device, a video game playable on a game console or personal computer and this is rendered on a streaming platform, in the cloud, or locally at the client device itself. The electronic game can be a metaverse game or other metaverse experience, a single player game, a multiplayer game, an action/adventure game, a real-time strategy game, a shooter game, a multiplayer online battle arena, a role-playing game, simulation or sports game, a puzzle, party game and/or other game.

In various examples, the NFT includes playable game data such as graphics files, game status information, executable code or other instructions that operate in conjunction with a platform and/or a client device to execute the play of the game itself. Furthermore, the NFT may include authentication data with respect to a user that "owns" the game NFT and this particular copy of the game and entitles the user or other holder of the NFT to play the game and other metadata and other data as discussed herein. In the example shown, the game NFT includes metadata that indicates that this copy corresponds to a special collector's edition of the game and, in particular, one of a limited series release of NFTs corresponding to one of the first 10,000 copies of the game and/or game NFT.

While described above as a "game NFT", such an NFT can have any of the metadata, other data, and/or operate similarly to any of the other types of NFTs corresponding to videos, images, documents, game pieces, game characters, metaverse features, and/or other objects, etc. that are described herein.

FIG. 62B presents a flowchart representation of an example method. In particular, a method 6200-1 is presented for use in conjunction with any of the functions and features previously described. Step 6202-1 includes receiving, via the processor, playable game data associated with an electronic game to be associated with a series of NFTs. Step 6204-1 includes receiving, via the processor, other data to be associated with the series of NFTs. Step 6206-1 includes facilitating, via the processor and based on the playable game data and the other data, generation of the series of NFTs, each of the series of NFTs comprising a playable instance of the electronic game.

FIG. 62C presents a pictorial representation of an example screen display. In the example shown, a user of an NFT game platform has accessed, via a client device associated with the user such as client device 825, a plurality of game NFTs associated with the user. The NFT game platform can be implemented via NFT collection platform 800, NFT distribution platform 2800, and/or other NFT platform that can include or operate in conjunction with NFT transaction authenticator 6022, NFT source 6026, secure real-time NFT metadata repository 6024, NFT wallet system 820, NFT marketplace 822, NFT creation system 824, and/or other tools, devices and systems described herein.

In this case, the user's collection of game NFTs includes NFTs 4150-1, 4150-2, 4150-3, and 4150-4, etc. In various embodiments the collection display can be arranged by the user or automatically sorted into categories such as genre's or other groupings based on metadata associated with each of the NFTs.

In the screen display shown, the platform has generated display data associated with a customized collection display that contains the plurality of game NFTs for display via a graphical user interface associated with the client device. Furthermore, the user has interacted with the graphical user interface and indicated a selection of one the plurality of game NFTs for play—in this case, the game "I Dig It". The selection is received by the platform which responds by interacting, via the network 115, with a client device 825 to support play of the selected game by the user—as shown in FIG. 62D. This support can include streaming game video to, and receiving game input from, the client device 625 via the network 115.

The NFT collection platform 800 and/or associated client device improves the technology of NFT systems and existing gaming platforms by allowing the user to generate, store, collect, display and use game NFTs that include playable content. The use of NFTs in association with playable game content allows users to "own" playable versions of games that can be streamed to a user's client device, to own and trade collectable limited game edition NFTs, to loan authenticated versions of games for the play of others, and/or to authenticate the user's ownership in the game and the game NFT.

FIG. 62E presents a flowchart representation of an example method. In particular, a method 6200-2 is presented for use in conjunction with any of the functions and features previously described. Step 6202-2 includes accessing, via a network interface, a plurality of game NFTs, each of the plurality of game NFTs associated with a game accessible by a user of a client device. Step 6204-2 includes generating, via the processor, display data associated with a customized collection display that contains the plurality of game NFTs for display via a graphical user interface.

Step 6206-2 receiving, via the graphical user interface, a selection of one the plurality of game NFTs for play of the associated game. Step 6208-2 includes facilitating, via the network interface and in conjunction with the client device, play of the game associated with the one of the plurality of game NFTs.

FIG. 62F presents a block diagram/flow representation of an example of NFT generation. In particular, game data 6226 has been collected in association with the user's (player's) play of a game corresponding to game NFT 6220. At some time, such as the end of a game, when a player reaches certain goals or achievements in the game, upon expiration of a predetermined time period, upon accumulation of a predetermined amount of game play (e.g. a number of games played, an amount of play time, etc.) or other criteria, the game data 6226 is used to generate an update to the game NFT 6220 as the updated game NFT 6220-1. In this fashion, the player's game play and/or performance and achievements can be used to update the game NFT so that a player can pick up where he/she left off, have a mechanism to display some of the performance/achievements in conjunction with the game NFT itself.

As used herein, the term "updated" NFT can be used to represent changes that are made to an original NFT—i.e. the NFT that is the subject of the update. In addition, an "updated" NFT can be a new NFT, such as a derivative NFT, an all new NFT or other NFT that is minted based on the content, images, metadata and/or other data or based merely on the existence of the original NFT. This new NFT can be minted on the original blockchain used to mint the original NFT or via a parachain/side chain that is different from the original blockchain.

In FIG. 62G, an example of Game NFT 6220 corresponding to an NBA game is presented. In FIG. 62H, game data 6226 is generated based on the player's play of the game and used to generate an updated game NFT 6220-1. In the example shown, updated game NFT 6220-1 visually reflects that the player has reached the "one-star" level.

FIG. 62I presents a flowchart representation of an example method. In particular, a method 6200-3 is presented for use in conjunction with any of the functions and features previously described. Step 6202-3 includes facilitating, via the network interface and in conjunction with the client device, play of the game associated with the one of the plurality of game NFTs. Step 6204-3 includes receiving, via the processor, game data associated with the game play of the game by a user. Step 6206-3 includes updating the original NFT associated with the game piece, based on the game data associated with the game play of the game by the user.

FIG. 62J presents a block diagram/flow representation of an example of NFT generation. In the example shown, NFT generation tools 808 are used to generate a derivative NFT 6224 based on the expiration restrictions 6222 that is shown in FIG. 62K. The expiration restrictions can correspond to, for example, an expiration time and/or date, one or N time use in a game, tournament or challenge, etc. This derivative NFT 4624 can be created on a parachain or other sidechain that is different from the blockchain on which the original game NFT 6220 resides. Furthermore, this derivative NFT 6224 can be micro-loaned or otherwise leased or loaned to another user for game play—subject to the expiration restrictions. In this fashion, for example, other users can play the game in exchange for a price (payment, bounty, experience, etc.).

In FIG. 62L, the derivative NFT 6224 has been temporarily loaned to another user who plays the game. At the end of the loan (e.g. when the expiration restrictions are met) the loaned game is automatically deleted, destroyed, disabled or otherwise "burned" and game data 6226 indicating the end of the escrow, stats and experience or other game performance metrics earned by the other user via the game are retrieved and can be stored by the user on the blockchain or other decentralized computer network with the original NFT 6220 to generate updated NFT 6220', as shown in FIG. 62M.

FIG. 62N presents a flowchart representation of an example method. In particular, a method 6200-4 is presented for use in conjunction with any of the functions and features previously described. Step 6202-4 includes facilitating, via the processor, creation of a derivative NFT corresponding to an original NFT associated with a game the derivative NFT having expiration restrictions limiting game play of the game. Step 6204-4 includes facilitating, via the processor, a micro-loan transaction of the derivative NFT to another user to facilitate the game play of the game by the other user, wherein the derivative NFT expires when the expiration restrictions are met.

FIG. 62O presents a flowchart representation of an example method. In particular, a method 6200-5 is presented for use in conjunction with any of the functions and features previously described. Step 6202-5 includes facilitating, via the processor, creation of a derivative NFT corresponding to an original NFT associated with a game the derivative NFT having expiration restrictions limiting game play of the game. Step 6204-5 includes facilitating, via the processor, a micro-loan transaction of the derivative NFT to another user to facilitate the game play of the game by the another user, wherein the derivative NFT expires when the expiration restrictions are met. Step 6206-5 includes receiving, via the processor, game data associated with the game play of the game piece by the another user. Step 6208-5 includes updating the original NFT associated with the game piece, based on the game data associated with the game play of the game piece by the other user.

FIG. 62P presents a flowchart representation of an example method. In particular, a method 6200-6 is presented for use in conjunction with any of the functions and features previously described. Step 6202-6 includes accessing, via a network interface, a plurality of game NFTs, each of the plurality of game NFTs including a playable instance of an associated game that is accessible by a user of a client device. Step 6204-06 includes generating, via the processor, display data associated with a customized collection display that contains the plurality of game NFTs. Step 6206-06 includes sending, via the network interface, the display data associated with a customized collection display to the client device for display via a graphical user interface associated with the client device.

Step 6208-06 includes receiving, via the graphical user interface, a selection of one the plurality of game NFTs for play of the associated game. Step 62010-06 includes facilitating, via the network interface, play of the associated game in conjunction with the client device.

In various examples, facilitating the play of the associated game includes streaming, via the network interface, game video associated with the one of the plurality of game NFTs to the client device and receiving from the client device, via the network interface, game data associated with the game play of the game by the user. The customized collection display that presents the plurality of game NFTs can be configured in response to user interactions with the graphical user interface, configured based on metadata associated with the plurality of game NFTs and/or example, be configured based on genres associated with the plurality of game NFTs or other categories or customized arrangements, either automatically or by selection from the user.

In various examples, the method can further includes updating the game NFT based on the game play of the associated game by the user, for example, by minting an updated game NFT that may be minted on via parachain that can be different from the blockchain that minted the game NFT. The method can further include: facilitating creation of a derivative NFT corresponding to a game NFT of the plurality of game NFTs, the derivative NFT having expiration restrictions limiting game play of the associated game; and facilitating a micro-loan transaction of the derivative NFT to another user to facilitate the game play of the associated game by the another user, wherein the derivative NFT expires when the expiration restrictions are met. These facilitating steps can be accomplished via NFT marketplace tools 804 and NFT generation tools 808 in conjunction with, for example, one or more NFT wallet systems 820, one or more NFT marketplaces 822 and one or more NFT creation systems 824.

FIG. 62Q presents a flowchart representation of an example method. In particular, a method 6200-7 is presented for use in conjunction with any of the functions and features previously described. Step 6202-7 includes receiving, via the network interface and from a non-fungible token (NFT) game platform, display data associated with a customized collection display that presents a plurality of game NFTs, each of the plurality of game NFTs including a playable instance of an associated game that is accessible by a user of the client device. Step 6204-07 includes displaying the display data via a graphical user interface and a display device associated with the client device.

Step 6206-07 includes receiving, via the processor in response to user interactions with the graphical user interface, a selection of one the plurality of game NFTs for play of the associated game. Step 6208-7 includes sending, to the NFT game platform via the network interface, selection data indicating the selection of the one the plurality of game NFTs. Step 6210-07 includes facilitating, via the network interface and in conjunction with NFT game platform, play of the associated game.

The NFT game platform can be implemented via NFT collection platform 800, NFT distribution platform 2800, and/or other NFT platform that can include or operate in conjunction with NFT transaction authenticator 6022, NFT source 6026, secure real-time NFT metadata repository 6024, NFT wallet system 820, NFT marketplace 822, NFT creation system 824, and/or other tools, devices and systems described herein.

In various examples, facilitating the play of the associated game includes receiving, via the network interface, game video associated with the one of the plurality of game NFTs that is streamed from the NFT game platform and/or sending to the NFT game platform, via the network interface, game data associated with the game play of the game by the user that is generated by the client device.

FIG. 63A presents a block diagram/flow representation of an example of NFT generation. In particular, team data 6326 has been collected in association with the performance and activities of a team corresponding to team NFT 6320. In the example shown, the team NFT 6320 is associated with an NFL team, the Los Angeles Rams. The team data 6326 can include game statistics from actual games such as points scored, touchdowns, turnovers, passing yards, running yards, total yards, a win or loss, game attendance and other game statistics, season statistics such as win loss record, advancement in post season play, attendance, and other team statistics such as the number of Super Bowls played, the number of Super Bowls won, etc. The team data 6326 can be collected from a media outlet, sports website or other source of sports statistics. While described above in terms of a football team, team data associated with other teams in other sports such as hockey, cricket, soccer, rugby, baseball, basketball, Olympic sports and other team sports can likewise be collected.

At some time, such as the end of a game, the end of a season, the beginning of post season play, periodically, after some time interval, the occurrence of certain goals, milestones or achievements, etc. the team data 6326 is collected and used to generate an update to the team NFT 6320 as the updated team NFT 6320-1. In this fashion, the team's game play and/or other performance and achievements can be used to update the team NFT to reflect this updated performance, achievements, etc.

As previously discussed the term "updated" NFT can be used to represent changes that are made to an original NFT—i.e. the NFT that is the subject of the update. These changes could be to merely add the new team data 6326 to the NFT metadata to the original team NFT 6320 and/or to change the visual display to reflect changes in performance and/or new achievements. In addition, an "updated" team NFT 6320-1 can be a new NFT, such as a derivative NFT or other NFT that is minted based on the content, images, metadata and/or other data from the original team NFT 6320 and/or an entirely new NFT with different content, images, that is "based on" the original team NFT 6320 merely because the existence of the original NFT automatically triggered the generation of new/updated NFT. This updated NFT can be minted on the original blockchain used to mint the original NFT or via a parachain/side chain that is different from the original blockchain.

In FIG. 63B, an example of team NFT 6220 corresponding to an NFL team is presented. In FIG. 63C, team data 6326 is generated based on the team's actual play in their sport, in this case the play of the team in Super Bowl LVI and used to generate an updated game NFT 6320-1. In the example shown, updated team NFT 6320-1 visually reflects that the team is the Super Bowl LVI champion. In this fashion, for example, a user that owns a Rams NFT can qualify to automatically receive (or have early access to purchase) a special Rams Super Bowl NFT that is dropped when the Ram's win the Super Bowl.

FIG. 63D presents a flowchart representation of an example method. In particular, a method 6300-1 is presented for use in conjunction with any of the functions and features previously described. Step 6302-1 includes receiving, via the processor, team data associated with game play of a sports team. Step 6304-1 includes facilitating generation of an updated team NFT associated with the sports team, based on the team data associated with the game play of the sports team and based on an original team NFT associated with the sports team.

FIG. 63E presents a block diagram/flow representation of an example of NFT generation. In particular, player data 6336 has been collected in association with the performance and activities of a player on a sports team corresponding to player NFT 6330. In the example shown, the player NFT 6330 is associated with the player, Matthew Stafford for an NFL team, the Los Angeles Rams. The player data 6336 can include game statistics such as points scored, touchdowns, turnovers, passing yards, running yards, total yards, a win or loss, and other game statistics, season statistics such as win/loss record, advancement in post season play, and other player statistics such as the number of Super Bowls played, the number of Super Bowls won, etc. The player data 6336 can be collected from a media outlet, sports website or other source of sports statistics. While described above in terms of a player for a football team, player data associated with players in other sports such as hockey, cricket, soccer, rugby, baseball, basketball, Olympic sports, golf, table tennis, tennis, and other sports can likewise be collected.

At some time, such as the end of a game or match, the end of a season, the end of a tournament, the beginning of post season play, periodically, after some time interval, the occurrence of certain goals, milestones or achievements, etc. the player data 6336 is collected and used to generate an update to the player NFT 6330 as the updated player NFT 6330-1. In this fashion, the player's game play and/or other performance and achievements can be used to update the player NFT to reflect this updated performance, achievements, etc.

The changes in the updated player NFT 6330-1 could be to merely add the new player data 6336 to the NFT metadata of the original player NFT 6330 and/or to change the visual display to reflect changes in performance and/or new achievements. In addition, an "updated" player NFT 6330-1 can be a new NFT, such as a derivative NFT or other NFT that is minted based on the content, images, metadata and/or other data from the original player NFT 6330 and/or an entirely new NFT with different content, images, that is "based on" the original player NFT 6330 merely because the existence of the original NFT automatically triggered the generation of new/updated NFT. This updated NFT can be minted on the original blockchain used to mint the original NFT or via a parachain/side chain that is different from the original blockchain.

In FIG. 63F, an example of player NFT 6330 corresponding to an NFL player is presented. In FIG. 63G, player data 6336 is generated based on the player's actual play in their sport, in this case the play of the player in Super Bowl LVI and used to generate an updated player NFT 6330-1. In the example shown, updated player NFT 6330-1 visually reflects that the player is a Super Bowl LVI champion. In this fashion, for example, a user that owns a Matthew Stafford NFT can qualify to automatically receive (or have early access to purchase) a special Matthew Stafford Super Bowl NFT that is dropped when the Ram's win the Super Bowl.

FIG. 63H presents a flowchart representation of an example method. In particular, a method 6300-2 is presented for use in conjunction with any of the functions and features previously described. Step 6302-2 includes receiving, via the processor, player data associated with game play of a sports team player. Step 6304-2 includes facilitating generation of an updated player NFT associated with the sports team player, based on the player data associated with the game play of the sports team player and based on an original player NFT associated with the sports team player.

FIG. 63I presents a block diagram/flow representation of an example of NFT generation. In particular, contestant data 6346 has been collected in association with the performance and activities of a contestant corresponding to contestant NFT 6340. In the example shown, the contestant NFT 6340 is associated with the contestant, Cam Anthony in season 20 of the reality television game show, The Voice. The contestant data 6346 can include the number of chair turns, saves, steals, word-wide votes, statistics regarding the popularity of their music, and/or other contestant statistics and data pertinent to the contestant's career and performance on the show (the contest). The contestant data 6346 can be collected from a media outlet associated with the contest. While described above in terms of a contestant for a reality television show, the contestant/contest can correspond to other game shows, tests of knowledge, athletic ability, and/or other skills and/or other contests and the contestant data 6346 can include data associated with the contestant's performance in the contest itself.

At some time, such as the end of a game, match, contest, the end of a season, the end of a tournament, periodically, after some time interval, the occurrence of certain goals, milestones or achievements, etc., the contestant data 6346 is collected and used to generate an update to the contestant NFT 6340 as the updated contestant NFT 6340-1. In this fashion, the contestant's game/contest play and/or other performance and achievements can be used to update the contestant NFT to reflect this updated performance, achievements, etc.

The changes in the updated contestant NFT 6340-1 could be to merely add the new contestant data 6346 to the NFT metadata of the original contestant NFT 6340 and/or to change the visual display to reflect changes in performance and/or new achievements. In addition, an "updated" contestant NFT 6340-1 can be a new NFT, such as a derivative NFT or other NFT that is minted based on the content, images, metadata and/or other data from the original contestant NFT 6340 and/or an entirely new NFT with different content, images, that is "based on" the original contestant NFT 6340 merely because the existence of the original NFT automatically triggered the generation of new/updated NFT. This updated NFT can be minted on the original blockchain used to mint the original NFT or via a parachain/side chain that is different from the original blockchain.

In FIG. 63J, an example of contestant NFT 6340 corresponding to a contestant on The Voice is presented. In FIG. 63K, contestant data 6346 is generated based on the contestant's results from a finale performance and used to generate an updated contestant NFT 6340-1. In the example shown, updated contestant NFT 6340-1 visually reflects that the contestant was a winner of The Voice. In this fashion, for example, a user that owns a Cam Anthony NFT can qualify to automatically receive (or have early access to purchase) a special Cam Anthony Voice Champion NFT that is dropped when the Cam wins The Voice.

FIG. 63L presents a flowchart representation of an example method. In particular, a method 6300-3 is presented for use in conjunction with any of the functions and features previously described. Step 6302-3 includes receiving, via the processor, contestant data associated with performance of a contestant in a contest. Step 6304-3 includes facilitating generation of an updated contestant NFT associated with the contestant, based on the contestant data and based on an original contestant NFT associated with the contestant.

FIG. 63M presents a block diagram/flow representation of an example of NFT generation. In particular, celebrity data 6356 has been collected in association with the performance and activities of a contestant corresponding to celebrity NFT 6350. In the example shown, the celebrity NFT 6350 is associated with the celebrity, Cam Anthony, a contestant in season 20 of the reality television game show, The Voice. The celebrity data 6356 can include the performance on a reality television show, statistics regarding the popularity of their music, awards and nominations received, the number and stature of the performances and appearances, social media data regarding followers, likes, and/or other popularity metrics, data from critical reviews and/or other celebrity statistics and data pertinent to the celebrity's career. The celebrity data 6356 can be collected from a media outlet associated with one or more celebrities such as TMZ, Hollywood stock exchange, etc. While described above in terms of a contestant for a reality television show, the celebrity can be a musician, actor, sports figure, political figure, social media influencer, inventor, media personality, the head of a company, a public figure or other celebrity.

The changes in the updated celebrity NFT 6350-1 could be to merely add the new celebrity data 6356 to the NFT metadata of the original celebrity NFT 6350 and/or to change the visual display to reflect changes in performance and/or new achievements. In addition, an "updated" celebrity NFT 6350-1 can be a new NFT, such as a derivative NFT or other NFT that is minted based on the content, images, metadata and/or other data from the original celebrity NFT 6350 and/or an entirely new NFT with different content, images, that is "based on" the original celebrity NFT 6350 merely because the existence of the original NFT automatically triggered the generation of new/updated NFT. This updated NFT can be minted on the original blockchain used to mint the original NFT or via a parachain/side chain that is different from the original blockchain.

In FIG. 63N, an example of celebrity NFT 6350 corresponding to a contestant on The Voice is presented. In FIG. 63O, celebrity data 6356 is generated based on the celebrity's results from a finale performance on the show and used to generate an updated celebrity NFT 6350-1. In the example shown, updated celebrity NFT 6350-1 visually reflects that the contestant was a winner of The Voice. In this fashion, for example, a user that owns a Cam Anthony NFT can qualify to automatically receive (or have early access to purchase) a special Cam Anthony Voice Champion NFT that is dropped when the Cam wins The Voice.

FIG. 63P presents a flowchart representation of an example method. In particular, a method 6300-4 is presented for use in conjunction with any of the functions and features previously described. Step 6302-4 includes receiving, via the processor, receiving, via the processor, celebrity data associated with activities of a celebrity. Step 6304-1 includes facilitating generation of an updated celebrity NFT associated with the celebrity, based on the celebrity data and based on an original celebrity NFT associated with the celebrity.

As previously FIGS. 59A-59E, a metaverse gallery can be generated and used to display NFTs in a virtual world. In other examples, one or more NFTs can be "placed" in set locations in a real-world location, such as a gallery, and are viewable via alternative reality (AR) technology. The gallery can be a special AR environment or conventional gallery with AR space configured to display NFTs using AR equipment such as smartphones running an AR app and/or AR googles that are provided by the visitors to the gallery or provided by the gallery itself for the purpose of viewing the NFTs that are located there. Other ordinary locations can also provide a suitable AR environment for viewing NFT imagery. The location and orientation of the AR equipment in relation to the specific location of the NFT in the AR environment is used to reproduce displays of NFT imagery via the AR equipment.

FIG. 64A presents a pictorial representation of an example screen display. In the example shown, the user has used the NFT collection display tools to choose a specific AR environment to display one or more NFTs. In FIGS. 64B and 64C, the user has selected a specific NFT 6420-1 to display and has selected a location to display the NFT in the AR environment by dragging and dropping the NFT to the desired location.

FIG. 64D presents a block diagram/flow representation of an example of the generation of AR environment display data. In the example shown, the NFT collection tools 808 include an AR creation engine such as Niantic's Lightship engine or other tool that facilitates the placement and location of imagery associated with one or more NFT(s) 6420 in an AR environment based on AR environment selection data 6422 generated in response to user interaction. The result is AR environment display data 6424 that displays the NFT(s) 6420 to viewers that are located in the corresponding space in the physical world.

FIG. 64E presents a block diagram/flow representation of an example of NFT generation. In addition to providing users a mechanism for viewing and displaying NFTs in their collection, AR interaction data 6430 can be collected and tracked based on views and other interactions with a user's NFT(s) by other users. These interactions can be used to provide credit to the user and/or the specific NFT itself. For example, an updated NFT 6435 can be generated based on an NFT 6420-1 that is displayed via AR equipment in the AR environment and the AR interaction data 6430 that is collected from the AR equipment of the viewers. This updated NFT 6435 can, for example, indicate a threshold number of viewings, a threshold number of positive comments, social media postings, the inclusion of the NFT in the AR environment is special and/or curated events, etc. In this fashion, for example, a user that displays a particular NFT 6420-1 can qualify to automatically receive (or have early access to purchase) special updated NFTs 6435 that are dropped in response to viewing/interaction thresholds being reached.

FIG. 64F presents a pictorial/flow representation of an example update to an NFT. In the example shown, AR interaction data 6430 indicating a number of positive viewer interactions with the NFT 6420-1 that is displayed via AR equipment in the AR environment as shown. The AR interaction data 6430 is used to generate an updated NFT 6435. This updated NFT 6435 includes a special "Ruby Level" visual indicator that commemorates to the user and to others that the number of positive viewer interactions with the NFT 6420-1 has been reached. In response, the user may choose to replace NFT 6420-1 with updated NFT 6435 in the AR environment to show off this status to other viewers. In other examples, the updating of the NFT and replacement in the AR environment can happen automatically, without any user interaction beyond the first placement of NFT 6420-1.

FIG. 64G presents a flowchart representation of an example method. In particular, a method 6400-1 is presented for use in conjunction with any of the functions and features previously described. Step 6402-1 includes receiving, via the processor, selection data indicating one or more NFTs and further indicating an alternative reality (AR) environment. Step 6404-1 includes facilitating generation of AR environment display data for virtual display of the one or more NFTs in the AR environment.

FIG. 64H presents a flowchart representation of an example method. In particular, a method 6400-2 is presented for use in conjunction with any of the functions and features previously described. Step 6402-2 includes receiving, via the processor, alternative reality (AR) interaction data indicating interaction with an NFT in an AR environment. Step 6404-2 includes facilitating generation of an updated NFT based on the AR interaction data and based on the NFT.

As used herein, the terms "game piece" and "game character" can be used interchangeably to refer to a game character, an ancillary article or other article or object that is used in a game.

As used herein "blockchain" and "blockchain node" refer to traditional blockchain technology as well as other decentralized computer network technologies that, for example, maintain a secure and decentralized record of transactions and/or otherwise protect the security of digital information. In various examples, a blockchain can operate to collect information together in groups, such as blocks, that hold sets of information. These blocks have certain storage capacities and, when filled, are closed and linked to the previously filled blocks, forming a chain of data. New information that follows that freshly added block is compiled into newly formed blocks that, once filled, can also be added to the chain.

As used herein the term "tool" corresponds to a utility, application and/or other software routine that performs one or more specific functions in conjunction with a computer.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, nonvolatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein involve NFTs that are generated ("minted") and secured via blockchain or other decentralized computer network technology. The distributed nature of these technologies over different nodes, the contemporaneous nature of geographically distinct calculations, coupled with the extreme computational complexity of the required calculations means that these decentralized computer network technologies cannot practically be performed by the human mind.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A client device comprises:
a network interface configured to communicate via a network;
at least one processor;
a non-transitory machine-readable storage medium that stores operational instructions that, when executed by the processor, cause the at least one processor to perform operations that include:
receiving, via the network interface and from a non-fungible token (NFT) game platform, display data associated with a customized collection display that presents a plurality of game NFTs, each of the plurality of game NFTs associated with a game that is accessible by a user of the client device, wherein the customized collection display that presents the plurality of game NFTs is configured based on genres associated with the plurality of game NFTs;
displaying the display data via a graphical user interface and a display device associated with the client device;
receiving, via the processor in response to user interactions with the graphical user interface, a selection of one the plurality of game NFTs for play of the associated game;
sending, to the NFT game platform via the network interface, selection data indicating the selection of the one the plurality of game NFTs; and
facilitating, via the network interface and in conjunction with NFT game platform, play of the associated game when ownership of the game NFT is authenticated.

2. The client device of claim 1, wherein facilitating the play of the associated game includes receiving, via the network interface, game video associated with the one of the plurality of game NFTs that is streamed from the NFT game platform.

3. The client device of claim 1, wherein facilitating the play of the associated game includes sending to the NFT game platform, via the network interface, game data associated with the game play of the game by the user that is generated by the client device and wherein the one of the plurality of game NFTs is updated based on the game data.

4. The client device of claim 1, wherein the customized collection display that presents the plurality of game NFTs is configured in response to user interactions with the graphical user interface.

5. The client device of claim 1, wherein the customized collection display that presents the plurality of game NFTs is configured further based on metadata associated with the plurality of game NFTs.

6. The client device of claim 1, wherein ownership of the game NFT is authenticated based on the user.

7. The client device of claim 1, wherein the game NFT associated with the associated game is updated based on the game play of the associated game by the user.

8. The client device of claim 7, wherein the game NFT associated with the associated game, is updated by minting an updated game NFT.

9. The client device of claim 8, wherein the updated game NFT is minted on via a parachain that is different from a blockchain that minted the game NFT.

10. The client device of claim 1, wherein the operations further include:
facilitating, in response to user interactions with the graphical user interface, creation of a derivative NFT corresponding to a game NFT of the plurality of game NFTs, the derivative NFT having expiration restrictions limiting game play of the associated game; and
facilitating, in response to user interactions with the graphical user interface, a micro-loan transaction of the derivative NFT to another user to facilitate the game play of the associated game by the another user, wherein the derivative NFT expires when the expiration restrictions are met.

11. A method for use with a non-fungible token (NFT) platform that includes a processor and a memory, the method comprising:
accessing, via a network interface, a plurality of game NFTs, each of the plurality of game NFTs including a playable instance of an associated game that is accessible by a user of a client device;
generating, via the processor, display data associated with a customized collection display that contains the plurality of game NFTs, wherein the customized collection display that presents the plurality of game NFTs is configured based on genres associated with the plurality of game NFTs;

sending, via the network interface, the display data associated with a customized collection display to the client device for display via a graphical user interface associated with the client device;

receiving, via the graphical user interface, a selection of one the plurality of game NFTs for play of the associated game; and facilitating, via the network interface and in conjunction with NFT game platform, play of the associated game when the game NFT is authenticated.

12. The method of claim 11, wherein facilitating the play of the associated game includes streaming, via the network interface, game video associated with the one of the plurality of game NFTs to the client device.

13. The method of claim 11, wherein facilitating the play of the associated game includes sending to the NFT game platform, via the network interface, game data associated with the game play of the game by the user that is generated by the client device and wherein the one of the plurality of game NFTs is updated based on the game data.

14. The method of claim 11, wherein the customized collection display that presents the plurality of game NFTs is configured in response to user interactions with the graphical user interface.

15. The method of claim 11, wherein the customized collection display that presents the plurality of game NFTs is configured further based on metadata associated with the plurality of game NFTs.

16. The method of claim 11, wherein ownership of the game NFT is authenticated based on the user.

17. The method of claim 11, further comprising:
updating the game NFT based on the game play of the associated game by the user.

18. The method of claim 17, wherein the game NFT associated with the associated game, is updated by minting an updated game NFT.

19. The method of claim 18, wherein the updated game NFT is minted on via parachain that is different from a blockchain that minted the game NFT.

20. The method of claim 11, further comprising:
facilitating creation of a derivative NFT corresponding to a game NFT of the plurality of game NFTs, the derivative NFT having expiration restrictions limiting game play of the associated game; and facilitating a micro-loan transaction of the derivative NFT to another user to facilitate the game play of the associated game by the another user, wherein the derivative NFT expires when the expiration restrictions are met.

* * * * *